US007230127B2

(12) United States Patent
Sage et al.

(10) Patent No.: US 7,230,127 B2
(45) Date of Patent: Jun. 12, 2007

(54) PHOTOLUMINESCENT COMPOUNDS

(75) Inventors: Ian C Sage, Worcester (GB); Wendy H Howie, Worcester (GB); Ian D Brotherston, Worcester (GB)

(73) Assignee: Qinetiq Limited, London (GB)

( * ) Notice: Subject to any disclaimer, the term of this patent is extended or adjusted under 35 U.S.C. 154(b) by 63 days.

(21) Appl. No.: 10/486,965

(22) PCT Filed: Aug. 6, 2002

(86) PCT No.: PCT/GB02/03619

§ 371 (c)(1),
(2), (4) Date: Feb. 17, 2004

(87) PCT Pub. No.: WO03/016427

PCT Pub. Date: Feb. 27, 2003

(65) Prior Publication Data

US 2004/0245503 A1 Dec. 9, 2004

(30) Foreign Application Priority Data

Aug. 14, 2001 (GB) ................................ 0119727.6

(51) Int. Cl.
*C07F 15/00* (2006.01)
*C07F 49/92* (2006.01)
*H01J 1/62* (2006.01)

(52) U.S. Cl. .......................... 556/14; 556/40; 428/690; 313/504

(58) Field of Classification Search ................ 428/690, 428/917, 343; 252/301.16; 556/14, 40; 313/504
See application file for complete search history.

(56) References Cited

U.S. PATENT DOCUMENTS

| | | | | |
|---|---|---|---|---|
| 5,504,195 | A | 4/1996 | Leedham et al. | 534/15 |
| 6,071,632 | A | 6/2000 | Hall-Goulle | 428/690 |
| 6,524,727 | B1 * | 2/2003 | Kathirgamanathan | 428/690 |
| 6,605,317 | B1 * | 8/2003 | Kathirgamanathan | 427/162 |
| 2004/0233347 | A1 * | 11/2004 | Sage et al. | 349/56 |

FOREIGN PATENT DOCUMENTS

| | | | |
|---|---|---|---|
| EP | 1 009 033 | A | 6/2000 |
| EP | 1 035 160 | A | 9/2000 |
| GB | 2 232 119 | A | 12/1990 |
| GB | 2232199 | A | 12/1990 |
| GB | 2 325 883 | A | 12/1998 |
| WO | 96/20942 | A | 7/1996 |
| WO | 97/18451 | A | 5/1997 |
| WO | 02/062914 | A1 | 8/2002 |

(Continued)

OTHER PUBLICATIONS

Reyes et al. Growth and Characterization of OLED with samarium complex as emitting and electron transporting layer, 2002 Thin Solid Films vol. 420-421, pp. 23-29.*

(Continued)

*Primary Examiner*—Rena Dye
*Assistant Examiner*—Camie S. Thompson
(74) *Attorney, Agent, or Firm*—Nixon & Vanderhye P.C.

(57) ABSTRACT

Triboluminescent materials comprising M wherein M is chosen from Tb, Eu, Sm, Dy and from 75% to 99.99% of M is replaced by Y, Gd, La or Lu.

11 Claims, 1 Drawing Sheet

FOREIGN PATENT DOCUMENTS

WO 02/062915 A1 8/2002

OTHER PUBLICATIONS

Figure 1:
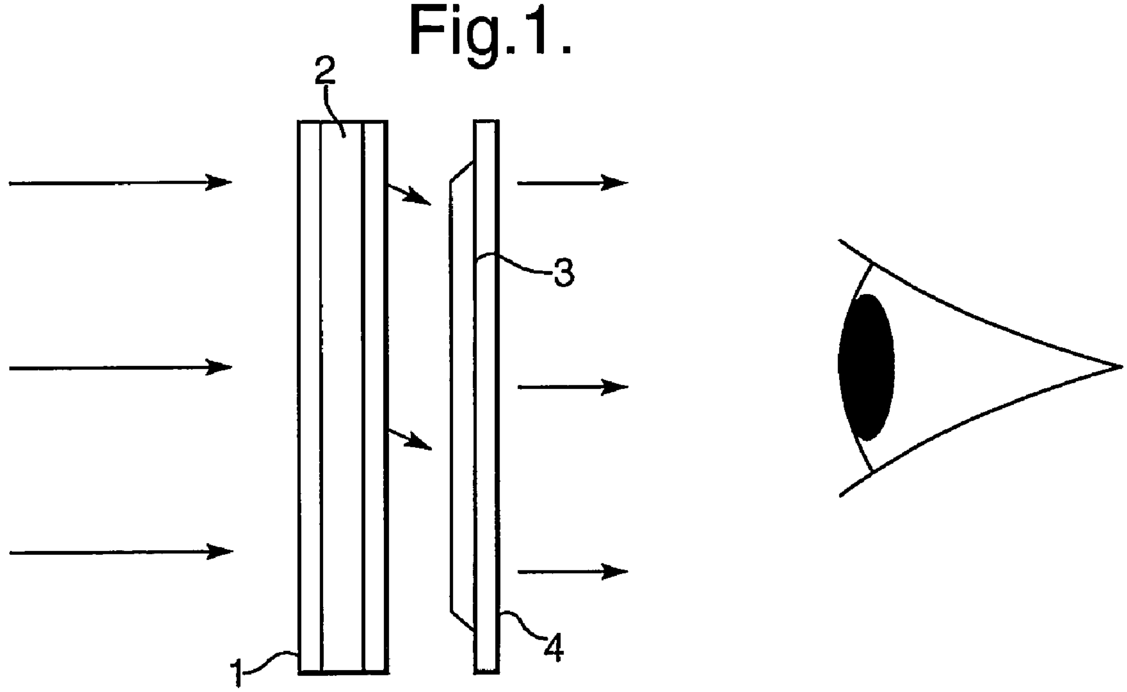

Zhu et al., Red Mechanoluminescence and Photoluminescence from Novel Europium Complexes, Chinese Chemical Letters, vol. 11, No. 7, pp. 635-638, Jan. 2000.*

Zhu et al., Synthesis and Fluorescent Properties of New Binuclear Europium beta-Diketone chelates EumY1-m(TTA)3phen as Red Electroluminescent Materials, Chinese Chemical Letters vol. 10, No. 7, pp. 603-606, 1999.*

Zhu et al; "Red Mechanoluminescence and Photoluminescenece from Novel Europium Complexex"; Chinese Chemical Letters, vol. 11, No. 7, 2000, pp. 635-638, XP008009596.

Brandl: "Das Phaenomen Der Triboluminreszenz"; Mathemathische UND Naturwissenschaftliche Unterricht, Duemmler, BONN, DE, Jun. 1, 1992, pp. 195-202, XP001078983.

Zhu Wenxiang et al; "Triboluminescent Complexes of Rare Earth (I). Ternary Complexes of Samarium (3+), and Terbium (3+) with Thenoyltrifluoroacetone and Triphenylphosphine Oxide"; Caplus, XP002217570.

Zhu Wenxiang et al; "Rare Earth Triboluminescent Complexes. Part II, Mixed Complexes Between Europium (3+), TTA and Pyridine-Type N-Oxide Compounds"; Retrieved from STN Database Accession No. 114:1771144 CA, XP002217712.

Ala-Kleme et al; "Y (III)-Enhanced Dy (III) and Sm (III)-Specific Electrogenerated Luminescence of Heterrodinuclear 1-Y(III)-Dy(III)-1 and 1-Y(III)-Sm(III)-1 Chelates"; Journal of Alloys and Compounds, vol. 275-277, 1998, pp. 911-914, XP002217711.

Akiyama et al; "Influence of Eu, Dy Co-Doped Strontium Aluminate Composition on Mechanoluminescence Intensity"; Journal of Luminescence, Amsterdam, NL, vol. 97, No. 1, Apr. 2002, pp. 13-18, XP004347383.

Takada et al; "Mechanoluminescent Properites of Europium Complexes"; Synthetic Metals, Elsevier Sequoia, Lausanne, CH, vol. 91, No. 1/3, Dec. 1997, pp. 351-354, XP000866433.

Patent Abstracts of Japan, vol. 006, No. 011 (C-088), Jan. 22, 1982 & JP 56 136874 A, Oct. 26, 1981, Abstract.

Chinese Chemical Letters, vol. 11, No. 7, pp. 635-638, 2000.

Chinese Chemical Letters, vol. 11, No. 7, pp. 635-638, 2000.

* cited by examiner

PHOTOLUMINESCENT COMPOUNDS

This application is the US national phase of international application PCT/GB02/03619, filed in English on 6 Aug. 2002, which designated the US. PCT/GB02/03619 claims priority to GB Application No. 0119727.6 filed 14 Aug. 2001. The entire contents of these applications are incorporated herein by reference.

This invention relates to photoluminescent (PL) materials and their use in devices which exploit the photoluminescent effect.

Photoluminescent materials are known. Examples include such materials as manganese doped zinc sulphide, copper activated strontium pyrophosphate, and solutions of organic dyes such as fluorescein and coumarin 6.

Photoluminescence is a general term including the phenomena fluorescence and phosphorescence. Photoluminescence is a general term used to describe the emission of light as a result of an initial absorption of light.

Chinese Chemical Letters, vol 11, no 7 pp 635–38, 2000 discloses a number of compounds that exhibit mechanoluminescence (ML) and photoluminescence. More specifically two 1:1 binuclear (europium and lanthanum) β-diketonate complexes are disclosed. The complexes further comprise 1,10-phenanthroline and an anion of thenoyltrifluoroacetone (HTTA).

Soden in J. Appl. Phys., 32, (1961) 750 discloses the effects of rare-earth substitutions on the fluorescence of Terbium Hexa-Antipyrine tri-iodide.

Preferably the photoluminescent materials of the present invention exhibit phosphorescence i.e such substances absorb radiation and as a result are induced to emit radiation themselves and the emission continues after the source of irradiation is removed.

There are numerous applications of phosphorescent compounds and there is a continued need for alternative more effective compounds in order for devices utilising the phosphorescent phenomena to be more effective.

Preferably for use in photoluminescent devices, photoluminescent compounds exhibit some or all of the following properties:

- Bright emission and high quantum yield for their photoluminescence
- High stability to temperature and short wavelength light
- Ability to absorb light at wavelengths emitted by common sources such as mercury discharge lamps, or by novel sources such as blue LEDs
- Emission at wavelengths which are different from those provided by known materials
- Emission of light having other features distinguishable from known materials, such as luminescence lifetime, bandwidth, etc.

Clearly it is also advantageous that if photoluminescent compounds are to be used commercially then they should not be prohibitively expensive.

The current invention provides for the use of a range of compounds in a number of devices/applications which exploit the photoluminescent effect.

According to a first aspect of this invention use of materials comprising M plus ligand wherein M is chosen from Tb, Eu, Sm, Dy and 0.01%–99.99% of M is replaced by at least one of Y, Gd, La or Lu as photoluminescent materials is provided, provided that:

other than when the photoluminescent material is selected from Formula I or Formula III; when; with respect to M only La and Eu are present then La is present in an amount of at least 75%;

when the material is given by Formula II then M is replaced by at least one of La or Lu.

Preferably the photoluminescent materials are chosen from the following general Formulae I and II and III:

Formula I

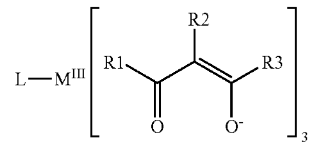

Wherein M is Eu, Tb, Dy or Sm and 0.01%–99.99% of M is replaced by at least one of Y, Gd, La or Lu;

R2 is H or C1–C6 alkyl or phenyl;

R1 and R3 are independently of each other selected from phenyl, naphthyl, H and C1–C6 branched or straight chain alkyl, thiophene and C1–C6 fluorinated alkyl wherein the fluorination may be in 1 or all positions or any intermediate value, substituted phenyl wherein the substituents are independently selected from C1–C4 straight or branched chain alkyl, Cl, Br, F, I and the phenyl group may be substituted in 1, 2 or 3 positions;

L is p-N,N-dimethylaminopyridine, N-methylimidazole, p-methoxypyridine-N-oxide, 4 phenyl pyridine, 2,2' bipyridyl, phenanthroline, bathophenanthroline, bathocuproine, 3-cyanopyridine, 4 cyanopyridine and for L their N-oxides;

L is also given by the following general Formula IA:

Formula IA

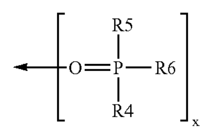

Wherein the arrow indicates that the oxygen coordinates to M wherein x is 1 or 2

R4 and R5 are independently of each other selected from phenyl, tolyl, naphthyl, C1–C6 branched or straight chain alkyl and substituted phenyl wherein the substituents are independently selected from C1–C4 straight or branched chain alkyl and the phenyl group may be substituted in 1, 2 or 3 positions;

R6 is selected from phenyl, tolyl, naphthyl, C1–C6 branched or straight chain alkyl, —$(CH_2)_n$P(O)R7 R8, wherein n=1 to 4 and —N═(P R7 R8 R9), wherein R7, R8 and R9 are independently selected from phenyl, naphthyl, C1–C6 branched or straight chain alkyl and substituted phenyl wherein the substituents are independently selected from C1–C4 straight or branched chain alkyl and the phenyl group may be substituted in 1, 2 or 3 positions;

R6 is also selected from substituted phenyl wherein the substituents are independently selected from C1–C4 straight or branched chain alkyl and the phenyl group may be substituted in 1, 2 or 3 positions;

it is understood in the definition of R6 that the phosphine oxide group, [included in —$(CH_2)_n$P(O)R7 R8] if present, may be coordinated to the metal atom M or to another equivalent metal atom as a bridging group.

For Formulae I and IA the C1–C6 alkyl groups can be straight chain or branched and are typically methyl, ethyl, n-propyl, isopropyl, n-butyl, sec-butyl, isobutyl, ter-butyl or the different positional isomers of pentyl and hexyl, cyclopentyl, cyclohexyl or methyl cyclopentyl.

Preferably the alkyl groups contain 1–4 carbon atoms.

Preferably M is Eu, Tb or Dy.

R2 is preferably H.

Most preferably R1 and R3 are each tert-butyl or phenyl.

The synthesis of compounds of Formula I is described in W0 96/20942 and references therein including Eisentrant et al, Inorg. Syn. 11, 1968, 94.

Hexa-antipyrine tri-iodide compounds of Formula II:

Formula II

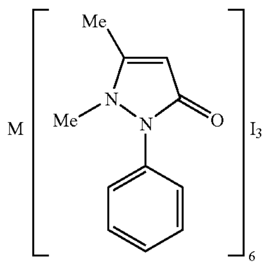

wherein M is Tb wherein 0.01%–99.99% of M is replaced by at least one of Y, Gd, La or Lu.

With respect to Formula II the $I_3$ anion may be replaced with other suitable anions such as tetrafluoroborate. When the anion is other than $I_3$ then the general formula will be referred to as Formula IV.

Compounds of Formula III:

Formula III

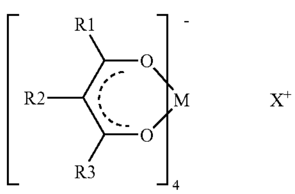

wherein M is Eu, Tb, Dy or Sm wherein 0.01%–99.99% of M is replaced by at least one of Y, Gd, La or Lu;

and wherein R1 and R2 and R3 are independently chosen from H, $C_1$–$C_{12}$ alkyl, including straight and branched chain which may be fluorinated in one, or any interim amount and up to all positions, $C_1$–$C_{12}$ cycloalkyl, aryl, thiophene, pyrrole, pyridine, pyrimidine, furan, benzoxazole, benzothiazole.

$X^+$ is selected from:

Morpholinium;

Pyridinium optionally substituted by phenyl, C1–C6 alkyl, Cl, Br, F, I, CN, $NO_2$;

$HNR_1R_2R_3$ wherein $R_1$, $R_2$ and $R_3$ are independently selected from H, C1–C12 alkyl, phenyl and benzyl.

In all aspects of the present invention preferably at least 75% of M is replaced, more preferably at least 85% is replaced and even more preferably at least 95% and up to and including 99% is replaced. Preferred ranges are 75–99%, 85–99%, 95–99%.

In addition to binary complexes, ternary complexes and tertiary complexes are included in the present invention in relation to M.

The ability of the materials of the present invention to provide intense photoluminescence is unexpected. The present understanding of the mechanism of photoluminescence in compounds of this type, is that light is first absorbed by the organic ligands surrounding the metal atom. This leads to formation of a molecule in an excited state, in which one ligand is in an excited singlet state. This excitation energy is then transferred to the metal ion. Such energy transfer may involve an initial conversion of the ligand excited singlet state to an excited triplet state, or may proceed directly. The transfer of energy is widely understood to rely on the short distance between the ligand and the metal ion. In the materials of the present invention, the initial absorption of light will most frequently occur in a ligand which is bound to a substantially non-luminescent ion of Y, La, Gd or Lu. These ions are luminescent only at short wavelengths when excited by very high energy light. Short wavelength emission of light from these ions is not characteristically observed from compounds of the present invention. The excitation energy must therefore be transferred to a ligand attached to a luminescent ion of Eu, Tb, Sm or Dy for light to be emitted. In the materials of the present invention in which a substantial fraction of the latter ions are replaced by Y, La, Gd or Lu, there may be no nearest neighbour ligands attached to a luminescent ion. Transfer of energy from one ligand to another must on average occur many times before photoluminescent emission can occur. Each transfer of energy is accompanied by a finite chance that the excitation energy may be transformed into heat rather than emission of light. We unexpectedly find that in the compounds of this invention, a highly efficient photoluminescence may be achieved even when a large proportion of the luminescent ions is replaced.

These unexpected results provide a particular benefit for applications of photoluminescent materials by providing a reduced materials cost.

In addition to their phosphorescent properties the compounds of the invention have good stability in the presence of radiation such as ultraviolet radiation. These properties make them particularly useful in liquid crystalline displays that are exposed to high levels of ultraviolet radiation, such as those used in outdoor displays. In addition, they may be included in phosphorescent substrates or phosphor layer liquid crystal devices, such as those described in U.S. Pat. No. 4,830,469, WO 95/27920, EP-A-185495 and European Patent No 0755532—the contents of which are herein incorporated by reference.

These devices are particularly suitable for display cells and especially colour display cells as they overcome problems associated with the use of liquid crystals as shutters for transmitting light to a viewer. The light scattering or birefringent properties of suitable liquid crystals is useful in this respect and may be controlled by application of an electrical field. However the liquid crystal material is sensitive to the angle at which light passes through it, and therefore there may be difficulties with viewing angle when these are viewed directly.

These problems are overcome in devices such as those mentioned above, by directing light from a light source, usually an ultraviolet light source, through the liquid crystal layer onto self-radiating elements or phosphors. These are activated by light reaching them through the liquid crystal layer, and thereafter emit light at a desirable viewing angle. Each phosphor therefore can constitute a pixel in a display or a combination of red, blue and green phosphors may be grouped to form a pixel which can emit light at any colour of the spectrum, depending upon the relative stimulation of each.

The invention will now be described by way of example only with reference to the following diagrams:

FIG. 1 illustrates a display cell in which the materials of the present invention may be incorporated.

A preferred liquid crystal device according to the invention is a display cell comprising a layer of a liquid crystal material, means for addressing the liquid crystal material so as to allow light to pass through it when appropriately addressed, and an emitting layer comprising phosphor elements, arranged to receive light passing through the liquid crystal layer wherein the phosphor elements comprise one or more compounds according to the first aspect of the present invention.

Such devices are illustrated schematically in FIG. 1 hereinafter. These devices may be arranged differently depending upon the intended application.

Suitably in these devices, the liquid crystal material is contained between two parallel, spatially separated transparent substrate plates (1), either in individual cells or in a continuous panel. Liquid crystal material (2), such as those known to those skilled in the art is provided in the cell, and the orientation is controllable by addressing means such as electrodes arranged on either side of the layer (not shown). Light from a light source is supplied in the direction of the arrow, and is either internally reflected by the liquid crystal material, or diverted to phosphors (3), such as those provided by the present invention on an emitting layer (4), depending upon the activation of the liquid crystal material. The phosphors may then emit light at a preferred viewing angle.

Devices may also contain polarisers and/or dichroic ultraviolet light absorbers (as described in U.S. Pat. No. 4,830,469) the contents of which are herein incorporated by reference.

A particularly preferred device further comprises means for collimating activating light towards the phosphors. Various arrangements for such collimating means are described in WO 95/27920 the contents of which are herein incorporated by reference. They include lenses, which may be arranged in or on one of the layers.

Light from an ultra-violet light source, is supplied to the liquid crystal layer, either directly onto the back or from the edge using for example the transparent backing plate as a light guide. The addressing means control the orientation of the liquid crystal material, within each cell or region of the panel as is well understood in the art. As a result, light may or may not be directed onto a particular phosphor element, which is either activated to emit light or remain dark, respectively. By appropriate control of the addressing means, each pixel point has individual visible light output characteristics at any given point in time.

Such devices may include computer or television screens, and these may contain hundreds of thousands of individual pixels, which control the amount of red, green or blue light reaching a very small area of the screen, for example of 100 μm or less. In such cases, one of the electrodes used to address the liquid crystal material may be connected together in columns, and the other connected in rows (where rows and columns are perpendicular to each other) in order to reduce the number of electrical connections required. However, in order to ensure that pixels are controlled individually, these need to be multiplexed as understood in the art. Multiplexing is generally achieved by applying a voltage which cycles between the desired voltage and zero many times per second. As each row receives the required voltage, a positive or negative voltage is applied to each column so that individual pixels within the row are addressed in the required manner. This means that the liquid crystal of all the "on" pixels will be subject to a voltage in excess of the threshold voltage for that compound. All rows in the display are scanned to refresh the pixels.

Other suitable devices include a white LED light source comprising a blue emitting LED provided with a fluorescent composition including one or more compounds of the present invention, the composition being such that when illuminated by the blue LED a substantially white emission colour is obtained.

Other suitable devices include using/incorporating the materials of the present invention as fluorescent security marks.

EXPERIMENTAL

Terbium tris(2,2,6,6-tetramethylheptane-3,5-dionate) (0.1 gm) and gadolinium tris(2,2,6,6-tetramethylheptane-3,5-dionate) (0.9 gm) were dissolved in 3 ml of warm anhydrous ethanol. Solid 4-dimethylamino pyridine (0.18 gm) was added and the solution was raised briefly to reflux. The solution was allowed to cool, and then placed in a refrigerator at 5° C. overnight. The colourless crystals which separated were filtered, washed with a small quantity of cold anhydrous ethanol, and dried to furnish tris 2,2,6,6-tetramethylheptanedionato Tb0.1, Gd0.9 dimethylaminopyridine as almost colourless crystals. The photoluminescent properties of the product were tested by measurement of the brightness of green light emitted by a powdered sample exposed to light of wavelength 365 nm from a mercury discharge lamp alongside a similar sample of the corresponding product containing 100% terbium. Substantially identical brightness of emitted light was observed from each sample.

By the same method, the following compounds were prepared:

tris acetylacetonato Tb dimethylaminopyridine (comparative example)

tris acetylacetonato Tb 4-picoline-N-oxide (comparative example)

tris acetylacetonato Tb 4-phenylpyridine (comparative example)

tris acetylacetonato Tb 4-phenylpyridine-N-oxide (comparative example)

tris acetylacetonato Tb 1-methylimidazole (comparative example)

tris acetylacetonato Tb triphenylphosphine oxide (comparative example)

tris acetylacetonato Tb 2,2-bipyridyl (comparative example)

tris acetylacetonato Tb 2,2-bipyridyl-N,N-dioxide (comparative example)

tris acetylacetonato Tb phenanthroline (comparative example)

tris acetylacetonato Tb bathocuproine (comparative example)

tris acetylacetonato Tb bathophenanthroline (comparative example)

tris dibenzoylmethanato Tb dimethylaminopyridine (comparative example)

tris dibenzoylmethanato Tb 4-picoline-N-oxide (comparative example)

tris dibenzoylmethanato Tb 4-phenylpyridine (comparative example)

tris dibenzoylmethanato Tb 4-phenylpyridine-N-oxide (comparative example)

tris dibenzoylmethanato Tb 1-methylimidazole (comparative example)

tris dibenzoylmethanato Tb triphenylphosphine oxide (comparative example)
tris dibenzoylmethanato Tb 2,2-bipyridyl (comparative example)
tris dibenzoylmethanato Tb 2,2-bipyridyl-N,N-dioxide (comparative example)
tris dibenzoylmethanato Tb phenanthroline (comparative example)
tris dibenzoylmethanato Tb bathocuproine (comparative example)
tris dibenzoylmethanato Tb bathophenanthroline (comparative example)
tris thenoyltrifluoroacetonato Tb dimethylaminopyridine (comparative example)
tris thenoyltrifluoroacetonato Tb 4-picoline-N-oxide (comparative example)
tris thenoyltrifluoroacetonato Tb 4-phenylpyridine (comparative example)
tris thenoyltrifluoroacetonato Tb 4-phenylpyridine-N-oxide (comparative example)
tris thenoyltrifluoroacetonato Tb 1-methylimidazole (comparative example)
tris thenoyltrifluoroacetonato Tb triphenylphosphine oxide (comparative example)
tris thenoyltrifluoroacetonato Tb 2,2-bipyridyl (comparative example)
tris thenoyltrifluoroacetonato Tb 2,2-bipyridyl-N,N-dioxide (comparative example)
tris thenoyltrifluoroacetonato Tb phenanthroline (comparative example)
tris thenoyltrifluoroacetonato Tb bathocuproine (comparative example)
tris thenoyltrifluoroacetonato Tb bathophenanthroline (comparative example)
tris 2,2,6,6-tetramethylheptanedionato Tb dimethylaminopyridine (comparative example)
tris 2,2,6,6-tetramethylheptanedionato Tb 4-picoline-N-oxide (comparative example)
tris 2,2,6,6-tetramethylheptanedionato Tb 4-phenylpyridine (comparative example)
tris 2,2,6,6-tetramethylheptanedionato Tb 4-phenylpyridine-N-oxide (comparative example)
tris 2,2,6,6-tetramethylheptanedionato Tb 1-methylimidazole (comparative example)
tris 2,2,6,6-tetramethylheptanedionato Tb triphenylphosphine oxide (comparative example)
tris 2,2,6,6-tetramethylheptanedionato Tb 2,2-bipyridyl (comparative example)
tris 2,2,6,6-tetramethylheptanedionato Tb 2,2-bipyridyl-N,N-dioxide (comparative example)
tris 2,2,6,6-tetramethylheptanedionato Tb phenanthroline (comparative example)
tris 2,2,6,6-tetramethylheptanedionato Tb bathocuproine (comparative example)
tris 2,2,6,6-tetramethylheptanedionato Tb bathophenanthroline (comparative example)
tris 3-methylpentane-2,4-dionato Tb dimethylaminopyridine (comparative example)
tris 3-methylpentane-2,4-dionato Tb 4-picoline-N-oxide (comparative example)
tris 3-methylpentane-2,4-dionato Tb 4-phenylpyridine (comparative example)
tris 3-methylpentane-2,4-dionato Tb 4-phenylpyridine-N-oxide (comparative example)
tris 3-methylpentane-2,4-dionato Tb 1-methylimidazole (comparative example)
tris 3-methylpentane-2,4-dionato Tb triphenylphosphine oxide (comparative example)
tris 3-methylpentane-2,4-dionato Tb 2,2-bipyridyl (comparative example)
tris 3-methylpentane-2,4-dionato Tb 2,2-bipyridyl-N,N-dioxide (comparative example)
tris 3-methylpentane-2,4-dionato Tb phenanthroline (comparative example)
tris 3-methylpentane-2,4-dionato Tb bathocuproine (comparative example)
tris 3-methylpentane-2,4-dionato Tb bathophenanthroline (comparative example)
tris 3-ethylpentane-2,4-dionato Tb dimethylaminopyridine (comparative example)
tris 3-ethylpentane-2,4-dionato Tb 4-picoline-N-oxide (comparative example)
tris 3-ethylpentane-2,4-dionato Tb 4-phenylpyridine (comparative example)
tris 3-ethylpentane-2,4-dionato Tb 4-phenylpyridine-N-oxide (comparative example)
tris 3-ethylpentane-2,4-dionato Tb 1-methylimidazole (comparative example)
tris 3-ethylpentane-2,4-dionato Tb triphenylphosphine oxide (comparative example)
tris 3-ethylpentane-2,4-dionato Tb 2,2-bipyridyl (comparative example)
tris 3-ethylpentane-2,4-dionato Tb 2,2-bipyridyl-N,N-dioxide (comparative example)
tris 3-ethylpentane-2,4-dionato Tb phenanthroline (comparative example)
tris 3-ethylpentane-2,4-dionato Tb bathocuproine (comparative example)
tris 3-ethylpentane-2,4-dionato Tb bathophenanthroline (comparative example)
tris pivaloyltrifluoroacetonato Tb dimethylaminopyridine (comparative example)
tris pivaloyltrifluoroacetonato Tb 4-picoline-N-oxide (comparative example)
tris pivaloyltrifluoroacetonato Tb 4-phenylpyridine (comparative example)
tris pivaloyltrifluoroacetonato Tb 4-phenylpyridine-N-oxide (comparative example)
tris pivaloyltrifluoroacetonato Tb 1-methylimidazole (comparative example)
tris pivaloyltrifluoroacetonato Tb triphenylphosphine oxide (comparative example)
tris pivaloyltrifluoroacetonato Tb 2,2-bipyridyl (comparative example)
tris pivaloyltrifluoroacetonato Tb 2,2-bipyridyl-N,N-dioxide (comparative example)
tris pivaloyltrifluoroacetonato Tb phenanthroline (comparative example)
tris pivaloyltrifluoroacetonato Tb bathocuproine (comparative example)
tris pivaloyltrifluoroacetonato Tb bathophenanthroline (comparative example)
tris trifluoroacetylacetonato Tb dimethylaminopyridine (comparative example)
tris trifluoroacetylacetonato Tb 4-picoline-N-oxide (comparative example)
tris trifluoroacetylacetonato Tb 4-phenylpyridine (comparative example)
tris trifluoroacetylacetonato Tb 4-phenylpyridine-N-oxide (comparative example)
tris trifluoroacetylacetonato Tb 1-methylimidazole (comparative example)

tris trifluoroacetylacetonato Tb triphenylphosphine oxide (comparative example)
tris trifluoroacetylacetonato Tb 2,2-bipyridyl (comparative example)
tris trifluoroacetylacetonato Tb 2,2-bipyridyl-N,N-dioxide (comparative example)
tris trifluoroacetylacetonato Tb phenanthroline (comparative example)
tris trifluoroacetylacetonato Tb bathocuproine (comparative example)
tris trifluoroacetylacetonato Tb bathophenanthroline (comparative example)
tris hexafluoroacetylacetonato Tb dimethylaminopyridine (comparative example)
tris hexafluoroacetylacetonato Tb 4-picoline-N-oxide (comparative example)
tris hexafluoroacetylacetonato Tb 4-phenylpyridine (comparative example)
tris hexafluoroacetylacetonato Tb 4-phenylpyridine-N-oxide (comparative example)
tris hexafluoroacetylacetonato Tb 1-methylimidazole (comparative example)
tris hexafluoroacetylacetonato Tb triphenylphosphine oxide (comparative example)
tris hexafluoroacetylacetonato Tb 2,2-bipyridyl (comparative example)
tris hexafluoroacetylacetonato Tb 2,2-bipyridyl-N,N-dioxide (comparative example)
tris hexafluoroacetylacetonato Tb phenanthroline (comparative example)
tris hexafluoroacetylacetonato Tb bathocuproine (comparative example)
tris hexafluoroacetylacetonato Tb bathophenanthroline (comparative example)
tris 6,6,7,7,8,8,8-heptafluoro-2,2-dimethyloctanedionato Tb dimethylaminopyridine (comparative example)
tris 6,6,7,7,8,8,8-heptafluoro-2,2-dimethyloctanedionato Tb 4-picoline-N-oxide (comparative example)
tris 6,6,7,7,8,8,8-heptafluoro-2,2-dimethyloctanedionato Tb 4-phenylpyridine (comparative example)
tris 6,6,7,7,8,8,8-heptafluoro-2,2-dimethyloctanedionato Tb 4-phenylpyridine-N-oxide (comparative example)
tris 6,6,7,7,8,8,8-heptafluoro-2,2-dimethyloctanedionato Tb 1-methylimidazole (comparative example)
tris 6,6,7,7,8,8,8-heptafluoro-2,2-dimethyloctanedionato Tb triphenylphosphine oxide (comparative example)
tris 6,6,7,7,8,8,8-heptafluoro-2,2-dimethyloctanedionato Tb 2,2-bipyridyl (comparative example)
tris 6,6,7,7,8,8,8-heptafluoro-2,2-dimethyloctanedionato Tb 2,2-bipyridyl-N,N-dioxide (comparative example)
tris 6,6,7,7,8,8,8-heptafluoro-2,2-dimethyloctanedionato Tb phenanthroline (comparative example)
tris 6,6,7,7,8,8,8-heptafluoro-2,2-dimethyloctanedionato Tb bathocuproine (comparative example)
tris 6,6,7,7,8,8,8-heptafluoro-2,2-dimethyloctanedionato Tb bathophenanthroline (comparative example)
tris 1-phenyl-1,3-butanedionato Tb dimethylaminopyridine (comparative example)
tris 1-phenyl-1,3-butanedionato Tb 4-picoline-N-oxide (comparative example)
tris 1-phenyl-1,3-butanedionato Tb 4-phenylpyridine (comparative example)
tris 1-phenyl-1,3-butanedionato Tb 4-phenylpyridine-N-oxide (comparative example)
tris 1-phenyl-1,3-butanedionato Tb 1-methylimidazole (comparative example)
tris 1-phenyl-1,3-butanedionato Tb triphenylphosphine oxide (comparative example)
tris 1-phenyl-1,3-butanedionato Tb 2,2-bipyridyl (comparative example)
tris 1-phenyl-1,3-butanedionato Tb 2,2-bipyridyl-N,N-dioxide (comparative example)
tris 1-phenyl-1,3-butanedionato Tb phenanthroline (comparative example)
tris 1-phenyl-1,3-butanedionato Tb bathocuproine (comparative example)
tris 1-phenyl-1,3-butanedionato Tb bathophenanthroline (comparative example)
tris acetylacetonato Eu dimethylaminopyridine (comparative example)
tris acetylacetonato Eu 4-picoline-N-oxide (comparative example)
tris acetylacetonato Eu 4-phenylpyridine (comparative example)
tris acetylacetonato Eu 4-phenylpyridine-N-oxide (comparative example)
tris acetylacetonato Eu 1-methylimidazole (comparative example)
tris acetylacetonato Eu triphenylphosphine oxide (comparative example)
tris acetylacetonato Eu 2,2-bipyridyl (comparative example)
tris acetylacetonato Eu 2,2-bipyridyl-N,N-dioxide (comparative example)
tris acetylacetonato Eu phenanthroline (comparative example)
tris acetylacetonato Eu bathocuproine (comparative example)
tris acetylacetonato Eu bathophenanthroline (comparative example)
tris dibenzoylmethanato Eu dimethylaminopyridine (comparative example)
tris dibenzoylmethanato Eu 4-picoline-N-oxide (comparative example)
tris dibenzoylmethanato Eu 4-phenylpyridine (comparative example)
tris dibenzoylmethanato Eu 4-phenylpyridine-N-oxide (comparative example)
tris dibenzoylmethanato Eu 1-methylimidazole (comparative example)
tris dibenzoylmethanato Eu triphenylphosphine oxide (comparative example)
tris dibenzoylmethanato Eu 2,2-bipyridyl (comparative example)
tris dibenzoylmethanato Eu 2,2-bipyridyl-N,N-dioxide (comparative example)
tris dibenzoylmethanato Eu phenanthroline (comparative example)
tris dibenzoylmethanato Eu bathocuproine (comparative example)
tris dibenzoylmethanato Eu bathophenanthroline (comparative example)
tris thenoyltrifluoroacetonato Eu dimethylaminopyridine (comparative example)
tris thenoyltrifluoroacetonato Eu 4-picoline-N-oxide (comparative example)
tris thenoyltrifluoroacetonato Eu 4-phenylpyridine (comparative example)
tris thenoyltrifluoroacetonato Eu 4-phenylpyridine-N-oxide (comparative example)
tris thenoyltrifluoroacetonato Eu 1-methylimidazole (comparative example)
tris thenoyltrifluoroacetonato Eu triphenylphosphine oxide (comparative example)

tris thenoyltrifluoroacetonato Eu 2,2-bipyridyl (comparative example)

tris thenoyltrifluoroacetonato Eu 2,2-bipyridyl-N,N-dioxide (comparative example)

tris thenoyltrifluoroacetonato Eu phenanthroline (comparative example)

tris thenoyltrifluoroacetonato Eu bathocuproine (comparative example)

tris thenoyltrifluoroacetonato Eu bathophenanthroline (comparative example)

tris 2,2,6,6-tetramethylheptanedionato Eu dimethylaminopyridine (comparative example)

tris 2,2,6,6-tetramethylheptanedionato Eu 4-picoline-N-oxide (comparative example)

tris 2,2,6,6-tetramethylheptanedionato Eu 4-phenylpyridine (comparative example)

tris 2,2,6,6-tetramethylheptanedionato Eu 4-phenylpyridine-N-oxide (comparative example)

tris 2,2,6,6-tetramethylheptanedionato Eu 1-methylimidazole (comparative example)

tris 2,2,6,6-tetramethylheptanedionato Eu triphenylphosphine oxide (comparative example)

tris 2,2,6,6-tetramethylheptanedionato Eu 2,2-bipyridyl (comparative example)

tris 2,2,6,6-tetramethylheptanedionato Eu 2,2-bipyridyl-N,N-dioxide (comparative example)

tris 2,2,6,6-tetramethylheptanedionato Eu phenanthroline (comparative example)

tris 2,2,6,6-tetramethylheptanedionato Eu bathocuproine (comparative example)

tris 2,2,6,6-tetramethylheptanedionato Eu bathophenanthroline (comparative example)

tris 3-methylpentane-2,4-dionato Eu dimethylaminopyridine (comparative example)

tris 3-methylpentane-2,4-dionato Eu 4-picoline-N-oxide (comparative example)

tris 3-methylpentane-2,4-dionato Eu 4-phenylpyridine (comparative example)

tris 3-methylpentane-2,4-dionato Eu 4-phenylpyridine-N-oxide (comparative example)

tris 3-methylpentane-2,4-dionato Eu 1-methylimidazole (comparative example)

tris 3-methylpentane-2,4-dionato Eu triphenylphosphine oxide (comparative example)

tris 3-methylpentane-2,4-dionato Eu 2,2-bipyridyl (comparative example)

tris 3-methylpentane-2,4-dionato Eu 2,2-bipyridyl-N,N-dioxide (comparative example)

tris 3-methylpentane-2,4-dionato Eu phenanthroline (comparative example)

tris 3-methylpentane-2,4-dionato Eu bathocuproine (comparative example)

tris 3-methylpentane-2,4-dionato Eu bathophenanthroline (comparative example)

tris 3-ethylpentane-2,4-dionato Eu dimethylaminopyridine (comparative example)

tris 3-ethylpentane-2,4-dionato Eu 4-picoline-N-oxide (comparative example)

tris 3-ethylpentane-2,4-dionato Eu 4-phenylpyridine (comparative example)

tris 3-ethylpentane-2,4-dionato Eu 4-phenylpyridine-N-oxide (comparative example)

tris 3-ethylpentane-2,4-dionato Eu 1-methylimidazole (comparative example)

tris 3-ethylpentane-2,4-dionato Eu triphenylphosphine oxide (comparative example)

tris 3-ethylpentane-2,4-dionato Eu 2,2-bipyridyl (comparative example)

tris 3-ethylpentane-2,4-dionato Eu 2,2-bipyridyl-N,N-dioxide (comparative example)

tris 3-ethylpentane-2,4-dionato Eu phenanthroline (comparative example)

tris 3-ethylpentane-2,4-dionato Eu bathocuproine (comparative example)

tris 3-ethylpentane-2,4-dionato Eu bathophenanthroline (comparative example)

tris pivaloyltrifluoroacetonato Eu dimethylaminopyridine (comparative example)

tris pivaloyltrifluoroacetonato Eu 4-picoline-N-oxide (comparative example)

tris pivaloyltrifluoroacetonato Eu 4-phenylpyridine (comparative example)

tris pivaloyltrifluoroacetonato Eu 4-phenylpyridine-N-oxide (comparative example)

tris pivaloyltrifluoroacetonato Eu 1-methylimidazole (comparative example)

tris pivaloyltrifluoroacetonato Eu triphenylphosphine oxide (comparative example)

tris pivaloyltrifluoroacetonato Eu 2,2-bipyridyl (comparative example)

tris pivaloyltrifluoroacetonato Eu 2,2-bipyridyl-N,N-dioxide (comparative example)

tris pivaloyltrifluoroacetonato Eu phenanthroline (comparative example)

tris pivaloyltrifluoroacetonato Eu bathocuproine (comparative example)

tris pivaloyltrifluoroacetonato Eu bathophenanthroline (comparative example)

tris trifluoroacetylacetonato Eu dimethylaminopyridine (comparative example)

tris trifluoroacetylacetonato Eu 4-picoline-N-oxide (comparative example)

tris trifluoroacetylacetonato Eu 4-phenylpyridine (comparative example)

tris trifluoroacetylacetonato Eu 4-phenylpyridine-N-oxide (comparative example)

tris trifluoroacetylacetonato Eu 1-methylimidazole (comparative example)

tris trifluoroacetylacetonato Eu triphenylphosphine oxide (comparative example)

tris trifluoroacetylacetonato Eu 2,2-bipyridyl (comparative example)

tris trifluoroacetylacetonato Eu 2,2-bipyridyl-N,N-dioxide (comparative example)

tris trifluoroacetylacetonato Eu phenanthroline (comparative example)

tris trifluoroacetylacetonato Eu bathocuproine (comparative example)

tris trifluoroacetylacetonato Eu bathophenanthroline (comparative example)

tris hexafluoroacetylacetonato Eu dimethylaminopyridine (comparative example)

tris hexafluoroacetylacetonato Eu 4-picoline-N-oxide (comparative example)

tris hexafluoroacetylacetonato Eu 4-phenylpyridine (comparative example)

tris hexafluoroacetylacetonato Eu 4-phenylpyridine-N-oxide (comparative example)

tris hexafluoroacetylacetonato Eu 1-methylimidazole (comparative example)

tris hexafluoroacetylacetonato Eu triphenylphosphine oxide (comparative example)

tris hexafluoroacetylacetonato Eu 2,2-bipyridyl (comparative example)

tris hexafluoroacetylacetonato Eu 2,2-bipyridyl-N,N-dioxide (comparative example)

tris hexafluoroacetylacetonato Eu phenanthroline (comparative example)

tris hexafluoroacetylacetonato Eu bathocuproine (comparative example)

tris hexafluoroacetylacetonato Eu bathophenanthroline (comparative example)

tris 6,6,7,7,8,8,8-heptafluoro-2,2-dimethyloctanedionato Eu dimethylaminopyridine (comparative example)

tris 6,6,7,7,8,8,8-heptafluoro-2,2-dimethyloctanedionato Eu 4-picoline-N-oxide (comparative example)

tris 6,6,7,7,8,8,8-heptafluoro-2,2-dimethyloctanedionato Eu 4-phenylpyridine (comparative example)

tris 6,6,7,7,8,8,8-heptafluoro-2,2-dimethyloctanedionato Eu 4-phenylpyridine-N-oxide (comparative example)

tris 6,6,7,7,8,8,8-heptafluoro-2,2-dimethyloctanedionato Eu 1-methylimidazole (comparative example)

tris 6,6,7,7,8,8,8-heptafluoro-2,2-dimethyloctanedionato Eu triphenylphosphine oxide (comparative example)

tris 6,6,7,7,8,8,8-heptafluoro-2,2-dimethyloctanedionato Eu 2,2-bipyridyl (comparative example)

tris 6,6,7,7,8,8,8-heptafluoro-2,2-dimethyloctanedionato Eu 2,2-bipyridyl-N,N-dioxide (comparative example)

tris 6,6,7,7,8,8,8-heptafluoro-2,2-dimethyloctanedionato Eu phenanthroline (comparative example)

tris 6,6,7,7,8,8,8-heptafluoro-2,2-dimethyloctanedionato Eu bathocuproine (comparative example)

tris 6,6,7,7,8,8,8-heptafluoro-2,2-dimethyloctanedionato Eu bathophenanthroline (comparative example)

tris 1-phenyl-1,3-butanedionato Eu dimethylaminopyridine (comparative example)

tris 1-phenyl-1,3-butanedionato Eu 4-picoline-N-oxide (comparative example)

tris 1-phenyl-1,3-butanedionato Eu 4-phenylpyridine (comparative example)

tris 1-phenyl-1,3-butanedionato Eu 4-phenylpyridine-N-oxide (comparative example)

tris 1-phenyl-1,3-butanedionato Eu 1-methylimidazole (comparative example)

tris 1-phenyl-1,3-butanedionato Eu triphenylphosphine oxide (comparative example)

tris 1-phenyl-1,3-butanedionato Eu 2,2-bipyridyl (comparative example)

tris 1-phenyl-1,3-butanedionato Eu 2,2-bipyridyl-N,N-dioxide (comparative example)

tris 1-phenyl-1,3-butanedionato Eu phenanthroline (comparative example)

tris 1-phenyl-1,3-butanedionato Eu bathocuproine (comparative example)

tris 1-phenyl-1,3-butanedionato Eu bathophenanthroline (comparative example)

tris acetylacetonato Sm dimethylaminopyridine (comparative example)

tris acetylacetonato Sm 4-picoline-N-oxide (comparative example)

tris acetylacetonato Sm 4-phenylpyridine (comparative example)

tris acetylacetonato Sm 4-phenylpyridine-N-oxide (comparative example)

tris acetylacetonato Sm 1-methylimidazole (comparative example)

tris acetylacetonato Sm triphenylphosphine oxide (comparative example)

tris acetylacetonato Sm 2,2-bipyridyl (comparative example)

tris acetylacetonato Sm 2,2-bipyridyl-N,N-dioxide (comparative example).

tris acetylacetonato Sm phenanthroline (comparative example)

tris acetylacetonato Sm bathocuproine (comparative example)

tris acetylacetonato Sm bathophenanthroline (comparative example)

tris dibenzoylmethanato Sm dimethylaminopyridine (comparative example)

tris dibenzoylmethanato Sm 4-picoline-N-oxide (comparative example)

tris dibenzoylmethanato Sm 4-phenylpyridine (comparative example)

tris dibenzoylmethanato Sm 4-phenylpyridine-N-oxide (comparative example)

tris dibenzoylmethanato Sm 1-methylimidazole (comparative example)

tris dibenzoylmethanato Sm triphenylphosphine oxide (comparative example)

tris dibenzoylmethanato Sm 2,2-bipyridyl (comparative example)

tris dibenzoylmethanato Sm 2,2-bipyridyl-N,N-dioxide (comparative example)

tris dibenzoylmethanato Sm phenanthroline (comparative example)

tris dibenzoylmethanato Sm bathocuproine (comparative example)

tris dibenzoylmethanato Sm bathophenanthroline (comparative example)

tris thenoyltrifluoroacetonato Sm dimethylaminopyridine (comparative example)

tris thenoyltrifluoroacetonato Sm 4-picoline-N-oxide (comparative example)

tris thenoyltrifluoroacetonato Sm 4-phenylpyridine (comparative example)

tris thenoyltrifluoroacetonato Sm 4-phenylpyridine-N-oxide (comparative example)

tris thenoyltrifluoroacetonato Sm 1-methylimidazole (comparative example)

tris thenoyltrifluoroacetonato Sm triphenylphosphine oxide (comparative example)

tris thenoyltrifluoroacetonato Sm 2,2-bipyridyl (comparative example)

tris thenoyltrifluoroacetonato Sm 2,2-bipyridyl-N,N-dioxide (comparative example)

tris thenoyltrifluoroacetonato Sm phenanthroline (comparative example)

tris thenoyltrifluoroacetonato Sm bathocuproine (comparative example)

tris thenoyltrifluoroacetonato Sm bathophenanthroline (comparative example)

tris 2,2,6,6-tetramethylheptanedionato Sm dimethylaminopyridine (comparative example)

tris 2,2,6,6-tetramethylheptanedionato Sm 4-picoline-N-oxide (comparative example)

tris 2,2,6,6-tetramethylheptanedionato Sm 4-phenylpyridine (comparative example)

tris 2,2,6,6-tetramethylheptanedionato Sm 4-phenylpyridine-N-oxide (comparative example)

tris 2,2,6,6-tetramethylheptanedionato Sm 1-methylimidazole (comparative example)

tris 2,2,6,6-tetramethylheptanedionato Sm triphenylphosphine oxide (comparative example)

tris 2,2,6,6-tetramethylheptanedionato Sm 2,2-bipyridyl (comparative example)
tris 2,2,6,6-tetramethylheptanedionato Sm 2,2-bipyridyl-N,N-dioxide (comparative example)
tris 2,2,6,6-tetramethylheptanedionato Sm phenanthroline (comparative example)
tris 2,2,6,6-tetramethylheptanedionato Sm bathocuproine (comparative example)
tris 2,2,6,6-tetramethylheptanedionato Sm bathophenanthroline (comparative example)
tris 3-methylpentane-2,4-dionato Sm dimethylaminopyridine (comparative example)
tris 3-methylpentane-2,4-dionato Sm 4-picoline-N-oxide (comparative example)
tris 3-methylpentane-2,4-dionato Sm 4-phenylpyridine (comparative example)
tris 3-methylpentane-2,4-dionato Sm 4-phenylpyridine-N-oxide (comparative example)
tris 3-methylpentane-2,4-dionato Sm 1-methylimidazole (comparative example)
tris 3-methylpentane-2,4-dionato Sm triphenylphosphine oxide (comparative example)
tris 3-methylpentane-2,4-dionato Sm 2,2-bipyridyl (comparative example)
tris 3-methylpentane-2,4-dionato Sm 2,2-bipyridyl-N,N-dioxide (comparative example)
tris 3-methylpentane-2,4-dionato Sm phenanthroline (comparative example)
tris 3-methylpentane-2,4-dionato Sm bathocuproine (comparative example)
tris 3-methylpentane-2,4-dionato Sm bathophenanthroline (comparative example)
tris 3-ethylpentane-2,4-dionato Sm dimethylaminopyridine (comparative example)
tris 3-ethylpentane-2,4-dionato Sm 4-picoline-N-oxide (comparative example)
tris 3-ethylpentane-2,4-dionato Sm 4-phenylpyridine (comparative example)
tris 3-ethylpentane-2,4-dionato Sm 4-phenylpyridine-N-oxide (comparative example)
tris 3-ethylpentane-2,4-dionato Sm 1-methylimidazole (comparative example)
tris 3-ethylpentane-2,4-dionato Sm triphenylphosphine oxide (comparative example)
tris 3-ethylpentane-2,4-dionato Sm 2,2-bipyridyl (comparative example)
tris 3-ethylpentane-2,4-dionato Sm 2,2-bipyridyl-N,N-dioxide (comparative example)
tris 3-ethylpentane-2,4-dionato Sm phenanthroline (comparative example)
tris 3-ethylpentane-2,4-dionato Sm bathocuproine (comparative example)
tris 3-ethylpentane-2,4-dionato Sm bathophenanthroline (comparative example)
tris pivaloyltrifluoroacetonato Sm dimethylaminopyridine (comparative example)
tris pivaloyltrifluoroacetonato Sm 4-picoline-N-oxide (comparative example)
tris pivaloyltrifluoroacetonato Sm 4-phenylpyridine (comparative example)
tris pivaloyltrifluoroacetonato Sm 4-phenylpyridine-N-oxide (comparative example)
tris pivaloyltrifluoroacetonato Sm 1-methylimidazole (comparative example)
tris pivaloyltrifluoroacetonato Sm triphenylphosphine oxide (comparative example)
tris pivaloyltrifluoroacetonato Sm 2,2-bipyridyl (comparative example)
tris pivaloyltrifluoroacetonato Sm 2,2-bipyridyl-N,N-dioxide (comparative example)
tris pivaloyltrifluoroacetonato Sm phenanthroline (comparative example)
tris pivaloyltrifluoroacetonato Sm bathocuproine (comparative example)
tris pivaloyltrifluoroacetonato Sm bathophenanthroline (comparative example)
tris trifluoroacetylacetonato Sm dimethylaminopyridine (comparative example)
tris trifluoroacetylacetonato Sm 4-picoline-N-oxide (comparative example)
tris trifluoroacetylacetonato Sm 4-phenylpyridine (comparative example)
tris trifluoroacetylacetonato Sm 4-phenylpyridine-N-oxide (comparative example)
tris trifluoroacetylacetonato Sm 1-methylimidazole (comparative example)
tris trifluoroacetylacetonato Sm triphenylphosphine oxide (comparative example)
tris trifluoroacetylacetonato Sm 2,2-bipyridyl (comparative example)
tris trifluoroacetylacetonato Sm 2,2-bipyridyl-N,N-dioxide (comparative example)
tris trifluoroacetylacetonato Sm phenanthroline (comparative example)
tris trifluoroacetylacetonato Sm bathocuproine (comparative example)
tris trifluoroacetylacetonato Sm bathophenanthroline (comparative example)
tris hexafluoroacetylacetonato Sm dimethylaminopyridine (comparative example)
tris hexafluoroacetylacetonato Sm 4-picoline-N-oxide (comparative example)
tris hexafluoroacetylacetonato Sm 4-phenylpyridine (comparative example)
tris hexafluoroacetylacetonato Sm 4-phenylpyridine-N-oxide (comparative example)
tris hexafluoroacetylacetonato Sm 1-methylimidazole (comparative example)
tris hexafluoroacetylacetonato Sm triphenylphosphine oxide (comparative example)
tris hexafluoroacetylacetonato Sm 2,2-bipyridyl (comparative example)
tris hexafluoroacetylacetonato Sm 2,2-bipyridyl-N,N-dioxide (comparative example)
tris hexafluoroacetylacetonato Sm phenanthroline (comparative example)
tris hexafluoroacetylacetonato Sm bathocuproine (comparative example)
tris hexafluoroacetylacetonato Sm bathophenanthroline (comparative example)
tris 6,6,7,7,8,8,8-heptafluoro-2,2-dimethyloctanedionato Sm dimethylaminopyridine (comparative example)
tris 6,6,7,7,8,8,8-heptafluoro-2,2-dimethyloctanedionato Sm 4-picoline-N-oxide (comparative example)
tris 6,6,7,7,8,8,8-heptafluoro-2,2-dimethyloctanedionato Sm 4-phenylpyridine (comparative example)
tris 6,6,7,7,8,8,8-heptafluoro-2,2-dimethyloctanedionato Sm 4-phenylpyridine-N-oxide (comparative example)
tris 6,6,7,7,8,8,8-heptafluoro-2,2-dimethyloctanedionato Sm 1-methylimidazole (comparative example)
tris 6,6,7,7,8,8,8-heptafluoro-2,2-dimethyloctanedionato Sm triphenylphosphine oxide (comparative example)

tris 6,6,7,7,8,8,8-heptafluoro-2,2-dimethyloctanedionato Sm 2,2-bipyridyl (comparative example)
tris 6,6,7,7,8,8,8-heptafluoro-2,2-dimethyloctanedionato Sm 2,2-bipyridyl-N,N-dioxide (comparative example)
tris 6,6,7,7,8,8,8-heptafluoro-2,2-dimethyloctanedionato Sm phenanthroline (comparative example)
tris 6,6,7,7,8,8,8-heptafluoro-2,2-dimethyloctanedionato Sm bathocuproine (comparative example)
tris 6,6,7,7,8,8,8-heptafluoro-2,2-dimethyloctanedionato Sm bathophenanthroline (comparative example)
tris 1-phenyl-1,3-butanedionato Sm dimethylaminopyridine (comparative example)
tris 1-phenyl-1,3-butanedionato Sm 4-picoline-N-oxide (comparative example)
tris 1-phenyl-1,3-butanedionato Sm 4-phenylpyridine (comparative example)
tris 1-phenyl-1,3-butanedionato Sm 4-phenylpyridine-N-oxide (comparative example)
tris 1-phenyl-1,3-butanedionato Sm 1-methylimidazole (comparative example)
tris 1-phenyl-1,3-butanedionato Sm triphenylphosphine oxide (comparative example)
tris 1-phenyl-1,3-butanedionato Sm 2,2-bipyridyl (comparative example)
tris 1-phenyl-1,3-butanedionato Sm 2,2-bipyridyl-N,N-dioxide (comparative example)
tris 1-phenyl-1,3-butanedionato Sm phenanthroline (comparative example)
tris 1-phenyl-1,3-butanedionato Sm bathocuproine (comparative example)
tris 1-phenyl-1,3-butanedionato Sm bathophenanthroline (comparative example)
tris acetylacetonato Dy dimethylaminopyridine (comparative example)
tris acetylacetonato Dy 4-picoline-N-oxide (comparative example)
tris acetylacetonato Dy 4-phenylpyridine (comparative example)
tris acetylacetonato Dy 4-phenylpyridine-N-oxide (comparative example)
tris acetylacetonato Dy 1-methylimidazole (comparative example)
tris acetylacetonato Dy triphenylphosphine oxide (comparative example)
tris acetylacetonato Dy 2,2-bipyridyl (comparative example)
tris acetylacetonato Dy 2,2-bipyridyl-N,N-dioxide (comparative example)
tris acetylacetonato Dy phenanthroline (comparative example)
tris acetylacetonato Dy bathocuproine (comparative example)
tris acetylacetonato Dy bathophenanthroline (comparative example)
tris dibenzoylmethanato Dy dimethylaminopyridine (comparative example)
tris dibenzoylmethanato Dy 4-picoline-N-oxide (comparative example)
tris dibenzoylmethanato Dy 4-phenylpyridine (comparative example)
tris dibenzoylmethanato Dy 4-phenylpyridine-N-oxide (comparative example)
tris dibenzoylmethanato Dy 1-methylimidazole (comparative example)
tris dibenzoylmethanato Dy triphenylphosphine oxide (comparative example)
tris dibenzoylmethanato Dy 2,2-bipyridyl (comparative example)
tris dibenzoylmethanato Dy 2,2-bipyridyl-N,N-dioxide (comparative example)
tris dibenzoylmethanato Dy phenanthroline (comparative example)
tris dibenzoylmethanato Dy bathocuproine (comparative example)
tris dibenzoylmethanato Dy bathophenanthroline (comparative example)
tris thenoyltrifluoroacetonato Dy dimethylaminopyridine (comparative example)
tris thenoyltrifluoroacetonato Dy 4-picoline-N-oxide (comparative example)
tris thenoyltrifluoroacetonato Dy 4-phenylpyridine (comparative example)
tris thenoyltrifluoroacetonato Dy 4-phenylpyridine-N-oxide (comparative example)
tris thenoyltrifluoroacetonato Dy 1-methylimidazole (comparative example)
tris thenoyltrifluoroacetonato Dy triphenylphosphine oxide (comparative example)
tris thenoyltrifluoroacetonato Dy 2,2-bipyridyl (comparative example)
tris thenoyltrifluoroacetonato Dy 2,2-bipyridyl-N,N-dioxide (comparative example)
tris thenoyltrifluoroacetonato Dy phenanthroline (comparative example)
tris thenoyltrifluoroacetonato Dy bathocuproine (comparative example)
tris thenoyltrifluoroacetonato Dy bathophenanthroline (comparative example)
tris 2,2,6,6-tetramethylheptanedionato Dy dimethylaminopyridine (comparative example)
tris 2,2,6,6-tetramethylheptanedionato Dy 4-picoline-N-oxide (comparative example)
tris 2,2,6,6-tetramethylheptanedionato Dy 4-phenylpyridine (comparative example)
tris 2,2,6,6-tetramethylheptanedionato Dy 4-phenylpyridine-N-oxide (comparative example)
tris 2,2,6,6-tetramethylheptanedionato Dy 1-methylimidazole (comparative example)
tris 2,2,6,6-tetramethylheptanedionato Dy triphenylphosphine oxide (comparative example)
tris 2,2,6,6-tetramethylheptanedionato Dy 2,2-bipyridyl (comparative example)
tris 2,2,6,6-tetramethylheptanedionato Dy 2,2-bipyridyl-N,N-dioxide (comparative example)
tris 2,2,6,6-tetramethylheptanedionato Dy phenanthroline (comparative example)
tris 2,2,6,6-tetramethylheptanedionato Dy bathocuproine (comparative example)
tris 2,2,6,6-tetramethylheptanedionato Dy bathophenanthroline (comparative example)
tris 3-methylpentane-2,4-dionato Dy dimethylaminopyridine (comparative example)
tris 3-methylpentane-2,4-dionato Dy 4-picoline-N-oxide (comparative example)
tris 3-methylpentane-2,4-dionato Dy 4-phenylpyridine (comparative example)
tris 3-methylpentane-2,4-dionato Dy 4-phenylpyridine-N-oxide (comparative example)
tris 3-methylpentane-2,4-dionato Dy 1-methylimidazole (comparative example)
tris 3-methylpentane-2,4-dionato Dy triphenylphosphine oxide (comparative example)
tris 3-methylpentane-2,4-dionato Dy 2,2-bipyridyl (comparative example)

tris 3-methylpentane-2,4-dionato Dy 2,2-bipyridyl-N,N-dioxide (comparative example)
tris 3-methylpentane-2,4-dionato Dy phenanthroline (comparative example)
tris 3-methylpentane-2,4-dionato Dy bathocuproine (comparative example)
tris 3-methylpentane-2,4-dionato Dy bathophenanthroline (comparative example)
tris 3-ethylpentane-2,4-dionato Dy dimethylaminopyridine (comparative example)
tris 3-ethylpentane-2,4-dionato Dy 4-picoline-N-oxide (comparative example)
tris 3-ethylpentane-2,4-dionato Dy 4-phenylpyridine (comparative example)
tris 3-ethylpentane-2,4-dionato Dy 4-phenylpyridine-N-oxide (comparative example)
tris 3-ethylpentane-2,4-dionato Dy 1-methylimidazole (comparative example)
tris 3-ethylpentane-2,4-dionato Dy triphenylphosphine oxide (comparative example)
tris 3-ethylpentane-2,4-dionato Dy 2,2-bipyridyl (comparative example)
tris 3-ethylpentane-2,4-dionato Dy 2,2-bipyridyl-N,N-dioxide (comparative example)
tris 3-ethylpentane-2,4-dionato Dy phenanthroline (comparative example)
tris 3-ethylpentane-2,4-dionato Dy bathocuproine (comparative example)
tris 3-ethylpentane-2,4-dionato Dy bathophenanthroline (comparative example)
tris pivaloyltrifluoroacetonato Dy dimethylaminopyridine (comparative example)
tris pivaloyltrifluoroacetonato Dy 4-picoline-N-oxide (comparative example)
tris pivaloyltrifluoroacetonato Dy 4-phenylpyridine (comparative example)
tris pivaloyltrifluoroacetonato Dy 4-phenylpyridine-N-oxide (comparative example)
tris pivaloyltrifluoroacetonato Dy 1-methylimidazole (comparative example)
tris pivaloyltrifluoroacetonato Dy triphenylphosphine oxide (comparative example)
tris pivaloyltrifluoroacetonato Dy 2,2-bipyridyl (comparative example)
tris pivaloyltrifluoroacetonato Dy 2,2-bipyridyl-N,N-dioxide (comparative example)
tris pivaloyltrifluoroacetonato Dy phenanthroline (comparative example)
tris pivaloyltrifluoroacetonato Dy bathocuproine (comparative example)
tris pivaloyltrifluoroacetonato Dy bathophenanthroline (comparative example)
tris trifluoroacetylacetonato Dy dimethylaminopyridine (comparative example)
tris trifluoroacetylacetonato Dy 4-picoline-N-oxide (comparative example)
tris trifluoroacetylacetonato Dy 4-phenylpyridine (comparative example)
tris trifluoroacetylacetonato Dy 4-phenylpyridine-N-oxide (comparative example)
tris trifluoroacetylacetonato Dy 1-methylimidazole (comparative example)
tris trifluoroacetylacetonato Dy triphenylphosphine oxide (comparative example)
tris trifluoroacetylacetonato Dy 2,2-bipyridyl (comparative example)
tris trifluoroacetylacetonato Dy 2,2-bipyridyl-N,N-dioxide (comparative example)
tris trifluoroacetylacetonato Dy phenanthroline (comparative example)
tris trifluoroacetylacetonato Dy bathocuproine (comparative example)
tris trifluoroacetylacetonato Dy bathophenanthroline (comparative example)
tris hexafluoroacetylacetonato Dy dimethylaminopyridine (comparative example)
tris hexafluoroacetylacetonato Dy 4-picoline-N-oxide (comparative example)
tris hexafluoroacetylacetonato Dy 4-phenylpyridine (comparative example)
tris hexafluoroacetylacetonato Dy 4-phenylpyridine-N-oxide (comparative example)
tris hexafluoroacetylacetonato Dy 1-methylimidazole (comparative example)
tris hexafluoroacetylacetonato Dy triphenylphosphine oxide (comparative example)
tris hexafluoroacetylacetonato Dy 2,2-bipyridyl (comparative example)
tris hexafluoroacetylacetonato Dy 2,2-bipyridyl-N,N-dioxide (comparative example)
tris hexafluoroacetylacetonato Dy phenanthroline (comparative example)
tris hexafluoroacetylacetonato Dy bathocuproine (comparative example)
tris hexafluoroacetylacetonato Dy bathophenanthroline (comparative example)
tris 6,6,7,7,8,8,8-heptafluoro-2,2-dimethyloctanedionato Dy dimethylaminopyridine (comparative example)
tris 6,6,7,7,8,8,8-heptafluoro-2,2-dimethyloctanedionato Dy 4-picoline-N-oxide (comparative example)
tris 6,6,7,7,8,8,8-heptafluoro-2,2-dimethyloctanedionato Dy 4-phenylpyridine (comparative example)
tris 6,6,7,7,8,8,8-heptafluoro-2,2-dimethyloctanedionato Dy 4-phenylpyridine-N-oxide (comparative example)
tris 6,6,7,7,8,8,8-heptafluoro-2,2-dimethyloctanedionato Dy 1-methylimidazole (comparative example)
tris 6,6,7,7,8,8,8-heptafluoro-2,2-dimethyloctanedionato Dy triphenylphosphine oxide (comparative example)
tris 6,6,7,7,8,8,8-heptafluoro-2,2-dimethyloctanedionato Dy 2,2-bipyridyl (comparative example)
tris 6,6,7,7,8,8,8-heptafluoro-2,2-dimethyloctanedionato Dy 2,2-bipyridyl-N,N-dioxide (comparative example)
tris 6,6,7,7,8,8,8-heptafluoro-2,2-dimethyloctanedionato Dy phenanthroline (comparative example)
tris 6,6,7,7,8,8,8-heptafluoro-2,2-dimethyloctanedionato Dy bathocuproine (comparative example)
tris 6,6,7,7,8,8,8-heptafluoro-2,2-dimethyloctanedionato Dy bathophenanthroline (comparative example)
tris 1-phenyl-1,3-butanedionato Dy dimethylaminopyridine (comparative example)
tris 1-phenyl-1,3-butanedionato Dy 4-picoline-N-oxide (comparative example)
tris 1-phenyl-1,3-butanedionato Dy 4-phenylpyridine (comparative example)
tris 1-phenyl-1,3-butanedionato Dy 4-phenylpyridine-N-oxide (comparative example)
tris 1-phenyl-1,3-butanedionato Dy 1-methylimidazole (comparative example)
tris 1-phenyl-1,3-butanedionato Dy triphenylphosphine oxide (comparative example)
tris 1-phenyl-1,3-butanedionato Dy 2,2-bipyridyl (comparative example)

tris 1-phenyl-1,3-butanedionato Dy 2,2-bipyridyl-N,N-dioxide (comparative example)
tris 1-phenyl-1,3-butanedionato Dy phenanthroline (comparative example)
tris 1-phenyl-1,3-butanedionato Dy bathocuproine (comparative example)
tris 1-phenyl-1,3-butanedionato Dy bathophenanthroline (comparative example)
tris acetylacetonato Tb0.5, Y0.5 dimethylaminopyridine
tris acetylacetonato Tb0.5, Y0.5 4-picoline-N-oxide
tris acetylacetonato Tb0.5, Y0.5 4-phenylpyridine
tris acetylacetonato Tb0.5, Y0.5 4-phenylpyridine-N-oxide
tris acetylacetonato Tb0.5, Y0.5 1-methylimidazole
tris acetylacetonato Tb0.5, Y0.5 triphenylphosphine oxide
tris acetylacetonato Tb0.5, Y0.5 2,2-bipyridyl
tris acetylacetonato Tb0.5, Y0.5 2,2-bipyridyl-N,N-dioxide
tris acetylacetonato Tb0.5, Y0.5 phenanthroline
tris acetylacetonato Tb0.5, Y0.5 bathocuproine
tris acetylacetonato Tb0.5, Y0.5 bathophenanthroline
tris dibenzoylmethanato Tb0.5, Y0.5 dimethylaminopyridine
tris dibenzoylmethanato Tb0.5, Y0.5 4-picoline-N-oxide
tris dibenzoylmethanato Tb0.5, Y0.5 4-phenylpyridine
tris dibenzoylmethanato Tb0.5, Y0.5 4-phenylpyridine-N-oxide
tris dibenzoylmethanato Tb0.5, Y0.5 1-methylimidazole
tris dibenzoylmethanato Tb0.5, Y0.5 triphenylphosphine oxide
tris dibenzoylmethanato Tb0.5, Y0.5 2,2-bipyridyl
tris dibenzoylmethanato Tb0.5, Y0.5 2,2-bipyridyl-N,N-dioxide
tris dibenzoylmethanato Tb0.5, Y0.5 phenanthroline
tris dibenzoylmethanato Tb0.5, Y0.5 bathocuproine
tris dibenzoylmethanato Tb0.5, Y0.5 bathophenanthroline
tris thenoyltrifluoroacetonato Tb0.5, Y0.5 dimethylaminopyridine
tris thenoyltrifluoroacetonato Tb0.5, Y0.5 4-picoline-N-oxide
tris thenoyltrifluoroacetonato Tb0.5, Y0.5 4-phenylpyridine
tris thenoyltrifluoroacetonato Tb0.5, Y0.5 4-phenylpyridine-N-oxide
tris thenoyltrifluoroacetonato Tb0.5, Y0.5 1-methylimidazole
tris thenoyltrifluoroacetonato Tb0.5, Y0.5 triphenylphosphine oxide
tris thenoyltrifluoroacetonato Tb0.5, Y0.5 2,2-bipyridyl
tris thenoyltrifluoroacetonato Tb0.5, Y0.5 2,2-bipyridyl-N,N-dioxide
tris thenoyltrifluoroacetonato Tb0.5, Y0.5 phenanthroline
tris thenoyltrifluoroacetonato Tb0.5, Y0.5 bathocuproine
tris thenoyltrifluoroacetonato Tb0.5, Y0.5 bathophenanthroline
tris 2,2,6,6-tetramethylheptanedionato Tb0.5, Y0.5 dimethylaminopyridine
tris 2,2,6,6-tetramethylheptanedionato Tb0.5, Y0.5 4-picoline-N-oxide
tris 2,2,6,6-tetramethylheptanedionato Tb0.5, Y0.5 4-phenylpyridine
tris 2,2,6,6-tetramethylheptanedionato Tb0.5, Y0.5 4-phenylpyridine-N-oxide
tris 2,2,6,6-tetramethylheptanedionato Tb0.5, Y0.5 1-methylimidazole
tris 2,2,6,6-tetramethylheptanedionato Tb0.5, Y0.5 triphenylphosphine oxide
tris 2,2,6,6-tetramethylheptanedionato Tb0.5, Y0.5 2,2-bipyridyl
tris 2,2,6,6-tetramethylheptanedionato Tb0.5, Y0.5 2,2-bipyridyl-N,N-dioxide
tris 2,2,6,6-tetramethylheptanedionato Tb0.5, Y0.5 phenanthroline
tris 2,2,6,6-tetramethylheptanedionato Tb0.5, Y0.5 bathocuproine
tris 2,2,6,6-tetramethylheptanedionato Tb0.5, Y0.5 bathophenanthroline
tris 3-methylpentane-2,4-dionato Tb0.5, Y0.5 dimethylaminopyridine
tris 3-methylpentane-2,4-dionato Tb0.5, Y0.5 4-picoline-N-oxide
tris 3-methylpentane-2,4-dionato Tb0.5, Y0.5 4-phenylpyridine
tris 3-methylpentane-2,4-dionato Tb0.5, Y0.5 4-phenylpyridine-N-oxide
tris 3-methylpentane-2,4-dionato Tb0.5, Y0.5 1-methylimidazole
tris 3-methylpentane-2,4-dionato Tb0.5, Y0.5 triphenylphosphine oxide
tris 3-methylpentane-2,4-dionato Tb0.5, Y0.5 2,2-bipyridyl
tris 3-methylpentane-2,4-dionato Tb0.5, Y0.5 2,2-bipyridyl-N,N-dioxide
tris 3-methylpentane-2,4-dionato Tb0.5, Y0.5 phenanthroline
tris 3-methylpentane-2,4-dionato Tb0.5, Y0.5 bathocuproine
tris 3-methylpentane-2,4-dionato Tb0.5, Y0.5 bathophenanthroline
tris 3-ethylpentane-2,4-dionato Tb0.5, Y0.5 dimethylaminopyridine
tris 3-ethylpentane-2,4-dionato Tb0.5, Y0.5 4-picoline-N-oxide
tris 3-ethylpentane-2,4-dionato Tb0.5, Y0.5 4-phenylpyridine
tris 3-ethylpentane-2,4-dionato Tb0.5, Y0.5 4-phenylpyridine-N-oxide
tris 3-ethylpentane-2,4-dionato Tb0.5, Y0.5 1-methylimidazole
tris 3-ethylpentane-2,4-dionato Tb0.5, Y0.5 triphenylphosphine oxide
tris 3-ethylpentane-2,4-dionato Tb0.5, Y0.5 2,2-bipyridyl
tris 3-ethylpentane-2,4-dionato Tb0.5, Y0.5 2,2-bipyridyl-N,N-dioxide
tris 3-ethylpentane-2,4-dionato Tb0.5, Y0.5 phenanthroline
tris 3-ethylpentane-2,4-dionato Tb0.5, Y0.5 bathocuproine
tris 3-ethylpentane-2,4-dionato Tb0.5, Y0.5 bathophenanthroline
tris pivaloyltrifluoroacetonato Tb0.5, Y0.5 dimethylaminopyridine
tris pivaloyltrifluoroacetonato Tb0.5, Y0.5 4-picoline-N-oxide
tris pivaloyltrifluoroacetonato Tb0.5, Y0.5 4-phenylpyridine
tris pivaloyltrifluoroacetonato Tb0.5, Y0.5 4-phenylpyridine-N-oxide
tris pivaloyltrifluoroacetonato Tb0.5, Y0.5 1-methylimidazole
tris pivaloyltrifluoroacetonato Tb0.5, Y0.5 triphenylphosphine oxide
tris pivaloyltrifluoroacetonato Tb0.5, Y0.5 2,2-bipyridyl
tris pivaloyltrifluoroacetonato Tb0.5, Y0.5 2,2-bipyridyl-N,N-dioxide
tris pivaloyltrifluoroacetonato Tb0.5, Y0.5 phenanthroline
tris pivaloyltrifluoroacetonato Tb0.5, Y0.5 bathocuproine
tris pivaloyltrifluoroacetonato Tb0.5, Y0.5 bathophenanthroline
tris trifluoroacetylacetonato Tb0.5, Y0.5 dimethylaminopyridine tris trifluoroacetylacetonato Tb0.5, Y0.5 4-picoline-N-oxide
tris trifluoroacetylacetonato Tb0.5, Y0.5 4-phenylpyridine
tris trifluoroacetylacetonato Tb0.5, Y0.5 4-phenylpyridine-N-oxide
tris trifluoroacetylacetonato Tb0.5, Y0.5 1-methylimidazole
tris trifluoroacetylacetonato Tb0.5, Y0.5 triphenylphosphine oxide
tris trifluoroacetylacetonato Tb0.5, Y0.5 2,2-bipyridyl
tris trifluoroacetylacetonato Tb0.5, Y0.5 2,2-bipyridyl-N,N-dioxide
tris trifluoroacetylacetonato Tb0.5, Y0.5 phenanthroline
tris trifluoroacetylacetonato Tb0.5, Y0.5 bathocuproine
tris trifluoroacetylacetonato Tb0.5, Y0.5 bathophenanthroline
tris hexafluoroacetylacetonato Tb0.5, Y0.5 dimethylaminopyridine
tris hexafluoroacetylacetonato Tb0.5, Y0.5 4-picoline-N-oxide
tris hexafluoroacetylacetonato Tb0.5, Y0.5 4-phenylpyridine
tris hexafluoroacetylacetonato Tb0.5, Y0.5 4-phenylpyridine-N-oxide
tris hexafluoroacetylacetonato Tb0.5, Y0.5 1-methylimidazole
tris hexafluoroacetylacetonato Tb0.5, Y0.5 triphenylphosphine oxide
tris hexafluoroacetylacetonato Tb0.5, Y0.5 2,2-bipyridyl
tris hexafluoroacetylacetonato Tb0.5, Y0.5 2,2-bipyridyl-N,N-dioxide
tris hexafluoroacetylacetonato Tb0.5, Y0.5 phenanthroline
tris hexafluoroacetylacetonato Tb0.5, Y0.5 bathocuproine
tris hexafluoroacetylacetonato Tb0.5, Y0.5 bathophenanthroline
tris 6,6,7,7,8,8,8-heptafluoro-2,2-dimethyloctanedionato Tb0.5, Y0.5 dimethylaminopyridine
tris 6,6,7,7,8,8,8-heptafluoro-2,2-dimethyloctanedionato Tb0.5, Y0.5 4-picoline-N-oxide
tris 6,6,7,7,8,8,8-heptafluoro-2,2-dimethyloctanedionato Tb0.5, Y0.5 4-phenylpyridine
tris 6,6,7,7,8,8,8-heptafluoro-2,2-dimethyloctanedionato Tb0.5, Y0.5 4-phenylpyridine-N-oxide
tris 6,6,7,7,8,8,8-heptafluoro-2,2-dimethyloctanedionato Tb0.5, Y0.5 1-methylimidazole
tris 6,6,7,7,8,8,8-heptafluoro-2,2-dimethyloctanedionato Tb0.5, Y0.5 triphenylphosphine oxide
tris 6,6,7,7,8,8,8-heptafluoro-2,2-dimethyloctanedionato Tb0.5, Y0.5 2,2-bipyridyl
tris 6,6,7,7,8,8,8-heptafluoro-2,2-dimethyloctanedionato Tb0.5, Y0.5 2,2-bipyridyl-N,N-dioxide
tris 6,6,7,7,8,8,8-heptafluoro-2,2-dimethyloctanedionato Tb0.5, Y0.5 phenanthroline
tris 6,6,7,7,8,8,8-heptafluoro-2,2-dimethyloctanedionato Tb0.5, Y0.5 bathocuproine
tris 6,6,7,7,8,8,8-heptafluoro-2,2-dimethyloctanedionato Tb0.5, Y0.5 bathophenanthroline
tris 1-phenyl-1,3-butanedionato Tb0.5, Y0.5 dimethylaminopyridine
tris 1-phenyl-1,3-butanedionato Tb0.5, Y0.5 4-picoline-N-oxide
tris 1-phenyl-1,3-butanedionato Tb0.5, Y0.5 4-phenylpyridine
tris 1-phenyl-1,3-butanedionato Tb0.5, Y0.5 4-phenylpyridine-N-oxide
tris 1-phenyl-1,3-butanedionato Tb0.5, Y0.5 1-methylimidazole
tris 1-phenyl-1,3-butanedionato Tb0.5, Y0.5 triphenylphosphine oxide
tris 1-phenyl-1,3-butanedionato Tb0.5, Y0.5 2,2-bipyridyl
tris 1-phenyl-1,3-butanedionato Tb0.5, Y0.5 2,2-bipyridyl-N,N-dioxide
tris 1-phenyl-1,3-butanedionato Tb0.5, Y0.5 phenanthroline
tris 1-phenyl-1,3-butanedionato Tb0.5, Y0.5 bathocuproine
tris 1-phenyl-1,3-butanedionato Tb0.5, Y0.5 bathophenanthroline
tris acetylacetonato Tb0.2, Y0.8 dimethylaminopyridine
tris acetylacetonato Tb0.2, Y0.8 4-picoline-N-oxide
tris acetylacetonato Tb0.2, Y0.8 4-phenylpyridine
tris acetylacetonato Tb0.2, Y0.8 4-phenylpyridine-N-oxide
tris acetylacetonato Tb0.2, Y0.8 1-methylimidazole
tris acetylacetonato Tb0.2, Y0.8 triphenylphosphine oxide
tris acetylacetonato Tb0.2, Y0.8 2,2-bipyridyl
tris acetylacetonato Tb0.2, Y0.8 2,2-bipyridyl-N,N-dioxide
tris acetylacetonato Tb0.2, Y0.8 phenanthroline
tris acetylacetonato Tb0.2, Y0.8 bathocuproine
tris acetylacetonato Tb0.2, Y0.8 bathophenanthroline
tris dibenzoylmethanato Tb0.2, Y0.8 dimethylaminopyridine
tris dibenzoylmethanato Tb0.2, Y0.8 4-picoline-N-oxide
tris dibenzoylmethanato Tb0.2, Y0.8 4-phenylpyridine
tris dibenzoylmethanato Tb0.2, Y0.8 4-phenylpyridine-N-oxide
tris dibenzoylmethanato Tb0.2, Y0.8 1-methylimidazole
tris dibenzoylmethanato Tb0.2, Y0.8 triphenylphosphine oxide
tris dibenzoylmethanato Tb0.2, Y0.8 2,2-bipyridyl
tris dibenzoylmethanato Tb0.2, Y0.8 2,2-bipyridyl-N,N-dioxide
tris dibenzoylmethanato Tb0.2, Y0.8 phenanthroline
tris dibenzoylmethanato Tb0.2, Y0.8 bathocuproine
tris dibenzoylmethanato Tb0.2, Y0.8 bathophenanthroline
tris thenoyltrifluoroacetonato Tb0.2, Y0.8 dimethylaminopyridine
tris thenoyltrifluoroacetonato Tb0.2, Y0.8 4-picoline-N-oxide
tris thenoyltrifluoroacetonato Tb0.2, Y0.8 4-phenylpyridine
tris thenoyltrifluoroacetonato Tb0.2, Y0.8 4-phenylpyridine-N-oxide
tris thenoyltrifluoroacetonato Tb0.2, Y0.8 1-methylimidazole
tris thenoyltrifluoroacetonato Tb0.2, Y0.8 triphenylphosphine oxide
tris thenoyltrifluoroacetonato Tb0.2, Y0.8 2,2-bipyridyl
tris thenoyltrifluoroacetonato Tb0.2, Y0.8 2,2-bipyridyl-N,N-dioxide
tris thenoyltrifluoroacetonato Tb0.2, Y0.8 phenanthroline
tris thenoyltrifluoroacetonato Tb0.2, Y0.8 bathocuproine
tris thenoyltrifluoroacetonato Tb0.2, Y0.8 bathophenanthroline
tris 2,2,6,6-tetramethylheptanedionato Tb0.2, Y0.8 dimethylaminopyridine
tris 2,2,6,6-tetramethylheptanedionato Tb0.2, Y0.8 4-picoline-N-oxide
tris 2,2,6,6-tetramethylheptanedionato Tb0.2, Y0.8 4-phenylpyridine
tris 2,2,6,6-tetramethylheptanedionato Tb0.2, Y0.8 4-phenylpyridine-N-oxide
tris 2,2,6,6-tetramethylheptanedionato Tb0.2, Y0.8 1-methylimidazole
tris 2,2,6,6-tetramethylheptanedionato Tb0.2, Y0.8 triphenylphosphine oxide
tris 2,2,6,6-tetramethylheptanedionato Tb0.2, Y0.8 2,2-bipyridyl
tris 2,2,6,6-tetramethylheptanedionato Tb0.2, Y0.8 2,2-bipyridyl-N,N-dioxide tris 2,2,6,6-tetramethylheptanedionato Tb0.2, Y0.8 phenanthroline
tris 2,2,6,6-tetramethylheptanedionato Tb0.2, Y0.8 bathocuproine
tris 2,2,6,6-tetramethylheptanedionato Tb0.2, Y0.8 bathophenanthroline
tris 3-methylpentane-2,4-dionato Tb0.2, Y0.8 dimethylaminopyridine
tris 3-methylpentane-2,4-dionato Tb0.2, Y0.8 4-picoline-N-oxide
tris 3-methylpentane-2,4-dionato Tb0.2, Y0.8 4-phenylpyridine
tris 3-methylpentane-2,4-dionato Tb0.2, Y0.8 4-phenylpyridine-N-oxide
tris 3-methylpentane-2,4-dionato Tb0.2, Y0.8 1-methylimidazole
tris 3-methylpentane-2,4-dionato Tb0.2, Y0.8 triphenylphosphine oxide
tris 3-methylpentane-2,4-dionato Tb0.2, Y0.8 2,2-bipyridyl
tris 3-methylpentane-2,4-dionato Tb0.2, Y0.8 2,2-bipyridyl-N,N-dioxide
tris 3-methylpentane-2,4-dionato Tb0.2, Y0.8 phenanthroline
tris 3-methylpentane-2,4-dionato Tb0.2, Y0.8 bathocuproine
tris 3-methylpentane-2,4-dionato Tb0.2, Y0.8 bathophenanthroline
tris 3-ethylpentane-2,4-dionato Tb0.2, Y0.8 dimethylaminopyridine
tris 3-ethylpentane-2,4-dionato Tb0.2, Y0.8 4-picoline-N-oxide
tris 3-ethylpentane-2,4-dionato Tb0.2, Y0.8 4-phenylpyridine
tris 3-ethylpentane-2,4-dionato Tb0.2, Y0.8 4-phenylpyridine-N-oxide
tris 3-ethylpentane-2,4-dionato Tb0.2, Y0.8 1-methylimidazole
tris 3-ethylpentane-2,4-dionato Tb0.2, Y0.8 triphenylphosphine oxide
tris 3-ethylpentane-2,4-dionato Tb0.2, Y0.8 2,2-bipyridyl
tris 3-ethylpentane-2,4-dionato Tb0.2, Y0.8 2,2-bipyridyl-N,N-dioxide
tris 3-ethylpentane-2,4-dionato Tb0.2, Y0.8 phenanthroline
tris 3-ethylpentane-2,4-dionato Tb0.2, Y0.8 bathocuproine
tris 3-ethylpentane-2,4-dionato Tb0.2, Y0.8 bathophenanthroline
tris pivaloyltrifluoroacetonato Tb0.2, Y0.8 dimethylaminopyridine
tris pivaloyltrifluoroacetonato Tb0.2, Y0.8 4-picoline-N-oxide
tris pivaloyltrifluoroacetonato Tb0.2, Y0.8 4-phenylpyridine
tris pivaloyltrifluoroacetonato Tb0.2, Y0.8 4-phenylpyridine-N-oxide
tris pivaloyltrifluoroacetonato Tb0.2, Y0.8 1-methylimidazole
tris pivaloyltrifluoroacetonato Tb0.2, Y0.8 triphenylphosphine oxide
tris pivaloyltrifluoroacetonato Tb0.2, Y0.8 2,2-bipyridyl
tris pivaloyltrifluoroacetonato Tb0.2, Y0.8 2,2-bipyridyl-N,N-dioxide
tris pivaloyltrifluoroacetonato Tb0.2, Y0.8 phenanthroline
tris pivaloyltrifluoroacetonato Tb0.2, Y0.8 bathocuproine
tris pivaloyltrifluoroacetonato Tb0.2, Y0.8 bathophenanthroline
tris trifluoroacetylacetonato Tb0.2, Y0.8 dimethylaminopyridine
tris trifluoroacetylacetonato Tb0.2, Y0.8 4-picoline-N-oxide
tris trifluoroacetylacetonato Tb0.2, Y0.8 4-phenylpyridine
tris trifluoroacetylacetonato Tb0.2, Y0.8 4-phenylpyridine-N-oxide
tris trifluoroacetylacetonato Tb0.2, Y0.8 1-methylimidazole
tris trifluoroacetylacetonato Tb0.2, Y0.8 triphenylphosphine oxide
tris trifluoroacetylacetonato Tb0.2, Y0.8 2,2-bipyridyl
tris trifluoroacetylacetonato Tb0.2, Y0.8 2,2-bipyridyl-N,N-dioxide
tris trifluoroacetylacetonato Tb0.2, Y0.8 phenanthroline
tris trifluoroacetylacetonato Tb0.2, Y0.8 bathocuproine
tris trifluoroacetylacetonato Tb0.2, Y0.8 bathophenanthroline
tris hexafluoroacetylacetonato Tb0.2, Y0.8 dimethylaminopyridine
tris hexafluoroacetylacetonato Tb0.2, Y0.8 4-picoline-N-oxide
tris hexafluoroacetylacetonato Tb0.2, Y0.8 4-phenylpyridine
tris hexafluoroacetylacetonato Tb0.2, Y0.8 4-phenylpyridine-N-oxide
tris hexafluoroacetylacetonato Tb0.2, Y0.8 1-methylimidazole
tris hexafluoroacetylacetonato Tb0.2, Y0.8 triphenylphosphine oxide
tris hexafluoroacetylacetonato Tb0.2, Y0.8 2,2-bipyridyl
tris hexafluoroacetylacetonato Tb0.2, Y0.8 2,2-bipyridyl-N,N-dioxide
tris hexafluoroacetylacetonato Tb0.2, Y0.8 phenanthroline
tris hexafluoroacetylacetonato Tb0.2, Y0.8 bathocuproine
tris hexafluoroacetylacetonato Tb0.2, Y0.8 bathophenanthroline
tris 6,6,7,7,8,8,8-heptafluoro-2,2-dimethyloctanedionato Tb0.2, Y0.8 dimethylaminopyridine
tris 6,6,7,7,8,8,8-heptafluoro-2,2-dimethyloctanedionato Tb0.2, Y0.8 4-picoline-N-oxide
tris 6,6,7,7,8,8,8-heptafluoro-2,2-dimethyloctanedionato Tb0.2, Y0.8 4-phenylpyridine
tris 6,6,7,7,8,8,8-heptafluoro-2,2-dimethyloctanedionato Tb0.2, Y0.8 4-phenylpyridine-N-oxide
tris 6,6,7,7,8,8,8-heptafluoro-2,2-dimethyloctanedionato Tb0.2, Y0.8 1-methylimidazole
tris 6,6,7,7,8,8,8-heptafluoro-2,2-dimethyloctanedionato Tb0.2, Y0.8 triphenylphosphine oxide
tris 6,6,7,7,8,8,8-heptafluoro-2,2-dimethyloctanedionato Tb0.2, Y0.8 2,2-bipyridyl
tris 6,6,7,7,8,8,8-heptafluoro-2,2-dimethyloctanedionato Tb0.2, Y0.8 2,2-bipyridyl-N,N-dioxide
tris 6,6,7,7,8,8,8-heptafluoro-2,2-dimethyloctanedionato Tb0.2, Y0.8 phenanthroline
tris 6,6,7,7,8,8,8-heptafluoro-2,2-dimethyloctanedionato Tb0.2, Y0.8 bathocuproine
tris 6,6,7,7,8,8,8-heptafluoro-2,2-dimethyloctanedionato Tb0.2, Y0.8 bathophenanthroline
tris 1-phenyl-1,3-butanedionato Tb0.2, Y0.8 dimethylaminopyridine
tris 1-phenyl-1,3-butanedionato Tb0.2, Y0.8 4-picoline-N-oxide
tris 1-phenyl-1,3-butanedionato Tb0.2, Y0.8 4-phenylpyridine
tris 1-phenyl-1,3-butanedionato Tb0.2, Y0.8 4-phenylpyridine-N-oxide
tris 1-phenyl-1,3-butanedionato Tb0.2, Y0.8 1-methylimidazole
tris 1-phenyl-1,3-butanedionato Tb0.2, Y0.8 triphenylphosphine oxide
tris 1-phenyl-1,3-butanedionato Tb0.2, Y0.8 2,2-bipyridyl
tris 1-phenyl-1,3-butanedionato Tb0.2, Y0.8 2,2-bipyridyl-N,N-dioxide tris 1-phenyl-1,3-butanedionato Tb0.2, Y0.8 phenanthroline
tris 1-phenyl-1,3-butanedionato Tb0.2, Y0.8 bathocuproine
tris 1-phenyl-1,3-butanedionato Tb0.2, Y0.8 bathophenanthroline
tris acetylacetonato Tb0.1, Y0.9 dimethylaminopyridine
tris acetylacetonato Tb0.1, Y0.9 4-picoline-N-oxide
tris acetylacetonato Tb0.1, Y0.9 4-phenylpyridine
tris acetylacetonato Tb0.1, Y0.9 4-phenylpyridine-N-oxide
tris acetylacetonato Tb0.1, Y0.9 1-methylimidazole
tris acetylacetonato Tb0.1, Y0.9 triphenylphosphine oxide
tris acetylacetonato Tb0.1, Y0.9 2,2-bipyridyl
tris acetylacetonato Tb0.1, Y0.9 2,2-bipyridyl-N,N-dioxide
tris acetylacetonato Tb0.1, Y0.9 phenanthroline
tris acetylacetonato Tb0.1, Y0.9 bathocuproine
tris acetylacetonato Tb0.1, Y0.9 bathophenanthroline
tris dibenzoylmethanato Tb0.1, Y0.9 dimethylaminopyridine
tris dibenzoylmethanato Tb0.1, Y0.9 4-picoline-N-oxide
tris dibenzoylmethanato Tb0.1, Y0.9 4-phenylpyridine
tris dibenzoylmethanato Tb0.1, Y0.9 4-phenylpyridine-N-oxide
tris dibenzoylmethanato Tb0.1, Y0.9 1-methylimidazole
tris dibenzoylmethanato Tb0.1, Y0.9 triphenylphosphine oxide
tris dibenzoylmethanato Tb0.1, Y0.9 2,2-bipyridyl
tris dibenzoylmethanato Tb0.1, Y0.9 2,2-bipyridyl-N,N-dioxide
tris dibenzoylmethanato Tb0.1, Y0.9 phenanthroline
tris dibenzoylmethanato Tb0.1, Y0.9 bathocuproine
tris dibenzoylmethanato Tb0.1, Y0.9 bathophenanthroline
tris thenoyltrifluoroacetonato Tb0.1, Y0.9 dimethylaminopyridine
tris thenoyltrifluoroacetonato Tb0.1, Y0.9 4-picoline-N-oxide
tris thenoyltrifluoroacetonato Tb0.1, Y0.9 4-phenylpyridine
tris thenoyltrifluoroacetonato Tb0.1, Y0.9 4-phenylpyridine-N-oxide
tris thenoyltrifluoroacetonato Tb0.1, Y0.9 1-methylimidazole
tris thenoyltrifluoroacetonato Tb0.1, Y0.9 triphenylphosphine oxide
tris thenoyltrifluoroacetonato Tb0.1, Y0.9 2,2-bipyridyl
tris thenoyltrifluoroacetonato Tb0.1, Y0.9 2,2-bipyridyl-N,N-dioxide
tris thenoyltrifluoroacetonato Tb0.1, Y0.9 phenanthroline
tris thenoyltrifluoroacetonato Tb0.1, Y0.9 bathocuproine
tris thenoyltrifluoroacetonato Tb0.1, Y0.9 bathophenanthroline
tris 2,2,6,6-tetramethylheptanedionato Tb0.1, Y0.9 dimethylaminopyridine
tris 2,2,6,6-tetramethylheptanedionato Tb0.1, Y0.9 4-picoline-N-oxide
tris 2,2,6,6-tetramethylheptanedionato Tb0.1, Y0.9 4-phenylpyridine
tris 2,2,6,6-tetramethylheptanedionato Tb0.1, Y0.9 4-phenylpyridine-N-oxide
tris 2,2,6,6-tetramethylheptanedionato Tb0.1, Y0.9 1-methylimidazole
tris 2,2,6,6-tetramethylheptanedionato Tb0.1, Y0.9 triphenylphosphine oxide
tris 2,2,6,6-tetramethylheptanedionato Tb0.1, Y0.9 2,2-bipyridyl
tris 2,2,6,6-tetramethylheptanedionato Tb0.1, Y0.9 2,2-bipyridyl-N,N-dioxide
tris 2,2,6,6-tetramethylheptanedionato Tb0.1, Y0.9 phenanthroline
tris 2,2,6,6-tetramethylheptanedionato Tb0.1, Y0.9 bathocuproine
tris 2,2,6,6-tetramethylheptanedionato Tb0.1, Y0.9 bathophenanthroline
tris 3-methylpentane-2,4-dionato Tb0.1, Y0.9 dimethylaminopyridine
tris 3-methylpentane-2,4-dionato Tb0.1, Y0.9 4-picoline-N-oxide
tris 3-methylpentane-2,4-dionato Tb0.1, Y0.9 4-phenylpyridine
tris 3-methylpentane-2,4-dionato Tb0.1, Y0.9 4-phenylpyridine-N-oxide
tris 3-methylpentane-2,4-dionato Tb0.1, Y0.9 1-methylimidazole
tris 3-methylpentane-2,4-dionato Tb0.1, Y0.9 triphenylphosphine oxide
tris 3-methylpentane-2,4-dionato Tb0.1, Y0.9 2,2-bipyridyl
tris 3-methylpentane-2,4-dionato Tb0.1, Y0.9 2,2-bipyridyl-N,N-dioxide
tris 3-methylpentane-2,4-dionato Tb0.1, Y0.9 phenanthroline
tris 3-methylpentane-2,4-dionato Tb0.1, Y0.9 bathocuproine
tris 3-methylpentane-2,4-dionato Tb0.1, Y0.9 bathophenanthroline
tris 3-ethylpentane-2,4-dionato Tb0.1, Y0.9 dimethylaminopyridine
tris 3-ethylpentane-2,4-dionato Tb0.1, Y0.9 4-picoline-N-oxide
tris 3-ethylpentane-2,4-dionato Tb0.1, Y0.9 4-phenylpyridine
tris 3-ethylpentane-2,4-dionato Tb0.1, Y0.9 4-phenylpyridine-N-oxide
tris 3-ethylpentane-2,4-dionato Tb0.1, Y0.9 1-methylimidazole
tris 3-ethylpentane-2,4-dionato Tb0.1, Y0.9 triphenylphosphine oxide
tris 3-ethylpentane-2,4-dionato Tb0.1, Y0.9 2,2-bipyridyl
tris 3-ethylpentane-2,4-dionato Tb0.1, Y0.9 2,2-bipyridyl-N,N-dioxide
tris 3-ethylpentane-2,4-dionato Tb0.1, Y0.9 phenanthroline
tris 3-ethylpentane-2,4-dionato Tb0.1, Y0.9 bathocuproine
tris 3-ethylpentane-2,4-dionato Tb0.1, Y0.9 bathophenanthroline
tris pivaloyltrifluoroacetonato Tb0.1, Y0.9 dimethylaminopyridine
tris pivaloyltrifluoroacetonato Tb0.1, Y0.9 4-picoline-N-oxide
tris pivaloyltrifluoroacetonato Tb0.1, Y0.9 4-phenylpyridine
tris pivaloyltrifluoroacetonato Tb0.1, Y0.9 4-phenylpyridine-N-oxide
tris pivaloyltrifluoroacetonato Tb0.1, Y0.9 1-methylimidazole
tris pivaloyltrifluoroacetonato Tb0.1, Y0.9 triphenylphosphine oxide
tris pivaloyltrifluoroacetonato Tb0.1, Y0.9 2,2-bipyridyl
tris pivaloyltrifluoroacetonato Tb0.1, Y0.9 2,2-bipyridyl-N,N-dioxide
tris pivaloyltrifluoroacetonato Tb0.1, Y0.9 phenanthroline
tris pivaloyltrifluoroacetonato Tb0.1, Y0.9 bathocuproine
tris pivaloyltrifluoroacetonato Tb0.1, Y0.9 bathophenanthroline
tris trifluoroacetylacetonato Tb0.1, Y0.9 dimethylaminopyridine
tris trifluoroacetylacetonato Tb0.1, Y0.9 4-picoline-N-oxide
tris trifluoroacetylacetonato Tb0.1, Y0.9 4-phenylpyridine
tris trifluoroacetylacetonato Tb0.1, Y0.9 4-phenylpyridine-N-oxide tris trifluoroacetylacetonato Tb0.1, Y0.9 1-methylimidazole
tris trifluoroacetylacetonato Tb0.1, Y0.9 triphenylphosphine oxide
tris trifluoroacetylacetonato Tb0.1, Y0.9 2,2-bipyridyl
tris trifluoroacetylacetonato Tb0.1, Y0.9 2,2-bipyridyl-N,N-dioxide
tris trifluoroacetylacetonato Tb0.1, Y0.9 phenanthroline
tris trifluoroacetylacetonato Tb0.1, Y0.9 bathocuproine
tris trifluoroacetylacetonato Tb0.1, Y0.9 bathophenanthroline
tris hexafluoroacetylacetonato Tb0.1, Y0.9 dimethylaminopyridine
tris hexafluoroacetylacetonato Tb0.1, Y0.9 4-picoline-N-oxide
tris hexafluoroacetylacetonato Tb0.1, Y0.9 4-phenylpyridine
tris hexafluoroacetylacetonato Tb0.1, Y0.9 4-phenylpyridine-N-oxide
tris hexafluoroacetylacetonato Tb0.1, Y0.9 1-methylimidazole
tris hexafluoroacetylacetonato Tb0.1, Y0.9 triphenylphosphine oxide
tris hexafluoroacetylacetonato Tb0.1, Y0.9 2,2-bipyridyl
tris hexafluoroacetylacetonato Tb0.1, Y0.9 2,2-bipyridyl-N,N-dioxide
tris hexafluoroacetylacetonato Tb0.1, Y0.9 phenanthroline
tris hexafluoroacetylacetonato Tb0.1, Y0.9 bathocuproine
tris hexafluoroacetylacetonato Tb0.1, Y0.9 bathophenanthroline
tris 6,6,7,7,8,8,8-heptafluoro-2,2-dimethyloctanedionato Tb0.1, Y0.9 dimethylaminopyridine
tris 6,6,7,7,8,8,8-heptafluoro-2,2-dimethyloctanedionato Tb0.1, Y0.9 4-picoline-N-oxide
tris 6,6,7,7,8,8,8-heptafluoro-2,2-dimethyloctanedionato Tb0.1, Y0.9 4-phenylpyridine
tris 6,6,7,7,8,8,8-heptafluoro-2,2-dimethyloctanedionato Tb0.1, Y0.9 4-phenylpyridine-N-oxide
tris 6,6,7,7,8,8,8-heptafluoro-2,2-dimethyloctanedionato Tb0.1, Y0.9 1-methylimidazole
tris 6,6,7,7,8,8,8-heptafluoro-2,2-dimethyloctanedionato Tb0.1, Y0.9 triphenylphosphine oxide
tris 6,6,7,7,8,8,8-heptafluoro-2,2-dimethyloctanedionato Tb0.1, Y0.9 2,2-bipyridyl
tris 6,6,7,7,8,8,8-heptafluoro-2,2-dimethyloctanedionato Tb0.1, Y0.9 2,2-bipyridyl-N,N-dioxide
tris 6,6,7,7,8,8,8-heptafluoro-2,2-dimethyloctanedionato Tb0.1, Y0.9 phenanthroline
tris 6,6,7,7,8,8,8-heptafluoro-2,2-dimethyloctanedionato Tb0.1, Y0.9 bathocuproine
tris 6,6,7,7,8,8,8-heptafluoro-2,2-dimethyloctanedionato Tb0.1, Y0.9 bathophenanthroline
tris 1-phenyl-1,3-butanedionato Tb0.1, Y0.9 dimethylaminopyridine
tris 1-phenyl-1,3-butanedionato Tb0.1, Y0.9 4-picoline-N-oxide
tris 1-phenyl-1,3-butanedionato Tb0.1, Y0.9 4-phenylpyridine
tris 1-phenyl-1,3-butanedionato Tb0.1, Y0.9 4-phenylpyridine-N-oxide
tris 1-phenyl-1,3-butanedionato Tb0.1, Y0.9 1-methylimidazole
tris 1-phenyl-1,3-butanedionato Tb0.1, Y0.9 triphenylphosphine oxide
tris 1-phenyl-1,3-butanedionato Tb0.1, Y0.9 2,2-bipyridyl
tris 1-phenyl-1,3-butanedionato Tb0.1, Y0.9 2,2-bipyridyl-N,N-dioxide
tris 1-phenyl-1,3-butanedionato Tb0.1, Y0.9 phenanthroline
tris 1-phenyl-1,3-butanedionato Tb0.1, Y0.9 bathocuproine
tris 1-phenyl-1,3-butanedionato Tb0.1, Y0.9 bathophenanthroline
tris acetylacetonato Tb0.01, Y0.99 dimethylaminopyridine
tris acetylacetonato Tb0.01, Y0.99 4-picoline-N-oxide
tris acetylacetonato Tb0.01, Y0.99 4-phenylpyridine
tris acetylacetonato Tb0.01, Y0.99 4-phenylpyridine-N-oxide
tris acetylacetonato Tb0.01, Y0.99 1-methylimidazole
tris acetylacetonato Tb0.01, Y0.99 triphenylphosphine oxide
tris acetylacetonato Tb0.01, Y0.99 2,2-bipyridyl
tris acetylacetonato Tb0.01, Y0.99 2,2-bipyridyl-N,N-dioxide
tris acetylacetonato Tb0.01, Y0.99 phenanthroline
tris acetylacetonato Tb0.01, Y0.99 bathocuproine
tris acetylacetonato Tb0.01, Y0.99 bathophenanthroline
tris dibenzoylmethanato Tb0.01, Y0.99 dimethylaminopyridine
tris dibenzoylmethanato Tb0.01, Y0.99 4-picoline-N-oxide
tris dibenzoylmethanato Tb0.01, Y0.99 4-phenylpyridine
tris dibenzoylmethanato Tb0.01, Y0.99 4-phenylpyridine-N-oxide
tris dibenzoylmethanato Tb0.01, Y0.99 1-methylimidazole
tris dibenzoylmethanato Tb0.01, Y0.99 triphenylphosphine oxide
tris dibenzoylmethanato Tb0.01, Y0.99 2,2-bipyridyl
tris dibenzoylmethanato Tb0.01, Y0.99 2,2-bipyridyl-N,N-dioxide
tris dibenzoylmethanato Tb0.01, Y0.99 phenanthroline
tris dibenzoylmethanato Tb0.01, Y0.99 bathocuproine
tris dibenzoylmethanato Tb0.01, Y0.99 bathophenanthroline
tris thenoyltrifluoroacetonato Tb0.01, Y0.99 dimethylaminopyridine
tris thenoyltrifluoroacetonato Tb0.01, Y0.99 4-picoline-N-oxide
tris thenoyltrifluoroacetonato Tb0.01, Y0.99 4-phenylpyridine
tris thenoyltrifluoroacetonato Tb0.01, Y0.99 4-phenylpyridine-N-oxide
tris thenoyltrifluoroacetonato Tb0.01, Y0.99 1-methylimidazole
tris thenoyltrifluoroacetonato Tb0.01, Y0.99 triphenylphosphine oxide
tris thenoyltrifluoroacetonato Tb0.01, Y0.99 2,2-bipyridyl
tris thenoyltrifluoroacetonato Tb0.01, Y0.99 2,2-bipyridyl-N,N-dioxide
tris thenoyltrifluoroacetonato Tb0.01, Y0.99 phenanthroline
tris thenoyltrifluoroacetonato Tb0.01, Y0.99 bathocuproine
tris thenoyltrifluoroacetonato Tb0.01, Y0.99 bathophenanthroline
tris 2,2,6,6-tetramethylheptanedionato Tb0.01, Y0.99 dimethylaminopyridine
tris 2,2,6,6-tetramethylheptanedionato Tb0.01, Y0.99 4-picoline-N-oxide
tris 2,2,6,6-tetramethylheptanedionato Tb0.01, Y0.99 4-phenylpyridine
tris 2,2,6,6-tetramethylheptanedionato Tb0.01, Y0.99 4-phenylpyridine-N-oxide
tris 2,2,6,6-tetramethylheptanedionato Tb0.01, Y0.99 1-methylimidazole
tris 2,2,6,6-tetramethylheptanedionato Tb0.01, Y0.99 triphenylphosphine oxide
tris 2,2,6,6-tetramethylheptanedionato Tb0.01, Y0.99 2,2-bipyridyl
tris 2,2,6,6-tetramethylheptanedionato Tb0.01, Y0.99 2,2-bipyridyl-N,N-dioxide
tris 2,2,6,6-tetramethylheptanedionato Tb0.01, Y0.99 phenanthroline tris 2,2,6,6-tetramethylheptanedionato Tb0.01, Y0.99 bathocuproine
tris 2,2,6,6-tetramethylheptanedionato Tb0.01, Y0.99 bathophenanthroline
tris 3-methylpentane-2,4-dionato Tb0.01, Y0.99 dimethylaminopyridine
tris 3-methylpentane-2,4-dionato Tb0.01, Y0.99 4-picoline-N-oxide
tris 3-methylpentane-2,4-dionato Tb0.01, Y0.99 4-phenylpyridine
tris 3-methylpentane-2,4-dionato Tb0.01, Y0.99 4-phenylpyridine-N-oxide
tris 3-methylpentane-2,4-dionato Tb0.01, Y0.99 1-methylimidazole
tris 3-methylpentane-2,4-dionato Tb0.01, Y0.99 triphenylphosphine oxide
tris 3-methylpentane-2,4-dionato Tb0.01, Y0.99 2,2-bipyridyl
tris 3-methylpentane-2,4-dionato Tb0.01, Y0.99 2,2-bipyridyl-N,N-dioxide
tris 3-methylpentane-2,4-dionato Tb0.01, Y0.99 phenanthroline
tris 3-methylpentane-2,4-dionato Tb0.01, Y0.99 bathocuproine
tris 3-methylpentane-2,4-dionato Tb0.01, Y0.99 bathophenanthroline
tris 3-ethylpentane-2,4-dionato Tb0.01, Y0.99 dimethylaminopyridine
tris 3-ethylpentane-2,4-dionato Tb0.01, Y0.99 4-picoline-N-oxide
tris 3-ethylpentane-2,4-dionato Tb0.01, Y0.99 4-phenylpyridine
tris 3-ethylpentane-2,4-dionato Tb0.01, Y0.99 4-phenylpyridine-N-oxide
tris 3-ethylpentane-2,4-dionato Tb0.01, Y0.99 1-methylimidazole
tris 3-ethylpentane-2,4-dionato Tb0.01, Y0.99 triphenylphosphine oxide
tris 3-ethylpentane-2,4-dionato Tb0.01, Y0.99 2,2-bipyridyl
tris 3-ethylpentane-2,4-dionato Tb0.01, Y0.99 2,2-bipyridyl-N,N-dioxide
tris 3-ethylpentane-2,4-dionato Tb0.01, Y0.99 phenanthroline
tris 3-ethylpentane-2,4-dionato Tb0.01, Y0.99 bathocuproine
tris 3-ethylpentane-2,4-dionato Tb0.01, Y0.99 bathophenanthroline
tris pivaloyltrifluoroacetonato Tb0.01, Y0.99 dimethylaminopyridine
tris pivaloyltrifluoroacetonato Tb0.01, Y0.99 4-picoline-N-oxide
tris pivaloyltrifluoroacetonato Tb0.01, Y0.99 4-phenylpyridine
tris pivaloyltrifluoroacetonato Tb0.01, Y0.99 4-phenylpyridine-N-oxide
tris pivaloyltrifluoroacetonato Tb0.01, Y0.99 1-methylimidazole
tris pivaloyltrifluoroacetonato Tb0.01, Y0.99 triphenylphosphine oxide
tris pivaloyltrifluoroacetonato Tb0.01, Y0.99 2,2-bipyridyl
tris pivaloyltrifluoroacetonato Tb0.01, Y0.99 2,2-bipyridyl-N,N-dioxide
tris pivaloyltrifluoroacetonato Tb0.01, Y0.99 phenanthroline
tris pivaloyltrifluoroacetonato Tb0.01, Y0.99 bathocuproine
tris pivaloyltrifluoroacetonato Tb0.01, Y0.99 bathophenanthroline
tris trifluoroacetylacetonato Tb0.01, Y0.99 dimethylaminopyridine
tris trifluoroacetylacetonato Tb0.01, Y0.99 4-picoline-N-oxide
tris trifluoroacetylacetonato Tb0.01, Y0.99 4-phenylpyridine
tris trifluoroacetylacetonato Tb0.01, Y0.99 4-phenylpyridine-N-oxide
tris trifluoroacetylacetonato Tb0.01, Y0.99 1-methylimidazole
tris trifluoroacetylacetonato Tb0.01, Y0.99 triphenylphosphine oxide
tris trifluoroacetylacetonato Tb0.01, Y0.99 2,2-bipyridyl
tris trifluoroacetylacetonato Tb0.01, Y0.99 2,2-bipyridyl-N,N-dioxide
tris trifluoroacetylacetonato Tb0.01, Y0.99 phenanthroline
tris trifluoroacetylacetonato Tb0.01, Y0.99 bathocuproine
tris trifluoroacetylacetonato Tb0.01, Y0.99 bathophenanthroline
tris hexafluoroacetylacetonato Tb0.01, Y0.99 dimethylaminopyridine
tris hexafluoroacetylacetonato Tb0.01, Y0.99 4-picoline-N-oxide
tris hexafluoroacetylacetonato Tb0.01, Y0.99 4-phenylpyridine
tris hexafluoroacetylacetonato Tb0.01, Y0.99 4-phenylpyridine-N-oxide
tris hexafluoroacetylacetonato Tb0.01, Y0.99 1-methylimidazole
tris hexafluoroacetylacetonato Tb0.01, Y0.99 triphenylphosphine oxide
tris hexafluoroacetylacetonato Tb0.01, Y0.99 2,2-bipyridyl
tris hexafluoroacetylacetonato Tb0.01, Y0.99 2,2-bipyridyl-N,N-dioxide
tris hexafluoroacetylacetonato Tb0.01, Y0.99 phenanthroline
tris hexafluoroacetylacetonato Tb0.01, Y0.99 bathocuproine
tris hexafluoroacetylacetonato Tb0.01, Y0.99 bathophenanthroline
tris 6,6,7,7,8,8,8-heptafluoro-2,2-dimethyloctanedionato Tb0.01, Y0.99 dimethylaminopyridine
tris 6,6,7,7,8,8,8-heptafluoro-2,2-dimethyloctanedionato Tb0.01, Y0.99 4-picoline-N-oxide
tris 6,6,7,7,8,8,8-heptafluoro-2,2-dimethyloctanedionato Tb0.01, Y0.99 4-phenylpyridine
tris 6,6,7,7,8,8,8-heptafluoro-2,2-dimethyloctanedionato Tb0.01, Y0.99 4-phenylpyridine-N-oxide
tris 6,6,7,7,8,8,8-heptafluoro-2,2-dimethyloctanedionato Tb0.01, Y0.99 1-methylimidazole
tris 6,6,7,7,8,8,8-heptafluoro-2,2-dimethyloctanedionato Tb0.01, Y0.99 triphenylphosphine oxide
tris 6,6,7,7,8,8,8-heptafluoro-2,2-dimethyloctanedionato Tb0.01, Y0.99 2,2-bipyridyl
tris 6,6,7,7,8,8,8-heptafluoro-2,2-dimethyloctanedionato Tb0.01, Y0.99 2,2-bipyridyl-N,N-dioxide
tris 6,6,7,7,8,8,8-heptafluoro-2,2-dimethyloctanedionato Tb0.01, Y0.99 phenanthroline
tris 6,6,7,7,8,8,8-heptafluoro-2,2-dimethyloctanedionato Tb0.01, Y0.99 bathocuproine
tris 6,6,7,7,8,8,8-heptafluoro-2,2-dimethyloctanedionato Tb0.01, Y0.99 bathophenanthroline
tris 1-phenyl-1,3-butanedionato Tb0.01, Y0.99 dimethylaminopyridine
tris 1-phenyl-1,3-butanedionato Tb0.01, Y0.99 4-picoline-N-oxide
tris 1-phenyl-1,3-butanedionato Tb0.01, Y0.99 4-phenylpyridine tris 1-phenyl-1,3-butanedionato Tb0.01, Y0.99 4-phenylpyridine-N-oxide
tris 1-phenyl-1,3-butanedionato Tb0.01, Y0.99 1-methylimidazole
tris 1-phenyl-1,3-butanedionato Tb0.01, Y0.99 triphenylphosphine oxide
tris 1-phenyl-1,3-butanedionato Tb0.01, Y0.99 2,2-bipyridyl
tris 1-phenyl-1,3-butanedionato Tb0.01, Y0.99 2,2-bipyridyl-N,N-dioxide
tris 1-phenyl-1,3-butanedionato Tb0.01, Y0.99 phenanthroline
tris 1-phenyl-1,3-butanedionato Tb0.01, Y0.99 bathocuproine
tris 1-phenyl-1,3-butanedionato Tb0.01, Y0.99 bathophenanthroline
tris acetylacetonato Eu0.5, Y0.5 dimethylaminopyridine
tris acetylacetonato Eu0.5, Y0.5 4-picoline-N-oxide
tris acetylacetonato Eu0.5, Y0.5 4-phenylpyridine
tris acetylacetonato Eu0.5, Y0.5 4-phenylpyridine-N-oxide
tris acetylacetonato Eu0.5, Y0.5 1-methylimidazole
tris acetylacetonato Eu0.5, Y0.5 triphenylphosphine oxide
tris acetylacetonato Eu0.5, Y0.5 2,2-bipyridyl
tris acetylacetonato Eu0.5, Y0.5 2,2-bipyridyl-N,N-dioxide
tris acetylacetonato Eu0.5, Y0.5 phenanthroline
tris acetylacetonato Eu0.5, Y0.5 bathocuproine
tris acetylacetonato Eu0.5, Y0.5 bathophenanthroline
tris dibenzoylmethanato Eu0.5, Y0.5 dimethylaminopyridine
tris dibenzoylmethanato Eu0.5, Y0.5 4-picoline-N-oxide
tris dibenzoylmethanato Eu0.5, Y0.5 4-phenylpyridine
tris dibenzoylmethanato Eu0.5, Y0.5 4-phenylpyridine-N-oxide
tris dibenzoylmethanato Eu0.5, Y0.5 1-methylimidazole
tris dibenzoylmethanato Eu0.5, Y0.5 triphenylphosphine oxide
tris dibenzoylmethanato Eu0.5, Y0.5 2,2-bipyridyl
tris dibenzoylmethanato Eu0.5, Y0.5 2,2-bipyridyl-N,N-dioxide
tris dibenzoylmethanato Eu0.5, Y0.5 phenanthroline
tris dibenzoylmethanato Eu0.5, Y0.5 bathocuproine
tris dibenzoylmethanato Eu0.5, Y0.5 bathophenanthroline
tris thenoyltrifluoroacetonato Eu0.5, Y0.5 dimethylaminopyridine
tris thenoyltrifluoroacetonato Eu0.5, Y0.5 4-picoline-N-oxide
tris thenoyltrifluoroacetonato Eu0.5, Y0.5 4-phenylpyridine
tris thenoyltrifluoroacetonato Eu0.5, Y0.5 4-phenylpyridine-N-oxide
tris thenoyltrifluoroacetonato Eu0.5, Y0.5 1-methylimidazole
tris thenoyltrifluoroacetonato Eu0.5, Y0.5 triphenylphosphine oxide
tris thenoyltrifluoroacetonato Eu0.5, Y0.5 2,2-bipyridyl
tris thenoyltrifluoroacetonato Eu0.5, Y0.5 2,2-bipyridyl-N,N-dioxide
tris thenoyltrifluoroacetonato Eu0.5, Y0.5 phenanthroline
tris thenoyltrifluoroacetonato Eu0.5, Y0.5 bathocuproine
tris thenoyltrifluoroacetonato Eu0.5, Y0.5 bathophenanthroline
tris 2,2,6,6-tetramethylheptanedionato Eu0.5, Y0.5 dimethylaminopyridine
tris 2,2,6,6-tetramethylheptanedionato Eu0.5, Y0.5 4-picoline-N-oxide
tris 2,2,6,6-tetramethylheptanedionato Eu0.5, Y0.5 4-phenylpyridine
tris 2,2,6,6-tetramethylheptanedionato Eu0.5, Y0.5 4-phenylpyridine-N-oxide
tris 2,2,6,6-tetramethylheptanedionato Eu0.5, Y0.5 1-methylimidazole
tris 2,2,6,6-tetramethylheptanedionato Eu0.5, Y0.5 triphenylphosphine oxide
tris 2,2,6,6-tetramethylheptanedionato Eu0.5, Y0.5 2,2-bipyridyl
tris 2,2,6,6-tetramethylheptanedionato Eu0.5, Y0.5 2,2-bipyridyl-N,N-dioxide
tris 2,2,6,6-tetramethylheptanedionato Eu0.5, Y0.5 phenanthroline
tris 2,2,6,6-tetramethylheptanedionato Eu0.5, Y0.5 bathocuproine
tris 2,2,6,6-tetramethylheptanedionato Eu0.5, Y0.5 bathophenanthroline
tris 3-methylpentane-2,4-dionato Eu0.5, Y0.5 dimethylaminopyridine
tris 3-methylpentane-2,4-dionato Eu0.5, Y0.5 4-picoline-N-oxide
tris 3-methylpentane-2,4-dionato Eu0.5, Y0.5 4-phenylpyridine
tris 3-methylpentane-2,4-dionato Eu0.5, Y0.5 4-phenylpyridine-N-oxide
tris 3-methylpentane-2,4-dionato Eu0.5, Y0.5 1-methylimidazole
tris 3-methylpentane-2,4-dionato Eu0.5, Y0.5 triphenylphosphine oxide
tris 3-methylpentane-2,4-dionato Eu0.5, Y0.5 2,2-bipyridyl
tris 3-methylpentane-2,4-dionato Eu0.5, Y0.5 2,2-bipyridyl-N,N-dioxide
tris 3-methylpentane-2,4-dionato Eu0.5, Y0.5 phenanthroline
tris 3-methylpentane-2,4-dionato Eu0.5, Y0.5 bathocuproine
tris 3-methylpentane-2,4-dionato Eu0.5, Y0.5 bathophenanthroline
tris 3-ethylpentane-2,4-dionato Eu0.5, Y0.5 dimethylaminopyridine
tris 3-ethylpentane-2,4-dionato Eu0.5, Y0.5 4-picoline-N-oxide
tris 3-ethylpentane-2,4-dionato Eu0.5, Y0.5 4-phenylpyridine
tris 3-ethylpentane-2,4-dionato Eu0.5, Y0.5 4-phenylpyridine-N-oxide
tris 3-ethylpentane-2,4-dionato Eu0.5, Y0.5 1-methylimidazole
tris 3-ethylpentane-2,4-dionato Eu0.5, Y0.5 triphenylphosphine oxide
tris 3-ethylpentane-2,4-dionato Eu0.5, Y0.5 2,2-bipyridyl
tris 3-ethylpentane-2,4-dionato Eu0.5, Y0.5 2,2-bipyridyl-N,N-dioxide
tris 3-ethylpentane-2,4-dionato Eu0.5, Y0.5 phenanthroline
tris 3-ethylpentane-2,4-dionato Eu0.5, Y0.5 bathocuproine
tris 3-ethylpentane-2,4-dionato Eu0.5, Y0.5 bathophenanthroline
tris pivaloyltrifluoroacetonato Eu0.5, Y0.5 dimethylaminopyridine
tris pivaloyltrifluoroacetonato Eu0.5, Y0.5 4-picoline-N-oxide
tris pivaloyltrifluoroacetonato Eu0.5, Y0.5 4-phenylpyridine
tris pivaloyltrifluoroacetonato Eu0.5, Y0.5 4-phenylpyridine-N-oxide
tris pivaloyltrifluoroacetonato Eu0.5, Y0.5 1-methylimidazole
tris pivaloyltrifluoroacetonato Eu0.5, Y0.5 triphenylphosphine oxide
tris pivaloyltrifluoroacetonato Eu0.5, Y0.5 2,2-bipyridyl
tris pivaloyltrifluoroacetonato Eu0.5, Y0.5 2,2-bipyridyl-N,N-dioxide tris pivaloyltrifluoroacetonato Eu0.5, Y0.5 phenanthroline
tris pivaloyltrifluoroacetonato Eu0.5, Y0.5 bathocuproine
tris pivaloyltrifluoroacetonato Eu0.5, Y0.5 bathophenanthroline
tris trifluoroacetylacetonato Eu0.5, Y0.5 dimethylaminopyridine
tris trifluoroacetylacetonato Eu0.5, Y0.5 4-picoline-N-oxide
tris trifluoroacetylacetonato Eu0.5, Y0.5 4-phenylpyridine
tris trifluoroacetylacetonato Eu0.5, Y0.5 4-phenylpyridine-N-oxide
tris trifluoroacetylacetonato Eu0.5, Y0.5 1-methylimidazole
tris trifluoroacetylacetonato Eu0.5, Y0.5 triphenylphosphine oxide
tris trifluoroacetylacetonato Eu0.5, Y0.5 2,2-bipyridyl
tris trifluoroacetylacetonato Eu0.5, Y0.5 2,2-bipyridyl-N,N-dioxide
tris trifluoroacetylacetonato Eu0.5, Y0.5 phenanthroline
tris trifluoroacetylacetonato Eu0.5, Y0.5 bathocuproine
tris trifluoroacetylacetonato Eu0.5, Y0.5 bathophenanthroline
tris hexafluoroacetylacetonato Eu0.5, Y0.5 dimethylaminopyridine
tris hexafluoroacetylacetonato Eu0.5, Y0.5 4-picoline-N-oxide
tris hexafluoroacetylacetonato Eu0.5, Y0.5 4-phenylpyridine
tris hexafluoroacetylacetonato Eu0.5, Y0.5 4-phenylpyridine-N-oxide
tris hexafluoroacetylacetonato Eu0.5, Y0.5 1-methylimidazole
tris hexafluoroacetylacetonato Eu0.5, Y0.5 triphenylphosphine oxide
tris hexafluoroacetylacetonato Eu0.5, Y0.5 2,2-bipyridyl
tris hexafluoroacetylacetonato Eu0.5, Y0.5 2,2-bipyridyl-N, N-dioxide
tris hexafluoroacetylacetonato Eu0.5, Y0.5 phenanthroline
tris hexafluoroacetylacetonato Eu0.5, Y0.5 bathocuproine
tris hexafluoroacetylacetonato Eu0.5, Y0.5 bathophenanthroline
tris 6,6,7,7,8,8,8-heptafluoro-2,2-dimethyloctanedionato Eu0.5, Y0.5 dimethylaminopyridine
tris 6,6,7,7,8,8,8-heptafluoro-2,2-dimethyloctanedionato Eu0.5, Y0.5 4-picoline-N-oxide
tris 6,6,7,7,8,8,8-heptafluoro-2,2-dimethyloctanedionato Eu0.5, Y0.5 4-phenylpyridine
tris 6,6,7,7,8,8,8-heptafluoro-2,2-dimethyloctanedionato Eu0.5, Y0.5 4-phenylpyridine-N-oxide
tris 6,6,7,7,8,8,8-heptafluoro-2,2-dimethyloctanedionato Eu0.5, Y0.5 1-methylimidazole
tris 6,6,7,7,8,8,8-heptafluoro-2,2-dimethyloctanedionato Eu0.5, Y0.5 triphenylphosphine oxide
tris 6,6,7,7,8,8,8-heptafluoro-2,2-dimethyloctanedionato Eu0.5, Y0.5 2,2-bipyridyl
tris 6,6,7,7,8,8,8-heptafluoro-2,2-dimethyloctanedionato Eu0.5, Y0.5 2,2-bipyridyl-N,N-dioxide
tris 6,6,7,7,8,8,8-heptafluoro-2,2-dimethyloctanedionato Eu0.5, Y0.5 phenanthroline
tris 6,6,7,7,8,8,8-heptafluoro-2,2-dimethyloctanedionato Eu0.5, Y0.5 bathocuproine
tris 6,6,7,7,8,8,8-heptafluoro-2,2-dimethyloctanedionato Eu0.5, Y0.5 bathophenanthroline
tris 1-phenyl-1,3-butanedionato Eu0.5, Y0.5 dimethylaminopyridine
tris 1-phenyl-1,3-butanedionato Eu0.5, Y0.5 4-picoline-N-oxide
tris 1-phenyl-1,3-butanedionato Eu0.5, Y0.5 4-phenylpyridine
tris 1-phenyl-1,3-butanedionato Eu0.5, Y0.5 4-phenylpyridine-N-oxide
tris 1-phenyl-1,3-butanedionato Eu0.5, Y0.5 1-methylimidazole
tris 1-phenyl-1,3-butanedionato Eu0.5, Y0.5 triphenylphosphine oxide
tris 1-phenyl-1,3-butanedionato Eu0.5, Y0.5 2,2-bipyridyl
tris 1-phenyl-1,3-butanedionato Eu0.5, Y0.5 2,2-bipyridyl-N,N-dioxide
tris 1-phenyl-1,3-butanedionato Eu0.5, Y0.5 phenanthroline
tris 1-phenyl-1,3-butanedionato Eu0.5, Y0.5 bathocuproine
tris 1-phenyl-1,3-butanedionato Eu0.5, Y0.5 bathophenanthroline
tris acetylacetonato Eu0.2, Y0.8 dimethylaminopyridine
tris acetylacetonato Eu0.2, Y0.8 4-picoline-N-oxide
tris acetylacetonato Eu0.2, Y0.8 4-phenylpyridine
tris acetylacetonato Eu0.2, Y0.8 4-phenylpyridine-N-oxide
tris acetylacetonato Eu0.2, Y0.8 1-methylimidazole
tris acetylacetonato Eu0.2, Y0.8 triphenylphosphine oxide
tris acetylacetonato Eu0.2, Y0.8 2,2-bipyridyl
tris acetylacetonato Eu0.2, Y0.8 2,2-bipyridyl-N,N-dioxide
tris acetylacetonato Eu0.2, Y0.8 phenanthroline
tris acetylacetonato Eu0.2, Y0.8 bathocuproine
tris acetylacetonato Eu0.2, Y0.8 bathophenanthroline
tris dibenzoylmethanato Eu0.2, Y0.8 dimethylaminopyridine
tris dibenzoylmethanato Eu0.2, Y0.8 4-picoline-N-oxide
tris dibenzoylmethanato Eu0.2, Y0.8 4-phenylpyridine
tris dibenzoylmethanato Eu0.2, Y0.8 4-phenylpyridine-N-oxide
tris dibenzoylmethanato Eu0.2, Y0.8 1-methylimidazole
tris dibenzoylmethanato Eu0.2, Y0.8 triphenylphosphine oxide
tris dibenzoylmethanato Eu0.2, Y0.8 2,2-bipyridyl
tris dibenzoylmethanato Eu0.2, Y0.8 2,2-bipyridyl-N,N-dioxide
tris dibenzoylmethanato Eu0.2, Y0.8 phenanthroline
tris dibenzoylmethanato Eu0.2, Y0.8 bathocuproine
tris dibenzoylmethanato Eu0.2, Y0.8 bathophenanthroline
tris thenoyltrifluoroacetonato Eu0.2, Y0.8 dimethylaminopyridine
tris thenoyltrifluoroacetonato Eu0.2, Y0.8 4-picoline-N-oxide
tris thenoyltrifluoroacetonato Eu0.2, Y0.8 4-phenylpyridine
tris thenoyltrifluoroacetonato Eu0.2, Y0.8 4-phenylpyridine-N-oxide
tris thenoyltrifluoroacetonato Eu0.2, Y0.8 1-methylimidazole
tris thenoyltrifluoroacetonato Eu0.2, Y0.8 triphenylphosphine oxide
tris thenoyltrifluoroacetonato Eu0.2, Y0.8 2,2-bipyridyl
tris thenoyltrifluoroacetonato Eu0.2, Y0.8 2,2-bipyridyl-N, N-dioxide
tris thenoyltrifluoroacetonato Eu0.2, Y0.8 phenanthroline
tris thenoyltrifluoroacetonato Eu0.2, Y0.8 bathocuproine
tris thenoyltrifluoroacetonato Eu0.2, Y0.8 bathophenanthroline
tris 2,2,6,6-tetramethylheptanedionato Eu0.2, Y0.8 dimethylaminopyridine
tris 2,2,6,6-tetramethylheptanedionato Eu0.2, Y0.8 4-picoline-N-oxide
tris 2,2,6,6-tetramethylheptanedionato Eu0.2, Y0.8 4-phenylpyridine
tris 2,2,6,6-tetramethylheptanedionato Eu0.2, Y0.8 4-phenylpyridine-N-oxide
tris 2,2,6,6-tetramethylheptanedionato Eu0.2, Y0.8 1-methylimidazole tris 2,2,6,6-tetramethylheptanedionato Eu0.2, Y0.8 triphenylphosphine oxide
tris 2,2,6,6-tetramethylheptanedionato Eu0.2, Y0.8 2,2-bipyridyl
tris 2,2,6,6-tetramethylheptanedionato Eu0.2, Y0.8 2,2-bipyridyl-N,N-dioxide
tris 2,2,6,6-tetramethylheptanedionato Eu0.2, Y0.8 phenanthroline
tris 2,2,6,6-tetramethylheptanedionato Eu0.2, Y0.8 bathocuproine
tris 2,2,6,6-tetramethylheptanedionato Eu0.2, Y0.8 bathophenanthroline
tris 3-methylpentane-2,4-dionato Eu0.2, Y0.8 dimethylaminopyridine
tris 3-methylpentane-2,4-dionato Eu0.2, Y0.8 4-picoline-N-oxide
tris 3-methylpentane-2,4-dionato Eu0.2, Y0.8 4-phenylpyridine
tris 3-methylpentane-2,4-dionato Eu0.2, Y0.8 4-phenylpyridine-N-oxide
tris 3-methylpentane-2,4-dionato Eu0.2, Y0.8 1-methylimidazole
tris 3-methylpentane-2,4-dionato Eu0.2, Y0.8 triphenylphosphine oxide
tris 3-methylpentane-2,4-dionato Eu0.2, Y0.8 2,2-bipyridyl
tris 3-methylpentane-2,4-dionato Eu0.2, Y0.8 2,2-bipyridyl-N,N-dioxide
tris 3-methylpentane-2,4-dionato Eu0.2, Y0.8 phenanthroline
tris 3-methylpentane-2,4-dionato Eu0.2, Y0.8 bathocuproine
tris 3-methylpentane-2,4-dionato Eu0.2, Y0.8 bathophenanthroline
tris 3-ethylpentane-2,4-dionato Eu0.2, Y0.8 dimethylaminopyridine
tris 3-ethylpentane-2,4-dionato Eu0.2, Y0.8 4-picoline-N-oxide
tris 3-ethylpentane-2,4-dionato Eu0.2, Y0.8 4-phenylpyridine
tris 3-ethylpentane-2,4-dionato Eu0.2, Y0.8 4-phenylpyridine-N-oxide
tris 3-ethylpentane-2,4-dionato Eu0.2, Y0.8 1-methylimidazole
tris 3-ethylpentane-2,4-dionato Eu0.2, Y0.8 triphenylphosphine oxide
tris 3-ethylpentane-2,4-dionato Eu0.2, Y0.8 2,2-bipyridyl
tris 3-ethylpentane-2,4-dionato Eu0.2, Y0.8 2,2-bipyridyl-N,N-dioxide
tris 3-ethylpentane-2,4-dionato Eu0.2, Y0.8 phenanthroline
tris 3-ethylpentane-2,4-dionato Eu0.2, Y0.8 bathocuproine
tris 3-ethylpentane-2,4-dionato Eu0.2, Y0.8 bathophenanthroline
tris pivaloyltrifluoroacetonato Eu0.2, Y0.8 dimethylaminopyridine
tris pivaloyltrifluoroacetonato Eu0.2, Y0.8 4-picoline-N-oxide
tris pivaloyltrifluoroacetonato Eu0.2, Y0.8 4-phenylpyridine
tris pivaloyltrifluoroacetonato Eu0.2, Y0.8 4-phenylpyridine-N-oxide
tris pivaloyltrifluoroacetonato Eu0.2, Y0.8 1-methylimidazole
tris pivaloyltrifluoroacetonato Eu0.2, Y0.8 triphenylphosphine oxide
tris pivaloyltrifluoroacetonato Eu0.2, Y0.8 2,2-bipyridyl
tris pivaloyltrifluoroacetonato Eu0.2, Y0.8 2,2-bipyridyl-N,N-dioxide
tris pivaloyltrifluoroacetonato Eu0.2, Y0.8 phenanthroline
tris pivaloyltrifluoroacetonato Eu0.2, Y0.8 bathocuproine
tris pivaloyltrifluoroacetonato Eu0.2, Y0.8 bathophenanthroline
tris trifluoroacetylacetonato Eu0.2, Y0.8 dimethylaminopyridine
tris trifluoroacetylacetonato Eu0.2, Y0.8 4-picoline-N-oxide
tris trifluoroacetylacetonato Eu0.2, Y0.8 4-phenylpyridine
tris trifluoroacetylacetonato Eu0.2, Y0.8 4-phenylpyridine-N-oxide
tris trifluoroacetylacetonato Eu0.2, Y0.8 1-methylimidazole
tris trifluoroacetylacetonato Eu0.2, Y0.8 triphenylphosphine oxide
tris trifluoroacetylacetonato Eu0.2, Y0.8 2,2-bipyridyl
tris trifluoroacetylacetonato Eu0.2, Y0.8 2,2-bipyridyl-N,N-dioxide
tris trifluoroacetylacetonato Eu0.2, Y0.8 phenanthroline
tris trifluoroacetylacetonato Eu0.2, Y0.8 bathocuproine
tris trifluoroacetylacetonato Eu0.2, Y0.8 bathophenanthroline
tris hexafluoroacetylacetonato Eu0.2, Y0.8 dimethylaminopyridine
tris hexafluoroacetylacetonato Eu0.2, Y0.8 4-picoline-N-oxide
tris hexafluoroacetylacetonato Eu0.2, Y0.8 4-phenylpyridine
tris hexafluoroacetylacetonato Eu0.2, Y0.8 4-phenylpyridine-N-oxide
tris hexafluoroacetylacetonato Eu0.2, Y0.8 1-methylimidazole
tris hexafluoroacetylacetonato Eu0.2, Y0.8 triphenylphosphine oxide
tris hexafluoroacetylacetonato Eu0.2, Y0.8 2,2-bipyridyl
tris hexafluoroacetylacetonato Eu0.2, Y0.8 2,2-bipyridyl-N,N-dioxide
tris hexafluoroacetylacetonato Eu0.2, Y0.8 phenanthroline
tris hexafluoroacetylacetonato Eu0.2, Y0.8 bathocuproine
tris hexafluoroacetylacetonato Eu0.2, Y0.8 bathophenanthroline
tris 6,6,7,7,8,8,8-heptafluoro-2,2-dimethyloctanedionato Eu0.2, Y0.8 dimethylaminopyridine
tris 6,6,7,7,8,8,8-heptafluoro-2,2-dimethyloctanedionato Eu0.2, Y0.8 4-picoline-N-oxide
tris 6,6,7,7,8,8,8-heptafluoro-2,2-dimethyloctanedionato Eu0.2, Y0.8 4-phenylpyridine
tris 6,6,7,7,8,8,8-heptafluoro-2,2-dimethyloctanedionato Eu0.2, Y0.8 4-phenylpyridine-N-oxide
tris 6,6,7,7,8,8,8-heptafluoro-2,2-dimethyloctanedionato Eu0.2, Y0.8 1-methylimidazole
tris 6,6,7,7,8,8,8-heptafluoro-2,2-dimethyloctanedionato Eu0.2, Y0.8 triphenylphosphine oxide
tris 6,6,7,7,8,8,8-heptafluoro-2,2-dimethyloctanedionato Eu0.2, Y0.8 2,2-bipyridyl
tris 6,6,7,7,8,8,8-heptafluoro-2,2-dimethyloctanedionato Eu0.2, Y0.8 2,2-bipyridyl-N,N-dioxide
tris 6,6,7,7,8,8,8-heptafluoro-2,2-dimethyloctanedionato Eu0.2, Y0.8 phenanthroline
tris 6,6,7,7,8,8,8-heptafluoro-2,2-dimethyloctanedionato Eu0.2, Y0.8 bathocuproine
tris 6,6,7,7,8,8,8-heptafluoro-2,2-dimethyloctanedionato Eu0.2, Y0.8 bathophenanthroline
tris 1-phenyl-1,3-butanedionato Eu0.2, Y0.8 dimethylaminopyridine
tris 1-phenyl-1,3-butanedionato Eu0.2, Y0.8 4-picoline-N-oxide
tris 1-phenyl-1,3-butanedionato Eu0.2, Y0.8 4-phenylpyridine
tris 1-phenyl-1,3-butanedionato Eu0.2, Y0.8 4-phenylpyridine-N-oxide tris 1-phenyl-1,3-butanedionato Eu0.2, Y0.8 1-methylimidazole tris 1-phenyl-1,3-butanedionato Eu0.2, Y0.8 triphenylphosphine oxide tris 1-phenyl-1,3-butanedionato Eu0.2, Y0.8 2,2-bipyridyl tris 1-phenyl-1,3-butanedionato Eu0.2, Y0.8 2,2-bipyridyl-N,N-dioxide tris 1-phenyl-1,3-butanedionato Eu0.2, Y0.8 phenanthroline tris 1-phenyl-1,3-butanedionato Eu0.2, Y0.8 bathocuproine tris 1-phenyl-1,3-butanedionato Eu0.2, Y0.8 bathophenanthroline tris acetylacetonato Eu0.1, Y0.9 dimethylaminopyridine tris acetylacetonato Eu0.1, Y0.9 4-picoline-N-oxide tris acetylacetonato Eu0.1, Y0.9 4-phenylpyridine tris acetylacetonato Eu0.1, Y0.9 4-phenylpyridine-N-oxide tris acetylacetonato Eu0.1, Y0.9 1-methylimidazole tris acetylacetonato Eu0.1, Y0.9 triphenylphosphine oxide tris acetylacetonato Eu0.1, Y0.9 2,2-bipyridyl tris acetylacetonato Eu0.1, Y0.9 2,2-bipyridyl-N,N-dioxide tris acetylacetonato Eu0.1, Y0.9 phenanthroline tris acetylacetonato Eu0.1, Y0.9 bathocuproine tris acetylacetonato Eu0.1, Y0.9 bathophenanthroline tris dibenzoylmethanato Eu0.1, Y0.9 dimethylaminopyridine tris dibenzoylmethanato Eu0.1, Y0.9 4-picoline-N-oxide tris dibenzoylmethanato Eu0.1, Y0.9 4-phenylpyridine tris dibenzoylmethanato Eu0.1, Y0.9 4-phenylpyridine-N-oxide tris dibenzoylmethanato Eu0.1, Y0.9 1-methylimidazole tris dibenzoylmethanato Eu0.1, Y0.9 triphenylphosphine oxide tris dibenzoylmethanato Eu0.1, Y0.9 2,2-bipyridyl tris dibenzoylmethanato Eu0.1, Y0.9 2,2-bipyridyl-N,N-dioxide tris dibenzoylmethanato Eu0.1, Y0.9 phenanthroline tris dibenzoylmethanato Eu0.1, Y0.9 bathocuproine tris dibenzoylmethanato Eu0.1, Y0.9 bathophenanthroline tris thenoyltrifluoroacetonato Eu0.1, Y0.9 dimethylaminopyridine tris thenoyltrifluoroacetonato Eu0.1, Y0.9 4-picoline-N-oxide tris thenoyltrifluoroacetonato Eu0.1, Y0.9 4-phenylpyridine tris thenoyltrifluoroacetonato Eu0.1, Y0.9 4-phenylpyridine-N-oxide tris thenoyltrifluoroacetonato Eu0.1, Y0.9 1-methylimidazole tris thenoyltrifluoroacetonato Eu0.1, Y0.9 triphenylphosphine oxide tris thenoyltrifluoroacetonato Eu0.1, Y0.9 2,2-bipyridyl tris thenoyltrifluoroacetonato Eu0.1, Y0.9 2,2-bipyridyl-N,N-dioxide tris thenoyltrifluoroacetonato Eu0.1, Y0.9 phenanthroline tris thenoyltrifluoroacetonato Eu0.1, Y0.9 bathocuproine tris thenoyltrifluoroacetonato Eu0.1, Y0.9 bathophenanthroline tris 2,2,6,6-tetramethylheptanedionato Eu0.1, Y0.9 dimethylaminopyridine tris 2,2,6,6-tetramethylheptanedionato Eu0.1, Y0.9 4-picoline-N-oxide tris 2,2,6,6-tetramethylheptanedionato Eu0.1, Y0.9 4-phenylpyridine tris 2,2,6,6-tetramethylheptanedionato Eu0.1, Y0.9 4-phenylpyridine-N-oxide tris 2,2,6,6-tetramethylheptanedionato Eu0.1, Y0.9 1-methylimidazole tris 2,2,6,6-tetramethylheptanedionato Eu0.1, Y0.9 triphenylphosphine oxide tris 2,2,6,6-tetramethylheptanedionato Eu0.1, Y0.9 2,2-bipyridyl tris 2,2,6,6-tetramethylheptanedionato Eu0.1, Y0.9 2,2-bipyridyl-N,N-dioxide tris 2,2,6,6-tetramethylheptanedionato Eu0.1, Y0.9 phenanthroline tris 2,2,6,6-tetramethylheptanedionato Eu0.1, Y0.9 bathocuproine tris 2,2,6,6-tetramethylheptanedionato Eu0.1, Y0.9 bathophenanthroline tris 3-methylpentane-2,4-dionato Eu0.1, Y0.9 dimethylaminopyridine tris 3-methylpentane-2,4-dionato Eu0.1, Y0.9 4-picoline-N-oxide tris 3-methylpentane-2,4-dionato Eu0.1, Y0.9 4-phenylpyridine tris 3-methylpentane-2,4-dionato Eu0.1, Y0.9 4-phenylpyridine-N-oxide tris 3-methylpentane-2,4-dionato Eu0.1, Y0.9 1-methylimidazole tris 3-methylpentane-2,4-dionato Eu0.1, Y0.9 triphenylphosphine oxide tris 3-methylpentane-2,4-dionato Eu0.1, Y0.9 2,2-bipyridyl tris 3-methylpentane-2,4-dionato Eu0.1, Y0.9 2,2-bipyridyl-N,N-dioxide tris 3-methylpentane-2,4-dionato Eu0.1, Y0.9 phenanthroline tris 3-methylpentane-2,4-dionato Eu0.1, Y0.9 bathocuproine tris 3-methylpentane-2,4-dionato Eu0.1, Y0.9 bathophenanthroline tris 3-ethylpentane-2,4-dionato Eu0.1, Y0.9 dimethylaminopyridine tris 3-ethylpentane-2,4-dionato Eu0.1, Y0.9 4-picoline-N-oxide tris 3-ethylpentane-2,4-dionato Eu0.1, Y0.9 4-phenylpyridine tris 3-ethylpentane-2,4-dionato Eu0.1, Y0.9 4-phenylpyridine-N-oxide tris 3-ethylpentane-2,4-dionato Eu0.1, Y0.9 1-methylimidazole tris 3-ethylpentane-2,4-dionato Eu0.1, Y0.9 triphenylphosphine oxide tris 3-ethylpentane-2,4-dionato Eu0.1, Y0.9 2,2-bipyridyl tris 3-ethylpentane-2,4-dionato Eu0.1, Y0.9 2,2-bipyridyl-N,N-dioxide tris 3-ethylpentane-2,4-dionato Eu0.1, Y0.9 phenanthroline tris 3-ethylpentane-2,4-dionato Eu0.1, Y0.9 bathocuproine tris 3-ethylpentane-2,4-dionato Eu0.1, Y0.9 bathophenanthroline tris pivaloyltrifluoroacetonato Eu0.1, Y0.9 dimethylaminopyridine tris pivaloyltrifluoroacetonato Eu0.1, Y0.9 4-picoline-N-oxide tris pivaloyltrifluoroacetonato Eu0.1, Y0.9 4-phenylpyridine tris pivaloyltrifluoroacetonato Eu0.1, Y0.9 4-phenylpyridine-N-oxide tris pivaloyltrifluoroacetonato Eu0.1, Y0.9 1-methylimidazole tris pivaloyltrifluoroacetonato Eu0.1, Y0.9 triphenylphosphine oxide tris pivaloyltrifluoroacetonato Eu0.1, Y0.9 2,2-bipyridyl tris pivaloyltrifluoroacetonato Eu0.1, Y0.9 2,2-bipyridyl-N,N-dioxide tris pivaloyltrifluoroacetonato Eu0.1, Y0.9 phenanthroline tris pivaloyltrifluoroacetonato Eu0.1, Y0.9 bathocuproine tris pivaloyltrifluoroacetonato Eu0.1, Y0.9 bathophenanthroline tris trifluoroacetylacetonato Eu0.1, Y0.9 dimethylaminopyridine
tris trifluoroacetylacetonato Eu0.1, Y0.9 4-picoline-N-oxide
tris trifluoroacetylacetonato Eu0.1, Y0.9 4-phenylpyridine
tris trifluoroacetylacetonato Eu0.1, Y0.9 4-phenylpyridine-N-oxide
tris trifluoroacetylacetonato Eu0.1, Y0.9 1-methylimidazole
tris trifluoroacetylacetonato Eu0.1, Y0.9 triphenylphosphine oxide
tris trifluoroacetylacetonato Eu0.1, Y0.9 2,2-bipyridyl
tris trifluoroacetylacetonato Eu0.1, Y0.9 2,2-bipyridyl-N,N-dioxide
tris trifluoroacetylacetonato Eu0.1, Y0.9 phenanthroline
tris trifluoroacetylacetonato Eu0.1, Y0.9 bathocuproine
tris trifluoroacetylacetonato Eu0.1, Y0.9 bathophenanthroline
tris hexafluoroacetylacetonato Eu0.1, Y0.9 dimethylaminopyridine
tris hexafluoroacetylacetonato Eu0.1, Y0.9 4-picoline-N-oxide
tris hexafluoroacetylacetonato Eu0.1, Y0.9 4-phenylpyridine
tris hexafluoroacetylacetonato Eu0.1, Y0.9 4-phenylpyridine-N-oxide
tris hexafluoroacetylacetonato Eu0.1, Y0.9 1-methylimidazole
tris hexafluoroacetylacetonato Eu0.1, Y0.9 triphenylphosphine oxide
tris hexafluoroacetylacetonato Eu0.1, Y0.9 2,2-bipyridyl
tris hexafluoroacetylacetonato Eu0.1, Y0.9 2,2-bipyridyl-N,N-dioxide
tris hexafluoroacetylacetonato Eu0.1, Y0.9 phenanthroline
tris hexafluoroacetylacetonato Eu0.1, Y0.9 bathocuproine
tris hexafluoroacetylacetonato Eu0.1, Y0.9 bathophenanthroline
tris 6,6,7,7,8,8,8-heptafluoro-2,2-dimethyloctanedionato Eu0.1, Y0.9 dimethylaminopyridine
tris 6,6,7,7,8,8,8-heptafluoro-2,2-dimethyloctanedionato Eu0.1, Y0.9 4-picoline-N-oxide
tris 6,6,7,7,8,8,8-heptafluoro-2,2-dimethyloctanedionato Eu0.1, Y0.9 4-phenylpyridine
tris 6,6,7,7,8,8,8-heptafluoro-2,2-dimethyloctanedionato Eu0.1, Y0.9 4-phenylpyridine-N-oxide
tris 6,6,7,7,8,8,8-heptafluoro-2,2-dimethyloctanedionato Eu0.1, Y0.9 1-methylimidazole
tris 6,6,7,7,8,8,8-heptafluoro-2,2-dimethyloctanedionato Eu0.1, Y0.9 triphenylphosphine oxide
tris 6,6,7,7,8,8,8-heptafluoro-2,2-dimethyloctanedionato Eu0.1, Y0.9 2,2-bipyridyl
tris 6,6,7,7,8,8,8-heptafluoro-2,2-dimethyloctanedionato Eu0.1, Y0.9 2,2-bipyridyl-N,N-dioxide
tris 6,6,7,7,8,8,8-heptafluoro-2,2-dimethyloctanedionato Eu0.1, Y0.9 phenanthroline
tris 6,6,7,7,8,8,8-heptafluoro-2,2-dimethyloctanedionato Eu0.1, Y0.9 bathocuproine
tris 6,6,7,7,8,8,8-heptafluoro-2,2-dimethyloctanedionato Eu0.1, Y0.9 bathophenanthroline
tris 1-phenyl-1,3-butanedionato Eu0.1, Y0.9 dimethylaminopyridine
tris 1-phenyl-1,3-butanedionato Eu0.1, Y0.9 4-picoline-N-oxide
tris 1-phenyl-1,3-butanedionato Eu0.1, Y0.9 4-phenylpyridine
tris 1-phenyl-1,3-butanedionato Eu0.1, Y0.9 4-phenylpyridine-N-oxide
tris 1-phenyl-1,3-butanedionato Eu0.1, Y0.9 1-methylimidazole
tris 1-phenyl-1,3-butanedionato Eu0.1, Y0.9 triphenylphosphine oxide
tris 1-phenyl-1,3-butanedionato Eu0.1, Y0.9 2,2-bipyridyl
tris 1-phenyl-1,3-butanedionato Eu0.1, Y0.9 2,2-bipyridyl-N,N-dioxide
tris 1-phenyl-1,3-butanedionato Eu0.1, Y0.9 phenanthroline
tris 1-phenyl-1,3-butanedionato Eu0.1, Y0.9 bathocuproine
tris 1-phenyl-1,3-butanedionato Eu0.1, Y0.9 bathophenanthroline
tris acetylacetonato Eu0.01, Y0.99 dimethylaminopyridine
tris acetylacetonato Eu0.01, Y0.99 4-picoline-N-oxide
tris acetylacetonato Eu0.01, Y0.99 4-phenylpyridine
tris acetylacetonato Eu0.01, Y0.99 4-phenylpyridine-N-oxide
tris acetylacetonato Eu0.01, Y0.99 1-methylimidazole
tris acetylacetonato Eu0.01, Y0.99 triphenylphosphine oxide
tris acetylacetonato Eu0.01, Y0.99 2,2-bipyridyl
tris acetylacetonato Eu0.01, Y0.99 2,2-bipyridyl-N,N-dioxide
tris acetylacetonato Eu0.01, Y0.99 phenanthroline
tris acetylacetonato Eu0.01, Y0.99 bathocuproine
tris acetylacetonato Eu0.01, Y0.99 bathophenanthroline
tris dibenzoylmethanato Eu0.01, Y0.99 dimethylaminopyridine
tris dibenzoylmethanato Eu0.01, Y0.99 4-picoline-N-oxide
tris dibenzoylmethanato Eu0.01, Y0.99 4-phenylpyridine
tris dibenzoylmethanato Eu0.01, Y0.99 4-phenylpyridine-N-oxide
tris dibenzoylmethanato Eu0.01, Y0.99 1-methylimidazole
tris dibenzoylmethanato Eu0.01, Y0.99 triphenylphosphine oxide
tris dibenzoylmethanato Eu0.01, Y0.99 2,2-bipyridyl
tris dibenzoylmethanato Eu0.01, Y0.99 2,2-bipyridyl-N,N-dioxide
tris dibenzoylmethanato Eu0.01, Y0.99 phenanthroline
tris dibenzoylmethanato Eu0.01, Y0.99 bathocuproine
tris dibenzoylmethanato Eu0.01, Y0.99 bathophenanthroline
tris thenoyltrifluoroacetonato Eu0.01, Y0.99 dimethylaminopyridine
tris thenoyltrifluoroacetonato Eu0.01, Y0.99 4-picoline-N-oxide
tris thenoyltrifluoroacetonato Eu0.01, Y0.99 4-phenylpyridine
tris thenoyltrifluoroacetonato Eu0.01, Y0.99 4-phenylpyridine-N-oxide
tris thenoyltrifluoroacetonato Eu0.01, Y0.99 1-methylimidazole
tris thenoyltrifluoroacetonato Eu0.01, Y0.99 triphenylphosphine oxide
tris thenoyltrifluoroacetonato Eu0.01, Y0.99 2,2-bipyridyl
tris thenoyltrifluoroacetonato Eu0.01, Y0.99 2,2-bipyridyl-N,N-dioxide
tris thenoyltrifluoroacetonato Eu0.01, Y0.99 phenanthroline
tris thenoyltrifluoroacetonato Eu0.01, Y0.99 bathocuproine
tris thenoyltrifluoroacetonato Eu0.01, Y0.99 bathophenanthroline
tris 2,2,6,6-tetramethylheptanedionato Eu0.01, Y0.99 dimethylaminopyridine
tris 2,2,6,6-tetramethylheptanedionato Eu0.01, Y0.99 4-picoline-N-oxide
tris 2,2,6,6-tetramethylheptanedionato Eu0.01, Y0.99 4-phenylpyridine
tris 2,2,6,6-tetramethylheptanedionato Eu0.01, Y0.99 4-phenylpyridine-N-oxide
tris 2,2,6,6-tetramethylheptanedionato Eu0.01, Y0.99 1-methylimidazole tris 2,2,6,6-tetramethylheptanedionato Eu0.01, Y0.99 triphenylphosphine oxide
tris 2,2,6,6-tetramethylheptanedionato Eu0.01, Y0.99 2,2-bipyridyl
tris 2,2,6,6-tetramethylheptanedionato Eu0.01, Y0.99 2,2-bipyridyl-N,N-dioxide
tris 2,2,6,6-tetramethylheptanedionato Eu0.01, Y0.99 phenanthroline
tris 2,2,6,6-tetramethylheptanedionato Eu0.01, Y0.99 bathocuproine
tris 2,2,6,6-tetramethylheptanedionato Eu0.01, Y0.99 bathophenanthroline
tris 3-methylpentane-2,4-dionato Eu0.01, Y0.99 dimethylaminopyridine
tris 3-methylpentane-2,4-dionato Eu0.01, Y0.99 4-picoline-N-oxide
tris 3-methylpentane-2,4-dionato Eu0.01, Y0.99 4-phenylpyridine
tris 3-methylpentane-2,4-dionato Eu0.01, Y0.99 4-phenylpyridine-N-oxide
tris 3-methylpentane-2,4-dionato Eu0.01, Y0.99 1-methylimidazole
tris 3-methylpentane-2,4-dionato Eu0.01, Y0.99 triphenylphosphine oxide
tris 3-methylpentane-2,4-dionato Eu0.01, Y0.99 2,2-bipyridyl
tris 3-methylpentane-2,4-dionato Eu0.01, Y0.99 2,2-bipyridyl-N,N-dioxide
tris 3-methylpentane-2,4-dionato Eu0.01, Y0.99 phenanthroline
tris 3-methylpentane-2,4-dionato Eu0.01, Y0.99 bathocuproine
tris 3-methylpentane-2,4-dionato Eu0.01, Y0.99 bathophenanthroline
tris 3-ethylpentane-2,4-dionato Eu0.01, Y0.99 dimethylaminopyridine
tris 3-ethylpentane-2,4-dionato Eu0.01, Y0.99 4-picoline-N-oxide
tris 3-ethylpentane-2,4-dionato Eu0.01, Y0.99 4-phenylpyridine
tris 3-ethylpentane-2,4-dionato Eu0.01, Y0.99 4-phenylpyridine-N-oxide
tris 3-ethylpentane-2,4-dionato Eu0.01, Y0.99 1-methylimidazole
tris 3-ethylpentane-2,4-dionato Eu0.01, Y0.99 triphenylphosphine oxide
tris 3-ethylpentane-2,4-dionato Eu0.01, Y0.99 2,2-bipyridyl
tris 3-ethylpentane-2,4-dionato Eu0.01, Y0.99 2,2-bipyridyl-N,N-dioxide
tris 3-ethylpentane-2,4-dionato Eu0.01, Y0.99 phenanthroline
tris 3-ethylpentane-2,4-dionato Eu0.01, Y0.99 bathocuproine
tris 3-ethylpentane-2,4-dionato Eu0.01, Y0.99 bathophenanthroline
tris pivaloyltrifluoroacetonato Eu0.01, Y0.99 dimethylaminopyridine
tris pivaloyltrifluoroacetonato Eu0.01, Y0.99 4-picoline-N-oxide
tris pivaloyltrifluoroacetonato Eu0.01, Y0.99 4-phenylpyridine
tris pivaloyltrifluoroacetonato Eu0.01, Y0.99 4-phenylpyridine-N-oxide
tris pivaloyltrifluoroacetonato Eu0.01, Y0.99 1-methylimidazole
tris pivaloyltrifluoroacetonato Eu0.01, Y0.99 triphenylphosphine oxide
tris pivaloyltrifluoroacetonato Eu0.01, Y0.99 2,2-bipyridyl
tris pivaloyltrifluoroacetonato Eu0.01, Y0.99 2,2-bipyridyl-N,N-dioxide
tris pivaloyltrifluoroacetonato Eu0.01, Y0.99 phenanthroline
tris pivaloyltrifluoroacetonato Eu0.01, Y0.99 bathocuproine
tris pivaloyltrifluoroacetonato Eu0.01, Y0.99 bathophenanthroline
tris trifluoroacetylacetonato Eu0.01, Y0.99 dimethylaminopyridine
tris trifluoroacetylacetonato Eu0.01, Y0.99 4-picoline-N-oxide
tris trifluoroacetylacetonato Eu0.01, Y0.99 4-phenylpyridine
tris trifluoroacetylacetonato Eu0.01, Y0.99 4-phenylpyridine-N-oxide
tris trifluoroacetylacetonato Eu0.01, Y0.99 1-methylimidazole
tris trifluoroacetylacetonato Eu0.01, Y0.99 triphenylphosphine oxide
tris trifluoroacetylacetonato Eu0.01, Y0.99 2,2-bipyridyl
tris trifluoroacetylacetonato Eu0.01, Y0.99 2,2-bipyridyl-N,N-dioxide
tris trifluoroacetylacetonato Eu0.01, Y0.99 phenanthroline
tris trifluoroacetylacetonato Eu0.01, Y0.99 bathocuproine
tris trifluoroacetylacetonato Eu0.01, Y0.99 bathophenanthroline
tris hexafluoroacetylacetonato Eu0.01, Y0.99 dimethylaminopyridine
tris hexafluoroacetylacetonato Eu0.01, Y0.99 4-picoline-N-oxide
tris hexafluoroacetylacetonato Eu0.01, Y0.99 4-phenylpyridine
tris hexafluoroacetylacetonato Eu0.01, Y0.99 4-phenylpyridine-N-oxide
tris hexafluoroacetylacetonato Eu0.01, Y0.99 1-methylimidazole
tris hexafluoroacetylacetonato Eu0.01, Y0.99 triphenylphosphine oxide
tris hexafluoroacetylacetonato Eu0.01, Y0.99 2,2-bipyridyl
tris hexafluoroacetylacetonato Eu0.01, Y0.99 2,2-bipyridyl-N,N-dioxide
tris hexafluoroacetylacetonato Eu0.01, Y0.99 phenanthroline
tris hexafluoroacetylacetonato Eu0.01, Y0.99 bathocuproine
tris hexafluoroacetylacetonato Eu0.01, Y0.99 bathophenanthroline
tris 6,6,7,7,8,8,8-heptafluoro-2,2-dimethyloctanedionato Eu0.01, Y0.99 dimethylaminopyridine
tris 6,6,7,7,8,8,8-heptafluoro-2,2-dimethyloctanedionato Eu0.01, Y0.99 4-picoline-N-oxide
tris 6,6,7,7,8,8,8-heptafluoro-2,2-dimethyloctanedionato Eu0.01, Y0.99 4-phenylpyridine
tris 6,6,7,7,8,8,8-heptafluoro-2,2-dimethyloctanedionato Eu0.01, Y0.99 4-phenylpyridine-N-oxide
tris 6,6,7,7,8,8,8-heptafluoro-2,2-dimethyloctanedionato Eu0.01, Y0.99 1-methylimidazole
tris 6,6,7,7,8,8,8-heptafluoro-2,2-dimethyloctanedionato Eu0.01, Y0.99 triphenylphosphine oxide
tris 6,6,7,7,8,8,8-heptafluoro-2,2-dimethyloctanedionato Eu0.01, Y0.99 2,2-bipyridyl
tris 6,6,7,7,8,8,8-heptafluoro-2,2-dimethyloctanedionato Eu0.01, Y0.99 2,2-bipyridyl-N,N-dioxide
tris 6,6,7,7,8,8,8-heptafluoro-2,2-dimethyloctanedionato Eu0.01, Y0.99 phenanthroline
tris 6,6,7,7,8,8,8-heptafluoro-2,2-dimethyloctanedionato Eu0.01, Y0.99 bathocuproine tris 6,6,7,7,8,8,8-heptafluoro-2,2-dimethyloctanedionato Eu0.01, Y0.99 bathophenanthroline
tris 1-phenyl-1,3-butanedionato Eu0.01, Y0.99 dimethylaminopyridine
tris 1-phenyl-1,3-butanedionato Eu0.01, Y0.99 4-picoline-N-oxide
tris 1-phenyl-1,3-butanedionato Eu0.01, Y0.99 4-phenylpyridine
tris 1-phenyl-1,3-butanedionato Eu0.01, Y0.99 4-phenylpyridine-N-oxide
tris 1-phenyl-1,3-butanedionato Eu0.01, Y0.99 1-methylimidazole
tris 1-phenyl-1,3-butanedionato Eu0.01, Y0.99 triphenylphosphine oxide
tris 1-phenyl-1,3-butanedionato Eu0.01, Y0.99 2,2-bipyridyl
tris 1-phenyl-1,3-butanedionato Eu0.01, Y0.99 2,2-bipyridyl-N,N-dioxide
tris 1-phenyl-1,3-butanedionato Eu0.01, Y0.99 phenanthroline
tris 1-phenyl-1,3-butanedionato Eu0.01, Y0.99 bathocuproine
tris 1-phenyl-1,3-butanedionato Eu0.01, Y0.99 bathophenanthroline
tris acetylacetonato Eu0.5, Y0.5 dimethylaminopyridine
tris acetylacetonato Eu0.5, Y0.5 4-picoline-N-oxide
tris acetylacetonato Eu0.5, Y0.5 4-phenylpyridine
tris acetylacetonato Eu0.5, Y0.5 4-phenylpyridine-N-oxide
tris acetylacetonato Eu0.5, Y0.5 1-methylimidazole
tris acetylacetonato Eu0.5, Y0.5 triphenylphosphine oxide
tris acetylacetonato Eu0.5, Y0.5 2,2-bipyridyl
tris acetylacetonato Eu0.5, Y0.5 2,2-bipyridyl-N,N-dioxide
tris acetylacetonato Eu0.5, Y0.5 phenanthroline
tris acetylacetonato Eu0.5, Y0.5 bathocuproine
tris acetylacetonato Eu0.5, Y0.5 bathophenanthroline
tris dibenzoylmethanato Eu0.5, Y0.5 dimethylaminopyridine
tris dibenzoylmethanato Eu0.5, Y0.5 4-picoline-N-oxide
tris dibenzoylmethanato Eu0.5, Y0.5 4-phenylpyridine
tris dibenzoylmethanato Eu0.5, Y0.5 4-phenylpyridine-N-oxide
tris dibenzoylmethanato Eu0.5, Y0.5 1-methylimidazole
tris dibenzoylmethanato Eu0.5, Y0.5 triphenylphosphine oxide
tris dibenzoylmethanato Eu0.5, Y0.5 2,2-bipyridyl
tris dibenzoylmethanato Eu0.5, Y0.5 2,2-bipyridyl-N,N-dioxide
tris dibenzoylmethanato Eu0.5, Y0.5 phenanthroline
tris dibenzoylmethanato Eu0.5, Y0.5 bathocuproine
tris dibenzoylmethanato Eu0.5, Y0.5 bathophenanthroline
tris thenoyltrifluoroacetonato Eu0.5, Y0.5 dimethylaminopyridine
tris thenoyltrifluoroacetonato Eu0.5, Y0.5 4-picoline-N-oxide
tris thenoyltrifluoroacetonato Eu0.5, Y0.5 4-phenylpyridine
tris thenoyltrifluoroacetonato Eu0.5, Y0.5 4-phenylpyridine-N-oxide
tris thenoyltrifluoroacetonato Eu0.5, Y0.5 1-methylimidazole
tris thenoyltrifluoroacetonato Eu0.5, Y0.5 triphenylphosphine oxide
tris thenoyltrifluoroacetonato Eu0.5, Y0.5 2,2-bipyridyl
tris thenoyltrifluoroacetonato Eu0.5, Y0.5 2,2-bipyridyl-N,N-dioxide
tris thenoyltrifluoroacetonato Eu0.5, Y0.5 phenanthroline
tris thenoyltrifluoroacetonato Eu0.5, Y0.5 bathocuproine
tris thenoyltrifluoroacetonato Eu0.5, Y0.5 bathophenanthroline
tris 2,2,6,6-tetramethylheptanedionato Eu0.5, Y0.5 dimethylaminopyridine
tris 2,2,6,6-tetramethylheptanedionato Eu0.5, Y0.5 4-picoline-N-oxide
tris 2,2,6,6-tetramethylheptanedionato Eu0.5, Y0.5 4-phenylpyridine
tris 2,2,6,6-tetramethylheptanedionato Eu0.5, Y0.5 4-phenylpyridine-N-oxide
tris 2,2,6,6-tetramethylheptanedionato Eu0.5, Y0.5 1-methylimidazole
tris 2,2,6,6-tetramethylheptanedionato Eu0.5, Y0.5 triphenylphosphine oxide
tris 2,2,6,6-tetramethylheptanedionato Eu0.5, Y0.5 2,2-bipyridyl
tris 2,2,6,6-tetramethylheptanedionato Eu0.5, Y0.5 2,2-bipyridyl-N,N-dioxide
tris 2,2,6,6-tetramethylheptanedionato Eu0.5, Y0.5 phenanthroline
tris 2,2,6,6-tetramethylheptanedionato Eu0.5, Y0.5 bathocuproine
tris 2,2,6,6-tetramethylheptanedionato Eu0.5, Y0.5 bathophenanthroline
tris 3-methylpentane-2,4-dionato Eu0.5, Y0.5 dimethylaminopyridine
tris 3-methylpentane-2,4-dionato Eu0.5, Y0.5 4-picoline-N-oxide
tris 3-methylpentane-2,4-dionato Eu0.5, Y0.5 4-phenylpyridine
tris 3-methylpentane-2,4-dionato Eu0.5, Y0.5 4-phenylpyridine-N-oxide
tris 3-methylpentane-2,4-dionato Eu0.5, Y0.5 1-methylimidazole
tris 3-methylpentane-2,4-dionato Eu0.5, Y0.5 triphenylphosphine oxide
tris 3-methylpentane-2,4-dionato Eu0.5, Y0.5 2,2-bipyridyl
tris 3-methylpentane-2,4-dionato Eu0.5, Y0.5 2,2-bipyridyl-N,N-dioxide
tris 3-methylpentane-2,4-dionato Eu0.5, Y0.5 phenanthroline
tris 3-methylpentane-2,4-dionato Eu0.5, Y0.5 bathocuproine
tris 3-methylpentane-2,4-dionato Eu0.5, Y0.5 bathophenanthroline
tris 3-ethylpentane-2,4-dionato Eu0.5, Y0.5 dimethylaminopyridine
tris 3-ethylpentane-2,4-dionato Eu0.5, Y0.5 4-picoline-N-oxide
tris 3-ethylpentane-2,4-dionato Eu0.5, Y0.5 4-phenylpyridine
tris 3-ethylpentane-2,4-dionato Eu0.5, Y0.5 4-phenylpyridine-N-oxide
tris 3-ethylpentane-2,4-dionato Eu0.5, Y0.5 1-methylimidazole
tris 3-ethylpentane-2,4-dionato Eu0.5, Y0.5 triphenylphosphine oxide
tris 3-ethylpentane-2,4-dionato Eu0.5, Y0.5 2,2-bipyridyl
tris 3-ethylpentane-2,4-dionato Eu0.5, Y0.5 2,2-bipyridyl-N,N-dioxide
tris 3-ethylpentane-2,4-dionato Eu0.5, Y0.5 phenanthroline
tris 3-ethylpentane-2,4-dionato Eu0.5, Y0.5 bathocuproine
tris 3-ethylpentane-2,4-dionato Eu0.5, Y0.5 bathophenanthroline
tris pivaloyltrifluoroacetonato Eu0.5, Y0.5 dimethylaminopyridine
tris pivaloyltrifluoroacetonato Eu0.5, Y0.5 4-picoline-N-oxide tris pivaloyltrifluoroacetonato Eu0.5, Y0.5 4-phenylpyridine
tris pivaloyltrifluoroacetonato Eu0.5, Y0.5 4-phenylpyridine-N-oxide
tris pivaloyltrifluoroacetonato Eu0.5, Y0.5 1-methylimidazole
tris pivaloyltrifluoroacetonato Eu0.5, Y0.5 triphenylphosphine oxide
tris pivaloyltrifluoroacetonato Eu0.5, Y0.5 2,2-bipyridyl
tris pivaloyltrifluoroacetonato Eu0.5, Y0.5 2,2-bipyridyl-N,N-dioxide
tris pivaloyltrifluoroacetonato Eu0.5, Y0.5 phenanthroline
tris pivaloyltrifluoroacetonato Eu0.5, Y0.5 bathocuproine
tris pivaloyltrifluoroacetonato Eu0.5, Y0.5 bathophenanthroline
tris trifluoroacetylacetonato Eu0.5, Y0.5 dimethylaminopyridine
tris trifluoroacetylacetonato Eu0.5, Y0.5 4-picoline-N-oxide
tris trifluoroacetylacetonato Eu0.5, Y0.5 4-phenylpyridine
tris trifluoroacetylacetonato Eu0.5, Y0.5 4-phenylpyridine-N-oxide
tris trifluoroacetylacetonato Eu0.5, Y0.5 1-methylimidazole
tris trifluoroacetylacetonato Eu0.5, Y0.5 triphenylphosphine oxide
tris trifluoroacetylacetonato Eu0.5, Y0.5 2,2-bipyridyl
tris trifluoroacetylacetonato Eu0.5, Y0.5 2,2-bipyridyl-N,N-dioxide
tris trifluoroacetylacetonato Eu0.5, Y0.5 phenanthroline
tris trifluoroacetylacetonato Eu0.5, Y0.5 bathocuproine
tris trifluoroacetylacetonato Eu0.5, Y0.5 bathophenanthroline
tris hexafluoroacetylacetonato Eu0.5, Y0.5 dimethylaminopyridine
tris hexafluoroacetylacetonato Eu0.5, Y0.5 4-picoline-N-oxide
tris hexafluoroacetylacetonato Eu0.5, Y0.5 4-phenylpyridine
tris hexafluoroacetylacetonato Eu0.5, Y0.5 4-phenylpyridine-N-oxide
tris hexafluoroacetylacetonato Eu0.5, Y0.5 1-methylimidazole
tris hexafluoroacetylacetonato Eu0.5, Y0.5 triphenylphosphine oxide
tris hexafluoroacetylacetonato Eu0.5, Y0.5 2,2-bipyridyl
tris hexafluoroacetylacetonato Eu0.5, Y0.5 2,2-bipyridyl-N,N-dioxide
tris hexafluoroacetylacetonato Eu0.5, Y0.5 phenanthroline
tris hexafluoroacetylacetonato Eu0.5, Y0.5 bathocuproine
tris hexafluoroacetylacetonato Eu0.5, Y0.5 bathophenanthroline
tris 6,6,7,7,8,8,8-heptafluoro-2,2-dimethyloctanedionato Eu0.5, Y0.5 dimethylaminopyridine
tris 6,6,7,7,8,8,8-heptafluoro-2,2-dimethyloctanedionato Eu0.5, Y0.5 4-picoline-N-oxide
tris 6,6,7,7,8,8,8-heptafluoro-2,2-dimethyloctanedionato Eu0.5, Y0.5 4-phenylpyridine
tris 6,6,7,7,8,8,8-heptafluoro-2,2-dimethyloctanedionato Eu0.5, Y0.5 4-phenylpyridine-N-oxide
tris 6,6,7,7,8,8,8-heptafluoro-2,2-dimethyloctanedionato Eu0.5, Y0.5 1-methylimidazole
tris 6,6,7,7,8,8,8-heptafluoro-2,2-dimethyloctanedionato Eu0.5, Y0.5 triphenylphosphine oxide
tris 6,6,7,7,8,8,8-heptafluoro-2,2-dimethyloctanedionato Eu0.5, Y0.5 2,2-bipyridyl
tris 6,6,7,7,8,8,8-heptafluoro-2,2-dimethyloctanedionato Eu0.5, Y0.5 2,2-bipyridyl-N,N-dioxide
tris 6,6,7,7,8,8,8-heptafluoro-2,2-dimethyloctanedionato Eu0.5, Y0.5 phenanthroline
tris 6,6,7,7,8,8,8-heptafluoro-2,2-dimethyloctanedionato Eu0.5, Y0.5 bathocuproine
tris 6,6,7,7,8,8,8-heptafluoro-2,2-dimethyloctanedionato Eu0.5, Y0.5 bathophenanthroline
tris 1-phenyl-1,3-butanedionato Eu0.5, Y0.5 dimethylaminopyridine
tris 1-phenyl-1,3-butanedionato Eu0.5, Y0.5 4-picoline-N-oxide
tris 1-phenyl-1,3-butanedionato Eu0.5, Y0.5 4-phenylpyridine
tris 1-phenyl-1,3-butanedionato Eu0.5, Y0.5 4-phenylpyridine-N-oxide
tris 1-phenyl-1,3-butanedionato Eu0.5, Y0.5 1-methylimidazole
tris 1-phenyl-1,3-butanedionato Eu0.5, Y0.5 triphenylphosphine oxide
tris 1-phenyl-1,3-butanedionato Eu0.5, Y0.5 2,2-bipyridyl
tris 1-phenyl-1,3-butanedionato Eu0.5, Y0.5 2,2-bipyridyl-N,N-dioxide
tris 1-phenyl-1,3-butanedionato Eu0.5, Y0.5 phenanthroline
tris 1-phenyl-1,3-butanedionato Eu0.5, Y0.5 bathocuproine
tris 1-phenyl-1,3-butanedionato Eu0.5, Y0.5 bathophenanthroline
tris acetylacetonato Eu0.2, Y0.8 dimethylaminopyridine
tris acetylacetonato Eu0.2, Y0.8 4-picoline-N-oxide
tris acetylacetonato Eu0.2, Y0.8 4-phenylpyridine
tris acetylacetonato Eu0.2, Y0.8 4-phenylpyridine-N-oxide
tris acetylacetonato Eu0.2, Y0.8 1-methylimidazole
tris acetylacetonato Eu0.2, Y0.8 triphenylphosphine oxide
tris acetylacetonato Eu0.2, Y0.8 2,2-bipyridyl
tris acetylacetonato Eu0.2, Y0.8 2,2-bipyridyl-N,N-dioxide
tris acetylacetonato Eu0.2, Y0.8 phenanthroline
tris acetylacetonato Eu0.2, Y0.8 bathocuproine
tris acetylacetonato Eu0.2, Y0.8 bathophenanthroline
tris dibenzoylmethanato Eu0.2, Y0.8 dimethylaminopyridine
tris dibenzoylmethanato Eu0.2, Y0.8 4-picoline-N-oxide
tris dibenzoylmethanato Eu0.2, Y0.8 4-phenylpyridine
tris dibenzoylmethanato Eu0.2, Y0.8 4-phenylpyridine-N-oxide
tris dibenzoylmethanato Eu0.2, Y0.8 1-methylimidazole
tris dibenzoylmethanato Eu0.2, Y0.8 triphenylphosphine oxide
tris dibenzoylmethanato Eu0.2, Y0.8 2,2-bipyridyl
tris dibenzoylmethanato Eu0.2, Y0.8 2,2-bipyridyl-N,N-dioxide
tris dibenzoylmethanato Eu0.2, Y0.8 phenanthroline
tris dibenzoylmethanato Eu0.2, Y0.8 bathocuproine
tris dibenzoylmethanato Eu0.2, Y0.8 bathophenanthroline
tris thenoyltrifluoroacetonato Eu0.2, Y0.8 dimethylaminopyridine
tris thenoyltrifluoroacetonato Eu0.2, Y0.8 4-picoline-N-oxide
tris thenoyltrifluoroacetonato Eu0.2, Y0.8 4-phenylpyridine
tris thenoyltrifluoroacetonato Eu0.2, Y0.8 4-phenylpyridine-N-oxide
tris thenoyltrifluoroacetonato Eu0.2, Y0.8 1-methylimidazole
tris thenoyltrifluoroacetonato Eu0.2, Y0.8 triphenylphosphine oxide
tris thenoyltrifluoroacetonato Eu0.2, Y0.8 2,2-bipyridyl
tris thenoyltrifluoroacetonato Eu0.2, Y0.8 2,2-bipyridyl-N,N-dioxide
tris thenoyltrifluoroacetonato Eu0.2, Y0.8 phenanthroline
tris thenoyltrifluoroacetonato Eu0.2, Y0.8 bathocuproine
tris thenoyltrifluoroacetonato Eu0.2, Y0.8 bathophenanthroline tris 2,2,6,6-tetramethylheptanedionato Eu0.2, Y0.8 dimethylaminopyridine
tris 2,2,6,6-tetramethylheptanedionato Eu0.2, Y0.8 4-picoline-N-oxide
tris 2,2,6,6-tetramethylheptanedionato Eu0.2, Y0.8 4-phenylpyridine
tris 2,2,6,6-tetramethylheptanedionato Eu0.2, Y0.8 4-phenylpyridine-N-oxide
tris 2,2,6,6-tetramethylheptanedionato Eu0.2, Y0.8 1-methylimidazole
tris 2,2,6,6-tetramethylheptanedionato Eu0.2, Y0.8 triphenylphosphine oxide
tris 2,2,6,6-tetramethylheptanedionato Eu0.2, Y0.8 2,2-bipyridyl
tris 2,2,6,6-tetramethylheptanedionato Eu0.2, Y0.8 2,2-bipyridyl-N,N-dioxide
tris 2,2,6,6-tetramethylheptanedionato Eu0.2, Y0.8 phenanthroline
tris 2,2,6,6-tetramethylheptanedionato Eu0.2, Y0.8 bathocuproine
tris 2,2,6,6-tetramethylheptanedionato Eu0.2, Y0.8 bathophenanthroline
tris 3-methylpentane-2,4-dionato Eu0.2, Y0.8 dimethylaminopyridine
tris 3-methylpentane-2,4-dionato Eu0.2, Y0.8 4-picoline-N-oxide
tris 3-methylpentane-2,4-dionato Eu0.2, Y0.8 4-phenylpyridine
tris 3-methylpentane-2,4-dionato Eu0.2, Y0.8 4-phenylpyridine-N-oxide
tris 3-methylpentane-2,4-dionato Eu0.2, Y0.8 1-methylimidazole
tris 3-methylpentane-2,4-dionato Eu0.2, Y0.8 triphenylphosphine oxide
tris 3-methylpentane-2,4-dionato Eu0.2, Y0.8 2,2-bipyridyl
tris 3-methylpentane-2,4-dionato Eu0.2, Y0.8 2,2-bipyridyl-N,N-dioxide
tris 3-methylpentane-2,4-dionato Eu0.2, Y0.8 phenanthroline
tris 3-methylpentane-2,4-dionato Eu0.2, Y0.8 bathocuproine
tris 3-methylpentane-2,4-dionato Eu0.2, Y0.8 bathophenanthroline
tris 3-ethylpentane-2,4-dionato Eu0.2, Y0.8 dimethylaminopyridine
tris 3-ethylpentane-2,4-dionato Eu0.2, Y0.8 4-picoline-N-oxide
tris 3-ethylpentane-2,4-dionato Eu0.2, Y0.8 4-phenylpyridine
tris 3-ethylpentane-2,4-dionato Eu0.2, Y0.8 4-phenylpyridine-N-oxide
tris 3-ethylpentane-2,4-dionato Eu0.2, Y0.8 1-methylimidazole
tris 3-ethylpentane-2,4-dionato Eu0.2, Y0.8 triphenylphosphine oxide
tris 3-ethylpentane-2,4-dionato Eu0.2, Y0.8 2,2-bipyridyl
tris 3-ethylpentane-2,4-dionato Eu0.2, Y0.8 2,2-bipyridyl-N,N-dioxide
tris 3-ethylpentane-2,4-dionato Eu0.2, Y0.8 phenanthroline
tris 3-ethylpentane-2,4-dionato Eu0.2, Y0.8 bathocuproine
tris 3-ethylpentane-2,4-dionato Eu0.2, Y0.8 bathophenanthroline
tris pivaloyltrifluoroacetonato Eu0.2, Y0.8 dimethylaminopyridine
tris pivaloyltrifluoroacetonato Eu0.2, Y0.8 4-picoline-N-oxide
tris pivaloyltrifluoroacetonato Eu0.2, Y0.8 4-phenylpyridine
tris pivaloyltrifluoroacetonato Eu0.2, Y0.8 4-phenylpyridine-N-oxide
tris pivaloyltrifluoroacetonato Eu0.2, Y0.8 1-methylimidazole
tris pivaloyltrifluoroacetonato Eu0.2, Y0.8 triphenylphosphine oxide
tris pivaloyltrifluoroacetonato Eu0.2, Y0.8 2,2-bipyridyl
tris pivaloyltrifluoroacetonato Eu0.2, Y0.8 2,2-bipyridyl-N,N-dioxide
tris pivaloyltrifluoroacetonato Eu0.2, Y0.8 phenanthroline
tris pivaloyltrifluoroacetonato Eu0.2, Y0.8 bathocuproine
tris pivaloyltrifluoroacetonato Eu0.2, Y0.8 bathophenanthroline
tris trifluoroacetylacetonato Eu0.2, Y0.8 dimethylaminopyridine
tris trifluoroacetylacetonato Eu0.2, Y0.8 4-picoline-N-oxide
tris trifluoroacetylacetonato Eu0.2, Y0.8 4-phenylpyridine
tris trifluoroacetylacetonato Eu0.2, Y0.8 4-phenylpyridine-N-oxide
tris trifluoroacetylacetonato Eu0.2, Y0.8 1-methylimidazole
tris trifluoroacetylacetonato Eu0.2, Y0.8 triphenylphosphine oxide
tris trifluoroacetylacetonato Eu0.2, Y0.8 2,2-bipyridyl
tris trifluoroacetylacetonato Eu0.2, Y0.8 2,2-bipyridyl-N,N-dioxide
tris trifluoroacetylacetonato Eu0.2, Y0.8 phenanthroline
tris trifluoroacetylacetonato Eu0.2, Y0.8 bathocuproine
tris trifluoroacetylacetonato Eu0.2, Y0.8 bathophenanthroline
tris hexafluoroacetylacetonato Eu0.2, Y0.8 dimethylaminopyridine
tris hexafluoroacetylacetonato Eu0.2, Y0.8 4-picoline-N-oxide
tris hexafluoroacetylacetonato Eu0.2, Y0.8 4-phenylpyridine
tris hexafluoroacetylacetonato Eu0.2, Y0.8 4-phenylpyridine-N-oxide
tris hexafluoroacetylacetonato Eu0.2, Y0.8 1-methylimidazole
tris hexafluoroacetylacetonato Eu0.2, Y0.8 triphenylphosphine oxide
tris hexafluoroacetylacetonato Eu0.2, Y0.8 2,2-bipyridyl
tris hexafluoroacetylacetonato Eu0.2, Y0.8 2,2-bipyridyl-N,N-dioxide
tris hexafluoroacetylacetonato Eu0.2, Y0.8 phenanthroline
tris hexafluoroacetylacetonato Eu0.2, Y0.8 bathocuproine
tris hexafluoroacetylacetonato Eu0.2, Y0.8 bathophenanthroline
tris 6,6,7,7,8,8,8-heptafluoro-2,2-dimethyloctanedionato Eu0.2, Y0.8 dimethylaminopyridine
tris 6,6,7,7,8,8,8-heptafluoro-2,2-dimethyloctanedionato Eu0.2, Y0.8 4-picoline-N-oxide
tris 6,6,7,7,8,8,8-heptafluoro-2,2-dimethyloctanedionato Eu0.2, Y0.8 4-phenylpyridine
tris 6,6,7,7,8,8,8-heptafluoro-2,2-dimethyloctanedionato Eu0.2, Y0.8 4-phenylpyridine-N-oxide
tris 6,6,7,7,8,8,8-heptafluoro-2,2-dimethyloctanedionato Eu0.2, Y0.8 1-methylimidazole
tris 6,6,7,7,8,8,8-heptafluoro-2,2-dimethyloctanedionato Eu0.2, Y0.8 triphenylphosphine oxide
tris 6,6,7,7,8,8,8-heptafluoro-2,2-dimethyloctanedionato Eu0.2, Y0.8 2,2-bipyridyl
tris 6,6,7,7,8,8,8-heptafluoro-2,2-dimethyloctanedionato Eu0.2, Y0.8 2,2-bipyridyl-N,N-dioxide
tris 6,6,7,7,8,8,8-heptafluoro-2,2-dimethyloctanedionato Eu0.2, Y0.8 phenanthroline tris 6,6,7,7,8,8,8-heptafluoro-2,2-dimethyloctanedionato Eu0.2, Y0.8 bathocuproine
tris 6,6,7,7,8,8,8-heptafluoro-2,2-dimethyloctanedionato Eu0.2, Y0.8 bathophenanthroline
tris 1-phenyl-1,3-butanedionato Eu0.2, Y0.8 dimethylaminopyridine
tris 1-phenyl-1,3-butanedionato Eu0.2, Y0.8 4-picoline-N-oxide
tris 1-phenyl-1,3-butanedionato Eu0.2, Y0.8 4-phenylpyridine
tris 1-phenyl-1,3-butanedionato Eu0.2, Y0.8 4-phenylpyridine-N-oxide
tris 1-phenyl-1,3-butanedionato Eu0.2, Y0.8 1-methylimidazole
tris 1-phenyl-1,3-butanedionato Eu0.2, Y0.8 triphenylphosphine oxide
tris 1-phenyl-1,3-butanedionato Eu0.2, Y0.8 2,2-bipyridyl
tris 1-phenyl-1,3-butanedionato Eu0.2, Y0.8 2,2-bipyridyl-N,N-dioxide
tris 1-phenyl-1,3-butanedionato Eu0.2, Y0.8 phenanthroline
tris 1-phenyl-1,3-butanedionato Eu0.2, Y0.8 bathocuproine
tris 1-phenyl-1,3-butanedionato Eu0.2, Y0.8 bathophenanthroline
tris acetylacetonato Eu0.1, Y0.9 dimethylaminopyridine
tris acetylacetonato Eu0.1, Y0.9 4-picoline-N-oxide
tris acetylacetonato Eu0.1, Y0.9 4-phenylpyridine
tris acetylacetonato Eu0.1, Y0.9 4-phenylpyridine-N-oxide
tris acetylacetonato Eu0.1, Y0.9 1-methylimidazole
tris acetylacetonato Eu0.1, Y0.9 triphenylphosphine oxide
tris acetylacetonato Eu0.1, Y0.9 2,2-bipyridyl
tris acetylacetonato Eu0.1, Y0.9 2,2-bipyridyl-N,N-dioxide
tris acetylacetonato Eu0.1, Y0.9 phenanthroline
tris acetylacetonato Eu0.1, Y0.9 bathocuproine
tris acetylacetonato Eu0.1, Y0.9 bathophenanthroline
tris dibenzoylmethanato Eu0.1, Y0.9 dimethylaminopyridine
tris dibenzoylmethanato Eu0.1, Y0.9 4-picoline-N-oxide
tris dibenzoylmethanato Eu0.1, Y0.9 4-phenylpyridine
tris dibenzoylmethanato Eu0.1, Y0.9 4-phenylpyridine-N-oxide
tris dibenzoylmethanato Eu0.1, Y0.9 1-methylimidazole
tris dibenzoylmethanato Eu0.1, Y0.9 triphenylphosphine oxide
tris dibenzoylmethanato Eu0.1, Y0.9 2,2-bipyridyl
tris dibenzoylmethanato Eu0.1, Y0.9 2,2-bipyridyl-N,N-dioxide
tris dibenzoylmethanato Eu0.1, Y0.9 phenanthroline
tris dibenzoylmethanato Eu0.1, Y0.9 bathocuproine
tris dibenzoylmethanato Eu0.1, Y0.9 bathophenanthroline
tris thenoyltrifluoroacetonato Eu0.1, Y0.9 dimethylaminopyridine
tris thenoyltrifluoroacetonato Eu0.1, Y0.9 4-picoline-N-oxide
tris thenoyltrifluoroacetonato Eu0.1, Y0.9 4-phenylpyridine
tris thenoyltrifluoroacetonato Eu0.1, Y0.9 4-phenylpyridine-N-oxide
tris thenoyltrifluoroacetonato Eu0.1, Y0.9 1-methylimidazole
tris thenoyltrifluoroacetonato Eu0.1, Y0.9 triphenylphosphine oxide
tris thenoyltrifluoroacetonato Eu0.1, Y0.9 2,2-bipyridyl
tris thenoyltrifluoroacetonato Eu0.1, Y0.9 2,2-bipyridyl-N,N-dioxide
tris thenoyltrifluoroacetonato Eu0.1, Y0.9 phenanthroline
tris thenoyltrifluoroacetonato Eu0.1, Y0.9 bathocuproine
tris thenoyltrifluoroacetonato Eu0.1, Y0.9 bathophenanthroline
tris 2,2,6,6-tetramethylheptanedionato Eu0.1, Y0.9 dimethylaminopyridine
tris 2,2,6,6-tetramethylheptanedionato Eu0.1, Y0.9 4-picoline-N-oxide
tris 2,2,6,6-tetramethylheptanedionato Eu0.1, Y0.9 4-phenylpyridine
tris 2,2,6,6-tetramethylheptanedionato Eu0.1, Y0.9 4-phenylpyridine-N-oxide
tris 2,2,6,6-tetramethylheptanedionato Eu0.1, Y0.9 1-methylimidazole
tris 2,2,6,6-tetramethylheptanedionato Eu0.1, Y0.9 triphenylphosphine oxide
tris 2,2,6,6-tetramethylheptanedionato Eu0.1, Y0.9 2,2-bipyridyl
tris 2,2,6,6-tetramethylheptanedionato Eu0.1, Y0.9 2,2-bipyridyl-N,N-dioxide
tris 2,2,6,6-tetramethylheptanedionato Eu0.1, Y0.9 phenanthroline
tris 2,2,6,6-tetramethylheptanedionato Eu0.1, Y0.9 bathocuproine
tris 2,2,6,6-tetramethylheptanedionato Eu0.1, Y0.9 bathophenanthroline
tris 3-methylpentane-2,4-dionato Eu0.1, Y0.9 dimethylaminopyridine
tris 3-methylpentane-2,4-dionato Eu0.1, Y0.9 4-picoline-N-oxide
tris 3-methylpentane-2,4-dionato Eu0.1, Y0.9 4-phenylpyridine
tris 3-methylpentane-2,4-dionato Eu0.1, Y0.9 4-phenylpyridine-N-oxide
tris 3-methylpentane-2,4-dionato Eu0.1, Y0.9 1-methylimidazole
tris 3-methylpentane-2,4-dionato Eu0.1, Y0.9 triphenylphosphine oxide
tris 3-methylpentane-2,4-dionato Eu0.1, Y0.9 2,2-bipyridyl
tris 3-methylpentane-2,4-dionato Eu0.1, Y0.9 2,2-bipyridyl-N,N-dioxide
tris 3-methylpentane-2,4-dionato Eu0.1, Y0.9 phenanthroline
tris 3-methylpentane-2,4-dionato Eu0.1, Y0.9 bathocuproine
tris 3-methylpentane-2,4-dionato Eu0.1, Y0.9 bathophenanthroline
tris 3-ethylpentane-2,4-dionato Eu0.1, Y0.9 dimethylaminopyridine
tris 3-ethylpentane-2,4-dionato Eu0.1, Y0.9 4-picoline-N-oxide
tris 3-ethylpentane-2,4-dionato Eu0.1, Y0.9 4-phenylpyridine
tris 3-ethylpentane-2,4-dionato Eu0.1, Y0.9 4-phenylpyridine-N-oxide
tris 3-ethylpentane-2,4-dionato Eu0.1, Y0.9 1-methylimidazole
tris 3-ethylpentane-2,4-dionato Eu0.1, Y0.9 triphenylphosphine oxide
tris 3-ethylpentane-2,4-dionato Eu0.1, Y0.9 2,2-bipyridyl
tris 3-ethylpentane-2,4-dionato Eu0.1, Y0.9 2,2-bipyridyl-N,N-dioxide
tris 3-ethylpentane-2,4-dionato Eu0.1, Y0.9 phenanthroline
tris 3-ethylpentane-2,4-dionato Eu0.1, Y0.9 bathocuproine
tris 3-ethylpentane-2,4-dionato Eu0.1, Y0.9 bathophenanthroline
tris pivaloyltrifluoroacetonato Eu0.1, Y0.9 dimethylaminopyridine
tris pivaloyltrifluoroacetonato Eu0.1, Y0.9 4-picoline-N-oxide
tris pivaloyltrifluoroacetonato Eu0.1, Y0.9 4-phenylpyridine tris pivaloyltrifluoroacetonato Eu0.1, Y0.9 4-phenylpyridine-N-oxide
tris pivaloyltrifluoroacetonato Eu0.1, Y0.9 1-methylimidazole
tris pivaloyltrifluoroacetonato Eu0.1, Y0.9 triphenylphosphine oxide
tris pivaloyltrifluoroacetonato Eu0.1, Y0.9 2,2-bipyridyl
tris pivaloyltrifluoroacetonato Eu0.1, Y0.9 2,2-bipyridyl-N,N-dioxide
tris pivaloyltrifluoroacetonato Eu0.1, Y0.9 phenanthroline
tris pivaloyltrifluoroacetonato Eu0.1, Y0.9 bathocuproine
tris pivaloyltrifluoroacetonato Eu0.1, Y0.9 bathophenanthroline
tris trifluoroacetylacetonato Eu0.1, Y0.9 dimethylaminopyridine
tris trifluoroacetylacetonato Eu0.1, Y0.9 4-picoline-N-oxide
tris trifluoroacetylacetonato Eu0.1, Y0.9 4-phenylpyridine
tris trifluoroacetylacetonato Eu0.1, Y0.9 4-phenylpyridine-N-oxide
tris trifluoroacetylacetonato Eu0.1, Y0.9 1-methylimidazole
tris trifluoroacetylacetonato Eu0.1, Y0.9 triphenylphosphine oxide
tris trifluoroacetylacetonato Eu0.1, Y0.9 2,2-bipyridyl
tris trifluoroacetylacetonato Eu0.1, Y0.9 2,2-bipyridyl-N,N-dioxide
tris trifluoroacetylacetonato Eu0.1, Y0.9 phenanthroline
tris trifluoroacetylacetonato Eu0.1, Y0.9 bathocuproine
tris trifluoroacetylacetonato Eu0.1, Y0.9 bathophenanthroline
tris hexafluoroacetylacetonato Eu0.1, Y0.9 dimethylaminopyridine
tris hexafluoroacetylacetonato Eu0.1, Y0.9 4-picoline-N-oxide
tris hexafluoroacetylacetonato Eu0.1, Y0.9 4-phenylpyridine
tris hexafluoroacetylacetonato Eu0.1, Y0.9 4-phenylpyridine-N-oxide
tris hexafluoroacetylacetonato Eu0.1, Y0.9 1-methylimidazole
tris hexafluoroacetylacetonato Eu0.1, Y0.9 triphenylphosphine oxide
tris hexafluoroacetylacetonato Eu0.1, Y0.9 2,2-bipyridyl
tris hexafluoroacetylacetonato Eu0.1, Y0.9 2,2-bipyridyl-N,N-dioxide
tris hexafluoroacetylacetonato Eu0.1, Y0.9 phenanthroline
tris hexafluoroacetylacetonato Eu0.1, Y0.9 bathocuproine
tris hexafluoroacetylacetonato Eu0.1, Y0.9 bathophenanthroline
tris 6,6,7,7,8,8,8-heptafluoro-2,2-dimethyloctanedionato Eu0.1, Y0.9 dimethylaminopyridine
tris 6,6,7,7,8,8,8-heptafluoro-2,2-dimethyloctanedionato Eu0.1, Y0.9 4-picoline-N-oxide
tris 6,6,7,7,8,8,8-heptafluoro-2,2-dimethyloctanedionato Eu0.1, Y0.9 4-phenylpyridine
tris 6,6,7,7,8,8,8-heptafluoro-2,2-dimethyloctanedionato Eu0.1, Y0.9 4-phenylpyridine-N-oxide
tris 6,6,7,7,8,8,8-heptafluoro-2,2-dimethyloctanedionato Eu0.1, Y0.9 1-methylimidazole
tris 6,6,7,7,8,8,8-heptafluoro-2,2-dimethyloctanedionato Eu0.1, Y0.9 triphenylphosphine oxide
tris 6,6,7,7,8,8,8-heptafluoro-2,2-dimethyloctanedionato Eu0.1, Y0.9 2,2-bipyridyl
tris 6,6,7,7,8,8,8-heptafluoro-2,2-dimethyloctanedionato Eu0.1, Y0.9 2,2-bipyridyl-N,N-dioxide
tris 6,6,7,7,8,8,8-heptafluoro-2,2-dimethyloctanedionato Eu0.1, Y0.9 phenanthroline
tris 6,6,7,7,8,8,8-heptafluoro-2,2-dimethyloctanedionato Eu0.1, Y0.9 bathocuproine
tris 6,6,7,7,8,8,8-heptafluoro-2,2-dimethyloctanedionato Eu0.1, Y0.9 bathophenanthroline
tris 1-phenyl-1,3-butanedionato Eu0.1, Y0.9 dimethylaminopyridine
tris 1-phenyl-1,3-butanedionato Eu0.1, Y0.9 4-picoline-N-oxide
tris 1-phenyl-1,3-butanedionato Eu0.1, Y0.9 4-phenylpyridine
tris 1-phenyl-1,3-butanedionato Eu0.1, Y0.9 4-phenylpyridine-N-oxide
tris 1-phenyl-1,3-butanedionato Eu0.1, Y0.9 1-methylimidazole
tris 1-phenyl-1,3-butanedionato Eu0.1, Y0.9 triphenylphosphine oxide
tris 1-phenyl-1,3-butanedionato Eu0.1, Y0.9 2,2-bipyridyl
tris 1-phenyl-1,3-butanedionato Eu0.1, Y0.9 2,2-bipyridyl-N,N-dioxide
tris 1-phenyl-1,3-butanedionato Eu0.1, Y0.9 phenanthroline
tris 1-phenyl-1,3-butanedionato Eu0.1, Y0.9 bathocuproine
tris 1-phenyl-1,3-butanedionato Eu0.1, Y0.9 bathophenanthroline
tris acetylacetonato Eu0.01, Y0.99 dimethylaminopyridine
tris acetylacetonato Eu0.01, Y0.99 4-picoline-N-oxide
tris acetylacetonato Eu0.01, Y0.99 4-phenylpyridine
tris acetylacetonato Eu0.01, Y0.99 4-phenylpyridine-N-oxide
tris acetylacetonato Eu0.01, Y0.99 1-methylimidazole
tris acetylacetonato Eu0.01, Y0.99 triphenylphosphine oxide
tris acetylacetonato Eu0.01, Y0.99 2,2-bipyridyl
tris acetylacetonato Eu0.01, Y0.99 2,2-bipyridyl-N,N-dioxide
tris acetylacetonato Eu0.01, Y0.99 phenanthroline
tris acetylacetonato Eu0.01, Y0.99 bathocuproine
tris acetylacetonato Eu0.01, Y0.99 bathophenanthroline
tris dibenzoylmethanato Eu0.01, Y0.99 dimethylaminopyridine
tris dibenzoylmethanato Eu0.01, Y0.99 4-picoline-N-oxide
tris dibenzoylmethanato Eu0.01, Y0.99 4-phenylpyridine
tris dibenzoylmethanato Eu0.01, Y0.99 4-phenylpyridine-N-oxide
tris dibenzoylmethanato Eu0.01, Y0.99 1-methylimidazole
tris dibenzoylmethanato Eu0.01, Y0.99 triphenylphosphine oxide
tris dibenzoylmethanato Eu0.01, Y0.99 2,2-bipyridyl
tris dibenzoylmethanato Eu0.01, Y0.99 2,2-bipyridyl-N,N-dioxide
tris dibenzoylmethanato Eu0.01, Y0.99 phenanthroline
tris dibenzoylmethanato Eu0.01, Y0.99 bathocuproine
tris dibenzoylmethanato Eu0.01, Y0.99 bathophenanthroline
tris thenoyltrifluoroacetonato Eu0.01, Y0.99 dimethylaminopyridine
tris thenoyltrifluoroacetonato Eu0.01, Y0.99 4-picoline-N-oxide
tris thenoyltrifluoroacetonato Eu0.01, Y0.99 4-phenylpyridine
tris thenoyltrifluoroacetonato Eu0.01, Y0.99 4-phenylpyridine-N-oxide
tris thenoyltrifluoroacetonato Eu0.01, Y0.99 1-methylimidazole
tris thenoyltrifluoroacetonato Eu0.01, Y0.99 triphenylphosphine oxide
tris thenoyltrifluoroacetonato Eu0.01, Y0.99 2,2-bipyridyl
tris thenoyltrifluoroacetonato Eu0.01, Y0.99 2,2-bipyridyl-N,N-dioxide
tris thenoyltrifluoroacetonato Eu0.01, Y0.99 phenanthroline tris thenoyltrifluoroacetonato Eu0.01, Y0.99 bathocuproine
tris thenoyltrifluoroacetonato Eu0.01, Y0.99 bathophenanthroline
tris 2,2,6,6-tetramethylheptanedionato Eu0.01, Y0.99 dimethylaminopyridine
tris 2,2,6,6-tetramethylheptanedionato Eu0.01, Y0.99 4-picoline-N-oxide
tris 2,2,6,6-tetramethylheptanedionato Eu0.01, Y0.99 4-phenylpyridine
tris 2,2,6,6-tetramethylheptanedionato Eu0.01, Y0.99 4-phenylpyridine-N-oxide
tris 2,2,6,6-tetramethylheptanedionato Eu0.01, Y0.99 1-methylimidazole
tris 2,2,6,6-tetramethylheptanedionato Eu0.01, Y0.99 triphenylphosphine oxide
tris 2,2,6,6-tetramethylheptanedionato Eu0.01, Y0.99 2,2-bipyridyl
tris 2,2,6,6-tetramethylheptanedionato Eu0.01, Y0.99 2,2-bipyridyl-N,N-dioxide
tris 2,2,6,6-tetramethylheptanedionato Eu0.01, Y0.99 phenanthroline
tris 2,2,6,6-tetramethylheptanedionato Eu0.01, Y0.99 bathocuproine
tris 2,2,6,6-tetramethylheptanedionato Eu0.01, Y0.99 bathophenanthroline
tris 3-methylpentane-2,4-dionato Eu0.01, Y0.99 dimethylaminopyridine
tris 3-methylpentane-2,4-dionato Eu0.01, Y0.99 4-picoline-N-oxide
tris 3-methylpentane-2,4-dionato Eu0.01, Y0.99 4-phenylpyridine
tris 3-methylpentane-2,4-dionato Eu0.01, Y0.99 4-phenylpyridine-N-oxide
tris 3-methylpentane-2,4-dionato Eu0.01, Y0.99 1-methylimidazole
tris 3-methylpentane-2,4-dionato Eu0.01, Y0.99 triphenylphosphine oxide
tris 3-methylpentane-2,4-dionato Eu0.01, Y0.99 2,2-bipyridyl
tris 3-methylpentane-2,4-dionato Eu0.01, Y0.99 2,2-bipyridyl-N,N-dioxide
tris 3-methylpentane-2,4-dionato Eu0.01, Y0.99 phenanthroline
tris 3-methylpentane-2,4-dionato Eu0.01, Y0.99 bathocuproine
tris 3-methylpentane-2,4-dionato Eu0.01, Y0.99 bathophenanthroline
tris 3-ethylpentane-2,4-dionato Eu0.01, Y0.99 dimethylaminopyridine
tris 3-ethylpentane-2,4-dionato Eu0.01, Y0.99 4-picoline-N-oxide
tris 3-ethylpentane-2,4-dionato Eu0.01, Y0.99 4-phenylpyridine
tris 3-ethylpentane-2,4-dionato Eu0.01, Y0.99 4-phenylpyridine-N-oxide
tris 3-ethylpentane-2,4-dionato Eu0.01, Y0.99 1-methylimidazole
tris 3-ethylpentane-2,4-dionato Eu0.01, Y0.99 triphenylphosphine oxide
tris 3-ethylpentane-2,4-dionato Eu0.01, Y0.99 2,2-bipyridyl
tris 3-ethylpentane-2,4-dionato Eu0.01, Y0.99 2,2-bipyridyl-N,N-dioxide
tris 3-ethylpentane-2,4-dionato Eu0.01, Y0.99 phenanthroline
tris 3-ethylpentane-2,4-dionato Eu0.01, Y0.99 bathocuproine
tris 3-ethylpentane-2,4-dionato Eu0.01, Y0.99 bathophenanthroline
tris pivaloyltrifluoroacetonato Eu0.01, Y0.99 dimethylaminopyridine
tris pivaloyltrifluoroacetonato Eu0.01, Y0.99 4-picoline-N-oxide
tris pivaloyltrifluoroacetonato Eu0.01, Y0.99 4-phenylpyridine
tris pivaloyltrifluoroacetonato Eu0.01, Y0.99 4-phenylpyridine-N-oxide
tris pivaloyltrifluoroacetonato Eu0.01, Y0.99 1-methylimidazole
tris pivaloyltrifluoroacetonato Eu0.01, Y0.99 triphenylphosphine oxide
tris pivaloyltrifluoroacetonato Eu0.01, Y0.99 2,2-bipyridyl
tris pivaloyltrifluoroacetonato Eu0.01, Y0.99 2,2-bipyridyl-N,N-dioxide
tris pivaloyltrifluoroacetonato Eu0.01, Y0.99 phenanthroline
tris pivaloyltrifluoroacetonato Eu0.01, Y0.99 bathocuproine
tris pivaloyltrifluoroacetonato Eu0.01, Y0.99 bathophenanthroline
tris trifluoroacetylacetonato Eu0.01, Y0.99 dimethylaminopyridine
tris trifluoroacetylacetonato Eu0.01, Y0.99 4-picoline-N-oxide
tris trifluoroacetylacetonato Eu0.01, Y0.99 4-phenylpyridine
tris trifluoroacetylacetonato Eu0.01, Y0.99 4-phenylpyridine-N-oxide
tris trifluoroacetylacetonato Eu0.01, Y0.99 1-methylimidazole
tris trifluoroacetylacetonato Eu0.01, Y0.99 triphenylphosphine oxide
tris trifluoroacetylacetonato Eu0.01, Y0.99 2,2-bipyridyl
tris trifluoroacetylacetonato Eu0.01, Y0.99 2,2-bipyridyl-N,N-dioxide
tris trifluoroacetylacetonato Eu0.01, Y0.99 phenanthroline
tris trifluoroacetylacetonato Eu0.01, Y0.99 bathocuproine
tris trifluoroacetylacetonato Eu0.01, Y0.99 bathophenanthroline
tris hexafluoroacetylacetonato Eu0.01, Y0.99 dimethylaminopyridine
tris hexafluoroacetylacetonato Eu0.01, Y0.99 4-picoline-N-oxide
tris hexafluoroacetylacetonato Eu0.01, Y0.99 4-phenylpyridine
tris hexafluoroacetylacetonato Eu0.01, Y0.99 4-phenylpyridine-N-oxide
tris hexafluoroacetylacetonato Eu0.01, Y0.99 1-methylimidazole
tris hexafluoroacetylacetonato Eu0.01, Y0.99 triphenylphosphine oxide
tris hexafluoroacetylacetonato Eu0.01, Y0.99 2,2-bipyridyl
tris hexafluoroacetylacetonato Eu0.01, Y0.99 2,2-bipyridyl-N,N-dioxide
tris hexafluoroacetylacetonato Eu0.01, Y0.99 phenanthroline
tris hexafluoroacetylacetonato Eu0.01, Y0.99 bathocuproine
tris hexafluoroacetylacetonato Eu0.01, Y0.99 bathophenanthroline
tris 6,6,7,7,8,8,8-heptafluoro-2,2-dimethyloctanedionato Eu0.01, Y0.99 dimethylaminopyridine
tris 6,6,7,7,8,8,8-heptafluoro-2,2-dimethyloctanedionato Eu0.01, Y0.99 4-picoline-N-oxide
tris 6,6,7,7,8,8,8-heptafluoro-2,2-dimethyloctanedionato Eu0.01, Y0.99 4-phenylpyridine tris 6,6,7,7,8,8,8-heptafluoro-2,2-dimethyloctanedionato Eu0.01, Y0.99 4-phenylpyridine-N-oxide tris 6,6,7,7,8,8,8-heptafluoro-2,2-dimethyloctanedionato Eu0.01, Y0.99 1-methylimidazole tris 6,6,7,7,8,8,8-heptafluoro-2,2-dimethyloctanedionato Eu0.01, Y0.99 triphenylphosphine oxide tris 6,6,7,7,8,8,8-heptafluoro-2,2-dimethyloctanedionato Eu0.01, Y0.99 2,2-bipyridyl tris 6,6,7,7,8,8,8-heptafluoro-2,2-dimethyloctanedionato Eu0.01, Y0.99 2,2-bipyridyl-N,N-dioxide tris 6,6,7,7,8,8,8-heptafluoro-2,2-dimethyloctanedionato Eu0.01, Y0.99 phenanthroline tris 6,6,7,7,8,8,8-heptafluoro-2,2-dimethyloctanedionato Eu0.01, Y0.99 bathocuproine tris 6,6,7,7,8,8,8-heptafluoro-2,2-dimethyloctanedionato Eu0.01, Y0.99 bathophenanthroline tris 1-phenyl-1,3-butanedionato Eu0.01, Y0.99 dimethylaminopyridine tris 1-phenyl-1,3-butanedionato Eu0.01, Y0.99 4-picoline-N-oxide tris 1-phenyl-1,3-butanedionato Eu0.01, Y0.99 4-phenylpyridine tris 1-phenyl-1,3-butanedionato Eu0.01, Y0.99 4-phenylpyridine-N-oxide tris 1-phenyl-1,3-butanedionato Eu0.01, Y0.99 1-methylimidazole tris 1-phenyl-1,3-butanedionato Eu0.01, Y0.99 triphenylphosphine oxide tris 1-phenyl-1,3-butanedionato Eu0.01, Y0.99 2,2-bipyridyl tris 1-phenyl-1,3-butanedionato Eu0.01, Y0.99 2,2-bipyridyl-N,N-dioxide tris 1-phenyl-1,3-butanedionato Eu0.01, Y0.99 phenanthroline tris 1-phenyl-1,3-butanedionato Eu0.01, Y0.99 bathocuproine tris 1-phenyl-1,3-butanedionato Eu0.01, Y0.99 bathophenanthroline tris acetylacetonato Tb0.5, La0.5 dimethylaminopyridine tris acetylacetonato Tb0.5, La0.5 4-picoline-N-oxide tris acetylacetonato Tb0.5, La0.5 4-phenylpyridine tris acetylacetonato Tb0.5, La0.5 4-phenylpyridine-N-oxide tris acetylacetonato Tb0.5, La0.5 1-methylimidazole tris acetylacetonato Tb0.5, La0.5 triphenylphosphine oxide tris acetylacetonato Tb0.5, La0.5 2,2-bipyridyl tris acetylacetonato Tb0.5, La0.5 2,2-bipyridyl-N,N-dioxide tris acetylacetonato Tb0.5, La0.5 phenanthroline tris acetylacetonato Tb0.5, La0.5 bathocuproine tris acetylacetonato Tb0.5, La0.5 bathophenanthroline tris dibenzoylmethanato Tb0.5, La0.5 dimethylaminopyridine tris dibenzoylmethanato Tb0.5, La0.5 4-picoline-N-oxide tris dibenzoylmethanato Tb0.5, La0.5 4-phenylpyridine tris dibenzoylmethanato Tb0.5, La0.5 4-phenylpyridine-N-oxide tris dibenzoylmethanato Tb0.5, La0.5 1-methylimidazole tris dibenzoylmethanato Tb0.5, La0.5 triphenylphosphine oxide tris dibenzoylmethanato Tb0.5, La0.5 2,2-bipyridyl tris dibenzoylmethanato Tb0.5, La0.5 2,2-bipyridyl-N,N-dioxide tris dibenzoylmethanato Tb0.5, La0.5 phenanthroline tris dibenzoylmethanato Tb0.5, La0.5 bathocuproine tris dibenzoylmethanato Tb0.5, La0.5 bathophenanthroline tris thenoyltrifluoroacetonato Tb0.5, La0.5 dimethylaminopyridine tris thenoyltrifluoroacetonato Tb0.5, La0.5 4-picoline-N-oxide tris thenoyltrifluoroacetonato Tb0.5, La0.5 4-phenylpyridine tris thenoyltrifluoroacetonato Tb0.5, La0.5 4-phenylpyridine-N-oxide tris thenoyltrifluoroacetonato Tb0.5, La0.5 1-methylimidazole tris thenoyltrifluoroacetonato Tb0.5, La0.5 triphenylphosphine oxide tris thenoyltrifluoroacetonato Tb0.5, La0.5 2,2-bipyridyl tris thenoyltrifluoroacetonato Tb0.5, La0.5 2,2-bipyridyl-N,N-dioxide tris thenoyltrifluoroacetonato Tb0.5, La0.5 phenanthroline tris thenoyltrifluoroacetonato Tb0.5, La0.5 bathocuproine tris thenoyltrifluoroacetonato Tb0.5, La0.5 bathophenanthroline tris 2,2,6,6-tetramethylheptanedionato Tb0.5, La0.5 dimethylaminopyridine tris 2,2,6,6-tetramethylheptanedionato Tb0.5, La0.5 4-picoline-N-oxide tris 2,2,6,6-tetramethylheptanedionato Tb0.5, La0.5 4-phenylpyridine tris 2,2,6,6-tetramethylheptanedionato Tb0.5, La0.5 4-phenylpyridine-N-oxide tris 2,2,6,6-tetramethylheptanedionato Tb0.5, La0.5 1-methylimidazole tris 2,2,6,6-tetramethylheptanedionato Tb0.5, La0.5 triphenylphosphine oxide tris 2,2,6,6-tetramethylheptanedionato Tb0.5, La0.5 2,2-bipyridyl tris 2,2,6,6-tetramethylheptanedionato Tb0.5, La0.5 2,2-bipyridyl-N,N-dioxide tris 2,2,6,6-tetramethylheptanedionato Tb0.5, La0.5 phenanthroline tris 2,2,6,6-tetramethylheptanedionato Tb0.5, La0.5 bathocuproine tris 2,2,6,6-tetramethylheptanedionato Tb0.5, La0.5 bathophenanthroline tris 3-methylpentane-2,4-dionato Tb0.5, La0.5 dimethylaminopyridine tris 3-methylpentane-2,4-dionato Tb0.5, La0.5 4-picoline-N-oxide tris 3-methylpentane-2,4-dionato Tb0.5, La0.5 4-phenylpyridine tris 3-methylpentane-2,4-dionato Tb0.5, La0.5 4-phenylpyridine-N-oxide tris 3-methylpentane-2,4-dionato Tb0.5, La0.5 1-methylimidazole tris 3-methylpentane-2,4-dionato Tb0.5, La0.5 triphenylphosphine oxide tris 3-methylpentane-2,4-dionato Tb0.5, La0.5 2,2-bipyridyl tris 3-methylpentane-2,4-dionato Tb0.5, La0.5 2,2-bipyridyl-N,N-dioxide tris 3-methylpentane-2,4-dionato Tb0.5, La0.5 phenanthroline tris 3-methylpentane-2,4-dionato Tb0.5, La0.5 bathocuproine tris 3-methylpentane-2,4-dionato Tb0.5, La0.5 bathophenanthroline tris 3-ethylpentane-2,4-dionato Tb0.5, La0.5 dimethylaminopyridine tris 3-ethylpentane-2,4-dionato Tb0.5, La0.5 4-picoline-N-oxide tris 3-ethylpentane-2,4-dionato Tb0.5, La0.5 4-phenylpyridine tris 3-ethylpentane-2,4-dionato Tb0.5, La0.5 4-phenylpyridine-N-oxide tris 3-ethylpentane-2,4-dionato Tb0.5, La0.5 1-methylimidazole tris 3-ethylpentane-2,4-dionato Tb0.5, La0.5 triphenylphosphine oxide tris 3-ethylpentane-2,4-dionato Tb0.5, La0.5 2,2-bipyridyl tris 3-ethylpentane-2,4-dionato Tb0.5, La0.5 2,2-bipyridyl-N,N-dioxide tris 3-ethylpentane-2,4-dionato Tb0.5, La0.5 phenanthroline tris 3-ethylpentane-2,4-dionato Tb0.5, La0.5 bathocuproine tris 3-ethylpentane-2,4-dionato Tb0.5, La0.5 bathophenanthroline tris pivaloyltrifluoroacetonato Tb0.5, La0.5 dimethylaminopyridine tris pivaloyltrifluoroacetonato Tb0.5, La0.5 4-picoline-N-oxide tris pivaloyltrifluoroacetonato Tb0.5, La0.5 4-phenylpyridine tris pivaloyltrifluoroacetonato Tb0.5, La0.5 4-phenylpyridine-N-oxide tris pivaloyltrifluoroacetonato Tb0.5, La0.5 1-methylimidazole tris pivaloyltrifluoroacetonato Tb0.5, La0.5 triphenylphosphine oxide tris pivaloyltrifluoroacetonato Tb0.5, La0.5 2,2-bipyridyl tris pivaloyltrifluoroacetonato Tb0.5, La0.5 2,2-bipyridyl-N,N-dioxide tris pivaloyltrifluoroacetonato Tb0.5, La0.5 phenanthroline tris pivaloyltrifluoroacetonato Tb0.5, La0.5 bathocuproine tris pivaloyltrifluoroacetonato Tb0.5, La0.5 bathophenanthroline tris trifluoroacetylacetonato Tb0.5, La0.5 dimethylaminopyridine tris trifluoroacetylacetonato Tb0.5, La0.5 4-picoline-N-oxide tris trifluoroacetylacetonato Tb0.5, La0.5 4-phenylpyridine tris trifluoroacetylacetonato Tb0.5, La0.5 4-phenylpyridine-N-oxide tris trifluoroacetylacetonato Tb0.5, La0.5 1-methylimidazole tris trifluoroacetylacetonato Tb0.5, La0.5 triphenylphosphine oxide tris trifluoroacetylacetonato Tb0.5, La0.5 2,2-bipyridyl tris trifluoroacetylacetonato Tb0.5, La0.5 2,2-bipyridyl-N,N-dioxide tris trifluoroacetylacetonato Tb0.5, La0.5 phenanthroline tris trifluoroacetylacetonato Tb0.5, La0.5 bathocuproine tris trifluoroacetylacetonato Tb0.5, La0.5 bathophenanthroline tris hexafluoroacetylacetonato Tb0.5, La0.5 dimethylaminopyridine tris hexafluoroacetylacetonato Tb0.5, La0.5 4-picoline-N-oxide tris hexafluoroacetylacetonato Tb0.5, La0.5 4-phenylpyridine tris hexafluoroacetylacetonato Tb0.5, La0.5 4-phenylpyridine-N-oxide tris hexafluoroacetylacetonato Tb0.5, La0.5 1-methylimidazole tris hexafluoroacetylacetonato Tb0.5, La0.5 triphenylphosphine oxide tris hexafluoroacetylacetonato Tb0.5, La0.5 2,2-bipyridyl tris hexafluoroacetylacetonato Tb0.5, La0.5 2,2-bipyridyl-N,N-dioxide tris hexafluoroacetylacetonato Tb0.5, La0.5 phenanthroline tris hexafluoroacetylacetonato Tb0.5, La0.5 bathocuproine tris hexafluoroacetylacetonato Tb0.5, La0.5 bathophenanthroline tris 6,6,7,7,8,8,8-heptafluoro-2,2-dimethyloctanedionato Tb0.5, La0.5 dimethylaminopyridine tris 6,6,7,7,8,8,8-heptafluoro-2,2-dimethyloctanedionato Tb0.5, La0.5 4-picoline-N-oxide tris 6,6,7,7,8,8,8-heptafluoro-2,2-dimethyloctanedionato Tb0.5, La0.5 4-phenylpyridine tris 6,6,7,7,8,8,8-heptafluoro-2,2-dimethyloctanedionato Tb0.5, La0.5 4-phenylpyridine-N-oxide tris 6,6,7,7,8,8,8-heptafluoro-2,2-dimethyloctanedionato Tb0.5, La0.5 1-methylimidazole tris 6,6,7,7,8,8,8-heptafluoro-2,2-dimethyloctanedionato Tb0.5, La0.5 triphenylphosphine oxide tris 6,6,7,7,8,8,8-heptafluoro-2,2-dimethyloctanedionato Tb0.5, La0.5 2,2-bipyridyl tris 6,6,7,7,8,8,8-heptafluoro-2,2-dimethyloctanedionato Tb0.5, La0.5 2,2-bipyridyl-N,N-dioxide tris 6,6,7,7,8,8,8-heptafluoro-2,2-dimethyloctanedionato Tb0.5, La0.5 phenanthroline tris 6,6,7,7,8,8,8-heptafluoro-2,2-dimethyloctanedionato Tb0.5, La0.5 bathocuproine tris 6,6,7,7,8,8,8-heptafluoro-2,2-dimethyloctanedionato Tb0.5, La0.5 bathophenanthroline tris 1-phenyl-1,3-butanedionato Tb0.5, La0.5 dimethylaminopyridine tris 1-phenyl-1,3-butanedionato Tb0.5, La0.5 4-picoline-N-oxide tris 1-phenyl-1,3-butanedionato Tb0.5, La0.5 4-phenylpyridine tris 1-phenyl-1,3-butanedionato Tb0.5, La0.5 4-phenylpyridine-N-oxide tris 1-phenyl-1,3-butanedionato Tb0.5, La0.5 1-methylimidazole tris 1-phenyl-1,3-butanedionato Tb0.5, La0.5 triphenylphosphine oxide tris 1-phenyl-1,3-butanedionato Tb0.5, La0.5 2,2-bipyridyl tris 1-phenyl-1,3-butanedionato Tb0.5, La0.5 2,2-bipyridyl-N,N-dioxide tris 1-phenyl-1,3-butanedionato Tb0.5, La0.5 phenanthroline tris 1-phenyl-1,3-butanedionato Tb0.5, La0.5 bathocuproine tris 1-phenyl-1,3-butanedionato Tb0.5, La0.5 bathophenanthroline tris acetylacetonato Tb0.2, La0.8 dimethylaminopyridine tris acetylacetonato Tb0.2, La0.8 4-picoline-N-oxide tris acetylacetonato Tb0.2, La0.8 4-phenylpyridine tris acetylacetonato Tb0.2, La0.8 4-phenylpyridine-N-oxide tris acetylacetonato Tb0.2, La0.8 1-methylimidazole tris acetylacetonato Tb0.2, La0.8 triphenylphosphine oxide tris acetylacetonato Tb0.2, La0.8 2,2-bipyridyl tris acetylacetonato Tb0.2, La0.8 2,2-bipyridyl-N,N-dioxide tris acetylacetonato Tb0.2, La0.8 phenanthroline tris acetylacetonato Tb0.2, La0.8 bathocuproine tris acetylacetonato Tb0.2, La0.8 bathophenanthroline tris dibenzoylmethanato Tb0.2, La0.8 dimethylaminopyridine tris dibenzoylmethanato Tb0.2, La0.8 4-picoline-N-oxide tris dibenzoylmethanato Tb0.2, La0.8 4-phenylpyridine tris dibenzoylmethanato Tb0.2, La0.8 4-phenylpyridine-N-oxide tris dibenzoylmethanato Tb0.2, La0.8 1-methylimidazole tris dibenzoylmethanato Tb0.2, La0.8 triphenylphosphine oxide tris dibenzoylmethanato Tb0.2, La0.8 2,2-bipyridyl tris dibenzoylmethanato Tb0.2, La0.8 2,2-bipyridyl-N,N-dioxide tris dibenzoylmethanato Tb0.2, La0.8 phenanthroline tris dibenzoylmethanato Tb0.2, La0.8 bathocuproine tris dibenzoylmethanato Tb0.2, La0.8 bathophenanthroline
tris thenoyltrifluoroacetonato Tb0.2, La0.8 dimethylaminopyridine
tris thenoyltrifluoroacetonato Tb0.2, La0.8 4-picoline-N-oxide
tris thenoyltrifluoroacetonato Tb0.2, La0.8 4-phenylpyridine
tris thenoyltrifluoroacetonato Tb0.2, La0.8 4-phenylpyridine-N-oxide
tris thenoyltrifluoroacetonato Tb0.2, La0.8 1-methylimidazole
tris thenoyltrifluoroacetonato Tb0.2, La0.8 triphenylphosphine oxide
tris thenoyltrifluoroacetonato Tb0.2, La0.8 2,2-bipyridyl
tris thenoyltrifluoroacetonato Tb0.2, La0.8 2,2-bipyridyl-N,N-dioxide
tris thenoyltrifluoroacetonato Tb0.2, La0.8 phenanthroline
tris thenoyltrifluoroacetonato Tb0.2, La0.8 bathocuproine
tris thenoyltrifluoroacetonato Tb0.2, La0.8 bathophenanthroline
tris 2,2,6,6-tetramethylheptanedionato Tb0.2, La0.8 dimethylaminopyridine
tris 2,2,6,6-tetramethylheptanedionato Tb0.2, La0.8 4-picoline-N-oxide
tris 2,2,6,6-tetramethylheptanedionato Tb0.2, La0.8 4-phenylpyridine
tris 2,2,6,6-tetramethylheptanedionato Tb0.2, La0.8 4-phenylpyridine-N-oxide
tris 2,2,6,6-tetramethylheptanedionato Tb0.2, La0.8 1-methylimidazole
tris 2,2,6,6-tetramethylheptanedionato Tb0.2, La0.8 triphenylphosphine oxide
tris 2,2,6,6-tetramethylheptanedionato Tb0.2, La0.8 2,2-bipyridyl
tris 2,2,6,6-tetramethylheptanedionato Tb0.2, La0.8 2,2-bipyridyl-N,N-dioxide
tris 2,2,6,6-tetramethylheptanedionato Tb0.2, La0.8 phenanthroline
tris 2,2,6,6-tetramethylheptanedionato Tb0.2, La0.8 bathocuproine
tris 2,2,6,6-tetramethylheptanedionato Tb0.2, La0.8 bathophenanthroline
tris 3-methylpentane-2,4-dionato Tb0.2, La0.8 dimethylaminopyridine
tris 3-methylpentane-2,4-dionato Tb0.2, La0.8 4-picoline-N-oxide
tris 3-methylpentane-2,4-dionato Tb0.2, La0.8 4-phenylpyridine
tris 3-methylpentane-2,4-dionato Tb0.2, La0.8 4-phenylpyridine-N-oxide
tris 3-methylpentane-2,4-dionato Tb0.2, La0.8 1-methylimidazole
tris 3-methylpentane-2,4-dionato Tb0.2, La0.8 triphenylphosphine oxide
tris 3-methylpentane-2,4-dionato Tb0.2, La0.8 2,2-bipyridyl
tris 3-methylpentane-2,4-dionato Tb0.2, La0.8 2,2-bipyridyl-N,N-dioxide
tris 3-methylpentane-2,4-dionato Tb0.2, La0.8 phenanthroline
tris 3-methylpentane-2,4-dionato Tb0.2, La0.8 bathocuproine
tris 3-methylpentane-2,4-dionato Tb0.2, La0.8 bathophenanthroline
tris 3-ethylpentane-2,4-dionato Tb0.2, La0.8 dimethylaminopyridine
tris 3-ethylpentane-2,4-dionato Tb0.2, La0.8 4-picoline-N-oxide
tris 3-ethylpentane-2,4-dionato Tb0.2, La0.8 4-phenylpyridine
tris 3-ethylpentane-2,4-dionato Tb0.2, La0.8 4-phenylpyridine-N-oxide
tris 3-ethylpentane-2,4-dionato Tb0.2, La0.8 1-methylimidazole
tris 3-ethylpentane-2,4-dionato Tb0.2, La0.8 triphenylphosphine oxide
tris 3-ethylpentane-2,4-dionato Tb0.2, La0.8 2,2-bipyridyl
tris-3-ethylpentane-2,4-dionato Tb0.2, La0.8 2,2-bipyridyl-N,N-dioxide
tris 3-ethylpentane-2,4-dionato Tb0.2, La0.8 phenanthroline
tris 3-ethylpentane-2,4-dionato Tb0.2, La0.8 bathocuproine
tris 3-ethylpentane-2,4-dionato Tb0.2, La0.8 bathophenanthroline
tris pivaloyltrifluoroacetonato Tb0.2, La0.8 dimethylaminopyridine
tris pivaloyltrifluoroacetonato Tb0.2, La0.8 4-picoline-N-oxide
tris pivaloyltrifluoroacetonato Tb0.2, La0.8 4-phenylpyridine
tris pivaloyltrifluoroacetonato Tb0.2, La0.8 4-phenylpyridine-N-oxide
tris pivaloyltrifluoroacetonato Tb0.2, La0.8 1-methylimidazole
tris pivaloyltrifluoroacetonato Tb0.2, La0.8 triphenylphosphine oxide
tris pivaloyltrifluoroacetonato Tb0.2, La0.8 2,2-bipyridyl
tris pivaloyltrifluoroacetonato Tb0.2, La0.8 2,2-bipyridyl-N,N-dioxide
tris pivaloyltrifluoroacetonato Tb0.2, La0.8 phenanthroline
tris pivaloyltrifluoroacetonato Tb0.2, La0.8 bathocuproine
tris pivaloyltrifluoroacetonato Tb0.2, La0.8 bathophenanthroline
tris trifluoroacetylacetonato Tb0.2, La0.8 dimethylaminopyridine
tris trifluoroacetylacetonato Tb0.2, La0.8 4-picoline-N-oxide
tris trifluoroacetylacetonato Tb0.2, La0.8 4-phenylpyridine
tris trifluoroacetylacetonato Tb0.2, La0.8 4-phenylpyridine-N-oxide
tris trifluoroacetylacetonato Tb0.2, La0.8 1-methylimidazole
tris trifluoroacetylacetonato Tb0.2, La0.8 triphenylphosphine oxide
tris trifluoroacetylacetonato Tb0.2, La0.8 2,2-bipyridyl
tris trifluoroacetylacetonato Tb0.2, La0.8 2,2-bipyridyl-N,N-dioxide
tris trifluoroacetylacetonato Tb0.2, La0.8 phenanthroline
tris trifluoroacetylacetonato Tb0.2, La0.8 bathocuproine
tris trifluoroacetylacetonato Tb0.2, La0.8 bathophenanthroline
tris hexafluoroacetylacetonato Tb0.2, La0.8 dimethylaminopyridine
tris hexafluoroacetylacetonato Tb0.2, La0.8 4-picoline-N-oxide
tris hexafluoroacetylacetonato Tb0.2, La0.8 4-phenylpyridine
tris hexafluoroacetylacetonato Tb0.2, La0.8 4-phenylpyridine-N-oxide
tris hexafluoroacetylacetonato Tb0.2, La0.8 1-methylimidazole
tris hexafluoroacetylacetonato Tb0.2, La0.8 triphenylphosphine oxide
tris hexafluoroacetylacetonato Tb0.2, La0.8 2,2-bipyridyl
tris hexafluoroacetylacetonato Tb0.2, La0.8 2,2-bipyridyl-N,N-dioxide tris hexafluoroacetylacetonato Tb0.2, La0.8 phenanthroline
tris hexafluoroacetylacetonato Tb0.2, La0.8 bathocuproine
tris hexafluoroacetylacetonato Tb0.2, La0.8 bathophenanthroline
tris 6,6,7,7,8,8,8-heptafluoro-2,2-dimethyloctanedionato Tb0.2, La0.8 dimethylaminopyridine
tris 6,6,7,7,8,8,8-heptafluoro-2,2-dimethyloctanedionato Tb0.2, La0.8 4-picoline-N-oxide
tris 6,6,7,7,8,8,8-heptafluoro-2,2-dimethyloctanedionato Tb0.2, La0.8 4-phenylpyridine
tris 6,6,7,7,8,8,8-heptafluoro-2,2-dimethyloctanedionato Tb0.2, La0.8 4-phenylpyridine-N-oxide
tris 6,6,7,7,8,8,8-heptafluoro-2,2-dimethyloctanedionato Tb0.2, La0.8 1-methylimidazole
tris 6,6,7,7,8,8,8-heptafluoro-2,2-dimethyloctanedionato Tb0.2, La0.8 triphenylphosphine oxide
tris 6,6,7,7,8,8,8-heptafluoro-2,2-dimethyloctanedionato Tb0.2, La0.8 2,2-bipyridyl
tris 6,6,7,7,8,8,8-heptafluoro-2,2-dimethyloctanedionato Tb0.2, La0.8 2,2-bipyridyl-N,N-dioxide
tris 6,6,7,7,8,8,8-heptafluoro-2,2-dimethyloctanedionato Tb0.2, La0.8 phenanthroline
tris 6,6,7,7,8,8,8-heptafluoro-2,2-dimethyloctanedionato Tb0.2, La0.8 bathocuproine
tris 6,6,7,7,8,8,8-heptafluoro-2,2-dimethyloctanedionato Tb0.2, La0.8 bathophenanthroline
tris 1-phenyl-1,3-butanedionato Tb0.2, La0.8 dimethylaminopyridine
tris 1-phenyl-1,3-butanedionato Tb0.2, La0.8 4-picoline-N-oxide
tris 1-phenyl-1,3-butanedionato Tb0.2, La0.8 4-phenylpyridine
tris 1-phenyl-1,3-butanedionato Tb0.2, La0.8 4-phenylpyridine-N-oxide
tris 1-phenyl-1,3-butanedionato Tb0.2, La0.8 1-methylimidazole
tris 1-phenyl-1,3-butanedionato Tb0.2, La0.8 triphenylphosphine oxide
tris 1-phenyl-1,3-butanedionato Tb0.2, La0.8 2,2-bipyridyl
tris 1-phenyl-1,3-butanedionato Tb0.2, La0.8 2,2-bipyridyl-N,N-dioxide
tris 1-phenyl-1,3-butanedionato Tb0.2, La0.8 phenanthroline
tris 1-phenyl-1,3-butanedionato Tb0.2, La0.8 bathocuproine
tris 1-phenyl-1,3-butanedionato Tb0.2, La0.8 bathophenanthroline
tris acetylacetonato Tb0.1, La0.9 dimethylaminopyridine
tris acetylacetonato Tb0.1, La0.9 4-picoline-N-oxide
tris acetylacetonato Tb0.1, La0.9 4-phenylpyridine
tris acetylacetonato Tb0.1, La0.9 4-phenylpyridine-N-oxide
tris acetylacetonato Tb0.1, La0.9 1-methylimidazole
tris acetylacetonato Tb0.1, La0.9 triphenylphosphine oxide
tris acetylacetonato Tb0.1, La0.9 2,2-bipyridyl
tris acetylacetonato Tb0.1, La0.9 2,2-bipyridyl-N,N-dioxide
tris acetylacetonato Tb0.1, La0.9 phenanthroline
tris acetylacetonato Tb0.1, La0.9 bathocuproine
tris acetylacetonato Tb0.1, La0.9 bathophenanthroline
tris dibenzoylmethanato Tb0.1, La0.9 dimethylaminopyridine
tris dibenzoylmethanato Tb0.1, La0.9 4-picoline-N-oxide
tris dibenzoylmethanato Tb0.1, La0.9 4-phenylpyridine
tris dibenzoylmethanato Tb0.1, La0.9 4-phenylpyridine-N-oxide
tris dibenzoylmethanato Tb0.1, La0.9 1-methylimidazole
tris dibenzoylmethanato Tb0.1, La0.9 triphenylphosphine oxide
tris dibenzoylmethanato Tb0.1, La0.9 2,2-bipyridyl
tris dibenzoylmethanato Tb0.1, La0.9 2,2-bipyridyl-N,N-dioxide
tris dibenzoylmethanato Tb0.1, La0.9 phenanthroline
tris dibenzoylmethanato Tb0.1, La0.9 bathocuproine
tris dibenzoylmethanato Tb0.1, La0.9 bathophenanthroline
tris thenoyltrifluoroacetonato Tb0.1, La0.9 dimethylaminopyridine
tris thenoyltrifluoroacetonato Tb0.1, La0.9 4-picoline-N-oxide
tris thenoyltrifluoroacetonato Tb0.1, La0.9 4-phenylpyridine
tris thenoyltrifluoroacetonato Tb0.1, La0.9 4-phenylpyridine-N-oxide
tris thenoyltrifluoroacetonato Tb0.1, La0.9 1-methylimidazole
tris thenoyltrifluoroacetonato Tb0.1, La0.9 triphenylphosphine oxide
tris thenoyltrifluoroacetonato Tb0.1, La0.9 2,2-bipyridyl
tris thenoyltrifluoroacetonato Tb0.1, La0.9 2,2-bipyridyl-N,N-dioxide
tris thenoyltrifluoroacetonato Tb0.1, La0.9 phenanthroline
tris thenoyltrifluoroacetonato Tb0.1, La0.9 bathocuproine
tris thenoyltrifluoroacetonato Tb0.1, La0.9 bathophenanthroline
tris 2,2,6,6-tetramethylheptanedionato Tb0.1, La0.9 dimethylaminopyridine
tris 2,2,6,6-tetramethylheptanedionato Tb0.1, La0.9 4-picoline-N-oxide
tris 2,2,6,6-tetramethylheptanedionato Tb0.1, La0.9 4-phenylpyridine
tris 2,2,6,6-tetramethylheptanedionato Tb0.1, La0.9 4-phenylpyridine-N-oxide
tris 2,2,6,6-tetramethylheptanedionato Tb0.1, La0.9 1-methylimidazole
tris 2,2,6,6-tetramethylheptanedionato Tb0.1, La0.9 triphenylphosphine oxide
tris 2,2,6,6-tetramethylheptanedionato Tb0.1, La0.9 2,2-bipyridyl
tris 2,2,6,6-tetramethylheptanedionato Tb0.1, La0.9 2,2-bipyridyl-N,N-dioxide
tris 2,2,6,6-tetramethylheptanedionato Tb0.1, La0.9 phenanthroline
tris 2,2,6,6-tetramethylheptanedionato Tb0.1, La0.9 bathocuproine
tris 2,2,6,6-tetramethylheptanedionato Tb0.1, La0.9 bathophenanthroline
tris 3-methylpentane-2,4-dionato Tb0.1, La0.9 dimethylaminopyridine
tris 3-methylpentane-2,4-dionato Tb0.1, La0.9 4-picoline-N-oxide
tris 3-methylpentane-2,4-dionato Tb0.1, La0.9 4-phenylpyridine
tris 3-methylpentane-2,4-dionato Tb0.1, La0.9 4-phenylpyridine-N-oxide
tris 3-methylpentane-2,4-dionato Tb0.1, La0.9 1-methylimidazole
tris 3-methylpentane-2,4-dionato Tb0.1, La0.9 triphenylphosphine oxide
tris 3-methylpentane-2,4-dionato Tb0.1, La0.9 2,2-bipyridyl
tris 3-methylpentane-2,4-dionato Tb0.1, La0.9 2,2-bipyridyl-N,N-dioxide
tris 3-methylpentane-2,4-dionato Tb0.1, La0.9 phenanthroline
tris 3-methylpentane-2,4-dionato Tb0.1, La0.9 bathocuproine
tris 3-methylpentane-2,4-dionato Tb0.1, La0.9 bathophenanthroline tris 3-ethylpentane-2,4-dionato Tb0.1, La0.9 dimethylaminopyridine
tris 3-ethylpentane-2,4-dionato Tb0.1, La0.9 4-picoline-N-oxide
tris 3-ethylpentane-2,4-dionato Tb0.1, La0.9 4-phenylpyridine
tris 3-ethylpentane-2,4-dionato Tb0.1, La0.9 4-phenylpyridine-N-oxide
tris 3-ethylpentane-2,4-dionato Tb0.1, La0.9 1-methylimidazole
tris 3-ethylpentane-2,4-dionato Tb0.1, La0.9 triphenylphosphine oxide
tris 3-ethylpentane-2,4-dionato Tb0.1, La0.9 2,2-bipyridyl
tris 3-ethylpentane-2,4-dionato Tb0.1, La0.9 2,2-bipyridyl-N,N-dioxide
tris 3-ethylpentane-2,4-dionato Tb0.1, La0.9 phenanthroline
tris 3-ethylpentane-2,4-dionato Tb0.1, La0.9 bathocuproine
tris 3-ethylpentane-2,4-dionato Tb0.1, La0.9 bathophenanthroline
tris pivaloyltrifluoroacetonato Tb0.1, La0.9 dimethylaminopyridine
tris pivaloyltrifluoroacetonato Tb0.1, La0.9 4-picoline-N-oxide
tris pivaloyltrifluoroacetonato Tb0.1, La0.9 4-phenylpyridine
tris pivaloyltrifluoroacetonato Tb0.1, La0.9 4-phenylpyridine-N-oxide
tris pivaloyltrifluoroacetonato Tb0.1, La0.9 1-methylimidazole
tris pivaloyltrifluoroacetonato Tb0.1, La0.9 triphenylphosphine oxide
tris pivaloyltrifluoroacetonato Tb0.1, La0.9 2,2-bipyridyl
tris pivaloyltrifluoroacetonato Tb0.1, La0.9 2,2-bipyridyl-N,N-dioxide
tris pivaloyltrifluoroacetonato Tb0.1, La0.9 phenanthroline
tris pivaloyltrifluoroacetonato Tb0.1, La0.9 bathocuproine
tris pivaloyltrifluoroacetonato Tb0.1, La0.9 bathophenanthroline
tris trifluoroacetylacetonato Tb0.1, La0.9 dimethylaminopyridine
tris trifluoroacetylacetonato Tb0.1, La0.9 4-picoline-N-oxide
tris trifluoroacetylacetonato Tb0.1, La0.9 4-phenylpyridine
tris trifluoroacetylacetonato Tb0.1, La0.9 4-phenylpyridine-N-oxide
tris trifluoroacetylacetonato Tb0.1, La0.9 1-methylimidazole
tris trifluoroacetylacetonato Tb0.1, La0.9 triphenylphosphine oxide
tris trifluoroacetylacetonato Tb0.1, La0.9 2,2-bipyridyl
tris trifluoroacetylacetonato Tb0.1, La0.9 2,2-bipyridyl-N,N-dioxide
tris trifluoroacetylacetonato Tb0.1, La0.9 phenanthroline
tris trifluoroacetylacetonato Tb0.1, La0.9 bathocuproine
tris trifluoroacetylacetonato Tb0.1, La0.9 bathophenanthroline
tris hexafluoroacetylacetonato Tb0.1, La0.9 dimethylaminopyridine
tris hexafluoroacetylacetonato Tb0.1, La0.9 4-picoline-N-oxide
tris hexafluoroacetylacetonato Tb0.1, La0.9 4-phenylpyridine
tris hexafluoroacetylacetonato Tb0.1, La0.9 4-phenylpyridine-N-oxide
tris hexafluoroacetylacetonato Tb0.1, La0.9 1-methylimidazole
tris hexafluoroacetylacetonato Tb0.1, La0.9 triphenylphosphine oxide
tris hexafluoroacetylacetonato Tb0.1, La0.9 2,2-bipyridyl
tris hexafluoroacetylacetonato Tb0.1, La0.9 2,2-bipyridyl-N,N-dioxide
tris hexafluoroacetylacetonato Tb0.1, La0.9 phenanthroline
tris hexafluoroacetylacetonato Tb0.1, La0.9 bathocuproine
tris hexafluoroacetylacetonato Tb0.1, La0.9 bathophenanthroline
tris 6,6,7,7,8,8,8-heptafluoro-2,2-dimethyloctanedionato Tb0.1, La0.9 dimethylaminopyridine
tris 6,6,7,7,8,8,8-heptafluoro-2,2-dimethyloctanedionato Tb0.1, La0.9 4-picoline-N-oxide
tris 6,6,7,7,8,8,8-heptafluoro-2,2-dimethyloctanedionato Tb0.1, La0.9 4-phenylpyridine
tris 6,6,7,7,8,8,8-heptafluoro-2,2-dimethyloctanedionato Tb0.1, La0.9 4-phenylpyridine-N-oxide
tris 6,6,7,7,8,8,8-heptafluoro-2,2-dimethyloctanedionato Tb0.1, La0.9 1-methylimidazole
tris 6,6,7,7,8,8,8-heptafluoro-2,2-dimethyloctanedionato Tb0.1, La0.9 triphenylphosphine oxide
tris 6,6,7,7,8,8,8-heptafluoro-2,2-dimethyloctanedionato Tb0.1, La0.9 2,2-bipyridyl
tris 6,6,7,7,8,8,8-heptafluoro-2,2-dimethyloctanedionato Tb0.1, La0.9 2,2-bipyridyl-N,N-dioxide
tris 6,6,7,7,8,8,8-heptafluoro-2,2-dimethyloctanedionato Tb0.1, La0.9 phenanthroline
tris 6,6,7,7,8,8,8-heptafluoro-2,2-dimethyloctanedionato Tb0.1, La0.9 bathocuproine
tris 6,6,7,7,8,8,8-heptafluoro-2,2-dimethyloctanedionato Tb0.1, La0.9 bathophenanthroline
tris 1-phenyl-1,3-butanedionato Tb0.1, La0.9 dimethylaminopyridine
tris 1-phenyl-1,3-butanedionato Tb0.1, La0.9 4-picoline-N-oxide
tris 1-phenyl-1,3-butanedionato Tb0.1, La0.9 4-phenylpyridine
tris 1-phenyl-1,3-butanedionato Tb0.1, La0.9 4-phenylpyridine-N-oxide
tris 1-phenyl-1,3-butanedionato Tb0.1, La0.9 1-methylimidazole
tris 1-phenyl-1,3-butanedionato Tb0.1, La0.9 triphenylphosphine oxide
tris 1-phenyl-1,3-butanedionato Tb0.1, La0.9 2,2-bipyridyl
tris 1-phenyl-1,3-butanedionato Tb0.1, La0.9 2,2-bipyridyl-N,N-dioxide
tris 1-phenyl-1,3-butanedionato Tb0.1, La0.9 phenanthroline
tris 1-phenyl-1,3-butanedionato Tb0.1, La0.9 bathocuproine
tris 1-phenyl-1,3-butanedionato Tb0.1, La0.9 bathophenanthroline
tris acetylacetonato Tb0.01, La0.99 dimethylaminopyridine
tris acetylacetonato Tb0.01, La0.99 4-picoline-N-oxide
tris acetylacetonato Tb0.01, La0.99 4-phenylpyridine
tris acetylacetonato Tb0.01, La0.99 4-phenylpyridine-N-oxide
tris acetylacetonato Tb0.01, La0.99 1-methylimidazole
tris acetylacetonato Tb0.01, La0.99 triphenylphosphine oxide
tris acetylacetonato Tb0.01, La0.99 2,2-bipyridyl
tris acetylacetonato Tb0.01, La0.99 2,2-bipyridyl-N,N-dioxide
tris acetylacetonato Tb0.01, La0.99 phenanthroline
tris acetylacetonato Tb0.01, La0.99 bathocuproine
tris acetylacetonato Tb0.01, La0.99 bathophenanthroline
tris dibenzoylmethanato Tb0.01, La0.99 dimethylaminopyridine tris dibenzoylmethanato Tb0.01, La0.99 4-picoline-N-oxide
tris dibenzoylmethanato Tb0.01, La0.99 4-phenylpyridine
tris dibenzoylmethanato Tb0.01, La0.99 4-phenylpyridine-N-oxide
tris dibenzoylmethanato Tb0.01, La0.99 1-methylimidazole
tris dibenzoylmethanato Tb0.01, La0.99 triphenylphosphine oxide
tris dibenzoylmethanato Tb0.01, La0.99 2,2-bipyridyl
tris dibenzoylmethanato Tb0.01, La0.99 2,2-bipyridyl-N,N-dioxide
tris dibenzoylmethanato Tb0.01, La0.99 phenanthroline
tris dibenzoylmethanato Tb0.01, La0.99 bathocuproine
tris dibenzoylmethanato Tb0.01, La0.99 bathophenanthroline
tris thenoyltrifluoroacetonato Tb0.01, La0.99 dimethylaminopyridine
tris thenoyltrifluoroacetonato Tb0.01, La0.99 4-picoline-N-oxide
tris thenoyltrifluoroacetonato Tb0.01, La0.99 4-phenylpyridine
tris thenoyltrifluoroacetonato Tb0.01, La0.99 4-phenylpyridine-N-oxide
tris thenoyltrifluoroacetonato Tb0.01, La0.99 1-methylimidazole
tris thenoyltrifluoroacetonato Tb0.01, La0.99 triphenylphosphine oxide
tris thenoyltrifluoroacetonato Tb0.01, La0.99 2,2-bipyridyl
tris thenoyltrifluoroacetonato Tb0.01, La0.99 2,2-bipyridyl-N,N-dioxide
tris thenoyltrifluoroacetonato Tb0.01, La0.99 phenanthroline
tris thenoyltrifluoroacetonato Tb0.01, La0.99 bathocuproine
tris thenoyltrifluoroacetonato Tb0.01, La0.99 bathophenanthroline
tris 2,2,6,6-tetramethylheptanedionato Tb0.01, La0.99 dimethylaminopyridine
tris 2,2,6,6-tetramethylheptanedionato Tb0.01, La0.99 4-picoline-N-oxide
tris 2,2,6,6-tetramethylheptanedionato Tb0.01, La0.99 4-phenylpyridine
tris 2,2,6,6-tetramethylheptanedionato Tb0.01, La0.99 4-phenylpyridine-N-oxide
tris 2,2,6,6-tetramethylheptanedionato Tb0.01, La0.99 1-methylimidazole
tris 2,2,6,6-tetramethylheptanedionato Tb0.01, La0.99 triphenylphosphine oxide
tris 2,2,6,6-tetramethylheptanedionato Tb0.01, La0.99 2,2-bipyridyl
tris 2,2,6,6-tetramethylheptanedionato Tb0.01, La0.99 2,2-bipyridyl-N,N-dioxide
tris 2,2,6,6-tetramethylheptanedionato Tb0.01, La0.99 phenanthroline
tris 2,2,6,6-tetramethylheptanedionato Tb0.01, La0.99 bathocuproine
tris 2,2,6,6-tetramethylheptanedionato Tb0.01, La0.99 bathophenanthroline
tris 3-methylpentane-2,4-dionato Tb0.01, La0.99 dimethylaminopyridine
tris 3-methylpentane-2,4-dionato Tb0.01, La0.99 4-picoline-N-oxide
tris 3-methylpentane-2,4-dionato Tb0.01, La0.99 4-phenylpyridine
tris 3-methylpentane-2,4-dionato Tb0.01, La0.99 4-phenylpyridine-N-oxide
tris 3-methylpentane-2,4-dionato Tb0.01, La0.99 1-methylimidazole
tris 3-methylpentane-2,4-dionato Tb0.01, La0.99 triphenylphosphine oxide
tris 3-methylpentane-2,4-dionato Tb0.01, La0.99 2,2-bipyridyl
tris 3-methylpentane-2,4-dionato Tb0.01, La0.99 2,2-bipyridyl-N,N-dioxide
tris 3-methylpentane-2,4-dionato Tb0.01, La0.99 phenanthroline
tris 3-methylpentane-2,4-dionato Tb0.01, La0.99 bathocuproine
tris 3-methylpentane-2,4-dionato Tb0.01, La0.99 bathophenanthroline
tris 3-ethylpentane-2,4-dionato Tb0.01, La0.99 dimethylaminopyridine
tris 3-ethylpentane-2,4-dionato Tb0.01, La0.99 4-picoline-N-oxide
tris 3-ethylpentane-2,4-dionato Tb0.01, La0.99 4-phenylpyridine
tris 3-ethylpentane-2,4-dionato Tb0.01, La0.99 4-phenylpyridine-N-oxide
tris 3-ethylpentane-2,4-dionato Tb0.01, La0.99 1-methylimidazole
tris 3-ethylpentane-2,4-dionato Tb0.01, La0.99 triphenylphosphine oxide
tris 3-ethylpentane-2,4-dionato Tb0.01, La0.99 2,2-bipyridyl
tris 3-ethylpentane-2,4-dionato Tb0.01, La0.99 2,2-bipyridyl-N,N-dioxide
tris 3-ethylpentane-2,4-dionato Tb0.01, La0.99 phenanthroline
tris 3-ethylpentane-2,4-dionato Tb0.01, La0.99 bathocuproine
tris 3-ethylpentane-2,4-dionato Tb0.01, La0.99 bathophenanthroline
tris pivaloyltrifluoroacetonato Tb0.01, La0.99 dimethylaminopyridine
tris pivaloyltrifluoroacetonato Tb0.01, La0.99 4-picoline-N-oxide
tris pivaloyltrifluoroacetonato Tb0.01, La0.99 4-phenylpyridine
tris pivaloyltrifluoroacetonato Tb0.01, La0.99 4-phenylpyridine-N-oxide
tris pivaloyltrifluoroacetonato Tb0.01, La0.99 1-methylimidazole
tris pivaloyltrifluoroacetonato Tb0.01, La0.99 triphenylphosphine oxide
tris pivaloyltrifluoroacetonato Tb0.01, La0.99 2,2-bipyridyl
tris pivaloyltrifluoroacetonato Tb0.01, La0.99 2,2-bipyridyl-N,N-dioxide
tris pivaloyltrifluoroacetonato Tb0.01, La0.99 phenanthroline
tris pivaloyltrifluoroacetonato Tb0.01, La0.99 bathocuproine
tris pivaloyltrifluoroacetonato Tb0.01, La0.99 bathophenanthroline
tris trifluoroacetylacetonato Tb0.01, La0.99 dimethylaminopyridine
tris trifluoroacetylacetonato Tb0.01, La0.99 4-picoline-N-oxide
tris trifluoroacetylacetonato Tb0.01, La0.99 4-phenylpyridine
tris trifluoroacetylacetonato Tb0.01, La0.99 4-phenylpyridine-N-oxide
tris trifluoroacetylacetonato Tb0.01, La0.99 1-methylimidazole
tris trifluoroacetylacetonato Tb0.01, La0.99 triphenylphosphine oxide tris trifluoroacetylacetonato Tb0.01, La0.99 2,2-bipyridyl
tris trifluoroacetylacetonato Tb0.01, La0.99 2,2-bipyridyl-N,N-dioxide
tris trifluoroacetylacetonato Tb0.01, La0.99 phenanthroline
tris trifluoroacetylacetonato Tb0.01, La0.99 bathocuproine
tris trifluoroacetylacetonato Tb0.01, La0.99 bathophenanthroline
tris hexafluoroacetylacetonato Tb0.01, La0.99 dimethylaminopyridine
tris hexafluoroacetylacetonato Tb0.01, La0.99 4-picoline-N-oxide
tris hexafluoroacetylacetonato Tb0.01, La0.99 4-phenylpyridine
tris hexafluoroacetylacetonato Tb0.01, La0.99 4-phenylpyridine-N-oxide
tris hexafluoroacetylacetonato Tb0.01, La0.99 1-methylimidazole
tris hexafluoroacetylacetonato Tb0.01, La0.99 triphenylphosphine oxide
tris hexafluoroacetylacetonato Tb0.01, La0.99 2,2-bipyridyl
tris hexafluoroacetylacetonato Tb0.01, La0.99 2,2-bipyridyl-N,N-dioxide
tris hexafluoroacetylacetonato Tb0.01, La0.99 phenanthroline
tris hexafluoroacetylacetonato Tb0.01, La0.99 bathocuproine
tris hexafluoroacetylacetonato Tb0.01, La0.99 bathophenanthroline
tris 6,6,7,7,8,8,8-heptafluoro-2,2-dimethyloctanedionato Tb0.01, La0.99 dimethylaminopyridine
tris 6,6,7,7,8,8,8-heptafluoro-2,2-dimethyloctanedionato Tb0.01, La0.99 4-picoline-N-oxide
tris 6,6,7,7,8,8,8-heptafluoro-2,2-dimethyloctanedionato Tb0.01, La0.99 4-phenylpyridine
tris 6,6,7,7,8,8,8-heptafluoro-2,2-dimethyloctanedionato Tb0.01, La0.99 4-phenylpyridine-N-oxide
tris 6,6,7,7,8,8,8-heptafluoro-2,2-dimethyloctanedionato Tb0.01, La0.99 1-methylimidazole
tris 6,6,7,7,8,8,8-heptafluoro-2,2-dimethyloctanedionato Tb0.01, La0.99 triphenylphosphine oxide
tris 6,6,7,7,8,8,8-heptafluoro-2,2-dimethyloctanedionato Tb0.01, La0.99 2,2-bipyridyl
tris 6,6,7,7,8,8,8-heptafluoro-2,2-dimethyloctanedionato Tb0.01, La0.99 2,2-bipyridyl-N,N-dioxide
tris 6,6,7,7,8,8,8-heptafluoro-2,2-dimethyloctanedionato Tb0.01, La0.99 phenanthroline
tris 6,6,7,7,8,8,8-heptafluoro-2,2-dimethyloctanedionato Tb0.01, La0.99 bathocuproine
tris 6,6,7,7,8,8,8-heptafluoro-2,2-dimethyloctanedionato Tb0.01, La0.99 bathophenanthroline
tris 1-phenyl-1,3-butanedionato Tb0.01, La0.99 dimethylaminopyridine
tris 1-phenyl-1,3-butanedionato Tb0.01, La0.99 4-picoline-N-oxide
tris 1-phenyl-1,3-butanedionato Tb0.01, La0.99 4-phenylpyridine
tris 1-phenyl-1,3-butanedionato Tb0.01, La0.99 4-phenylpyridine-N-oxide
tris 1-phenyl-1,3-butanedionato Tb0.01, La0.99 1-methylimidazole
tris 1-phenyl-1,3-butanedionato Tb0.01, La0.99 triphenylphosphine oxide
tris 1-phenyl-1,3-butanedionato Tb0.01, La0.99 2,2-bipyridyl
tris 1-phenyl-1,3-butanedionato Tb0.01, La0.99 2,2-bipyridyl-N,N-dioxide
tris 1-phenyl-1,3-butanedionato Tb0.01, La0.99 phenanthroline
tris 1-phenyl-1,3-butanedionato Tb0.01, La0.99 bathocuproine
tris 1-phenyl-1,3-butanedionato Tb0.01, La0.99 bathophenanthroline
tris acetylacetonato Eu0.5, La0.5 dimethylaminopyridine
tris acetylacetonato Eu0.5, La0.5 4-picoline-N-oxide
tris acetylacetonato Eu0.5, La0.5 4-phenylpyridine
tris acetylacetonato Eu0.5, La0.5 4-phenylpyridine-N-oxide
tris acetylacetonato Eu0.5, La0.5 1-methylimidazole
tris acetylacetonato Eu0.5, La0.5 triphenylphosphine oxide
tris acetylacetonato Eu0.5, La0.5 2,2-bipyridyl
tris acetylacetonato Eu0.5, La0.5 2,2-bipyridyl-N,N-dioxide
tris acetylacetonato Eu0.5, La0.5 phenanthroline
tris acetylacetonato Eu0.5, La0.5 bathocuproine
tris acetylacetonato Eu0.5, La0.5 bathophenanthroline
tris dibenzoylmethanato Eu0.5, La0.5 dimethylaminopyridine
tris dibenzoylmethanato Eu0.5, La0.5 4-picoline-N-oxide
tris dibenzoylmethanato Eu0.5, La0.5 4-phenylpyridine
tris dibenzoylmethanato Eu0.5, La0.5 4-phenylpyridine-N-oxide
tris dibenzoylmethanato Eu0.5, La0.5 1-methylimidazole
tris dibenzoylmethanato Eu0.5, La0.5 triphenylphosphine oxide
tris dibenzoylmethanato Eu0.5, La0.5 2,2-bipyridyl
tris dibenzoylmethanato Eu0.5, La0.5 2,2-bipyridyl-N,N-dioxide
tris dibenzoylmethanato Eu0.5, La0.5 phenanthroline
tris dibenzoylmethanato Eu0.5, La0.5 bathocuproine
tris dibenzoylmethanato Eu0.5, La0.5 bathophenanthroline
tris thenoyltrifluoroacetonato Eu0.5, La0.5 dimethylaminopyridine
tris thenoyltrifluoroacetonato Eu0.5, La0.5 4-picoline-N-oxide
tris thenoyltrifluoroacetonato Eu0.5, La0.5 4-phenylpyridine
tris thenoyltrifluoroacetonato Eu0.5, La0.5 4-phenylpyridine-N-oxide
tris thenoyltrifluoroacetonato Eu0.5, La0.5 1-methylimidazole
tris thenoyltrifluoroacetonato Eu0.5, La0.5 triphenylphosphine oxide
tris thenoyltrifluoroacetonato Eu0.5, La0.5 2,2-bipyridyl
tris thenoyltrifluoroacetonato Eu0.5, La0.5 2,2-bipyridyl-N,N-dioxide
tris thenoyltrifluoroacetonato Eu0.5, La0.5 phenanthroline
tris thenoyltrifluoroacetonato Eu0.5, La0.5 bathocuproine
tris thenoyltrifluoroacetonato Eu0.5, La0.5 bathophenanthroline
tris 2,2,6,6-tetramethylheptanedionato Eu0.5, La0.5 dimethylaminopyridine
tris 2,2,6,6-tetramethylheptanedionato Eu0.5, La0.5 4-picoline-N-oxide
tris 2,2,6,6-tetramethylheptanedionato Eu0.5, La0.5 4-phenylpyridine
tris 2,2,6,6-tetramethylheptanedionato Eu0.5, La0.5 4-phenylpyridine-N-oxide
tris 2,2,6,6-tetramethylheptanedionato Eu0.5, La0.5 1-methylimidazole
tris 2,2,6,6-tetramethylheptanedionato Eu0.5, La0.5 triphenylphosphine oxide
tris 2,2,6,6-tetramethylheptanedionato Eu0.5, La0.5 2,2-bipyridyl
tris 2,2,6,6-tetramethylheptanedionato Eu0.5, La0.5 2,2-bipyridyl-N,N-dioxide tris 2,2,6,6-tetramethylheptanedionato Eu0.5, La0.5 phenanthroline
tris 2,2,6,6-tetramethylheptanedionato Eu0.5, La0.5 bathocuproine
tris 2,2,6,6-tetramethylheptanedionato Eu0.5, La0.5 bathophenanthroline
tris 3-methylpentane-2,4-dionato Eu0.5, La0.5 dimethylaminopyridine
tris 3-methylpentane-2,4-dionato Eu0.5, La0.5 4-picoline-N-oxide
tris 3-methylpentane-2,4-dionato Eu0.5, La0.5 4-phenylpyridine
tris 3-methylpentane-2,4-dionato Eu0.5, La0.5 4-phenylpyridine-N-oxide
tris 3-methylpentane-2,4-dionato Eu0.5, La0.5 1-methylimidazole
tris 3-methylpentane-2,4-dionato Eu0.5, La0.5 triphenylphosphine oxide
tris 3-methylpentane-2,4-dionato Eu0.5, La0.5 2,2-bipyridyl
tris 3-methylpentane-2,4-dionato Eu0.5, La0.5 2,2-bipyridyl-N,N-dioxide
tris 3-methylpentane-2,4-dionato Eu0.5, La0.5 phenanthroline
tris 3-methylpentane-2,4-dionato Eu0.5, La0.5 bathocuproine
tris 3-methylpentane-2,4-dionato Eu0.5, La0.5 bathophenanthroline
tris 3-ethylpentane-2,4-dionato Eu0.5, La0.5 dimethylaminopyridine
tris 3-ethylpentane-2,4-dionato Eu0.5, La0.5 4-picoline-N-oxide
tris 3-ethylpentane-2,4-dionato Eu0.5, La0.5 4-phenylpyridine
tris 3-ethylpentane-2,4-dionato Eu0.5, La0.5 4-phenylpyridine-N-oxide
tris 3-ethylpentane-2,4-dionato Eu0.5, La0.5 1-methylimidazole
tris 3-ethylpentane-2,4-dionato Eu0.5, La0.5 triphenylphosphine oxide
tris 3-ethylpentane-2,4-dionato Eu0.5, La0.5 2,2-bipyridyl
tris 3-ethylpentane-2,4-dionato Eu0.5, La0.5 2,2-bipyridyl-N,N-dioxide
tris 3-ethylpentane-2,4-dionato Eu0.5, La0.5 phenanthroline
tris 3-ethylpentane-2,4-dionato Eu0.5, La0.5 bathocuproine
tris 3-ethylpentane-2,4-dionato Eu0.5, La0.5 bathophenanthroline
tris pivaloyltrifluoroacetonato Eu0.5, La0.5 dimethylaminopyridine
tris pivaloyltrifluoroacetonato Eu0.5, La0.5 4-picoline-N-oxide
tris pivaloyltrifluoroacetonato Eu0.5, La0.5 4-phenylpyridine
tris pivaloyltrifluoroacetonato Eu0.5, La0.5 4-phenylpyridine-N-oxide
tris pivaloyltrifluoroacetonato Eu0.5, La0.5 1-methylimidazole
tris pivaloyltrifluoroacetonato Eu0.5, La0.5 triphenylphosphine oxide
tris pivaloyltrifluoroacetonato Eu0.5, La0.5 2,2-bipyridyl
tris pivaloyltrifluoroacetonato Eu0.5, La0.5 2,2-bipyridyl-N,N-dioxide
tris pivaloyltrifluoroacetonato Eu0.5, La0.5 phenanthroline
tris pivaloyltrifluoroacetonato Eu0.5, La0.5 bathocuproine
tris pivaloyltrifluoroacetonato Eu0.5, La0.5 bathophenanthroline
tris trifluoroacetylacetonato Eu0.5, La0.5 dimethylaminopyridine
tris trifluoroacetylacetonato Eu0.5, La0.5 4-picoline-N-oxide
tris trifluoroacetylacetonato Eu0.5, La0.5 4-phenylpyridine
tris trifluoroacetylacetonato Eu0.5, La0.5 4-phenylpyridine-N-oxide
tris trifluoroacetylacetonato Eu0.5, La0.5 1-methylimidazole
tris trifluoroacetylacetonato Eu0.5, La0.5 triphenylphosphine oxide
tris trifluoroacetylacetonato Eu0.5, La0.5 2,2-bipyridyl
tris trifluoroacetylacetonato Eu0.5, La0.5 2,2-bipyridyl-N,N-dioxide
tris trifluoroacetylacetonato Eu0.5, La0.5 phenanthroline
tris trifluoroacetylacetonato Eu0.5, La0.5 bathocuproine
tris trifluoroacetylacetonato Eu0.5, La0.5 bathophenanthroline
tris hexafluoroacetylacetonato Eu0.5, La0.5 dimethylaminopyridine
tris hexafluoroacetylacetonato Eu0.5, La0.5 4-picoline-N-oxide
tris hexafluoroacetylacetonato Eu0.5, La0.5 4-phenylpyridine
tris hexafluoroacetylacetonato Eu0.5, La0.5 4-phenylpyridine-N-oxide
tris hexafluoroacetylacetonato Eu0.5, La0.5 1-methylimidazole
tris hexafluoroacetylacetonato Eu0.5, La0.5 triphenylphosphine oxide
tris hexafluoroacetylacetonato Eu0.5, La0.5 2,2-bipyridyl
tris hexafluoroacetylacetonato Eu0.5, La0.5 2,2-bipyridyl-N,N-dioxide
tris hexafluoroacetylacetonato Eu0.5, La0.5 phenanthroline
tris hexafluoroacetylacetonato Eu0.5, La0.5 bathocuproine
tris hexafluoroacetylacetonato Eu0.5, La0.5 bathophenanthroline
tris, 6,6,7,7,8,8,8-heptafluoro-2,2-dimethyloctanedionato Eu0.5, La0.5 dimethylaminopyridine
tris 6,6,7,7,8,8,8-heptafluoro-2,2-dimethyloctanedionato Eu0.5, La0.5 4-picoline-N-oxide
tris 6,6,7,7,8,8,8-heptafluoro-2,2-dimethyloctanedionato Eu0.5, La0.5 4-phenylpyridine
tris 6,6,7,7,8,8,8-heptafluoro-2,2-dimethyloctanedionato Eu0.5, La0.5 4-phenylpyridine-N-oxide
tris 6,6,7,7,8,8,8-heptafluoro-2,2-dimethyloctanedionato Eu0.5, La0.5 1-methylimidazole
tris 6,6,7,7,8,8,8-heptafluoro-2,2-dimethyloctanedionato Eu0.5, La0.5 triphenylphosphine oxide
tris 6,6,7,7,8,8,8-heptafluoro-2,2-dimethyloctanedionato Eu0.5, La0.5 2,2-bipyridyl
tris 6,6,7,7,8,8,8-heptafluoro-2,2-dimethyloctanedionato Eu0.5, La0.5 2,2-bipyridyl-N,N-dioxide
tris 6,6,7,7,8,8,8-heptafluoro-2,2-dimethyloctanedionato Eu0.5, La0.5 phenanthroline
tris 6,6,7,7,8,8,8-heptafluoro-2,2-dimethyloctanedionato Eu0.5, La0.5 bathocuproine
tris 6,6,7,7,8,8,8-heptafluoro-2,2-dimethyloctanedionato Eu0.5, La0.5 bathophenanthroline
tris 1-phenyl-1,3-butanedionato Eu0.5, La0.5 dimethylaminopyridine
tris 1-phenyl-1,3-butanedionato Eu0.5, La0.5 4-picoline-N-oxide
tris 1-phenyl-1,3-butanedionato Eu0.5, La0.5 4-phenylpyridine
tris 1-phenyl-1,3-butanedionato Eu0.5, La0.5 4-phenylpyridine-N-oxide
tris 1-phenyl-1,3-butanedionato Eu0.5, La0.5 1-methylimidazole tris 1-phenyl-1,3-butanedionato Eu0.5, La0.5 triphenylphosphine oxide
tris 1-phenyl-1,3-butanedionato Eu0.5, La0.5 2,2-bipyridyl
tris 1-phenyl-1,3-butanedionato Eu0.5, La0.5 2,2-bipyridyl-N,N-dioxide
tris 1-phenyl-1,3-butanedionato Eu0.5, La0.5 phenanthroline
tris 1-phenyl-1,3-butanedionato Eu0.5, La0.5 bathocuproine
tris 1-phenyl-1,3-butanedionato Eu0.5, La0.5 bathophenanthroline
tris acetylacetonato Eu0.2, La0.8 dimethylaminopyridine
tris acetylacetonato Eu0.2, La0.8 4-picoline-N-oxide
tris acetylacetonato Eu0.2, La0.8 4-phenylpyridine
tris acetylacetonato Eu0.2, La0.8 4-phenylpyridine-N-oxide
tris acetylacetonato Eu0.2, La0.8 1-methylimidazole
tris acetylacetonato Eu0.2, La0.8 triphenylphosphine oxide
tris acetylacetonato Eu0.2, La0.8 2,2-bipyridyl
tris acetylacetonato Eu0.2, La0.8 2,2-bipyridyl-N,N-dioxide
tris acetylacetonato Eu0.2, La0.8 phenanthroline
tris acetylacetonato Eu0.2, La0.8 bathocuproine
tris acetylacetonato Eu0.2, La0.8 bathophenanthroline
tris dibenzoylmethanato Eu0.2, La0.8 dimethylaminopyridine
tris dibenzoylmethanato Eu0.2, La0.8 4-picoline-N-oxide
tris dibenzoylmethanato Eu0.2, La0.8 4-phenylpyridine
tris dibenzoylmethanato Eu0.2, La0.8 4-phenylpyridine-N-oxide
tris dibenzoylmethanato Eu0.2, La0.8 1-methylimidazole
tris dibenzoylmethanato Eu0.2, La0.8 triphenylphosphine oxide
tris dibenzoylmethanato Eu0.2, La0.8 2,2-bipyridyl
tris dibenzoylmethanato Eu0.2, La0.8 2,2-bipyridyl-N,N-dioxide
tris dibenzoylmethanato Eu0.2, La0.8 phenanthroline
tris dibenzoylmethanato Eu0.2, La0.8 bathocuproine
tris dibenzoylmethanato Eu0.2, La0.8 bathophenanthroline
tris thenoyltrifluoroacetonato Eu0.2, La0.8 dimethylaminopyridine
tris thenoyltrifluoroacetonato Eu0.2, La0.8 4-picoline-N-oxide
tris thenoyltrifluoroacetonato Eu0.2, La0.8 4-phenylpyridine
tris thenoyltrifluoroacetonato Eu0.2, La0.8 4-phenylpyridine-N-oxide
tris thenoyltrifluoroacetonato Eu0.2, La0.8 1-methylimidazole
tris thenoyltrifluoroacetonato Eu0.2, La0.8 triphenylphosphine oxide
tris thenoyltrifluoroacetonato Eu0.2, La0.8 2,2-bipyridyl
tris thenoyltrifluoroacetonato Eu0.2, La0.8 2,2-bipyridyl-N,N-dioxide
tris thenoyltrifluoroacetonato Eu0.2, La0.8 phenanthroline
tris thenoyltrifluoroacetonato Eu0.2, La0.8 bathocuproine
tris thenoyltrifluoroacetonato Eu0.2, La0.8 bathophenanthroline
tris 2,2,6,6-tetramethylheptanedionato Eu0.2, La0.8 dimethylaminopyridine
tris 2,2,6,6-tetramethylheptanedionato Eu0.2, La0.8 4-picoline-N-oxide
tris 2,2,6,6-tetramethylheptanedionato Eu0.2, La0.8 4-phenylpyridine
tris 2,2,6,6-tetramethylheptanedionato Eu0.2, La0.8 4-phenylpyridine-N-oxide
tris 2,2,6,6-tetramethylheptanedionato Eu0.2, La0.8 1-methylimidazole
tris 2,2,6,6-tetramethylheptanedionato Eu0.2, La0.8 triphenylphosphine oxide
tris 2,2,6,6-tetramethylheptanedionato Eu0.2, La0.8 2,2-bipyridyl
tris 2,2,6,6-tetramethylheptanedionato Eu0.2, La0.8 2,2-bipyridyl-N,N-dioxide
tris 2,2,6,6-tetramethylheptanedionato Eu0.2, La0.8 phenanthroline
tris 2,2,6,6-tetramethylheptanedionato Eu0.2, La0.8 bathocuproine
tris 2,2,6,6-tetramethylheptanedionato Eu0.2, La0.8 bathophenanthroline
tris 3-methylpentane-2,4-dionato Eu0.2, La0.8 dimethylaminopyridine
tris 3-methylpentane-2,4-dionato Eu0.2, La0.8 4-picoline-N-oxide
tris 3-methylpentane-2,4-dionato Eu0.2, La0.8 4-phenylpyridine
tris 3-methylpentane-2,4-dionato Eu0.2, La0.8 4-phenylpyridine-N-oxide
tris 3-methylpentane-2,4-dionato Eu0.2, La0.8 1-methylimidazole
tris 3-methylpentane-2,4-dionato Eu0.2, La0.8 triphenylphosphine oxide
tris 3-methylpentane-2,4-dionato Eu0.2, La0.8 2,2-bipyridyl
tris 3-methylpentane-2,4-dionato Eu0.2, La0.8 2,2-bipyridyl-N,N-dioxide
tris 3-methylpentane-2,4-dionato Eu0.2, La0.8 phenanthroline
tris 3-methylpentane-2,4-dionato Eu0.2, La0.8 bathocuproine
tris 3-methylpentane-2,4-dionato Eu0.2, La0.8 bathophenanthroline
tris 3-ethylpentane-2,4-dionato Eu0.2, La0.8 dimethylaminopyridine
tris 3-ethylpentane-2,4-dionato Eu0.2, La0.8 4-picoline-N-oxide
tris 3-ethylpentane-2,4-dionato Eu0.2, La0.8 4-phenylpyridine
tris 3-ethylpentane-2,4-dionato Eu0.2, La0.8 4-phenylpyridine-N-oxide
tris 3-ethylpentane-2,4-dionato Eu0.2, La0.8 1-methylimidazole
tris 3-ethylpentane-2,4-dionato Eu0.2, La0.8 triphenylphosphine oxide
tris 3-ethylpentane-2,4-dionato Eu0.2, La0.8 2,2-bipyridyl
tris 3-ethylpentane-2,4-dionato Eu0.2, La0.8 2,2-bipyridyl-N,N-dioxide
tris 3-ethylpentane-2,4-dionato Eu0.2, La0.8 phenanthroline
tris 3-ethylpentane-2,4-dionato Eu0.2, La0.8 bathocuproine
tris 3-ethylpentane-2,4-dionato Eu0.2, La0.8 bathophenanthroline
tris pivaloyltrifluoroacetonato Eu0.2, La0.8 dimethylaminopyridine
tris pivaloyltrifluoroacetonato Eu0.2, La0.8 4-picoline-N-oxide
tris pivaloyltrifluoroacetonato Eu0.2, La0.8 4-phenylpyridine
tris pivaloyltrifluoroacetonato Eu0.2, La0.8 4-phenylpyridine-N-oxide
tris pivaloyltrifluoroacetonato Eu0.2, La0.8 1-methylimidazole
tris pivaloyltrifluoroacetonato Eu0.2, La0.8 triphenylphosphine oxide
tris pivaloyltrifluoroacetonato Eu0.2, La0.8 2,2-bipyridyl
tris pivaloyltrifluoroacetonato Eu0.2, La0.8 2,2-bipyridyl-N,N-dioxide
tris pivaloyltrifluoroacetonato Eu0.2, La0.8 phenanthroline
tris pivaloyltrifluoroacetonato Eu0.2, La0.8 bathocuproine tris pivaloyltrifluoroacetonato Eu0.2, La0.8 bathophenanthroline
tris trifluoroacetylacetonato Eu0.2, La0.8 dimethylaminopyridine
tris trifluoroacetylacetonato Eu0.2, La0.8 4-picoline-N-oxide
tris trifluoroacetylacetonato Eu0.2, La0.8 4-phenylpyridine
tris trifluoroacetylacetonato Eu0.2, La0.8 4-phenylpyridine-N-oxide
tris trifluoroacetylacetonato Eu0.2, La0.8 1-methylimidazole
tris trifluoroacetylacetonato Eu0.2, La0.8 triphenylphosphine oxide
tris trifluoroacetylacetonato Eu0.2, La0.8 2,2-bipyridyl
tris trifluoroacetylacetonato Eu0.2, La0.8 2,2-bipyridyl-N,N-dioxide
tris trifluoroacetylacetonato Eu0.2, La0.8 phenanthroline
tris trifluoroacetylacetonato Eu0.2, La0.8 bathocuproine
tris trifluoroacetylacetonato Eu0.2, La0.8 bathophenanthroline
tris hexafluoroacetylacetonato Eu0.2, La0.8 dimethylaminopyridine
tris hexafluoroacetylacetonato Eu0.2, La0.8 4-picoline-N-oxide
tris hexafluoroacetylacetonato Eu0.2, La0.8 4-phenylpyridine
tris hexafluoroacetylacetonato Eu0.2, La0.8 4-phenylpyridine-N-oxide
tris hexafluoroacetylacetonato Eu0.2, La0.8 1-methylimidazole
tris hexafluoroacetylacetonato Eu0.2, La0.8 triphenylphosphine oxide
tris hexafluoroacetylacetonato Eu0.2, La0.8 2,2-bipyridyl
tris hexafluoroacetylacetonato Eu0.2, La0.8 2,2-bipyridyl-N,N-dioxide
tris hexafluoroacetylacetonato Eu0.2, La0.8 phenanthroline
tris hexafluoroacetylacetonato Eu0.2, La0.8 bathocuproine
tris hexafluoroacetylacetonato Eu0.2, La0.8 bathophenanthroline
tris 6,6,7,7,8,8,8-heptafluoro-2,2-dimethyloctanedionato Eu0.2, La0.8 dimethylaminopyridine
tris 6,6,7,7,8,8,8-heptafluoro-2,2-dimethyloctanedionato Eu0.2, La0.8 4-picoline-N-oxide
tris 6,6,7,7,8,8,8-heptafluoro-2,2-dimethyloctanedionato Eu0.2, La0.8 4-phenylpyridine
tris 6,6,7,7,8,8,8-heptafluoro-2,2-dimethyloctanedionato Eu0.2, La0.8 4-phenylpyridine-N-oxide
tris 6,6,7,7,8,8,8-heptafluoro-2,2-dimethyloctanedionato Eu0.2, La0.8 1-methylimidazole
tris 6,6,7,7,8,8,8-heptafluoro-2,2-dimethyloctanedionato Eu0.2, La0.8 triphenylphosphine oxide
tris 6,6,7,7,8,8,8-heptafluoro-2,2-dimethyloctanedionato Eu0.2, La0.8 2,2-bipyridyl
tris 6,6,7,7,8,8,8-heptafluoro-2,2-dimethyloctanedionato Eu0.2, La0.8 2,2-bipyridyl-N,N-dioxide
tris 6,6,7,7,8,8,8-heptafluoro-2,2-dimethyloctanedionato Eu0.2, La0.8 phenanthroline
tris 6,6,7,7,8,8,8-heptafluoro-2,2-dimethyloctanedionato Eu0.2, La0.8 bathocuproine
tris 6,6,7,7,8,8,8-heptafluoro-2,2-dimethyloctanedionato Eu0.2, La0.8 bathophenanthroline
tris 1-phenyl-1,3-butanedionato Eu0.2, La0.8 dimethylaminopyridine
tris 1-phenyl-1,3-butanedionato Eu0.2, La0.8 4-picoline-N-oxide
tris 1-phenyl-1,3-butanedionato Eu0.2, La0.8 4-phenylpyridine
tris 1-phenyl-1,3-butanedionato Eu0.2, La0.8 4-phenylpyridine-N-oxide
tris 1-phenyl-1,3-butanedionato Eu0.2, La0.8 1-methylimidazole
tris 1-phenyl-1,3-butanedionato Eu0.2, La0.8 triphenylphosphine oxide
tris 1-phenyl-1,3-butanedionato Eu0.2, La0.8 2,2-bipyridyl
tris 1-phenyl-1,3-butanedionato Eu0.2, La0.8 2,2-bipyridyl-N,N-dioxide
tris 1-phenyl-1,3-butanedionato Eu0.2, La0.8 phenanthroline
tris 1-phenyl-1,3-butanedionato Eu0.2, La0.8 bathocuproine
tris 1-phenyl-1,3-butanedionato Eu0.2, La0.8 bathophenanthroline
tris acetylacetonato Eu0.1, La0.9 dimethylaminopyridine
tris acetylacetonato Eu0.1, La0.9 4-picoline-N-oxide
tris acetylacetonato Eu0.1, La0.9 4-phenylpyridine
tris acetylacetonato Eu0.1, La0.9 4-phenylpyridine-N-oxide
tris acetylacetonato Eu0.1, La0.9 1-methylimidazole
tris acetylacetonato Eu0.1, La0.9 triphenylphosphine oxide
tris acetylacetonato Eu0.1, La0.9 2,2-bipyridyl
tris acetylacetonato Eu0.1, La0.9 2,2-bipyridyl-N,N-dioxide
tris acetylacetonato Eu0.1, La0.9 phenanthroline
tris acetylacetonato Eu0.1, La0.9 bathocuproine
tris acetylacetonato Eu0.1, La0.9 bathophenanthroline
tris dibenzoylmethanato Eu0.1, La0.9 dimethylaminopyridine
tris dibenzoylmethanato Eu0.1, La0.9 4-picoline-N-oxide
tris dibenzoylmethanato Eu0.1, La0.9 4-phenylpyridine
tris dibenzoylmethanato Eu0.1, La0.9 4-phenylpyridine-N-oxide
tris dibenzoylmethanato Eu0.1, La0.9 1-methylimidazole
tris dibenzoylmethanato Eu0.1, La0.9 triphenylphosphine oxide
tris dibenzoylmethanato Eu0.1, La0.9 2,2-bipyridyl
tris dibenzoylmethanato Eu0.1, La0.9 2,2-bipyridyl-N,N-dioxide
tris dibenzoylmethanato Eu0.1, La0.9 phenanthroline
tris dibenzoylmethanato Eu0.1, La0.9 bathocuproine
tris dibenzoylmethanato Eu0.1, La0.9 bathophenanthroline
tris thenoyltrifluoroacetonato Eu0.1, La0.9 dimethylaminopyridine
tris thenoyltrifluoroacetonato Eu0.1, La0.9 4-picoline-N-oxide
tris thenoyltrifluoroacetonato Eu0.1, La0.9 4-phenylpyridine
tris thenoyltrifluoroacetonato Eu0.1, La0.9 4-phenylpyridine-N-oxide
tris thenoyltrifluoroacetonato Eu0.1, La0.9 1-methylimidazole
tris thenoyltrifluoroacetonato Eu0.1, La0.9 triphenylphosphine oxide
tris thenoyltrifluoroacetonato Eu0.1, La0.9 2,2-bipyridyl
tris thenoyltrifluoroacetonato Eu0.1, La0.9 2,2-bipyridyl-N,N-dioxide
tris thenoyltrifluoroacetonato Eu0.1, La0.9 phenanthroline
tris thenoyltrifluoroacetonato Eu0.1, La0.9 bathocuproine
tris thenoyltrifluoroacetonato Eu0.1, La0.9 bathophenanthroline
tris 2,2,6,6-tetramethylheptanedionato Eu0.1, La0.9 dimethylaminopyridine
tris 2,2,6,6-tetramethylheptanedionato Eu0.1, La0.9 4-picoline-N-oxide
tris 2,2,6,6-tetramethylheptanedionato Eu0.1, La0.9 4-phenylpyridine
tris 2,2,6,6-tetramethylheptanedionato Eu0.1, La0.9 4-phenylpyridine-N-oxide tris 2,2,6,6-tetramethylheptanedionato Eu0.1, La0.9 1-methylimidazole
tris 2,2,6,6-tetramethylheptanedionato Eu0.1, La0.9 triphenylphosphine oxide
tris 2,2,6,6-tetramethylheptanedionato Eu0.1, La0.9 2,2-bipyridyl
tris 2,2,6,6-tetramethylheptanedionato Eu0.1, La0.9 2,2-bipyridyl-N,N-dioxide
tris 2,2,6,6-tetramethylheptanedionato Eu0.1, La0.9 phenanthroline
tris 2,2,6,6-tetramethylheptanedionato Eu0.1, La0.9 bathocuproine
tris 2,2,6,6-tetramethylheptanedionato Eu0.1, La0.9 bathophenanthroline
tris 3-methylpentane-2,4-dionato Eu0.1, La0.9 dimethylaminopyridine
tris 3-methylpentane-2,4-dionato Eu0.1, La0.9 4-picoline-N-oxide
tris 3-methylpentane-2,4-dionato Eu0.1, La0.9 4-phenylpyridine
tris 3-methylpentane-2,4-dionato Eu0.1, La0.9 4-phenylpyridine-N-oxide
tris 3-methylpentane-2,4-dionato Eu0.1, La0.9 1-methylimidazole
tris 3-methylpentane-2,4-dionato Eu0.1, La0.9 triphenylphosphine oxide
tris 3-methylpentane-2,4-dionato Eu0.1, La0.9 2,2-bipyridyl
tris 3-methylpentane-2,4-dionato Eu0.1, La0.9 2,2-bipyridyl-N,N-dioxide
tris 3-methylpentane-2,4-dionato Eu0.1, La0.9 phenanthroline
tris 3-methylpentane-2,4-dionato Eu0.1, La0.9 bathocuproine
tris 3-methylpentane-2,4-dionato Eu0.1, La0.9 bathophenanthroline
tris 3-ethylpentane-2,4-dionato Eu0.1, La0.9 dimethylaminopyridine
tris 3-ethylpentane-2,4-dionato Eu0.1, La0.9 4-picoline-N-oxide
tris 3-ethylpentane-2,4-dionato Eu0.1, La0.9 4-phenylpyridine
tris 3-ethylpentane-2,4-dionato Eu0.1, La0.9 4-phenylpyridine-N-oxide
tris 3-ethylpentane-2,4-dionato Eu0.1, La0.9 1-methylimidazole
tris 3-ethylpentane-2,4-dionato Eu0.1, La0.9 triphenylphosphine oxide
tris 3-ethylpentane-2,4-dionato Eu0.1, La0.9 2,2-bipyridyl
tris 3-ethylpentane-2,4-dionato Eu0.1, La0.9 2,2-bipyridyl-N,N-dioxide
tris 3-ethylpentane-2,4-dionato Eu0.1, La0.9 phenanthroline
tris 3-ethylpentane-2,4-dionato Eu0.1, La0.9 bathocuproine
tris 3-ethylpentane-2,4-dionato Eu0.1, La0.9 bathophenanthroline
tris pivaloyltrifluoroacetonato Eu0.1, La0.9 dimethylaminopyridine
tris pivaloyltrifluoroacetonato Eu0.1, La0.9 4-picoline-N-oxide
tris pivaloyltrifluoroacetonato Eu0.1, La0.9 4-phenylpyridine
tris pivaloyltrifluoroacetonato Eu0.1, La0.9 4-phenylpyridine-N-oxide
tris pivaloyltrifluoroacetonato Eu0.1, La0.9 1-methylimidazole
tris pivaloyltrifluoroacetonato Eu0.1, La0.9 triphenylphosphine oxide
tris pivaloyltrifluoroacetonato Eu0.1, La0.9 2,2-bipyridyl
tris pivaloyltrifluoroacetonato Eu0.1, La0.9 2,2-bipyridyl-N,N-dioxide
tris pivaloyltrifluoroacetonato Eu0.1, La0.9 phenanthroline
tris pivaloyltrifluoroacetonato Eu0.1, La0.9 bathocuproine
tris pivaloyltrifluoroacetonato Eu0.1, La0.9 bathophenanthroline
tris trifluoroacetylacetonato Eu0.1, La0.9 dimethylaminopyridine
tris trifluoroacetylacetonato Eu0.1, La0.9 4-picoline-N-oxide
tris trifluoroacetylacetonato Eu0.1, La0.9 4-phenylpyridine
tris trifluoroacetylacetonato Eu0.1, La0.9 4-phenylpyridine-N-oxide
tris trifluoroacetylacetonato Eu0.1, La0.9 1-methylimidazole
tris trifluoroacetylacetonato Eu0.1, La0.9 triphenylphosphine oxide
tris trifluoroacetylacetonato Eu0.1, La0.9 2,2-bipyridyl
tris trifluoroacetylacetonato Eu0.1, La0.9 2,2-bipyridyl-N,N-dioxide
tris trifluoroacetylacetonato Eu0.1, La0.9 phenanthroline
tris trifluoroacetylacetonato Eu0.1, La0.9 bathocuproine
tris trifluoroacetylacetonato Eu0.1, La0.9 bathophenanthroline
tris hexafluoroacetylacetonato Eu0.1, La0.9 dimethylaminopyridine
tris hexafluoroacetylacetonato Eu0.1, La0.9 4-picoline-N-oxide
tris hexafluoroacetylacetonato Eu0.1, La0.9 4-phenylpyridine
tris hexafluoroacetylacetonato Eu0.1, La0.9 4-phenylpyridine-N-oxide
tris hexafluoroacetylacetonato Eu0.1, La0.9 1-methylimidazole
tris hexafluoroacetylacetonato Eu0.1, La0.9 triphenylphosphine oxide
tris hexafluoroacetylacetonato Eu0.1, La0.9 2,2-bipyridyl
tris hexafluoroacetylacetonato Eu0.1, La0.9 2,2-bipyridyl-N,N-dioxide
tris hexafluoroacetylacetonato Eu0.1, La0.9 phenanthroline
tris hexafluoroacetylacetonato Eu0.1, La0.9 bathocuproine
tris hexafluoroacetylacetonato Eu0.1, La0.9 bathophenanthroline
tris 6,6,7,7,8,8,8-heptafluoro-2,2-dimethyloctanedionato Eu0.1, La0.9 dimethylaminopyridine
tris 6,6,7,7,8,8,8-heptafluoro-2,2-dimethyloctanedionato Eu0.1, La0.9 4-picoline-N-oxide
tris 6,6,7,7,8,8,8-heptafluoro-2,2-dimethyloctanedionato Eu0.1, La0.9 4-phenylpyridine
tris 6,6,7,7,8,8,8-heptafluoro-2,2-dimethyloctanedionato Eu0.1, La0.9 4-phenylpyridine-N-oxide
tris 6,6,7,7,8,8,8-heptafluoro-2,2-dimethyloctanedionato Eu0.1, La0.9 1-methylimidazole
tris 6,6,7,7,8,8,8-heptafluoro-2,2-dimethyloctanedionato Eu0.1, La0.9 triphenylphosphine oxide
tris 6,6,7,7,8,8,8-heptafluoro-2,2-dimethyloctanedionato Eu0.1, La0.9 2,2-bipyridyl
tris 6,6,7,7,8,8,8-heptafluoro-2,2-dimethyloctanedionato Eu0.1, La0.9 2,2-bipyridyl-N,N-dioxide
tris 6,6,7,7,8,8,8-heptafluoro-2,2-dimethyloctanedionato Eu0.1, La0.9 phenanthroline
tris 6,6,7,7,8,8,8-heptafluoro-2,2-dimethyloctanedionato Eu0.1, La0.9 bathocuproine
tris 6,6,7,7,8,8,8-heptafluoro-2,2-dimethyloctanedionato Eu0.1, La0.9 bathophenanthroline
tris 1-phenyl-1,3-butanedionato Eu0.1, La0.9 dimethylaminopyridine tris 1-phenyl-1,3-butanedionato Eu0.1, La0.9 4-picoline-N-oxide tris 1-phenyl-1,3-butanedionato Eu0.1, La0.9 4-phenylpyridine tris 1-phenyl-1,3-butanedionato Eu0.1, La0.9 4-phenylpyridine-N-oxide tris 1-phenyl-1,3-butanedionato Eu0.1, La0.9 1-methylimidazole tris 1-phenyl-1,3-butanedionato Eu0.1, La0.9 triphenylphosphine oxide tris 1-phenyl-1,3-butanedionato Eu0.1, La0.9 2,2-bipyridyl tris 1-phenyl-1,3-butanedionato Eu0.1, La0.9 2,2-bipyridyl-N,N-dioxide tris 1-phenyl-1,3-butanedionato Eu0.1, La0.9 phenanthroline tris 1-phenyl-1,3-butanedionato Eu0.1, La0.9 bathocuproine tris 1-phenyl-1,3-butanedionato Eu0.1, La0.9 bathophenanthroline tris acetylacetonato Eu0.01, La0.99 dimethylaminopyridine tris acetylacetonato Eu0.01, La0.99 4-picoline-N-oxide tris acetylacetonato Eu0.01, La0.99 4-phenylpyridine tris acetylacetonato Eu0.01, La0.99 4-phenylpyridine-N-oxide tris acetylacetonato Eu0.01, La0.99 1-methylimidazole tris acetylacetonato Eu0.01, La0.99 triphenylphosphine oxide tris acetylacetonato Eu0.01, La0.99 2,2-bipyridyl tris acetylacetonato Eu0.01, La0.99 2,2-bipyridyl-N,N-dioxide tris acetylacetonato Eu0.01, La0.99 phenanthroline tris acetylacetonato Eu0.01, La0.99 bathocuproine tris acetylacetonato Eu0.01, La0.99 bathophenanthroline tris dibenzoylmethanato Eu0.01, La0.99 dimethylaminopyridine tris dibenzoylmethanato Eu0.01, La0.99 4-picoline-N-oxide tris dibenzoylmethanato Eu0.01, La0.99 4-phenylpyridine tris dibenzoylmethanato Eu0.01, La0.99 4-phenylpyridine-N-oxide tris dibenzoylmethanato Eu0.01, La0.99 1-methylimidazole tris dibenzoylmethanato Eu0.01, La0.99 triphenylphosphine oxide tris dibenzoylmethanato Eu0.01, La0.99 2,2-bipyridyl tris dibenzoylmethanato Eu0.01, La0.99 2,2-bipyridyl-N,N-dioxide tris dibenzoylmethanato Eu0.01, La0.99 phenanthroline tris dibenzoylmethanato Eu0.01, La0.99 bathocuproine tris dibenzoylmethanato Eu0.01, La0.99 bathophenanthroline tris thenoyltrifluoroacetonato Eu0.01, La0.99 dimethylaminopyridine tris thenoyltrifluoroacetonato Eu0.01, La0.99 4-picoline-N-oxide tris thenoyltrifluoroacetonato Eu0.01, La0.99 4-phenylpyridine tris thenoyltrifluoroacetonato Eu0.01, La0.99 4-phenylpyridine-N-oxide tris thenoyltrifluoroacetonato Eu0.01, La0.99 1-methylimidazole tris thenoyltrifluoroacetonato Eu0.01, La0.99 triphenylphosphine oxide tris thenoyltrifluoroacetonato Eu0.01, La0.99 2,2-bipyridyl tris thenoyltrifluoroacetonato Eu0.01, La0.99 2,2-bipyridyl-N,N-dioxide tris thenoyltrifluoroacetonato Eu0.01, La0.99 phenanthroline tris thenoyltrifluoroacetonato Eu0.01, La0.99 bathocuproine tris thenoyltrifluoroacetonato Eu0.01, La0.99 bathophenanthroline tris 2,2,6,6-tetramethylheptanedionato Eu0.01, La0.99 dimethylaminopyridine tris 2,2,6,6-tetramethylheptanedionato Eu0.01, La0.99 4-picoline-N-oxide tris 2,2,6,6-tetramethylheptanedionato Eu0.01, La0.99 4-phenylpyridine tris 2,2,6,6-tetramethylheptanedionato Eu0.01, La0.99 4-phenylpyridine-N-oxide tris 2,2,6,6-tetramethylheptanedionato Eu0.01, La0.99 1-methylimidazole tris 2,2,6,6-tetramethylheptanedionato Eu0.01, La0.99 triphenylphosphine oxide tris 2,2,6,6-tetramethylheptanedionato Eu0.01, La0.99 2,2-bipyridyl tris 2,2,6,6-tetramethylheptanedionato Eu0.01, La0.99 2,2-bipyridyl-N,N-dioxide tris 2,2,6,6-tetramethylheptanedionato Eu0.01, La0.99 phenanthroline tris 2,2,6,6-tetramethylheptanedionato Eu0.01, La0.99 bathocuproine tris 2,2,6,6-tetramethylheptanedionato Eu0.01, La0.99 bathophenanthroline tris 3-methylpentane-2,4-dionato Eu0.01, La0.99 dimethylaminopyridine tris 3-methylpentane-2,4-dionato Eu0.01, La0.99 4-picoline-N-oxide tris 3-methylpentane-2,4-dionato Eu0.01, La0.99 4-phenylpyridine tris 3-methylpentane-2,4-dionato Eu0.01, La0.99 4-phenylpyridine-N-oxide tris 3-methylpentane-2,4-dionato Eu0.01, La0.99 1-methylimidazole tris 3-methylpentane-2,4-dionato Eu0.01, La0.99 triphenylphosphine oxide tris 3-methylpentane-2,4-dionato Eu0.01, La0.99 2,2-bipyridyl tris 3-methylpentane-2,4-dionato Eu0.01, La0.99 2,2-bipyridyl-N,N-dioxide tris 3-methylpentane-2,4-dionato Eu0.01, La0.99 phenanthroline tris 3-methylpentane-2,4-dionato Eu0.01, La0.99 bathocuproine tris 3-methylpentane-2,4-dionato Eu0.01, La0.99 bathophenanthroline tris 3-ethylpentane-2,4-dionato Eu0.01, La0.99 dimethylaminopyridine tris 3-ethylpentane-2,4-dionato Eu0.01, La0.99 4-picoline-N-oxide tris 3-ethylpentane-2,4-dionato Eu0.01, La0.99 4-phenylpyridine tris 3-ethylpentane-2,4-dionato Eu0.01, La0.99 4-phenylpyridine-N-oxide tris 3-ethylpentane-2,4-dionato Eu0.01, La0.99 1-methylimidazole tris 3-ethylpentane-2,4-dionato Eu0.01, La0.99 triphenylphosphine oxide tris 3-ethylpentane-2,4-dionato Eu0.01, La0.99 2,2-bipyridyl tris 3-ethylpentane-2,4-dionato Eu0.01, La0.99 2,2-bipyridyl-N,N-dioxide tris 3-ethylpentane-2,4-dionato Eu0.01, La0.99 phenanthroline tris 3-ethylpentane-2,4-dionato Eu0.01, La0.99 bathocuproine tris 3-ethylpentane-2,4-dionato Eu0.01, La0.99 bathophenanthroline tris pivaloyltrifluoroacetonato Eu0.01, La0.99 dimethylaminopyridine tris pivaloyltrifluoroacetonato Eu0.01, La0.99 4-picoline-N-oxide tris pivaloyltrifluoroacetonato Eu0.01, La0.99 4-phenylpyridine tris pivaloyltrifluoroacetonato Eu0.01, La0.99 4-phenylpyridine-N-oxide tris pivaloyltrifluoroacetonato Eu0.01, La0.99 1-methylimidazole tris pivaloyltrifluoroacetonato Eu0.01, La0.99 triphenylphosphine oxide tris pivaloyltrifluoroacetonato Eu0.01, La0.99 2,2-bipyridyl tris pivaloyltrifluoroacetonato Eu0.01, La0.99 2,2-bipyridyl-N,N-dioxide tris pivaloyltrifluoroacetonato Eu0.01, La0.99 phenanthroline tris pivaloyltrifluoroacetonato Eu0.01, La0.99 bathocuproine tris pivaloyltrifluoroacetonato Eu0.01, La0.99 bathophenanthroline tris trifluoroacetylacetonato Eu0.01, La0.99 dimethylaminopyridine tris trifluoroacetylacetonato Eu0.01, La0.99 4-picoline-N-oxide tris trifluoroacetylacetonato Eu0.01, La0.99 4-phenylpyridine tris trifluoroacetylacetonato Eu0.01, La0.99 4-phenylpyridine-N-oxide tris trifluoroacetylacetonato Eu0.01, La0.99 1-methylimidazole tris trifluoroacetylacetonato Eu0.01, La0.99 triphenylphosphine oxide tris trifluoroacetylacetonato Eu0.01, La0.99 2,2-bipyridyl tris trifluoroacetylacetonato Eu0.01, La0.99 2,2-bipyridyl-N,N-dioxide tris trifluoroacetylacetonato Eu0.01, La0.99 phenanthroline tris trifluoroacetylacetonato Eu0.01, La0.99 bathocuproine tris trifluoroacetylacetonato Eu0.01, La0.99 bathophenanthroline tris hexafluoroacetylacetonato Eu0.01, La0.99 dimethylaminopyridine tris hexafluoroacetylacetonato Eu0.01, La0.99 4-picoline-N-oxide tris hexafluoroacetylacetonato Eu0.01, La0.99 4-phenylpyridine tris hexafluoroacetylacetonato Eu0.01, La0.99 4-phenylpyridine-N-oxide tris hexafluoroacetylacetonato Eu0.01, La0.99 1-methylimidazole tris hexafluoroacetylacetonato Eu0.01, La0.99 triphenylphosphine oxide tris hexafluoroacetylacetonato Eu0.01, La0.99 2,2-bipyridyl tris hexafluoroacetylacetonato Eu0.01, La0.99 2,2-bipyridyl-N,N-dioxide tris hexafluoroacetylacetonato Eu0.01, La0.99 phenanthroline tris hexafluoroacetylacetonato Eu0.01, La0.99 bathocuproine tris hexafluoroacetylacetonato Eu0.01, La0.99 bathophenanthroline tris 6,6,7,7,8,8,8-heptafluoro-2,2-dimethyloctanedionato Eu0.01, La0.99 dimethylaminopyridine tris 6,6,7,7,8,8,8-heptafluoro-2,2-dimethyloctanedionato Eu0.01, La0.99 4-picoline-N-oxide tris 6,6,7,7,8,8,8-heptafluoro-2,2-dimethyloctanedionato Eu0.01, La0.99 4-phenylpyridine tris 6,6,7,7,8,8,8-heptafluoro-2,2-dimethyloctanedionato Eu0.01, La0.99 4-phenylpyridine-N-oxide tris 6,6,7,7,8,8,8-heptafluoro-2,2-dimethyloctanedionato Eu0.01, La0.99 1-methylimidazole tris 6,6,7,7,8,8,8-heptafluoro-2,2-dimethyloctanedionato Eu0.01, La0.99 triphenylphosphine oxide tris 6,6,7,7,8,8,8-heptafluoro-2,2-dimethyloctanedionato Eu0.01, La0.99 2,2-bipyridyl tris 6,6,7,7,8,8,8-heptafluoro-2,2-dimethyloctanedionato Eu0.01, La0.99 2,2-bipyridyl-N,N-dioxide tris 6,6,7,7,8,8,8-heptafluoro-2,2-dimethyloctanedionato Eu0.01, La0.99 phenanthroline tris 6,6,7,7,8,8,8-heptafluoro-2,2-dimethyloctanedionato Eu0.01, La0.99 bathocuproine tris 6,6,7,7,8,8,8-heptafluoro-2,2-dimethyloctanedionato Eu0.01, La0.99 bathophenanthroline tris 1-phenyl-1,3-butanedionato Eu0.01, La0.99 dimethylaminopyridine tris 1-phenyl-1,3-butanedionato Eu0.01, La0.99 4-picoline-N-oxide tris 1-phenyl-1,3-butanedionato Eu0.01, La0.99 4-phenylpyridine tris 1-phenyl-1,3-butanedionato Eu0.01, La0.99 4-phenylpyridine-N-oxide tris 1-phenyl-1,3-butanedionato Eu0.01, La0.99 1-methylimidazole tris 1-phenyl-1,3-butanedionato Eu0.01, La0.99 triphenylphosphine oxide tris 1-phenyl-1,3-butanedionato Eu0.01, La0.99 2,2-bipyridyl tris 1-phenyl-1,3-butanedionato Eu0.01, La0.99 2,2-bipyridyl-N,N-dioxide tris 1-phenyl-1,3-butanedionato Eu0.01, La0.99 phenanthroline tris 1-phenyl-1,3-butanedionato Eu0.01, La0.99 bathocuproine tris 1-phenyl-1,3-butanedionato Eu0.01, La0.99 bathophenanthroline tris acetylacetonato Eu0.5, La0.5 dimethylaminopyridine tris acetylacetonato Eu0.5, La0.5 4-picoline-N-oxide tris acetylacetonato Eu0.5, La0.5 4-phenylpyridine tris acetylacetonato Eu0.5, La0.5 4-phenylpyridine-N-oxide tris acetylacetonato Eu0.5, La0.5 1-methylimidazole tris acetylacetonato Eu0.5, La0.5 triphenylphosphine oxide tris acetylacetonato Eu0.5, La0.5 2,2-bipyridyl tris acetylacetonato Eu0.5, La0.5 2,2-bipyridyl-N,N-dioxide tris acetylacetonato Eu0.5, La0.5 phenanthroline tris acetylacetonato Eu0.5, La0.5 bathocuproine tris acetylacetonato Eu0.5, La0.5 bathophenanthroline tris dibenzoylmethanato Eu0.5, La0.5 dimethylaminopyridine tris dibenzoylmethanato Eu0.5, La0.5 4-picoline-N-oxide tris dibenzoylmethanato Eu0.5, La0.5 4-phenylpyridine tris dibenzoylmethanato Eu0.5, La0.5 4-phenylpyridine-N-oxide tris dibenzoylmethanato Eu0.5, La0.5 1-methylimidazole tris dibenzoylmethanato Eu0.5, La0.5 triphenylphosphine oxide tris dibenzoylmethanato Eu0.5, La0.5 2,2-bipyridyl tris dibenzoylmethanato Eu0.5, La0.5 2,2-bipyridyl-N,N-dioxide tris dibenzoylmethanato Eu0.5, La0.5 phenanthroline tris dibenzoylmethanato Eu0.5, La0.5 bathocuproine tris dibenzoylmethanato Eu0.5, La0.5 bathophenanthroline tris thenoyltrifluoroacetonato Eu0.5, La0.5 dimethylaminopyridine
tris thenoyltrifluoroacetonato Eu0.5, La0.5 4-picoline-N-oxide
tris thenoyltrifluoroacetonato Eu0.5, La0.5 4-phenylpyridine
tris thenoyltrifluoroacetonato Eu0.5, La0.5 4-phenylpyridine-N-oxide
tris thenoyltrifluoroacetonato Eu0.5, La0.5 1-methylimidazole
tris thenoyltrifluoroacetonato Eu0.5, La0.5 triphenylphosphine oxide
tris thenoyltrifluoroacetonato Eu0.5, La0.5 2,2-bipyridyl
tris thenoyltrifluoroacetonato Eu0.5, La0.5 2,2-bipyridyl-N,N-dioxide
tris thenoyltrifluoroacetonato Eu0.5, La0.5 phenanthroline
tris thenoyltrifluoroacetonato Eu0.5, La0.5 bathocuproine
tris thenoyltrifluoroacetonato Eu0.5, La0.5 bathophenanthroline
tris 2,2,6,6-tetramethylheptanedionato Eu0.5, La0.5 dimethylaminopyridine
tris 2,2,6,6-tetramethylheptanedionato Eu0.5, La0.5 4-picoline-N-oxide
tris 2,2,6,6-tetramethylheptanedionato Eu0.5, La0.5 4-phenylpyridine
tris 2,2,6,6-tetramethylheptanedionato Eu0.5, La0.5 4-phenylpyridine-N-oxide
tris 2,2,6,6-tetramethylheptanedionato Eu0.5, La0.5 1-methylimidazole
tris 2,2,6,6-tetramethylheptanedionato Eu0.5, La0.5 triphenylphosphine oxide
tris 2,2,6,6-tetramethylheptanedionato Eu0.5, La0.5 2,2-bipyridyl
tris 2,2,6,6-tetramethylheptanedionato Eu0.5, La0.5 2,2-bipyridyl-N,N-dioxide
tris 2,2,6,6-tetramethylheptanedionato Eu0.5, La0.5 phenanthroline
tris 2,2,6,6-tetramethylheptanedionato Eu0.5, La0.5 bathocuproine
tris 2,2,6,6-tetramethylheptanedionato Eu0.5, La0.5 bathophenanthroline
tris 3-methylpentane-2,4-dionato Eu0.5, La0.5 dimethylaminopyridine
tris 3-methylpentane-2,4-dionato Eu0.5, La0.5 4-picoline-N-oxide
tris 3-methylpentane-2,4-dionato Eu0.5, La0.5 4-phenylpyridine
tris 3-methylpentane-2,4-dionato Eu0.5, La0.5 4-phenylpyridine-N-oxide
tris 3-methylpentane-2,4-dionato Eu0.5, La0.5 1-methylimidazole
tris 3-methylpentane-2,4-dionato Eu0.5, La0.5 triphenylphosphine oxide
tris 3-methylpentane-2,4-dionato Eu0.5, La0.5 2,2-bipyridyl
tris 3-methylpentane-2,4-dionato Eu0.5, La0.5 2,2-bipyridyl-N,N-dioxide
tris 3-methylpentane-2,4-dionato Eu0.5, La0.5 phenanthroline
tris 3-methylpentane-2,4-dionato Eu0.5, La0.5 bathocuproine
tris 3-methylpentane-2,4-dionato Eu0.5, La0.5 bathophenanthroline
tris 3-ethylpentane-2,4-dionato Eu0.5, La0.5 dimethylaminopyridine
tris 3-ethylpentane-2,4-dionato Eu0.5, La0.5 4-picoline-N-oxide
tris 3-ethylpentane-2,4-dionato Eu0.5, La0.5 4-phenylpyridine
tris 3-ethylpentane-2,4-dionato Eu0.5, La0.5 4-phenylpyridine-N-oxide
tris 3-ethylpentane-2,4-dionato Eu0.5, La0.5 1-methylimidazole
tris 3-ethylpentane-2,4-dionato Eu0.5, La0.5 triphenylphosphine oxide
tris 3-ethylpentane-2,4-dionato Eu0.5, La0.5 2,2-bipyridyl
tris 3-ethylpentane-2,4-dionato Eu0.5, La0.5 2,2-bipyridyl-N,N-dioxide
tris 3-ethylpentane-2,4-dionato Eu0.5, La0.5 phenanthroline
tris 3-ethylpentane-2,4-dionato Eu0.5, La0.5 bathocuproine
tris 3-ethylpentane-2,4-dionato Eu0.5, La0.5 bathophenanthroline
tris pivaloyltrifluoroacetonato Eu0.5, La0.5 dimethylaminopyridine
tris pivaloyltrifluoroacetonato Eu0.5, La0.5 4-picoline-N-oxide
tris pivaloyltrifluoroacetonato Eu0.5, La0.5 4-phenylpyridine
tris pivaloyltrifluoroacetonato Eu0.5, La0.5 4-phenylpyridine-N-oxide
tris pivaloyltrifluoroacetonato Eu0.5, La0.5 1-methylimidazole
tris pivaloyltrifluoroacetonato Eu0.5, La0.5 triphenylphosphine oxide
tris pivaloyltrifluoroacetonato Eu0.5, La0.5 2,2-bipyridyl
tris pivaloyltrifluoroacetonato Eu0.5, La0.5 2,2-bipyridyl-N,N-dioxide
tris pivaloyltrifluoroacetonato Eu0.5, La0.5 phenanthroline
tris pivaloyltrifluoroacetonato Eu0.5, La0.5 bathocuproine
tris pivaloyltrifluoroacetonato Eu0.5, La0.5 bathophenanthroline
tris trifluoroacetylacetonato Eu0.5, La0.5 dimethylaminopyridine
tris trifluoroacetylacetonato Eu0.5, La0.5 4-picoline-N-oxide
tris trifluoroacetylacetonato Eu0.5, La0.5 4-phenylpyridine
tris trifluoroacetylacetonato Eu0.5, La0.5 4-phenylpyridine-N-oxide
tris trifluoroacetylacetonato Eu0.5, La0.5 1-methylimidazole
tris trifluoroacetylacetonato Eu0.5, La0.5 triphenylphosphine oxide
tris trifluoroacetylacetonato Eu0.5, La0.5 2,2-bipyridyl
tris trifluoroacetylacetonato Eu0.5, La0.5 2,2-bipyridyl-N,N-dioxide
tris trifluoroacetylacetonato Eu0.5, La0.5 phenanthroline
tris trifluoroacetylacetonato Eu0.5, La0.5 bathocuproine
tris trifluoroacetylacetonato Eu0.5, La0.5 bathophenanthroline
tris hexafluoroacetylacetonato Eu0.5, La0.5 dimethylaminopyridine
tris hexafluoroacetylacetonato Eu0.5, La0.5 4-picoline-N-oxide
tris hexafluoroacetylacetonato Eu0.5, La0.5 4-phenylpyridine
tris hexafluoroacetylacetonato Eu0.5, La0.5 4-phenylpyridine-N-oxide
tris hexafluoroacetylacetonato Eu0.5, La0.5 1-methylimidazole
tris hexafluoroacetylacetonato Eu0.5, La0.5 triphenylphosphine oxide
tris hexafluoroacetylacetonato Eu0.5, La0.5 2,2-bipyridyl
tris hexafluoroacetylacetonato Eu0.5, La0.5 2,2-bipyridyl-N,N-dioxide
tris hexafluoroacetylacetonato Eu0.5, La0.5 phenanthroline
tris hexafluoroacetylacetonato Eu0.5, La0.5 bathocuproine tris hexafluoroacetylacetonato Eu0.5, La0.5 bathophenanthroline tris 6,6,7,7,8,8,8-heptafluoro-2,2-dimethyloctanedionato Eu0.5, La0.5 dimethylaminopyridine tris 6,6,7,7,8,8,8-heptafluoro-2,2-dimethyloctanedionato Eu0.5, La0.5 4-picoline-N-oxide tris 6,6,7,7,8,8,8-heptafluoro-2,2-dimethyloctanedionato Eu0.5, La0.5 4-phenylpyridine tris 6,6,7,7,8,8,8-heptafluoro-2,2-dimethyloctanedionato Eu0.5, La0.5 4-phenylpyridine-N-oxide tris 6,6,7,7,8,8,8-heptafluoro-2,2-dimethyloctanedionato Eu0.5, La0.5 1-methylimidazole tris 6,6,7,7,8,8,8-heptafluoro-2,2-dimethyloctanedionato Eu0.5, La0.5 triphenylphosphine oxide tris 6,6,7,7,8,8,8-heptafluoro-2,2-dimethyloctanedionato Eu0.5, La0.5 2,2-bipyridyl tris 6,6,7,7,8,8,8-heptafluoro-2,2-dimethyloctanedionato Eu0.5, La0.5 2,2-bipyridyl-N,N-dioxide tris 6,6,7,7,8,8,8-heptafluoro-2,2-dimethyloctanedionato Eu0.5, La0.5 phenanthroline tris 6,6,7,7,8,8,8-heptafluoro-2,2-dimethyloctanedionato Eu0.5, La0.5 bathocuproine tris 6,6,7,7,8,8,8-heptafluoro-2,2-dimethyloctanedionato Eu0.5, La0.5 bathophenanthroline tris 1-phenyl-1,3-butanedionato Eu0.5, La0.5 dimethylaminopyridine tris 1-phenyl-1,3-butanedionato Eu0.5, La0.5 4-picoline-N-oxide tris 1-phenyl-1,3-butanedionato Eu0.5, La0.5 4-phenylpyridine tris 1-phenyl-1,3-butanedionato Eu0.5, La0.5 4-phenylpyridine-N-oxide tris 1-phenyl-1,3-butanedionato Eu0.5, La0.5 1-methylimidazole tris 1-phenyl-1,3-butanedionato Eu0.5, La0.5 triphenylphosphine oxide tris 1-phenyl-1,3-butanedionato Eu0.5, La0.5 2,2-bipyridyl tris 1-phenyl-1,3-butanedionato Eu0.5, La0.5 2,2-bipyridyl-N,N-dioxide tris 1-phenyl-1,3-butanedionato Eu0.5, La0.5 phenanthroline tris 1-phenyl-1,3-butanedionato Eu0.5, La0.5 bathocuproine tris 1-phenyl-1,3-butanedionato Eu0.5, La0.5 bathophenanthroline tris acetylacetonato Eu0.2, La0.8 dimethylaminopyridine tris acetylacetonato Eu0.2, La0.8 4-picoline-N-oxide tris acetylacetonato Eu0.2, La0.8 4-phenylpyridine tris acetylacetonato Eu0.2, La0.8 4-phenylpyridine-N-oxide tris acetylacetonato Eu0.2, La0.8 1-methylimidazole tris acetylacetonato Eu0.2, La0.8 triphenylphosphine oxide tris acetylacetonato Eu0.2, La0.8 2,2-bipyridyl tris acetylacetonato Eu0.2, La0.8 2,2-bipyridyl-N,N-dioxide tris acetylacetonato Eu0.2, La0.8 phenanthroline tris acetylacetonato Eu0.2, La0.8 bathocuproine tris acetylacetonato Eu0.2, La0.8 bathophenanthroline tris dibenzoylmethanato Eu0.2, La0.8 dimethylaminopyridine tris dibenzoylmethanato Eu0.2, La0.8 4-picoline-N-oxide tris dibenzoylmethanato Eu0.2, La0.8 4-phenylpyridine tris dibenzoylmethanato Eu0.2, La0.8 4-phenylpyridine-N-oxide tris dibenzoylmethanato Eu0.2, La0.8 1-methylimidazole tris dibenzoylmethanato Eu0.2, La0.8 triphenylphosphine oxide tris dibenzoylmethanato Eu0.2, La0.8 2,2-bipyridyl tris dibenzoylmethanato Eu0.2, La0.8 2,2-bipyridyl-N,N-dioxide tris dibenzoylmethanato Eu0.2, La0.8 phenanthroline tris dibenzoylmethanato Eu0.2, La0.8 bathocuproine tris dibenzoylmethanato Eu0.2, La0.8 bathophenanthroline tris thenoyltrifluoroacetonato Eu0.2, La0.8 dimethylaminopyridine tris thenoyltrifluoroacetonato Eu0.2, La0.8 4-picoline-N-oxide tris thenoyltrifluoroacetonato Eu0.2, La0.8 4-phenylpyridine tris thenoyltrifluoroacetonato Eu0.2, La0.8 4-phenylpyridine-N-oxide tris thenoyltrifluoroacetonato Eu0.2, La0.8 1-methylimidazole tris thenoyltrifluoroacetonato Eu0.2, La0.8 triphenylphosphine oxide tris thenoyltrifluoroacetonato Eu0.2, La0.8 2,2-bipyridyl tris thenoyltrifluoroacetonato Eu0.2, La0.8 2,2-bipyridyl-N,N-dioxide tris thenoyltrifluoroacetonato Eu0.2, La0.8 phenanthroline tris thenoyltrifluoroacetonato Eu0.2, La0.8 bathocuproine tris thenoyltrifluoroacetonato Eu0.2, La0.8 bathophenanthroline tris 2,2,6,6-tetramethylheptanedionato Eu0.2, La0.8 dimethylaminopyridine tris 2,2,6,6-tetramethylheptanedionato Eu0.2, La0.8 4-picoline-N-oxide tris 2,2,6,6-tetramethylheptanedionato Eu0.2, La0.8 4-phenylpyridine tris 2,2,6,6-tetramethylheptanedionato Eu0.2, La0.8 4-phenylpyridine-N-oxide tris 2,2,6,6-tetramethylheptanedionato Eu0.2, La0.8 1-methylimidazole tris 2,2,6,6-tetramethylheptanedionato Eu0.2, La0.8 triphenylphosphine oxide tris 2,2,6,6-tetramethylheptanedionato Eu0.2, La0.8 2,2-bipyridyl tris 2,2,6,6-tetramethylheptanedionato Eu0.2, La0.8 2,2-bipyridyl-N,N-dioxide tris 2,2,6,6-tetramethylheptanedionato Eu0.2, La0.8 phenanthroline tris 2,2,6,6-tetramethylheptanedionato Eu0.2, La0.8 bathocuproine tris 2,2,6,6-tetramethylheptanedionato Eu0.2, La0.8 bathophenanthroline tris 3-methylpentane-2,4-dionato Eu0.2, La0.8 dimethylaminopyridine tris 3-methylpentane-2,4-dionato Eu0.2, La0.8 4-picoline-N-oxide tris 3-methylpentane-2,4-dionato Eu0.2, La0.8 4-phenylpyridine tris 3-methylpentane-2,4-dionato Eu0.2, La0.8 4-phenylpyridine-N-oxide tris 3-methylpentane-2,4-dionato Eu0.2, La0.8 1-methylimidazole tris 3-methylpentane-2,4-dionato Eu0.2, La0.8 triphenylphosphine oxide tris 3-methylpentane-2,4-dionato Eu0.2, La0.8 2,2-bipyridyl tris 3-methylpentane-2,4-dionato Eu0.2, La0.8 2,2-bipyridyl-N,N-dioxide tris 3-methylpentane-2,4-dionato Eu0.2, La0.8 phenanthroline tris 3-methylpentane-2,4-dionato Eu0.2, La0.8 bathocuproine tris 3-methylpentane-2,4-dionato Eu0.2, La0.8 bathophenanthroline tris 3-ethylpentane-2,4-dionato Eu0.2, La0.8 dimethylaminopyridine tris 3-ethylpentane-2,4-dionato Eu0.2, La0.8 4-picoline-N-oxide
tris 3-ethylpentane-2,4-dionato Eu0.2, La0.8 4-phenylpyridine
tris 3-ethylpentane-2,4-dionato Eu0.2, La0.8 4-phenylpyridine-N-oxide
tris 3-ethylpentane-2,4-dionato Eu0.2, La0.8 1-methylimidazole
tris 3-ethylpentane-2,4-dionato Eu0.2, La0.8 triphenylphosphine oxide
tris 3-ethylpentane-2,4-dionato Eu0.2, La0.8 2,2-bipyridyl
tris 3-ethylpentane-2,4-dionato Eu0.2, La0.8 2,2-bipyridyl-N,N-dioxide
tris 3-ethylpentane-2,4-dionato Eu0.2, La0.8 phenanthroline
tris 3-ethylpentane-2,4-dionato Eu0.2, La0.8 bathocuproine
tris 3-ethylpentane-2,4-dionato Eu0.2, La0.8 bathophenanthroline
tris pivaloyltrifluoroacetonato Eu0.2, La0.8 dimethylaminopyridine
tris pivaloyltrifluoroacetonato Eu0.2, La0.8 4-picoline-N-oxide
tris pivaloyltrifluoroacetonato Eu0.2, La0.8 4-phenylpyridine
tris pivaloyltrifluoroacetonato Eu0.2, La0.8 4-phenylpyridine-N-oxide
tris pivaloyltrifluoroacetonato Eu0.2, La0.8 1-methylimidazole
tris pivaloyltrifluoroacetonato Eu0.2, La0.8 triphenylphosphine oxide
tris pivaloyltrifluoroacetonato Eu0.2, La0.8 2,2-bipyridyl
tris pivaloyltrifluoroacetonato Eu0.2, La0.8 2,2-bipyridyl-N,N-dioxide
tris pivaloyltrifluoroacetonato Eu0.2, La0.8 phenanthroline
tris pivaloyltrifluoroacetonato Eu0.2, La0.8 bathocuproine
tris pivaloyltrifluoroacetonato Eu0.2, La0.8 bathophenanthroline
tris trifluoroacetylacetonato Eu0.2, La0.8 dimethylaminopyridine
tris trifluoroacetylacetonato Eu0.2, La0.8 4-picoline-N-oxide
tris trifluoroacetylacetonato Eu0.2, La0.8 4-phenylpyridine
tris trifluoroacetylacetonato Eu0.2, La0.8 4-phenylpyridine-N-oxide
tris trifluoroacetylacetonato Eu0.2, La0.8 1-methylimidazole
tris trifluoroacetylacetonato Eu0.2, La0.8 triphenylphosphine oxide
tris trifluoroacetylacetonato Eu0.2, La0.8 2,2-bipyridyl
tris trifluoroacetylacetonato Eu0.2, La0.8 2,2-bipyridyl-N,N-dioxide
tris trifluoroacetylacetonato Eu0.2, La0.8 phenanthroline
tris trifluoroacetylacetonato Eu0.2, La0.8 bathocuproine
tris trifluoroacetylacetonato Eu0.2, La0.8 bathophenanthroline
tris hexafluoroacetylacetonato Eu0.2, La0.8 dimethylaminopyridine
tris hexafluoroacetylacetonato Eu0.2, La0.8 4-picoline-N-oxide
tris hexafluoroacetylacetonato Eu0.2, La0.8 4-phenylpyridine
tris hexafluoroacetylacetonato Eu0.2, La0.8 4-phenylpyridine-N-oxide
tris hexafluoroacetylacetonato Eu0.2, La0.8 1-methylimidazole
tris hexafluoroacetylacetonato Eu0.2, La0.8 triphenylphosphine oxide
tris hexafluoroacetylacetonato Eu0.2, La0.8 2,2-bipyridyl
tris hexafluoroacetylacetonato Eu0.2, La0.8 2,2-bipyridyl-N,N-dioxide
tris hexafluoroacetylacetonato Eu0.2, La0.8 phenanthroline
tris hexafluoroacetylacetonato Eu0.2, La0.8 bathocuproine
tris hexafluoroacetylacetonato Eu0.2, La0.8 bathophenanthroline
tris 6,6,7,7,8,8,8-heptafluoro-2,2-dimethyloctanedionato Eu0.2, La0.8 dimethylaminopyridine
tris 6,6,7,7,8,8,8-heptafluoro-2,2-dimethyloctanedionato Eu0.2, La0.8 4-picoline-N-oxide
tris 6,6,7,7,8,8,8-heptafluoro-2,2-dimethyloctanedionato Eu0.2, La0.8 4-phenylpyridine
tris 6,6,7,7,8,8,8-heptafluoro-2,2-dimethyloctanedionato Eu0.2, La0.8 4-phenylpyridine-N-oxide
tris 6,6,7,7,8,8,8-heptafluoro-2,2-dimethyloctanedionato Eu0.2, La0.8 1-methylimidazole
tris 6,6,7,7,8,8,8-heptafluoro-2,2-dimethyloctanedionato Eu0.2, La0.8 triphenylphosphine oxide
tris 6,6,7,7,8,8,8-heptafluoro-2,2-dimethyloctanedionato Eu0.2, La0.8 2,2-bipyridyl
tris 6,6,7,7,8,8,8-heptafluoro-2,2-dimethyloctanedionato Eu0.2, La0.8 2,2-bipyridyl-N,N-dioxide
tris 6,6,7,7,8,8,8-heptafluoro-2,2-dimethyloctanedionato Eu0.2, La0.8 phenanthroline
tris 6,6,7,7,8,8,8-heptafluoro-2,2-dimethyloctanedionato Eu0.2, La0.8 bathocuproine
tris 6,6,7,7,8,8,8-heptafluoro-2,2-dimethyloctanedionato Eu0.2, La0.8 bathophenanthroline
tris 1-phenyl-1,3-butanedionato Eu0.2, La0.8 dimethylaminopyridine
tris 1-phenyl-1,3-butanedionato Eu0.2, La0.8 4-picoline-N-oxide
tris 1-phenyl-1,3-butanedionato Eu0.2, La0.8 4-phenylpyridine
tris 1-phenyl-1,3-butanedionato Eu0.2, La0.8 4-phenylpyridine-N-oxide
tris 1-phenyl-1,3-butanedionato Eu0.2, La0.8 1-methylimidazole
tris 1-phenyl-1,3-butanedionato Eu0.2, La0.8 triphenylphosphine oxide
tris 1-phenyl-1,3-butanedionato Eu0.2, La0.8 2,2-bipyridyl
tris 1-phenyl-1,3-butanedionato Eu0.2, La0.8 2,2-bipyridyl-N,N-dioxide
tris 1-phenyl-1,3-butanedionato Eu0.2, La0.8 phenanthroline
tris 1-phenyl-1,3-butanedionato Eu0.2, La0.8 bathocuproine
tris 1-phenyl-1,3-butanedionato Eu0.2, La0.8 bathophenanthroline
tris acetylacetonato Eu0.1, La0.9 dimethylaminopyridine
tris acetylacetonato Eu0.1, La0.9 4-picoline-N-oxide
tris acetylacetonato Eu0.1, La0.9 4-phenylpyridine
tris acetylacetonato Eu0.1, La0.9 4-phenylpyridine-N-oxide
tris acetylacetonato Eu0.1, La0.9 1-methylimidazole
tris acetylacetonato Eu0.1, La0.9 triphenylphosphine oxide
tris acetylacetonato Eu0.1, La0.9 2,2-bipyridyl
tris acetylacetonato Eu0.1, La0.9 2,2-bipyridyl-N,N-dioxide
tris acetylacetonato Eu0.1, La0.9 phenanthroline
tris acetylacetonato Eu0.1, La0.9 bathocuproine
tris acetylacetonato Eu0.1, La0.9 bathophenanthroline
tris dibenzoylmethanato Eu0.1, La0.9 dimethylaminopyridine
tris dibenzoylmethanato Eu0.1, La0.9 4-picoline-N-oxide
tris dibenzoylmethanato Eu0.1, La0.9 4-phenylpyridine
tris dibenzoylmethanato Eu0.1, La0.9 4-phenylpyridine-N-oxide
tris dibenzoylmethanato Eu0.1, La0.9 1-methylimidazole tris dibenzoylmethanato Eu0.1, La0.9 triphenylphosphine oxide
tris dibenzoylmethanato Eu0.1, La0.9 2,2-bipyridyl
tris dibenzoylmethanato Eu0.1, La0.9 2,2-bipyridyl-N,N-dioxide
tris dibenzoylmethanato Eu0.1, La0.9 phenanthroline
tris dibenzoylmethanato Eu0.1, La0.9 bathocuproine
tris dibenzoylmethanato Eu0.1, La0.9 bathophenanthroline
tris thenoyltrifluoroacetonato Eu0.1, La0.9 dimethylaminopyridine
tris thenoyltrifluoroacetonato Eu0.1, La0.9 4-picoline-N-oxide
tris thenoyltrifluoroacetonato Eu0.1, La0.9 4-phenylpyridine
tris thenoyltrifluoroacetonato Eu0.1, La0.9 4-phenylpyridine-N-oxide
tris thenoyltrifluoroacetonato Eu0.1, La0.9 1-methylimidazole
tris thenoyltrifluoroacetonato Eu0.1, La0.9 triphenylphosphine oxide
tris thenoyltrifluoroacetonato Eu0.1, La0.9 2,2-bipyridyl
tris thenoyltrifluoroacetonato Eu0.1, La0.9 2,2-bipyridyl-N,N-dioxide
tris thenoyltrifluoroacetonato Eu0.1, La0.9 phenanthroline
tris thenoyltrifluoroacetonato Eu0.1, La0.9 bathocuproine
tris thenoyltrifluoroacetonato Eu0.1, La0.9 bathophenanthroline
tris 2,2,6,6-tetramethylheptanedionato Eu0.1, La0.9 dimethylaminopyridine
tris 2,2,6,6-tetramethylheptanedionato Eu0.1, La0.9 4-picoline-N-oxide
tris 2,2,6,6-tetramethylheptanedionato Eu0.1, La0.9 4-phenylpyridine
tris 2,2,6,6-tetramethylheptanedionato Eu0.1, La0.9 4-phenylpyridine-N-oxide
tris 2,2,6,6-tetramethylheptanedionato Eu0.1, La0.9 1-methylimidazole
tris 2,2,6,6-tetramethylheptanedionato Eu0.1, La0.9 triphenylphosphine oxide
tris 2,2,6,6-tetramethylheptanedionato Eu0.1, La0.9 2,2-bipyridyl
tris 2,2,6,6-tetramethylheptanedionato Eu0.1, La0.9 2,2-bipyridyl-N,N-dioxide
tris 2,2,6,6-tetramethylheptanedionato Eu0.1, La0.9 phenanthroline
tris 2,2,6,6-tetramethylheptanedionato Eu0.1, La0.9 bathocuproine
tris 2,2,6,6-tetramethylheptanedionato Eu0.1, La0.9 bathophenanthroline
tris 3-methylpentane-2,4-dionato Eu0.1, La0.9 dimethylaminopyridine
tris 3-methylpentane-2,4-dionato Eu0.1, La0.9 4-picoline-N-oxide
tris 3-methylpentane-2,4-dionato Eu0.1, La0.9 4-phenylpyridine
tris 3-methylpentane-2,4-dionato Eu0.1, La0.9 4-phenylpyridine-N-oxide
tris 3-methylpentane-2,4-dionato Eu0.1, La0.9 1-methylimidazole
tris 3-methylpentane-2,4-dionato Eu0.1, La0.9 triphenylphosphine oxide
tris 3-methylpentane-2,4-dionato Eu0.1, La0.9 2,2-bipyridyl
tris 3-methylpentane-2,4-dionato Eu0.1, La0.9 2,2-bipyridyl-N,N-dioxide
tris 3-methylpentane-2,4-dionato Eu0.1, La0.9 phenanthroline
tris 3-methylpentane-2,4-dionato Eu0.1, La0.9 bathocuproine
tris 3-methylpentane-2,4-dionato Eu0.1, La0.9 bathophenanthroline
tris 3-ethylpentane-2,4-dionato Eu0.1, La0.9 dimethylaminopyridine
tris 3-ethylpentane-2,4-dionato Eu0.1, La0.9 4-picoline-N-oxide
tris 3-ethylpentane-2,4-dionato Eu0.1, La0.9 4-phenylpyridine
tris 3-ethylpentane-2,4-dionato Eu0.1, La0.9 4-phenylpyridine-N-oxide
tris 3-ethylpentane-2,4-dionato Eu0.1, La0.9 1-methylimidazole
tris 3-ethylpentane-2,4-dionato Eu0.1, La0.9 triphenylphosphine oxide
tris 3-ethylpentane-2,4-dionato Eu0.1, La0.9 2,2-bipyridyl
tris 3-ethylpentane-2,4-dionato Eu0.1, La0.9 2,2-bipyridyl-N,N-dioxide
tris 3-ethylpentane-2,4-dionato Eu0.1, La0.9 phenanthroline
tris 3-ethylpentane-2,4-dionato Eu0.1, La0.9 bathocuproine
tris 3-ethylpentane-2,4-dionato Eu0.1, La0.9 bathophenanthroline
tris pivaloyltrifluoroacetonato Eu0.1, La0.9 dimethylaminopyridine
tris pivaloyltrifluoroacetonato Eu0.1, La0.9 4-picoline-N-oxide
tris pivaloyltrifluoroacetonato Eu0.1, La0.9 4-phenylpyridine
tris pivaloyltrifluoroacetonato Eu0.1, La0.9 4-phenylpyridine-N-oxide
tris pivaloyltrifluoroacetonato Eu0.1, La0.9 1-methylimidazole
tris pivaloyltrifluoroacetonato Eu0.1, La0.9 triphenylphosphine oxide
tris pivaloyltrifluoroacetonato Eu0.1, La0.9 2,2-bipyridyl
tris pivaloyltrifluoroacetonato Eu0.1, La0.9 2,2-bipyridyl-N,N-dioxide
tris pivaloyltrifluoroacetonato Eu0.1, La0.9 phenanthroline
tris pivaloyltrifluoroacetonato Eu0.1, La0.9 bathocuproine
tris pivaloyltrifluoroacetonato Eu0.1, La0.9 bathophenanthroline
tris trifluoroacetylacetonato Eu0.1, La0.9 dimethylaminopyridine
tris trifluoroacetylacetonato Eu0.1, La0.9 4-picoline-N-oxide
tris trifluoroacetylacetonato Eu0.1, La0.9 4-phenylpyridine
tris trifluoroacetylacetonato Eu0.1, La0.9 4-phenylpyridine-N-oxide
tris trifluoroacetylacetonato Eu0.1, La0.9 1-methylimidazole
tris trifluoroacetylacetonato Eu0.1, La0.9 triphenylphosphine oxide
tris trifluoroacetylacetonato Eu0.1, La0.9 2,2-bipyridyl
tris trifluoroacetylacetonato Eu0.1, La0.9 2,2-bipyridyl-N,N-dioxide
tris trifluoroacetylacetonato Eu0.1, La0.9 phenanthroline
tris trifluoroacetylacetonato Eu0.1, La0.9 bathocuproine
tris trifluoroacetylacetonato Eu0.1, La0.9 bathophenanthroline
tris hexafluoroacetylacetonato Eu0.1, La0.9 dimethylaminopyridine
tris hexafluoroacetylacetonato Eu0.1, La0.9 4-picoline-N-oxide
tris hexafluoroacetylacetonato Eu0.1, La0.9 4-phenylpyridine
tris hexafluoroacetylacetonato Eu0.1, La0.9 4-phenylpyridine-N-oxide tris hexafluoroacetylacetonato Eu0.1, La0.9 1-methylimidazole
tris hexafluoroacetylacetonato Eu0.1, La0.9 triphenylphosphine oxide
tris hexafluoroacetylacetonato Eu0.1, La0.9 2,2-bipyridyl
tris hexafluoroacetylacetonato Eu0.1, La0.9 2,2-bipyridyl-N,N-dioxide
tris hexafluoroacetylacetonato Eu0.1, La0.9 phenanthroline
tris hexafluoroacetylacetonato Eu0.1, La0.9 bathocuproine
tris hexafluoroacetylacetonato Eu0.1, La0.9 bathophenanthroline
tris 6,6,7,7,8,8,8-heptafluoro-2,2-dimethyloctanedionato Eu0.1, La0.9 dimethylaminopyridine
tris 6,6,7,7,8,8,8-heptafluoro-2,2-dimethyloctanedionato Eu0.1, La0.9 4-picoline-N-oxide
tris 6,6,7,7,8,8,8-heptafluoro-2,2-dimethyloctanedionato Eu0.1, La0.9 4-phenylpyridine
tris 6,6,7,7,8,8,8-heptafluoro-2,2-dimethyloctanedionato Eu0.1, La0.9 4-phenylpyridine-N-oxide
tris 6,6,7,7,8,8,8-heptafluoro-2,2-dimethyloctanedionato Eu0.1, La0.9 1-methylimidazole
tris 6,6,7,7,8,8,8-heptafluoro-2,2-dimethyloctanedionato Eu0.1, La0.9 triphenylphosphine oxide
tris 6,6,7,7,8,8,8-heptafluoro-2,2-dimethyloctanedionato Eu0.1, La0.9 2,2-bipyridyl
tris 6,6,7,7,8,8,8-heptafluoro-2,2-dimethyloctanedionato Eu0.1, La0.9 2,2-bipyridyl-N,N-dioxide
tris 6,6,7,7,8,8,8-heptafluoro-2,2-dimethyloctanedionato Eu0.1, La0.9 phenanthroline
tris 6,6,7,7,8,8,8-heptafluoro-2,2-dimethyloctanedionato Eu0.1, La0.9 bathocuproine
tris 6,6,7,7,8,8,8-heptafluoro-2,2-dimethyloctanedionato Eu0.1, La0.9 bathophenanthroline
tris 1-phenyl-1,3-butanedionato Eu0.1, La0.9 dimethylaminopyridine
tris 1-phenyl-1,3-butanedionato Eu0.1, La0.9 4-picoline-N-oxide
tris 1-phenyl-1,3-butanedionato Eu0.1, La0.9 4-phenylpyridine
tris 1-phenyl-1,3-butanedionato Eu0.1, La0.9 4-phenylpyridine-N-oxide
tris 1-phenyl-1,3-butanedionato Eu0.1, La0.9 1-methylimidazole
tris 1-phenyl-1,3-butanedionato Eu0.1, La0.9 triphenylphosphine oxide
tris 1-phenyl-1,3-butanedionato Eu0.1, La0.9 2,2-bipyridyl
tris 1-phenyl-1,3-butanedionato Eu0.1, La0.9 2,2-bipyridyl-N,N-dioxide
tris 1-phenyl-1,3-butanedionato Eu0.1, La0.9 phenanthroline
tris 1-phenyl-1,3-butanedionato Eu0.1, La0.9 bathocuproine
tris 1-phenyl-1,3-butanedionato Eu0.1, La0.9 bathophenanthroline
tris acetylacetonato Eu0.01, La0.99 dimethylaminopyridine
tris acetylacetonato Eu0.01, La0.99 4-picoline-N-oxide
tris acetylacetonato Eu0.01, La0.99 4-phenylpyridine
tris acetylacetonato Eu0.01, La0.99 4-phenylpyridine-N-oxide
tris acetylacetonato Eu0.01, La0.99 1-methylimidazole
tris acetylacetonato Eu0.01, La0.99 triphenylphosphine oxide
tris acetylacetonato Eu0.01, La0.99 2,2-bipyridyl
tris acetylacetonato Eu0.01, La0.99 2,2-bipyridyl-N,N-dioxide
tris acetylacetonato Eu0.01, La0.99 phenanthroline
tris acetylacetonato Eu0.01, La0.99 bathocuproine
tris acetylacetonato Eu0.01, La0.99 bathophenanthroline
tris dibenzoylmethanato Eu0.01, La0.99 dimethylaminopyridine
tris dibenzoylmethanato Eu0.01, La0.99 4-picoline-N-oxide
tris dibenzoylmethanato Eu0.01, La0.99 4-phenylpyridine
tris dibenzoylmethanato Eu0.01, La0.99 4-phenylpyridine-N-oxide
tris dibenzoylmethanato Eu0.01, La0.99 1-methylimidazole
tris dibenzoylmethanato Eu0.01, La0.99 triphenylphosphine oxide
tris dibenzoylmethanato Eu0.01, La0.99 2,2-bipyridyl
tris dibenzoylmethanato Eu0.01, La0.99 2,2-bipyridyl-N,N-dioxide
tris dibenzoylmethanato Eu0.01, La0.99 phenanthroline
tris dibenzoylmethanato Eu0.01, La0.99 bathocuproine
tris dibenzoylmethanato Eu0.01, La0.99 bathophenanthroline
tris thenoyltrifluoroacetonato Eu0.01, La0.99 dimethylaminopyridine
tris thenoyltrifluoroacetonato Eu0.01, La0.99 4-picoline-N-oxide
tris thenoyltrifluoroacetonato Eu0.01, La0.99 4-phenylpyridine
tris thenoyltrifluoroacetonato Eu0.01, La0.99 4-phenylpyridine-N-oxide
tris thenoyltrifluoroacetonato Eu0.01, La0.99 1-methylimidazole
tris thenoyltrifluoroacetonato Eu0.01, La0.99 triphenylphosphine oxide
tris thenoyltrifluoroacetonato Eu0.01, La0.99 2,2-bipyridyl
tris thenoyltrifluoroacetonato Eu0.01, La0.99 2,2-bipyridyl-N,N-dioxide
tris thenoyltrifluoroacetonato Eu0.01, La0.99 phenanthroline
tris thenoyltrifluoroacetonato Eu0.01, La0.99 bathocuproine
tris thenoyltrifluoroacetonato Eu0.01, La0.99 bathophenanthroline
tris 2,2,6,6-tetramethylheptanedionato Eu0.01, La0.99 dimethylaminopyridine
tris 2,2,6,6-tetramethylheptanedionato Eu0.01, La0.99 4-picoline-N-oxide
tris 2,2,6,6-tetramethylheptanedionato Eu0.01, La0.99 4-phenylpyridine
tris 2,2,6,6-tetramethylheptanedionato Eu0.01, La0.99 4-phenylpyridine-N-oxide
tris 2,2,6,6-tetramethylheptanedionato Eu0.01, La0.99 1-methylimidazole
tris 2,2,6,6-tetramethylheptanedionato Eu0.01, La0.99 triphenylphosphine oxide
tris 2,2,6,6-tetramethylheptanedionato Eu0.01, La0.99 2,2-bipyridyl
tris 2,2,6,6-tetramethylheptanedionato Eu0.01, La0.99 2,2-bipyridyl-N,N-dioxide
tris 2,2,6,6-tetramethylheptanedionato Eu0.01, La0.99 phenanthroline
tris 2,2,6,6-tetramethylheptanedionato Eu0.01, La0.99 bathocuproine
tris 2,2,6,6-tetramethylheptanedionato Eu0.01, La0.99 bathophenanthroline
tris 3-methylpentane-2,4-dionato Eu0.01, La0.99 dimethylaminopyridine
tris 3-methylpentane-2,4-dionato Eu0.01, La0.99 4-picoline-N-oxide
tris 3-methylpentane-2,4-dionato Eu0.01, La0.99 4-phenylpyridine
tris 3-methylpentane-2,4-dionato Eu0.01, La0.99 4-phenylpyridine-N-oxide tris 3-methylpentane-2,4-dionato Eu0.01, La0.99 1-methylimidazole
tris 3-methylpentane-2,4-dionato Eu0.01, La0.99 triphenylphosphine oxide
tris 3-methylpentane-2,4-dionato Eu0.01, La0.99 2,2-bipyridyl
tris 3-methylpentane-2,4-dionato Eu0.01, La0.99 2,2-bipyridyl-N,N-dioxide
tris 3-methylpentane-2,4-dionato Eu0.01, La0.99 phenanthroline
tris 3-methylpentane-2,4-dionato Eu0.01, La0.99 bathocuproine
tris 3-methylpentane-2,4-dionato Eu0.01, La0.99 bathophenanthroline
tris 3-ethylpentane-2,4-dionato Eu0.01, La0.99 dimethylaminopyridine
tris 3-ethylpentane-2,4-dionato Eu0.01, La0.99 4-picoline-N-oxide
tris 3-ethylpentane-2,4-dionato Eu0.01, La0.99 4-phenylpyridine
tris 3-ethylpentane-2,4-dionato Eu0.01, La0.99 4-phenylpyridine-N-oxide
tris 3-ethylpentane-2,4-dionato Eu0.01, La0.99 1-methylimidazole
tris 3-ethylpentane-2,4-dionato Eu0.01, La0.99 triphenylphosphine oxide
tris 3-ethylpentane-2,4-dionato Eu0.01, La0.99 2,2-bipyridyl
tris 3-ethylpentane-2,4-dionato Eu0.01, La0.99 2,2-bipyridyl-N,N-dioxide
tris 3-ethylpentane-2,4-dionato Eu0.01, La0.99 phenanthroline
tris 3-ethylpentane-2,4-dionato Eu0.01, La0.99 bathocuproine
tris 3-ethylpentane-2,4-dionato Eu0.01, La0.99 bathophenanthroline
tris pivaloyltrifluoroacetonato Eu0.01, La0.99 dimethylaminopyridine
tris pivaloyltrifluoroacetonato Eu0.01, La0.99 4-picoline-N-oxide
tris pivaloyltrifluoroacetonato Eu0.01, La0.99 4-phenylpyridine
tris pivaloyltrifluoroacetonato Eu0.01, La0.99 4-phenylpyridine-N-oxide
tris pivaloyltrifluoroacetonato Eu0.01, La0.99 1-methylimidazole
tris pivaloyltrifluoroacetonato Eu0.01, La0.99 triphenylphosphine oxide
tris pivaloyltrifluoroacetonato Eu0.01, La0.99 2,2-bipyridyl
tris pivaloyltrifluoroacetonato Eu0.01, La0.99 2,2-bipyridyl-N,N-dioxide
tris pivaloyltrifluoroacetonato Eu0.01, La0.99 phenanthroline
tris pivaloyltrifluoroacetonato Eu0.01, La0.99 bathocuproine
tris pivaloyltrifluoroacetonato Eu0.01, La0.99 bathophenanthroline
tris trifluoroacetylacetonato Eu0.01, La0.99 dimethylaminopyridine
tris trifluoroacetylacetonato Eu0.01, La0.99 4-picoline-N-oxide
tris trifluoroacetylacetonato Eu0.01, La0.99 4-phenylpyridine
tris trifluoroacetylacetonato Eu0.01, La0.99 4-phenylpyridine-N-oxide
tris trifluoroacetylacetonato Eu0.01, La0.99 1-methylimidazole
tris trifluoroacetylacetonato Eu0.01, La0.99 triphenylphosphine oxide
tris trifluoroacetylacetonato Eu0.01, La0.99 2,2-bipyridyl
tris trifluoroacetylacetonato Eu0.01, La0.99 2,2-bipyridyl-N,N-dioxide
tris trifluoroacetylacetonato Eu0.01, La0.99 phenanthroline
tris trifluoroacetylacetonato Eu0.01, La0.99 bathocuproine
tris trifluoroacetylacetonato Eu0.01, La0.99 bathophenanthroline
tris hexafluoroacetylacetonato Eu0.01, La0.99 dimethylaminopyridine
tris hexafluoroacetylacetonato Eu0.01, La0.99 4-picoline-N-oxide
tris hexafluoroacetylacetonato Eu0.01, La0.99 4-phenylpyridine
tris hexafluoroacetylacetonato Eu0.01, La0.99 4-phenylpyridine-N-oxide
tris hexafluoroacetylacetonato Eu0.01, La0.99 1-methylimidazole
tris hexafluoroacetylacetonato Eu0.01, La0.99 triphenylphosphine oxide
tris hexafluoroacetylacetonato Eu0.01, La0.99 2,2-bipyridyl
tris hexafluoroacetylacetonato Eu0.01, La0.99 2,2-bipyridyl-N,N-dioxide
tris hexafluoroacetylacetonato Eu0.01, La0.99 phenanthroline
tris hexafluoroacetylacetonato Eu0.01, La0.99 bathocuproine
tris hexafluoroacetylacetonato Eu0.01, La0.99 bathophenanthroline
tris 6,6,7,7,8,8,8-heptafluoro-2,2-dimethyloctanedionato Eu0.01, La0.99 dimethylaminopyridine
tris 6,6,7,7,8,8,8-heptafluoro-2,2-dimethyloctanedionato Eu0.01, La0.99 4-picoline-N-oxide
tris 6,6,7,7,8,8,8-heptafluoro-2,2-dimethyloctanedionato Eu0.01, La0.99 4-phenylpyridine
tris 6,6,7,7,8,8,8-heptafluoro-2,2-dimethyloctanedionato Eu0.01, La0.99 4-phenylpyridine-N-oxide
tris 6,6,7,7,8,8,8-heptafluoro-2,2-dimethyloctanedionato Eu0.01, La0.99 1-methylimidazole
tris 6,6,7,7,8,8,8-heptafluoro-2,2-dimethyloctanedionato Eu0.01, La0.99 triphenylphosphine oxide
tris 6,6,7,7,8,8,8-heptafluoro-2,2-dimethyloctanedionato Eu0.01, La0.99 2,2-bipyridyl
tris 6,6,7,7,8,8,8-heptafluoro-2,2-dimethyloctanedionato Eu0.01, La0.99 2,2-bipyridyl-N,N-dioxide
tris 6,6,7,7,8,8,8-heptafluoro-2,2-dimethyloctanedionato Eu0.01, La0.99 phenanthroline
tris 6,6,7,7,8,8,8-heptafluoro-2,2-dimethyloctanedionato Eu0.01, La0.99 bathocuproine
tris 6,6,7,7,8,8,8-heptafluoro-2,2-dimethyloctanedionato Eu0.01, La0.99 bathophenanthroline
tris 1-phenyl-1,3-butanedionato Eu0.01, La0.99 dimethylaminopyridine
tris 1-phenyl-1,3-butanedionato Eu0.01, La0.99 4-picoline-N-oxide
tris 1-phenyl-1,3-butanedionato Eu0.01, La0.99 4-phenylpyridine
tris 1-phenyl-1,3-butanedionato Eu0.01, La0.99 4-phenylpyridine-N-oxide
tris 1-phenyl-1,3-butanedionato Eu0.01, La0.99 1-methylimidazole
tris 1-phenyl-1,3-butanedionato Eu0.01, La0.99 triphenylphosphine oxide
tris 1-phenyl-1,3-butanedionato Eu0.01, La0.99 2,2-bipyridyl tris 1-phenyl-1,3-butanedionato Eu0.01, La0.99 2,2-bipyridyl-N,N-dioxide
tris 1-phenyl-1,3-butanedionato Eu0.01, La0.99 phenanthroline
tris 1-phenyl-1,3-butanedionato Eu0.01, La0.99 bathocuproine
tris 1-phenyl-1,3-butanedionato Eu0.01, La0.99 bathophenanthroline
tris acetylacetonato Tb0.5, Gd0.5 dimethylaminopyridine
tris acetylacetonato Tb0.5, Gd0.5 4-picoline-N-oxide
tris acetylacetonato Tb0.5, Gd0.5 4-phenylpyridine
tris acetylacetonato Tb0.5, Gd0.5 4-phenylpyridine-N-oxide
tris acetylacetonato Tb0.5, Gd0.5 1-methylimidazole
tris acetylacetonato Tb0.5, Gd0.5 triphenylphosphine oxide
tris acetylacetonato Tb0.5, Gd0.5 2,2-bipyridyl
tris acetylacetonato Tb0.5, Gd0.5 2,2-bipyridyl-N,N-dioxide
tris acetylacetonato Tb0.5, Gd0.5 phenanthroline
tris acetylacetonato Tb0.5, Gd0.5 bathocuproine
tris acetylacetonato Tb0.5, Gd0.5 bathophenanthroline
tris dibenzoylmethanato Tb0.5, Gd0.5 dimethylaminopyridine
tris dibenzoylmethanato Tb0,5, Gd0.5 4-picoline-N-oxide
tris dibenzoylmethanato Tb0.5, Gd0.5 4-phenylpyridine
tris dibenzoylmethanato Tb0.5, Gd0.5 4-phenylpyridine-N-oxide
tris dibenzoylmethanato Tb0.5, Gd0.5 1-methylimidazole
tris dibenzoylmethanato Tb0.5, Gd0.5 triphenylphosphine oxide
tris dibenzoylmethanato Tb0.5, Gd0.5 2,2-bipyridyl
tris dibenzoylmethanato Tb0.5, Gd0.5 2,2-bipyridyl-N,N-dioxide
tris dibenzoylmethanato Tb0.5, Gd0.5 phenanthroline
tris dibenzoylmethanato Tb0.5, Gd0.5 bathocuproine
tris dibenzoylmethanato Tb0.5, Gd0.5 bathophenanthroline
tris thenoyltrifluoroacetonato Tb0.5, Gd0.5 dimethylaminopyridine
tris thenoyltrifluoroacetonato Tb0.5, Gd0.5 4-picoline-N-oxide
tris thenoyltrifluoroacetonato Tb0.5, Gd0.5 4-phenylpyridine
tris thenoyltrifluoroacetonato Tb0.5, Gd0.5 4-phenylpyridine-N-oxide
tris thenoyltrifluoroacetonato Tb0.5, Gd0.5 1-methylimidazole
tris thenoyltrifluoroacetonato Tb0.5, Gd0.5 triphenylphosphine oxide
tris thenoyltrifluoroacetonato Tb0.5, Gd0.5 2,2-bipyridyl
tris thenoyltrifluoroacetonato Tb0.5, Gd0.5 2,2-bipyridyl-N,N-dioxide
tris thenoyltrifluoroacetonato Tb0.5, Gd0.5 phenanthroline
tris thenoyltrifluoroacetonato Tb0.5, Gd0.5 bathocuproine
tris thenoyltrifluoroacetonato Tb0.5, Gd0.5 bathophenanthroline
tris 2,2,6,6-tetramethylheptanedionato Tb0.5, Gd0.5 dimethylaminopyridine
tris 2,2,6,6-tetramethylheptanedionato Tb0.5, Gd0.5 4-picoline-N-oxide
tris 2,2,6,6-tetramethylheptanedionato Tb0.5, Gd0.5 4-phenylpyridine
tris 2,2,6,6-tetramethylheptanedionato Tb0.5, Gd0.5 4-phenylpyridine-N-oxide
tris 2,2,6,6-tetramethylheptanedionato Tb0.5, Gd0.5 1-methylimidazole
tris 2,2,6,6-tetramethylheptanedionato Tb0.5, Gd0.5 triphenylphosphine oxide
tris 2,2,6,6-tetramethylheptanedionato Tb0.5, Gd0.5 2,2-bipyridyl
tris 2,2,6,6-tetramethylheptanedionato Tb0.5, Gd0.5 2,2-bipyridyl-N,N-dioxide
tris 2,2,6,6-tetramethylheptanedionato Tb0.5, Gd0.5 phenanthroline
tris 2,2,6,6-tetramethylheptanedionato Tb0.5, Gd0.5 bathocuproine
tris 2,2,6,6-tetramethylheptanedionato Tb0.5, Gd0.5 bathophenanthroline
tris 3-methylpentane-2,4-dionato Tb0.5, Gd0.5 dimethylaminopyridine
tris 3-methylpentane-2,4-dionato Tb0.5, Gd0.5 4-picoline-N-oxide
tris 3-methylpentane-2,4-dionato Tb0.5, Gd0.5 4-phenylpyridine
tris 3-methylpentane-2,4-dionato Tb0.5, Gd0.5 4-phenylpyridine-N-oxide
tris 3-methylpentane-2,4-dionato Tb0.5, Gd0.5 1-methylimidazole
tris 3-methylpentane-2,4-dionato Tb0.5, Gd0.5 triphenylphosphine oxide
tris 3-methylpentane-2,4-dionato Tb0.5, Gd0.5 2,2-bipyridyl
tris 3-methylpentane-2,4-dionato Tb0.5, Gd0.5 2,2-bipyridyl-N,N-dioxide
tris 3-methylpentane-2,4-dionato Tb0.5, Gd0.5 phenanthroline
tris 3-methylpentane-2,4-dionato Tb0.5, Gd0.5 bathocuproine
tris 3-methylpentane-2,4-dionato Tb0.5, Gd0.5 bathophenanthroline
tris 3-ethylpentane-2,4-dionato Tb0.5, Gd0.5 dimethylaminopyridine
tris 3-ethylpentane-2,4-dionato Tb0.5, Gd0.5 4-picoline-N-oxide
tris 3-ethylpentane-2,4-dionato Tb0.5, Gd0.5 4-phenylpyridine
tris 3-ethylpentane-2,4-dionato Tb0.5, Gd0.5 4-phenylpyridine-N-oxide
tris 3-ethylpentane-2,4-dionato Tb0.5, Gd0.5 1-methylimidazole
tris 3-ethylpentane-2,4-dionato Tb0.5, Gd0.5 triphenylphosphine oxide
tris 3-ethylpentane-2,4-dionato Tb0.5, Gd0.5 2,2-bipyridyl
tris 3-ethylpentane-2,4-dionato Tb0.5, Gd0.5 2,2-bipyridyl-N,N-dioxide
tris 3-ethylpentane-2,4-dionato Tb0.5, Gd0.5 phenanthroline
tris 3-ethylpentane-2,4-dionato Tb0.5, Gd0.5 bathocuproine
tris 3-ethylpentane-2,4-dionato Tb0.5, Gd0.5 bathophenanthroline
tris pivaloyltrifluoroacetonato Tb0.5, Gd0.5 dimethylaminopyridine
tris pivaloyltrifluoroacetonato Tb0.5, Gd0.5 4-picoline-N-oxide
tris pivaloyltrifluoroacetonato Tb0.5, Gd0.5 4-phenylpyridine
tris pivaloyltrifluoroacetonato Tb0.5, Gd0.5 4-phenylpyridine-N-oxide
tris pivaloyltrifluoroacetonato Tb0.5, Gd0.5 1-methylimidazole
tris pivaloyltrifluoroacetonato Tb0.5, Gd0.5 triphenylphosphine oxide
tris pivaloyltrifluoroacetonato Tb0.5, Gd0.5 2,2-bipyridyl
tris pivaloyltrifluoroacetonato Tb0.5, Gd0.5 2,2-bipyridyl-N,N-dioxide
tris pivaloyltrifluoroacetonato Tb0.5, Gd0.5 phenanthroline
tris pivaloyltrifluoroacetonato Tb0.5, Gd0.5 bathocuproine tris pivaloyltrifluoroacetonato Tb0.5, Gd0.5 bathophenanthroline
tris trifluoroacetylacetonato Tb0.5, Gd0.5 dimethylaminopyridine
tris trifluoroacetylacetonato Tb0.5, Gd0.5 4-picoline-N-oxide
tris trifluoroacetylacetonato Tb0.5, Gd0.5 4-phenylpyridine
tris trifluoroacetylacetonato Tb0.5, Gd0.5 4-phenylpyridine-N-oxide
tris trifluoroacetylacetonato Tb0.5, Gd0.5 1-methylimidazole
tris trifluoroacetylacetonato Tb0.5, Gd0.5 triphenylphosphine oxide
tris trifluoroacetylacetonato Tb0.5, Gd0.5 2,2-bipyridyl
tris trifluoroacetylacetonato Tb0.5, Gd0.5 2,2-bipyridyl-N,N-dioxide
tris trifluoroacetylacetonato Tb0.5, Gd0.5 phenanthroline
tris trifluoroacetylacetonato Tb0.5, Gd0.5 bathocuproine
tris trifluoroacetylacetonato Tb0.5, Gd0.5 bathophenanthroline
tris hexafluoroacetylacetonato Tb0.5, Gd0.5 dimethylaminopyridine
tris hexafluoroacetylacetonato Tb0.5, Gd0.5 4-picoline-N-oxide
tris hexafluoroacetylacetonato Tb0.5, Gd0.5 4-phenylpyridine
tris hexafluoroacetylacetonato Tb0.5, Gd0.5 4-phenylpyridine-N-oxide
tris hexafluoroacetylacetonato Tb0.5, Gd0.5 1-methylimidazole
tris hexafluoroacetylacetonato Tb0.5, Gd0.5 triphenylphosphine oxide
tris hexafluoroacetylacetonato Tb0.5, Gd0.5 2,2-bipyridyl
tris hexafluoroacetylacetonato Tb0.5, Gd0.5 2,2-bipyridyl-N,N-dioxide
tris hexafluoroacetylacetonato Tb0.5, Gd0.5 phenanthroline
tris hexafluoroacetylacetonato Tb0.5, Gd0.5 bathocuproine
tris hexafluoroacetylacetonato Tb0.5, Gd0.5 bathophenanthroline
tris 6,6,7,7,8,8,8-heptafluoro-2,2-dimethyloctanedionato Tb0.5, Gd0.5 dimethylaminopyridine
tris 6,6,7,7,8,8,8-heptafluoro-2,2-dimethyloctanedionato Tb0.5, Gd0.5 4-picoline-N-oxide
tris 6,6,7,7,8,8,8-heptafluoro-2,2-dimethyloctanedionato Tb0.5, Gd0.5 4-phenylpyridine
tris 6,6,7,7,8,8,8-heptafluoro-2,2-dimethyloctanedionato Tb0.5, Gd0.5 4-phenylpyridine-N-oxide
tris 6,6,7,7,8,8,8-heptafluoro-2,2-dimethyloctanedionato Tb0.5, Gd0.5 1-methylimidazole
tris 6,6,7,7,8,8,8-heptafluoro-2,2-dimethyloctanedionato Tb0.5, Gd0.5 triphenylphosphine oxide
tris 6,6,7,7,8,8,8-heptafluoro-2,2-dimethyloctanedionato Tb0.5, Gd0.5 2,2-bipyridyl
tris 6,6,7,7,8,8,8-heptafluoro-2,2-dimethyloctanedionato Tb0.5, Gd0.5 2,2-bipyridyl-N,N-dioxide
tris 6,6,7,7,8,8,8-heptafluoro-2,2-dimethyloctanedionato Tb0.5, Gd0.5 phenanthroline
tris 6,6,7,7,8,8,8-heptafluoro-2,2-dimethyloctanedionato Tb0.5, Gd0.5 bathocuproine
tris 6,6,7,7,8,8,8-heptafluoro-2,2-dimethyloctanedionato Tb0.5, Gd0.5 bathophenanthroline
tris 1-phenyl-1,3-butanedionato Tb0.5, Gd0.5 dimethylaminopyridine
tris 1-phenyl-1,3-butanedionato Tb0.5, Gd0.5 4-picoline-N-oxide
tris 1-phenyl-1,3-butanedionato Tb0.5, Gd0.5 4-phenylpyridine
tris 1-phenyl-1,3-butanedionato Tb0.5, Gd0.5 4-phenylpyridine-N-oxide
tris 1-phenyl-1,3-butanedionato Tb0.5, Gd0.5 1-methylimidazole
tris 1-phenyl-1,3-butanedionato Tb0.5, Gd0.5 triphenylphosphine oxide
tris 1-phenyl-1,3-butanedionato Tb0.5, Gd0.5 2,2-bipyridyl
tris 1-phenyl-1,3-butanedionato Tb0.5, Gd0.5 2,2-bipyridyl-N,N-dioxide
tris 1-phenyl-1,3-butanedionato Tb0.5, Gd0.5 phenanthroline
tris 1-phenyl-1,3-butanedionato Tb0.5, Gd0.5 bathocuproine
tris 1-phenyl-1,3-butanedionato Tb0.5, Gd0.5 bathophenanthroline
tris acetylacetonato Tb0.2, Gd0.8 dimethylaminopyridine
tris acetylacetonato Tb0.2, Gd0.8 4-picoline-N-oxide
tris acetylacetonato Tb0.2, Gd0.8 4-phenylpyridine
tris acetylacetonato Tb0.2, Gd0.8 4-phenylpyridine-N-oxide
tris acetylacetonato Tb0.2, Gd0.8 1-methylimidazole
tris acetylacetonato Tb0.2, Gd0.8 triphenylphosphine oxide
tris acetylacetonato Tb0.2, Gd0.8 2,2-bipyridyl
tris acetylacetonato Tb0.2, Gd0.8 2,2-bipyridyl-N,N-dioxide
tris acetylacetonato Tb0.2, Gd0.8 phenanthroline
tris acetylacetonato Tb0.2, Gd0.8 bathocuproine
tris acetylacetonato Tb0.2, Gd0.8 bathophenanthroline
tris dibenzoylmethanato Tb0.2, Gd0.8 dimethylaminopyridine
tris dibenzoylmethanato Tb0.2, Gd0.8 4-picoline-N-oxide
tris dibenzoylmethanato Tb0.2, Gd0.8 4-phenylpyridine
tris dibenzoylmethanato Tb0.2, Gd0.8 4-phenylpyridine-N-oxide
tris dibenzoylmethanato Tb0.2, Gd0.8 1-methylimidazole
tris dibenzoylmethanato Tb0.2, Gd0.8 triphenylphosphine oxide
tris dibenzoylmethanato Tb0.2, Gd0.8 2,2-bipyridyl
tris dibenzoylmethanato Tb0.2, Gd0.8 2,2-bipyridyl-N,N-dioxide
tris dibenzoylmethanato Tb0.2, Gd0.8 phenanthroline
tris dibenzoylmethanato Tb0.2, Gd0.8 bathocuproine
tris dibenzoylmethanato Tb0.2, Gd0.8 bathophenanthroline
tris thenoyltrifluoroacetonato Tb0.2, Gd0.8 dimethylaminopyridine
tris thenoyltrifluoroacetonato Tb0.2, Gd0.8 4-picoline-N-oxide
tris thenoyltrifluoroacetonato Tb0.2, Gd0.8 4-phenylpyridine
tris thenoyltrifluoroacetonato Tb0.2, Gd0.8 4-phenylpyridine-N-oxide
tris thenoyltrifluoroacetonato Tb0.2, Gd0.8 1-methylimidazole
tris thenoyltrifluoroacetonato Tb0.2, Gd0.8 triphenylphosphine oxide
tris thenoyltrifluoroacetonato Tb0.2, Gd0.8 2,2-bipyridyl
tris thenoyltrifluoroacetonato Tb0.2, Gd0.8 2,2-bipyridyl-N,N-dioxide
tris thenoyltrifluoroacetonato Tb0.2, Gd0.8 phenanthroline
tris thenoyltrifluoroacetonato Tb0.2, Gd0.8 bathocuproine
tris thenoyltrifluoroacetonato Tb0.2, Gd0.8 bathophenanthroline
tris 2,2,6,6-tetramethylheptanedionato Tb0.2, Gd0.8 dimethylaminopyridine
tris 2,2,6,6-tetramethylheptanedionato Tb0.2, Gd0.8 4-picoline-N-oxide
tris 2,2,6,6-tetramethylheptanedionato Tb0.2, Gd0.8 4-phenylpyridine
tris 2,2,6,6-tetramethylheptanedionato Tb0.2, Gd0.8 4-phenylpyridine-N-oxide tris 2,2,6,6-tetramethylheptanedionato Tb0.2, Gd0.8 1-methylimidazole
tris 2,2,6,6-tetramethylheptanedionato Tb0.2, Gd0.8 triphenylphosphine oxide
tris 2,2,6,6-tetramethylheptanedionato Tb0.2, Gd0.8 2,2-bipyridyl
tris 2,2,6,6-tetramethylheptanedionato Tb0.2, Gd0.8 2,2-bipyridyl-N,N-dioxide
tris 2,2,6,6-tetramethylheptanedionato Tb0.2, Gd0.8 phenanthroline
tris 2,2,6,6-tetramethylheptanedionato Tb0.2, Gd0.8 bathocuproine
tris 2,2,6,6-tetramethylheptanedionato Tb0.2, Gd0.8 bathophenanthroline
tris 3-methylpentane-2,4-dionato Tb0.2, Gd0.8 dimethylaminopyridine
tris 3-methylpentane-2,4-dionato Tb0.2, Gd0.8 4-picoline-N-oxide
tris 3-methylpentane-2,4-dionato Tb0.2, Gd0.8 4-phenylpyridine
tris 3-methylpentane-2,4-dionato Tb0.2, Gd0.8 4-phenylpyridine-N-oxide
tris 3-methylpentane-2,4-dionato Tb0.2, Gd0.8 1-methylimidazole
tris 3-methylpentane-2,4-dionato Tb0.2, Gd0.8 triphenylphosphine oxide
tris 3-methylpentane-2,4-dionato Tb0.2, Gd0.8 2,2-bipyridyl
tris 3-methylpentane-2,4-dionato Tb0.2, Gd0.8 2,2-bipyridyl-N,N-dioxide
tris 3-methylpentane-2,4-dionato Tb0.2, Gd0.8 phenanthroline
tris 3-methylpentane-2,4-dionato Tb0.2, Gd0.8 bathocuproine
tris 3-methylpentane-2,4-dionato Tb0.2, Gd0.8 bathophenanthroline
tris 3-ethylpentane-2,4-dionato Tb0.2, Gd0.8 dimethylaminopyridine
tris 3-ethylpentane-2,4-dionato Tb0.2, Gd0.8 4-picoline-N-oxide
tris 3-ethylpentane-2,4-dionato Tb0.2, Gd0.8 4-phenylpyridine
tris 3-ethylpentane-2,4-dionato Tb0.2, Gd0.8 4-phenylpyridine-N-oxide
tris 3-ethylpentane-2,4-dionato Tb0.2, Gd0.8 1-methylimidazole
tris 3-ethylpentane-2,4-dionato Tb0.2, Gd0.8 triphenylphosphine oxide
tris 3-ethylpentane-2,4-dionato Tb0.2, Gd0.8 2,2-bipyridyl
tris 3-ethylpentane-2,4-dionato Tb0.2, Gd0.8 2,2-bipyridyl-N,N-dioxide
tris 3-ethylpentane-2,4-dionato Tb0.2, Gd0.8 phenanthroline
tris 3-ethylpentane-2,4-dionato Tb0.2, Gd0.8 bathocuproine
tris 3-ethylpentane-2,4-dionato Tb0.2, Gd0.8 bathophenanthroline
tris pivaloyltrifluoroacetonato Tb0.2, Gd0.8 dimethylaminopyridine
tris pivaloyltrifluoroacetonato Tb0.2, Gd0.8 4-picoline-N-oxide
tris pivaloyltrifluoroacetonato Tb0.2, Gd0.8 4-phenylpyridine
tris pivaloyltrifluoroacetonato Tb0.2, Gd0.8 4-phenylpyridine-N-oxide
tris pivaloyltrifluoroacetonato Tb0.2, Gd0.8 1-methylimidazole
tris pivaloyltrifluoroacetonato Tb0.2, Gd0.8 triphenylphosphine oxide
tris pivaloyltrifluoroacetonato Tb0.2, Gd0.8 2,2-bipyridyl
tris pivaloyltrifluoroacetonato Tb0.2, Gd0.8 2,2-bipyridyl-N,N-dioxide
tris pivaloyltrifluoroacetonato Tb0.2, Gd0.8 phenanthroline
tris pivaloyltrifluoroacetonato Tb0.2, Gd0.8 bathocuproine
tris pivaloyltrifluoroacetonato Tb0.2, Gd0.8 bathophenanthroline
tris trifluoroacetylacetonato Tb0.2, Gd0.8 dimethylaminopyridine
tris trifluoroacetylacetonato Tb0.2, Gd0.8 4-picoline-N-oxide
tris trifluoroacetylacetonato Tb0.2, Gd0.8 4-phenylpyridine
tris trifluoroacetylacetonato Tb0.2, Gd0.8 4-phenylpyridine-N-oxide
tris trifluoroacetylacetonato Tb0.2, Gd0.8 1-methylimidazole
tris trifluoroacetylacetonato Tb0.2, Gd0.8 triphenylphosphine oxide
tris trifluoroacetylacetonato Tb0.2, Gd0.8 2,2-bipyridyl
tris trifluoroacetylacetonato Tb0.2, Gd0.8 2,2-bipyridyl-N,N-dioxide
tris trifluoroacetylacetonato Tb0.2, Gd0.8 phenanthroline
tris trifluoroacetylacetonato Tb0.2, Gd0.8 bathocuproine
tris trifluoroacetylacetonato Tb0.2, Gd0.8 bathophenanthroline
tris hexafluoroacetylacetonato Tb0.2, Gd0.8 dimethylaminopyridine
tris hexafluoroacetylacetonato Tb0.2, Gd0.8 4-picoline-N-oxide
tris hexafluoroacetylacetonato Tb0.2, Gd0.8 4-phenylpyridine
tris hexafluoroacetylacetonato Tb0.2, Gd0.8 4-phenylpyridine-N-oxide
tris hexafluoroacetylacetonato Tb0.2, Gd0.8 1-methylimidazole
tris hexafluoroacetylacetonato Tb0.2, Gd0.8 triphenylphosphine oxide
tris hexafluoroacetylacetonato Tb0.2, Gd0.8 2,2-bipyridyl
tris hexafluoroacetylacetonato Tb0.2, Gd0.8 2,2-bipyridyl-N,N-dioxide
tris hexafluoroacetylacetonato Tb0.2, Gd0.8 phenanthroline
tris hexafluoroacetylacetonato Tb0.2, Gd0.8 bathocuproine
tris hexafluoroacetylacetonato Tb0.2, Gd0.8 bathophenanthroline
tris 6,6,7,7,8,8,8-heptafluoro-2,2-dimethyloctanedionato Tb0.2, Gd0.8 dimethylaminopyridine
tris 6,6,7,7,8,8,8-heptafluoro-2,2-dimethyloctanedionato Tb0.2, Gd0.8 4-picoline-N-oxide
tris 6,6,7,7,8,8,8-heptafluoro-2,2-dimethyloctanedionato Tb0.2, Gd0.8 4-phenylpyridine
tris 6,6,7,7,8,8,8-heptafluoro-2,2-dimethyloctanedionato Tb0.2, Gd0.8 4-phenylpyridine-N-oxide
tris 6,6,7,7,8,8,8-heptafluoro-2,2-dimethyloctanedionato Tb0.2, Gd0.8 1-methylimidazole
tris 6,6,7,7,8,8,8-heptafluoro-2,2-dimethyloctanedionato Tb0.2, Gd0.8 triphenylphosphine oxide
tris 6,6,7,7,8,8,8-heptafluoro-2,2-dimethyloctanedionato Tb0.2, Gd0.8 2,2-bipyridyl
tris 6,6,7,7,8,8,8-heptafluoro-2,2-dimethyloctanedionato Tb0.2, Gd0.8 2,2-bipyridyl-N,N-dioxide
tris 6,6,7,7,8,8,8-heptafluoro-2,2-dimethyloctanedionato Tb0.2, Gd0.8 phenanthroline
tris 6,6,7,7,8,8,8-heptafluoro-2,2-dimethyloctanedionato Tb0.2, Gd0.8 bathocuproine
tris 6,6,7,7,8,8,8-heptafluoro-2,2-dimethyloctanedionato Tb0.2, Gd0.8 bathophenanthroline tris 1-phenyl-1,3-butanedionato Tb0.2, Gd0.8 dimethylaminopyridine
tris 1-phenyl-1,3-butanedionato Tb0.2, Gd0.8 4-picoline-N-oxide
tris 1-phenyl-1,3-butanedionato Tb0.2, Gd0.8 4-phenylpyridine
tris 1-phenyl-1,3-butanedionato Tb0.2, Gd0.8 4-phenylpyridine-N-oxide
tris 1-phenyl-1,3-butanedionato Tb0.2, Gd0.8 1-methylimidazole
tris 1-phenyl-1,3-butanedionato Tb0.2, Gd0.8 triphenylphosphine oxide
tris 1-phenyl-1,3-butanedionato Tb0.2, Gd0.8 2,2-bipyridyl
tris 1-phenyl-1,3-butanedionato Tb0.2, Gd0.8 2,2-bipyridyl-N,N-dioxide
tris 1-phenyl-1,3-butanedionato Tb0.2, Gd0.8 phenanthroline
tris 1-phenyl-1,3-butanedionato Tb0.2, Gd0.8 bathocuproine
tris 1-phenyl-1,3-butanedionato Tb0.2, Gd0.8 bathophenanthroline
tris acetylacetonato Tb0.1, Gd0.9 dimethylaminopyridine
tris acetylacetonato Tb0.1, Gd0.9 4-picoline-N-oxide
tris acetylacetonato Tb0.1, Gd0.9 4-phenylpyridine
tris acetylacetonato Tb0.1, Gd0.9 4-phenylpyridine-N-oxide
tris acetylacetonato Tb0.1, Gd0.9 1-methylimidazole
tris acetylacetonato Tb0.1, Gd0.9 triphenylphosphine oxide
tris acetylacetonato Tb0.1, Gd0.9 2,2-bipyridyl
tris acetylacetonato Tb0.1, Gd0.9 2,2-bipyridyl-N,N-dioxide
tris acetylacetonato Tb0.1, Gd0.9 phenanthroline
tris acetylacetonato Tb0.1, Gd0.9 bathocuproine
tris acetylacetonato Tb0.1, Gd0.9 bathophenanthroline
tris dibenzoylmethanato Tb0.1, Gd0.9 dimethylaminopyridine
tris dibenzoylmethanato Tb0.1, Gd0.9 4-picoline-N-oxide
tris dibenzoylmethanato Tb0.1, Gd0.9 4-phenylpyridine
tris dibenzoylmethanato Tb0.1, Gd0.9 4-phenylpyridine-N-oxide
tris dibenzoylmethanato Tb0.1, Gd0.9 1-methylimidazole
tris dibenzoylmethanato Tb0.1, Gd0.9 triphenylphosphine oxide
tris dibenzoylmethanato Tb0.1, Gd0.9 2,2-bipyridyl
tris dibenzoylmethanato Tb0.1, Gd0.9 2,2-bipyridyl-N,N-dioxide
tris dibenzoylmethanato Tb0.1, Gd0.9 phenanthroline
tris dibenzoylmethanato Tb0.1, Gd0.9 bathocuproine
tris dibenzoylmethanato Tb0.1, Gd0.9 bathophenanthroline
tris thenoyltrifluoroacetonato Tb0.1, Gd0.9 dimethylaminopyridine
tris thenoyltrifluoroacetonato Tb0.1, Gd0.9 4-picoline-N-oxide
tris thenoyltrifluoroacetonato Tb0.1, Gd0.9 4-phenylpyridine
tris thenoyltrifluoroacetonato Tb0.1, Gd0.9 4-phenylpyridine-N-oxide
tris thenoyltrifluoroacetonato Tb0.1, Gd0.9 1-methylimidazole
tris thenoyltrifluoroacetonato Tb0.1, Gd0.9 triphenylphosphine oxide
tris thenoyltrifluoroacetonato Tb0.1, Gd0.9 2,2-bipyridyl
tris thenoyltrifluoroacetonato Tb0.1, Gd0.9 2,2-bipyridyl-N,N-dioxide
tris thenoyltrifluoroacetonato Tb0.1, Gd0.9 phenanthroline
tris thenoyltrifluoroacetonato Tb0.1, Gd0.9 bathocuproine
tris thenoyltrifluoroacetonato Tb0.1, Gd0.9 bathophenanthroline
tris 2,2,6,6-tetramethylheptanedionato Tb0.1, Gd0.9 4-picoline-N-oxide
tris 2,2,6,6-tetramethylheptanedionato Tb0.1, Gd0.9 4-phenylpyridine
tris 2,2,6,6-tetramethyl heptanedionato Tb0.1, Gd0.9 4-phenylpyridine-N-oxide
tris 2,2,6,6-tetramethylheptanedionato Tb0.1, Gd0.9 1-methylimidazole
tris 2,2,6,6-tetramethylheptanedionato Tb0.1, Gd0.9 triphenylphosphine oxide
tris 2,2,6,6-tetramethylheptanedionato Tb0.1, Gd0.9 2,2-bipyridyl
tris 2,2,6,6-tetramethylheptanedionato Tb0.1, Gd0.9 2,2-bipyridyl-N,N-dioxide
tris 2,2,6,6-tetramethylheptanedionato Tb0.1, Gd0.9 phenanthroline
tris 2,2,6,6-tetramethylheptanedionato Tb0.1, Gd0.9 bathocuproine
tris 2,2,6,6-tetramethylheptanedionato Tb0.1, Gd0.9 bathophenanthroline
tris 3-methylpentane-2,4-dionato Tb0.1, Gd0.9 dimethylaminopyridine
tris 3-methylpentane-2,4-dionato Tb0.1, Gd0.9 4-picoline-N-oxide
tris 3-methylpentane-2,4-dionato Tb0.1, Gd0.9 4-phenylpyridine
tris 3-methylpentane-2,4-dionato Tb0.1, Gd0.9 4-phenylpyridine-N-oxide
tris 3-methylpentane-2,4-dionato Tb0.1, Gd0.9 1-methylimidazole
tris 3-methylpentane-2,4-dionato Tb0.1, Gd0.9 triphenylphosphine oxide
tris 3-methylpentane-2,4-dionato Tb0.1, Gd0.9 2,2-bipyridyl
tris 3-methylpentane-2,4-dionato Tb0.1, Gd0.9 2,2-bipyridyl-N,N-dioxide
tris 3-methylpentane-2,4-dionato Tb0.1, Gd0.9 phenanthroline
tris 3-methylpentane-2,4-dionato Tb0.1, Gd0.9 bathocuproine
tris 3-methylpentane-2,4-dionato Tb0.1, Gd0.9 bathophenanthroline
tris 3-ethylpentane-2,4-dionato Tb0.1, Gd0.9 dimethylaminopyridine
tris 3-ethylpentane-2,4-dionato Tb0.1, Gd0.9 4-picoline-N-oxide
tris 3-ethylpentane-2,4-dionato Tb0.1, Gd0.9 4-phenylpyridine
tris 3-ethylpentane-2,4-dionato Tb0.1, Gd0.9 4-phenylpyridine-N-oxide
tris 3-ethylpentane-2,4-dionato Tb0.1, Gd0.9 1-methylimidazole
tris 3-ethylpentane-2,4-dionato Tb0.1, Gd0.9 triphenylphosphine oxide
tris 3-ethylpentane-2,4-dionato Tb0.1, Gd0.9 2,2-bipyridyl
tris 3-ethylpentane-2,4-dionato Tb0.1, Gd0.9 2,2-bipyridyl-N,N-dioxide
tris 3-ethylpentane-2,4-dionato Tb0.1, Gd0.9 phenanthroline
tris 3-ethylpentane-2,4-dionato Tb0.1, Gd0.9 bathocuproine
tris 3-ethylpentane-2,4-dionato Tb0.1, Gd0.9 bathophenanthroline
tris pivaloyltrifluoroacetonato Tb0.1, Gd0.9 dimethylaminopyridine
tris pivaloyltrifluoroacetonato Tb0.1, Gd0.9 4-picoline-N-oxide
tris pivaloyltrifluoroacetonato Tb0.1, Gd0.9 4-phenylpyridine
tris pivaloyltrifluoroacetonato Tb0.1, Gd0.9 4-phenylpyridine-N-oxide tris pivaloyltrifluoroacetonato Tb0.1, Gd0.9 1-methylimidazole
tris pivaloyltrifluoroacetonato Tb0.1, Gd0.9 triphenylphosphine oxide
tris pivaloyltrifluoroacetonato Tb0.1, Gd0.9 2,2-bipyridyl
tris pivaloyltrifluoroacetonato Tb0.1, Gd0.9 2,2-bipyridyl-N,N-dioxide
tris pivaloyltrifluoroacetonato Tb0.1, Gd0.9 phenanthroline
tris pivaloyltrifluoroacetonato Tb0.1, Gd0.9 bathocuproine
tris pivaloyltrifluoroacetonato Tb0.1, Gd0.9 bathophenanthroline
tris trifluoroacetylacetonato Tb0.1, Gd0.9 dimethylaminopyridine
tris trifluoroacetylacetonato Tb0.1, Gd0.9 4-picoline-N-oxide
tris trifluoroacetylacetonato Tb0.1, Gd0.9 4-phenylpyridine
tris trifluoroacetylacetonato Tb0.1, Gd0.9 4-phenylpyridine-N-oxide
tris trifluoroacetylacetonato Tb0.1, Gd0.9 1-methylimidazole
tris trifluoroacetylacetonato Tb0.1, Gd0.9 triphenylphosphine oxide
tris trifluoroacetylacetonato Tb0.1, Gd0.9 2,2-bipyridyl
tris trifluoroacetylacetonato Tb0.1, Gd0.9 2,2-bipyridyl-N,N-dioxide
tris trifluoroacetylacetonato Tb0.1, Gd0.9 phenanthroline
tris trifluoroacetylacetonato Tb0.1, Gd0.9 bathocuproine
tris trifluoroacetylacetonato Tb0.1, Gd0.9 bathophenanthroline
tris hexafluoroacetylacetonato Tb0.1, Gd0.9 dimethylaminopyridine
tris hexafluoroacetylacetonato Tb0.1, Gd0.9 4-picoline-N-oxide
tris hexafluoroacetylacetonato Tb0.1, Gd0.9 4-phenylpyridine
tris hexafluoroacetylacetonato Tb0.1, Gd0.9 4-phenylpyridine-N-oxide
tris hexafluoroacetylacetonato Tb0.1, Gd0.9 1-methylimidazole
tris hexafluoroacetylacetonato Tb0.1, Gd0.9 triphenylphosphine oxide
tris hexafluoroacetylacetonato Tb0.1, Gd0.9 2,2-bipyridyl
tris hexafluoroacetylacetonato Tb0.1, Gd0.9 2,2-bipyridyl-N,N-dioxide
tris hexafluoroacetylacetonato Tb0.1, Gd0.9 phenanthroline
tris hexafluoroacetylacetonato Tb0.1, Gd0.9 bathocuproine
tris hexafluoroacetylacetonato Tb0.1, Gd0.9 bathophenanthroline
tris 6,6,7,7,8,8,8-heptafluoro-2,2-dimethyloctanedionato Tb0.1, Gd0.9 dimethylaminopyridine
tris 6,6,7,7,8,8,8-heptafluoro-2,2-dimethyloctanedionato Tb0.1, Gd0.9 4-picoline-N-oxide
tris 6,6,7,7,8,8,8-heptafluoro-2,2-dimethyloctanedionato Tb0.1, Gd0.9 4-phenylpyridine
tris 6,6,7,7,8,8,8-heptafluoro-2,2-dimethyloctanedionato Tb0.1, Gd0.9 4-phenylpyridine-N-oxide
tris 6,6,7,7,8,8,8-heptafluoro-2,2-dimethyloctanedionato Tb0.1, Gd0.9 1-methylimidazole
tris 6,6,7,7,8,8,8-heptafluoro-2,2-dimethyloctanedionato Tb0.1, Gd0.9 triphenylphosphine oxide
tris 6,6,7,7,8,8,8-heptafluoro-2,2-dimethyloctanedionato Tb0.1, Gd0.9 2,2-bipyridyl
tris 6,6,7,7,8,8,8-heptafluoro-2,2-dimethyloctanedionato Tb0.1, Gd0.9 2,2-bipyridyl-N,N-dioxide
tris 6,6,7,7,8,8,8-heptafluoro-2,2-dimethyloctanedionato Tb0.1, Gd0.9 phenanthroline
tris 6,6,7,7,8,8,8-heptafluoro-2,2-dimethyloctanedionato Tb0.1, Gd0.9 bathocuproine
tris 6,6,7,7,8,8,8-heptafluoro-2,2-dimethyloctanedionato Tb0.1, Gd0.9 bathophenanthroline
tris 1-phenyl-1,3-butanedionato Tb0.1, Gd0.9 dimethylaminopyridine
tris 1-phenyl-1,3-butanedionato Tb0.1, Gd0.9 4-picoline-N-oxide
tris 1-phenyl-1,3-butanedionato Tb0.1, Gd0.9 4-phenylpyridine
tris 1-phenyl-1,3-butanedionato Tb0.1, Gd0.9 4-phenylpyridine-N-oxide
tris 1-phenyl-1,3-butanedionato Tb0.1, Gd0.9 1-methylimidazole
tris 1-phenyl-1,3-butanedionato Tb0.1, Gd0.9 triphenylphosphine oxide
tris 1-phenyl-1,3-butanedionato Tb0.1, Gd0.9 2,2-bipyridyl
tris 1-phenyl-1,3-butanedionato Tb0.1, Gd0.9 2,2-bipyridyl-N,N-dioxide
tris 1-phenyl-1,3-butanedionato Tb0.1, Gd0.9 phenanthroline
tris 1-phenyl-1,3-butanedionato Tb0.1, Gd0.9 bathocuproine
tris 1-phenyl-1,3-butanedionato Tb0.1, Gd0.9 bathophenanthroline
tris acetylacetonato Tb0.01, Gd0.99 dimethylaminopyridine
tris acetylacetonato Tb0.01, Gd0.99 4-picoline-N-oxide
tris acetylacetonato Tb0.01, Gd0.99 4-phenylpyridine
tris acetylacetonato Tb0.01, Gd0.99 4-phenylpyridine-N-oxide
tris acetylacetonato Tb0.01, Gd0.99 1-methylimidazole
tris acetylacetonato Tb0.01, Gd0.99 triphenylphosphine oxide
tris acetylacetonato Tb0.01, Gd0.99 2,2-bipyridyl
tris acetylacetonato Tb0.01, Gd0.99 2,2-bipyridyl-N,N-dioxide
tris acetylacetonato Tb0.01, Gd0.99 phenanthroline
tris acetylacetonato Tb0.01, Gd0.99 bathocuproine
tris acetylacetonato Tb0.01, Gd0.99 bathophenanthroline
tris dibenzoylmethanato Tb0.01, Gd0.99 dimethylaminopyridine
tris dibenzoylmethanato Tb0.01, Gd0.99 4-picoline-N-oxide
tris dibenzoylmethanato Tb0.01, Gd0.99 4-phenylpyridine
tris dibenzoylmethanato Tb0.01, Gd0.99 4-phenylpyridine-N-oxide
tris dibenzoylmethanato Tb0.01, Gd0.99 1-methylimidazole
tris dibenzoylmethanato Tb0.01, Gd0.99 triphenylphosphine oxide
tris dibenzoylmethanato Tb0.01, Gd0.99 2,2-bipyridyl
tris dibenzoylmethanato Tb0.01, Gd0.99 2,2-bipyridyl-N,N-dioxide
tris dibenzoylmethanato Tb0.01, Gd0.99 phenanthroline
tris dibenzoylmethanato Tb0.01, Gd0.99 bathocuproine
tris dibenzoylmethanato Tb0.01, Gd0.99 bathophenanthroline
tris thenoyltrifluoroacetonato Tb0.01, Gd0.99 dimethylaminopyridine
tris thenoyltrifluoroacetonato Tb0.01, Gd0.99 4-picoline-N-oxide
tris thenoyltrifluoroacetonato Tb0.01, Gd0.99 4-phenylpyridine
tris thenoyltrifluoroacetonato Tb0.01, Gd0.99 4-phenylpyridine-N-oxide
tris thenoyltrifluoroacetonato Tb0.01, Gd0.99 1-methylimidazole
tris thenoyltrifluoroacetonato Tb0.01, Gd0.99 triphenylphosphine oxide
tris thenoyltrifluoroacetonato Tb0.01, Gd0.99 2,2-bipyridyl tris thenoyltrifluoroacetonato Tb0.01, Gd0.99 2,2-bipyridyl-N,N-dioxide tris thenoyltrifluoroacetonato Tb0.01, Gd0.99 phenanthroline tris thenoyltrifluoroacetonato Tb0.01, Gd0.99 bathocuproine tris thenoyltrifluoroacetonato Tb0.01, Gd0.99 bathophenanthroline tris 2,2,6,6-tetramethylheptanedionato Tb0.01, Gd0.99 dimethylaminopyridine tris 2,2,6,6-tetramethylheptanedionato Tb0.01, Gd0.99 4-picoline-N-oxide tris 2,2,6,6-tetramethylheptanedionato Tb0.01, Gd0.99 4-phenylpyridine tris 2,2,6,6-tetramethylheptanedionato Tb0.01, Gd0.99 4-phenylpyridine-N-oxide tris 2,2,6,6-tetramethylheptanedionato Tb0.01, Gd0.99 1-methylimidazole tris 2,2,6,6-tetramethylheptanedionato Tb0.01, Gd0.99 triphenylphosphine oxide tris 2,2,6,6-tetramethylheptanedionato Tb0.01, Gd0.99 2,2-bipyridyl tris 2,2,6,6-tetramethylheptanedionato Tb0.01, Gd0.99 2,2-bipyridyl-N,N-dioxide tris 2,2,6,6-tetramethylheptanedionato Tb0.01, Gd0.99 phenanthroline tris 2,2,6,6-tetramethylheptanedionato Tb0.01, Gd0.99 bathocuproine tris 2,2,6,6-tetramethylheptanedionato Tb0.01, Gd0.99 bathophenanthroline tris 3-methylpentane-2,4-dionato Tb0.01, Gd0.99 dimethylaminopyridine tris 3-methylpentane-2,4-dionato Tb0.01, Gd0.99 4-picoline-N-oxide tris 3-methylpentane-2,4-dionato Tb0.01, Gd0.99 4-phenylpyridine tris 3-methylpentane-2,4-dionato Tb0.01, Gd0.99 4-phenylpyridine-N-oxide tris 3-methylpentane-2,4-dionato Tb0.01, Gd0.99 1-methylimidazole tris 3-methylpentane-2,4-dionato Tb0.01, Gd0.99 triphenylphosphine oxide tris 3-methylpentane-2,4-dionato Tb0.01, Gd0.99 2,2-bipyridyl tris 3-methylpentane-2,4-dionato Tb0.01, Gd0.99 2,2-bipyridyl-N,N-dioxide tris 3-methylpentane-2,4-dionato Tb0.01, Gd0.99 phenanthroline tris 3-methylpentane-2,4-dionato Tb0.01, Gd0.99 bathocuproine tris 3-methylpentane-2,4-dionato Tb0.01, Gd0.99 bathophenanthroline tris 3-ethylpentane-2,4-dionato Tb0.01, Gd0.99 dimethylaminopyridine tris 3-ethylpentane-2,4-dionato Tb0.01, Gd0.99 4-picoline-N-oxide tris 3-ethylpentane-2,4-dionato Tb0.01, Gd0.99 4-phenylpyridine tris 3-ethylpentane-2,4-dionato Tb0.01, Gd0.99 4-phenylpyridine-N-oxide tris 3-ethylpentane-2,4-dionato Tb0.01, Gd0.99 1-methylimidazole tris 3-ethylpentane-2,4-dionato Tb0.01, Gd0.99 triphenylphosphine oxide tris 3-ethylpentane-2,4-dionato Tb0.01, Gd0.99 2,2-bipyridyl tris 3-ethylpentane-2,4-dionato Tb0.01, Gd0.99 2,2-bipyridyl-N,N-dioxide tris 3-ethylpentane-2,4-dionato Tb0.01, Gd0.99 phenanthroline tris 3-ethylpentane-2,4-dionato Tb0.01, Gd0.99 bathocuproine tris 3-ethylpentane-2,4-dionato Tb0.01, Gd0.99 bathophenanthroline tris pivaloyltrifluoroacetonato Tb0.01, Gd0.99 dimethylaminopyridine tris pivaloyltrifluoroacetonato Tb0.01, Gd0.99 4-picoline-N-oxide tris pivaloyltrifluoroacetonato Tb0.01, Gd0.99 4-phenylpyridine tris pivaloyltrifluoroacetonato Tb0.01, Gd0.99 4-phenylpyridine-N-oxide tris pivaloyltrifluoroacetonato Tb0.01, Gd0.99 1-methylimidazole tris pivaloyltrifluoroacetonato Tb0.01, Gd0.99 triphenylphosphine oxide tris pivaloyltrifluoroacetonato Tb0.01, Gd0.99 2,2-bipyridyl tris pivaloyltrifluoroacetonato Tb0.01, Gd0.99 2,2-bipyridyl-N,N-dioxide tris pivaloyltrifluoroacetonato Tb0.01, Gd0.99 phenanthroline tris pivaloyltrifluoroacetonato Tb0.01, Gd0.99 bathocuproine tris pivaloyltrifluoroacetonato Tb0.01, Gd0.99 bathophenanthroline tris trifluoroacetylacetonato Tb0.01, Gd0.99 dimethylaminopyridine tris trifluoroacetylacetonato Tb0.01, Gd0.99 4-picoline-N-oxide tris trifluoroacetylacetonato Tb0.01, Gd0.99 4-phenylpyridine tris trifluoroacetylacetonato Tb0.01, Gd0.99 4-phenylpyridine-N-oxide tris trifluoroacetylacetonato Tb0.01, Gd0.99 1-methylimidazole tris trifluoroacetylacetonato Tb0.01, Gd0.99 triphenylphosphine oxide tris trifluoroacetylacetonato Tb0.01, Gd0.99 2,2-bipyridyl tris trifluoroacetylacetonato Tb0.01, Gd0.99 2,2-bipyridyl-N,N-dioxide tris trifluoroacetylacetonato Tb0.01, Gd0.99 phenanthroline tris trifluoroacetylacetonato Tb0.01, Gd0.99 bathocuproine tris trifluoroacetylacetonato Tb0.01, Gd0.99 bathophenanthroline tris hexafluoroacetylacetonato Tb0.01, Gd0.99 dimethylaminopyridine tris hexafluoroacetylacetonato Tb0.01, Gd0.99 4-picoline-N-oxide tris hexafluoroacetylacetonato Tb0.01, Gd0.99 4-phenylpyridine tris hexafluoroacetylacetonato Tb0.01, Gd0.99 4-phenylpyridine-N-oxide tris hexafluoroacetylacetonato Tb0.01, Gd0.99 1-methylimidazole tris hexafluoroacetylacetonato Tb0.01, Gd0.99 triphenylphosphine oxide tris hexafluoroacetylacetonato Tb0.01, Gd0.99 2,2-bipyridyl tris hexafluoroacetylacetonato Tb0.01, Gd0.99 2,2-bipyridyl-N,N-dioxide tris hexafluoroacetylacetonato Tb0.01, Gd0.99 phenanthroline tris hexafluoroacetylacetonato Tb0.01, Gd0.99 bathocuproine tris hexafluoroacetylacetonato Tb0.01, Gd0.99 bathophenanthroline tris 6,6,7,7,8,8,8-heptafluoro-2,2-dimethyloctanedionato Tb0.01, Gd0.99 dimethylaminopyridine tris 6,6,7,7,8,8,8-heptafluoro-2,2-dimethyloctanedionato Tb0.01, Gd0.99 4-picoline-N-oxide tris 6,6,7,7,8,8,8-heptafluoro-2,2-dimethyloctanedionato Tb0.01, Gd0.99 4-phenylpyridine tris 6,6,7,7,8,8,8-heptafluoro-2,2-dimethyloctanedionato Tb0.01, Gd0.99 4-phenylpyridine-N-oxide tris 6,6,7,7,8,8,8-heptafluoro-2,2-dimethyloctanedionato Tb0.01, Gd0.99 1-methylimidazole tris 6,6,7,7,8,8,8-heptafluoro-2,2-dimethyloctanedionato Tb0.01, Gd0.99 triphenylphosphine oxide tris 6,6,7,7,8,8,8-heptafluoro-2,2-dimethyloctanedionato Tb0.01, Gd0.99 2,2-bipyridyl tris 6,6,7,7,8,8,8-heptafluoro-2,2-dimethyloctanedionato Tb0.01, Gd0.99 2,2-bipyridyl-N,N-dioxide tris-6,6,7,7,8,8,8-heptafluoro-2,2-dimethyloctanedionato Tb0.01, Gd0.99 phenanthroline tris 6,6,7,7,8,8,8-heptafluoro-2,2-dimethyloctanedionato Tb0.01, Gd0.99 bathocuproine tris 6,6,7,7,8,8,8-heptafluoro-2,2-dimethyloctanedionato Tb0.01, Gd0.99 bathophenanthroline tris 1-phenyl-1,3-butanedionato Tb0.01, Gd0.99 dimethylaminopyridine tris 1-phenyl-1,3-butanedionato Tb0.01, Gd0.99 4-picoline-N-oxide tris 1-phenyl-1,3-butanedionato Tb0.01, Gd0.99 4-phenylpyridine tris 1-phenyl-1,3-butanedionato Tb0.01, Gd0.99 4-phenylpyridine-N-oxide tris 1-phenyl-1,3-butanedionato Tb0.01, Gd0.99 1-methylimidazole tris 1-phenyl-1,3-butanedionato Tb0.01, Gd0.99 triphenylphosphine oxide tris 1-phenyl-1,3-butanedionato Tb0.01, Gd0.99 2,2-bipyridyl tris 1-phenyl-1,3-butanedionato Tb0.01, Gd0.99 2,2-bipyridyl-N,N-dioxide tris 1-phenyl-1,3-butanedionato Tb0.01, Gd0.99 phenanthroline tris 1-phenyl-1,3-butanedionato Tb0.01, Gd0.99 bathocuproine tris 1-phenyl-1,3-butanedionato Tb0.01, Gd0.99 bathophenanthroline tris acetylacetonato Eu0.5, Gd0.5 dimethylaminopyridine tris acetylacetonato Eu0.5, Gd0.5 4-picoline-N-oxide tris acetylacetonato Eu0.5, Gd0.5 4-phenylpyridine tris acetylacetonato Eu0.5, Gd0.5 4-phenylpyridine-N-oxide tris acetylacetonato Eu0.5, Gd0.5 1-methylimidazole tris acetylacetonato Eu0.5, Gd0.5 triphenylphosphine oxide tris acetylacetonato Eu0.5, Gd0.5 2,2-bipyridyl tris acetylacetonato Eu0.5, Gd0.5 2,2-bipyridyl-N,N-dioxide tris acetylacetonato Eu0.5, Gd0.5 phenanthroline tris acetylacetonato Eu0.5, Gd0.5 bathocuproine tris acetylacetonato Eu0.5, Gd0.5 bathophenanthroline tris dibenzoylmethanato Eu0.5, Gd0.5 dimethylaminopyridine tris dibenzoylmethanato Eu0.5, Gd0.5 4-picoline-N-oxide tris dibenzoylmethanato Eu0.5, Gd0.5 4-phenylpyridine tris dibenzoylmethanato Eu0.5, Gd0.5 4-phenylpyridine-N-oxide tris dibenzoylmethanato Eu0.5, Gd0.5 1-methylimidazole tris dibenzoylmethanato Eu0.5, Gd0.5 triphenylphosphine oxide tris dibenzoylmethanato Eu0.5, Gd0.5 2,2-bipyridyl tris dibenzoylmethanato Eu0.5, Gd0.5 2,2-bipyridyl-N,N-dioxide tris dibenzoylmethanato Eu0.5, Gd0.5 phenanthroline tris dibenzoylmethanato Eu0.5, Gd0.5 bathocuproine tris dibenzoylmethanato Eu0.5, Gd0.5 bathophenanthroline tris thenoyltrifluoroacetonato Eu0.5, Gd0.5 dimethylaminopyridine tris thenoyltrifluoroacetonato Eu0.5, Gd0.5 4-picoline-N-oxide tris thenoyltrifluoroacetonato Eu0.5, Gd0.5 4-phenylpyridine tris thenoyltrifluoroacetonato Eu0.5, Gd0.5 4-phenylpyridine-N-oxide tris thenoyltrifluoroacetonato Eu0.5, Gd0.5 1-methylimidazole tris thenoyltrifluoroacetonato Eu0.5, Gd0.5 triphenylphosphine oxide tris thenoyltrifluoroacetonato Eu0.5, Gd0.5 2,2-bipyridyl tris thenoyltrifluoroacetonato Eu0.5, Gd0.5 2,2-bipyridyl-N,N-dioxide tris thenoyltrifluoroacetonato Eu0.5, Gd0.5 phenanthroline tris thenoyltrifluoroacetonato Eu0.5, Gd0.5 bathocuproine tris thenoyltrifluoroacetonato Eu0.5, Gd0.5 bathophenanthroline tris 2,2,6,6-tetramethylheptanedionato Eu0.5, Gd0.5 dimethylaminopyridine tris 2,2,6,6-tetramethylheptanedionato Eu0.5, Gd0.5 4-picoline-N-oxide tris 2,2,6,6-tetramethylheptanedionato Eu0.5, Gd0.5 4-phenylpyridine tris 2,2,6,6-tetramethylheptanedionato Eu0.5, Gd0.5 4-phenylpyridine-N-oxide tris 2,2,6,6-tetramethylheptanedionato Eu0.5, Gd0.5 1-methylimidazole tris 2,2,6,6-tetramethylheptanedionato Eu0.5, Gd0.5 triphenylphosphine oxide tris 2,2,6,6-tetramethylheptanedionato Eu0.5, Gd0.5 2,2-bipyridyl tris 2,2,6,6-tetramethylheptanedionato Eu0.5, Gd0.5 2,2-bipyridyl-N,N-dioxide tris 2,2,6,6-tetramethylheptanedionato Eu0.5, Gd0.5 phenanthroline tris 2,2,6,6-tetramethylheptanedionato Eu0.5, Gd0.5 bathocuproine tris 2,2,6,6-tetramethylheptanedionato Eu0.5, Gd0.5 bathophenanthroline tris 3-methylpentane-2,4-dionato Eu0.5, Gd0.5 dimethylaminopyridine tris 3-methylpentane-2,4-dionato Eu0.5, Gd0.5 4-picoline-N-oxide tris 3-methylpentane-2,4-dionato Eu0.5, Gd0.5 4-phenylpyridine tris 3-methylpentane-2,4-dionato Eu0.5, Gd0.5 4-phenylpyridine-N-oxide tris 3-methylpentane-2,4-dionato Eu0.5, Gd0.5 1-methylimidazole tris 3-methylpentane-2,4-dionato Eu0.5, Gd0.5 triphenylphosphine oxide tris 3-methylpentane-2,4-dionato Eu0.5, Gd0.5 2,2-bipyridyl tris 3-methylpentane-2,4-dionato Eu0.5, Gd0.5 2,2-bipyridyl-N,N-dioxide tris 3-methylpentane-2,4-dionato Eu0.5, Gd0.5 phenanthroline tris 3-methylpentane-2,4-dionato Eu0.5, Gd0.5 bathocuproine tris 3-methylpentane-2,4-dionato Eu0.5, Gd0.5 bathophenanthroline tris 3-ethylpentane-2,4-dionato Eu0.5, Gd0.5 dimethylaminopyridine
tris 3-ethylpentane-2,4-dionato Eu0.5, Gd0.5 4-picoline-N-oxide
tris 3-ethylpentane-2,4-dionato Eu0.5, Gd0.5 4-phenylpyridine
tris 3-ethylpentane-2,4-dionato Eu0.5, Gd0.5 4-phenylpyridine-N-oxide
tris 3-ethylpentane-2,4-dionato Eu0.5, Gd0.5 1-methylimidazole
tris 3-ethylpentane-2,4-dionato Eu0.5, Gd0.5 triphenylphosphine oxide
tris 3-ethylpentane-2,4-dionato Eu0.5, Gd0.5 2,2-bipyridyl
tris 3-ethylpentane-2,4-dionato Eu0.5, Gd0.5 2,2-bipyridyl-N,N-dioxide
tris 3-ethylpentane-2,4-dionato Eu0.5, Gd0.5 phenanthroline
tris 3-ethylpentane-2,4-dionato Eu0.5, Gd0.5 bathocuproine
tris 3-ethylpentane-2,4-dionato Eu0.5, Gd0.5 bathophenanthroline
tris pivaloyltrifluoroacetonato Eu0.5, Gd0.5 dimethylaminopyridine
tris pivaloyltrifluoroacetonato Eu0.5, Gd0.5 4-picoline-N-oxide
tris pivaloyltrifluoroacetonato Eu0.5, Gd0.5 4-phenylpyridine
tris pivaloyltrifluoroacetonato Eu0.5, Gd0.5 4-phenylpyridine-N-oxide
tris pivaloyltrifluoroacetonato Eu0.5, Gd0.5 1-methylimidazole
tris pivaloyltrifluoroacetonato Eu0.5, Gd0.5 triphenylphosphine oxide
tris pivaloyltrifluoroacetonato Eu0.5, Gd0.5 2,2-bipyridyl
tris pivaloyltrifluoroacetonato Eu0.5, Gd0.5 2,2-bipyridyl-N,N-dioxide
tris pivaloyltrifluoroacetonato Eu0.5, Gd0.5 phenanthroline
tris pivaloyltrifluoroacetonato Eu0.5, Gd0.5 bathocuproine
tris pivaloyltrifluoroacetonato Eu0.5, Gd0.5 bathophenanthroline
tris trifluoroacetylacetonato Eu0.5, Gd0.5 dimethylaminopyridine
tris trifluoroacetylacetonato Eu0.5, Gd0.5 4-picoline-N-oxide
tris trifluoroacetylacetonato Eu0.5, Gd0.5 4-phenylpyridine
tris trifluoroacetylacetonato Eu0.5, Gd0.5 4-phenylpyridine-N-oxide
tris trifluoroacetylacetonato Eu0.5, Gd0.5 1-methylimidazole
tris trifluoroacetylacetonato Eu0.5, Gd0.5 triphenylphosphine oxide
tris trifluoroacetylacetonato Eu0.5, Gd0.5 2,2-bipyridyl
tris trifluoroacetylacetonato Eu0.5, Gd0.5 2,2-bipyridyl-N,N-dioxide
tris trifluoroacetylacetonato Eu0.5, Gd0.5 phenanthroline
tris trifluoroacetylacetonato Eu0.5, Gd0.5 bathocuproine
tris trifluoroacetylacetonato Eu0.5, Gd0.5 bathophenanthroline
tris hexafluoroacetylacetonato Eu0.5, Gd0.5 dimethylaminopyridine
tris hexafluoroacetylacetonato Eu0.5, Gd0.5 4-picoline-N-oxide
tris hexafluoroacetylacetonato Eu0.5, Gd0.5 4-phenylpyridine
tris hexafluoroacetylacetonato Eu0.5, Gd0.5 4-phenylpyridine-N-oxide
tris hexafluoroacetylacetonato Eu0.5, Gd0.5 1-methylimidazole
tris hexafluoroacetylacetonato Eu0.5, Gd0.5 triphenylphosphine oxide
tris hexafluoroacetylacetonato Eu0.5, Gd0.5 2,2-bipyridyl
tris hexafluoroacetylacetonato Eu0.5, Gd0.5 2,2-bipyridyl-N,N-dioxide
tris hexafluoroacetylacetonato Eu0.5, Gd0.5 phenanthroline
tris hexafluoroacetylacetonato Eu0.5, Gd0.5 bathocuproine
tris hexafluoroacetylacetonato Eu0.5, Gd0.5 bathophenanthroline
tris 6,6,7,7,8,8,8-heptafluoro-2,2-dimethyloctanedionato Eu0.5, Gd0.5 dimethylaminopyridine
tris 6,6,7,7,8,8,8-heptafluoro-2,2-dimethyloctanedionato Eu0.5, Gd0.5 4-picoline-N-oxide
tris 6,6,7,7,8,8,8-heptafluoro-2,2-dimethyloctanedionato Eu0.5, Gd0.5 4-phenylpyridine
tris 6,6,7,7,8,8,8-heptafluoro-2,2-dimethyloctanedionato Eu0.5, Gd0.5 4-phenylpyridine-N-oxide
tris 6,6,7,7,8,8,8-heptafluoro-2,2-dimethyloctanedionato Eu0.5, Gd0.5 1-methylimidazole
tris 6,6,7,7,8,8,8-heptafluoro-2,2-dimethyloctanedionato Eu0.5, Gd0.5 triphenylphosphine oxide
tris 6,6,7,7,8,8,8-heptafluoro-2,2-dimethyloctanedionato Eu0.5, Gd0.5 2,2-bipyridyl
tris 6,6,7,7,8,8,8-heptafluoro-2,2-dimethyloctanedionato Eu0.5, Gd0.5 2,2-bipyridyl-N,N-dioxide
tris 6,6,7,7,8,8,8-heptafluoro-2,2-dimethyloctanedionato Eu0.5, Gd0.5 phenanthroline
tris 6,6,7,7,8,8,8-heptafluoro-2,2-dimethyloctanedionato Eu0.5, Gd0.5 bathocuproine
tris 6,6,7,7,8,8,8-heptafluoro-2,2-dimethyloctanedionato Eu0.5, Gd0.5 bathophenanthroline
tris 1-phenyl-1,3-butanedionato Eu0.5, Gd0.5 dimethylaminopyridine
tris 1-phenyl-1,3-butanedionato Eu0.5, Gd0.5 4-picoline-N-oxide
tris 1-phenyl-1,3-butanedionato Eu0.5, Gd0.5 4-phenylpyridine
tris 1-phenyl-1,3-butanedionato Eu0.5, Gd0.5 4-phenylpyridine-N-oxide
tris 1-phenyl-1,3-butanedionato Eu0.5, Gd0.5 1-methylimidazole
tris 1-phenyl-1,3-butanedionato Eu0.5, Gd0.5 triphenylphosphine oxide
tris 1-phenyl-1,3-butanedionato Eu0.5, Gd0.5 2,2-bipyridyl
tris 1-phenyl-1,3-butanedionato Eu0.5, Gd0.5 2,2-bipyridyl-N,N-dioxide
tris 1-phenyl-1,3-butanedionato Eu0.5, Gd0.5 phenanthroline
tris 1-phenyl-1,3-butanedionato Eu0.5, Gd0.5 bathocuproine
tris 1-phenyl-1,3-butanedionato Eu0.5, Gd0.5 bathophenanthroline
tris acetylacetonato Eu0.2, Gd0.8 dimethylaminopyridine
tris acetylacetonato Eu0.2, Gd0.8 4-picoline-N-oxide
tris acetylacetonato Eu0.2, Gd0.8 4-phenylpyridine
tris acetylacetonato Eu0.2, Gd0.8 4-phenylpyridine-N-oxide
tris acetylacetonato Eu0.2, Gd0.8 1-methylimidazole
tris acetylacetonato Eu0.2, Gd0.8 triphenylphosphine oxide
tris acetylacetonato Eu0.2, Gd0.8 2,2-bipyridyl
tris acetylacetonato Eu0.2, Gd0.8 2,2-bipyridyl-N,N-dioxide
tris acetylacetonato Eu0.2, Gd0.8 phenanthroline
tris acetylacetonato Eu0.2, Gd0.8 bathocuproine
tris acetylacetonato Eu0.2, Gd0.8 bathophenanthroline
tris dibenzoylmethanato Eu0.2, Gd0.8 dimethylaminopyridine
tris dibenzoylmethanato Eu0.2, Gd0.8 4-picoline-N-oxide
tris dibenzoylmethanato Eu0.2, Gd0.8 4-phenylpyridine tris dibenzoylmethanato Eu0.2, Gd0.8 4-phenylpyridine-N-oxide
tris dibenzoylmethanato Eu0.2, Gd0.8 1-methylimidazole
tris dibenzoylmethanato Eu0.2, Gd0.8 triphenylphosphine oxide
tris dibenzoylmethanato Eu0.2, Gd0.8 2,2-bipyridyl
tris dibenzoylmethanato Eu0.2, Gd0.8 2,2-bipyridyl-N,N-dioxide
tris dibenzoylmethanato Eu0.2, Gd0.8 phenanthroline
tris dibenzoylmethanato Eu0.2, Gd0.8 bathocuproine
tris dibenzoylmethanato Eu0.2, Gd0.8 bathophenanthroline
tris thenoyltrifluoroacetonato Eu0.2, Gd0.8 dimethylaminopyridine
tris thenoyltrifluoroacetonato Eu0.2, Gd0.8 4-picoline-N-oxide
tris thenoyltrifluoroacetonato Eu0.2, Gd0.8 4-phenylpyridine
tris thenoyltrifluoroacetonato Eu0.2, Gd0.8 4-phenylpyridine-N-oxide
tris thenoyltrifluoroacetonato Eu0.2, Gd0.8 1-methylimidazole
tris thenoyltrifluoroacetonato Eu0.2, Gd0.8 triphenylphosphine oxide
tris thenoyltrifluoroacetonato Eu0.2, Gd0.8 2,2-bipyridyl
tris thenoyltrifluoroacetonato Eu0.2, Gd0.8 2,2-bipyridyl-N,N-dioxide
tris thenoyltrifluoroacetonato Eu0.2, Gd0.8 phenanthroline
tris thenoyltrifluoroacetonato Eu0.2, Gd0.8 bathocuproine
tris thenoyltrifluoroacetonato Eu0.2, Gd0.8 bathophenanthroline
tris 2,2,6,6-tetramethylheptanedionato Eu0.2, Gd0.8 dimethylaminopyridine
tris 2,2,6,6-tetramethylheptanedionato Eu0.2, Gd0.8 4-picoline-N-oxide
tris 2,2,6,6-tetramethylheptanedionato Eu0.2, Gd0.8 4-phenylpyridine
tris 2,2,6,6-tetramethylheptanedionato Eu0.2, Gd0.8 4-phenylpyridine-N-oxide
tris 2,2,6,6-tetramethylheptanedionato Eu0.2, Gd0.8 1-methylimidazole
tris 2,2,6,6-tetramethylheptanedionato Eu0.2, Gd0.8 triphenylphosphine oxide
tris 2,2,6,6-tetramethylheptanedionato Eu0.2, Gd0.8 2,2-bipyridyl
tris 2,2,6,6-tetramethylheptanedionato Eu0.2, Gd0.8 2,2-bipyridyl-N,N-dioxide
tris 2,2,6,6-tetramethylheptanedionato Eu0.2, Gd0.8 phenanthroline
tris 2,2,6,6-tetramethylheptanedionato Eu0.2, Gd0.8 bathocuproine
tris 2,2,6,6-tetramethylheptanedionato Eu0.2, Gd0.8 bathophenanthroline
tris 3-methylpentane-2,4-dionato Eu0.2, Gd0.8 dimethylaminopyridine
tris 3-methylpentane-2,4-dionato Eu0.2, Gd0.8 4-picoline-N-oxide
tris 3-methylpentane-2,4-dionato Eu0.2, Gd0.8 4-phenylpyridine
tris 3-methylpentane-2,4-dionato Eu0.2, Gd0.8 4-phenylpyridine-N-oxide
tris 3-methylpentane-2,4-dionato Eu0.2, Gd0.8 1-methylimidazole
tris 3-methylpentane-2,4-dionato Eu0.2, Gd0.8 triphenylphosphine oxide
tris 3-methylpentane-2,4-dionato Eu0.2, Gd0.8 2,2-bipyridyl
tris 3-methylpentane-2,4-dionato Eu0.2, Gd0.8 2,2-bipyridyl-N,N-dioxide
tris 3-methylpentane-2,4-dionato Eu0.2, Gd0.8 phenanthroline
tris 3-methylpentane-2,4-dionato Eu0.2, Gd0.8 bathocuproine
tris 3-methylpentane-2,4-dionato Eu0.2, Gd0.8 bathophenanthroline
tris 3-ethylpentane-2,4-dionato Eu0.2, Gd0.8 dimethylaminopyridine
tris 3-ethylpentane-2,4-dionato Eu0.2, Gd0.8 4-picoline-N-oxide
tris 3-ethylpentane-2,4-dionato Eu0.2, Gd0.8 4-phenylpyridine
tris 3-ethylpentane-2,4-dionato Eu0.2, Gd0.8 4-phenylpyridine-N-oxide
tris 3-ethylpentane-2,4-dionato Eu0.2, Gd0.8 1-methylimidazole
tris 3-ethylpentane-2,4-dionato Eu0.2, Gd0.8 triphenylphosphine oxide
tris 3-ethylpentane-2,4-dionato Eu0.2, Gd0.8 2,2-bipyridyl
tris 3-ethylpentane-2,4-dionato Eu0.2, Gd0.8 2,2-bipyridyl-N,N-dioxide
tris 3-ethylpentane-2,4-dionato Eu0.2, Gd0.8 phenanthroline
tris 3-ethylpentane-2,4-dionato Eu0.2, Gd0.8 bathocuproine
tris 3-ethylpentane-2,4-dionato Eu0.2, Gd0.8 bathophenanthroline
tris pivaloyltrifluoroacetonato Eu0.2, Gd0.8 dimethylaminopyridine
tris pivaloyltrifluoroacetonato Eu0.2, Gd0.8 4-picoline-N-oxide
tris pivaloyltrifluoroacetonato Eu0.2, Gd0.8 4-phenylpyridine
tris pivaloyltrifluoroacetonato Eu0.2, Gd0.8 4-phenylpyridine-N-oxide
tris pivaloyltrifluoroacetonato Eu0.2, Gd0.8 1-methylimidazole
tris pivaloyltrifluoroacetonato Eu0.2, Gd0.8 triphenylphosphine oxide
tris pivaloyltrifluoroacetonato Eu0.2, Gd0.8 2,2-bipyridyl
tris pivaloyltrifluoroacetonato Eu0.2, Gd0.8 2,2-bipyridyl-N,N-dioxide
tris pivaloyltrifluoroacetonato Eu0.2, Gd0.8 phenanthroline
tris pivaloyltrifluoroacetonato Eu0.2, Gd0.8 bathocuproine
tris pivaloyltrifluoroacetonato Eu0.2, Gd0.8 bathophenanthroline
tris trifluoroacetylacetonato Eu0.2, Gd0.8 dimethylaminopyridine
tris trifluoroacetylacetonato Eu0.2, Gd0.8 4-picoline-N-oxide
tris trifluoroacetylacetonato Eu0.2, Gd0.8 4-phenylpyridine
tris trifluoroacetylacetonato Eu0.2, Gd0.8 4-phenylpyridine-N-oxide
tris trifluoroacetylacetonato Eu0.2, Gd0.8 1-methylimidazole
tris trifluoroacetylacetonato Eu0.2, Gd0.8 triphenylphosphine oxide
tris trifluoroacetylacetonato Eu0.2, Gd0.8 2,2-bipyridyl
tris trifluoroacetylacetonato Eu0.2, Gd0.8 2,2-bipyridyl-N,N-dioxide
tris trifluoroacetylacetonato Eu0.2, Gd0.8 phenanthroline
tris trifluoroacetylacetonato Eu0.2, Gd0.8 bathocuproine
tris trifluoroacetylacetonato Eu0.2, Gd0.8 bathophenanthroline
tris hexafluoroacetylacetonato Eu0.2, Gd0.8 dimethylaminopyridine tris hexafluoroacetylacetonato Eu0.2, Gd0.8 4-picoline-N-oxide
tris hexafluoroacetylacetonato Eu0.2, Gd0.8 4-phenylpyridine
tris hexafluoroacetylacetonato Eu0.2, Gd0.8 4-phenylpyridine-N-oxide
tris hexafluoroacetylacetonato Eu0.2, Gd0.8 1-methylimidazole
tris hexafluoroacetylacetonato Eu0.2, Gd0.8 triphenylphosphine oxide
tris hexafluoroacetylacetonato Eu0.2, Gd0.8 2,2-bipyridyl
tris hexafluoroacetylacetonato Eu0.2, Gd0.8 2,2-bipyridyl-N,N-dioxide
tris hexafluoroacetylacetonato Eu0.2, Gd0.8 phenanthroline
tris hexafluoroacetylacetonato Eu0.2, Gd0.8 bathocuproine
tris hexafluoroacetylacetonato Eu0.2, Gd0.8 bathophenanthroline
tris 6,6,7,7,8,8,8-heptafluoro-2,2-dimethyloctanedionato Eu0.2, Gd0.8 dimethylaminopyridine
tris 6,6,7,7,8,8,8-heptafluoro-2,2-dimethyloctanedionato Eu0.2, Gd0.8 4-picoline-N-oxide
tris 6,6,7,7,8,8,8-heptafluoro-2,2-dimethyloctanedionato Eu0.2, Gd0.8 4-phenylpyridine
tris 6,6,7,7,8,8,8-heptafluoro-2,2-dimethyloctanedionato Eu0.2, Gd0.8 4-phenylpyridine-N-oxide
tris 6,6,7,7,8,8,8-heptafluoro-2,2-dimethyloctanedionato Eu0.2, Gd0.8 1-methylimidazole
tris 6,6,7,7,8,8,8-heptafluoro-2,2-dimethyloctanedionato Eu0.2, Gd0.8 triphenylphosphine oxide
tris 6,6,7,7,8,8,8-heptafluoro-2,2-dimethyloctanedionato Eu0.2, Gd0.8 2,2-bipyridyl
tris 6,6,7,7,8,8,8-heptafluoro-2,2-dimethyloctanedionato Eu0.2, Gd0.8 2,2-bipyridyl-N,N-dioxide
tris 6,6,7,7,8,8,8-heptafluoro-2,2-dimethyloctanedionato Eu0.2, Gd0.8 phenanthroline
tris 6,6,7,7,8,8,8-heptafluoro-2,2-dimethyloctanedionato Eu0.2, Gd0.8 bathocuproine
tris 6,6,7,7,8,8,8-heptafluoro-2,2-dimethyloctanedionato Eu0.2, Gd0.8 bathophenanthroline
tris 1-phenyl-1,3-butanedionato Eu0.2, Gd0.8 dimethylaminopyridine
tris 1-phenyl-1,3-butanedionato Eu0.2, Gd0.8 4-picoline-N-oxide
tris 1-phenyl-1,3-butanedionato Eu0.2, Gd0.8 4-phenylpyridine
tris 1-phenyl-1,3-butanedionato Eu0.2, Gd0.8 4-phenylpyridine-N-oxide
tris 1-phenyl-1,3-butanedionato Eu0.2, Gd0.8 1-methylimidazole
tris 1-phenyl-1,3-butanedionato Eu0.2, Gd0.8 triphenylphosphine oxide
tris 1-phenyl-1,3-butanedionato Eu0.2, Gd0.8 2,2-bipyridyl
tris 1-phenyl-1,3-butanedionato Eu0.2, Gd0.8 2,2-bipyridyl-N,N-dioxide
tris 1-phenyl-1,3-butanedionato Eu0.2, Gd0.8 phenanthroline
tris 1-phenyl-1,3-butanedionato Eu0.2, Gd0.8 bathocuproine
tris 1-phenyl-1,3-butanedionato Eu0.2, Gd0.8 bathophenanthroline
tris acetylacetonato Eu0.1, Gd0.9 dimethylaminopyridine
tris acetylacetonato Eu0.1, Gd0.9 4-picoline-N-oxide
tris acetylacetonato Eu0.1, Gd0.9 4-phenylpyridine
tris acetylacetonato Eu0.1, Gd0.9 4-phenylpyridine-N-oxide
tris acetylacetonato Eu0.1, Gd0.9 1-methylimidazole
tris acetylacetonato Eu0.1, Gd0.9 triphenylphosphine oxide
tris acetylacetonato Eu0.1, Gd0.9 2,2-bipyridyl
tris acetylacetonato Eu0.1, Gd0.9 2,2-bipyridyl-N,N-dioxide
tris acetylacetonato Eu0.1, Gd0.9 phenanthroline
tris acetylacetonato Eu0.1, Gd0.9 bathocuproine
tris acetylacetonato Eu0.1, Gd0.9 bathophenanthroline
tris dibenzoylmethanato Eu0.1, Gd0.9 dimethylaminopyridine
tris dibenzoylmethanato Eu0.1, Gd0.9 4-picoline-N-oxide
tris dibenzoylmethanato Eu0.1, Gd0.9 4-phenylpyridine
tris dibenzoylmethanato Eu0.1, Gd0.9 4-phenylpyridine-N-oxide
tris dibenzoylmethanato Eu0.1, Gd0.9 1-methylimidazole
tris dibenzoylmethanato Eu0.1, Gd0.9 triphenylphosphine oxide
tris dibenzoylmethanato Eu0.1, Gd0.9 2,2-bipyridyl
tris dibenzoylmethanato Eu0.1, Gd0.9 2,2-bipyridyl-N,N-dioxide
tris dibenzoylmethanato Eu0.1, Gd0.9 phenanthroline
tris dibenzoylmethanato Eu0.1, Gd0.9 bathocuproine
tris dibenzoylmethanato Eu0.1, Gd0.9 bathophenanthroline
tris thenoyltrifluoroacetonato Eu0.1, Gd0.9 dimethylaminopyridine
tris thenoyltrifluoroacetonato Eu0.1, Gd0.9 4-picoline-N-oxide
tris thenoyltrifluoroacetonato Eu0.1, Gd0.9 4-phenylpyridine
tris thenoyltrifluoroacetonato Eu0.1, Gd0.9 4-phenylpyridine-N-oxide
tris thenoyltrifluoroacetonato Eu0.1, Gd0.9 1-methylimidazole
tris thenoyltrifluoroacetonato Eu0.1, Gd0.9 triphenylphosphine oxide
tris thenoyltrifluoroacetonato Eu0.1, Gd0.9 2,2-bipyridyl
tris thenoyltrifluoroacetonato Eu0.1, Gd0.9 2,2-bipyridyl-N,N-dioxide
tris thenoyltrifluoroacetonato Eu0.1, Gd0.9 phenanthroline
tris thenoyltrifluoroacetonato Eu0.1, Gd0.9 bathocuproine
tris thenoyltrifluoroacetonato Eu0.1, Gd0.9 bathophenanthroline
tris 2,2,6,6-tetramethylheptanedionato Eu0.1, Gd0.9 dimethylaminopyridine
tris 2,2,6,6-tetramethylheptanedionato Eu0.1, Gd0.9 4-picoline-N-oxide
tris 2,2,6,6-tetramethylheptanedionato Eu0.1, Gd0.9 4-phenylpyridine
tris 2,2,6,6-tetramethylheptanedionato Eu0.1, Gd0.9 4-phenylpyridine-N-oxide
tris 2,2,6,6-tetramethylheptanedionato Eu0.1, Gd0.9 1-methylimidazole
tris 2,2,6,6-tetramethylheptanedionato Eu0.1, Gd0.9 triphenylphosphine oxide
tris 2,2,6,6-tetramethylheptanedionato Eu0.1, Gd0.9 2,2-bipyridyl
tris 2,2,6,6-tetramethylheptanedionato Eu0.1, Gd0.9 2,2-bipyridyl-N,N-dioxide
tris 2,2,6,6-tetramethylheptanedionato Eu0.1, Gd0.9 phenanthroline
tris 2,2,6,6-tetramethylheptanedionato Eu0.1, Gd0.9 bathocuproine
tris 2,2,6,6-tetramethylheptanedionato Eu0.1, Gd0.9 bathophenanthroline
tris 3-methylpentane-2,4-dionato Eu0.1, Gd0.9 dimethylaminopyridine
tris 3-methylpentane-2,4-dionato Eu0.1, Gd0.9 4-picoline-N-oxide
tris 3-methylpentane-2,4-dionato Eu0.1, Gd0.9 4-phenylpyridine tris 3-methylpentane-2,4-dionato Eu0.1, Gd0.9 4-phenylpyridine-N-oxide tris 3-methylpentane-2,4-dionato Eu0.1, Gd0.9 1-methylimidazole tris 3-methylpentane-2,4-dionato Eu0.1, Gd0.9 triphenylphosphine oxide tris 3-methylpentane-2,4-dionato Eu0.1, Gd0.9 2,2-bipyridyl tris 3-methylpentane-2,4-dionato Eu0.1, Gd0.9 2,2-bipyridyl-N,N-dioxide tris 3-methylpentane-2,4-dionato Eu0.1, Gd0.9 phenanthroline tris 3-methylpentane-2,4-dionato Eu0.1, Gd0.9 bathocuproine tris 3-methylpentane-2,4-dionato Eu0.1, Gd0.9 bathophenanthroline tris 3-ethylpentane-2,4-dionato Eu0.1, Gd0.9 dimethylaminopyridine tris 3-ethylpentane-2,4-dionato Eu0.1, Gd0.9 4-picoline-N-oxide tris 3-ethylpentane-2,4-dionato Eu0.1, Gd0.9 4-phenylpyridine tris 3-ethylpentane-2,4-dionato Eu0.1, Gd0.9 4-phenylpyridine-N-oxide tris 3-ethylpentane-2,4-dionato Eu0.1, Gd0.9 1-methylimidazole tris 3-ethylpentane-2,4-dionato Eu0.1, Gd0.9 triphenylphosphine oxide tris 3-ethylpentane-2,4-dionato Eu0.1, Gd0.9 2,2-bipyridyl tris-3-ethylpentane-2,4-dionato Eu0.1, Gd0.9 2,2-bipyridyl-N,N-dioxide tris 3-ethylpentane-2,4-dionato Eu0.1, Gd0.9 phenanthroline tris 3-ethylpentane-2,4-dionato Eu0.1, Gd0.9 bathocuproine tris 3-ethylpentane-2,4-dionato Eu0.1, Gd0.9 bathophenanthroline tris pivaloyltrifluoroacetonato Eu0.1, Gd0.9 dimethylaminopyridine tris pivaloyltrifluoroacetonato Eu0.1, Gd0.9 4-picoline-N-oxide tris pivaloyltrifluoroacetonato Eu0.1, Gd0.9 4-phenylpyridine tris pivaloyltrifluoroacetonato Eu0.1, Gd0.9 4-phenylpyridine-N-oxide tris pivaloyltrifluoroacetonato Eu0.1, Gd0.9 1-methylimidazole tris pivaloyltrifluoroacetonato Eu0.1, Gd0.9 triphenylphosphine oxide tris pivaloyltrifluoroacetonato Eu0.1, Gd0.9 2,2-bipyridyl tris pivaloyltrifluoroacetonato Eu0.1, Gd0.9 2,2-bipyridyl-N,N-dioxide tris pivaloyltrifluoroacetonato Eu0.1, Gd0.9 phenanthroline tris pivaloyltrifluoroacetonato Eu0.1, Gd0.9 bathocuproine tris pivaloyltrifluoroacetonato Eu0.1, Gd0.9 bathophenanthroline tris trifluoroacetylacetonato Eu0.1, Gd0.9 dimethylaminopyridine tris trifluoroacetylacetonato Eu0.1, Gd0.9 4-picoline-N-oxide tris trifluoroacetylacetonato Eu0.1, Gd0.9 4-phenylpyridine tris trifluoroacetylacetonato Eu0.1, Gd0.9 4-phenylpyridine-N-oxide tris trifluoroacetylacetonato Eu0.1, Gd0.9 1-methylimidazole tris trifluoroacetylacetonato Eu0.1, Gd0.9 triphenylphosphine oxide tris trifluoroacetylacetonato Eu0.1, Gd0.9 2,2-bipyridyl tris trifluoroacetylacetonato Eu0.1, Gd0.9 2,2-bipyridyl-N,N-dioxide tris trifluoroacetylacetonato Eu0.1, Gd0.9 phenanthroline tris trifluoroacetylacetonato Eu0.1, Gd0.9 bathocuproine tris trifluoroacetylacetonato Eu0.1, Gd0.9 bathophenanthroline tris hexafluoroacetylacetonato Eu0.1, Gd0.9 dimethylaminopyridine tris hexafluoroacetylacetonato Eu0.1, Gd0.9 4-picoline-N-oxide tris hexafluoroacetylacetonato Eu0.1, Gd0.9 4-phenylpyridine tris hexafluoroacetylacetonato Eu0.1, Gd0.9 4-phenylpyridine-N-oxide tris hexafluoroacetylacetonato Eu0.1, Gd0.9 1-methylimidazole tris hexafluoroacetylacetonato Eu0.1, Gd0.9 triphenylphosphine oxide tris hexafluoroacetylacetonato Eu0.1, Gd0.9 2,2-bipyridyl tris hexafluoroacetylacetonato Eu0.1, Gd0.9 2,2-bipyridyl-N,N-dioxide tris hexafluoroacetylacetonato Eu0.1, Gd0.9 phenanthroline tris hexafluoroacetylacetonato Eu0.1, Gd0.9 bathocuproine tris hexafluoroacetylacetonato Eu0.1, Gd0.9 bathophenanthroline tris 6,6,7,7,8,8,8-heptafluoro-2,2-dimethyloctanedionato Eu0.1, Gd0.9 dimethylaminopyridine tris 6,6,7,7,8,8,8-heptafluoro-2,2-dimethyloctanedionato Eu0.1, Gd0.9 4-picoline-N-oxide tris 6,6,7,7,8,8,8-heptafluoro-2,2-dimethyloctanedionato Eu0.1, Gd0.9 4-phenylpyridine tris 6,6,7,7,8,8,8-heptafluoro-2,2-dimethyloctanedionato Eu0.1, Gd0.9 4-phenylpyridine-N-oxide tris 6,6,7,7,8,8,8-heptafluoro-2,2-dimethyloctanedionato Eu0.1, Gd0.9 1-methylimidazole tris 6,6,7,7,8,8,8-heptafluoro-2,2-dimethyloctanedionato Eu0.1, Gd0.9 triphenylphosphine oxide tris 6,6,7,7,8,8,8-heptafluoro-2,2-dimethyloctanedionato Eu0.1, Gd0.9 2,2-bipyridyl tris 6,6,7,7,8,8,8-heptafluoro-2,2-dimethyloctanedionato Eu0.1, Gd0.9 2,2-bipyridyl-N,N-dioxide tris 6,6,7,7,8,8,8-heptafluoro-2,2-dimethyloctanedionato Eu0.1, Gd0.9 phenanthroline tris 6,6,7,7,8,8,8-heptafluoro-2,2-dimethyloctanedionato Eu0.1, Gd0.9 bathocuproine tris 6,6,7,7,8,8,8-heptafluoro-2,2-dimethyloctanedionato Eu0.1, Gd0.9 bathophenanthroline tris 1-phenyl-1,3-butanedionato Eu0.1, Gd0.9 dimethylaminopyridine tris 1-phenyl-1,3-butanedionato Eu0.1, Gd0.9 4-picoline-N-oxide tris 1-phenyl-1,3-butanedionato Eu0.1, Gd0.9 4-phenylpyridine tris 1-phenyl-1,3-butanedionato Eu0.1, Gd0.9 4-phenylpyridine-N-oxide tris 1-phenyl-1,3-butanedionato Eu0.1, Gd0.9 1-methylimidazole tris 1-phenyl-1,3-butanedionato Eu0.1, Gd0.9 triphenylphosphine oxide tris 1-phenyl-1,3-butanedionato Eu0.1, Gd0.9 2,2-bipyridyl tris 1-phenyl-1,3-butanedionato Eu0.1, Gd0.9 2,2-bipyridyl-N,N-dioxide tris 1-phenyl-1,3-butanedionato Eu0.1, Gd0.9 phenanthroline tris 1-phenyl-1,3-butanedionato Eu0.1, Gd0.9 bathocuproine tris 1-phenyl-1,3-butanedionato Eu0.1, Gd0.9 bathophenanthroline
tris acetylacetonato Eu0.01, Gd0.99 dimethylaminopyridine
tris acetylacetonato Eu0.01, Gd0.99 4-picoline-N-oxide
tris acetylacetonato Eu0.01, Gd0.99 4-phenylpyridine
tris acetylacetonato Eu0.01, Gd0.99 4-phenylpyridine-N-oxide
tris acetylacetonato Eu0.01, Gd0.99 1-methylimidazole
tris acetylacetonato Eu0.01, Gd0.99 triphenylphosphine oxide
tris acetylacetonato Eu0.01, Gd0.99 2,2-bipyridyl
tris acetylacetonato Eu0.01, Gd0.99 2,2-bipyridyl-N,N-dioxide
tris acetylacetonato Eu0.01, Gd0.99 phenanthroline
tris acetylacetonato Eu0.01, Gd0.99 bathocuproine
tris acetylacetonato Eu0.01, Gd0.99 bathophenanthroline
tris dibenzoylmethanato Eu0.01, Gd0.99 dimethylaminopyridine
tris dibenzoylmethanato Eu0.01, Gd0.99 4-picoline-N-oxide
tris dibenzoylmethanato Eu0.01, Gd0.99 4-phenylpyridine
tris dibenzoylmethanato Eu0.01, Gd0.99 4-phenylpyridine-N-oxide
tris dibenzoylmethanato Eu0.01, Gd0.99 1-methylimidazole
tris dibenzoylmethanato Eu0.01, Gd0.99 triphenylphosphine oxide
tris dibenzoylmethanato Eu0.01, Gd0.99 2,2-bipyridyl
tris dibenzoylmethanato Eu0.01, Gd0.99 2,2-bipyridyl-N,N-dioxide
tris dibenzoylmethanato Eu0.01, Gd0.99 phenanthroline
tris dibenzoylmethanato Eu0.01, Gd0.99 bathocuproine
tris dibenzoylmethanato Eu0.01, Gd0.99 bathophenanthroline
tris thenoyltrifluoroacetonato Eu0.01, Gd0.99 dimethylaminopyridine
tris thenoyltrifluoroacetonato Eu0.01, Gd0.99 4-picoline-N-oxide
tris thenoyltrifluoroacetonato Eu0.01, Gd0.99 4-phenylpyridine
tris thenoyltrifluoroacetonato Eu0.01, Gd0.99 4-phenylpyridine-N-oxide
tris thenoyltrifluoroacetonato Eu0.01, Gd0.99 1-methylimidazole
tris thenoyltrifluoroacetonato Eu0.01, Gd0.99 triphenylphosphine oxide
tris thenoyltrifluoroacetonato Eu0.01, Gd0.99 2,2-bipyridyl
tris thenoyltrifluoroacetonato Eu0.01, Gd0.99 2,2-bipyridyl-N,N-dioxide
tris thenoyltrifluoroacetonato Eu0.01, Gd0.99 phenanthroline
tris thenoyltrifluoroacetonato Eu0.01, Gd0.99 bathocuproine
tris thenoyltrifluoroacetonato Eu0.01, Gd0.99 bathophenanthroline
tris 2,2,6,6-tetramethylheptanedionato Eu0.01, Gd0.99 dimethylaminopyridine
tris 2,2,6,6-tetramethylheptanedionato Eu0.01, Gd0.99 4-picoline-N-oxide
tris 2,2,6,6-tetramethylheptanedionato Eu0.01, Gd0.99 4-phenylpyridine
tris 2,2,6,6-tetramethylheptanedionato Eu0.01, Gd0.99 4-phenylpyridine-N-oxide
tris 2,2,6,6-tetramethylheptanedionato Eu0.01, Gd0.99 1-methylimidazole
tris 2,2,6,6-tetramethylheptanedionato Eu0.01, Gd0.99 triphenylphosphine oxide
tris 2,2,6,6-tetramethylheptanedionato Eu0.01, Gd0.99 2,2-bipyridyl
tris 2,2,6,6-tetramethylheptanedionato Eu0.01, Gd0.99 2,2-bipyridyl-N,N-dioxide
tris 2,2,6,6-tetramethylheptanedionato Eu0.01, Gd0.99 phenanthroline
tris 2,2,6,6-tetramethylheptanedionato Eu0.01, Gd0.99 bathocuproine
tris 2,2,6,6-tetramethylheptanedionato Eu0.01, Gd0.99 bathophenanthroline
tris 3-methylpentane-2,4-dionato Eu0.01, Gd0.99 dimethylaminopyridine
tris 3-methylpentane-2,4-dionato Eu0.01, Gd0.99 4-picoline-N-oxide
tris 3-methylpentane-2,4-dionato Eu0.01, Gd0.99 4-phenylpyridine
tris 3-methylpentane-2,4-dionato Eu0.01, Gd0.99 4-phenylpyridine-N-oxide
tris 3-methylpentane-2,4-dionato Eu0.01, Gd0.99 1-methylimidazole
tris 3-methylpentane-2,4-dionato Eu0.01, Gd0.99 triphenylphosphine oxide
tris 3-methylpentane-2,4-dionato Eu0.01, Gd0.99 2,2-bipyridyl
tris 3-methylpentane-2,4-dionato Eu0.01, Gd0.99 2,2-bipyridyl-N,N-dioxide
tris 3-methylpentane-2,4-dionato Eu0.01, Gd0.99 phenanthroline
tris 3-methylpentane-2,4-dionato Eu0.01, Gd0.99 bathocuproine
tris 3-methylpentane-2,4-dionato Eu0.01, Gd0.99 bathophenanthroline
tris 3-ethylpentane-2,4-dionato Eu0.01, Gd0.99 dimethylaminopyridine
tris 3-ethylpentane-2,4-dionato Eu0.01, Gd0.99 4-picoline-N-oxide
tris 3-ethylpentane-2,4-dionato Eu0.01, Gd0.99 4-phenylpyridine
tris 3-ethylpentane-2,4-dionato Eu0.01, Gd0.99 4-phenylpyridine-N-oxide
tris 3-ethylpentane-2,4-dionato Eu0.01, Gd0.99 1-methylimidazole
tris 3-ethylpentane-2,4-dionato Eu0.01, Gd0.99 triphenylphosphine oxide
tris 3-ethylpentane-2,4-dionato Eu0.01, Gd0.99 2,2-bipyridyl
tris 3-ethylpentane-2,4-dionato Eu0.01, Gd0.99 2,2-bipyridyl-N,N-dioxide
tris 3-ethylpentane-2,4-dionato Eu0.01, Gd0.99 phenanthroline
tris 3-ethylpentane-2,4-dionato Eu0.01, Gd0.99 bathocuproine
tris 3-ethylpentane-2,4-dionato Eu0.01, Gd0.99 bathophenanthroline
tris pivaloyltrifluoroacetonato Eu0.01, Gd0.99 dimethylaminopyridine
tris pivaloyltrifluoroacetonato Eu0.01, Gd0.99 4-picoline-N-oxide
tris pivaloyltrifluoroacetonato Eu0.01, Gd0.99 4-phenylpyridine
tris pivaloyltrifluoroacetonato Eu0.01, Gd0.99 4-phenylpyridine-N-oxide
tris pivaloyltrifluoroacetonato Eu0.01, Gd0.99 1-methylimidazole
tris pivaloyltrifluoroacetonato Eu0.01, Gd0.99 triphenylphosphine oxide
tris pivaloyltrifluoroacetonato Eu0.01, Gd0.99 2,2-bipyridyl
tris pivaloyltrifluoroacetonato Eu0.01, Gd0.99 2,2-bipyridyl-N,N-dioxide tris pivaloyltrifluoroacetonato Eu0.01, Gd0.99 phenanthroline
tris pivaloyltrifluoroacetonato Eu0.01, Gd0.99 bathocuproine
tris pivaloyltrifluoroacetonato Eu0.01, Gd0.99 bathophenanthroline
tris trifluoroacetylacetonato Eu0.01, Gd0.99 dimethylaminopyridine
tris trifluoroacetylacetonato Eu0.01, Gd0.99 4-picoline-N-oxide
tris trifluoroacetylacetonato Eu0.01, Gd0.99 4-phenylpyridine
tris trifluoroacetylacetonato Eu0.01, Gd0.99 4-phenylpyridine-N-oxide
tris trifluoroacetylacetonato Eu0.01, Gd0.99 1-methylimidazole
tris trifluoroacetylacetonato Eu0.01, Gd0.99 triphenylphosphine oxide
tris trifluoroacetylacetonato Eu0.01, Gd0.99 2,2-bipyridyl
tris trifluoroacetylacetonato Eu0.01, Gd0.99 2,2-bipyridyl-N,N-dioxide
tris trifluoroacetylacetonato Eu0.01, Gd0.99 phenanthroline
tris trifluoroacetylacetonato Eu0.01, Gd0.99 bathocuproine
tris trifluoroacetylacetonato Eu0.01, Gd0.99 bathophenanthroline
tris hexafluoroacetylacetonato Eu0.01, Gd0.99 dimethylaminopyridine
tris hexafluoroacetylacetonato Eu0.01, Gd0.99 4-picoline-N-oxide
tris hexafluoroacetylacetonato Eu0.01, Gd0.99 4-phenylpyridine
tris hexafluoroacetylacetonato Eu0.01, Gd0.99 4-phenylpyridine-N-oxide
tris hexafluoroacetylacetonato Eu0.01, Gd0.99 1-methylimidazole
tris hexafluoroacetylacetonato Eu0.01, Gd0.99 triphenylphosphine oxide
tris hexafluoroacetylacetonato Eu0.01, Gd0.99 2,2-bipyridyl
tris hexafluoroacetylacetonato Eu0.01, Gd0.99 2,2-bipyridyl-N,N-dioxide
tris hexafluoroacetylacetonato Eu0.01, Gd0.99 phenanthroline
tris hexafluoroacetylacetonato Eu0.01, Gd0.99 bathocuproine
tris hexafluoroacetylacetonato Eu0.01, Gd0.99 bathophenanthroline
tris 6,6,7,7,8,8,8-heptafluoro-2,2-dimethyloctanedionato Eu0.01, Gd0.99 dimethylaminopyridine
tris 6,6,7,7,8,8,8-heptafluoro-2,2-dimethyloctanedionato Eu0.01, Gd0.99 4-picoline-N-oxide
tris 6,6,7,7,8,8,8-heptafluoro-2,2-dimethyloctanedionato Eu0.01, Gd0.99 4-phenylpyridine
tris 6,6,7,7,8,8,8-heptafluoro-2,2-dimethyloctanedionato Eu0.01, Gd0.99 4-phenylpyridine-N-oxide
tris 6,6,7,7,8,8,8-heptafluoro-2,2-dimethyloctanedionato Eu0.01, Gd0.99 1-methylimidazole
tris 6,6,7,7,8,8,8-heptafluoro-2,2-dimethyloctanedionato Eu0.01, Gd0.99 triphenylphosphine oxide
tris 6,6,7,7,8,8,8-heptafluoro-2,2-dimethyloctanedionato Eu0.01, Gd0.99 2,2-bipyridyl
tris 6,6,7,7,8,8,8-heptafluoro-2,2-dimethyloctanedionato Eu0.01, Gd0.99 2,2-bipyridyl-N,N-dioxide
tris 6,6,7,7,8,8,8-heptafluoro-2,2-dimethyloctanedionato Eu0.01, Gd0.99 phenanthroline
tris 6,6,7,7,8,8,8-heptafluoro-2,2-dimethyloctanedionato Eu0.01, Gd0.99 bathocuproine
tris 6,6,7,7,8,8,8-heptafluoro-2,2-dimethyloctanedionato Eu0.01, Gd0.99 bathophenanthroline
tris 1-phenyl-1,3-butanedionato Eu0.01, Gd0.99 dimethylaminopyridine
tris 1-phenyl-1,3-butanedionato Eu0.01, Gd0.99 4-picoline-N-oxide
tris 1-phenyl-1,3-butanedionato Eu0.01, Gd0.99 4-phenylpyridine
tris 1-phenyl-1,3-butanedionato Eu0.01, Gd0.99 4-phenylpyridine-N-oxide
tris 1-phenyl-1,3-butanedionato Eu0.01, Gd0.99 1-methylimidazole
tris 1-phenyl-1,3-butanedionato Eu0.01, Gd0.99 triphenylphosphine oxide
tris 1-phenyl-1,3-butanedionato Eu0.01, Gd0.99 2,2-bipyridyl
tris 1-phenyl-1,3-butanedionato Eu0.01, Gd0.99 2,2-bipyridyl-N,N-dioxide
tris 1-phenyl-1,3-butanedionato Eu0.01, Gd0.99 phenanthroline
tris 1-phenyl-1,3-butanedionato Eu0.01, Gd0.99 bathocuproine
tris 1-phenyl-1,3-butanedionato Eu0.01, Gd0.99 bathophenanthroline
tris acetylacetonato Eu0.5, Gd0.5 dimethylaminopyridine
tris acetylacetonato Eu0.5, Gd0.5 4-picoline-N-oxide
tris acetylacetonato Eu0.5, Gd0.5 4-phenylpyridine
tris acetylacetonato Eu0.5, Gd0.5 4-phenylpyridine-N-oxide
tris acetylacetonato Eu0.5, Gd0.5 1-methylimidazole
tris acetylacetonato Eu0.5, Gd0.5 triphenylphosphine oxide
tris acetylacetonato Eu0.5, Gd0.5 2,2-bipyridyl
tris acetylacetonato Eu0.5, Gd0.5 2,2-bipyridyl-N,N-dioxide
tris acetylacetonato Eu0.5, Gd0.5 phenanthroline
tris acetylacetonato Eu0.5, Gd0.5 bathocuproine
tris acetylacetonato Eu0.5, Gd0.5 bathophenanthroline
tris dibenzoylmethanato Eu0.5, Gd0.5 dimethylaminopyridine
tris dibenzoylmethanato Eu0.5, Gd0.5 4-picoline-N-oxide
tris dibenzoylmethanato Eu0.5, Gd0.5 4-phenylpyridine
tris dibenzoylmethanato Eu0.5, Gd0.5 4-phenylpyridine-N-oxide
tris dibenzoylmethanato Eu0.5, Gd0.5 1-methylimidazole
tris dibenzoylmethanato Eu0.5, Gd0.5 triphenylphosphine oxide
tris dibenzoylmethanato Eu0.5, Gd0.5 2,2-bipyridyl
tris dibenzoylmethanato Eu0.5, Gd0.5 2,2-bipyridyl-N,N-dioxide
tris dibenzoylmethanato Eu0.5, Gd0.5 phenanthroline
tris dibenzoylmethanato Eu0.5, Gd0.5 bathocuproine
tris dibenzoylmethanato Eu0.5, Gd0.5 bathophenanthroline
tris thenoyltrifluoroacetonato Eu0.5, Gd0.5 dimethylaminopyridine
tris thenoyltrifluoroacetonato Eu0.5, Gd0.5 4-picoline-N-oxide
tris thenoyltrifluoroacetonato Eu0.5, Gd0.5 4-phenylpyridine
tris thenoyltrifluoroacetonato Eu0.5, Gd0.5 4-phenylpyridine-N-oxide
tris thenoyltrifluoroacetonato Eu0.5, Gd0.5 1-methylimidazole
tris thenoyltrifluoroacetonato Eu0.5, Gd0.5 triphenylphosphine oxide
tris thenoyltrifluoroacetonato Eu0.5, Gd0.5 2,2-bipyridyl
tris thenoyltrifluoroacetonato Eu0.5, Gd0.5 2,2-bipyridyl-N,N-dioxide
tris thenoyltrifluoroacetonato Eu0.5, Gd0.5 phenanthroline
tris thenoyltrifluoroacetonato Eu0.5, Gd0.5 bathocuproine tris thenoyltrifluoroacetonato Eu0.5, Gd0.5 bathophenanthroline
tris 2,2,6,6-tetramethylheptanedionato Eu0.5, Gd0.5 dimethylaminopyridine
tris 2,2,6,6-tetramethylheptanedionato Eu0.5, Gd0.5 4-picoline-N-oxide
tris 2,2,6,6-tetramethylheptanedionato Eu0.5, Gd0.5 4-phenylpyridine
tris 2,2,6,6-tetramethylheptanedionato Eu0.5, Gd0.5 4-phenylpyridine-N-oxide
tris 2,2,6,6-tetramethylheptanedionato Eu0.5, Gd0.5 1-methylimidazole
tris 2,2,6,6-tetramethylheptanedionato Eu0.5, Gd0.5 triphenylphosphine oxide
tris 2,2,6,6-tetramethylheptanedionato Eu0.5, Gd0.5 2,2-bipyridyl
tris 2,2,6,6-tetramethylheptanedionato Eu0.5, Gd0.5 2,2-bipyridyl-N,N-dioxide
tris 2,2,6,6-tetramethylheptanedionato Eu0.5, Gd0.5 phenanthroline
tris 2,2,6,6-tetramethylheptanedionato Eu0.5, Gd0.5 bathocuproine
tris 2,2,6,6-tetramethylheptanedionato Eu0.5, Gd0.5 bathophenanthroline
tris 3-methylpentane-2,4-dionato Eu0.5, Gd0.5 dimethylaminopyridine
tris 3-methylpentane-2,4-dionato Eu0.5, Gd0.5 4-picoline-N-oxide
tris 3-methylpentane-2,4-dionato Eu0.5, Gd0.5 4-phenylpyridine
tris 3-methylpentane-2,4-dionato Eu0.5, Gd0.5 4-phenylpyridine-N-oxide
tris 3-methylpentane-2,4-dionato Eu0.5, Gd0.5 1-methylimidazole
tris 3-methylpentane-2,4-dionato Eu0.5, Gd0.5 triphenylphosphine oxide
tris 3-methylpentane-2,4-dionato Eu0.5, Gd0.5 2,2-bipyridyl
tris 3-methylpentane-2,4-dionato Eu0.5, Gd0.5 2,2-bipyridyl-N,N-dioxide
tris 3-methylpentane-2,4-dionato Eu0.5, Gd0.5 phenanthroline
tris 3-methylpentane-2,4-dionato Eu0.5, Gd0.5 bathocuproine
tris 3-methylpentane-2,4-dionato Eu0.5, Gd0.5 bathophenanthroline
tris 3-ethylpentane-2,4-dionato Eu0.5, Gd0.5 dimethylaminopyridine
tris 3-ethylpentane-2,4-dionato Eu0.5, Gd0.5 4-picoline-N-oxide
tris 3-ethylpentane-2,4-dionato Eu0.5, Gd0.5 4-phenylpyridine
tris 3-ethylpentane-2,4-dionato Eu0.5, Gd0.5 4-phenylpyridine-N-oxide
tris 3-ethylpentane-2,4-dionato Eu0.5, Gd0.5 1-methylimidazole
tris 3-ethylpentane-2,4-dionato Eu0.5, Gd0.5 triphenylphosphine oxide
tris 3-ethylpentane-2,4-dionato Eu0.5, Gd0.5 2,2-bipyridyl
tris 3-ethylpentane-2,4-dionato Eu0.5, Gd0.5 2,2-bipyridyl-N,N-dioxide
tris 3-ethylpentane-2,4-dionato Eu0.5, Gd0.5 phenanthroline
tris 3-ethylpentane-2,4-dionato Eu0.5, Gd0.5 bathocuproine
tris 3-ethylpentane-2,4-dionato Eu0.5, Gd0.5 bathophenanthroline
tris pivaloyltrifluoroacetonato Eu0.5, Gd0.5 dimethylaminopyridine
tris pivaloyltrifluoroacetonato Eu0.5, Gd0.5 4-picoline-N-oxide
tris pivaloyltrifluoroacetonato Eu0.5, Gd0.5 4-phenylpyridine
tris pivaloyltrifluoroacetonato Eu0.5, Gd0.5 4-phenylpyridine-N-oxide
tris pivaloyltrifluoroacetonato Eu0.5, Gd0.5 1-methylimidazole
tris pivaloyltrifluoroacetonato Eu0.5, Gd0.5 triphenylphosphine oxide
tris pivaloyltrifluoroacetonato Eu0.5, Gd0.5 2,2-bipyridyl
tris pivaloyltrifluoroacetonato Eu0.5, Gd0.5 2,2-bipyridyl-N,N-dioxide
tris pivaloyltrifluoroacetonato Eu0.5, Gd0.5 phenanthroline
tris pivaloyltrifluoroacetonato Eu0.5, Gd0.5 bathocuproine
tris pivaloyltrifluoroacetonato Eu0.5, Gd0.5 bathophenanthroline
tris trifluoroacetylacetonato Eu0.5, Gd0.5 dimethylaminopyridine
tris trifluoroacetylacetonato Eu0.5, Gd0.5 4-picoline-N-oxide
tris trifluoroacetylacetonato Eu0.5, Gd0.5 4-phenylpyridine
tris trifluoroacetylacetonato Eu0.5, Gd0.5 4-phenylpyridine-N-oxide
tris trifluoroacetylacetonato Eu0.5, Gd0.5 1-methylimidazole
tris trifluoroacetylacetonato Eu0.5, Gd0.5 triphenylphosphine oxide
tris trifluoroacetylacetonato Eu0.5, Gd0.5 2,2-bipyridyl
tris trifluoroacetylacetonato Eu0.5, Gd0.5 2,2-bipyridyl-N,N-dioxide
tris trifluoroacetylacetonato Eu0.5, Gd0.5 phenanthroline
tris trifluoroacetylacetonato Eu0.5, Gd0.5 bathocuproine
tris trifluoroacetylacetonato Eu0.5, Gd0.5 bathophenanthroline
tris hexafluoroacetylacetonato Eu0.5, Gd0.5 dimethylaminopyridine
tris hexafluoroacetylacetonato Eu0.5, Gd0.5 4-picoline-N-oxide
tris hexafluoroacetylacetonato Eu0.5, Gd0.5 4-phenylpyridine
tris hexafluoroacetylacetonato Eu0.5, Gd0.5 4-phenylpyridine-N-oxide
tris hexafluoroacetylacetonato Eu0.5, Gd0.5 1-methylimidazole
tris hexafluoroacetylacetonato Eu0.5, Gd0.5 triphenylphosphine oxide
tris hexafluoroacetylacetonato Eu0.5, Gd0.5 2,2-bipyridyl
tris hexafluoroacetylacetonato Eu0.5, Gd0.5 2,2-bipyridyl-N,N-dioxide
tris hexafluoroacetylacetonato Eu0.5, Gd0.5 phenanthroline
tris hexafluoroacetylacetonato Eu0.5, Gd0.5 bathocuproine
tris hexafluoroacetylacetonato Eu0.5, Gd0.5 bathophenanthroline
tris 6,6,7,7,8,8,8-heptafluoro-2,2-dimethyloctanedionato Eu0.5, Gd0.5 dimethylaminopyridine
tris 6,6,7,7,8,8,8-heptafluoro-2,2-dimethyloctanedionato Eu0.5, Gd0.5 4-picoline-N-oxide
tris 6,6,7,7,8,8,8-heptafluoro-2,2-dimethyloctanedionato Eu0.5, Gd0.5 4-phenylpyridine
tris 6,6,7,7,8,8,8-heptafluoro-2,2-dimethyloctanedionato Eu0.5, Gd0.5 4-phenylpyridine-N-oxide
tris 6,6,7,7,8,8,8-heptafluoro-2,2-dimethyloctanedionato Eu0.5, Gd0.5 1-methylimidazole tris 6,6,7,7,8,8,8-heptafluoro-2,2-dimethyloctanedionato Eu0.5, Gd0.5 triphenylphosphine oxide
tris 6,6,7,7,8,8,8-heptafluoro-2,2-dimethyloctanedionato Eu0.5, Gd0.5 2,2-bipyridyl
tris 6,6,7,7,8,8,8-heptafluoro-2,2-dimethyloctanedionato Eu0.5, Gd0.5 2,2-bipyridyl-N,N-dioxide
tris 6,6,7,7,8,8,8-heptafluoro-2,2-dimethyloctanedionato Eu0.5, Gd0.5 phenanthroline
tris 6,6,7,7,8,8,8-heptafluoro-2,2-dimethyloctanedionato Eu0.5, Gd0.5 bathocuproine
tris 6,6,7,7,8,8,8-heptafluoro-2,2-dimethyloctanedionato Eu0.5, Gd0.5 bathophenanthroline
tris 1-phenyl-1,3-butanedionato Eu0.5, Gd0.5 dimethylaminopyridine
tris 1-phenyl-1,3-butanedionato Eu0.5, Gd0.5 4-picoline-N-oxide
tris 1-phenyl-1,3-butanedionato Eu0.5, Gd0.5 4-phenylpyridine
tris 1-phenyl-1,3-butanedionato Eu0.5, Gd0.5 4-phenylpyridine-N-oxide
tris 1-phenyl-1,3-butanedionato Eu0.5, Gd0.5 1-methylimidazole
tris 1-phenyl-1,3-butanedionato Eu0.5, Gd0.5 triphenylphosphine oxide
tris 1-phenyl-1,3-butanedionato Eu0.5, Gd0.5 2,2-bipyridyl
tris 1-phenyl-1,3-butanedionato Eu0.5, Gd0.5 2,2-bipyridyl-N,N-dioxide
tris 1-phenyl-1,3-butanedionato Eu0.5, Gd0.5 phenanthroline
tris 1-phenyl-1,3-butanedionato Eu0.5, Gd0.5 bathocuproine
tris 1-phenyl-1,3-butanedionato Eu0.5, Gd0.5 bathophenanthroline
tris acetylacetonato Eu0.2, Gd0.8 dimethylaminopyridine
tris acetylacetonato Eu0.2, Gd0.8 4-picoline-N-oxide
tris acetylacetonato Eu0.2, Gd0.8 4-phenylpyridine
tris acetylacetonato Eu0.2, Gd0.8 4-phenylpyridine-N-oxide
tris acetylacetonato Eu0.2, Gd0.8 1-methylimidazole
tris acetylacetonato Eu0.2, Gd0.8 triphenylphosphine oxide
tris acetylacetonato Eu0.2, Gd0.8 2,2-bipyridyl
tris acetylacetonato Eu0.2, Gd0.8 2,2-bipyridyl-N,N-dioxide
tris acetylacetonato Eu0.2, Gd0.8 phenanthroline
tris acetylacetonato Eu0.2, Gd0.8 bathocuproine
tris acetylacetonato Eu0.2, Gd0.8 bathophenanthroline
tris dibenzoylmethanato Eu0.2, Gd0.8 dimethylaminopyridine
tris dibenzoylmethanato Eu0.2, Gd0.8 4-picoline-N-oxide
tris dibenzoylmethanato Eu0.2, Gd0.8 4-phenylpyridine
tris dibenzoylmethanato Eu0.2, Gd0.8 4-phenylpyridine-N-oxide
tris dibenzoylmethanato Eu0.2, Gd0.8 1-methylimidazole
tris dibenzoylmethanato Eu0.2, Gd0.8 triphenylphosphine oxide
tris dibenzoylmethanato Eu0.2, Gd0.8 2,2-bipyridyl
tris dibenzoylmethanato Eu0.2, Gd0.8 2,2-bipyridyl-N,N-dioxide
tris dibenzoylmethanato Eu0.2, Gd0.8 phenanthroline
tris dibenzoylmethanato Eu0.2, Gd0.8 bathocuproine
tris dibenzoylmethanato Eu0.2, Gd0.8 bathophenanthroline
tris thenoyltrifluoroacetonato Eu0.2, Gd0.8 dimethylaminopyridine
tris thenoyltrifluoroacetonato Eu0.2, Gd0.8 4-picoline-N-oxide
tris thenoyltrifluoroacetonato Eu0.2, Gd0.8 4-phenylpyridine
tris thenoyltrifluoroacetonato Eu0.2, Gd0.8 4-phenylpyridine-N-oxide
tris thenoyltrifluoroacetonato Eu0.2, Gd0.8 1-methylimidazole
tris thenoyltrifluoroacetonato Eu0.2, Gd0.8 triphenylphosphine oxide
tris thenoyltrifluoroacetonato Eu0.2, Gd0.8 2,2-bipyridyl
tris thenoyltrifluoroacetonato Eu0.2, Gd0.8 2,2-bipyridyl-N,N-dioxide
tris thenoyltrifluoroacetonato Eu0.2, Gd0.8 phenanthroline
tris thenoyltrifluoroacetonato Eu0.2, Gd0.8 bathocuproine
tris thenoyltrifluoroacetonato Eu0.2, Gd0.8 bathophenanthroline
tris 2,2,6,6-tetramethylheptanedionato Eu0.2, Gd0.8 dimethylaminopyridine
tris 2,2,6,6-tetramethylheptanedionato Eu0.2, Gd0.8 4-picoline-N-oxide
tris 2,2,6,6-tetramethylheptanedionato Eu0.2, Gd0.8 4-phenylpyridine
tris 2,2,6,6-tetramethylheptanedionato Eu0.2, Gd0.8 4-phenylpyridine-N-oxide
tris 2,2,6,6-tetramethylheptanedionato Eu0.2, Gd0.8 1-methylimidazole
tris 2,2,6,6-tetramethylheptanedionato Eu0.2, Gd0.8 triphenylphosphine oxide
tris 2,2,6,6-tetramethylheptanedionato Eu0.2, Gd0.8 2,2-bipyridyl
tris 2,2,6,6-tetramethylheptanedionato Eu0.2, Gd0.8 2,2-bipyridyl-N,N-dioxide
tris 2,2,6,6-tetramethylheptanedionato Eu0.2, Gd0.8 phenanthroline
tris 2,2,6,6-tetramethylheptanedionato Eu0.2, Gd0.8 bathocuproine
tris 2,2,6,6-tetramethylheptanedionato Eu0.2, Gd0.8 bathophenanthroline
tris 3-methylpentane-2,4-dionato Eu0.2, Gd0.8 dimethylaminopyridine
tris 3-methylpentane-2,4-dionato Eu0.2, Gd0.8 4-picoline-N-oxide
tris 3-methylpentane-2,4-dionato Eu0.2, Gd0.8 4-phenylpyridine
tris 3-methylpentane-2,4-dionato Eu0.2, Gd0.8 4-phenylpyridine-N-oxide
tris 3-methylpentane-2,4-dionato Eu0.2, Gd0.8 1-methylimidazole
tris 3-methylpentane-2,4-dionato Eu0.2, Gd0.8 triphenylphosphine oxide
tris 3-methylpentane-2,4-dionato Eu0.2, Gd0.8 2,2-bipyridyl
tris 3-methylpentane-2,4-dionato Eu0.2, Gd0.8 2,2-bipyridyl-N,N-dioxide
tris 3-methylpentane-2,4-dionato Eu0.2, Gd0.8 phenanthroline
tris 3-methylpentane-2,4-dionato Eu0.2, Gd0.8 bathocuproine
tris 3-methylpentane-2,4-dionato Eu0.2, Gd0.8 bathophenanthroline
tris 3-ethylpentane-2,4-dionato Eu0.2, Gd0.8 dimethylaminopyridine
tris 3-ethylpentane-2,4-dionato Eu0.2, Gd0.8 4-picoline-N-oxide
tris 3-ethylpentane-2,4-dionato Eu0.2, Gd0.8 4-phenylpyridine
tris 3-ethylpentane-2,4-dionato Eu0.2, Gd0.8 4-phenylpyridine-N-oxide
tris 3-ethylpentane-2,4-dionato Eu0.2, Gd0.8 1-methylimidazole
tris 3-ethylpentane-2,4-dionato Eu0.2, Gd0.8 triphenylphosphine oxide tris 3-ethylpentane-2,4-dionato Eu0.2, Gd0.8 2,2-bipyridyl
tris 3-ethylpentane-2,4-dionato Eu0.2, Gd0.8 2,2-bipyridyl-N,N-dioxide
tris 3-ethylpentane-2,4-dionato Eu0.2, Gd0.8 phenanthroline
tris 3-ethylpentane-2,4-dionato Eu0.2, Gd0.8 bathocuproine
tris 3-ethylpentane-2,4-dionato Eu0.2, Gd0.8 bathophenanthroline
tris pivaloyltrifluoroacetonato Eu0.2, Gd0.8 dimethylaminopyridine
tris pivaloyltrifluoroacetonato Eu0.2, Gd0.8 4-picoline-N-oxide
tris pivaloyltrifluoroacetonato Eu0.2, Gd0.8 4-phenylpyridine
tris pivaloyltrifluoroacetonato Eu0.2, Gd0.8 4-phenylpyridine-N-oxide
tris pivaloyltrifluoroacetonato Eu0.2, Gd0.8 1-methylimidazole
tris pivaloyltrifluoroacetonato Eu0.2, Gd0.8 triphenylphosphine oxide
tris pivaloyltrifluoroacetonato Eu0.2, Gd0.8 2,2-bipyridyl
tris pivaloyltrifluoroacetonato Eu0.2, Gd0.8 2,2-bipyridyl-N,N-dioxide.
tris pivaloyltrifluoroacetonato Eu0.2, Gd0.8 phenanthroline
tris pivaloyltrifluoroacetonato Eu0.2, Gd0.8 bathocuproine
tris pivaloyltrifluoroacetonato Eu0.2, Gd0.8 bathophenanthroline
tris trifluoroacetylacetonato Eu0.2, Gd0.8 dimethylaminopyridine
tris trifluoroacetylacetonato Eu0.2, Gd0.8 4-picoline-N-oxide
tris trifluoroacetylacetonato Eu0.2, Gd0.8 4-phenylpyridine
tris trifluoroacetylacetonato Eu0.2, Gd0.8 4-phenylpyridine-N-oxide
tris trifluoroacetylacetonato Eu0.2, Gd0.8 1-methylimidazole
tris trifluoroacetylacetonato Eu0.2, Gd0.8 triphenylphosphine oxide
tris trifluoroacetylacetonato Eu0.2, Gd0.8 2,2-bipyridyl
tris trifluoroacetylacetonato Eu0.2, Gd0.8 2,2-bipyridyl-N,N-dioxide
tris trifluoroacetylacetonato Eu0.2, Gd0.8 phenanthroline
tris trifluoroacetylacetonato Eu0.2, Gd0.8 bathocuproine
tris trifluoroacetylacetonato Eu0.2, Gd0.8 bathophenanthroline
tris hexafluoroacetylacetonato Eu0.2, Gd0.8 dimethylaminopyridine
tris hexafluoroacetylacetonato Eu0.2, Gd0.8 4-picoline-N-oxide
tris hexafluoroacetylacetonato Eu0.2, Gd0.8 4-phenylpyridine
tris hexafluoroacetylacetonato Eu0.2, Gd0.8 4-phenylpyridine-N-oxide
tris hexafluoroacetylacetonato Eu0.2, Gd0.8 1-methylimidazole
tris hexafluoroacetylacetonato Eu0.2, Gd0.8 triphenylphosphine oxide
tris hexafluoroacetylacetonato Eu0.2, Gd0.8 2,2-bipyridyl
tris hexafluoroacetylacetonato Eu0.2, Gd0.8 2,2-bipyridyl-N,N-dioxide
tris hexafluoroacetylacetonato Eu0.2, Gd0.8 phenanthroline
tris hexafluoroacetylacetonato Eu0.2, Gd0.8 bathocuproine
tris hexafluoroacetylacetonato Eu0.2, Gd0.8 bathophenanthroline
tris 6,6,7,7,8,8,8-heptafluoro-2,2-dimethyloctanedionato Eu0.2, Gd0.8 dimethylaminopyridine
tris 6,6,7,7,8,8,8-heptafluoro-2,2-dimethyloctanedionato Eu0.2, Gd0.8 4-picoline-N-oxide
tris 6,6,7,7,8,8,8-heptafluoro-2,2-dimethyloctanedionato Eu0.2, Gd0.8 4-phenylpyridine
tris 6,6,7,7,8,8,8-heptafluoro-2,2-dimethyloctanedionato Eu0.2, Gd0.8 4-phenylpyridine-N-oxide
tris 6,6,7,7,8,8,8-heptafluoro-2,2-dimethyloctanedionato Eu0.2, Gd0.8 1-methylimidazole
tris 6,6,7,7,8,8,8-heptafluoro-2,2-dimethyloctanedionato Eu0.2, Gd0.8 triphenylphosphine oxide
tris 6,6,7,7,8,8,8-heptafluoro-2,2-dimethyloctanedionato Eu0.2, Gd0.8 2,2-bipyridyl
tris 6,6,7,7,8,8,8-heptafluoro-2,2-dimethyloctanedionato Eu0.2, Gd0.8 2,2-bipyridyl-N,N-dioxide
tris 6,6,7,7,8,8,8-heptafluoro-2,2-dimethyloctanedionato Eu0.2, Gd0.8 phenanthroline
tris 6,6,7,7,8,8,8-heptafluoro-2,2-dimethyloctanedionato Eu0.2, Gd0.8 bathocuproine
tris 6,6,7,7,8,8,8-heptafluoro-2,2-dimethyloctanedionato Eu0.2, Gd0.8 bathophenanthroline
tris 1-phenyl-1,3-butanedionato Eu0.2, Gd0.8 dimethylaminopyridine
tris 1-phenyl-1,3-butanedionato Eu0.2, Gd0.8 4-picoline-N-oxide
tris 1-phenyl-1,3-butanedionato Eu0.2, Gd0.8 4-phenylpyridine
tris 1-phenyl-1,3-butanedionato Eu0.2, Gd0.8 4-phenylpyridine-N-oxide
tris 1-phenyl-1,3-butanedionato Eu0.2, Gd0.8 1-methylimidazole
tris 1-phenyl-1,3-butanedionato Eu0.2, Gd0.8 triphenylphosphine oxide
tris 1-phenyl-1,3-butanedionato Eu0.2, Gd0.8 2,2-bipyridyl
tris 1-phenyl-1,3-butanedionato Eu0.2, Gd0.8 2,2-bipyridyl-N,N-dioxide
tris 1-phenyl-1,3-butanedionato Eu0.2, Gd0.8 phenanthroline
tris 1-phenyl-1,3-butanedionato Eu0.2, Gd0.8 bathocuproine
tris 1-phenyl-1,3-butanedionato Eu0.2, Gd0.8 bathophenanthroline
tris acetylacetonato Eu0.1, Gd0.9 dimethylaminopyridine
tris acetylacetonato Eu0.1, Gd0.9 4-picoline-N-oxide
tris acetylacetonato Eu0.1, Gd0.9 4-phenylpyridine
tris acetylacetonato Eu0.1, Gd0.9 4-phenylpyridine-N-oxide
tris acetylacetonato Eu0.1, Gd0.9 1-methylimidazole
tris acetylacetonato Eu0.1, Gd0.9 triphenylphosphine oxide
tris acetylacetonato Eu0.1, Gd0.9 2,2-bipyridyl
tris acetylacetonato Eu0.1, Gd0.9 2,2-bipyridyl-N,N-dioxide
tris acetylacetonato Eu0.1, Gd0.9 phenanthroline
tris acetylacetonato Eu0.1, Gd0.9 bathocuproine
tris acetylacetonato Eu0.1, Gd0.9 bathophenanthroline
tris dibenzoylmethanato Eu0.1, Gd0.9 dimethylaminopyridine
tris dibenzoylmethanato Eu0.1, Gd0.9 4-picoline-N-oxide
tris dibenzoylmethanato Eu0.1, Gd0.9 4-phenylpyridine
tris dibenzoylmethanato Eu0.1, Gd0.9 4-phenylpyridine-N-oxide
tris dibenzoylmethanato Eu0.1, Gd0.9 1-methylimidazole
tris dibenzoylmethanato Eu0.1, Gd0.9 triphenylphosphine oxide
tris dibenzoylmethanato Eu0.1, Gd0.9 2,2-bipyridyl
tris dibenzoylmethanato Eu0.1, Gd0.9 2,2-bipyridyl-N,N-dioxide
tris dibenzoylmethanato Eu0.1, Gd0.9 phenanthroline
tris dibenzoylmethanato Eu0.1, Gd0.9 bathocuproine
tris dibenzoylmethanato Eu0.1, Gd0.9 bathophenanthroline tris thenoyltrifluoroacetonato Eu0.1, Gd0.9 dimethylaminopyridine tris thenoyltrifluoroacetonato Eu0.1, Gd0.9 4-picoline-N-oxide tris thenoyltrifluoroacetonato Eu0.1, Gd0.9 4-phenylpyridine tris thenoyltrifluoroacetonato Eu0.1, Gd0.9 4-phenylpyridine-N-oxide tris thenoyltrifluoroacetonato Eu0.1, Gd0.9 1-methylimidazole tris thenoyltrifluoroacetonato Eu0.1, Gd0.9 triphenylphosphine oxide tris thenoyltrifluoroacetonato Eu0.1, Gd0.9 2,2-bipyridyl tris thenoyltrifluoroacetonato Eu0.1, Gd0.9 2,2-bipyridyl-N,N-dioxide tris thenoyltrifluoroacetonato Eu0.1, Gd0.9 phenanthroline tris thenoyltrifluoroacetonato Eu0.1, Gd0.9 bathocuproine tris thenoyltrifluoroacetonato Eu0.1, Gd0.9 bathophenanthroline tris 2,2,6,6-tetramethylheptanedionato Eu0.1, Gd0.9 dimethylaminopyridine tris 2,2,6,6-tetramethylheptanedionato Eu0.1, Gd0.9 4-picoline-N-oxide tris 2,2,6,6-tetramethylheptanedionato Eu0.1, Gd0.9 4-phenylpyridine tris 2,2,6,6-tetramethylheptanedionato Eu0.1, Gd0.9 4-phenylpyridine-N-oxide tris 2,2,6,6-tetramethylheptanedionato Eu0.1, Gd0.9 1-methylimidazole tris 2,2,6,6-tetramethylheptanedionato Eu0.1, Gd0.9 triphenylphosphine oxide tris 2,2,6,6-tetramethylheptanedionato Eu0.1, Gd0.9 2,2-bipyridyl tris 2,2,6,6-tetramethylheptanedionato Eu0.1, Gd0.9 2,2-bipyridyl-N,N-dioxide tris 2,2,6,6-tetramethylheptanedionato Eu0.1, Gd0.9 phenanthroline tris 2,2,6,6-tetramethylheptanedionato Eu0.1, Gd0.9 bathocuproine tris 2,2,6,6-tetramethylheptanedionato Eu0.1, Gd0.9 bathophenanthroline tris 3-methylpentane-2,4-dionato Eu0.1, Gd0.9 dimethylaminopyridine tris 3-methylpentane-2,4-dionato Eu0.1, Gd0.9 4-picoline-N-oxide tris 3-methylpentane-2,4-dionato Eu0.1, Gd0.9 4-phenylpyridine tris 3-methylpentane-2,4-dionato Eu0.1, Gd0.9 4-phenylpyridine-N-oxide tris 3-methylpentane-2,4-dionato Eu0.1, Gd0.9 1-methylimidazole tris 3-methylpentane-2,4-dionato Eu0.1, Gd0.9 triphenylphosphine oxide tris 3-methylpentane-2,4-dionato Eu0.1, Gd0.9 2,2-bipyridyl tris 3-methylpentane-2,4-dionato Eu0.1, Gd0.9 2,2-bipyridyl-N,N-dioxide tris 3-methylpentane-2,4-dionato Eu0.1, Gd0.9 phenanthroline tris 3-methylpentane-2,4-dionato Eu0.1, Gd0.9 bathocuproine tris 3-methylpentane-2,4-dionato Eu0.1, Gd0.9 bathophenanthroline tris 3-ethylpentane-2,4-dionato Eu0.1, Gd0.9 dimethylaminopyridine tris 3-ethylpentane-2,4-dionato Eu0.1, Gd0.9 4-picoline-N-oxide tris 3-ethylpentane-2,4-dionato Eu0.1, Gd0.9 4-phenylpyridine tris 3-ethylpentane-2,4-dionato Eu0.1, Gd0.9 4-phenylpyridine-N-oxide tris 3-ethylpentane-2,4-dionato Eu0.1, Gd0.9 1-methylimidazole tris 3-ethylpentane-2,4-dionato Eu0.1, Gd0.9 triphenylphosphine oxide tris 3-ethylpentane-2,4-dionato Eu0.1, Gd0.9 2,2-bipyridyl tris 3-ethylpentane-2,4-dionato Eu0.1, Gd0.9 2,2-bipyridyl-N,N-dioxide tris 3-ethylpentane-2,4-dionato Eu0.1, Gd0.9 phenanthroline tris 3-ethylpentane-2,4-dionato Eu0.1, Gd0.9 bathocuproine tris 3-ethylpentane-2,4-dionato Eu0.1, Gd0.9 bathophenanthroline tris pivaloyltrifluoroacetonato Eu0.1, Gd0.9 dimethylaminopyridine tris pivaloyltrifluoroacetonato Eu0.1, Gd0.9 4-picoline-N-oxide tris pivaloyltrifluoroacetonato Eu0.1, Gd0.9 4-phenylpyridine tris pivaloyltrifluoroacetonato Eu0.1, Gd0.9 4-phenylpyridine-N-oxide tris pivaloyltrifluoroacetonato Eu0.1, Gd0.9 1-methylimidazole tris pivaloyltrifluoroacetonato Eu0.1, Gd0.9 triphenylphosphine oxide tris pivaloyltrifluoroacetonato Eu0.1, Gd0.9 2,2-bipyridyl tris pivaloyltrifluoroacetonato Eu0.1, Gd0.9 2,2-bipyridyl-N,N-dioxide tris pivaloyltrifluoroacetonato Eu0.1, Gd0.9 phenanthroline tris pivaloyltrifluoroacetonato Eu0.1, Gd0.9 bathocuproine tris pivaloyltrifluoroacetonato Eu0.1, Gd0.9 bathophenanthroline tris trifluoroacetylacetonato Eu0.1, Gd0.9 dimethylaminopyridine tris trifluoroacetylacetonato Eu0.1, Gd0.9 4-picoline-N-oxide tris trifluoroacetylacetonato Eu0.1, Gd0.9 4-phenylpyridine tris trifluoroacetylacetonato Eu0.1, Gd0.9 4-phenylpyridine-N-oxide tris trifluoroacetylacetonato Eu0.1, Gd0.9 1-methylimidazole tris trifluoroacetylacetonato Eu0.1, Gd0.9 triphenylphosphine oxide tris trifluoroacetylacetonato Eu0.1, Gd0.9 2,2-bipyridyl tris trifluoroacetylacetonato Eu0.1, Gd0.9 2,2-bipyridyl-N,N-dioxide tris trifluoroacetylacetonato Eu0.1, Gd0.9 phenanthroline tris trifluoroacetylacetonato Eu0.1, Gd0.9 bathocuproine tris trifluoroacetylacetonato Eu0.1, Gd0.9 bathophenanthroline tris hexafluoroacetylacetonato Eu0.1, Gd0.9 dimethylaminopyridine tris hexafluoroacetylacetonato Eu0.1, Gd0.9 4-picoline-N-oxide tris hexafluoroacetylacetonato Eu0.1, Gd0.9 4-phenylpyridine tris hexafluoroacetylacetonato Eu0.1, Gd0.9 4-phenylpyridine-N-oxide tris hexafluoroacetylacetonato Eu0.1, Gd0.9 1-methylimidazole tris hexafluoroacetylacetonato Eu0.1, Gd0.9 triphenylphosphine oxide tris hexafluoroacetylacetonato Eu0.1, Gd0.9 2,2-bipyridyl tris hexafluoroacetylacetonato Eu0.1, Gd0.9 2,2-bipyridyl-N,N-dioxide
tris hexafluoroacetylacetonato Eu0.1, Gd0.9 phenanthroline
tris hexafluoroacetylacetonato Eu0.1, Gd0.9 bathocuproine
tris hexafluoroacetylacetonato Eu0.1, Gd0.9 bathophenanthroline
tris 6,6,7,7,8,8,8-heptafluoro-2,2-dimethyloctanedionato Eu0.1, Gd0.9 dimethylaminopyridine
tris 6,6,7,7,8,8,8-heptafluoro-2,2-dimethyloctanedionato Eu0.1, Gd0.9 4-picoline-N-oxide
tris 6,6,7,7,8,8,8-heptafluoro-2,2-dimethyloctanedionato Eu0.1, Gd0.9 4-phenylpyridine
tris 6,6,7,7,8,8,8-heptafluoro-2,2-dimethyloctanedionato Eu0.1, Gd0.9 4-phenylpyridine-N-oxide
tris 6,6,7,7,8,8,8-heptafluoro-2,2-dimethyloctanedionato Eu0.1, Gd0.9 1-methylimidazole
tris 6,6,7,7,8,8,8-heptafluoro-2,2-dimethyloctanedionato Eu0.1, Gd0.9 triphenylphosphine oxide
tris 6,6,7,7,8,8,8-heptafluoro-2,2-dimethyloctanedionato Eu0.1, Gd0.9 2,2-bipyridyl
tris 6,6,7,7,8,8,8-heptafluoro-2,2-dimethyloctanedionato Eu0.1, Gd0.9 2,2-bipyridyl-N,N-dioxide
tris 6,6,7,7,8,8,8-heptafluoro-2,2-dimethyloctanedionato Eu0.1, Gd0.9 phenanthroline
tris 6,6,7,7,8,8,8-heptafluoro-2,2-dimethyloctanedionato Eu0.1, Gd0.9 bathocuproine
tris 6,6,7,7,8,8,8-heptafluoro-2,2-dimethyloctanedionato Eu0.1, Gd0.9 bathophenanthroline
tris 1-phenyl-1,3-butanedionato Eu0.1, Gd0.9 dimethylaminopyridine
tris 1-phenyl-1,3-butanedionato Eu0.1, Gd0.9 4-picoline-N-oxide
tris 1-phenyl-1,3-butanedionato Eu0.1, Gd0.9 4-phenylpyridine
tris 1-phenyl-1,3-butanedionato Eu0.1, Gd0.9 4-phenylpyridine-N-oxide
tris 1-phenyl-1,3-butanedionato Eu0.1, Gd0.9 1-methylimidazole
tris 1-phenyl-1,3-butanedionato Eu0.1, Gd0.9 triphenylphosphine oxide
tris 1-phenyl-1,3-butanedionato Eu0.1, Gd0.9 2,2-bipyridyl
tris 1-phenyl-1,3-butanedionato Eu0.1, Gd0.9 2,2-bipyridyl-N,N-dioxide
tris 1-phenyl-1,3-butanedionato Eu0.1, Gd0.9 phenanthroline
tris 1-phenyl-1,3-butanedionato Eu0.1, Gd0.9 bathocuproine
tris 1-phenyl-1,3-butanedionato Eu0.1, Gd0.9 bathophenanthroline
tris acetylacetonato Eu0.01, Gd0.99 dimethylaminopyridine
tris acetylacetonato Eu0.01, Gd0.99 4-picoline-N-oxide
tris acetylacetonato Eu0.01, Gd0.99 4-phenylpyridine
tris acetylacetonato Eu0.01, Gd0.99 4-phenylpyridine-N-oxide
tris acetylacetonato Eu0.01, Gd0.99 1-methylimidazole
tris acetylacetonato Eu0.01, Gd0.99 triphenylphosphine oxide
tris acetylacetonato Eu0.01, Gd0.99 2,2-bipyridyl
tris acetylacetonato Eu0.01, Gd0.99 2,2-bipyridyl-N,N-dioxide
tris acetylacetonato Eu0.01, Gd0.99 phenanthroline
tris acetylacetonato Eu0.01, Gd0.99 bathocuproine
tris acetylacetonato Eu0.01, Gd0.99 bathophenanthroline
tris dibenzoylmethanato Eu0.01, Gd0.99 dimethylaminopyridine
tris dibenzoylmethanato Eu0.01, Gd0.99 4-picoline-N-oxide
tris dibenzoylmethanato Eu0.01, Gd0.99 4-phenylpyridine
tris dibenzoylmethanato Eu0.01, Gd0.99 4-phenylpyridine-N-oxide
tris dibenzoylmethanato Eu0.01, Gd0.99 1-methylimidazole
tris dibenzoylmethanato Eu0.01, Gd0.99 triphenylphosphine oxide
tris dibenzoylmethanato Eu0.01, Gd0.99 2,2-bipyridyl
tris dibenzoylmethanato Eu0.01, Gd0.99 2,2-bipyridyl-N,N-dioxide
tris dibenzoylmethanato Eu0.01, Gd0.99 phenanthroline
tris dibenzoylmethanato Eu0.01, Gd0.99 bathocuproine
tris dibenzoylmethanato Eu0.01, Gd0.99 bathophenanthroline
tris thenoyltrifluoroacetonato Eu0.01, Gd0.99 dimethylaminopyridine
tris thenoyltrifluoroacetonato Eu0.01, Gd0.99 4-picoline-N-oxide
tris thenoyltrifluoroacetonato Eu0.01, Gd0.99 4-phenylpyridine
tris thenoyltrifluoroacetonato Eu0.01, Gd0.99 4-phenylpyridine-N-oxide
tris thenoyltrifluoroacetonato Eu0.01, Gd0.99 1-methylimidazole
tris thenoyltrifluoroacetonato Eu0.01, Gd0.99 triphenylphosphine oxide
tris thenoyltrifluoroacetonato Eu0.01, Gd0.99 2,2-bipyridyl
tris thenoyltrifluoroacetonato Eu0.01, Gd0.99 2,2-bipyridyl-N,N-dioxide
tris thenoyltrifluoroacetonato Eu0.01, Gd0.99 phenanthroline
tris thenoyltrifluoroacetonato Eu0.01, Gd0.99 bathocuproine
tris thenoyltrifluoroacetonato Eu0.01, Gd0.99 bathophenanthroline
tris 2,2,6,6-tetramethylheptanedionato Eu0.01, Gd0.99 dimethylaminopyridine
tris 2,2,6,6-tetramethylheptanedionato Eu0.01, Gd0.99 4-picoline-N-oxide
tris 2,2,6,6-tetramethylheptanedionato Eu0.01, Gd0.99 4-phenylpyridine
tris 2,2,6,6-tetramethylheptanedionato Eu0.01, Gd0.99 4-phenylpyridine-N-oxide
tris 2,2,6,6-tetramethylheptanedionato Eu0.01, Gd0.99 1-methylimidazole
tris 2,2,6,6-tetramethylheptanedionato Eu0.01, Gd0.99 triphenylphosphine oxide
tris 2,2,6,6-tetramethylheptanedionato Eu0.01, Gd0.99 2,2-bipyridyl
tris 2,2,6,6-tetramethylheptanedionato Eu0.01, Gd0.99 2,2-bipyridyl-N,N-dioxide
tris 2,2,6,6-tetramethylheptanedionato Eu0.01, Gd0.99 phenanthroline
tris 2,2,6,6-tetramethylheptanedionato Eu0.01, Gd0.99 bathocuproine
tris 2,2,6,6-tetramethylheptanedionato Eu0.01, Gd0.99 bathophenanthroline
tris 3-methylpentane-2,4-dionato Eu0.01, Gd0.99 dimethylaminopyridine
tris 3-methylpentane-2,4-dionato Eu0.01, Gd0.99 4-picoline-N-oxide
tris 3-methylpentane-2,4-dionato Eu0.01, Gd0.99 4-phenylpyridine
tris 3-methylpentane-2,4-dionato Eu0.01, Gd0.99 4-phenylpyridine-N-oxide
tris 3-methylpentane-2,4-dionato Eu0.01, Gd0.99 1-methylimidazole
tris 3-methylpentane-2,4-dionato Eu0.01, Gd0.99 triphenylphosphine oxide tris 3-methylpentane-2,4-dionato Eu0.01, Gd0.99 2,2-bipyridyl tris 3-methylpentane-2,4-dionato Eu0.01, Gd0.99 2,2-bipyridyl-N,N-dioxide tris 3-methylpentane-2,4-dionato Eu0.01, Gd0.99 phenanthroline tris 3-methylpentane-2,4-dionato Eu0.01, Gd0.99 bathocuproine tris 3-methylpentane-2,4-dionato Eu0.01, Gd0.99 bathophenanthroline tris 3-ethylpentane-2,4-dionato Eu0.01, Gd0.99 dimethylaminopyridine tris 3-ethylpentane-2,4-dionato Eu0.01, Gd0.99 4-picoline-N-oxide tris 3-ethylpentane-2,4-dionato Eu0.01, Gd0.99 4-phenylpyridine tris 3-ethylpentane-2,4-dionato Eu0.01, Gd0.99 4-phenylpyridine-N-oxide tris 3-ethylpentane-2,4-dionato Eu0.01, Gd0.99 1-methylimidazole tris 3-ethylpentane-2,4-dionato Eu0.01, Gd0.99 triphenylphosphine oxide tris 3-ethylpentane-2,4-dionato Eu0.01, Gd0.99 2,2-bipyridyl tris 3-ethylpentane-2,4-dionato Eu0.01, Gd0.99 2,2-bipyridyl-N,N-dioxide tris 3-ethylpentane-2,4-dionato Eu0.01, Gd0.99 phenanthroline tris 3-ethylpentane-2,4-dionato Eu0.01, Gd0.99 bathocuproine tris 3-ethylpentane-2,4-dionato Eu0.01, Gd0.99 bathophenanthroline tris pivaloyltrifluoroacetonato Eu0.01, Gd0.99 dimethylaminopyridine tris pivaloyltrifluoroacetonato Eu0.01, Gd0.99 4-picoline-N-oxide tris pivaloyltrifluoroacetonato Eu0.01, Gd0.99 4-phenylpyridine tris pivaloyltrifluoroacetonato Eu0.01, Gd0.99 4-phenylpyridine-N-oxide tris pivaloyltrifluoroacetonato Eu0.01, Gd0.99 1-methylimidazole tris pivaloyltrifluoroacetonato Eu0.01, Gd0.99 triphenylphosphine oxide tris pivaloyltrifluoroacetonato Eu0.01, Gd0.99 2,2-bipyridyl tris pivaloyltrifluoroacetonato Eu0.01, Gd0.99 2,2-bipyridyl-N,N-dioxide tris pivaloyltrifluoroacetonato Eu0.01, Gd0.99 phenanthroline tris pivaloyltrifluoroacetonato Eu0.01, Gd0.99 bathocuproine tris pivaloyltrifluoroacetonato Eu0.01, Gd0.99 bathophenanthroline tris trifluoroacetylacetonato Eu0.01, Gd0.99 dimethylaminopyridine tris trifluoroacetylacetonato Eu0.01, Gd0.99 4-picoline-N-oxide tris trifluoroacetylacetonato Eu0.01, Gd0.99 4-phenylpyridine tris trifluoroacetylacetonato Eu0.01, Gd0.99 4-phenylpyridine-N-oxide tris trifluoroacetylacetonato Eu0.01, Gd0.99 1-methylimidazole tris trifluoroacetylacetonato Eu0.01, Gd0.99 triphenylphosphine oxide tris trifluoroacetylacetonato Eu0.01, Gd0.99 2,2-bipyridyl tris trifluoroacetylacetonato Eu0.01, Gd0.99 2,2-bipyridyl-N,N-dioxide tris trifluoroacetylacetonato Eu0.01, Gd0.99 phenanthroline tris trifluoroacetylacetonato Eu0.01, Gd0.99 bathocuproine tris trifluoroacetylacetonato Eu0.01, Gd0.99 bathophenanthroline tris hexafluoroacetylacetonato Eu0.01, Gd0.99 dimethylaminopyridine tris hexafluoroacetylacetonato Eu0.01, Gd0.99 4-picoline-N-oxide tris hexafluoroacetylacetonato Eu0.01, Gd0.99 4-phenylpyridine tris hexafluoroacetylacetonato Eu0.01, Gd0.99 4-phenylpyridine-N-oxide tris hexafluoroacetylacetonato Eu0.01, Gd0.99 1-methylimidazole tris hexafluoroacetylacetonato Eu0.01, Gd0.99 triphenylphosphine oxide tris hexafluoroacetylacetonato Eu0.01, Gd0.99 2,2-bipyridyl tris hexafluoroacetylacetonato Eu0.01, Gd0.99 2,2-bipyridyl-N,N-dioxide tris hexafluoroacetylacetonato Eu0.01, Gd0.99 phenanthroline tris hexafluoroacetylacetonato Eu0.01, Gd0.99 bathocuproine tris hexafluoroacetylacetonato Eu0.01, Gd0.99 bathophenanthroline tris 6,6,7,7,8,8,8-heptafluoro-2,2-dimethyloctanedionato Eu0.01, Gd0.99 dimethylaminopyridine tris 6,6,7,7,8,8,8-heptafluoro-2,2-dimethyloctanedionato Eu0.01, Gd0.99 4-picoline-N-oxide tris 6,6,7,7,8,8,8-heptafluoro-2,2-dimethyloctanedionato Eu0.01, Gd0.99 4-phenylpyridine tris 6,6,7,7,8,8,8-heptafluoro-2,2-dimethyloctanedionato Eu0.01, Gd0.99 4-phenylpyridine-N-oxide tris 6,6,7,7,8,8,8-heptafluoro-2,2-dimethyloctanedionato Eu0.01, Gd0.99 1-methylimidazole tris 6,6,7,7,8,8,8-heptafluoro-2,2-dimethyloctanedionato Eu0.01, Gd0.99 triphenylphosphine oxide tris 6,6,7,7,8,8,8-heptafluoro-2,2-dimethyloctanedionato Eu0.01, Gd0.99 2,2-bipyridyl tris 6,6,7,7,8,8,8-heptafluoro-2,2-dimethyloctanedionato Eu0.01, Gd0.99 2,2-bipyridyl-N,N-dioxide tris 6,6,7,7,8,8,8-heptafluoro-2,2-dimethyloctanedionato Eu0.01, Gd0.99 phenanthroline tris 6,6,7,7,8,8,8-heptafluoro-2,2-dimethyloctanedionato Eu0.01, Gd0.99 bathocuproine tris 6,6,7,7,8,8,8-heptafluoro-2,2-dimethyloctanedionato Eu0.01, Gd0.99 bathophenanthroline tris 1-phenyl-1,3-butanedionato Eu0.01, Gd0.99 dimethylaminopyridine tris 1-phenyl-1,3-butanedionato Eu0.01, Gd0.99 4-picoline-N-oxide tris 1-phenyl-1,3-butanedionato Eu0.01, Gd0.99 4-phenylpyridine tris 1-phenyl-1,3-butanedionato Eu0.01, Gd0.99 4-phenylpyridine-N-oxide tris 1-phenyl-1,3-butanedionato Eu0.01, Gd0.99 1-methylimidazole tris 1-phenyl-1,3-butanedionato Eu0.01, Gd0.99 triphenylphosphine oxide tris 1-phenyl-1,3-butanedionato Eu0.01, Gd0.99 2,2-bipyridyl tris 1-phenyl-1,3-butanedionato Eu0.01, Gd0.99 2,2-bipyridyl-N,N-dioxide tris 1-phenyl-1,3-butanedionato Eu0.01, Gd0.99 phenanthroline tris 1-phenyl-1,3-butanedionato Eu0.01, Gd0.99 bathocuproine
tris 1-phenyl-1,3-butanedionato Eu0.01, Gd0.99 bathophenanthroline
tris acetylacetonato Sm0.5, Y0.5 dimethylaminopyridine
tris acetylacetonato Sm0.5, Y0.5 4-picoline-N-oxide
tris acetylacetonato Sm0.5, Y0.5 4-phenylpyridine
tris acetylacetonato Sm0.5, Y0.5 4-phenylpyridine-N-oxide
tris acetylacetonato Sm0.5, Y0.5 1-methylimidazole
tris acetylacetonato Sm0.5, Y0.5 triphenylphosphine oxide
tris acetylacetonato Sm0.5, Y0.5 2,2-bipyridyl
tris acetylacetonato Sm0.5, Y0.5 2,2-bipyridyl-N,N-dioxide
tris acetylacetonato Sm0.5, Y0.5 phenanthroline
tris acetylacetonato Sm0.5, Y0.5 bathocuproine
tris acetylacetonato Sm0.5, Y0.5 bathophenanthroline
tris dibenzoylmethanato Sm0.5, Y0.5 dimethylaminopyridine
tris dibenzoylmethanato Sm0.5, Y0.5 4-picoline-N-oxide
tris dibenzoylmethanato Sm0.5, Y0.5 4-phenylpyridine
tris dibenzoylmethanato Sm0.5, Y0.5 4-phenylpyridine-N-oxide
tris dibenzoylmethanato Sm0.5, Y0.5 1-methylimidazole
tris dibenzoylmethanato Sm0.5, Y0.5 triphenylphosphine oxide
tris dibenzoylmethanato Sm0.5, Y0.5 2,2-bipyridyl
tris dibenzoylmethanato Sm0.5, Y0.5 2,2-bipyridyl-N,N-dioxide
tris dibenzoylmethanato Sm0.5, Y0.5 phenanthroline
tris dibenzoylmethanato Sm0.5, Y0.5 bathocuproine
tris dibenzoylmethanato Sm0.5, Y0.5 bathophenanthroline
tris thenoyltrifluoroacetonato Sm0.5, Y0.5 dimethylaminopyridine
tris thenoyltrifluoroacetonato Sm0.5, Y0.5 4-picoline-N-oxide
tris thenoyltrifluoroacetonato Sm0.5, Y0.5 4-phenylpyridine
tris thenoyltrifluoroacetonato Sm0.5, Y0.5 4-phenylpyridine-N-oxide
tris thenoyltrifluoroacetonato Sm0.5, Y0.5 1-methylimidazole
tris thenoyltrifluoroacetonato Sm0.5, Y0.5 triphenylphosphine oxide
tris thenoyltrifluoroacetonato Sm0.5, Y0.5 2,2-bipyridyl
tris thenoyltrifluoroacetonato Sm0.5, Y0.5 2,2-bipyridyl-N,N-dioxide
tris thenoyltrifluoroacetonato Sm0.5, Y0.5 phenanthroline
tris thenoyltrifluoroacetonato Sm0.5, Y0.5 bathocuproine
tris thenoyltrifluoroacetonato Sm0.5, Y0.5 bathophenanthroline
tris 2,2,6,6-tetramethylheptanedionato Sm0.5, Y0.5 dimethylaminopyridine
tris 2,2,6,6-tetramethylheptanedionato Sm0.5, Y0.5 4-picoline-N-oxide
tris 2,2,6,6-tetramethylheptanedionato Sm0.5, Y0.5 4-phenylpyridine
tris 2,2,6,6-tetramethylheptanedionato Sm0.5, Y0.5 4-phenylpyridine-N-oxide
tris 2,2,6,6-tetramethylheptanedionato Sm0.5, Y0.5 1-methylimidazole
tris 2,2,6,6-tetramethylheptanedionato Sm0.5, Y0.5 triphenylphosphine oxide
tris 2,2,6,6-tetramethylheptanedionato Sm0.5, Y0.5 2,2-bipyridyl
tris 2,2,6,6-tetramethylheptanedionato Sm0.5, Y0.5 2,2-bipyridyl-N,N-dioxide
tris 2,2,6,6-tetramethylheptanedionato Sm0.5, Y0.5 phenanthroline
tris 2,2,6,6-tetramethylheptanedionato Sm0.5, Y0.5 bathocuproine
tris 2,2,6,6-tetramethylheptanedionato Sm0.5, Y0.5 bathophenanthroline
tris 3-methylpentane-2,4-dionato Sm0.5, Y0.5 dimethylaminopyridine
tris 3-methylpentane-2,4-dionato Sm0.5, Y0.5 4-picoline-N-oxide
tris 3-methylpentane-2,4-dionato Sm0.5, Y0.5 4-phenylpyridine
tris 3-methylpentane-2,4-dionato Sm0.5, Y0.5 4-phenylpyridine-N-oxide
tris 3-methylpentane-2,4-dionato Sm0.5, Y0.5 1-methylimidazole
tris 3-methylpentane-2,4-dionato Sm0.5, Y0.5 triphenylphosphine oxide
tris 3-methylpentane-2,4-dionato Sm0.5, Y0.5 2,2-bipyridyl
tris 3-methylpentane-2,4-dionato Sm0.5, Y0.5 2,2-bipyridyl-N,N-dioxide
tris 3-methylpentane-2,4-dionato Sm0.5, Y0.5 phenanthroline
tris 3-methylpentane-2,4-dionato Sm0.5, Y0.5 bathocuproine
tris 3-methylpentane-2,4-dionato Sm0.5, Y0.5 bathophenanthroline
tris 3-ethylpentane-2,4-dionato Sm0.5, Y0.5 dimethylaminopyridine
tris 3-ethylpentane-2,4-dionato Sm0.5, Y0.5 4-picoline-N-oxide
tris 3-ethylpentane-2,4-dionato Sm0.5, Y0.5 4-phenylpyridine
tris 3-ethylpentane-2,4-dionato Sm0.5, Y0.5 4-phenylpyridine-N-oxide
tris 3-ethylpentane-2,4-dionato Sm0.5, Y0.5 1-methylimidazole
tris 3-ethylpentane-2,4-dionato Sm0.5, Y0.5 triphenylphosphine oxide
tris 3-ethylpentane-2,4-dionato Sm0.5, Y0.5 2,2-bipyridyl
tris 3-ethylpentane-2,4-dionato Sm0.5, Y0.5 2,2-bipyridyl-N,N-dioxide
tris 3-ethylpentane-2,4-dionato Sm0.5, Y0.5 phenanthroline
tris 3-ethylpentane-2,4-dionato Sm0.5, Y0.5 bathocuproine
tris 3-ethylpentane-2,4-dionato Sm0.5, Y0.5 bathophenanthroline
tris pivaloyltrifluoroacetonato Sm0.5, Y0.5 dimethylaminopyridine
tris pivaloyltrifluoroacetonato Sm0.5, Y0.5 4-picoline-N-oxide
tris pivaloyltrifluoroacetonato Sm0.5, Y0.5 4-phenylpyridine
tris pivaloyltrifluoroacetonato Sm0.5, Y0.5 4-phenylpyridine-N-oxide
tris pivaloyltrifluoroacetonato Sm0.5, Y0.5 1-methylimidazole
tris pivaloyltrifluoroacetonato Sm0.5, Y0.5 triphenylphosphine oxide
tris pivaloyltrifluoroacetonato Sm0.5, Y0.5 2,2-bipyridyl
tris pivaloyltrifluoroacetonato Sm0.5, Y0.5 2,2-bipyridyl-N,N-dioxide
tris pivaloyltrifluoroacetonato Sm0.5, Y0.5 phenanthroline
tris pivaloyltrifluoroacetonato Sm0.5, Y0.5 bathocuproine
tris pivaloyltrifluoroacetonato Sm0.5, Y0.5 bathophenanthroline
tris trifluoroacetylacetonato Sm0.5, Y0.5 dimethylaminopyridine
tris trifluoroacetylacetonato Sm0.5, Y0.5 4-picoline-N-oxide tris trifluoroacetylacetonato Sm0.5, Y0.5 4-phenylpyridine
tris trifluoroacetylacetonato Sm0.5, Y0.5 4-phenylpyridine-N-oxide
tris trifluoroacetylacetonato Sm0.5, Y0.5 1-methylimidazole
tris trifluoroacetylacetonato Sm0.5, Y0.5 triphenylphosphine oxide
tris trifluoroacetylacetonato Sm0.5, Y0.5 2,2-bipyridyl
tris trifluoroacetylacetonato Sm0.5, Y0.5 2,2-bipyridyl-N,N-dioxide
tris trifluoroacetylacetonato Sm0.5, Y0.5 phenanthroline
tris trifluoroacetylacetonato Sm0.5, Y0.5 bathocuproine
tris trifluoroacetylacetonato Sm0.5, Y0.5 bathophenanthroline
tris hexafluoroacetylacetonato Sm0.5, Y0.5 dimethylaminopyridine
tris hexafluoroacetylacetonato Sm0.5, Y0.5 4-picoline-N-oxide
tris hexafluoroacetylacetonato Sm0.5, Y0.5 4-phenylpyridine
tris hexafluoroacetylacetonato Sm0.5, Y0.5 4-phenylpyridine-N-oxide
tris hexafluoroacetylacetonato Sm0.5, Y0.5 1-methylimidazole
tris hexafluoroacetylacetonato Sm0.5, Y0.5 triphenylphosphine oxide
tris hexafluoroacetylacetonato Sm0.5, Y0.5 2,2-bipyridyl
tris hexafluoroacetylacetonato Sm0.5, Y0.5 2,2-bipyridyl-N,N-dioxide
tris hexafluoroacetylacetonato Sm0.5, Y0.5 phenanthroline
tris hexafluoroacetylacetonato Sm0.5, Y0.5 bathocuproine
tris hexafluoroacetylacetonato Sm0.5, Y0.5 bathophenanthroline
tris 6,6,7,7,8,8,8-heptafluoro-2,2-dimethyloctanedionato Sm0.5, Y0.5 dimethylaminopyridine
tris 6,6,7,7,8,8,8-heptafluoro-2,2-dimethyloctanedionato Sm0.5, Y0.5 4-picoline-N-oxide
tris 6,6,7,7,8,8,8-heptafluoro-2,2-dimethyloctanedionato Sm0.5, Y0.5 4-phenylpyridine
tris 6,6,7,7,8,8,8-heptafluoro-2,2-dimethyloctanedionato Sm0.5, Y0.5 4-phenylpyridine-N-oxide
tris 6,6,7,7,8,8,8-heptafluoro-2,2-dimethyloctanedionato Sm0.5, Y0.5 1-methylimidazole
tris 6,6,7,7,8,8,8-heptafluoro-2,2-dimethyloctanedionato Sm0.5, Y0.5 triphenylphosphine oxide
tris 6,6,7,7,8,8,8-heptafluoro-2,2-dimethyloctanedionato Sm0.5, Y0.5 2,2-bipyridyl
tris 6,6,7,7,8,8,8-heptafluoro-2,2-dimethyloctanedionato Sm0.5, Y0.5 2,2-bipyridyl-N,N-dioxide
tris 6,6,7,7,8,8,8-heptafluoro-2,2-dimethyloctanedionato Sm0.5, Y0.5 phenanthroline
tris 6,6,7,7,8,8,8-heptafluoro-2,2-dimethyloctanedionato Sm0.5, Y0.5 bathocuproine
tris 6,6,7,7,8,8,8-heptafluoro-2,2-dimethyloctanedionato Sm0.5, Y0.5 bathophenanthroline
tris 1-phenyl-1,3-butanedionato Sm0.5, Y0.5 dimethylaminopyridine
tris 1-phenyl-1,3-butanedionato Sm0.5, Y0.5 4-picoline-N-oxide
tris 1-phenyl-1,3-butanedionato Sm0.5, Y0.5 4-phenylpyridine
tris 1-phenyl-1,3-butanedionato Sm0.5, Y0.5 4-phenylpyridine-N-oxide
tris 1-phenyl-1,3-butanedionato Sm0.5, Y0.5 1-methylimidazole
tris 1-phenyl-1,3-butanedionato Sm0.5, Y0.5 triphenylphosphine oxide
tris 1-phenyl-1,3-butanedionato Sm0.5, Y0.5 2,2-bipyridyl
tris 1-phenyl-1,3-butanedionato Sm0.5, Y0.5 2,2-bipyridyl-N,N-dioxide
tris 1-phenyl-1,3-butanedionato Sm0.5, Y0.5 phenanthroline
tris 1-phenyl-1,3-butanedionato Sm0.5, Y0.5 bathocuproine
tris 1-phenyl-1,3-butanedionato Sm0.5, Y0.5 bathophenanthroline
tris acetylacetonato Sm0.2, Y0.8 dimethylaminopyridine
tris acetylacetonato Sm0.2, Y0.8 4-picoline-N-oxide
tris acetylacetonato Sm0.2, Y0.8 4-phenylpyridine
tris acetylacetonato Sm0.2, Y0.8 4-phenylpyridine-N-oxide
tris acetylacetonato Sm0.2, Y0.8 1-methylimidazole
tris acetylacetonato Sm0.2, Y0.8 triphenylphosphine oxide
tris acetylacetonato Sm0.2, Y0.8 2,2-bipyridyl
tris acetylacetonato Sm0.2, Y0.8 2,2-bipyridyl-N,N-dioxide
tris acetylacetonato Sm0.2, Y0.8 phenanthroline
tris acetylacetonato Sm0.2, Y0.8 bathocuproine
tris acetylacetonato Sm0.2, Y0.8 bathophenanthroline
tris dibenzoylmethanato Sm0.2, Y0.8 dimethylaminopyridine
tris dibenzoylmethanato Sm0.2, Y0.8 4-picoline-N-oxide
tris dibenzoylmethanato Sm0.2, Y0.8 4-phenylpyridine
tris dibenzoylmethanato Sm0.2, Y0.8 4-phenylpyridine-N-oxide
tris dibenzoylmethanato Sm0.2, Y0.8 1-methylimidazole
tris dibenzoylmethanato Sm0.2, Y0.8 triphenylphosphine oxide
tris dibenzoylmethanato Sm0.2, Y0.8 2,2-bipyridyl
tris dibenzoylmethanato Sm0.2, Y0.8 2,2-bipyridyl-N,N-dioxide
tris dibenzoylmethanato Sm0.2, Y0.8 phenanthroline
tris dibenzoylmethanato Sm0.2, Y0.8 bathocuproine
tris dibenzoylmethanato Sm0.2, Y0.8 bathophenanthroline
tris thenoyltrifluoroacetonato Sm0.2, Y0.8 dimethylaminopyridine
tris thenoyltrifluoroacetonato Sm0.2, Y0.8 4-picoline-N-oxide
tris thenoyltrifluoroacetonato Sm0.2, Y0.8 4-phenylpyridine
tris thenoyltrifluoroacetonato Sm0.2, Y0.8 4-phenylpyridine-N-oxide
tris thenoyltrifluoroacetonato Sm0.2, Y0.8 1-methylimidazole
tris thenoyltrifluoroacetonato Sm0.2, Y0.8 triphenylphosphine oxide
tris thenoyltrifluoroacetonato Sm0.2, Y0.8 2,2-bipyridyl
tris thenoyltrifluoroacetonato Sm0.2, Y0.8 2,2-bipyridyl-N,N-dioxide
tris thenoyltrifluoroacetonato Sm0.2, Y0.8 phenanthroline
tris thenoyltrifluoroacetonato Sm0.2, Y0.8 bathocuproine
tris thenoyltrifluoroacetonato Sm0.2, Y0.8 bathophenanthroline
tris 2,2,6,6-tetramethylheptanedionato Sm0.2, Y0.8 dimethylaminopyridine
tris 2,2,6,6-tetramethylheptanedionato Sm0.2, Y0.8 4-picoline-N-oxide
tris 2,2,6,6-tetramethylheptanedionato Sm0.2, Y0.8 4-phenylpyridine
tris 2,2,6,6-tetramethylheptanedionato Sm0.2, Y0.8 4-phenylpyridine-N-oxide
tris 2,2,6,6-tetramethylheptanedionato Sm0.2, Y0.8 1-methylimidazole
tris 2,2,6,6-tetramethylheptanedionato Sm0.2, Y0.8 triphenylphosphine oxide
tris 2,2,6,6-tetramethylheptanedionato Sm0.2, Y0.8 2,2-bipyridyl
tris 2,2,6,6-tetramethylheptanedionato Sm0.2, Y0.8 2,2-bipyridyl-N,N-dioxide tris 2,2,6,6-tetramethylheptanedionato Sm0.2, Y0.8 phenanthroline
tris 2,2,6,6-tetramethylheptanedionato Sm0.2, Y0.8 bathocuproine
tris 2,2,6,6-tetramethylheptanedionato Sm0.2, Y0.8 bathophenanthroline
tris 3-methylpentane-2,4-dionato Sm0.2, Y0.8 dimethylaminopyridine
tris 3-methylpentane-2,4-dionato Sm0.2, Y0.8 4-picoline-N-oxide
tris 3-methylpentane-2,4-dionato Sm0.2, Y0.8 4-phenylpyridine
tris 3-methylpentane-2,4-dionato Sm0.2, Y0.8 4-phenylpyridine-N-oxide
tris 3-methylpentane-2,4-dionato Sm0.2, Y0.8 1-methylimidazole
tris 3-methylpentane-2,4-dionato Sm0.2, Y0.8 triphenylphosphine oxide
tris 3-methylpentane-2,4-dionato Sm0.2, Y0.8 2,2-bipyridyl
tris 3-methylpentane-2,4-dionato Sm0.2, Y0.8 2,2-bipyridyl-N,N-dioxide
tris 3-methylpentane-2,4-dionato Sm0.2, Y0.8 phenanthroline
tris 3-methylpentane-2,4-dionato Sm0.2, Y0.8 bathocuproine
tris 3-methylpentane-2,4-dionato Sm0.2, Y0.8 bathophenanthroline
tris 3-ethylpentane-2,4-dionato Sm0.2, Y0.8 dimethylaminopyridine
tris 3-ethylpentane-2,4-dionato Sm0.2, Y0.8 4-picoline-N-oxide
tris 3-ethylpentane-2,4-dionato Sm0.2, Y0.8 4-phenylpyridine
tris 3-ethylpentane-2,4-dionato Sm0.2, Y0.8 4-phenylpyridine-N-oxide
tris 3-ethylpentane-2,4-dionato Sm0.2, Y0.8 1-methylimidazole
tris 3-ethylpentane-2,4-dionato Sm0.2, Y0.8 triphenylphosphine oxide
tris 3-ethylpentane-2,4-dionato Sm0.2, Y0.8 2,2-bipyridyl
tris 3-ethylpentane-2,4-dionato Sm0.2, Y0.8 2,2-bipyridyl-N,N-dioxide
tris 3-ethylpentane-2,4-dionato Sm0.2, Y0.8 phenanthroline
tris 3-ethylpentane-2,4-dionato Sm0.2, Y0.8 bathocuproine
tris 3-ethylpentane-2,4-dionato Sm0.2, Y0.8 bathophenanthroline
tris pivaloyltrifluoroacetonato Sm0.2, Y0.8 dimethylaminopyridine
tris pivaloyltrifluoroacetonato Sm0.2, Y0.8 4-picoline-N-oxide
tris pivaloyltrifluoroacetonato Sm0.2, Y0.8 4-phenylpyridine
tris pivaloyltrifluoroacetonato Sm0.2, Y0.8 4-phenylpyridine-N-oxide
tris pivaloyltrifluoroacetonato Sm0.2, Y0.8 1-methylimidazole
tris pivaloyltrifluoroacetonato Sm0.2, Y0.8 triphenylphosphine oxide
tris pivaloyltrifluoroacetonato Sm0.2, Y0.8 2,2-bipyridyl
tris pivaloyltrifluoroacetonato Sm0.2, Y0.8 2,2-bipyridyl-N,N-dioxide
tris pivaloyltrifluoroacetonato Sm0.2, Y0.8 phenanthroline
tris pivaloyltrifluoroacetonato Sm0.2, Y0.8 bathocuproine
tris pivaloyltrifluoroacetonato Sm0.2, Y0.8 bathophenanthroline
tris trifluoroacetylacetonato Sm0.2, Y0.8 dimethylaminopyridine
tris trifluoroacetylacetonato Sm0.2, Y0.8 4-picoline-N-oxide
tris trifluoroacetylacetonato Sm0.2, Y0.8 4-phenylpyridine
tris trifluoroacetylacetonato Sm0.2, Y0.8 4-phenylpyridine-N-oxide
tris trifluoroacetylacetonato Sm0.2, Y0.8 1-methylimidazole
tris trifluoroacetylacetonato Sm0.2, Y0.8 triphenylphosphine oxide
tris trifluoroacetylacetonato Sm0.2, Y0.8 2,2-bipyridyl
tris trifluoroacetylacetonato Sm0.2, Y0.8 2,2-bipyridyl-N,N-dioxide
tris trifluoroacetylacetonato Sm0.2, Y0.8 phenanthroline
tris trifluoroacetylacetonato Sm0.2, Y0.8 bathocuproine
tris trifluoroacetylacetonato Sm0.2, Y0.8 bathophenanthroline
tris hexafluoroacetylacetonato Sm0.2, Y0.8 dimethylaminopyridine
tris hexafluoroacetylacetonato Sm0.2, Y0.8 4-picoline-N-oxide
tris hexafluoroacetylacetonato Sm0.2, Y0.8 4-phenylpyridine
tris hexafluoroacetylacetonato Sm0.2, Y0.8 4-phenylpyridine-N-oxide
tris hexafluoroacetylacetonato Sm0.2, Y0.8 1-methylimidazole
tris hexafluoroacetylacetonato Sm0.2, Y0.8 triphenylphosphine oxide
tris hexafluoroacetylacetonato Sm0.2, Y0.8 2,2-bipyridyl
tris hexafluoroacetylacetonato Sm0.2, Y0.8 2,2-bipyridyl-N,N-dioxide
tris hexafluoroacetylacetonato Sm0.2, Y0.8 phenanthroline
tris hexafluoroacetylacetonato Sm0.2, Y0.8 bathocuproine
tris hexafluoroacetylacetonato Sm0.2, Y0.8 bathophenanthroline
tris 6,6,7,7,8,8,8-heptafluoro-2,2-dimethyloctanedionato Sm0.2, Y0.8 dimethylaminopyridine
tris 6,6,7,7,8,8,8-heptafluoro-2,2-dimethyloctanedionato Sm0.2, Y0.8 4-picoline-N-oxide
tris 6,6,7,7,8,8,8-heptafluoro-2,2-dimethyloctanedionato Sm0.2, Y0.8 4-phenylpyridine
tris 6,6,7,7,8,8,8-heptafluoro-2,2-dimethyloctanedionato Sm0.2, Y0.8 4-phenylpyridine-N-oxide
tris 6,6,7,7,8,8,8-heptafluoro-2,2-dimethyloctanedionato Sm0.2, Y0.8 1-methylimidazole
tris 6,6,7,7,8,8,8-heptafluoro-2,2-dimethyloctanedionato Sm0.2, Y0.8 triphenylphosphine oxide
tris 6,6,7,7,8,8,8-heptafluoro-2,2-dimethyloctanedionato Sm0.2, Y0.8 2,2-bipyridyl
tris 6,6,7,7,8,8,8-heptafluoro-2,2-dimethyloctanedionato Sm0.2, Y0.8 2,2-bipyridyl-N,N-dioxide
tris 6,6,7,7,8,8,8-heptafluoro-2,2-dimethyloctanedionato Sm0.2, Y0.8 phenanthroline
tris 6,6,7,7,8,8,8-heptafluoro-2,2-dimethyloctanedionato Sm0.2, Y0.8 bathocuproine
tris 6,6,7,7,8,8,8-heptafluoro-2,2-dimethyloctanedionato Sm0.2, Y0.8 bathophenanthroline
tris 1-phenyl-1,3-butanedionato Sm0.2, Y0.8 dimethylaminopyridine
tris 1-phenyl-1,3-butanedionato Sm0.2, Y0.8 4-picoline-N-oxide
tris 1-phenyl-1,3-butanedionato Sm0.2, Y0.8 4-phenylpyridine
tris 1-phenyl-1,3-butanedionato Sm0.2, Y0.8 4-phenylpyridine-N-oxide
tris 1-phenyl-1,3-butanedionato Sm0.2, Y0.8 1-methylimidazole tris 1-phenyl-1,3-butanedionato Sm0.2, Y0.8 triphenylphosphine oxide
tris 1-phenyl-1,3-butanedionato Sm0.2, Y0.8 2,2-bipyridyl
tris 1-phenyl-1,3-butanedionato Sm0.2, Y0.8 2,2-bipyridyl-N,N-dioxide
tris 1-phenyl-1,3-butanedionato Sm0.2, Y0.8 phenanthroline
tris 1-phenyl-1,3-butanedionato Sm0.2, Y0.8 bathocuproine
tris 1-phenyl-1,3-butanedionato Sm0.2, Y0.8 bathophenanthroline
tris acetylacetonato Sm0.1, Y0.9 dimethylaminopyridine
tris acetylacetonato Sm0.1, Y0.9 4-picoline-N-oxide
tris acetylacetonato Sm0.1, Y0.9 4-phenylpyridine
tris acetylacetonato Sm0.1, Y0.9 4-phenylpyridine-N-oxide
tris acetylacetonato Sm0.1, Y0.9 1-methylimidazole
tris acetylacetonato Sm0.1, Y0.9 triphenylphosphine oxide
tris acetylacetonato Sm0.1, Y0.9 2,2-bipyridyl
tris acetylacetonato Sm0.1, Y0.9 2,2-bipyridyl-N,N-dioxide
tris acetylacetonato Sm0.1, Y0.9 phenanthroline
tris acetylacetonato Sm0.1, Y0.9 bathocuproine
tris acetylacetonato Sm0.1, Y0.9 bathophenanthroline
tris dibenzoylmethanato Sm0.1, Y0.9 dimethylaminopyridine
tris dibenzoylmethanato Sm0.1, Y0.9 4-picoline-N-oxide
tris dibenzoylmethanato Sm0.1, Y0.9 4-phenylpyridine
tris dibenzoylmethanato Sm0.1, Y0.9 4-phenylpyridine-N-oxide
tris dibenzoylmethanato Sm0.1, Y0.9 1-methylimidazole
tris dibenzoylmethanato Sm0.1, Y0.9 triphenylphosphine oxide
tris dibenzoylmethanato Sm0.1, Y0.9 2,2-bipyridyl
tris dibenzoylmethanato Sm0.1, Y0.9 2,2-bipyridyl-N,N-dioxide
tris dibenzoylmethanato Sm0.1, Y0.9 phenanthroline
tris dibenzoylmethanato Sm0.1, Y0.9 bathocuproine
tris dibenzoylmethanato Sm0.1, Y0.9 bathophenanthroline
tris thenoyltrifluoroacetonato Sm0.1, Y0.9 dimethylaminopyridine
tris thenoyltrifluoroacetonato Sm0.1, Y0.9 4-picoline-N-oxide
tris thenoyltrifluoroacetonato Sm0.1, Y0.9 4-phenylpyridine
tris thenoyltrifluoroacetonato Sm0.1, Y0.9 4-phenylpyridine-N-oxide
tris thenoyltrifluoroacetonato Sm0.1, Y0.9 1-methylimidazole
tris thenoyltrifluoroacetonato Sm0.1, Y0.9 triphenylphosphine oxide
tris thenoyltrifluoroacetonato Sm0.1, Y0.9 2,2-bipyridyl
tris thenoyltrifluoroacetonato Sm0.1, Y0.9 2,2-bipyridyl-N,N-dioxide
tris thenoyltrifluoroacetonato Sm0.1, Y0.9 phenanthroline
tris thenoyltrifluoroacetonato Sm0.1, Y0.9 bathocuproine
tris thenoyltrifluoroacetonato Sm0.1, Y0.9 bathophenanthroline
tris 2,2,6,6-tetramethylheptanedionato Sm0.1, Y0.9 dimethylaminopyridine
tris 2,2,6,6-tetramethylheptanedionato Sm0.1, Y0.9 4-picoline-N-oxide
tris 2,2,6,6-tetramethylheptanedionato Sm0.1, Y0.9 4-phenylpyridine
tris 2,2,6,6-tetramethylheptanedionato Sm0.1, Y0.9 4-phenylpyridine-N-oxide
tris 2,2,6,6-tetramethylheptanedionato Sm0.1, Y0.9 1-methylimidazole
tris 2,2,6,6-tetramethylheptanedionato Sm0.1, Y0.9 triphenylphosphine oxide
tris 2,2,6,6-tetramethylheptanedionato Sm0.1, Y0.9 2,2-bipyridyl
tris 2,2,6,6-tetramethylheptanedionato Sm0.1, Y0.9 2,2-bipyridyl-N,N-dioxide
tris 2,2,6,6-tetramethylheptanedionato Sm0.1, Y0.9 phenanthroline
tris 2,2,6,6-tetramethylheptanedionato Sm0.1, Y0.9 bathocuproine
tris 2,2,6,6-tetramethylheptanedionato Sm0.1, Y0.9 bathophenanthroline
tris 3-methylpentane-2,4-dionato Sm0.1, Y0.9 dimethylaminopyridine
tris 3-methylpentane-2,4-dionato Sm0.1, Y0.9 4-picoline-N-oxide
tris 3-methylpentane-2,4-dionato Sm0.1, Y0.9 4-phenylpyridine
tris 3-methylpentane-2,4-dionato Sm0.1, Y0.9 4-phenylpyridine-N-oxide
tris 3-methylpentane-2,4-dionato Sm0.1, Y0.9 1-methylimidazole
tris 3-methylpentane-2,4-dionato Sm0.1, Y0.9 triphenylphosphine oxide
tris 3-methylpentane-2,4-dionato Sm0.1, Y0.9 2,2-bipyridyl
tris 3-methylpentane-2,4-dionato Sm0.1, Y0.9 2,2-bipyridyl-N,N-dioxide
tris 3-methylpentane-2,4-dionato Sm0.1, Y0.9 phenanthroline
tris 3-methylpentane-2,4-dionato Sm0.1, Y0.9 bathocuproine
tris 3-methylpentane-2,4-dionato Sm0.1, Y0.9 bathophenanthroline
tris 3-ethylpentane-2,4-dionato Sm0.1, Y0.9 dimethylaminopyridine
tris 3-ethylpentane-2,4-dionato Sm0.1, Y0.9 4-picoline-N-oxide
tris 3-ethylpentane-2,4-dionato Sm0.1, Y0.9 4-phenylpyridine
tris 3-ethylpentane-2,4-dionato Sm0.1, Y0.9 4-phenylpyridine-N-oxide
tris 3-ethylpentane-2,4-dionato Sm0.1, Y0.9 1-methylimidazole
tris 3-ethylpentane-2,4-dionato Sm0.1, Y0.9 triphenylphosphine oxide
tris 3-ethylpentane-2,4-dionato Sm0.1, Y0.9 2,2-bipyridyl
tris 3-ethylpentane-2,4-dionato Sm0.1, Y0.9 2,2-bipyridyl-N,N-dioxide
tris 3-ethylpentane-2,4-dionato Sm0.1, Y0.9 phenanthroline
tris 3-ethylpentane-2,4-dionato Sm0.1, Y0.9 bathocuproine
tris 3-ethylpentane-2,4-dionato Sm0.1, Y0.9 bathophenanthroline
tris pivaloyltrifluoroacetonato Sm0.1, Y0.9 dimethylaminopyridine
tris pivaloyltrifluoroacetonato Sm0.1, Y0.9 4-picoline-N-oxide
tris pivaloyltrifluoroacetonato Sm0.1, Y0.9 4-phenylpyridine
tris pivaloyltrifluoroacetonato Sm0.1, Y0.9 4-phenylpyridine-N-oxide
tris pivaloyltrifluoroacetonato Sm0.1, Y0.9 1-methylimidazole
tris pivaloyltrifluoroacetonato Sm0.1, Y0.9 triphenylphosphine oxide
tris pivaloyltrifluoroacetonato Sm0.1, Y0.9 2,2-bipyridyl
tris pivaloyltrifluoroacetonato Sm0.1, Y0.9 2,2-bipyridyl-N,N-dioxide
tris pivaloyltrifluoroacetonato Sm0.1, Y0.9 phenanthroline
tris pivaloyltrifluoroacetonato Sm0.1, Y0.9 bathocuproine
tris pivaloyltrifluoroacetonato Sm0.1, Y0.9 bathophenanthroline tris trifluoroacetylacetonato Sm0.1, Y0.9 dimethylaminopyridine
tris trifluoroacetylacetonato Sm0.1, Y0.9 4-picoline-N-oxide
tris trifluoroacetylacetonato Sm0.1, Y0.9 4-phenylpyridine
tris trifluoroacetylacetonato Sm0.1, Y0.9 4-phenylpyridine-N-oxide
tris trifluoroacetylacetonato Sm0.1, Y0.9 1-methylimidazole
tris trifluoroacetylacetonato Sm0.1, Y0.9 triphenylphosphine oxide
tris trifluoroacetylacetonato Sm0.1, Y0.9 2,2-bipyridyl
tris trifluoroacetylacetonato Sm0.1, Y0.9 2,2-bipyridyl-N,N-dioxide
tris trifluoroacetylacetonato Sm0.1, Y0.9 phenanthroline
tris trifluoroacetylacetonato Sm0.1, Y0.9 bathocuproine
tris trifluoroacetylacetonato Sm0.1, Y0.9 bathophenanthroline
tris hexafluoroacetylacetonato Sm0.1, Y0.9 dimethylaminopyridine
tris hexafluoroacetylacetonato Sm0.1, Y0.9 4-picoline-N-oxide
tris hexafluoroacetylacetonato Sm0.1, Y0.9 4-phenylpyridine
tris hexafluoroacetylacetonato Sm0.1, Y0.9 4-phenylpyridine-N-oxide
tris hexafluoroacetylacetonato Sm0.1, Y0.9 1-methylimidazole
tris hexafluoroacetylacetonato Sm0.1, Y0.9 triphenylphosphine oxide
tris hexafluoroacetylacetonato Sm0.1, Y0.9 2,2-bipyridyl
tris hexafluoroacetylacetonato Sm0.1, Y0.9 2,2-bipyridyl-N,N-dioxide
tris hexafluoroacetylacetonato Sm0.1, Y0.9 phenanthroline
tris hexafluoroacetylacetonato Sm0.1, Y0.9 bathocuproine
tris hexafluoroacetylacetonato Sm0.1, Y0.9 bathophenanthroline
tris 6,6,7,7,8,8,8-heptafluoro-2,2-dimethyloctanedionato Sm0.1, Y0.9 dimethylaminopyridine
tris 6,6,7,7,8,8,8-heptafluoro-2,2-dimethyloctanedionato Sm0.1, Y0.9 4-picoline-N-oxide
tris 6,6,7,7,8,8,8-heptafluoro-2,2-dimethyloctanedionato Sm0.1, Y0.9 4-phenylpyridine
tris 6,6,7,7,8,8,8-heptafluoro-2,2-dimethyloctanedionato Sm0.1, Y0.9 4-phenylpyridine-N-oxide
tris 6,6,7,7,8,8,8-heptafluoro-2,2-dimethyloctanedionato Sm0.1, Y0.9 1-methylimidazole
tris 6,6,7,7,8,8,8-heptafluoro-2,2-dimethyloctanedionato Sm0.1, Y0.9 triphenylphosphine oxide
tris 6,6,7,7,8,8,8-heptafluoro-2,2-dimethyloctanedionato Sm0.1, Y0.9 2,2-bipyridyl
tris 6,6,7,7,8,8,8-heptafluoro-2,2-dimethyloctanedionato Sm0.1, Y0.9 2,2-bipyridyl-N,N-dioxide
tris 6,6,7,7,8,8,8-heptafluoro-2,2-dimethyloctanedionato Sm0.1, Y0.9 phenanthroline
tris 6,6,7,7,8,8,8-heptafluoro-2,2-dimethyloctanedionato Sm0.1, Y0.9 bathocuproine
tris 6,6,7,7,8,8,8-heptafluoro-2,2-dimethyloctanedionato Sm0.1, Y0.9 bathophenanthroline
tris 1-phenyl-1,3-butanedionato Sm0.1, Y0.9 dimethylaminopyridine
tris 1-phenyl-1,3-butanedionato Sm0.1, Y0.9 4-picoline-N-oxide
tris 1-phenyl-1,3-butanedionato Sm0.1, Y0.9 4-phenylpyridine
tris 1-phenyl-1,3-butanedionato Sm0.1, Y0.9 4-phenylpyridine-N-oxide
tris 1-phenyl-1,3-butanedionato Sm0.1, Y0.9 1-methylimidazole
tris 1-phenyl-1,3-butanedionato Sm0.1, Y0.9 triphenylphosphine oxide
tris 1-phenyl-1,3-butanedionato Sm0.1, Y0.9 2,2-bipyridyl
tris 1-phenyl-1,3-butanedionato Sm0.1, Y0.9 2,2-bipyridyl-N,N-dioxide
tris 1-phenyl-1,3-butanedionato Sm0.1, Y0.9 phenanthroline
tris 1-phenyl-1,3-butanedionato Sm0.1, Y0.9 bathocuproine
tris 1-phenyl-1,3-butanedionato Sm0.1, Y0.9 bathophenanthroline
tris acetylacetonato Sm0.01, Y0.99 dimethylaminopyridine
tris acetylacetonato Sm0.01, Y0.99 4-picoline-N-oxide
tris acetylacetonato Sm0.01, Y0.99 4-phenylpyridine
tris acetylacetonato Sm0.01, Y0.99 4-phenylpyridine-N-oxide
tris acetylacetonato Sm0.01, Y0.99 1-methylimidazole
tris acetylacetonato Sm0.01, Y0.99 triphenylphosphine oxide
tris acetylacetonato Sm0.01, Y0.99 2,2-bipyridyl
tris acetylacetonato Sm0.01, Y0.99 2,2-bipyridyl-N,N-dioxide
tris acetylacetonato Sm0.01, Y0.99 phenanthroline
tris acetylacetonato Sm0.01, Y0.99 bathocuproine
tris acetylacetonato Sm0.01, Y0.99 bathophenanthroline
tris dibenzoylmethanato Sm0.01, Y0.99 dimethylaminopyridine
tris dibenzoylmethanato Sm0.01, Y0.99 4-picoline-N-oxide
tris dibenzoylmethanato Sm0.01, Y0.99 4-phenylpyridine
tris dibenzoylmethanato Sm0.01, Y0.99 4-phenylpyridine-N-oxide
tris dibenzoylmethanato Sm0.01, Y0.99 1-methylimidazole
tris dibenzoylmethanato Sm0.01, Y0.99 triphenylphosphine oxide
tris dibenzoylmethanato Sm0.01, Y0.99 2,2-bipyridyl
tris dibenzoylmethanato Sm0.01, Y0.99 2,2-bipyridyl-N,N-dioxide
tris dibenzoylmethanato Sm0.01, Y0.99 phenanthroline
tris dibenzoylmethanato Sm0.01, Y0.99 bathocuproine
tris dibenzoylmethanato Sm0.01, Y0.99 bathophenanthroline
tris thenoyltrifluoroacetonato Sm0.01, Y0.99 dimethylaminopyridine
tris thenoyltrifluoroacetonato Sm0.01, Y0.99 4-picoline-N-oxide
tris thenoyltrifluoroacetonato Sm0.01, Y0.99 4-phenylpyridine
tris thenoyltrifluoroacetonato Sm0.01, Y0.99 4-phenylpyridine-N-oxide
tris thenoyltrifluoroacetonato Sm0.01, Y0.99 1-methylimidazole
tris thenoyltrifluoroacetonato Sm0.01, Y0.99 triphenylphosphine oxide
tris thenoyltrifluoroacetonato Sm0.01, Y0.99 2,2-bipyridyl
tris thenoyltrifluoroacetonato Sm0.01, Y0.99 2,2-bipyridyl-N,N-dioxide
tris thenoyltrifluoroacetonato Sm0.01, Y0.99 phenanthroline
tris thenoyltrifluoroacetonato Sm0.01, Y0.99 bathocuproine
tris thenoyltrifluoroacetonato Sm0.01, Y0.99 bathophenanthroline
tris 2,2,6,6-tetramethylheptanedionato Sm0.01, Y0.99 dimethylaminopyridine
tris 2,2,6,6-tetramethylheptanedionato Sm0.01, Y0.99 4-picoline-N-oxide
tris 2,2,6,6-tetramethylheptanedionato Sm0.01, Y0.99 4-phenylpyridine tris 2,2,6,6-tetramethylheptanedionato Sm0.01, Y0.99 4-phenylpyridine-N-oxide tris 2,2,6,6-tetramethylheptanedionato Sm0.01, Y0.99 1-methylimidazole tris 2,2,6,6-tetramethylheptanedionato Sm0.01, Y0.99 triphenylphosphine oxide tris 2,2,6,6-tetramethylheptanedionato Sm0.01, Y0.99 2,2-bipyridyl tris 2,2,6,6-tetramethylheptanedionato Sm0.01, Y0.99 2,2-bipyridyl-N,N-dioxide tris 2,2,6,6-tetramethylheptanedionato Sm0.01, Y0.99 phenanthroline tris 2,2,6,6-tetramethylheptanedionato Sm0.01, Y0.99 bathocuproine tris 2,2,6,6-tetramethylheptanedionato Sm0.01, Y0.99 bathophenanthroline tris 3-methylpentane-2,4-dionato Sm0.01, Y0.99 dimethylaminopyridine tris 3-methylpentane-2,4-dionato Sm0.01, Y0.99 4-picoline-N-oxide tris 3-methylpentane-2,4-dionato Sm0.01, Y0.99 4-phenylpyridine tris 3-methylpentane-2,4-dionato Sm0.01, Y0.99 4-phenylpyridine-N-oxide tris 3-methylpentane-2,4-dionato Sm0.01, Y0.99 1-methylimidazole tris 3-methylpentane-2,4-dionato Sm0.01, Y0.99 triphenylphosphine oxide tris 3-methylpentane-2,4-dionato Sm0.01, Y0.99 2,2-bipyridyl tris 3-methylpentane-2,4-dionato Sm0.01, Y0.99 2,2-bipyridyl-N,N-dioxide tris 3-methylpentane-2,4-dionato Sm0.01, Y0.99 phenanthroline tris 3-methylpentane-2,4-dionato Sm0.01, Y0.99 bathocuproine tris 3-methylpentane-2,4-dionato Sm0.01, Y0.99 bathophenanthroline tris 3-ethylpentane-2,4-dionato Sm0.01, Y0.99 dimethylaminopyridine tris 3-ethylpentane-2,4-dionato Sm0.01, Y0.99 4-picoline-N-oxide tris 3-ethylpentane-2,4-dionato Sm0.01, Y0.99 4-phenylpyridine tris 3-ethylpentane-2,4-dionato Sm0.01, Y0.99 4-phenylpyridine-N-oxide tris 3-ethylpentane-2,4-dionato Sm0.01, Y0.99 1-methylimidazole tris 3-ethylpentane-2,4-dionato Sm0.01, Y0.99 triphenylphosphine oxide tris 3-ethylpentane-2,4-dionato Sm0.01, Y0.99 2,2-bipyridyl tris 3-ethylpentane-2,4-dionato Sm0.01, Y0.99 2,2-bipyridyl-N,N-dioxide tris 3-ethylpentane-2,4-dionato Sm0.01, Y0.99 phenanthroline tris 3-ethylpentane-2,4-dionato Sm0.01, Y0.99 bathocuproine tris 3-ethylpentane-2,4-dionato Sm0.01, Y0.99 bathophenanthroline tris pivaloyltrifluoroacetonato Sm0.01, Y0.99 dimethylaminopyridine tris pivaloyltrifluoroacetonato Sm0.01, Y0.99 4-picoline-N-oxide tris pivaloyltrifluoroacetonato Sm0.01, Y0.99 4-phenylpyridine tris pivaloyltrifluoroacetonato Sm0.01, Y0.99 4-phenylpyridine-N-oxide tris pivaloyltrifluoroacetonato Sm0.01, Y0.99 1-methylimidazole tris pivaloyltrifluoroacetonato Sm0.01, Y0.99 triphenylphosphine oxide tris pivaloyltrifluoroacetonato Sm0.01, Y0.99 2,2-bipyridyl tris pivaloyltrifluoroacetonato Sm0.01, Y0.99 2,2-bipyridyl-N,N-dioxide tris pivaloyltrifluoroacetonato Sm0.01, Y0.99 phenanthroline tris pivaloyltrifluoroacetonato Sm0.01, Y0.99 bathocuproine tris pivaloyltrifluoroacetonato Sm0.01, Y0.99 bathophenanthroline tris trifluoroacetylacetonato Sm0.01, Y0.99 dimethylaminopyridine tris trifluoroacetylacetonato Sm0.01, Y0.99 4-picoline-N-oxide tris trifluoroacetylacetonato Sm0.01, Y0.99 4-phenylpyridine tris trifluoroacetylacetonato Sm0.01, Y0.99 4-phenylpyridine-N-oxide tris trifluoroacetylacetonato Sm0.01, Y0.99 1-methylimidazole tris trifluoroacetylacetonato Sm0.01, Y0.99 triphenylphosphine oxide tris trifluoroacetylacetonato Sm0.01, Y0.99 2,2-bipyridyl tris trifluoroacetylacetonato Sm0.01, Y0.99 2,2-bipyridyl-N,N-dioxide tris trifluoroacetylacetonato Sm0.01, Y0.99 phenanthroline tris trifluoroacetylacetonato Sm0.01, Y0.99 bathocuproine tris trifluoroacetylacetonato Sm0.01, Y0.99 bathophenanthroline tris hexafluoroacetylacetonato Sm0.01, Y0.99 dimethylaminopyridine tris hexafluoroacetylacetonato Sm0.01, Y0.99 4-picoline-N-oxide tris hexafluoroacetylacetonato Sm0.01, Y0.99 4-phenylpyridine tris hexafluoroacetylacetonato Sm0.01, Y0.99 4-phenylpyridine-N-oxide tris hexafluoroacetylacetonato Sm0.01, Y0.99 1-methylimidazole tris hexafluoroacetylacetonato Sm0.01, Y0.99 triphenylphosphine oxide tris hexafluoroacetylacetonato Sm0.01, Y0.99 2,2-bipyridyl tris hexafluoroacetylacetonato Sm0.01, Y0.99 2,2-bipyridyl-N,N-dioxide tris hexafluoroacetylacetonato Sm0.01, Y0.99 phenanthroline tris hexafluoroacetylacetonato Sm0.01, Y0.99 bathocuproine tris hexafluoroacetylacetonato Sm0.01, Y0.99 bathophenanthroline tris 6,6,7,7,8,8,8-heptafluoro-2,2-dimethyloctanedionato Sm0.01, Y0.99 dimethylaminopyridine tris 6,6,7,7,8,8,8-heptafluoro-2,2-dimethyloctanedionato Sm0.01, Y0.99 4-picoline-N-oxide tris 6,6,7,7,8,8,8-heptafluoro-2,2-dimethyloctanedionato Sm0.01, Y0.99 4-phenylpyridine tris 6,6,7,7,8,8,8-heptafluoro-2,2-dimethyloctanedionato Sm0.01, Y0.99 4-phenylpyridine-N-oxide tris 6,6,7,7,8,8,8-heptafluoro-2,2-dimethyloctanedionato Sm0.01, Y0.99 1-methylimidazole tris 6,6,7,7,8,8,8-heptafluoro-2,2-dimethyloctanedionato Sm0.01, Y0.99 triphenylphosphine oxide tris 6,6,7,7,8,8,8-heptafluoro-2,2-dimethyloctanedionato Sm0.01, Y0.99 2,2-bipyridyl tris 6,6,7,7,8,8,8-heptafluoro-2,2-dimethyloctanedionato Sm0.01, Y0.99 2,2-bipyridyl-N,N-dioxide
tris 6,6,7,7,8,8,8-heptafluoro-2,2-dimethyloctanedionato Sm0.01, Y0.99 phenanthroline
tris 6,6,7,7,8,8,8-heptafluoro-2,2-dimethyloctanedionato Sm0.01, Y0.99 bathocuproine
tris 6,6,7,7,8,8,8-heptafluoro-2,2-dimethyloctanedionato Sm0.01, Y0.99 bathophenanthroline
tris 1-phenyl-1,3-butanedionato Sm0.01, Y0.99 dimethylaminopyridine
tris 1-phenyl-1,3-butanedionato Sm0.01, Y0.99 4-picoline-N-oxide
tris 1-phenyl-1,3-butanedionato Sm0.01, Y0.99 4-phenylpyridine
tris 1-phenyl-1,3-butanedionato Sm0.01, Y0.99 4-phenylpyridine-N-oxide
tris 1-phenyl-1,3-butanedionato Sm0.01, Y0.99 1-methylimidazole
tris 1-phenyl-1,3-butanedionato Sm0.01, Y0.99 triphenylphosphine oxide
tris 1-phenyl-1,3-butanedionato Sm0.01, Y0.99 2,2-bipyridyl
tris 1-phenyl-1,3-butanedionato Sm0.01, Y0.99 2,2-bipyridyl-N,N-dioxide
tris 1-phenyl-1,3-butanedionato Sm0.01, Y0.99 phenanthroline
tris 1-phenyl-1,3-butanedionato Sm0.01, Y0.99 bathocuproine
tris 1-phenyl-1,3-butanedionato Sm0.01, Y0.99 bathophenanthroline
tris acetylacetonato Dy0.5, Y0.5 dimethylaminopyridine
tris acetylacetonato Dy0.5, Y0.5 4-picoline-N-oxide
tris acetylacetonato Dy0.5, Y0.5 4-phenylpyridine
tris acetylacetonato Dy0.5, Y0.5 4-phenylpyridine-N-oxide
tris acetylacetonato Dy0.5, Y0.5 1-methylimidazole
tris acetylacetonato Dy0.5, Y0.5 triphenylphosphine oxide
tris acetylacetonato Dy0.5, Y0.5 2,2-bipyridyl
tris acetylacetonato Dy0.5, Y0.5 2,2-bipyridyl-N,N-dioxide
tris acetylacetonato Dy0.5, Y0.5 phenanthroline
tris acetylacetonato Dy0.5, Y0.5 bathocuproine
tris acetylacetonato Dy0.5, Y0.5 bathophenanthroline
tris dibenzoylmethanato Dy0.5, Y0.5 dimethylaminopyridine
tris dibenzoylmethanato Dy0.5, Y0.5 4-picoline-N-oxide
tris dibenzoylmethanato Dy0.5, Y0.5 4-phenylpyridine
tris dibenzoylmethanato Dy0.5, Y0.5 4-phenylpyridine-N-oxide
tris dibenzoylmethanato Dy0.5, Y0.5 1-methylimidazole
tris dibenzoylmethanato Dy0.5, Y0.5 triphenylphosphine oxide
tris dibenzoylmethanato Dy0.5, Y0.5 2,2-bipyridyl
tris dibenzoylmethanato Dy0.5, Y0.5 2,2-bipyridyl-N,N-dioxide
tris dibenzoylmethanato Dy0.5, Y0.5 phenanthroline
tris dibenzoylmethanato Dy0.5, Y0.5 bathocuproine
tris dibenzoylmethanato Dy0.5, Y0.5 bathophenanthroline
tris thenoyltrifluoroacetonato Dy0.5, Y0.5 dimethylaminopyridine
tris thenoyltrifluoroacetonato Dy0.5, Y0.5 4-picoline-N-oxide
tris thenoyltrifluoroacetonato Dy0.5, Y0.5 4-phenylpyridine
tris thenoyltrifluoroacetonato Dy0.5, Y0.5 4-phenylpyridine-N-oxide
tris thenoyltrifluoroacetonato Dy0.5, Y0.5 1-methylimidazole
tris thenoyltrifluoroacetonato Dy0.5, Y0.5 triphenylphosphine oxide tris thenoyltrifluoroacetonato Dy0.5, Y0.5 2,2-bipyridyl
tris thenoyltrifluoroacetonato Dy0.5, Y0.5 2,2-bipyridyl-N,N-dioxide
tris thenoyltrifluoroacetonato Dy0.5, Y0.5 phenanthroline
tris thenoyltrifluoroacetonato Dy0.5, Y0.5 bathocuproine
tris thenoyltrifluoroacetonato Dy0.5, Y0.5 bathophenanthroline
tris 2,2,6,6-tetramethylheptanedionato Dy0.5, Y0.5 dimethylaminopyridine
tris 2,2,6,6-tetramethylheptanedionato Dy0.5, Y0.5 4-picoline-N-oxide
tris 2,2,6,6-tetramethylheptanedionato Dy0.5, Y0.5 4-phenylpyridine
tris 2,2,6,6-tetramethylheptanedionato Dy0.5, Y0.5 4-phenylpyridine-N-oxide
tris 2,2,6,6-tetramethylheptanedionato Dy0.5, Y0.5 1-methylimidazole
tris 2,2,6,6-tetramethylheptanedionato Dy0.5, Y0.5 triphenylphosphine oxide
tris 2,2,6,6-tetramethylheptanedionato Dy0.5, Y0.5 2,2-bipyridyl
tris 2,2,6,6-tetramethylheptanedionato Dy0.5, Y0.5 2,2-bipyridyl-N,N-dioxide
tris 2,2,6,6-tetramethylheptanedionato Dy0.5, Y0.5 phenanthroline
tris 2,2,6,6-tetramethylheptanedionato Dy0.5, Y0.5 bathocuproine
tris 2,2,6,6-tetramethylheptanedionato Dy0.5, Y0.5 bathophenanthroline
tris 3-methylpentane-2,4-dionato Dy0.5, Y0.5 dimethylaminopyridine
tris 3-methylpentane-2,4-dionato Dy0.5, Y0.5 4-picoline-N-oxide
tris 3-methylpentane-2,4-dionato Dy0.5, Y0.5 4-phenylpyridine
tris 3-methylpentane-2,4-dionato Dy0.5, Y0.5 4-phenylpyridine-N-oxide
tris 3-methylpentane-2,4-dionato Dy0.5, Y0.5 1-methylimidazole
tris 3-methylpentane-2,4-dionato Dy0.5, Y0.5 triphenylphosphine oxide
tris 3-methylpentane-2,4-dionato Dy0.5, Y0.5 2,2-bipyridyl
tris 3-methylpentane-2,4-dionato Dy0.5, Y0.5 2,2-bipyridyl-N,N-dioxide
tris 3-methylpentane-2,4-dionato Dy0.5, Y0.5 phenanthroline
tris 3-methylpentane-2,4-dionato Dy0.5, Y0.5 bathocuproine
tris 3-methylpentane-2,4-dionato Dy0.5, Y0.5 bathophenanthroline
tris 3-ethylpentane-2,4-dionato Dy0.5, Y0.5 dimethylaminopyridine
tris 3-ethylpentane-2,4-dionato Dy0.5, Y0.5 4-picoline-N-oxide
tris 3-ethylpentane-2,4-dionato Dy0.5, Y0.5 4-phenylpyridine
tris 3-ethylpentane-2,4-dionato Dy0.5, Y0.5 4-phenylpyridine-N-oxide
tris 3-ethylpentane-2,4-dionato Dy0.5, Y0.5 1-methylimidazole
tris 3-ethylpentane-2,4-dionato Dy0.5, Y0.5 triphenylphosphine oxide
tris 3-ethylpentane-2,4-dionato Dy0.5, Y0.5 2,2-bipyridyl
tris 3-ethylpentane-2,4-dionato Dy0.5, Y0.5 2,2-bipyridyl-N,N-dioxide
tris 3-ethylpentane-2,4-dionato Dy0.5, Y0.5 phenanthroline
tris 3-ethylpentane-2,4-dionato Dy0.5, Y0.5 bathocuproine tris 3-ethylpentane-2,4-dionato Dy0.5, Y0.5 bathophenanthroline
tris pivaloyltrifluoroacetonato Dy0.5, Y0.5 dimethylaminopyridine
tris pivaloyltrifluoroacetonato Dy0.5, Y0.5 4-picoline-N-oxide
tris pivaloyltrifluoroacetonato Dy0.5, Y0.5 4-phenylpyridine
tris pivaloyltrifluoroacetonato Dy0.5, Y0.5 4-phenylpyridine-N-oxide
tris pivaloyltrifluoroacetonato Dy0.5, Y0.5 1-methylimidazole
tris pivaloyltrifluoroacetonato Dy0.5, Y0.5 triphenylphosphine oxide
tris pivaloyltrifluoroacetonato Dy0.5, Y0.5 2,2-bipyridyl
tris pivaloyltrifluoroacetonato Dy0.5, Y0.5 2,2-bipyridyl-N,N-dioxide
tris pivaloyltrifluoroacetonato Dy0.5, Y0.5 phenanthroline
tris pivaloyltrifluoroacetonato Dy0.5, Y0.5 bathocuproine
tris pivaloyltrifluoroacetonato Dy0.5, Y0.5 bathophenanthroline
tris trifluoroacetylacetonato Dy0.5, Y0.5 dimethylaminopyridine
tris trifluoroacetylacetonato Dy0.5, Y0.5 4-picoline-N-oxide
tris trifluoroacetylacetonato Dy0.5, Y0.5 4-phenylpyridine
tris trifluoroacetylacetonato Dy0.5, Y0.5 4-phenylpyridine-N-oxide
tris trifluoroacetylacetonato Dy0.5, Y0.5 1-methylimidazole
tris trifluoroacetylacetonato Dy0.5, Y0.5 triphenylphosphine oxide
tris trifluoroacetylacetonato Dy0.5, Y0.5 2,2-bipyridyl
tris trifluoroacetylacetonato Dy0.5, Y0.5 2,2-bipyridyl-N,N-dioxide
tris trifluoroacetylacetonato Dy0.5, Y0.5 phenanthroline
tris trifluoroacetylacetonato Dy0.5, Y0.5 bathocuproine
tris trifluoroacetylacetonato Dy0.5, Y0.5 bathophenanthroline
tris hexafluoroacetylacetonato Dy0.5, Y0.5 dimethylaminopyridine
tris hexafluoroacetylacetonato Dy0.5, Y0.5 4-picoline-N-oxide
tris hexafluoroacetylacetonato Dy0.5, Y0.5 4-phenylpyridine
tris hexafluoroacetylacetonato Dy0.5, Y0.5 4-phenylpyridine-N-oxide
tris hexafluoroacetylacetonato Dy0.5, Y0.5 1-methylimidazole
tris hexafluoroacetylacetonato Dy0.5, Y0.5 triphenylphosphine oxide
tris hexafluoroacetylacetonato Dy0.5, Y0.5 2,2-bipyridyl
tris hexafluoroacetylacetonato Dy0.5, Y0.5 2,2-bipyridyl-N,N-dioxide
tris hexafluoroacetylacetonato Dy0.5, Y0.5 phenanthroline
tris hexafluoroacetylacetonato Dy0.5, Y0.5 bathocuproine
tris hexafluoroacetylacetonato Dy0.5, Y0.5 bathophenanthroline
tris 6,6,7,7,8,8,8-heptafluoro-2,2-dimethyloctanedionato Dy0.5, Y0.5 dimethylaminopyridine
tris 6,6,7,7,8,8,8-heptafluoro-2,2-dimethyloctanedionato Dy0.5, Y0.5 4-picoline-N-oxide
tris 6,6,7,7,8,8,8-heptafluoro-2,2-dimethyloctanedionato Dy0.5, Y0.5 4-phenylpyridine
tris 6,6,7,7,8,8,8-heptafluoro-2,2-dimethyloctanedionato Dy0.5, Y0.5 4-phenylpyridine-N-oxide
tris 6,6,7,7,8,8,8-heptafluoro-2,2-dimethyloctanedionato Dy0.5, Y0.5 1-methylimidazole
tris 6,6,7,7,8,8,8-heptafluoro-2,2-dimethyloctanedionato Dy0.5, Y0.5 triphenylphosphine oxide
tris 6,6,7,7,8,8,8-heptafluoro-2,2-dimethyloctanedionato Dy0.5, Y0.5 2,2-bipyridyl
tris 6,6,7,7,8,8,8-heptafluoro-2,2-dimethyloctanedionato Dy0.5, Y0.5 2,2-bipyridyl-N,N-dioxide
tris 6,6,7,7,8,8,8-heptafluoro-2,2-dimethyloctanedionato Dy0.5, Y0.5 phenanthroline
tris 6,6,7,7,8,8,8-heptafluoro-2,2-dimethyloctanedionato Dy0.5, Y0.5 bathocuproine
tris 6,6,7,7,8,8,8-heptafluoro-2,2-dimethyloctanedionato Dy0.5, Y0.5 bathophenanthroline
tris 1-phenyl-1,3-butanedionato Dy0.5, Y0.5 dimethylaminopyridine
tris 1-phenyl-1,3-butanedionato Dy0.5, Y0.5 4-picoline-N-oxide
tris 1-phenyl-1,3-butanedionato Dy0.5, Y0.5 4-phenylpyridine
tris 1-phenyl-1,3-butanedionato Dy0.5, Y0.5 4-phenylpyridine-N-oxide
tris 1-phenyl-1,3-butanedionato Dy0.5, Y0.5 1-methylimidazole
tris 1-phenyl-1,3-butanedionato Dy0.5, Y0.5 triphenylphosphine oxide
tris 1-phenyl-1,3-butanedionato Dy0.5, Y0.5 2,2-bipyridyl
tris 1-phenyl-1,3-butanedionato Dy0.5, Y0.5 2,2-bipyridyl-N,N-dioxide
tris 1-phenyl-1,3-butanedionato Dy0.5, Y0.5 phenanthroline
tris 1-phenyl-1,3-butanedionato Dy0.5, Y0.5 bathocuproine
tris 1-phenyl-1,3-butanedionato Dy0.5, Y0.5 bathophenanthroline
tris acetylacetonato Dy0.2, Y0.8 dimethylaminopyridine
tris acetylacetonato Dy0.2, Y0.8 4-picoline-N-oxide
tris acetylacetonato Dy0.2, Y0.8 4-phenylpyridine
tris acetylacetonato Dy0.2, Y0.8 4-phenylpyridine-N-oxide
tris acetylacetonato Dy0.2, Y0.8 1-methylimidazole
tris acetylacetonato Dy0.2, Y0.8 triphenylphosphine oxide
tris acetylacetonato Dy0.2, Y0.8 2,2-bipyridyl
tris acetylacetonato Dy0.2, Y0.8 2,2-bipyridyl-N,N-dioxide
tris acetylacetonato Dy0.2, Y0.8 phenanthroline
tris acetylacetonato Dy0.2, Y0.8 bathocuproine
tris acetylacetonato Dy0.2, Y0.8 bathophenanthroline
tris dibenzoylmethanato Dy0.2, Y0.8 dimethylaminopyridine
tris dibenzoylmethanato Dy0.2, Y0.8 4-picoline-N-oxide
tris dibenzoylmethanato Dy0.2, Y0.8 4-phenylpyridine
tris dibenzoylmethanato Dy0.2, Y0.8 4-phenylpyridine-N-oxide
tris dibenzoylmethanato Dy0.2, Y0.8 1-methylimidazole
tris dibenzoylmethanato Dy0.2, Y0.8 triphenylphosphine oxide
tris dibenzoylmethanato Dy0.2, Y0.8 2,2-bipyridyl
tris dibenzoylmethanato Dy0.2, Y0.8 2,2-bipyridyl-N,N-dioxide
tris dibenzoylmethanato Dy0.2, Y0.8 phenanthroline
tris dibenzoylmethanato Dy0.2, Y0.8 bathocuproine
tris dibenzoylmethanato Dy0.2, Y0.8 bathophenanthroline
tris thenoyltrifluoroacetonato Dy0.2, Y0.8 dimethylaminopyridine
tris thenoyltrifluoroacetonato Dy0.2, Y0.8 4-picoline-N-oxide
tris thenoyltrifluoroacetonato Dy0.2, Y0.8 4-phenylpyridine
tris thenoyltrifluoroacetonato Dy0.2, Y0.8 4-phenylpyridine-N-oxide
tris thenoyltrifluoroacetonato Dy0.2, Y0.8 1-methylimidazole tris thenoyltrifluoroacetonato Dy0.2, Y0.8 triphenylphosphine oxide
tris thenoyltrifluoroacetonato Dy0.2, Y0.8 2,2-bipyridyl
tris thenoyltrifluoroacetonato Dy0.2, Y0.8 2,2-bipyridyl-N,N-dioxide
tris thenoyltrifluoroacetonato Dy0.2, Y0.8 phenanthroline
tris thenoyltrifluoroacetonato Dy0.2, Y0.8 bathocuproine
tris thenoyltrifluoroacetonato Dy0.2, Y0.8 bathophenanthroline
tris 2,2,6,6-tetramethylheptanedionato Dy0.2, Y0.8 dimethylaminopyridine
tris 2,2,6,6-tetramethylheptanedionato Dy0.2, Y0.8 4-picoline-N-oxide
tris 2,2,6,6-tetramethylheptanedionato Dy0.2, Y0.8 4-phenylpyridine
tris 2,2,6,6-tetramethylheptanedionato Dy0.2, Y0.8 4-phenylpyridine-N-oxide
tris 2,2,6,6-tetramethylheptanedionato Dy0.2, Y0.8 1-methylimidazole
tris 2,2,6,6-tetramethylheptanedionato Dy0.2, Y0.8 triphenylphosphine oxide
tris 2,2,6,6-tetramethylheptanedionato Dy0.2, Y0.8 2,2-bipyridyl
tris 2,2,6,6-tetramethylheptanedionato Dy0.2, Y0.8 2,2-bipyridyl-N,N-dioxide
tris 2,2,6,6-tetramethylheptanedionato Dy0.2, Y0.8 phenanthroline
tris 2,2,6,6-tetramethylheptanedionato Dy0.2, Y0.8 bathocuproine
tris 2,2,6,6-tetramethylheptanedionato Dy0.2, Y0.8 bathophenanthroline
tris 3-methylpentane-2,4-dionato Dy0.2, Y0.8 dimethylaminopyridine
tris 3-methylpentane-2,4-dionato Dy0.2, Y0.8 4-picoline-N-oxide
tris 3-methylpentane-2,4-dionato Dy0.2, Y0.8 4-phenylpyridine
tris 3-methylpentane-2,4-dionato Dy0.2, Y0.8 4-phenylpyridine-N-oxide
tris 3-methylpentane-2,4-dionato Dy0.2, Y0.8 1-methylimidazole
tris 3-methylpentane-2,4-dionato Dy0.2, Y0.8 triphenylphosphine oxide
tris 3-methylpentane-2,4-dionato Dy0.2, Y0.8 2,2-bipyridyl
tris 3-methylpentane-2,4-dionato Dy0.2, Y0.8 2,2-bipyridyl-N,N-dioxide
tris 3-methylpentane-2,4-dionato Dy0.2, Y0.8 phenanthroline
tris 3-methylpentane-2,4-dionato Dy0.2, Y0.8 bathocuproine
tris 3-methylpentane-2,4-dionato Dy0.2, Y0.8 bathophenanthroline
tris 3-ethylpentane-2,4-dionato Dy0.2, Y0.8 dimethylaminopyridine
tris 3-ethylpentane-2,4-dionato Dy0.2, Y0.8 4-picoline-N-oxide
tris 3-ethylpentane-2,4-dionato Dy0.2, Y0.8 4-phenylpyridine
tris 3-ethylpentane-2,4-dionato Dy0.2, Y0.8 4-phenylpyridine-N-oxide
tris 3-ethylpentane-2,4-dionato Dy0.2, Y0.8 1-methylimidazole
tris 3-ethylpentane-2,4-dionato Dy0.2, Y0.8 triphenylphosphine oxide
tris 3-ethylpentane-2,4-dionato Dy0.2, Y0.8 2,2-bipyridyl
tris 3-ethylpentane-2,4-dionato Dy0.2, Y0.8 2,2-bipyridyl-N,N-dioxide
tris 3-ethylpentane-2,4-dionato Dy0.2, Y0.8 phenanthroline
tris 3-ethylpentane-2,4-dionato Dy0.2, Y0.8 bathocuproine
tris 3-ethylpentane-2,4-dionato Dy0.2, Y0.8 bathophenanthroline
tris pivaloyltrifluoroacetonato Dy0.2, Y0.8 dimethylaminopyridine
tris pivaloyltrifluoroacetonato Dy0.2, Y0.8 4-picoline-N-oxide
tris pivaloyltrifluoroacetonato Dy0.2, Y0.8 4-phenylpyridine
tris pivaloyltrifluoroacetonato Dy0.2, Y0.8 4-phenylpyridine-N-oxide
tris pivaloyltrifluoroacetonato Dy0.2, Y0.8 1-methylimidazole
tris pivaloyltrifluoroacetonato Dy0.2, Y0.8 triphenylphosphine oxide
tris pivaloyltrifluoroacetonato Dy0.2, Y0.8 2,2-bipyridyl
tris pivaloyltrifluoroacetonato Dy0.2, Y0.8 2,2-bipyridyl-N,N-dioxide
tris pivaloyltrifluoroacetonato Dy0.2, Y0.8 phenanthroline
tris pivaloyltrifluoroacetonato Dy0.2, Y0.8 bathocuproine
tris pivaloyltrifluoroacetonato Dy0.2, Y0.8 bathophenanthroline
tris trifluoroacetylacetonato Dy0.2, Y0.8 dimethylaminopyridine
tris trifluoroacetylacetonato Dy0.2, Y0.8 4-picoline-N-oxide
tris trifluoroacetylacetonato Dy0.2, Y0.8 4-phenylpyridine
tris trifluoroacetylacetonato Dy0.2, Y0.8 4-phenylpyridine-N-oxide
tris trifluoroacetylacetonato Dy0.2, Y0.8 1-methylimidazole
tris trifluoroacetylacetonato Dy0.2, Y0.8 triphenylphosphine oxide
tris trifluoroacetylacetonato Dy0.2, Y0.8 2,2-bipyridyl
tris trifluoroacetylacetonato Dy0.2, Y0.8 2,2-bipyridyl-N,N-dioxide
tris trifluoroacetylacetonato Dy0.2, Y0.8 phenanthroline
tris trifluoroacetylacetonato Dy0.2, Y0.8 bathocuproine
tris trifluoroacetylacetonato Dy0.2, Y0.8 bathophenanthroline
tris hexafluoroacetylacetonato Dy0.2, Y0.8 dimethylaminopyridine
tris hexafluoroacetylacetonato Dy0.2, Y0.8 4-picoline-N-oxide
tris hexafluoroacetylacetonato Dy0.2, Y0.8 4-phenylpyridine
tris hexafluoroacetylacetonato Dy0.2, Y0.8 4-phenylpyridine-N-oxide
tris hexafluoroacetylacetonato Dy0.2, Y0.8 1-methylimidazole
tris hexafluoroacetylacetonato Dy0.2, Y0.8 triphenylphosphine oxide
tris hexafluoroacetylacetonato Dy0.2, Y0.8 2,2-bipyridyl
tris hexafluoroacetylacetonato Dy0.2, Y0.8 2,2-bipyridyl-N,N-dioxide
tris hexafluoroacetylacetonato Dy0.2, Y0.8 phenanthroline
tris hexafluoroacetylacetonato Dy0.2, Y0.8 bathocuproine
tris hexafluoroacetylacetonato Dy0.2, Y0.8 bathophenanthroline
tris 6,6,7,7,8,8,8-heptafluoro-2,2-dimethyloctanedionato Dy0.2, Y0.8 dimethylaminopyridine
tris 6,6,7,7,8,8,8-heptafluoro-2,2-dimethyloctanedionato Dy0.2, Y0.8 4-picoline-N-oxide
tris 6,6,7,7,8,8,8-heptafluoro-2,2-dimethyloctanedionato Dy0.2, Y0.8 4-phenylpyridine
tris 6,6,7,7,8,8,8-heptafluoro-2,2-dimethyloctanedionato Dy0.2, Y0.8 4-phenylpyridine-N-oxide tris 6,6,7,7,8,8,8-heptafluoro-2,2-dimethyloctanedionato Dy0.2, Y0.8 1-methylimidazole
tris 6,6,7,7,8,8,8-heptafluoro-2,2-dimethyloctanedionato Dy0.2, Y0.8 triphenylphosphine oxide
tris 6,6,7,7,8,8,8-heptafluoro-2,2-dimethyloctanedionato Dy0.2, Y0.8 2,2-bipyridyl
tris 6,6,7,7,8,8,8-heptafluoro-2,2-dimethyloctanedionato Dy0.2, Y0.8 2,2-bipyridyl-N,N-dioxide
tris 6,6,7,7,8,8,8-heptafluoro-2,2-dimethyloctanedionato Dy0.2, Y0.8 phenanthroline
tris 6,6,7,7,8,8,8-heptafluoro-2,2-dimethyloctanedionato Dy0.2, Y0.8 bathocuproine
tris 6,6,7,7,8,8,8-heptafluoro-2,2-dimethyloctanedionato Dy0.2, Y0.8 bathophenanthroline
tris 1-phenyl-1,3-butanedionato Dy0.2, Y0.8 dimethylaminopyridine
tris 1-phenyl-1,3-butanedionato Dy0.2, Y0.8 4-picoline-N-oxide
tris 1-phenyl-1,3-butanedionato Dy0.2, Y0.8 4-phenylpyridine
tris 1-phenyl-1,3-butanedionato Dy0.2, Y0.8 4-phenylpyridine-N-oxide
tris 1-phenyl-1,3-butanedionato Dy0.2, Y0.8 1-methylimidazole
tris 1-phenyl-1,3-butanedionato Dy0.2, Y0.8 triphenylphosphine oxide
tris 1-phenyl-1,3-butanedionato Dy0.2, Y0.8 2,2-bipyridyl
tris 1-phenyl-1,3-butanedionato Dy0.2, Y0.8 2,2-bipyridyl-N,N-dioxide
tris 1-phenyl-1,3-butanedionato Dy0.2, Y0.8 phenanthroline
tris 1-phenyl-1,3-butanedionato Dy0.2, Y0.8 bathocuproine
tris 1-phenyl-1,3-butanedionato Dy0.2, Y0.8 bathophenanthroline
tris acetylacetonato Dy0.1, Y0.9 dimethylaminopyridine
tris acetylacetonato Dy0.1, Y0.9 4-picoline-N-oxide
tris acetylacetonato Dy0.1, Y0.9 4-phenylpyridine
tris acetylacetonato Dy0.1, Y0.9 4-phenylpyridine-N-oxide
tris acetylacetonato Dy0.1, Y0.9 1-methylimidazole
tris acetylacetonato Dy0.1, Y0.9 triphenylphosphine oxide
tris acetylacetonato Dy0.1, Y0.9 2,2-bipyridyl
tris acetylacetonato Dy0.1, Y0.9 2,2-bipyridyl-N,N-dioxide
tris acetylacetonato Dy0.1, Y0.9 phenanthroline
tris acetylacetonato Dy0.1, Y0.9 bathocuproine
tris acetylacetonato Dy0.1, Y0.9 bathophenanthroline
tris dibenzoylmethanato Dy0.1, Y0.9 dimethylaminopyridine
tris dibenzoylmethanato Dy0.1, Y0.9 4-picoline-N-oxide
tris dibenzoylmethanato Dy0.1, Y0.9 4-phenylpyridine
tris dibenzoylmethanato Dy0.1, Y0.9 4-phenylpyridine-N-oxide
tris dibenzoylmethanato Dy0.1, Y0.9 1-methylimidazole
tris dibenzoylmethanato Dy0.1, Y0.9 triphenylphosphine oxide
tris dibenzoylmethanato Dy0.1, Y0.9 2,2-bipyridyl
tris dibenzoylmethanato Dy0.1, Y0.9 2,2-bipyridyl-N,N-dioxide
tris dibenzoylmethanato Dy0.1, Y0.9 phenanthroline
tris dibenzoylmethanato Dy0.1, Y0.9 bathocuproine
tris dibenzoylmethanato Dy0.1, Y0.9 bathophenanthroline
tris thenoyltrifluoroacetonato Dy0.1, Y0.9 dimethylaminopyridine
tris thenoyltrifluoroacetonato Dy0.1, Y0.9 4-picoline-N-oxide
tris thenoyltrifluoroacetonato Dy0.1, Y0.9 4-phenylpyridine
tris thenoyltrifluoroacetonato Dy0.1, Y0.9 4-phenylpyridine-N-oxide
tris thenoyltrifluoroacetonato Dy0.1, Y0.9 1-methylimidazole
tris thenoyltrifluoroacetonato Dy0.1, Y0.9 triphenylphosphine oxide
tris thenoyltrifluoroacetonato Dy0.1, Y0.9 2,2-bipyridyl
tris thenoyltrifluoroacetonato Dy0.1, Y0.9 2,2-bipyridyl-N,N-dioxide
tris thenoyltrifluoroacetonato Dy0.1, Y0.9 phenanthroline
tris thenoyltrifluoroacetonato Dy0.1, Y0.9 bathocuproine
tris thenoyltrifluoroacetonato Dy0.1, Y0.9 bathophenanthroline
tris 2,2,6,6-tetramethylheptanedionato Dy0.1, Y0.9 dimethylaminopyridine
tris 2,2,6,6-tetramethylheptanedionato Dy0.1, Y0.9 4-picoline-N-oxide
tris 2,2,6,6-tetramethylheptanedionato Dy0.1, Y0.9 4-phenylpyridine
tris 2,2,6,6-tetramethylheptanedionato Dy0.1, Y0.9 4-phenylpyridine-N-oxide
tris 2,2,6,6-tetramethylheptanedionato Dy0.1, Y0.9 1-methylimidazole
tris 2,2,6,6-tetramethylheptanedionato Dy0.1, Y0.9 triphenylphosphine oxide
tris 2,2,6,6-tetramethylheptanedionato Dy0.1, Y0.9 2,2-bipyridyl
tris 2,2,6,6-tetramethylheptanedionato Dy0.1, Y0.9 2,2-bipyridyl-N,N-dioxide
tris 2,2,6,6-tetramethylheptanedionato Dy0.1, Y0.9 phenanthroline
tris 2,2,6,6-tetramethylheptanedionato Dy0.1, Y0.9 bathocuproine
tris 2,2,6,6-tetramethylheptanedionato Dy0.1, Y0.9 bathophenanthroline
tris 3-methylpentane-2,4-dionato Dy0.1, Y0.9 dimethylaminopyridine
tris 3-methylpentane-2,4-dionato Dy0.1, Y0.9 4-picoline-N-oxide
tris 3-methylpentane-2,4-dionato Dy0.1, Y0.9 4-phenylpyridine
tris 3-methylpentane-2,4-dionato Dy0.1, Y0.9 4-phenylpyridine-N-oxide
tris 3-methylpentane-2,4-dionato Dy0.1, Y0.9 1-methylimidazole
tris 3-methylpentane-2,4-dionato Dy0.1, Y0.9 triphenylphosphine oxide
tris 3-methylpentane-2,4-dionato Dy0.1, Y0.9 2,2-bipyridyl
tris 3-methylpentane-2,4-dionato Dy0.1, Y0.9 2,2-bipyridyl-N,N-dioxide
tris 3-methylpentane-2,4-dionato Dy0.1, Y0.9 phenanthroline
tris 3-methylpentane-2,4-dionato Dy0.1, Y0.9 bathocuproine
tris 3-methylpentane-2,4-dionato Dy0.1, Y0.9 bathophenanthroline
tris 3-ethylpentane-2,4-dionato Dy0.1, Y0.9 dimethylaminopyridine
tris 3-ethylpentane-2,4-dionato Dy0.1, Y0.9 4-picoline-N-oxide
tris 3-ethylpentane-2,4-dionato Dy0.1, Y0.9 4-phenylpyridine
tris 3-ethylpentane-2,4-dionato Dy0.1, Y0.9 4-phenylpyridine-N-oxide
tris 3-ethylpentane-2,4-dionato Dy0.1, Y0.9 1-methylimidazole
tris 3-ethylpentane-2,4-dionato Dy0.1, Y0.9 triphenylphosphine oxide
tris 3-ethylpentane-2,4-dionato Dy0.1, Y0.9 2,2-bipyridyl tris 3-ethylpentane-2,4-dionato Dy0.1, Y0.9 2,2-bipyridyl-N,N-dioxide
tris 3-ethylpentane-2,4-dionato Dy0.1, Y0.9 phenanthroline
tris 3-ethylpentane-2,4-dionato Dy0.1, Y0.9 bathocuproine
tris 3-ethylpentane-2,4-dionato Dy0.1, Y0.9 bathophenanthroline
tris pivaloyltrifluoroacetonato Dy0.1, Y0.9 dimethylaminopyridine
tris pivaloyltrifluoroacetonato Dy0.1, Y0.9 4-picoline-N-oxide
tris pivaloyltrifluoroacetonato Dy0.1, Y0.9 4-phenylpyridine
tris pivaloyltrifluoroacetonato Dy0.1, Y0.9 4-phenylpyridine-N-oxide
tris pivaloyltrifluoroacetonato Dy0.1, Y0.9 1-methylimidazole
tris pivaloyltrifluoroacetonato Dy0.1, Y0.9 triphenylphosphine oxide
tris pivaloyltrifluoroacetonato Dy0.1, Y0.9 2,2-bipyridyl
tris pivaloyltrifluoroacetonato Dy0.1, Y0.9 2,2-bipyridyl-N,N-dioxide
tris pivaloyltrifluoroacetonato Dy0.1, Y0.9 phenanthroline
tris pivaloyltrifluoroacetonato Dy0.1, Y0.9 bathocuproine
tris pivaloyltrifluoroacetonato Dy0.1, Y0.9 bathophenanthroline
tris trifluoroacetylacetonato Dy0.1, Y0.9 dimethylaminopyridine
tris trifluoroacetylacetonato Dy0.1, Y0.9 4-picoline-N-oxide
tris trifluoroacetylacetonato Dy0.1, Y0.9 4-phenylpyridine
tris trifluoroacetylacetonato Dy0.1, Y0.9 4-phenylpyridine-N-oxide
tris trifluoroacetylacetonato Dy0.1, Y0.9 1-methylimidazole
tris trifluoroacetylacetonato Dy0.1, Y0.9 triphenylphosphine oxide
tris trifluoroacetylacetonato Dy0.1, Y0.9 2,2-bipyridyl
tris trifluoroacetylacetonato Dy0.1, Y0.9 2,2-bipyridyl-N,N-dioxide
tris trifluoroacetylacetonato Dy0.1, Y0.9 phenanthroline
tris trifluoroacetylacetonato Dy0.1, Y0.9 bathocuproine
tris trifluoroacetylacetonato Dy0.1, Y0.9 bathophenanthroline
tris hexafluoroacetylacetonato Dy0.1, Y0.9 dimethylaminopyridine
tris hexafluoroacetylacetonato Dy0.1, Y0.9 4-picoline-N-oxide
tris hexafluoroacetylacetonato Dy0.1, Y0.9 4-phenylpyridine
tris hexafluoroacetylacetonato Dy0.1, Y0.9 4-phenylpyridine-N-oxide
tris hexafluoroacetylacetonato Dy0.1, Y0.9 1-methylimidazole
tris hexafluoroacetylacetonato Dy0.1, Y0.9 triphenylphosphine oxide
tris hexafluoroacetylacetonato Dy0.1, Y0.9 2,2-bipyridyl
tris hexafluoroacetylacetonato Dy0.1, Y0.9 2,2-bipyridyl-N,N-dioxide
tris hexafluoroacetylacetonato Dy0.1, Y0.9 phenanthroline
tris hexafluoroacetylacetonato Dy0.1, Y0.9 bathocuproine
tris hexafluoroacetylacetonato Dy0.1, Y0.9 bathophenanthroline
tris 6,6,7,7,8,8,8-heptafluoro-2,2-dimethyloctanedionato Dy0.1, Y0.9 dimethylaminopyridine
tris 6,6,7,7,8,8,8-heptafluoro-2,2-dimethyloctanedionato Dy0.1, Y0.9 4-picoline-N-oxide
tris 6,6,7,7,8,8,8-heptafluoro-2,2-dimethyloctanedionato Dy0.1, Y0.9 4-phenylpyridine
tris 6,6,7,7,8,8,8-heptafluoro-2,2-dimethyloctanedionato Dy0.1, Y0.9 4-phenylpyridine-N-oxide
tris 6,6,7,7,8,8,8-heptafluoro-2,2-dimethyloctanedionato Dy0.1, Y0.9 1-methylimidazole
tris 6,6,7,7,8,8,8-heptafluoro-2,2-dimethyloctanedionato Dy0.1, Y0.9 triphenylphosphine oxide
tris 6,6,7,7,8,8,8-heptafluoro-2,2-dimethyloctanedionato Dy0.1, Y0.9 2,2-bipyridyl
tris 6,6,7,7,8,8,8-heptafluoro-2,2-dimethyloctanedionato Dy0.1, Y0.9 2,2-bipyridyl-N,N-dioxide
tris 6,6,7,7,8,8,8-heptafluoro-2,2-dimethyloctanedionato Dy0.1, Y0.9 phenanthroline
tris 6,6,7,7,8,8,8-heptafluoro-2,2-dimethyloctanedionato Dy0.1, Y0.9 bathocuproine
tris 6,6,7,7,8,8,8-heptafluoro-2,2-dimethyloctanedionato Dy0.1, Y0.9 bathophenanthroline
tris 1-phenyl-1,3-butanedionato Dy0.1, Y0.9 dimethylaminopyridine
tris 1-phenyl-1,3-butanedionato Dy0.1, Y0.9 4-picoline-N-oxide
tris 1-phenyl-1,3-butanedionato Dy0.1, Y0.9 4-phenylpyridine
tris 1-phenyl-1,3-butanedionato Dy0.1, Y0.9 4-phenylpyridine-N-oxide
tris 1-phenyl-1,3-butanedionato Dy0.1, Y0.9 1-methylimidazole
tris 1-phenyl-1,3-butanedionato Dy0.1, Y0.9 triphenylphosphine oxide
tris 1-phenyl-1,3-butanedionato Dy0.1, Y0.9 2,2-bipyridyl
tris 1-phenyl-1,3-butanedionato Dy0.1, Y0.9 2,2-bipyridyl-N,N-dioxide
tris 1-phenyl-1,3-butanedionato Dy0.1, Y0.9 phenanthroline
tris 1-phenyl-1,3-butanedionato Dy0.1, Y0.9 bathocuproine
tris 1-phenyl-1,3-butanedionato Dy0.1, Y0.9 bathophenanthroline
tris acetylacetonato Dy0.01, Y0.99 dimethylaminopyridine
tris acetylacetonato Dy0.01, Y0.99 4-picoline-N-oxide
tris acetylacetonato Dy0.01, Y0.99 4-phenylpyridine
tris acetylacetonato Dy0.01, Y0.99 4-phenylpyridine-N-oxide
tris acetylacetonato Dy0.01, Y0.99 1-methylimidazole
tris acetylacetonato Dy0.01, Y0.99 triphenylphosphine oxide
tris acetylacetonato Dy0.01, Y0.99 2,2-bipyridyl
tris acetylacetonato Dy0.01, Y0.99 2,2-bipyridyl-N,N-dioxide
tris acetylacetonato Dy0.01, Y0.99 phenanthroline
tris acetylacetonato Dy0.01, Y0.99 bathocuproine
tris acetylacetonato Dy0.01, Y0.99 bathophenanthroline
tris dibenzoylmethanato Dy0.01, Y0.99 dimethylaminopyridine
tris dibenzoylmethanato Dy0.01, Y0.99 4-picoline-N-oxide
tris dibenzoylmethanato Dy0.01, Y0.99 4-phenylpyridine
tris dibenzoylmethanato Dy0.01, Y0.99 4-phenylpyridine-N-oxide
tris dibenzoylmethanato Dy0.01, Y0.99 1-methylimidazole
tris dibenzoylmethanato Dy0.01, Y0.99 triphenylphosphine oxide
tris dibenzoylmethanato Dy0.01, Y0.99 2,2-bipyridyl
tris dibenzoylmethanato Dy0.01, Y0.99 2,2-bipyridyl-N,N-dioxide
tris dibenzoylmethanato Dy0.01, Y0.99 phenanthroline
tris dibenzoylmethanato Dy0.01, Y0.99 bathocuproine
tris dibenzoylmethanato Dy0.01, Y0.99 bathophenanthroline
tris thenoyltrifluoroacetonato Dy0.01, Y0.99 dimethylaminopyridine tris thenoyltrifluoroacetonato Dy0.01, Y0.99 4-picoline-N-oxide
tris thenoyltrifluoroacetonato Dy0.01, Y0.99 4-phenylpyridine
tris thenoyltrifluoroacetonato Dy0.01, Y0.99 4-phenylpyridine-N-oxide
tris thenoyltrifluoroacetonato Dy0.01, Y0.99 1-methylimidazole
tris thenoyltrifluoroacetonato Dy0.01, Y0.99 triphenylphosphine oxide
tris thenoyltrifluoroacetonato Dy0.01, Y0.99 2,2-bipyridyl
tris thenoyltrifluoroacetonato Dy0.01, Y0.99 2,2-bipyridyl-N,N-dioxide
tris thenoyltrifluoroacetonato Dy0.01, Y0.99 phenanthroline
tris thenoyltrifluoroacetonato Dy0.01, Y0.99 bathocuproine
tris thenoyltrifluoroacetonato Dy0.01, Y0.99 bathophenanthroline
tris 2,2,6,6-tetramethylheptanedionato Dy0.01, Y0.99 dimethylaminopyridine
tris 2,2,6,6-tetramethylheptanedionato Dy0.01, Y0.99 4-picoline-N-oxide
tris 2,2,6,6-tetramethylheptanedionato Dy0.01, Y0.99 4-phenylpyridine
tris 2,2,6,6-tetramethylheptanedionato Dy0.01, Y0.99 4-phenylpyridine-N-oxide
tris 2,2,6,6-tetramethylheptanedionato Dy0.01, Y0.99 1-methylimidazole
tris 2,2,6,6-tetramethylheptanedionato Dy0.01, Y0.99 triphenylphosphine oxide
tris 2,2,6,6-tetramethylheptanedionato Dy0.01, Y0.99 2,2-bipyridyl
tris 2,2,6,6-tetramethylheptanedionato Dy0.01, Y0.99 2,2-bipyridyl-N,N-dioxide
tris 2,2,6,6-tetramethylheptanedionato Dy0.01, Y0.99 phenanthroline
tris 2,2,6,6-tetramethylheptanedionato Dy0.01, Y0.99 bathocuproine
tris 2,2,6,6-tetramethylheptanedionato Dy0.01, Y0.99 bathophenanthroline
tris 3-methylpentane-2,4-dionato Dy0.01, Y0.99 dimethylaminopyridine
tris 3-methylpentane-2,4-dionato Dy0.01, Y0.99 4-picoline-N-oxide
tris 3-methylpentane-2,4-dionato Dy0.01, Y0.99 4-phenylpyridine
tris 3-methylpentane-2,4-dionato Dy0.01, Y0.99 4-phenylpyridine-N-oxide
tris 3-methylpentane-2,4-dionato Dy0.01, Y0.99 1-methylimidazole
tris 3-methylpentane-2,4-dionato Dy0.01, Y0.99 triphenylphosphine oxide
tris 3-methylpentane-2,4-dionato Dy0.01, Y0.99 2,2-bipyridyl
tris 3-methylpentane-2,4-dionato Dy0.01, Y0.99 2,2-bipyridyl-N,N-dioxide
tris 3-methylpentane-2,4-dionato Dy0.01, Y0.99 phenanthroline
tris 3-methylpentane-2,4-dionato Dy0.01, Y0.99 bathocuproine
tris 3-methylpentane-2,4-dionato Dy0.01, Y0.99 bathophenanthroline
tris 3-ethylpentane-2,4-dionato Dy0.01, Y0.99 dimethylaminopyridine
tris 3-ethylpentane-2,4-dionato Dy0.01, Y0.99 4-picoline-N-oxide
tris 3-ethylpentane-2,4-dionato Dy0.01, Y0.99 4-phenylpyridine
tris 3-ethylpentane-2,4-dionato Dy0.01, Y0.99 4-phenylpyridine-N-oxide
tris 3-ethylpentane-2,4-dionato Dy0.01, Y0.99 1-methylimidazole
tris 3-ethylpentane-2,4-dionato Dy0.01, Y0.99 triphenylphosphine oxide
tris 3-ethylpentane-2,4-dionato Dy0.01, Y0.99 2,2-bipyridyl
tris 3-ethylpentane-2,4-dionato Dy0.01, Y0.99 2,2-bipyridyl-N,N-dioxide
tris 3-ethylpentane-2,4-dionato Dy0.01, Y0.99 phenanthroline
tris 3-ethylpentane-2,4-dionato Dy0.01, Y0.99 bathocuproine
tris 3-ethylpentane-2,4-dionato Dy0.01, Y0.99 bathophenanthroline
tris pivaloyltrifluoroacetonato Dy0.01, Y0.99 dimethylaminopyridine
tris pivaloyltrifluoroacetonato Dy0.01, Y0.99 4-picoline-N-oxide
tris pivaloyltrifluoroacetonato Dy0.01, Y0.99 4-phenylpyridine
tris pivaloyltrifluoroacetonato Dy0.01, Y0.99 4-phenylpyridine-N-oxide
tris pivaloyltrifluoroacetonato Dy0.01, Y0.99 1-methylimidazole
tris pivaloyltrifluoroacetonato Dy0.01, Y0.99 triphenylphosphine oxide
tris pivaloyltrifluoroacetonato Dy0.01, Y0.99 2,2-bipyridyl
tris pivaloyltrifluoroacetonato Dy0.01, Y0.99 2,2-bipyridyl-N,N-dioxide
tris pivaloyltrifluoroacetonato Dy0.01, Y0.99 phenanthroline
tris pivaloyltrifluoroacetonato Dy0.01, Y0.99 bathocuproine
tris pivaloyltrifluoroacetonato Dy0.01, Y0.99 bathophenanthroline
tris trifluoroacetylacetonato Dy0.01, Y0.99 dimethylaminopyridine
tris trifluoroacetylacetonato Dy0.01, Y0.99 4-picoline-N-oxide
tris trifluoroacetylacetonato Dy0.01, Y0.99 4-phenylpyridine
tris trifluoroacetylacetonato Dy0.01, Y0.99 4-phenylpyridine-N-oxide
tris trifluoroacetylacetonato Dy0.01, Y0.99 1-methylimidazole
tris trifluoroacetylacetonato Dy0.01, Y0.99 triphenylphosphine oxide
tris trifluoroacetylacetonato Dy0.01, Y0.99 2,2-bipyridyl
tris trifluoroacetylacetonato Dy0.01, Y0.99 2,2-bipyridyl-N,N-dioxide
tris trifluoroacetylacetonato Dy0.01, Y0.99 phenanthroline
tris trifluoroacetylacetonato Dy0.01, Y0.99 bathocuproine
tris trifluoroacetylacetonato Dy0.01, Y0.99 bathophenanthroline
tris hexafluoroacetylacetonato Dy0.01, Y0.99 dimethylaminopyridine
tris hexafluoroacetylacetonato Dy0.01, Y0.99 4-picoline-N-oxide
tris hexafluoroacetylacetonato Dy0.01, Y0.99 4-phenylpyridine
tris hexafluoroacetylacetonato Dy0.01, Y0.99 4-phenylpyridine-N-oxide
tris hexafluoroacetylacetonato Dy0.01, Y0.99 1-methylimidazole
tris hexafluoroacetylacetonato Dy0.01, Y0.99 triphenylphosphine oxide
tris hexafluoroacetylacetonato Dy0.01, Y0.99 2,2-bipyridyl tris hexafluoroacetylacetonato Dy0.01, Y0.99 2,2-bipyridyl-N,N-dioxide
tris hexafluoroacetylacetonato Dy0.01, Y0.99 phenanthroline
tris hexafluoroacetylacetonato Dy0.01, Y0.99 bathocuproine
tris hexafluoroacetylacetonato Dy0.01, Y0.99 bathophenanthroline
tris 6,6,7,7,8,8,8-heptafluoro-2,2-dimethyloctanedionato Dy0.01, Y0.99 dimethylaminopyridine
tris 6,6,7,7,8,8,8-heptafluoro-2,2-dimethyloctanedionato Dy0.01, Y0.99 4-picoline-N-oxide
tris 6,6,7,7,8,8,8-heptafluoro-2,2-dimethyloctanedionato Dy0.01, Y0.99 4-phenylpyridine
tris 6,6,7,7,8,8,8-heptafluoro-2,2-dimethyloctanedionato Dy0.01, Y0.99 4-phenylpyridine-N-oxide
tris 6,6,7,7,8,8,8-heptafluoro-2,2-dimethyloctanedionato Dy0.01, Y0.99 1-methylimidazole
tris 6,6,7,7,8,8,8-heptafluoro-2,2-dimethyloctanedionato Dy0.01, Y0.99 triphenylphosphine oxide
tris 6,6,7,7,8,8,8-heptafluoro-2,2-dimethyloctanedionato Dy0.01, Y0.99 2,2-bipyridyl
tris 6,6,7,7,8,8,8-heptafluoro-2,2-dimethyloctanedionato Dy0.01, Y0.99 2,2-bipyridyl-N,N-dioxide
tris 6,6,7,7,8,8,8-heptafluoro-2,2-dimethyloctanedionato Dy0.01, Y0.99 phenanthroline
tris 6,6,7,7,8,8,8-heptafluoro-2,2-dimethyloctanedionato Dy0.01, Y0.99 bathocuproine
tris 6,6,7,7,8,8,8-heptafluoro-2,2-dimethyloctanedionato Dy0.01, Y0.99 bathophenanthroline
tris 1-phenyl-1,3-butanedionato Dy0.01, Y0.99 dimethylaminopyridine
tris 1-phenyl-1,3-butanedionato Dy0.01, Y0.99 4-picoline-N-oxide
tris 1-phenyl-1,3-butanedionato Dy0.01, Y0.99 4-phenylpyridine
tris 1-phenyl-1,3-butanedionato Dy0.01, Y0.99 4-phenylpyridine-N-oxide
tris 1-phenyl-1,3-butanedionato Dy0.01, Y0.99 1-methylimidazole
tris 1-phenyl-1,3-butanedionato Dy0.01, Y0.99 triphenylphosphine oxide
tris 1-phenyl-1,3-butanedionato Dy0.01, Y0.99 2,2-bipyridyl
tris 1-phenyl-1,3-butanedionato Dy0.01, Y0.99 2,2-bipyridyl-N,N-dioxide
tris 1-phenyl-1,3-butanedionato Dy0.01, Y0.99 phenanthroline
tris 1-phenyl-1,3-butanedionato Dy0.01, Y0.99 bathocuproine
tris 1-phenyl-1,3-butanedionato Dy0.01, Y0.99 bathophenanthroline
tris acetylacetonato Dy0.5, Y0.5 dimethylaminopyridine
tris acetylacetonato Dy0.5, Y0.5 4-picoline-N-oxide
tris acetylacetonato Dy0.5, Y0.5 4-phenylpyridine
tris acetylacetonato Dy0.5, Y0.5 4-phenylpyridine-N-oxide
tris acetylacetonato Dy0.5, Y0.5 1-methylimidazole
tris acetylacetonato Dy0.5, Y0.5 triphenylphosphine oxide
tris acetylacetonato Dy0.5, Y0.5 2,2-bipyridyl
tris acetylacetonato Dy0.5, Y0.5 2,2-bipyridyl-N,N-dioxide
tris acetylacetonato Dy0.5, Y0.5 phenanthroline
tris acetylacetonato Dy0.5, Y0.5 bathocuproine
tris acetylacetonato Dy0.5, Y0.5 bathophenanthroline
tris dibenzoylmethanato Dy0.5, Y0.5 dimethylaminopyridine
tris dibenzoylmethanato Dy0.5, Y0.5 4-picoline-N-oxide
tris dibenzoylmethanato Dy0.5, Y0.5 4-phenylpyridine
tris dibenzoylmethanato Dy0.5, Y0.5 4-phenylpyridine-N-oxide
tris dibenzoylmethanato Dy0.5, Y0.5 1-methylimidazole
tris dibenzoylmethanato Dy0.5, Y0.5 triphenylphosphine oxide
tris dibenzoylmethanato Dy0.5, Y0.5 2,2-bipyridyl
tris dibenzoylmethanato Dy0.5, Y0.5 2,2-bipyridyl-N,N-dioxide
tris dibenzoylmethanato Dy0.5, Y0.5 phenanthroline
tris dibenzoylmethanato Dy0.5, Y0.5 bathocuproine
tris dibenzoylmethanato Dy0.5, Y0.5 bathophenanthroline
tris thenoyltrifluoroacetonato Dy0.5, Y0.5 dimethylaminopyridine
tris thenoyltrifluoroacetonato Dy0.5, Y0.5 4-picoline-N-oxide
tris thenoyltrifluoroacetonato Dy0.5, Y0.5 4-phenylpyridine
tris thenoyltrifluoroacetonato Dy0.5, Y0.5 4-phenylpyridine-N-oxide
tris thenoyltrifluoroacetonato Dy0.5, Y0.5 1-methylimidazole
tris thenoyltrifluoroacetonato Dy0.5, Y0.5 triphenylphosphine oxide
tris thenoyltrifluoroacetonato Dy0.5, Y0.5 2,2-bipyridyl
tris thenoyltrifluoroacetonato Dy0.5, Y0.5 2,2-bipyridyl-N,N-dioxide
tris thenoyltrifluoroacetonato Dy0.5, Y0.5 phenanthroline
tris thenoyltrifluoroacetonato Dy0.5, Y0.5 bathocuproine
tris thenoyltrifluoroacetonato Dy0.5, Y0.5 bathophenanthroline
tris 2,2,6,6-tetramethylheptanedionato Dy0.5, Y0.5 dimethylaminopyridine
tris 2,2,6,6-tetramethylheptanedionato Dy0.5, Y0.5 4-picoline-N-oxide
tris 2,2,6,6-tetramethylheptanedionato Dy0.5, Y0.5 4-phenylpyridine
tris 2,2,6,6-tetramethylheptanedionato Dy0.5, Y0.5 4-phenylpyridine-N-oxide
tris 2,2,6,6-tetramethylheptanedionato Dy0.5, Y0.5 1-methylimidazole
tris 2,2,6,6-tetramethylheptanedionato Dy0.5, Y0.5 triphenylphosphine oxide
tris 2,2,6,6-tetramethylheptanedionato Dy0.5, Y0.5 2,2-bipyridyl
tris 2,2,6,6-tetramethylheptanedionato Dy0.5, Y0.5 2,2-bipyridyl-N,N-dioxide
tris 2,2,6,6-tetramethylheptanedionato Dy0.5, Y0.5 phenanthroline
tris 2,2,6,6-tetramethylheptanedionato Dy0.5, Y0.5 bathocuproine
tris 2,2,6,6-tetramethylheptanedionato Dy0.5, Y0.5 bathophenanthroline
tris 3-methylpentane-2,4-dionato Dy0.5, Y0.5 dimethylaminopyridine
tris 3-methylpentane-2,4-dionato Dy0.5, Y0.5 4-picoline-N-oxide
tris 3-methylpentane-2,4-dionato Dy0.5, Y0.5 4-phenylpyridine
tris 3-methylpentane-2,4-dionato Dy0.5, Y0.5 4-phenylpyridine-N-oxide
tris 3-methylpentane-2,4-dionato Dy0.5, Y0.5 1-methylimidazole
tris 3-methylpentane-2,4-dionato Dy0.5, Y0.5 triphenylphosphine oxide
tris 3-methylpentane-2,4-dionato Dy0.5, Y0.5 2,2-bipyridyl
tris 3-methylpentane-2,4-dionato Dy0.5, Y0.5 2,2-bipyridyl-N,N-dioxide tris 3-methylpentane-2,4-dionato Dy0.5, Y0.5 phenanthroline
tris 3-methylpentane-2,4-dionato Dy0.5, Y0.5 bathocuproine
tris 3-methylpentane-2,4-dionato Dy0.5, Y0.5 bathophenanthroline
tris 3-ethylpentane-2,4-dionato Dy0.5, Y0.5 dimethylaminopyridine
tris 3-ethylpentane-2,4-dionato Dy0.5, Y0.5 4-picoline-N-oxide
tris 3-ethylpentane-2,4-dionato Dy0.5, Y0.5 4-phenylpyridine
tris 3-ethylpentane-2,4-dionato Dy0.5, Y0.5 4-phenylpyridine-N-oxide
tris 3-ethylpentane-2,4-dionato Dy0.5, Y0.5 1-methylimidazole
tris 3-ethylpentane-2,4-dionato Dy0.5, Y0.5 triphenylphosphine oxide
tris 3-ethylpentane-2,4-dionato Dy0.5, Y0.5 2,2-bipyridyl
tris 3-ethylpentane-2,4-dionato Dy0.5, Y0.5 2,2-bipyridyl-N,N-dioxide
tris 3-ethylpentane-2,4-dionato Dy0.5, Y0.5 phenanthroline
tris 3-ethylpentane-2,4-dionato Dy0.5, Y0.5 bathocuproine
tris 3-ethylpentane-2,4-dionato Dy0.5, Y0.5 bathophenanthroline
tris pivaloyltrifluoroacetonato Dy0.5, Y0.5 dimethylaminopyridine
tris pivaloyltrifluoroacetonato Dy0.5, Y0.5 4-picoline-N-oxide
tris pivaloyltrifluoroacetonato Dy0.5, Y0.5 4-phenylpyridine
tris pivaloyltrifluoroacetonato Dy0.5, Y0.5 4-phenylpyridine-N-oxide
tris pivaloyltrifluoroacetonato Dy0.5, Y0.5 1-methylimidazole
tris pivaloyltrifluoroacetonato Dy0.5, Y0.5 triphenylphosphine oxide
tris pivaloyltrifluoroacetonato Dy0.5, Y0.5 2,2-bipyridyl
tris pivaloyltrifluoroacetonato Dy0.5, Y0.5 2,2-bipyridyl-N,N-dioxide
tris pivaloyltrifluoroacetonato Dy0.5, Y0.5 phenanthroline
tris pivaloyltrifluoroacetonato Dy0.5, Y0.5 bathocuproine
tris pivaloyltrifluoroacetonato Dy0.5, Y0.5 bathophenanthroline
tris trifluoroacetylacetonato Dy0.5, Y0.5 dimethylaminopyridine
tris trifluoroacetylacetonato Dy0.5, Y0.5 4-picoline-N-oxide
tris trifluoroacetylacetonato Dy0.5, Y0.5 4-phenylpyridine
tris trifluoroacetylacetonato Dy0.5, Y0.5 4-phenylpyridine-N-oxide
tris trifluoroacetylacetonato Dy0.5, Y0.5 1-methylimidazole
tris trifluoroacetylacetonato Dy0.5, Y0.5 triphenylphosphine oxide
tris trifluoroacetylacetonato Dy0.5, Y0.5 2,2-bipyridyl
tris trifluoroacetylacetonato Dy0.5, Y0.5 2,2-bipyridyl-N,N-dioxide
tris trifluoroacetylacetonato Dy0.5, Y0.5 phenanthroline
tris trifluoroacetylacetonato Dy0.5, Y0.5 bathocuproine
tris trifluoroacetylacetonato Dy0.5, Y0.5 bathophenanthroline
tris hexafluoroacetylacetonato Dy0.5, Y0.5 dimethylaminopyridine
tris hexafluoroacetylacetonato Dy0.5, Y0.5 4-picoline-N-oxide
tris hexafluoroacetylacetonato Dy0.5, Y0.5 4-phenylpyridine
tris hexafluoroacetylacetonato Dy0.5, Y0.5 4-phenylpyridine-N-oxide
tris hexafluoroacetylacetonato Dy0.5, Y0.5 1-methylimidazole
tris hexafluoroacetylacetonato Dy0.5, Y0.5 triphenylphosphine oxide
tris hexafluoroacetylacetonato Dy0.5, Y0.5 2,2-bipyridyl
tris hexafluoroacetylacetonato Dy0.5, Y0.5 2,2-bipyridyl-N,N-dioxide
tris hexafluoroacetylacetonato Dy0.5, Y0.5 phenanthroline
tris hexafluoroacetylacetonato Dy0.5, Y0.5 bathocuproine
tris hexafluoroacetylacetonato Dy0.5, Y0.5 bathophenanthroline
tris 6,6,7,7,8,8,8-heptafluoro-2,2-dimethyloctanedionato Dy0.5, Y0.5 dimethylaminopyridine
tris 6,6,7,7,8,8,8-heptafluoro-2,2-dimethyloctanedionato Dy0.5, Y0.5 4-picoline-N-oxide
tris 6,6,7,7,8,8,8-heptafluoro-2,2-dimethyloctanedionato Dy0.5, Y0.5 4-phenylpyridine
tris 6,6,7,7,8,8,8-heptafluoro-2,2-dimethyloctanedionato Dy0.5, Y0.5 4-phenylpyridine-N-oxide
tris 6,6,7,7,8,8,8-heptafluoro-2,2-dimethyloctanedionato Dy0.5, Y0.5 1-methylimidazole
tris 6,6,7,7,8,8,8-heptafluoro-2,2-dimethyloctanedionato Dy0.5, Y0.5 triphenylphosphine oxide
tris 6,6,7,7,8,8,8-heptafluoro-2,2-dimethyloctanedionato Dy0.5, Y0.5 2,2-bipyridyl
tris 6,6,7,7,8,8,8-heptafluoro-2,2-dimethyloctanedionato Dy0.5, Y0.5 2,2-bipyridyl-N,N-dioxide
tris 6,6,7,7,8,8,8-heptafluoro-2,2-dimethyloctanedionato Dy0.5, Y0.5 phenanthroline
tris 6,6,7,7,8,8,8-heptafluoro-2,2-dimethyloctanedionato Dy0.5, Y0.5 bathocuproine
tris 6,6,7,7,8,8,8-heptafluoro-2,2-dimethyloctanedionato Dy0.5, Y0.5 bathophenanthroline
tris 1-phenyl-1,3-butanedionato Dy0.5, Y0.5 dimethylaminopyridine
tris 1-phenyl-1,3-butanedionato Dy0.5, Y0.5 4-picoline-N-oxide
tris 1-phenyl-1,3-butanedionato Dy0.5, Y0.5 4-phenylpyridine
tris 1-phenyl-1,3-butanedionato Dy0.5, Y0.5 4-phenylpyridine-N-oxide
tris 1-phenyl-1,3-butanedionato Dy0.5, Y0.5 1-methylimidazole
tris 1-phenyl-1,3-butanedionato Dy0.5, Y0.5 triphenylphosphine oxide
tris 1-phenyl-1,3-butanedionato Dy0.5, Y0.5 2,2-bipyridyl
tris 1-phenyl-1,3-butanedionato Dy0.5, Y0.5 2,2-bipyridyl-N,N-dioxide
tris 1-phenyl-1,3-butanedionato Dy0.5, Y0.5 phenanthroline
tris 1-phenyl-1,3-butanedionato Dy0.5, Y0.5 bathocuproine
tris 1-phenyl-1,3-butanedionato Dy0.5, Y0.5 bathophenanthroline
tris acetylacetonato Dy0.2, Y0.8 dimethylaminopyridine
tris acetylacetonato Dy0.2, Y0.8 4-picoline-N-oxide
tris acetylacetonato Dy0.2, Y0.8 4-phenylpyridine
tris acetylacetonato Dy0.2, Y0.8 4-phenylpyridine-N-oxide
tris acetylacetonato Dy0.2, Y0.8 1-methylimidazole
tris acetylacetonato Dy0.2, Y0.8 triphenylphosphine oxide
tris acetylacetonato Dy0.2, Y0.8 2,2-bipyridyl
tris acetylacetonato Dy0.2, Y0.8 2,2-bipyridyl-N,N-dioxide
tris acetylacetonato Dy0.2, Y0.8 phenanthroline
tris acetylacetonato Dy0.2, Y0.8 bathocuproine
tris acetylacetonato Dy0.2, Y0.8 bathophenanthroline
tris dibenzoylmethanato Dy0.2, Y0.8 dimethylaminopyridine tris dibenzoylmethanato Dy0.2, Y0.8 4-picoline-N-oxide
tris dibenzoylmethanato Dy0.2, Y0.8 4-phenylpyridine
tris dibenzoylmethanato Dy0.2, Y0.8 4-phenylpyridine-N-oxide
tris dibenzoylmethanato Dy0.2, Y0.8 1-methylimidazole
tris dibenzoylmethanato Dy0.2, Y0.8 triphenylphosphine oxide
tris dibenzoylmethanato Dy0.2, Y0.8 2,2-bipyridyl
tris dibenzoylmethanato Dy0.2, Y0.8 2,2-bipyridyl-N,N-dioxide
tris dibenzoylmethanato Dy0.2, Y0.8 phenanthroline
tris dibenzoylmethanato Dy0.2, Y0.8 bathocuproine
tris dibenzoylmethanato Dy0.2, Y0.8 bathophenanthroline
tris thenoyltrifluoroacetonato Dy0.2, Y0.8 dimethylaminopyridine
tris thenoyltrifluoroacetonato Dy0.2, Y0.8 4-picoline-N-oxide
tris thenoyltrifluoroacetonato Dy0.2, Y0.8 4-phenylpyridine
tris thenoyltrifluoroacetonato Dy0.2, Y0.8 4-phenylpyridine-N-oxide
tris thenoyltrifluoroacetonato Dy0.2, Y0.8 1-methylimidazole
tris thenoyltrifluoroacetonato Dy0.2, Y0.8 triphenylphosphine oxide
tris thenoyltrifluoroacetonato Dy0.2, Y0.8 2,2-bipyridyl
tris thenoyltrifluoroacetonato Dy0.2, Y0.8 2,2-bipyridyl-N,N-dioxide
tris thenoyltrifluoroacetonato Dy0.2, Y0.8 phenanthroline
tris thenoyltrifluoroacetonato Dy0.2, Y0.8 bathocuproine
tris thenoyltrifluoroacetonato Dy0.2, Y0.8 bathophenanthroline
tris 2,2,6,6-tetramethylheptanedionato Dy0.2, Y0.8 dimethylaminopyridine
tris 2,2,6,6-tetramethylheptanedionato Dy0.2, Y0.8 4-picoline-N-oxide
tris 2,2,6,6-tetramethylheptanedionato Dy0.2, Y0.8 4-phenylpyridine
tris 2,2,6,6-tetramethylheptanedionato Dy0.2, Y0.8 4-phenylpyridine-N-oxide
tris 2,2,6,6-tetramethylheptanedionato Dy0.2, Y0.8 1-methylimidazole
tris 2,2,6,6-tetramethylheptanedionato Dy0.2, Y0.8 triphenylphosphine oxide
tris 2,2,6,6-tetramethylheptanedionato Dy0.2, Y0.8 2,2-bipyridyl
tris 2,2,6,6-tetramethylheptanedionato Dy0.2, Y0.8 2,2-bipyridyl-N,N-dioxide
tris 2,2,6,6-tetramethylheptanedionato Dy0.2, Y0.8 phenanthroline
tris 2,2,6,6-tetramethylheptanedionato Dy0.2, Y0.8 bathocuproine
tris 2,2,6,6-tetramethylheptanedionato Dy0.2, Y0.8 bathophenanthroline
tris 3-methylpentane-2,4-dionato Dy0.2, Y0.8 dimethylaminopyridine
tris 3-methylpentane-2,4-dionato Dy0.2, Y0.8 4-picoline-N-oxide
tris 3-methylpentane-2,4-dionato Dy0.2, Y0.8 4-phenylpyridine
tris 3-methylpentane-2,4-dionato Dy0.2, Y0.8 4-phenylpyridine-N-oxide
tris 3-methylpentane-2,4-dionato Dy0.2, Y0.8 1-methylimidazole
tris 3-methylpentane-2,4-dionato Dy0.2, Y0.8 triphenylphosphine oxide
tris 3-methylpentane-2,4-dionato Dy0.2, Y0.8 2,2-bipyridyl
tris 3-methylpentane-2,4-dionato Dy0.2, Y0.8 2,2-bipyridyl-N,N-dioxide
tris 3-methylpentane-2,4-dionato Dy0.2, Y0.8 phenanthroline
tris 3-methylpentane-2,4-dionato Dy0.2, Y0.8 bathocuproine
tris 3-methylpentane-2,4-dionato Dy0.2, Y0.8 bathophenanthroline
tris 3-ethylpentane-2,4-dionato Dy0.2, Y0.8 dimethylaminopyridine
tris 3-ethylpentane-2,4-dionato Dy0.2, Y0.8 4-picoline-N-oxide
tris 3-ethylpentane-2,4-dionato Dy0.2, Y0.8 4-phenylpyridine
tris 3-ethylpentane-2,4-dionato Dy0.2, Y0.8 4-phenylpyridine-N-oxide
tris 3-ethylpentane-2,4-dionato Dy0.2, Y0.8 1-methylimidazole
tris 3-ethylpentane-2,4-dionato Dy0.2, Y0.8 triphenylphosphine oxide
tris 3-ethylpentane-2,4-dionato Dy0.2, Y0.8 2,2-bipyridyl
tris 3-ethylpentane-2,4-dionato Dy0.2, Y0.8 2,2-bipyridyl-N,N-dioxide
tris 3-ethylpentane-2,4-dionato Dy0.2, Y0.8 phenanthroline
tris 3-ethylpentane-2,4-dionato Dy0.2, Y0.8 bathocuproine
tris 3-ethylpentane-2,4-dionato Dy0.2, Y0.8 bathophenanthroline
tris pivaloyltrifluoroacetonato Dy0.2, Y0.8 dimethylaminopyridine
tris pivaloyltrifluoroacetonato Dy0.2, Y0.8 4-picoline-N-oxide
tris pivaloyltrifluoroacetonato Dy0.2, Y0.8 4-phenylpyridine
tris pivaloyltrifluoroacetonato Dy0.2, Y0.8 4-phenylpyridine-N-oxide
tris pivaloyltrifluoroacetonato Dy0.2, Y0.8 1-methylimidazole
tris pivaloyltrifluoroacetonato Dy0.2, Y0.8 triphenylphosphine oxide
tris pivaloyltrifluoroacetonato Dy0.2, Y0.8 2,2-bipyridyl
tris pivaloyltrifluoroacetonato Dy0.2, Y0.8 2,2-bipyridyl-N,N-dioxide
tris pivaloyltrifluoroacetonato Dy0.2, Y0.8 phenanthroline
tris pivaloyltrifluoroacetonato Dy0.2, Y0.8 bathocuproine
tris pivaloyltrifluoroacetonato Dy0.2, Y0.8 bathophenanthroline
tris trifluoroacetylacetonato Dy0.2, Y0.8 dimethylaminopyridine
tris trifluoroacetylacetonato Dy0.2, Y0.8 4-picoline-N-oxide
tris trifluoroacetylacetonato Dy0.2, Y0.8 4-phenylpyridine
tris trifluoroacetylacetonato Dy0.2, Y0.8 4-phenylpyridine-N-oxide
tris trifluoroacetylacetonato Dy0.2, Y0.8 1-methylimidazole
tris trifluoroacetylacetonato Dy0.2, Y0.8 triphenylphosphine oxide
tris trifluoroacetylacetonato Dy0.2, Y0.8 2,2-bipyridyl
tris trifluoroacetylacetonato Dy0.2, Y0.8 2,2-bipyridyl-N,N-dioxide
tris trifluoroacetylacetonato Dy0.2, Y0.8 phenanthroline
tris trifluoroacetylacetonato Dy0.2, Y0.8 bathocuproine
tris trifluoroacetylacetonato Dy0.2, Y0.8 bathophenanthroline
tris hexafluoroacetylacetonato Dy0.2, Y0.8 dimethylaminopyridine
tris hexafluoroacetylacetonato Dy0.2, Y0.8 4-picoline-N-oxide tris hexafluoroacetylacetonato Dy0.2, Y0.8 4-phenylpyridine
tris hexafluoroacetylacetonato Dy0.2, Y0.8 4-phenylpyridine-N-oxide
tris hexafluoroacetylacetonato Dy0.2, Y0.8 1-methylimidazole
tris hexafluoroacetylacetonato Dy0.2, Y0.8 triphenylphosphine oxide
tris hexafluoroacetylacetonato Dy0.2, Y0.8 2,2-bipyridyl
tris hexafluoroacetylacetonato Dy0.2, Y0.8 2,2-bipyridyl-N,N-dioxide
tris hexafluoroacetylacetonato Dy0.2, Y0.8 phenanthroline
tris hexafluoroacetylacetonato Dy0.2, Y0.8 bathocuproine
tris hexafluoroacetylacetonato Dy0.2, Y0.8 bathophenanthroline
tris 6,6,7,7,8,8,8-heptafluoro-2,2-dimethyloctanedionato Dy0.2, Y0.8 dimethylaminopyridine
tris 6,6,7,7,8,8,8-heptafluoro-2,2-dimethyloctanedionato Dy0.2, Y0.8 4-picoline-N-oxide
tris 6,6,7,7,8,8,8-heptafluoro-2,2-dimethyloctanedionato Dy0.2, Y0.8 4-phenylpyridine
tris 6,6,7,7,8,8,8-heptafluoro-2,2-dimethyloctanedionato Dy0.2, Y0.8 4-phenylpyridine-N-oxide
tris 6,6,7,7,8,8,8-heptafluoro-2,2-dimethyloctanedionato Dy0.2, Y0.8 1-methylimidazole
tris 6,6,7,7,8,8,8-heptafluoro-2,2-dimethyloctanedionato Dy0.2, Y0.8 triphenylphosphine oxide
tris 6,6,7,7,8,8,8-heptafluoro-2,2-dimethyloctanedionato Dy0.2, Y0.8 2,2-bipyridyl
tris 6,6,7,7,8,8,8-heptafluoro-2,2-dimethyloctanedionato Dy0.2, Y0.8 2,2-bipyridyl-N,N-dioxide
tris 6,6,7,7,8,8,8-heptafluoro-2,2-dimethyloctanedionato Dy0.2, Y0.8 phenanthroline
tris 6,6,7,7,8,8,8-heptafluoro-2,2-dimethyloctanedionato Dy0.2, Y0.8 bathocuproine
tris 6,6,7,7,8,8,8-heptafluoro-2,2-dimethyloctanedionato Dy0.2, Y0.8 bathophenanthroline
tris 1-phenyl-1,3-butanedionato Dy0.2, Y0.8 dimethylaminopyridine
tris 1-phenyl-1,3-butanedionato Dy0.2, Y0.8 4-picoline-N-oxide
tris 1-phenyl-1,3-butanedionato Dy0.2, Y0.8 4-phenylpyridine
tris 1-phenyl-1,3-butanedionato Dy0.2, Y0.8 4-phenylpyridine-N-oxide
tris 1-phenyl-1,3-butanedionato Dy0.2, Y0.8 1-methylimidazole
tris 1-phenyl-1,3-butanedionato Dy0.2, Y0.8 triphenylphosphine oxide
tris 1-phenyl-1,3-butanedionato Dy0.2, Y0.8 2,2-bipyridyl
tris 1-phenyl-1,3-butanedionato Dy0.2, Y0.8 2,2-bipyridyl-N,N-dioxide
tris 1-phenyl-1,3-butanedionato Dy0.2, Y0.8 phenanthroline
tris 1-phenyl-1,3-butanedionato Dy0.2, Y0.8 bathocuproine
tris 1-phenyl-1,3-butanedionato Dy0.2, Y0.8 bathophenanthroline
tris acetylacetonato Dy0.1, Y0.9 dimethylaminopyridine
tris acetylacetonato Dy0.1, Y0.9 4-picoline-N-oxide
tris acetylacetonato Dy0.1, Y0.9 4-phenylpyridine
tris acetylacetonato Dy0.1, Y0.9 4-phenylpyridine-N-oxide
tris acetylacetonato Dy0.1, Y0.9 1-methylimidazole
tris acetylacetonato Dy0.1, Y0.9 triphenylphosphine oxide
tris acetylacetonato Dy0.1, Y0.9 2,2-bipyridyl
tris acetylacetonato Dy0.1, Y0.9 2,2-bipyridyl-N,N-dioxide
tris acetylacetonato Dy0.1, Y0.9 phenanthroline
tris acetylacetonato Dy0.1, Y0.9 bathocuproine
tris acetylacetonato Dy0.1, Y0.9 bathophenanthroline
tris dibenzoylmethanato Dy0.1, Y0.9 dimethylaminopyridine
tris dibenzoylmethanato Dy0.1, Y0.9 4-picoline-N-oxide
tris dibenzoylmethanato Dy0.1, Y0.9 4-phenylpyridine
tris dibenzoylmethanato Dy0.1, Y0.9 4-phenylpyridine-N-oxide
tris dibenzoylmethanato Dy0.1, Y0.9 1-methylimidazole
tris dibenzoylmethanato Dy0.1, Y0.9 triphenylphosphine oxide
tris dibenzoylmethanato Dy0.1, Y0.9 2,2-bipyridyl
tris dibenzoylmethanato Dy0.1, Y0.9 2,2-bipyridyl-N,N-dioxide
tris dibenzoylmethanato Dy0.1, Y0.9 phenanthroline
tris dibenzoylmethanato Dy0.1, Y0.9 bathocuproine
tris dibenzoylmethanato Dy0.1, Y0.9 bathophenanthroline
tris thenoyltrifluoroacetonato Dy0.1, Y0.9 dimethylaminopyridine
tris thenoyltrifluoroacetonato Dy0.1, Y0.9 4-picoline-N-oxide
tris thenoyltrifluoroacetonato Dy0.1, Y0.9 4-phenylpyridine
tris thenoyltrifluoroacetonato Dy0.1, Y0.9 4-phenylpyridine-N-oxide
tris thenoyltrifluoroacetonato Dy0.1, Y0.9 1-methylimidazole
tris thenoyltrifluoroacetonato Dy0.1, Y0.9 triphenylphosphine oxide
tris thenoyltrifluoroacetonato Dy0.1, Y0.9 2,2-bipyridyl
tris thenoyltrifluoroacetonato Dy0.1, Y0.9 2,2-bipyridyl-N,N-dioxide
tris thenoyltrifluoroacetonato Dy0.1, Y0.9 phenanthroline
tris thenoyltrifluoroacetonato Dy0.1, Y0.9 bathocuproine
tris thenoyltrifluoroacetonato Dy0.1, Y0.9 bathophenanthroline
tris 2,2,6,6-tetramethylheptanedionato Dy0.1, Y0.9 dimethylaminopyridine
tris 2,2,6,6-tetramethylheptanedionato Dy0.1, Y0.9 4-picoline-N-oxide
tris 2,2,6,6-tetramethylheptanedionato Dy0.1, Y0.9 4-phenylpyridine
tris 2,2,6,6-tetramethylheptanedionato Dy0.1, Y0.9 4-phenylpyridine-N-oxide
tris 2,2,6,6-tetramethylheptanedionato Dy0.1, Y0.9 1-methylimidazole
tris 2,2,6,6-tetramethylheptanedionato Dy0.1, Y0.9 triphenylphosphine oxide
tris 2,2,6,6-tetramethylheptanedionato Dy0.1, Y0.9 2,2-bipyridyl
tris 2,2,6,6-tetramethylheptanedionato Dy0.1, Y0.9 2,2-bipyridyl-N,N-dioxide
tris 2,2,6,6-tetramethylheptanedionato Dy0.1, Y0.9 phenanthroline
tris 2,2,6,6-tetramethylheptanedionato Dy0.1, Y0.9 bathocuproine
tris 2,2,6,6-tetramethylheptanedionato Dy0.1, Y0.9 bathophenanthroline
tris 3-methylpentane-2,4-dionato Dy0.1, Y0.9 dimethylaminopyridine
tris 3-methylpentane-2,4-dionato Dy0.1, Y0.9 4-picoline-N-oxide
tris 3-methylpentane-2,4-dionato Dy0.1, Y0.9 4-phenylpyridine
tris 3-methylpentane-2,4-dionato Dy0.1, Y0.9 4-phenylpyridine-N-oxide
tris 3-methylpentane-2,4-dionato Dy0.1, Y0.9 1-methylimidazole
tris 3-methylpentane-2,4-dionato Dy0.1, Y0.9 triphenylphosphine oxide tris 3-methylpentane-2,4-dionato Dy0.1, Y0.9 2,2-bipyridyl
tris 3-methylpentane-2,4-dionato Dy0.1, Y0.9 2,2-bipyridyl-N,N-dioxide
tris 3-methylpentane-2,4-dionato Dy0.1, Y0.9 phenanthroline
tris 3-methylpentane-2,4-dionato Dy0.1, Y0.9 bathocuproine
tris 3-methylpentane-2,4-dionato Dy0.1, Y0.9 bathophenanthroline
tris 3-ethylpentane-2,4-dionato Dy0.1, Y0.9 dimethylaminopyridine
tris 3-ethylpentane-2,4-dionato Dy0.1, Y0.9 4-picoline-N-oxide
tris 3-ethylpentane-2,4-dionato Dy0.1, Y0.9 4-phenylpyridine
tris 3-ethylpentane-2,4-dionato Dy0.1, Y0.9 4-phenylpyridine-N-oxide
tris 3-ethylpentane-2,4-dionato Dy0.1, Y0.9 1-methylimidazole
tris 3-ethylpentane-2,4-dionato Dy0.1, Y0.9 triphenylphosphine oxide
tris 3-ethylpentane-2,4-dionato Dy0.1, Y0.9 2,2-bipyridyl
tris 3-ethylpentane-2,4-dionato Dy0.1, Y0.9 2,2-bipyridyl-N,N-dioxide
tris 3-ethylpentane-2,4-dionato Dy0.1, Y0.9 phenanthroline
tris 3-ethylpentane-2,4-dionato Dy0.1, Y0.9 bathocuproine
tris 3-ethylpentane-2,4-dionato Dy0.1, Y0.9 bathophenanthroline
tris pivaloyltrifluoroacetonato Dy0.1, Y0.9 dimethylaminopyridine
tris pivaloyltrifluoroacetonato Dy0.1, Y0.9 4-picoline-N-oxide
tris pivaloyltrifluoroacetonato Dy0.1, Y0.9 4-phenylpyridine
tris pivaloyltrifluoroacetonato Dy0.1, Y0.9 4-phenylpyridine-N-oxide
tris pivaloyltrifluoroacetonato Dy0.1, Y0.9 1-methylimidazole
tris pivaloyltrifluoroacetonato Dy0.1, Y0.9 triphenylphosphine oxide
tris pivaloyltrifluoroacetonato Dy0.1, Y0.9 2,2-bipyridyl
tris pivaloyltrifluoroacetonato Dy0.1, Y0.9 2,2-bipyridyl-N,N-dioxide
tris pivaloyltrifluoroacetonato Dy0.1, Y0.9 phenanthroline
tris pivaloyltrifluoroacetonato Dy0.1, Y0.9 bathocuproine
tris pivaloyltrifluoroacetonato Dy0.1, Y0.9 bathophenanthroline
tris trifluoroacetylacetonato Dy0.1, Y0.9 dimethylaminopyridine
tris trifluoroacetylacetonato Dy0.1, Y0.9 4-picoline-N-oxide
tris trifluoroacetylacetonato Dy0.1, Y0.9 4-phenylpyridine
tris trifluoroacetylacetonato Dy0.1, Y0.9 4-phenylpyridine-N-oxide
tris trifluoroacetylacetonato Dy0.1, Y0.9 1-methylimidazole
tris trifluoroacetylacetonato Dy0.1, Y0.9 triphenylphosphine oxide
tris trifluoroacetylacetonato Dy0.1, Y0.9 2,2-bipyridyl
tris trifluoroacetylacetonato Dy0.1, Y0.9 2,2-bipyridyl-N,N-dioxide
tris trifluoroacetylacetonato Dy0.1, Y0.9 phenanthroline
tris trifluoroacetylacetonato Dy0.1, Y0.9 bathocuproine
tris trifluoroacetylacetonato Dy0.1, Y0.9 bathophenanthroline
tris hexafluoroacetylacetonato Dy0.1, Y0.9 dimethylaminopyridine
tris hexafluoroacetylacetonato Dy0.1, Y0.9 4-picoline-N-oxide
tris hexafluoroacetylacetonato Dy0.1, Y0.9 4-phenylpyridine
tris hexafluoroacetylacetonato Dy0.1, Y0.9 4-phenylpyridine-N-oxide
tris hexafluoroacetylacetonato Dy0.1, Y0.9 1-methylimidazole
tris hexafluoroacetylacetonato Dy0.1, Y0.9 triphenylphosphine oxide
tris hexafluoroacetylacetonato Dy0.1, Y0.9 2,2-bipyridyl
tris hexafluoroacetylacetonato Dy0.1, Y0.9 2,2-bipyridyl-N,N-dioxide
tris hexafluoroacetylacetonato Dy0.1, Y0.9 phenanthroline
tris hexafluoroacetylacetonato Dy0.1, Y0.9 bathocuproine
tris hexafluoroacetylacetonato Dy0.1, Y0.9 bathophenanthroline
tris 6,6,7,7,8,8,8-heptafluoro-2,2-dimethyloctanedionato Dy0.1, Y0.9 dimethylaminopyridine
tris 6,6,7,7,8,8,8-heptafluoro-2,2-dimethyloctanedionato Dy0.1, Y0.9 4-picoline-N-oxide
tris 6,6,7,7,8,8,8-heptafluoro-2,2-dimethyloctanedionato Dy0.1, Y0.9 4-phenylpyridine
tris 6,6,7,7,8,8,8-heptafluoro-2,2-dimethyloctanedionato Dy0.1, Y0.9 4-phenylpyridine-N-oxide
tris 6,6,7,7,8,8,8-heptafluoro-2,2-dimethyloctanedionato Dy0.1, Y0.9 1-methylimidazole
tris 6,6,7,7,8,8,8-heptafluoro-2,2-dimethyloctanedionato Dy0.1, Y0.9 triphenylphosphine oxide
tris 6,6,7,7,8,8,8-heptafluoro-2,2-dimethyloctanedionato Dy0.1, Y0.9 2,2-bipyridyl
tris 6,6,7,7,8,8,8-heptafluoro-2,2-dimethyloctanedionato Dy0.1, Y0.9 2,2-bipyridyl-N,N-dioxide
tris 6,6,7,7,8,8,8-heptafluoro-2,2-dimethyloctanedionato Dy0.1, Y0.9 phenanthroline
tris 6,6,7,7,8,8,8-heptafluoro-2,2-dimethyloctanedionato Dy0.1, Y0.9 bathocuproine
tris 6,6,7,7,8,8,8-heptafluoro-2,2-dimethyloctanedionato Dy0.1, Y0.9 bathophenanthroline
tris 1-phenyl-1,3-butanedionato Dy0.1, Y0.9 dimethylaminopyridine
tris 1-phenyl-1,3-butanedionato Dy0.1, Y0.9 4-picoline-N-oxide
tris 1-phenyl-1,3-butanedionato Dy0.1, Y0.9 4-phenylpyridine
tris 1-phenyl-1,3-butanedionato Dy0.1, Y0.9 4-phenylpyridine-N-oxide
tris 1-phenyl-1,3-butanedionato Dy0.1, Y0.9 1-methylimidazole
tris 1-phenyl-1,3-butanedionato Dy0.1, Y0.9 triphenylphosphine oxide
tris 1-phenyl-1,3-butanedionato Dy0.1, Y0.9 2,2-bipyridyl
tris 1-phenyl-1,3-butanedionato Dy0.1, Y0.9 2,2-bipyridyl-N,N-dioxide
tris 1-phenyl-1,3-butanedionato Dy0.1, Y0.9 phenanthroline
tris 1-phenyl-1,3-butanedionato Dy0.1, Y0.9 bathocuproine
tris 1-phenyl-1,3-butanedionato Dy0.1, Y0.9 bathophenanthroline
tris acetylacetonato Dy0.01, Y0.99 dimethylaminopyridine
tris acetylacetonato Dy0.01, Y0.99 4-picoline-N-oxide
tris acetylacetonato Dy0.01, Y0.99 4-phenylpyridine
tris acetylacetonato Dy0.01, Y0.99 4-phenylpyridine-N-oxide
tris acetylacetonato Dy0.01, Y0.99 1-methylimidazole
tris acetylacetonato Dy0.01, Y0.99 triphenylphosphine oxide
tris acetylacetonato Dy0.01, Y0.99 2,2-bipyridyl
tris acetylacetonato Dy0.01, Y0.99 2,2-bipyridyl-N,N-dioxide tris acetylacetonato Dy0.01, Y0.99 phenanthroline
tris acetylacetonato Dy0.01, Y0.99 bathocuproine
tris acetylacetonato Dy0.01, Y0.99 bathophenanthroline
tris dibenzoylmethanato Dy0.01, Y0.99 dimethylaminopyridine
tris dibenzoylmethanato Dy0.01, Y0.99 4-picoline-N-oxide
tris dibenzoylmethanato Dy0.01, Y0.99 4-phenylpyridine
tris dibenzoylmethanato Dy0.01, Y0.99 4-phenylpyridine-N-oxide
tris dibenzoylmethanato Dy0.01, Y0.99 1-methylimidazole
tris dibenzoylmethanato Dy0.01, Y0.99 triphenylphosphine oxide
tris dibenzoylmethanato Dy0.01, Y0.99 2,2-bipyridyl
tris dibenzoylmethanato Dy0.01, Y0.99 2,2-bipyridyl-N,N-dioxide
tris dibenzoylmethanato Dy0.01, Y0.99 phenanthroline
tris dibenzoylmethanato Dy0.01, Y0.99 bathocuproine
tris dibenzoylmethanato Dy0.01, Y0.99 bathophenanthroline
tris thenoyltrifluoroacetonato Dy0.01, Y0.99 dimethylaminopyridine
tris thenoyltrifluoroacetonato Dy0.01, Y0.99 4-picoline-N-oxide
tris thenoyltrifluoroacetonato Dy0.01, Y0.99 4-phenylpyridine
tris thenoyltrifluoroacetonato Dy0.01, Y0.99 4-phenylpyridine-N-oxide
tris thenoyltrifluoroacetonato Dy0.01, Y0.99 1-methylimidazole
tris thenoyltrifluoroacetonato Dy0.01, Y0.99 triphenylphosphine oxide
tris thenoyltrifluoroacetonato Dy0.01, Y0.99 2,2-bipyridyl
tris thenoyltrifluoroacetonato Dy0.01, Y0.99 2,2-bipyridyl-N,N-dioxide
tris thenoyltrifluoroacetonato Dy0.01, Y0.99 phenanthroline
tris thenoyltrifluoroacetonato Dy0.01, Y0.99 bathocuproine
tris thenoyltrifluoroacetonato Dy0.01, Y0.99 bathophenanthroline
tris 2,2,6,6-tetramethylheptanedionato Dy0.01, Y0.99 dimethylaminopyridine
tris 2,2,6,6-tetramethylheptanedionato Dy0.01, Y0.99 4-picoline-N-oxide
tris 2,2,6,6-tetramethylheptanedionato Dy0.01, Y0.99 4-phenylpyridine
tris 2,2,6,6-tetramethylheptanedionato Dy0.01, Y0.99 4-phenylpyridine-N-oxide
tris 2,2,6,6-tetramethylheptanedionato Dy0.01, Y0.99 1-methylimidazole
tris 2,2,6,6-tetramethylheptanedionato Dy0.01, Y0.99 triphenylphosphine oxide
tris 2,2,6,6-tetramethylheptanedionato Dy0.01, Y0.99 2,2-bipyridyl
tris 2,2,6,6-tetramethylheptanedionato Dy0.01, Y0.99 2,2-bipyridyl-N,N-dioxide
tris 2,2,6,6-tetramethylheptanedionato Dy0.01, Y0.99 phenanthroline
tris 2,2,6,6-tetramethylheptanedionato Dy0.01, Y0.99 bathocuproine
tris 2,2,6,6-tetramethylheptanedionato Dy0.01, Y0.99 bathophenanthroline
tris 3-methylpentane-2,4-dionato Dy0.01, Y0.99 dimethylaminopyridine
tris 3-methylpentane-2,4-dionato Dy0.01, Y0.99 4-picoline-N-oxide
tris 3-methylpentane-2,4-dionato Dy0.01, Y0.99 4-phenylpyridine
tris 3-methylpentane-2,4-dionato Dy0.01, Y0.99 4-phenylpyridine-N-oxide
tris 3-methylpentane-2,4-dionato Dy0.01, Y0.99 1-methylimidazole
tris 3-methylpentane-2,4-dionato Dy0.01, Y0.99 triphenylphosphine oxide
tris 3-methylpentane-2,4-dionato Dy0.01, Y0.99 2,2-bipyridyl
tris 3-methylpentane-2,4-dionato Dy0.01, Y0.99 2,2-bipyridyl-N,N-dioxide
tris 3-methylpentane-2,4-dionato Dy0.01, Y0.99 phenanthroline
tris 3-methylpentane-2,4-dionato Dy0.01, Y0.99 bathocuproine
tris 3-methylpentane-2,4-dionato Dy0.01, Y0.99 bathophenanthroline
tris 3-ethylpentane-2,4-dionato Dy0.01, Y0.99 dimethylaminopyridine
tris 3-ethylpentane-2,4-dionato Dy0.01, Y0.99 4-picoline-N-oxide
tris 3-ethylpentane-2,4-dionato Dy0.01, Y0.99 4-phenylpyridine
tris 3-ethylpentane-2,4-dionato Dy0.01, Y0.99 4-phenylpyridine-N-oxide
tris 3-ethylpentane-2,4-dionato Dy0.01, Y0.99 1-methylimidazole
tris 3-ethylpentane-2,4-dionato Dy0.01, Y0.99 triphenylphosphine oxide
tris 3-ethylpentane-2,4-dionato Dy0.01, Y0.99 2,2-bipyridyl
tris 3-ethylpentane-2,4-dionato Dy0.01, Y0.99 2,2-bipyridyl-N,N-dioxide
tris 3-ethylpentane-2,4-dionato Dy0.01, Y0.99 phenanthroline
tris 3-ethylpentane-2,4-dionato Dy0.01, Y0.99 bathocuproine
tris 3-ethylpentane-2,4-dionato Dy0.01, Y0.99 bathophenanthroline
tris pivaloyltrifluoroacetonato Dy0.01, Y0.99 dimethylaminopyridine
tris pivaloyltrifluoroacetonato Dy0.01, Y0.99 4-picoline-N-oxide
tris pivaloyltrifluoroacetonato Dy0.01, Y0.99 4-phenylpyridine
tris pivaloyltrifluoroacetonato Dy0.01, Y0.99 4-phenylpyridine-N-oxide
tris pivaloyltrifluoroacetonato Dy0.01, Y0.99 1-methylimidazole
tris pivaloyltrifluoroacetonato Dy0.01, Y0.99 triphenylphosphine oxide
tris pivaloyltrifluoroacetonato Dy0.01, Y0.99 2,2-bipyridyl
tris pivaloyltrifluoroacetonato Dy0.01, Y0.99 2,2-bipyridyl-N,N-dioxide
tris pivaloyltrifluoroacetonato Dy0.01, Y0.99 phenanthroline
tris pivaloyltrifluoroacetonato Dy0.01, Y0.99 bathocuproine
tris pivaloyltrifluoroacetonato Dy0.01, Y0.99 bathophenanthroline
tris trifluoroacetylacetonato Dy0.01, Y0.99 dimethylaminopyridine
tris trifluoroacetylacetonato Dy0.01, Y0.99 4-picoline-N-oxide
tris trifluoroacetylacetonato Dy0.01, Y0.99 4-phenylpyridine
tris trifluoroacetylacetonato Dy0.01, Y0.99 4-phenylpyridine-N-oxide
tris trifluoroacetylacetonato Dy0.01, Y0.99 1-methylimidazole tris trifluoroacetylacetonato Dy0.01, Y0.99 triphenylphosphine oxide
tris trifluoroacetylacetonato Dy0.01, Y0.99 2,2-bipyridyl
tris trifluoroacetylacetonato Dy0.01, Y0.99 2,2-bipyridyl-N,N-dioxide
tris trifluoroacetylacetonato Dy0.01, Y0.99 phenanthroline
tris trifluoroacetylacetonato Dy0.01, Y0.99 bathocuproine
tris trifluoroacetylacetonato Dy0.01, Y0.99 bathophenanthroline
tris hexafluoroacetylacetonato Dy0.01, Y0.99 dimethylaminopyridine
tris hexafluoroacetylacetonato Dy0.01, Y0.99 4-picoline-N-oxide
tris hexafluoroacetylacetonato Dy0.01, Y0.99 4-phenylpyridine
tris hexafluoroacetylacetonato Dy0.01, Y0.99 4-phenylpyridine-N-oxide
tris hexafluoroacetylacetonato Dy0.01, Y0.99 1-methylimidazole
tris hexafluoroacetylacetonato Dy0.01, Y0.99 triphenylphosphine oxide
tris hexafluoroacetylacetonato Dy0.01, Y0.99 2,2-bipyridyl
tris hexafluoroacetylacetonato Dy0.01, Y0.99 2,2-bipyridyl-N,N-dioxide
tris hexafluoroacetylacetonato Dy0.01, Y0.99 phenanthroline
tris hexafluoroacetylacetonato Dy0.01, Y0.99 bathocuproine
tris hexafluoroacetylacetonato Dy0.01, Y0.99 bathophenanthroline
tris 6,6,7,7,8,8,8-heptafluoro-2,2-dimethyloctanedionato Dy0.01, Y0.99 dimethylaminopyridine
tris 6,6,7,7,8,8,8-heptafluoro-2,2-dimethyloctanedionato Dy0.01, Y0.99 4-picoline-N-oxide
tris 6,6,7,7,8,8,8-heptafluoro-2,2-dimethyloctanedionato Dy0.01, Y0.99 4-phenylpyridine
tris 6,6,7,7,8,8,8-heptafluoro-2,2-dimethyloctanedionato Dy0.01, Y0.99 4-phenylpyridine-N-oxide
tris 6,6,7,7,8,8,8-heptafluoro-2,2-dimethyloctanedionato Dy0.01, Y0.99 1-methylimidazole
tris 6,6,7,7,8,8,8-heptafluoro-2,2-dimethyloctanedionato Dy0.01, Y0.99 triphenylphosphine oxide
tris 6,6,7,7,8,8,8-heptafluoro-2,2-dimethyloctanedionato Dy0.01, Y0.99 2,2-bipyridyl
tris 6,6,7,7,8,8,8-heptafluoro-2,2-dimethyloctanedionato Dy0.01, Y0.99 2,2-bipyridyl-N,N-dioxide
tris 6,6,7,7,8,8,8-heptafluoro-2,2-dimethyloctanedionato Dy0.01, Y0.99 phenanthroline
tris 6,6,7,7,8,8,8-heptafluoro-2,2-dimethyloctanedionato Dy0.01, Y0.99 bathocuproine
tris 6,6,7,7,8,8,8-heptafluoro-2,2-dimethyloctanedionato Dy0.01, Y0.99 bathophenanthroline
tris 1-phenyl-1,3-butanedionato Dy0.01, Y0.99 dimethylaminopyridine
tris 1-phenyl-1,3-butanedionato Dy0.01, Y0.99 4-picoline-N-oxide
tris 1-phenyl-1,3-butanedionato Dy0.01, Y0.99 4-phenylpyridine
tris 1-phenyl-1,3-butanedionato Dy0.01, Y0.99 4-phenylpyridine-N-oxide
tris 1-phenyl-1,3-butanedionato Dy0.01, Y0.99 1-methylimidazole
tris 1-phenyl-1,3-butanedionato Dy0.01, Y0.99 triphenylphosphine oxide
tris 1-phenyl-1,3-butanedionato Dy0.01, Y0.99 2,2-bipyridyl
tris 1-phenyl-1,3-butanedionato Dy0.01, Y0.99 2,2-bipyridyl-N,N-dioxide
tris 1-phenyl-1,3-butanedionato Dy0.01, Y0.99 phenanthroline
tris 1-phenyl-1,3-butanedionato Dy0.01, Y0.99 bathocuproine
tris 1-phenyl-1,3-butanedionato Dy0.01, Y0.99 bathophenanthroline
tris acetylacetonato Sm0.5, La0.5 dimethylaminopyridine
tris acetylacetonato Sm0.5, La0.5 4-picoline-N-oxide
tris acetylacetonato Sm0.5, La0.5 4-phenylpyridine
tris acetylacetonato Sm0.5, La0.5 4-phenylpyridine-N-oxide
tris acetylacetonato Sm0.5, La0.5 1-methylimidazole
tris acetylacetonato Sm0.5, La0.5 triphenylphosphine oxide
tris acetylacetonato Sm0.5, La0.5 2,2-bipyridyl
tris acetylacetonato Sm0.5, La0.5 2,2-bipyridyl-N,N-dioxide
tris acetylacetonato Sm0.5, La0.5 phenanthroline
tris acetylacetonato Sm0.5, La0.5 bathocuproine
tris acetylacetonato Sm0.5, La0.5 bathophenanthroline
tris dibenzoylmethanato Sm0.5, La0.5 dimethylaminopyridine
tris dibenzoylmethanato Sm0.5, La0.5 4-picoline-N-oxide
tris dibenzoylmethanato Sm0.5, La0.5 4-phenylpyridine
tris dibenzoylmethanato Sm0.5, La0.5 4-phenylpyridine-N-oxide
tris dibenzoylmethanato Sm0.5, La0.5 1-methylimidazole
tris dibenzoylmethanato Sm0.5, La0.5 triphenylphosphine oxide
tris dibenzoylmethanato Sm0.5, La0.5 2,2-bipyridyl
tris dibenzoylmethanato Sm0.5, La0.5 2,2-bipyridyl-N,N-dioxide
tris dibenzoylmethanato Sm0.5, La0.5 phenanthroline
tris dibenzoylmethanato Sm0.5, La0.5 bathocuproine
tris dibenzoylmethanato Sm0.5, La0.5 bathophenanthroline
tris thenoyltrifluoroacetonato Sm0.5, La0.5 dimethylaminopyridine
tris thenoyltrifluoroacetonato Sm0.5, La0.5 4-picoline-N-oxide
tris thenoyltrifluoroacetonato Sm0.5, La0.5 4-phenylpyridine
tris thenoyltrifluoroacetonato Sm0.5, La0.5 4-phenylpyridine-N-oxide
tris thenoyltrifluoroacetonato Sm0.5, La0.5' 1-methylimidazole
tris thenoyltrifluoroacetonato Sm0.5, La0.5 triphenylphosphine oxide
tris thenoyltrifluoroacetonato Sm0.5, La0.5 2,2-bipyridyl
tris thenoyltrifluoroacetonato Sm0.5, La0.5 2,2-bipyridyl-N,N-dioxide
tris thenoyltrifluoroacetonato Sm0.5, La0.5 phenanthroline
tris thenoyltrifluoroacetonato Sm0.5, La0.5 bathocuproine
tris thenoyltrifluoroacetonato Sm0.5, La0.5 bathophenanthroline
tris 2,2,6,6-tetramethylheptanedionato Sm0.5, La0.5 dimethylaminopyridine
tris 2,2,6,6-tetramethylheptanedionato Sm0.5, La0.5 4-picoline-N-oxide
tris 2,2,6,6-tetramethylheptanedionato Sm0.5, La0.5 4-phenylpyridine
tris 2,2,6,6-tetramethylheptanedionato Sm0.5, La0.5 4-phenylpyridine-N-oxide
tris 2,2,6,6-tetramethylheptanedionato Sm0.5, La0.5 1-methylimidazole
tris 2,2,6,6-tetramethylheptanedionato Sm0.5, La0.5 triphenylphosphine oxide
tris 2,2,6,6-tetramethylheptanedionato Sm0.5, La0.5 2,2-bipyridyl tris 2,2,6,6-tetramethylheptanedionato Sm0.5, La0.5 2,2-bipyridyl-N,N-dioxide
tris 2,2,6,6-tetramethylheptanedionato Sm0.5, La0.5 phenanthroline
tris 2,2,6,6-tetramethylheptanedionato Sm0.5, La0.5 bathocuproine
tris 2,2,6,6-tetramethylheptanedionato Sm0.5, La0.5 bathophenanthroline
tris 3-methylpentane-2,4-dionato Sm0.5, La0.5 dimethylaminopyridine
tris 3-methylpentane-2,4-dionato Sm0.5, La0.5 4-picoline-N-oxide
tris 3-methylpentane-2,4-dionato Sm0.5, La0.5 4-phenylpyridine
tris 3-methylpentane-2,4-dionato Sm0.5, La0.5 4-phenylpyridine-N-oxide
tris 3-methylpentane-2,4-dionato Sm0.5, La0.5 1-methylimidazole
tris 3-methylpentane-2,4-dionato Sm0.5, La0.5 triphenylphosphine oxide
tris 3-methylpentane-2,4-dionato Sm0.5, La0.5 2,2-bipyridyl
tris 3-methylpentane-2,4-dionato Sm0.5, La0.5 2,2-bipyridyl-N,N-dioxide
tris 3-methylpentane-2,4-dionato Sm0.5, La0.5 phenanthroline
tris 3-methylpentane-2,4-dionato Sm0.5, La0.5 bathocuproine
tris 3-methylpentane-2,4-dionato Sm0.5, La0.5 bathophenanthroline
tris 3-ethylpentane-2,4-dionato Sm0.5, La0.5 dimethylaminopyridine
tris 3-ethylpentane-2,4-dionato Sm0.5, La0.5 4-picoline-N-oxide
tris 3-ethylpentane-2,4-dionato Sm0.5, La0.5 4-phenylpyridine
tris 3-ethylpentane-2,4-dionato Sm0.5, La0.5 4-phenylpyridine-N-oxide
tris 3-ethylpentane-2,4-dionato Sm0.5, La0.5 1-methylimidazole
tris 3-ethylpentane-2,4-dionato Sm0.5, La0.5 triphenylphosphine oxide
tris 3-ethylpentane-2,4-dionato Sm0.5, La0.5 2,2-bipyridyl
tris 3-ethylpentane-2,4-dionato Sm0.5, La0.5 2,2-bipyridyl-N,N-dioxide
tris 3-ethylpentane-2,4-dionato Sm0.5, La0.5 phenanthroline
tris 3-ethylpentane-2,4-dionato Sm0.5, La0.5 bathocuproine
tris 3-ethylpentane-2,4-dionato Sm0.5, La0.5 bathophenanthroline
tris pivaloyltrifluoroacetonato Sm0.5, La0.5 dimethylaminopyridine
tris pivaloyltrifluoroacetonato Sm0.5, La0.5 4-picoline-N-oxide
tris pivaloyltrifluoroacetonato Sm0.5, La0.5 4-phenylpyridine
tris pivaloyltrifluoroacetonato Sm0.5, La0.5 4-phenylpyridine-N-oxide
tris pivaloyltrifluoroacetonato Sm0.5, La0.5 1-methylimidazole
tris pivaloyltrifluoroacetonato Sm0.5, La0.5 triphenylphosphine oxide
tris pivaloyltrifluoroacetonato Sm0.5, La0.5 2,2-bipyridyl
tris pivaloyltrifluoroacetonato Sm0.5, La0.5 2,2-bipyridyl-N,N-dioxide
tris pivaloyltrifluoroacetonato Sm0.5, La0.5 phenanthroline
tris pivaloyltrifluoroacetonato Sm0.5, La0.5 bathocuproine
tris pivaloyltrifluoroacetonato Sm0.5, La0.5 bathophenanthroline
tris trifluoroacetylacetonato Sm0.5, La0.5 dimethylaminopyridine
tris trifluoroacetylacetonato Sm0.5, La0.5 4-picoline-N-oxide
tris trifluoroacetylacetonato Sm0.5, La0.5 4-phenylpyridine
tris trifluoroacetylacetonato Sm0.5, La0.5 4-phenylpyridine-N-oxide
tris trifluoroacetylacetonato Sm0.5, La0.5 1-methylimidazole
tris trifluoroacetylacetonato Sm0.5, La0.5 triphenylphosphine oxide
tris trifluoroacetylacetonato Sm0.5, La0.5 2,2-bipyridyl
tris trifluoroacetylacetonato Sm0.5, La0.5 2,2-bipyridyl-N,N-dioxide
tris trifluoroacetylacetonato Sm0.5, La0.5 phenanthroline
tris trifluoroacetylacetonato Sm0.5, La0.5 bathocuproine
tris trifluoroacetylacetonato Sm0.5, La0.5 bathophenanthroline
tris hexafluoroacetylacetonato Sm0.5, La0.5 dimethylaminopyridine
tris hexafluoroacetylacetonato Sm0.5, La0.5 4-picoline-N-oxide
tris hexafluoroacetylacetonato Sm0.5, La0.5 4-phenylpyridine
tris hexafluoroacetylacetonato Sm0.5, La0.5 4-phenylpyridine-N-oxide
tris hexafluoroacetylacetonato Sm0.5, La0.5 1-methylimidazole
tris hexafluoroacetylacetonato Sm0.5, La0.5 triphenylphosphine oxide
tris hexafluoroacetylacetonato Sm0.5, La0.5 2,2-bipyridyl
tris hexafluoroacetylacetonato Sm0.5, La0.5 2,2-bipyridyl-N,N-dioxide
tris hexafluoroacetylacetonato Sm0.5, La0.5 phenanthroline
tris hexafluoroacetylacetonato Sm0.5, La0.5 bathocuproine
tris hexafluoroacetylacetonato Sm0.5, La0.5 bathophenanthroline
tris 6,6,7,7,8,8,8-heptafluoro-2,2-dimethyloctanedionato Sm0.5, La0.5 dimethylaminopyridine
tris 6,6,7,7,8,8,8-heptafluoro-2,2-dimethyloctanedionato Sm0.5, La0.5 4-picoline-N-oxide
tris 6,6,7,7,8,8,8-heptafluoro-2,2-dimethyloctanedionato Sm0.5, La0.5 4-phenylpyridine
tris 6,6,7,7,8,8,8-heptafluoro-2,2-dimethyloctanedionato Sm0.5, La0.5 4-phenylpyridine-N-oxide
tris 6,6,7,7,8,8,8-heptafluoro-2,2-dimethyloctanedionato Sm0.5, La0.5 1-methylimidazole
tris 6,6,7,7,8,8,8-heptafluoro-2,2-dimethyloctanedionato Sm0.5, La0.5 triphenylphosphine oxide
tris 6,6,7,7,8,8,8-heptafluoro-2,2-dimethyloctanedionato Sm0.5, La0.5 2,2-bipyridyl
tris 6,6,7,7,8,8,8-heptafluoro-2,2-dimethyloctanedionato Sm0.5, La0.5 2,2-bipyridyl-N,N-dioxide
tris 6,6,7,7,8,8,8-heptafluoro-2,2-dimethyloctanedionato Sm0.5, La0.5 phenanthroline
tris 6,6,7,7,8,8,8-heptafluoro-2,2-dimethyloctanedionato Sm0.5, La0.5 bathocuproine
tris 6,6,7,7,8,8,8-heptafluoro-2,2-dimethyloctanedionato Sm0.5, La0.5 bathophenanthroline
tris 1-phenyl-1,3-butanedionato Sm0.5, La0.5 dimethylaminopyridine
tris 1-phenyl-1,3-butanedionato Sm0.5, La0.5 4-picoline-N-oxide
tris 1-phenyl-1,3-butanedionato Sm0.5, La0.5 4-phenylpyridine tris 1-phenyl-1,3-butanedionato Sm0.5, La0.5 4-phenylpyridine-N-oxide tris 1-phenyl-1,3-butanedionato Sm0.5, La0.5 1-methylimidazole tris 1-phenyl-1,3-butanedionato Sm0.5, La0.5 triphenylphosphine oxide tris 1-phenyl-1,3-butanedionato Sm0.5, La0.5 2,2-bipyridyl tris 1-phenyl-1,3-butanedionato Sm0.5, La0.5 2,2-bipyridyl-N,N-dioxide tris 1-phenyl-1,3-butanedionato Sm0.5, La0.5 phenanthroline tris 1-phenyl-1,3-butanedionato Sm0.5, La0.5 bathocuproine tris 1-phenyl-1,3-butanedionato Sm0.5, La0.5 bathophenanthroline tris acetylacetonato Sm0.2, La0.8 dimethylaminopyridine tris acetylacetonato Sm0.2, La0.8 4-picoline-N-oxide tris acetylacetonato Sm0.2, La0.8 4-phenylpyridine tris acetylacetonato Sm0.2, La0.8 4-phenylpyridine-N-oxide tris acetylacetonato Sm0.2, La0.8 1-methylimidazole tris acetylacetonato Sm0.2, La0.8 triphenylphosphine oxide tris acetylacetonato Sm0.2, La0.8 2,2-bipyridyl tris acetylacetonato Sm0.2, La0.8 2,2-bipyridyl-N,N-dioxide tris acetylacetonato Sm0.2, La0.8 phenanthroline tris acetylacetonato Sm0.2, La0.8 bathocuproine tris acetylacetonato Sm0.2, La0.8 bathophenanthroline tris dibenzoylmethanato Sm0.2, La0.8 dimethylaminopyridine tris dibenzoylmethanato Sm0.2, La0.8 4-picoline-N-oxide tris dibenzoylmethanato Sm0.2, La0.8 4-phenylpyridine tris dibenzoylmethanato Sm0.2, La0.8 4-phenylpyridine-N-oxide tris dibenzoylmethanato Sm0.2, La0.8 1-methylimidazole tris dibenzoylmethanato Sm0.2, La0.8 triphenylphosphine oxide tris dibenzoylmethanato Sm0.2, La0.8 2,2-bipyridyl tris dibenzoylmethanato Sm0.2, La0.8 2,2-bipyridyl-N,N-dioxide tris dibenzoylmethanato Sm0.2, La0.8 phenanthroline tris dibenzoylmethanato Sm0.2, La0.8 bathocuproine tris dibenzoylmethanato Sm0.2, La0.8 bathophenanthroline tris thenoyltrifluoroacetonato Sm0.2, La0.8 dimethylaminopyridine tris thenoyltrifluoroacetonato Sm0.2, La0.8 4-picoline-N-oxide tris thenoyltrifluoroacetonato Sm0.2, La0.8 4-phenylpyridine tris thenoyltrifluoroacetonato Sm0.2, La0.8 4-phenylpyridine-N-oxide tris thenoyltrifluoroacetonato Sm0.2, La0.8 1-methylimidazole tris thenoyltrifluoroacetonato Sm0.2, La0.8 triphenylphosphine oxide tris thenoyltrifluoroacetonato Sm0.2, La0.8 2,2-bipyridyl tris thenoyltrifluoroacetonato Sm0.2, La0.8 2,2-bipyridyl-N,N-dioxide tris thenoyltrifluoroacetonato Sm0.2, La0.8 phenanthroline tris thenoyltrifluoroacetonato Sm0.2, La0.8 bathocuproine tris thenoyltrifluoroacetonato Sm0.2, La0.8 bathophenanthroline tris 2,2,6,6-tetramethylheptanedionato Sm0.2, La0.8 dimethylaminopyridine tris 2,2,6,6-tetramethylheptanedionato Sm0.2, La0.8 4-picoline-N-oxide tris 2,2,6,6-tetramethylheptanedionato Sm0.2, La0.8 4-phenylpyridine tris 2,2,6,6-tetramethylheptanedionato Sm0.2, La0.8 4-phenylpyridine-N-oxide tris 2,2,6,6-tetramethylheptanedionato Sm0.2, La0.8 1-methylimidazole tris 2,2,6,6-tetramethylheptanedionato Sm0.2, La0.8 triphenylphosphine oxide tris 2,2,6,6-tetramethylheptanedionato Sm0.2, La0.8 2,2-bipyridyl tris 2,2,6,6-tetramethylheptanedionato Sm0.2, La0.8 2,2-bipyridyl-N,N-dioxide tris 2,2,6,6-tetramethylheptanedionato Sm0.2, La0.8 phenanthroline tris 2,2,6,6-tetramethylheptanedionato Sm0.2, La0.8 bathocuproine tris 2,2,6,6-tetramethylheptanedionato Sm0.2, La0.8 bathophenanthroline tris 3-methylpentane-2,4-dionato Sm0.2, La0.8 dimethylaminopyridine tris 3-methylpentane-2,4-dionato Sm0.2, La0.8 4-picoline-N-oxide tris 3-methylpentane-2,4-dionato Sm0.2, La0.8 4-phenylpyridine tris 3-methylpentane-2,4-dionato Sm0.2, La0.8 4-phenylpyridine-N-oxide tris 3-methylpentane-2,4-dionato Sm0.2, La0.8 1-methylimidazole tris 3-methylpentane-2,4-dionato Sm0.2, La0.8 triphenylphosphine oxide tris 3-methylpentane-2,4-dionato Sm0.2, La0.8 2,2-bipyridyl tris 3-methylpentane-2,4-dionato Sm0.2, La0.8 2,2-bipyridyl-N,N-dioxide tris 3-methylpentane-2,4-dionato Sm0.2, La0.8 phenanthroline tris 3-methylpentane-2,4-dionato Sm0.2, La0.8 bathocuproine tris 3-methylpentane-2,4-dionato Sm0.2, La0.8 bathophenanthroline tris 3-ethylpentane-2,4-dionato Sm0.2, La0.8 dimethylaminopyridine tris 3-ethylpentane-2,4-dionato Sm0.2, La0.8 4-picoline-N-oxide tris 3-ethylpentane-2,4-dionato Sm0.2, La0.8 4-phenylpyridine tris 3-ethylpentane-2,4-dionato Sm0.2, La0.8 4-phenylpyridine-N-oxide tris 3-ethylpentane-2,4-dionato Sm0.2, La0.8 1-methylimidazole tris 3-ethylpentane-2,4-dionato Sm0.2, La0.8 triphenylphosphine oxide tris 3-ethylpentane-2,4-dionato Sm0.2, La0.8 2,2-bipyridyl tris 3-ethylpentane-2,4-dionato Sm0.2, La0.8 2,2-bipyridyl-N,N-dioxide tris 3-ethylpentane-2,4-dionato Sm0.2, La0.8 phenanthroline tris 3-ethylpentane-2,4-dionato Sm0.2, La0.8 bathocuproine tris 3-ethylpentane-2,4-dionato Sm0.2, La0.8 bathophenanthroline tris pivaloyltrifluoroacetonato Sm0.2, La0.8 dimethylaminopyridine tris pivaloyltrifluoroacetonato Sm0.2, La0.8 4-picoline-N-oxide tris pivaloyltrifluoroacetonato Sm0.2, La0.8 4-phenylpyridine tris pivaloyltrifluoroacetonato Sm0.2, La0.8 4-phenylpyridine-N-oxide tris pivaloyltrifluoroacetonato Sm0.2, La0.8 1-methylimidazole
tris pivaloyltrifluoroacetonato Sm0.2, La0.8 triphenylphosphine oxide
tris pivaloyltrifluoroacetonato Sm0.2, La0.8 2,2-bipyridyl
tris pivaloyltrifluoroacetonato Sm0.2, La0.8 2,2-bipyridyl-N,N-dioxide
tris pivaloyltrifluoroacetonato Sm0.2, La0.8 phenanthroline
tris pivaloyltrifluoroacetonato Sm0.2, La0.8 bathocuproine
tris pivaloyltrifluoroacetonato Sm0.2, La0.8 bathophenanthroline
tris trifluoroacetylacetonato Sm0.2, La0.8 dimethylaminopyridine
tris trifluoroacetylacetonato Sm0.2, La0.8 4-picoline-N-oxide
tris trifluoroacetylacetonato Sm0.2, La0.8 4-phenylpyridine
tris trifluoroacetylacetonato Sm0.2, La0.8 4-phenylpyridine-N-oxide
tris trifluoroacetylacetonato Sm0.2, La0.8 1-methylimidazole
tris trifluoroacetylacetonato Sm0.2, La0.8 triphenylphosphine oxide
tris trifluoroacetylacetonato Sm0.2, La0.8 2,2-bipyridyl
tris trifluoroacetylacetonato Sm0.2, La0.8 2,2-bipyridyl-N,N-dioxide
tris trifluoroacetylacetonato Sm0.2, La0.8 phenanthroline
tris trifluoroacetylacetonato Sm0.2, La0.8 bathocuproine
tris trifluoroacetylacetonato Sm0.2, La0.8 bathophenanthroline
tris hexafluoroacetylacetonato Sm0.2, La0.8 dimethylaminopyridine
tris hexafluoroacetylacetonato Sm0.2, La0.8 4-picoline-N-oxide
tris hexafluoroacetylacetonato Sm0.2, La0.8 4-phenylpyridine
tris hexafluoroacetylacetonato Sm0.2, La0.8 4-phenylpyridine-N-oxide
tris hexafluoroacetylacetonato Sm0.2, La0.8 1-methylimidazole
tris hexafluoroacetylacetonato Sm0.2, La0.8 triphenylphosphine oxide
tris hexafluoroacetylacetonato Sm0.2, La0.8 2,2-bipyridyl
tris hexafluoroacetylacetonato Sm0.2, La0.8 2,2-bipyridyl-N,N-dioxide
tris hexafluoroacetylacetonato Sm0.2, La0.8 phenanthroline
tris hexafluoroacetylacetonato Sm0.2, La0.8 bathocuproine
tris hexafluoroacetylacetonato Sm0.2, La0.8 bathophenanthroline
tris 6,6,7,7,8,8,8-heptafluoro-2,2-dimethyloctanedionato Sm0.2, La0.8 dimethylaminopyridine
tris 6,6,7,7,8,8,8-heptafluoro-2,2-dimethyloctanedionato Sm0.2, La0.8 4-picoline-N-oxide
tris 6,6,7,7,8,8,8-heptafluoro-2,2-dimethyloctanedionato Sm0.2, La0.8 4-phenylpyridine
tris 6,6,7,7,8,8,8-heptafluoro-2,2-dimethyloctanedionato Sm0.2, La0.8 4-phenylpyridine-N-oxide
tris 6,6,7,7,8,8,8-heptafluoro-2,2-dimethyloctanedionato Sm0.2, La0.8 1-methylimidazole
tris 6,6,7,7,8,8,8-heptafluoro-2,2-dimethyloctanedionato Sm0.2, La0.8 triphenylphosphine oxide
tris 6,6,7,7,8,8,8-heptafluoro-2,2-dimethyloctanedionato Sm0.2, La0.8 2,2-bipyridyl
tris 6,6,7,7,8,8,8-heptafluoro-2,2-dimethyloctanedionato Sm0.2, La0.8 2,2-bipyridyl-N,N-dioxide
tris 6,6,7,7,8,8,8-heptafluoro-2,2-dimethyloctanedionato Sm0.2, La0.8 phenanthroline
tris 6,6,7,7,8,8,8-heptafluoro-2,2-dimethyloctanedionato Sm0.2, La0.8 bathocuproine
tris 6,6,7,7,8,8,8-heptafluoro-2,2-dimethyloctanedionato Sm0.2, La0.8 bathophenanthroline
tris 1-phenyl-1,3-butanedionato Sm0.2, La0.8 dimethylaminopyridine
tris 1-phenyl-1,3-butanedionato Sm0.2, La0.8 4-picoline-N-oxide
tris 1-phenyl-1,3-butanedionato Sm0.2, La0.8 4-phenylpyridine
tris 1-phenyl-1,3-butanedionato Sm0.2, La0.8 4-phenylpyridine-N-oxide
tris 1-phenyl-1,3-butanedionato Sm0.2, La0.8 1-methylimidazole
tris 1-phenyl-1,3-butanedionato Sm0.2, La0.8 triphenylphosphine oxide
tris 1-phenyl-1,3-butanedionato Sm0.2, La0.8 2,2-bipyridyl
tris 1-phenyl-1,3-butanedionato Sm0.2, La0.8 2,2-bipyridyl-N,N-dioxide
tris 1-phenyl-1,3-butanedionato Sm0.2, La0.8 phenanthroline
tris 1-phenyl-1,3-butanedionato Sm0.2, La0.8 bathocuproine
tris 1-phenyl-1,3-butanedionato Sm0.2, La0.8 bathophenanthroline
tris acetylacetonato Sm0.1, La0.9 dimethylaminopyridine
tris acetylacetonato Sm0.1, La0.9 4-picoline-N-oxide
tris acetylacetonato Sm0.1, La0.9 4-phenylpyridine
tris acetylacetonato Sm0.1, La0.9 4-phenylpyridine-N-oxide
tris acetylacetonato Sm0.1, La0.9 1-methylimidazole
tris acetylacetonato Sm0.1, La0.9 triphenylphosphine oxide
tris acetylacetonato Sm0.1, La0.9 2,2-bipyridyl
tris acetylacetonato Sm0.1, La0.9 2,2-bipyridyl-N,N-dioxide
tris acetylacetonato Sm0.1, La0.9 phenanthroline
tris acetylacetonato Sm0.1, La0.9 bathocuproine
tris acetylacetonato Sm0.1, La0.9 bathophenanthroline
tris dibenzoylmethanato Sm0.1, La0.9 dimethylaminopyridine
tris dibenzoylmethanato Sm0.1, La0.9 4-picoline-N-oxide
tris dibenzoylmethanato Sm0.1, La0.9 4-phenylpyridine
tris dibenzoylmethanato Sm0.1, La0.9 4-phenylpyridine-N-oxide
tris dibenzoylmethanato Sm0.1, La0.9 1-methylimidazole
tris dibenzoylmethanato Sm0.1, La0.9 triphenylphosphine oxide
tris dibenzoylmethanato Sm0.1, La0.9 2,2-bipyridyl
tris dibenzoylmethanato Sm0.1, La0.9 2,2-bipyridyl-N,N-dioxide
tris dibenzoylmethanato Sm0.1, La0.9 phenanthroline
tris dibenzoylmethanato Sm0.1, La0.9 bathocuproine
tris dibenzoylmethanato Sm0.1, La0.9 bathophenanthroline
tris thenoyltrifluoroacetonato Sm0.1, La0.9 dimethylaminopyridine
tris thenoyltrifluoroacetonato Sm0.1, La0.9 4-picoline-N-oxide
tris thenoyltrifluoroacetonato Sm0.1, La0.9 4-phenylpyridine
tris thenoyltrifluoroacetonato Sm0.1, La0.9 4-phenylpyridine-N-oxide
tris thenoyltrifluoroacetonato Sm0.1, La0.9 1-methylimidazole
tris thenoyltrifluoroacetonato Sm0.1, La0.9 triphenylphosphine oxide
tris thenoyltrifluoroacetonato Sm0.1, La0.9 2,2-bipyridyl
tris thenoyltrifluoroacetonato Sm0.1, La0.9 2,2-bipyridyl-N,N-dioxide tris thenoyltrifluoroacetonato Sm0.1, La0.9 phenanthroline
tris thenoyltrifluoroacetonato Sm0.1, La0.9 bathocuproine
tris thenoyltrifluoroacetonato Sm0.1, La0.9 bathophenanthroline
tris 2,2,6,6-tetramethylheptanedionato Sm0.1, La0.9 dimethylaminopyridine
tris 2,2,6,6-tetramethylheptanedionato Sm0.1, La0.9 4-picoline-N-oxide
tris 2,2,6,6-tetramethylheptanedionato Sm0.1, La0.9 4-phenylpyridine
tris 2,2,6,6-tetramethylheptanedionato Sm0.1, La0.9 4-phenylpyridine-N-oxide
tris 2,2,6,6-tetramethylheptanedionato Sm0.1, La0.9 1-methylimidazole
tris 2,2,6,6-tetramethylheptanedionato Sm0.1, La0.9 triphenylphosphine oxide
tris 2,2,6,6-tetramethylheptanedionato Sm0.1, La0.9 2,2-bipyridyl
tris 2,2,6,6-tetramethylheptanedionato Sm0.1, La0.9 2,2-bipyridyl-N,N-dioxide
tris 2,2,6,6-tetramethylheptanedionato Sm0.1, La0.9 phenanthroline
tris 2,2,6,6-tetramethylheptanedionato Sm0.1, La0.9 bathocuproine
tris 2,2,6,6-tetramethylheptanedionato Sm0.1, La0.9 bathophenanthroline
tris 3-methylpentane-2,4-dionato Sm0.1, La0.9 dimethylaminopyridine
tris 3-methylpentane-2,4-dionato Sm0.1, La0.9 4-picoline-N-oxide
tris 3-methylpentane-2,4-dionato Sm0.1, La0.9 4-phenylpyridine
tris 3-methylpentane-2,4-dionato Sm0.1, La0.9 4-phenylpyridine-N-oxide
tris 3-methylpentane-2,4-dionato Sm0.1, La0.9 1-methylimidazole
tris 3-methylpentane-2,4-dionato Sm0.1, La0.9 triphenylphosphine oxide
tris 3-methylpentane-2,4-dionato Sm0.1, La0.9 2,2-bipyridyl
tris 3-methylpentane-2,4-dionato Sm0.1, La0.9 2,2-bipyridyl-N,N-dioxide
tris 3-methylpentane-2,4-dionato Sm0.1, La0.9 phenanthroline
tris 3-methylpentane-2,4-dionato Sm0.1, La0.9 bathocuproine
tris 3-methylpentane-2,4-dionato Sm0.1, La0.9 bathophenanthroline
tris 3-ethylpentane-2,4-dionato Sm0.1, La0.9 dimethylaminopyridine
tris 3-ethylpentane-2,4-dionato Sm0.1, La0.9 4-picoline-N-oxide
tris 3-ethylpentane-2,4-dionato Sm0.1, La0.9 4-phenylpyridine
tris 3-ethylpentane-2,4-dionato Sm0.1, La0.9 4-phenylpyridine-N-oxide
tris 3-ethylpentane-2,4-dionato Sm0.1, La0.9 1-methylimidazole
tris 3-ethylpentane-2,4-dionato Sm0.1, La0.9 triphenylphosphine oxide
tris 3-ethylpentane-2,4-dionato Sm0.1, La0.9 2,2-bipyridyl
tris 3-ethylpentane-2,4-dionato Sm0.1, La0.9 2,2-bipyridyl-N,N-dioxide
tris 3-ethylpentane-2,4-dionato Sm0.1, La0.9 phenanthroline
tris 3-ethylpentane-2,4-dionato Sm0.1, La0.9 bathocuproine
tris 3-ethylpentane-2,4-dionato Sm0.1, La0.9 bathophenanthroline
tris pivaloyltrifluoroacetonato Sm0.1, La0.9 dimethylaminopyridine
tris pivaloyltrifluoroacetonato Sm0.1, La0.9 4-picoline-N-oxide
tris pivaloyltrifluoroacetonato Sm0.1, La0.9 4-phenylpyridine
tris pivaloyltrifluoroacetonato Sm0.1, La0.9 4-phenylpyridine-N-oxide
tris pivaloyltrifluoroacetonato Sm0.1, La0.9 1-methylimidazole
tris pivaloyltrifluoroacetonato Sm0.1, La0.9 triphenylphosphine oxide
tris pivaloyltrifluoroacetonato Sm0.1, La0.9 2,2-bipyridyl
tris pivaloyltrifluoroacetonato Sm0.1, La0.9 2,2-bipyridyl-N,N-dioxide
tris pivaloyltrifluoroacetonato Sm0.1, La0.9 phenanthroline
tris pivaloyltrifluoroacetonato Sm0.1, La0.9 bathocuproine
tris pivaloyltrifluoroacetonato Sm0.1, La0.9 bathophenanthroline
tris trifluoroacetylacetonato Sm0.1, La0.9 dimethylaminopyridine
tris trifluoroacetylacetonato Sm0.1, La0.9 4-picoline-N-oxide
tris trifluoroacetylacetonato Sm0.1, La0.9 4-phenylpyridine
tris trifluoroacetylacetonato Sm0.1, La0.9 4-phenylpyridine-N-oxide
tris trifluoroacetylacetonato Sm0.1, La0.9 1-methylimidazole
tris trifluoroacetylacetonato Sm0.1, La0.9 triphenylphosphine oxide
tris trifluoroacetylacetonato Sm0.1, La0.9 2,2-bipyridyl
tris trifluoroacetylacetonato Sm0.1, La0.9 2,2-bipyridyl-N,N-dioxide
tris trifluoroacetylacetonato Sm0.1, La0.9 phenanthroline
tris trifluoroacetylacetonato Sm0.1, La0.9 bathocuproine
tris trifluoroacetylacetonato Sm0.1, La0.9 bathophenanthroline
tris hexafluoroacetylacetonato Sm0.1, La0.9 dimethylaminopyridine
tris hexafluoroacetylacetonato Sm0.1, La0.9 4-picoline-N-oxide
tris hexafluoroacetylacetonato Sm0.1, La0.9 4-phenylpyridine
tris hexafluoroacetylacetonato Sm0.1, La0.9 4-phenylpyridine-N-oxide
tris hexafluoroacetylacetonato Sm0.1, La0.9 1-methylimidazole
tris hexafluoroacetylacetonato Sm0.1, La0.9 triphenylphosphine oxide
tris hexafluoroacetylacetonato Sm0.1, La0.9 2,2-bipyridyl
tris hexafluoroacetylacetonato Sm0.1, La0.9 2,2-bipyridyl-N,N-dioxide
tris hexafluoroacetylacetonato Sm0.1, La0.9 phenanthroline
tris hexafluoroacetylacetonato Sm0.1, La0.9 bathocuproine
tris hexafluoroacetylacetonato Sm0.1, La0.9 bathophenanthroline
tris 6,6,7,7,8,8,8-heptafluoro-2,2-dimethyloctanedionato Sm0.1, La0.9 dimethylaminopyridine
tris 6,6,7,7,8,8,8-heptafluoro-2,2-dimethyloctanedionato Sm0.1, La0.9 4-picoline-N-oxide
tris 6,6,7,7,8,8,8-heptafluoro-2,2-dimethyloctanedionato Sm0.1, La0.9 4-phenylpyridine
tris 6,6,7,7,8,8,8-heptafluoro-2,2-dimethyloctanedionato Sm0.1, La0.9 4-phenylpyridine-N-oxide tris 6,6,7,7,8,8,8-heptafluoro-2,2-dimethyloctanedionato Sm0.1, La0.9 1-methylimidazole tris 6,6,7,7,8,8,8-heptafluoro-2,2-dimethyloctanedionato Sm0.1, La0.9 triphenylphosphine oxide tris 6,6,7,7,8,8,8-heptafluoro-2,2-dimethyloctanedionato Sm0.1, La0.9 2,2-bipyridyl tris 6,6,7,7,8,8,8-heptafluoro-2,2-dimethyloctanedionato Sm0.1, La0.9 2,2-bipyridyl-N,N-dioxide tris 6,6,7,7,8,8,8-heptafluoro-2,2-dimethyloctanedionato Sm0.1, La0.9 phenanthroline tris 6,6,7,7,8,8,8-heptafluoro-2,2-dimethyloctanedionato Sm0.1, La0.9 bathocuproine tris 6,6,7,7,8,8,8-heptafluoro-2,2-dimethyloctanedionato Sm0.1, La0.9 bathophenanthroline tris 1-phenyl-1,3-butanedionato Sm0.1, La0.9 dimethylaminopyridine tris 1-phenyl-1,3-butanedionato Sm0.1, La0.9 4-picoline-N-oxide tris 1-phenyl-1,3-butanedionato Sm0.1, La0.9 4-phenylpyridine tris 1-phenyl-1,3-butanedionato Sm0.1, La0.9 4-phenylpyridine-N-oxide tris 1-phenyl-1,3-butanedionato Sm0.1, La0.9 1-methylimidazole tris 1-phenyl-1,3-butanedionato Sm0.1, La0.9 triphenylphosphine oxide tris 1-phenyl-1,3-butanedionato Sm0.1, La0.9 2,2-bipyridyl tris 1-phenyl-1,3-butanedionato Sm0.1, La0.9 2,2-bipyridyl-N,N-dioxide tris 1-phenyl-1,3-butanedionato Sm0.1, La0.9 phenanthroline tris 1-phenyl-1,3-butanedionato Sm0.1, La0.9 bathocuproine tris 1-phenyl-1,3-butanedionato Sm0.1, La0.9 bathophenanthroline tris acetylacetonato Sm0.01, La0.99 dimethylaminopyridine tris acetylacetonato Sm0.01, La0.99 4-picoline-N-oxide tris acetylacetonato Sm0.01, La0.99 4-phenylpyridine tris acetylacetonato Sm0.01, La0.99 4-phenylpyridine-N-oxide tris acetylacetonato Sm0.01, La0.99 1-methylimidazole tris acetylacetonato Sm0.01, La0.99 triphenylphosphine oxide tris acetylacetonato Sm0.01, La0.99 2,2-bipyridyl tris acetylacetonato Sm0.01, La0.99 2,2-bipyridyl-N,N-dioxide tris acetylacetonato Sm0.01, La0.99 phenanthroline tris acetylacetonato Sm0.01, La0.99 bathocuproine tris acetylacetonato Sm0.01, La0.99 bathophenanthroline tris dibenzoylmethanato Sm0.01, La0.99 dimethylaminopyridine tris dibenzoylmethanato Sm0.01, La0.99 4-picoline-N-oxide tris dibenzoylmethanato Sm0.01, La0.99 4-phenylpyridine tris dibenzoylmethanato Sm0.01, La0.99 4-phenylpyridine-N-oxide tris dibenzoylmethanato Sm0.01, La0.99 1-methylimidazole tris dibenzoylmethanato Sm0.01, La0.99 triphenylphosphine oxide tris dibenzoylmethanato Sm0.01, La0.99 2,2-bipyridyl tris dibenzoylmethanato Sm0.01, La0.99 2,2-bipyridyl-N,N-dioxide tris dibenzoylmethanato Sm0.01, La0.99 phenanthroline tris dibenzoylmethanato Sm0.01, La0.99 bathocuproine tris dibenzoylmethanato Sm0.01, La0.99 bathophenanthroline tris thenoyltrifluoroacetonato Sm0.01, La0.99 dimethylaminopyridine tris thenoyltrifluoroacetonato Sm0.01, La0.99 4-picoline-N-oxide tris thenoyltrifluoroacetonato Sm0.01, La0.99 4-phenylpyridine tris thenoyltrifluoroacetonato Sm0.01, La0.99 4-phenylpyridine-N-oxide tris thenoyltrifluoroacetonato Sm0.01, La0.99 1-methylimidazole tris thenoyltrifluoroacetonato Sm0.01, La0.99 triphenylphosphine oxide tris thenoyltrifluoroacetonato Sm0.01, La0.99 2,2-bipyridyl tris thenoyltrifluoroacetonato Sm0.01, La0.99 2,2-bipyridyl-N,N-dioxide tris thenoyltrifluoroacetonato Sm0.01, La0.99 phenanthroline tris thenoyltrifluoroacetonato Sm0.01, La0.99 bathocuproine tris thenoyltrifluoroacetonato Sm0.01, La0.99 bathophenanthroline tris 2,2,6,6-tetramethylheptanedionato Sm0.01, La0.99 dimethylaminopyridine tris 2,2,6,6-tetramethylheptanedionato Sm0.01, La0.99 4-picoline-N-oxide tris 2,2,6,6-tetramethylheptanedionato Sm0.01, La0.99 4-phenylpyridine tris 2,2,6,6-tetramethylheptanedionato Sm0.01, La0.99 4-phenylpyridine-N-oxide tris 2,2,6,6-tetramethylheptanedionato Sm0.01, La0.99 1-methylimidazole tris 2,2,6,6-tetramethylheptanedionato Sm0.01, La0.99 triphenylphosphine oxide tris 2,2,6,6-tetramethylheptanedionato Sm0.01, La0.99 2,2-bipyridyl tris 2,2,6,6-tetramethylheptanedionato Sm0.01, La0.99 2,2-bipyridyl-N,N-dioxide tris 2,2,6,6-tetramethylheptanedionato Sm0.01, La0.99 phenanthroline tris 2,2,6,6-tetramethylheptanedionato Sm0.01, La0.99 bathocuproine tris 2,2,6,6-tetramethylheptanedionato Sm0.01, La0.99 bathophenanthroline tris 3-methylpentane-2,4-dionato Sm0.01, La0.99 dimethylaminopyridine tris 3-methylpentane-2,4-dionato Sm0.01, La0.99 4-picoline-N-oxide tris 3-methylpentane-2,4-dionato Sm0.01, La0.99 4-phenylpyridine tris 3-methylpentane-2,4-dionato Sm0.01, La0.99 4-phenylpyridine-N-oxide tris 3-methylpentane-2,4-dionato Sm0.01, La0.99 1-methylimidazole tris 3-methylpentane-2,4-dionato Sm0.01, La0.99 triphenylphosphine oxide tris 3-methylpentane-2,4-dionato Sm0.01, La0.99 2,2-bipyridyl tris 3-methylpentane-2,4-dionato Sm0.01, La0.99 2,2-bipyridyl-N,N-dioxide tris 3-methylpentane-2,4-dionato Sm0.01, La0.99 phenanthroline tris 3-methylpentane-2,4-dionato Sm0.01, La0.99 bathocuproine tris 3-methylpentane-2,4-dionato Sm0.01, La0.99 bathophenanthroline tris 3-ethylpentane-2,4-dionato Sm0.01, La0.99 dimethylaminopyridine tris 3-ethylpentane-2,4-dionato Sm0.01, La0.99 4-picoline-N-oxide tris 3-ethylpentane-2,4-dionato Sm0.01, La0.99 4-phenylpyridine
tris 3-ethylpentane-2,4-dionato Sm0.01, La0.99 4-phenylpyridine-N-oxide
tris 3-ethylpentane-2,4-dionato Sm0.01, La0.99 1-methylimidazole
tris 3-ethylpentane-2,4-dionato Sm0.01, La0.99 triphenylphosphine oxide
tris 3-ethylpentane-2,4-dionato Sm0.01, La0.99 2,2-bipyridyl
tris 3-ethylpentane-2,4-dionato Sm0.01, La0.99 2,2-bipyridyl-N,N-dioxide
tris 3-ethylpentane-2,4-dionato Sm0.01, La0.99 phenanthroline
tris 3-ethylpentane-2,4-dionato Sm0.01, La0.99 bathocuproine
tris 3-ethylpentane-2,4-dionato Sm0.01, La0.99 bathophenanthroline
tris pivaloyltrifluoroacetonato Sm0.01, La0.99 dimethylaminopyridine
tris pivaloyltrifluoroacetonato Sm0.01, La0.99 4-picoline-N-oxide
tris pivaloyltrifluoroacetonato Sm0.01, La0.99 4-phenylpyridine
tris pivaloyltrifluoroacetonato Sm0.01, La0.99 4-phenylpyridine-N-oxide
tris pivaloyltrifluoroacetonato Sm0.01, La0.99 1-methylimidazole
tris pivaloyltrifluoroacetonato Sm0.01, La0.99 triphenylphosphine oxide
tris pivaloyltrifluoroacetonato Sm0.01, La0.99 2,2-bipyridyl
tris pivaloyltrifluoroacetonato Sm0.01, La0.99 2,2-bipyridyl-N,N-dioxide
tris pivaloyltrifluoroacetonato Sm0.01, La0.99 phenanthroline
tris pivaloyltrifluoroacetonato Sm0.01, La0.99 bathocuproine
tris pivaloyltrifluoroacetonato Sm0.01, La0.99 bathophenanthroline
tris trifluoroacetylacetonato Sm0.01, La0.99 dimethylaminopyridine
tris trifluoroacetylacetonato Sm0.01, La0.99 4-picoline-N-oxide
tris trifluoroacetylacetonato Sm0.01, La0.99 4-phenylpyridine
tris trifluoroacetylacetonato Sm0.01, La0.99 4-phenylpyridine-N-oxide
tris trifluoroacetylacetonato Sm0.01, La0.99 1-methylimidazole
tris trifluoroacetylacetonato Sm0.01, La0.99 triphenylphosphine oxide
tris trifluoroacetylacetonato Sm0.01, La0.99 2,2-bipyridyl
tris trifluoroacetylacetonato Sm0.01, La0.99 2,2-bipyridyl-N,N-dioxide
tris trifluoroacetylacetonato Sm0.01, La0.99 phenanthroline
tris trifluoroacetylacetonato Sm0.01, La0.99 bathocuproine
tris trifluoroacetylacetonato Sm0.01, La0.99 bathophenanthroline
tris hexafluoroacetylacetonato Sm0.01, La0.99 dimethylaminopyridine
tris hexafluoroacetylacetonato Sm0.01, La0.99 4-picoline-N-oxide
tris hexafluoroacetylacetonato Sm0.01, La0.99 4-phenylpyridine
tris hexafluoroacetylacetonato Sm0.01, La0.99 4-phenylpyridine-N-oxide
tris hexafluoroacetylacetonato Sm0.01, La0.99 1-methylimidazole
tris hexafluoroacetylacetonato Sm0.01, La0.99 triphenylphosphine oxide
tris hexafluoroacetylacetonato Sm0.01, La0.99 2,2-bipyridyl
tris hexafluoroacetylacetonato Sm0.01, La0.99 2,2-bipyridyl-N,N-dioxide
tris hexafluoroacetylacetonato Sm0.01, La0.99 phenanthroline
tris hexafluoroacetylacetonato Sm0.01, La0.99 bathocuproine
tris hexafluoroacetylacetonato Sm0.01, La0.99 bathophenanthroline
tris 6,6,7,7,8,8,8-heptafluoro-2,2-dimethyloctanedionato Sm0.01, La0.99 dimethylaminopyridine
tris 6,6,7,7,8,8,8-heptafluoro-2,2-dimethyloctanedionato Sm0.01, La0.99 4-picoline-N-oxide
tris 6,6,7,7,8,8,8-heptafluoro-2,2-dimethyloctanedionato Sm0.01, La0.99 4-phenylpyridine
tris 6,6,7,7,8,8,8-heptafluoro-2,2-dimethyloctanedionato Sm0.01, La0.99 4-phenylpyridine-N-oxide
tris 6,6,7,7,8,8,8-heptafluoro-2,2-dimethyloctanedionato Sm0.01, La0.99 1-methylimidazole
tris 6,6,7,7,8,8,8-heptafluoro-2,2-dimethyloctanedionato Sm0.01, La0.99 triphenylphosphine oxide
tris 6,6,7,7,8,8,8-heptafluoro-2,2-dimethyloctanedionato Sm0.01, La0.99 2,2-bipyridyl
tris 6,6,7,7,8,8,8-heptafluoro-2,2-dimethyloctanedionato Sm0.01, La0.99 2,2-bipyridyl-N,N-dioxide
tris 6,6,7,7,8,8,8-heptafluoro-2,2-dimethyloctanedionato Sm0.01, La0.99 phenanthroline
tris 6,6,7,7,8,8,8-heptafluoro-2,2-dimethyloctanedionato Sm0.01, La0.99 bathocuproine
tris 6,6,7,7,8,8,8-heptafluoro-2,2-dimethyloctanedionato Sm0.01, La0.99 bathophenanthroline
tris 1-phenyl-1,3-butanedionato Sm0.01, La0.99 dimethylaminopyridine
tris 1-phenyl-1,3-butanedionato Sm0.01, La0.99 4-picoline-N-oxide
tris 1-phenyl-1,3-butanedionato Sm0.01, La0.99 4-phenylpyridine
tris 1-phenyl-1,3-butanedionato Sm0.01, La0.99 4-phenylpyridine-N-oxide
tris 1-phenyl-1,3-butanedionato Sm0.01, La0.99 1-methylimidazole
tris 1-phenyl-1,3-butanedionato Sm0.01, La0.99 triphenylphosphine oxide
tris 1-phenyl-1,3-butanedionato Sm0.01, La0.99 2,2-bipyridyl
tris 1-phenyl-1,3-butanedionato Sm0.01, La0.99 2,2-bipyridyl-N,N-dioxide
tris 1-phenyl-1,3-butanedionato Sm0.01, La0.99 phenanthroline
tris 1-phenyl-1,3-butanedionato Sm0.01, La0.99 bathocuproine
tris 1-phenyl-1,3-butanedionato Sm0.01, La0.99 bathophenanthroline
tris acetylacetonato Dy0.5, La0.5 dimethylaminopyridine
tris acetylacetonato Dy0.5, La0.5 4-picoline-N-oxide
tris acetylacetonato Dy0.5, La0.5 4-phenylpyridine
tris acetylacetonato Dy0.5, La0.5 4-phenylpyridine-N-oxide
tris acetylacetonato Dy0.5, La0.5 1-methylimidazole
tris acetylacetonato Dy0.5, La0.5 triphenylphosphine oxide
tris acetylacetonato Dy0.5, La0.5 2,2-bipyridyl
tris acetylacetonato Dy0.5, La0.5 2,2-bipyridyl-N,N-dioxide
tris acetylacetonato Dy0.5, La0.5 phenanthroline
tris acetylacetonato Dy0.5, La0.5 bathocuproine tris acetylacetonato Dy0.5, La0.5 bathophenanthroline
tris dibenzoylmethanato Dy0.5, La0.5 dimethylaminopyridine
tris dibenzoylmethanato Dy0.5, La0.5 4-picoline-N-oxide
tris dibenzoylmethanato Dy0.5, La0.5 4-phenylpyridine
tris dibenzoylmethanato Dy0.5, La0.5 4-phenylpyridine-N-oxide
tris dibenzoylmethanato Dy0.5, La0.5 1-methylimidazole
tris dibenzoylmethanato Dy0.5, La0.5 triphenylphosphine oxide
tris dibenzoylmethanato Dy0.5, La0.5 2,2-bipyridyl
tris dibenzoylmethanato Dy0.5, La0.5 2,2-bipyridyl-N,N-dioxide
tris dibenzoylmethanato Dy0.5, La0.5 phenanthroline
tris dibenzoylmethanato Dy0.5, La0.5 bathocuproine
tris dibenzoylmethanato Dy0.5, La0.5 bathophenanthroline
tris thenoyltrifluoroacetonato Dy0.5, La0.5 dimethylaminopyridine
tris thenoyltrifluoroacetonato Dy0.5, La0.5 4-picoline-N-oxide
tris thenoyltrifluoroacetonato Dy0.5, La0.5 4-phenylpyridine
tris thenoyltrifluoroacetonato Dy0.5, La0.5 4-phenylpyridine-N-oxide
tris thenoyltrifluoroacetonato Dy0.5, La0.5 1-methylimidazole
tris thenoyltrifluoroacetonato Dy0.5, La0.5 triphenylphosphine oxide
tris thenoyltrifluoroacetonato Dy0.5, La0.5 2,2-bipyridyl
tris thenoyltrifluoroacetonato Dy0.5, La0.5 2,2-bipyridyl-N,N-dioxide
tris thenoyltrifluoroacetonato Dy0.5, La0.5 phenanthroline
tris thenoyltrifluoroacetonato Dy0.5, La0.5 bathocuproine
tris thenoyltrifluoroacetonato Dy0.5, La0.5 bathophenanthroline
tris 2,2,6,6-tetramethylheptanedionato Dy0.5, La0.5 dimethylaminopyridine
tris 2,2,6,6-tetramethylheptanedionato Dy0.5, La0.5 4-picoline-N-oxide
tris 2,2,6,6-tetramethylheptanedionato Dy0.5, La0.5 4-phenylpyridine
tris 2,2,6,6-tetramethylheptanedionato Dy0.5, La0.5 4-phenylpyridine-N-oxide
tris 2,2,6,6-tetramethylheptanedionato Dy0.5, La0.5 1-methylimidazole
tris 2,2,6,6-tetramethylheptanedionato Dy0.5, La0.5 triphenylphosphine oxide
tris 2,2,6,6-tetramethylheptanedionato Dy0.5, La0.5 2,2-bipyridyl
tris 2,2,6,6-tetramethylheptanedionato Dy0.5, La0.5 2,2-bipyridyl-N,N-dioxide
tris 2,2,6,6-tetramethylheptanedionato Dy0.5, La0.5 phenanthroline
tris 2,2,6,6-tetramethylheptanedionato Dy0.5, La0.5 bathocuproine
tris 2,2,6,6-tetramethylheptanedionato Dy0.5, La0.5 bathophenanthroline
tris 3-methylpentane-2,4-dionato Dy0.5, La0.5 dimethylaminopyridine
tris 3-methylpentane-2,4-dionato Dy0.5, La0.5 4-picoline-N-oxide
tris 3-methylpentane-2,4-dionato Dy0.5, La0.5 4-phenylpyridine
tris 3-methylpentane-2,4-dionato Dy0.5, La0.5 4-phenylpyridine-N-oxide
tris 3-methylpentane-2,4-dionato Dy0.5, La0.5 1-methylimidazole
tris 3-methylpentane-2,4-dionato Dy0.5, La0.5 triphenylphosphine oxide
tris 3-methylpentane-2,4-dionato Dy0.5, La0.5 2,2-bipyridyl
tris 3-methylpentane-2,4-dionato Dy0.5, La0.5 2,2-bipyridyl-N,N-dioxide
tris 3-methylpentane-2,4-dionato Dy0.5, La0.5 phenanthroline
tris 3-methylpentane-2,4-dionato Dy0.5, La0.5 bathocuproine
tris 3-methylpentane-2,4-dionato Dy0.5, La0.5 bathophenanthroline
tris 3-ethylpentane-2,4-dionato Dy0.5, La0.5 dimethylaminopyridine
tris 3-ethylpentane-2,4-dionato Dy0.5, La0.5 4-picoline-N-oxide
tris 3-ethylpentane-2,4-dionato Dy0.5, La0.5 4-phenylpyridine
tris 3-ethylpentane-2,4-dionato Dy0.5, La0.5 4-phenylpyridine-N-oxide
tris 3-ethylpentane-2,4-dionato Dy0.5, La0.5 1-methylimidazole
tris 3-ethylpentane-2,4-dionato Dy0.5, La0.5 triphenylphosphine oxide
tris 3-ethylpentane-2,4-dionato Dy0.5, La0.5 2,2-bipyridyl
tris 3-ethylpentane-2,4-dionato Dy0.5, La0.5 2,2-bipyridyl-N,N-dioxide
tris 3-ethylpentane-2,4-dionato Dy0.5, La0.5 phenanthroline
tris 3-ethylpentane-2,4-dionato Dy0.5, La0.5 bathocuproine
tris 3-ethylpentane-2,4-dionato Dy0.5, La0.5 bathophenanthroline
tris pivaloyltrifluoroacetonato Dy0.5, La0.5 dimethylaminopyridine
tris pivaloyltrifluoroacetonato Dy0.5, La0.5 4-picoline-N-oxide
tris pivaloyltrifluoroacetonato Dy0.5, La0.5 4-phenylpyridine
tris pivaloyltrifluoroacetonato Dy0.5, La0.5 4-phenylpyridine-N-oxide
tris pivaloyltrifluoroacetonato Dy0.5, La0.5 1-methylimidazole
tris pivaloyltrifluoroacetonato Dy0.5, La0.5 triphenylphosphine oxide
tris pivaloyltrifluoroacetonato Dy0.5, La0.5 2,2-bipyridyl
tris pivaloyltrifluoroacetonato Dy0.5, La0.5 2,2-bipyridyl-N,N-dioxide
tris pivaloyltrifluoroacetonato Dy0.5, La0.5 phenanthroline
tris pivaloyltrifluoroacetonato Dy0.5, La0.5 bathocuproine
tris pivaloyltrifluoroacetonato Dy0.5, La0.5 bathophenanthroline
tris trifluoroacetylacetonato Dy0.5, La0.5 dimethylaminopyridine
tris trifluoroacetylacetonato Dy0.5, La0.5 4-picoline-N-oxide
tris trifluoroacetylacetonato Dy0.5, La0.5 4-phenylpyridine
tris trifluoroacetylacetonato Dy0.5, La0.5 4-phenylpyridine-N-oxide
tris trifluoroacetylacetonato Dy0.5, La0.5 1-methylimidazole
tris trifluoroacetylacetonato Dy0.5, La0.5 triphenylphosphine oxide
tris trifluoroacetylacetonato Dy0.5, La0.5 2,2-bipyridyl
tris trifluoroacetylacetonato Dy0.5, La0.5 2,2-bipyridyl-N,N-dioxide
tris trifluoroacetylacetonato Dy0.5, La0.5 phenanthroline
tris trifluoroacetylacetonato Dy0.5, La0.5 bathocuproine
tris trifluoroacetylacetonato Dy0.5, La0.5 bathophenanthroline tris hexafluoroacetylacetonato Dy0.5, La0.5 dimethylaminopyridine
tris hexafluoroacetylacetonato Dy0.5, La0.5 4-picoline-N-oxide
tris hexafluoroacetylacetonato Dy0.5, La0.5 4-phenylpyridine
tris hexafluoroacetylacetonato Dy0.5, La0.5 4-phenylpyridine-N-oxide
tris hexafluoroacetylacetonato Dy0.5, La0.5 1-methylimidazole
tris hexafluoroacetylacetonato Dy0.5, La0.5 triphenylphosphine oxide
tris hexafluoroacetylacetonato Dy0.5, La0.5 2,2-bipyridyl
tris hexafluoroacetylacetonato Dy0.5, La0.5 2,2-bipyridyl-N,N-dioxide
tris hexafluoroacetylacetonato Dy0.5, La0.5 phenanthroline
tris hexafluoroacetylacetonato Dy0.5, La0.5 bathocuproine
tris hexafluoroacetylacetonato Dy0.5, La0.5 bathophenanthroline
tris 6,6,7,7,8,8,8-heptafluoro-2,2-dimethyloctanedionato Dy0.5, La0.5 dimethylaminopyridine
tris 6,6,7,7,8,8,8-heptafluoro-2,2-dimethyloctanedionato Dy0.5, La0.5 4-picoline-N-oxide
tris 6,6,7,7,8,8,8-heptafluoro-2,2-dimethyloctanedionato Dy0.5, La0.5 4-phenylpyridine
tris 6,6,7,7,8,8,8-heptafluoro-2,2-dimethyloctanedionato Dy0.5, La0.5 4-phenylpyridine-N-oxide
tris 6,6,7,7,8,8,8-heptafluoro-2,2-dimethyloctanedionato Dy0.5, La0.5 1-methylimidazole
tris 6,6,7,7,8,8,8-heptafluoro-2,2-dimethyloctanedionato Dy0.5, La0.5 triphenylphosphine oxide
tris 6,6,7,7,8,8,8-heptafluoro-2,2-dimethyloctanedionato Dy0.5, La0.5 2,2-bipyridyl
tris 6,6,7,7,8,8,8-heptafluoro-2,2-dimethyloctanedionato Dy0.5, La0.5 2,2-bipyridyl-N,N-dioxide
tris 6,6,7,7,8,8,8-heptafluoro-2,2-dimethyloctanedionato Dy0.5, La0.5 phenanthroline
tris 6,6,7,7,8,8,8-heptafluoro-2,2-dimethyloctanedionato Dy0.5, La0.5 bathocuproine
tris 6,6,7,7,8,8,8-heptafluoro-2,2-dimethyloctanedionato Dy0.5, La0.5 bathophenanthroline
tris 1-phenyl-1,3-butanedionato Dy0.5, La0.5 dimethylaminopyridine
tris 1-phenyl-1,3-butanedionato Dy0.5, La0.5 4-picoline-N-oxide
tris 1-phenyl-1,3-butanedionato Dy0.5, La0.5 4-phenylpyridine
tris 1-phenyl-1,3-butanedionato Dy0.5, La0.5 4-phenylpyridine-N-oxide
tris 1-phenyl-1,3-butanedionato Dy0.5, La0.5 1-methylimidazole
tris 1-phenyl-1,3-butanedionato Dy0.5, La0.5 triphenylphosphine oxide
tris 1-phenyl-1,3-butanedionato Dy0.5, La0.5 2,2-bipyridyl
tris 1-phenyl-1,3-butanedionato Dy0.5, La0.5 2,2-bipyridyl-N,N-dioxide
tris 1-phenyl-1,3-butanedionato Dy0.5, La0.5 phenanthroline
tris 1-phenyl-1,3-butanedionato Dy0.5, La0.5 bathocuproine
tris 1-phenyl-1,3-butanedionato Dy0.5, La0.5 bathophenanthroline
tris acetylacetonato Dy0.2, La0.8 dimethylaminopyridine
tris acetylacetonato Dy0.2, La0.8 4-picoline-N-oxide
tris acetylacetonato Dy0.2, La0.8 4-phenylpyridine
tris acetylacetonato Dy0.2, La0.8 4-phenylpyridine-N-oxide
tris acetylacetonato Dy0.2, La0.8 1-methylimidazole
tris acetylacetonato Dy0.2, La0.8 triphenylphosphine oxide
tris acetylacetonato Dy0.2, La0.8 2,2-bipyridyl
tris acetylacetonato Dy0.2, La0.8 2,2-bipyridyl-N,N-dioxide
tris acetylacetonato Dy0.2, La0.8 phenanthroline
tris acetylacetonato Dy0.2, La0.8 bathocuproine
tris acetylacetonato Dy0.2, La0.8 bathophenanthroline
tris dibenzoylmethanato Dy0.2, La0.8 dimethylaminopyridine
tris dibenzoylmethanato Dy0.2, La0.8 4-picoline-N-oxide
tris dibenzoylmethanato Dy0.2, La0.8 4-phenylpyridine
tris dibenzoylmethanato Dy0.2, La0.8 4-phenylpyridine-N-oxide
tris dibenzoylmethanato Dy0.2, La0.8 1-methylimidazole
tris dibenzoylmethanato Dy0.2, La0.8 triphenylphosphine oxide
tris dibenzoylmethanato Dy0.2, La0.8 2,2-bipyridyl
tris dibenzoylmethanato Dy0.2, La0.8 2,2-bipyridyl-N,N-dioxide
tris dibenzoylmethanato Dy0.2, La0.8 phenanthroline
tris dibenzoylmethanato Dy0.2, La0.8 bathocuproine
tris dibenzoylmethanato Dy0.2, La0.8 bathophenanthroline
tris thenoyltrifluoroacetonato Dy0.2, La0.8 dimethylaminopyridine
tris thenoyltrifluoroacetonato Dy0.2, La0.8 4-picoline-N-oxide
tris thenoyltrifluoroacetonato Dy0.2, La0.8 4-phenylpyridine
tris thenoyltrifluoroacetonato Dy0.2, La0.8 4-phenylpyridine-N-oxide
tris thenoyltrifluoroacetonato Dy0.2, La0.8 1-methylimidazole
tris thenoyltrifluoroacetonato Dy0.2, La0.8 triphenylphosphine oxide
tris thenoyltrifluoroacetonato Dy0.2, La0.8 2,2-bipyridyl
tris thenoyltrifluoroacetonato Dy0.2, La0.8 2,2-bipyridyl-N,N-dioxide
tris thenoyltrifluoroacetonato Dy0.2, La0.8 phenanthroline
tris thenoyltrifluoroacetonato Dy0.2, La0.8 bathocuproine
tris thenoyltrifluoroacetonato Dy0.2, La0.8 bathophenanthroline
tris 2,2,6,6-tetramethylheptanedionato Dy0.2, La0.8 dimethylaminopyridine
tris 2,2,6,6-tetramethylheptanedionato Dy0.2, La0.8 4-picoline-N-oxide
tris 2,2,6,6-tetramethylheptanedionato Dy0.2, La0.8 4-phenylpyridine
tris 2,2,6,6-tetramethylheptanedionato Dy0.2, La0.8 4-phenylpyridine-N-oxide
tris 2,2,6,6-tetramethylheptanedionato Dy0.2, La0.8 1-methylimidazole
tris 2,2,6,6-tetramethylheptanedionato Dy0.2, La0.8 triphenylphosphine oxide
tris 2,2,6,6-tetramethylheptanedionato Dy0.2, La0.8 2,2-bipyridyl
tris 2,2,6,6-tetramethylheptanedionato Dy0.2, La0.8 2,2-bipyridyl-N,N-dioxide
tris 2,2,6,6-tetramethylheptanedionato Dy0.2, La0.8 phenanthroline
tris 2,2,6,6-tetramethylheptanedionato Dy0.2, La0.8 bathocuproine
tris 2,2,6,6-tetramethylheptanedionato Dy0.2, La0.8 bathophenanthroline
tris 3-methylpentane-2,4-dionato Dy0.2, La0.8 dimethylaminopyridine
tris 3-methylpentane-2,4-dionato Dy0.2, La0.8 4-picoline-N-oxide
tris 3-methylpentane-2,4-dionato Dy0.2, La0.8 4-phenylpyridine tris 3-methylpentane-2,4-dionato Dy0.2, La0.8 4-phenylpyridine-N-oxide
tris 3-methylpentane-2,4-dionato Dy0.2, La0.8 1-methylimidazole
tris 3-methylpentane-2,4-dionato Dy0.2, La0.8 triphenylphosphine oxide
tris 3-methylpentane-2,4-dionato Dy0.2, La0.8 2,2-bipyridyl
tris 3-methylpentane-2,4-dionato Dy0.2, La0.8 2,2-bipyridyl-N,N-dioxide
tris 3-methylpentane-2,4-dionato Dy0.2, La0.8 phenanthroline
tris 3-methylpentane-2,4-dionato Dy0.2, La0.8 bathocuproine
tris 3-methylpentane-2,4-dionato Dy0.2, La0.8 bathophenanthroline
tris 3-ethylpentane-2,4-dionato Dy0.2, La0.8 dimethylaminopyridine
tris 3-ethylpentane-2,4-dionato Dy0.2, La0.8 4-picoline-N-oxide
tris 3-ethylpentane-2,4-dionato Dy0.2, La0.8 4-phenylpyridine
tris 3-ethylpentane-2,4-dionato Dy0.2, La0.8 4-phenylpyridine-N-oxide
tris 3-ethylpentane-2,4-dionato Dy0.2, La0.8 1-methylimidazole
tris 3-ethylpentane-2,4-dionato Dy0.2, La0.8 triphenylphosphine oxide
tris 3-ethylpentane-2,4-dionato Dy0.2, La0.8 2,2-bipyridyl
tris 3-ethylpentane-2,4-dionato Dy0.2, La0.8 2,2-bipyridyl-N,N-dioxide
tris 3-ethylpentane-2,4-dionato Dy0.2, La0.8 phenanthroline
tris 3-ethylpentane-2,4-dionato Dy0.2, La0.8 bathocuproine
tris 3-ethylpentane-2,4-dionato Dy0.2, La0.8 bathophenanthroline
tris pivaloyltrifluoroacetonato Dy0.2, La0.8 dimethylaminopyridine
tris pivaloyltrifluoroacetonato Dy0.2, La0.8 4-picoline-N-oxide
tris pivaloyltrifluoroacetonato Dy0.2, La0.8 4-phenylpyridine
tris pivaloyltrifluoroacetonato Dy0.2, La0.8 4-phenylpyridine-N-oxide
tris pivaloyltrifluoroacetonato Dy0.2, La0.8 1-methylimidazole
tris pivaloyltrifluoroacetonato Dy0.2, La0.8 triphenylphosphine oxide
tris pivaloyltrifluoroacetonato Dy0.2, La0.8 2,2-bipyridyl
tris pivaloyltrifluoroacetonato Dy0.2, La0.8 2,2-bipyridyl-N,N-dioxide
tris pivaloyltrifluoroacetonato Dy0.2, La0.8 phenanthroline
tris pivaloyltrifluoroacetonato Dy0.2, La0.8 bathocuproine
tris pivaloyltrifluoroacetonato Dy0.2, La0.8 bathophenanthroline
tris trifluoroacetylacetonato Dy0.2, La0.8 dimethylaminopyridine
tris trifluoroacetylacetonato Dy0.2, La0.8 4-picoline-N-oxide
tris trifluoroacetylacetonato Dy0.2, La0.8 4-phenylpyridine
tris trifluoroacetylacetonato Dy0.2, La0.8 4-phenylpyridine-N-oxide
tris trifluoroacetylacetonato Dy0.2, La0.8 1-methylimidazole
tris trifluoroacetylacetonato Dy0.2, La0.8 triphenylphosphine oxide
tris trifluoroacetylacetonato Dy0.2, La0.8 2,2-bipyridyl
tris trifluoroacetylacetonato Dy0.2, La0.8 2,2-bipyridyl-N,N-dioxide
tris trifluoroacetylacetonato Dy0.2, La0.8 phenanthroline
tris trifluoroacetylacetonato Dy0.2, La0.8 bathocuproine
tris trifluoroacetylacetonato Dy0.2, La0.8 bathophenanthroline
tris hexafluoroacetylacetonato Dy0.2, La0.8 dimethylaminopyridine
tris hexafluoroacetylacetonato Dy0.2, La0.8 4-picoline-N-oxide
tris hexafluoroacetylacetonato Dy0.2, La0.8 4-phenylpyridine
tris hexafluoroacetylacetonato Dy0.2, La0.8 4-phenylpyridine-N-oxide
tris hexafluoroacetylacetonato Dy0.2, La0.8 1-methylimidazole
tris hexafluoroacetylacetonato Dy0.2, La0.8 triphenylphosphine oxide
tris hexafluoroacetylacetonato Dy0.2, La0.8 2,2-bipyridyl
tris hexafluoroacetylacetonato Dy0.2, La0.8 2,2-bipyridyl-N,N-dioxide
tris hexafluoroacetylacetonato Dy0.2, La0.8 phenanthroline
tris hexafluoroacetylacetonato Dy0.2, La0.8 bathocuproine
tris hexafluoroacetylacetonato Dy0.2, La0.8 bathophenanthroline
tris 6,6,7,7,8,8,8-heptafluoro-2,2-dimethyloctanedionato Dy0.2, La0.8 dimethylaminopyridine
tris 6,6,7,7,8,8,8-heptafluoro-2,2-dimethyloctanedionato Dy0.2, La0.8 4-picoline-N-oxide
tris 6,6,7,7,8,8,8-heptafluoro-2,2-dimethyloctanedionato Dy0.2, La0.8 4-phenylpyridine
tris 6,6,7,7,8,8,8-heptafluoro-2,2-dimethyloctanedionato Dy0.2, La0.8 4-phenylpyridine-N-oxide
tris 6,6,7,7,8,8,8-heptafluoro-2,2-dimethyloctanedionato Dy0.2, La0.8 1-methylimidazole
tris 6,6,7,7,8,8,8-heptafluoro-2,2-dimethyloctanedionato Dy0.2, La0.8 triphenylphosphine oxide
tris 6,6,7,7,8,8,8-heptafluoro-2,2-dimethyloctanedionato Dy0.2, La0.8 2,2-bipyridyl
tris 6,6,7,7,8,8,8-heptafluoro-2,2-dimethyloctanedionato Dy0.2, La0.8 2,2-bipyridyl-N,N-dioxide
tris 6,6,7,7,8,8,8-heptafluoro-2,2-dimethyloctanedionato Dy0.2, La0.8 phenanthroline
tris 6,6,7,7,8,8,8-heptafluoro-2,2-dimethyloctanedionato Dy0.2, La0.8 bathocuproine
tris 6,6,7,7,8,8,8-heptafluoro-2,2-dimethyloctanedionato Dy0.2, La0.8 bathophenanthroline
tris 1-phenyl-1,3-butanedionato Dy0.2, La0.8 dimethylaminopyridine
tris 1-phenyl-1,3-butanedionato Dy0.2, La0.8 4-picoline-N-oxide
tris 1-phenyl-1,3-butanedionato Dy0.2, La0.8 4-phenylpyridine
tris 1-phenyl-1,3-butanedionato Dy0.2, La0.8 4-phenylpyridine-N-oxide
tris 1-phenyl-1,3-butanedionato Dy0.2, La0.8 1-methylimidazole
tris 1-phenyl-1,3-butanedionato Dy0.2, La0.8 triphenylphosphine oxide
tris 1-phenyl-1,3-butanedionato Dy0.2, La0.8 2,2-bipyridyl
tris 1-phenyl-1,3-butanedionato Dy0.2, La0.8 2,2-bipyridyl-N,N-dioxide
tris 1-phenyl-1,3-butanedionato Dy0.2, La0.8 phenanthroline
tris 1-phenyl-1,3-butanedionato Dy0.2, La0.8 bathocuproine
tris 1-phenyl-1,3-butanedionato Dy0.2, La0.8 bathophenanthroline
tris acetylacetonato Dy0.1, La0.9 dimethylaminopyridine
tris acetylacetonato Dy0.1, La0.9 4-picoline-N-oxide tris acetylacetonato Dy0.1, La0.9 4-phenylpyridine
tris acetylacetonato Dy0.1, La0.9 4-phenylpyridine-N-oxide
tris acetylacetonato Dy0.1, La0.9 1-methylimidazole
tris acetylacetonato Dy0.1, La0.9 triphenylphosphine oxide
tris acetylacetonato Dy0.1, La0.9 2,2-bipyridyl
tris acetylacetonato Dy0.1, La0.9 2,2-bipyridyl-N,N-dioxide
tris acetylacetonato Dy0.1, La0.9 phenanthroline
tris acetylacetonato Dy0.1, La0.9 bathocuproine
tris acetylacetonato Dy0.1, La0.9 bathophenanthroline
tris dibenzoylmethanato Dy0.1, La0.9 dimethylaminopyridine
tris dibenzoylmethanato Dy0.1, La0.9 4-picoline-N-oxide
tris dibenzoylmethanato Dy0.1, La0.9 4-phenylpyridine
tris dibenzoylmethanato Dy0.1, La0.9 4-phenylpyridine-N-oxide
tris dibenzoylmethanato Dy0.1, La0.9 1-methylimidazole
tris dibenzoylmethanato Dy0.1, La0.9 triphenylphosphine oxide
tris dibenzoylmethanato Dy0.1, La0.9 2,2-bipyridyl
tris dibenzoylmethanato Dy0.1, La0.9 2,2-bipyridyl-N,N-dioxide
tris dibenzoylmethanato Dy0.1, La0.9 phenanthroline
tris dibenzoylmethanato Dy0.1, La0.9 bathocuproine
tris dibenzoylmethanato Dy0.1, La0.9 bathophenanthroline
tris thenoyltrifluoroacetonato Dy0.1, La0.9 dimethylaminopyridine
tris thenoyltrifluoroacetonato Dy0.1, La0.9 4-picoline-N-oxide
tris thenoyltrifluoroacetonato Dy0.1, La0.9 4-phenylpyridine
tris thenoyltrifluoroacetonato Dy0.1, La0.9 4-phenylpyridine-N-oxide
tris thenoyltrifluoroacetonato Dy0.1, La0.9 1-methylimidazole
tris thenoyltrifluoroacetonato Dy0.1, La0.9 triphenylphosphine oxide
tris thenoyltrifluoroacetonato Dy0.1, La0.9 2,2-bipyridyl
tris thenoyltrifluoroacetonato Dy0.1, La0.9 2,2-bipyridyl-N,N-dioxide
tris thenoyltrifluoroacetonato Dy0.1, La0.9 phenanthroline
tris thenoyltrifluoroacetonato Dy0.1, La0.9 bathocuproine
tris thenoyltrifluoroacetonato Dy0.1, La0.9 bathophenanthroline
tris 2,2,6,6-tetramethylheptanedionato Dy0.1, La0.9 dimethylaminopyridine
tris 2,2,6,6-tetramethylheptanedionato Dy0.1, La0.9 4-picoline-N-oxide
tris 2,2,6,6-tetramethylheptanedionato Dy0.1, La0.9 4-phenylpyridine
tris 2,2,6,6-tetramethylheptanedionato Dy0.1, La0.9 4-phenylpyridine-N-oxide
tris 2,2,6,6-tetramethylheptanedionato Dy0.1, La0.9 1-methylimidazole
tris 2,2,6,6-tetramethylheptanedionato Dy0.1, La0.9 triphenylphosphine oxide
tris 2,2,6,6-tetramethylheptanedionato Dy0.1, La0.9 2,2-bipyridyl
tris 2,2,6,6-tetramethylheptanedionato Dy0.1, La0.9 2,2-bipyridyl-N,N-dioxide
tris 2,2,6,6-tetramethylheptanedionato Dy0.1, La0.9 phenanthroline
tris 2,2,6,6-tetramethylheptanedionato Dy0.1, La0.9 bathocuproine
tris 2,2,6,6-tetramethylheptanedionato Dy0.1, La0.9 bathophenanthroline
tris 3-methylpentane-2,4-dionato Dy0.1, La0.9 dimethylaminopyridine tris 3-methylpentane-2,4-dionato Dy0.1, La0.9 4-picoline-N-oxide
tris 3-methylpentane-2,4-dionato Dy0.1, La0.9 4-phenylpyridine
tris 3-methylpentane-2,4-dionato Dy0.1, La0.9 4-phenylpyridine-N-oxide
tris 3-methylpentane-2,4-dionato Dy0.1, La0.9 1-methylimidazole
tris 3-methylpentane-2,4-dionato Dy0.1, La0.9 triphenylphosphine oxide
tris 3-methylpentane-2,4-dionato Dy0.1, La0.9 2,2-bipyridyl
tris 3-methylpentane-2,4-dionato Dy0.1, La0.9 2,2-bipyridyl-N,N-dioxide
tris 3-methylpentane-2,4-dionato Dy0.1, La0.9 phenanthroline
tris 3-methylpentane-2,4-dionato Dy0.1, La0.9 bathocuproine
tris 3-methylpentane-2,4-dionato Dy0.1, La0.9 bathophenanthroline
tris 3-ethylpentane-2,4-dionato Dy0.1, La0.9 dimethylaminopyridine
tris 3-ethylpentane-2,4-dionato Dy0.1, La0.9 4-picoline-N-oxide
tris 3-ethylpentane-2,4-dionato Dy0.1, La0.9 4-phenylpyridine
tris 3-ethylpentane-2,4-dionato Dy0.1, La0.9 4-phenylpyridine-N-oxide
tris 3-ethylpentane-2,4-dionato Dy0.1, La0.9 1-methylimidazole
tris 3-ethylpentane-2,4-dionato Dy0.1, La0.9 triphenylphosphine oxide
tris 3-ethylpentane-2,4-dionato Dy0.1, La0.9 2,2-bipyridyl
tris 3-ethylpentane-2,4-dionato Dy0.1, La0.9 2,2-bipyridyl-N,N-dioxide
tris 3-ethylpentane-2,4-dionato Dy0.1, La0.9 phenanthroline
tris 3-ethylpentane-2,4-dionato Dy0.1, La0.9 bathocuproine
tris 3-ethylpentane-2,4-dionato Dy0.1, La0.9 bathophenanthroline
tris pivaloyltrifluoroacetonato Dy0.1, La0.9 dimethylaminopyridine
tris pivaloyltrifluoroacetonato Dy0.1, La0.9 4-picoline-N-oxide
tris pivaloyltrifluoroacetonato Dy0.1, La0.9 4-phenylpyridine
tris pivaloyltrifluoroacetonato Dy0.1, La0.9 4-phenylpyridine-N-oxide
tris pivaloyltrifluoroacetonato Dy0.1, La0.9 1-methylimidazole
tris pivaloyltrifluoroacetonato Dy0.1, La0.9 triphenylphosphine oxide
tris pivaloyltrifluoroacetonato Dy0.1, La0.9 2,2-bipyridyl
tris pivaloyltrifluoroacetonato Dy0.1, La0.9 2,2-bipyridyl-N,N-dioxide
tris pivaloyltrifluoroacetonato Dy0.1, La0.9 phenanthroline
tris pivaloyltrifluoroacetonato Dy0.1, La0.9 bathocuproine
tris pivaloyltrifluoroacetonato Dy0.1, La0.9 bathophenanthroline
tris trifluoroacetylacetonato Dy0.1, La0.9 dimethylaminopyridine
tris trifluoroacetylacetonato Dy0.1, La0.9 4-picoline-N-oxide
tris trifluoroacetylacetonato Dy0.1, La0.9 4-phenylpyridine
tris trifluoroacetylacetonato Dy0.1, La0.9 4-phenylpyridine-N-oxide
tris trifluoroacetylacetonato Dy0.1, La0.9 1-methylimidazole tris trifluoroacetylacetonato Dy0.1, La0.9 triphenylphosphine oxide
tris trifluoroacetylacetonato Dy0.1, La0.9 2,2-bipyridyl
tris trifluoroacetylacetonato Dy0.1, La0.9 2,2-bipyridyl-N,N-dioxide
tris trifluoroacetylacetonato Dy0.1, La0.9 phenanthroline
tris trifluoroacetylacetonato Dy0.1, La0.9 bathocuproine
tris trifluoroacetylacetonato Dy0.1, La0.9 bathophenanthroline
tris hexafluoroacetylacetonato Dy0.1, La0.9 dimethylaminopyridine
tris hexafluoroacetylacetonato Dy0.1, La0.9 4-picoline-N-oxide
tris hexafluoroacetylacetonato Dy0.1, La0.9 4-phenylpyridine
tris hexafluoroacetylacetonato Dy0.1, La0.9 4-phenylpyridine-N-oxide
tris hexafluoroacetylacetonato Dy0.1, La0.9 1-methylimidazole
tris hexafluoroacetylacetonato Dy0.1, La0.9 triphenylphosphine oxide
tris hexafluoroacetylacetonato Dy0.1, La0.9 2,2-bipyridyl
tris hexafluoroacetylacetonato Dy0.1, La0.9 2,2-bipyridyl-N,N-dioxide
tris hexafluoroacetylacetonato Dy0.1, La0.9 phenanthroline
tris hexafluoroacetylacetonato Dy0.1, La0.9 bathocuproine
tris hexafluoroacetylacetonato Dy0.1, La0.9 bathophenanthroline
tris 6,6,7,7,8,8,8-heptafluoro-2,2-dimethyloctanedionato Dy0.1, La0.9 dimethylaminopyridine
tris 6,6,7,7,8,8,8-heptafluoro-2,2-dimethyloctanedionato Dy0.1, La0.9 4-picoline-N-oxide
tris 6,6,7,7,8,8,8-heptafluoro-2,2-dimethyloctanedionato Dy0.1, La0.9 4-phenylpyridine
tris 6,6,7,7,8,8,8-heptafluoro-2,2-dimethyloctanedionato Dy0.1, La0.9 4-phenylpyridine-N-oxide
tris 6,6,7,7,8,8,8-heptafluoro-2,2-dimethyloctanedionato Dy0.1, La0.9 1-methylimidazole
tris 6,6,7,7,8,8,8-heptafluoro-2,2-dimethyloctanedionato Dy0.1, La0.9 triphenylphosphine oxide
tris 6,6,7,7,8,8,8-heptafluoro-2,2-dimethyloctanedionato Dy0.1, La0.9 2,2-bipyridyl
tris 6,6,7,7,8,8,8-heptafluoro-2,2-dimethyloctanedionato Dy0.1, La0.9 2,2-bipyridyl-N,N-dioxide
tris 6,6,7,7,8,8,8-heptafluoro-2,2-dimethyloctanedionato Dy0.1, La0.9 phenanthroline
tris 6,6,7,7,8,8,8-heptafluoro-2,2-dimethyloctanedionato Dy0.1, La0.9 bathocuproine
tris 6,6,7,7,8,8,8-heptafluoro-2,2-dimethyloctanedionato Dy0.1, La0.9 bathophenanthroline
tris 1-phenyl-1,3-butanedionato Dy0.1, La0.9 dimethylaminopyridine
tris 1-phenyl-1,3-butanedionato Dy0.1, La0.9 4-picoline-N-oxide
tris 1-phenyl-1,3-butanedionato Dy0.1, La0.9 4-phenylpyridine
tris 1-phenyl-1,3-butanedionato Dy0.1, La0.9 4-phenylpyridine-N-oxide
tris 1-phenyl-1,3-butanedionato Dy0.1, La0.9 1-methylimidazole
tris 1-phenyl-1,3-butanedionato Dy0.1, La0.9 triphenylphosphine oxide
tris 1-phenyl-1,3-butanedionato Dy0.1, La0.9 2,2-bipyridyl
tris 1-phenyl-1,3-butanedionato Dy0.1, La0.9 2,2-bipyridyl-N,N-dioxide
tris 1-phenyl-1,3-butanedionato Dy0.1, La0.9 phenanthroline
tris 1-phenyl-1,3-butanedionato Dy0.1, La0.9 bathocuproine
tris 1-phenyl-1,3-butanedionato Dy0.1, La0.9 bathophenanthroline
tris acetylacetonato Dy0.01, La0.99 dimethylaminopyridine
tris acetylacetonato Dy0.01, La0.99 4-picoline-N-oxide
tris acetylacetonato Dy0.01, La0.99 4-phenylpyridine
tris acetylacetonato Dy0.01, La0.99 4-phenylpyridine-N-oxide
tris acetylacetonato Dy0.01, La0.99 1-methylimidazole
tris acetylacetonato Dy0.01, La0.99 triphenylphosphine oxide
tris acetylacetonato Dy0.01, La0.99 2,2-bipyridyl
tris acetylacetonato Dy0.01, La0.99 2,2-bipyridyl-N,N-dioxide
tris acetylacetonato Dy0.01, La0.99 phenanthroline
tris acetylacetonato Dy0.01, La0.99 bathocuproine
tris acetylacetonato Dy0.01, La0.99 bathophenanthroline
tris dibenzoylmethanato Dy0.01, La0.99 dimethylaminopyridine
tris dibenzoylmethanato Dy0.01, La0.99 4-picoline-N-oxide
tris dibenzoylmethanato Dy0.01, La0.99 4-phenylpyridine
tris dibenzoylmethanato Dy0.01, La0.99 4-phenylpyridine-N-oxide
tris dibenzoylmethanato Dy0.01, La0.99 1-methylimidazole
tris dibenzoylmethanato Dy0.01, La0.99 triphenylphosphine oxide
tris dibenzoylmethanato Dy0.01, La0.99 2,2-bipyridyl
tris dibenzoylmethanato Dy0.01, La0.99 2,2-bipyridyl-N,N-dioxide
tris dibenzoylmethanato Dy0.01, La0.99 phenanthroline
tris dibenzoylmethanato Dy0.01, La0.99 bathocuproine
tris dibenzoylmethanato Dy0.01, La0.99 bathophenanthroline
tris thenoyltrifluoroacetonato Dy0.01, La0.99 dimethylaminopyridine
tris thenoyltrifluoroacetonato Dy0.01, La0.99 4-picoline-N-oxide
tris thenoyltrifluoroacetonato Dy0.01, La0.99 4-phenylpyridine
tris thenoyltrifluoroacetonato Dy0.01, La0.99 4-phenylpyridine-N-oxide
tris thenoyltrifluoroacetonato Dy0.01, La0.99 1-methylimidazole
tris thenoyltrifluoroacetonato Dy0.01, La0.99 triphenylphosphine oxide
tris thenoyltrifluoroacetonato Dy0.01, La0.99 2,2-bipyridyl
tris thenoyltrifluoroacetonato Dy0.01, La0.99 2,2-bipyridyl-N,N-dioxide
tris thenoyltrifluoroacetonato Dy0.01, La0.99 phenanthroline
tris thenoyltrifluoroacetonato Dy0.01, La0.99 bathocuproine
tris thenoyltrifluoroacetonato Dy0.01, La0.99 bathophenanthroline
tris 2,2,6,6-tetramethylheptanedionato Dy0.01, La0.99 dimethylaminopyridine
tris 2,2,6,6-tetramethylheptanedionato Dy0.01, La0.99 4-picoline-N-oxide
tris 2,2,6,6-tetramethylheptanedionato Dy0.01, La0.99 4-phenylpyridine
tris 2,2,6,6-tetramethylheptanedionato Dy0.01, La0.99 4-phenylpyridine-N-oxide
tris 2,2,6,6-tetramethylheptanedionato Dy0.01, La0.99 1-methylimidazole
tris 2,2,6,6-tetramethylheptanedionato Dy0.01, La0.99 triphenylphosphine oxide
tris 2,2,6,6-tetramethylheptanedionato Dy0.01, La0.99 2,2-bipyridyl tris 2,2,6,6-tetramethylheptanedionato Dy0.01, La0.99 2,2-bipyridyl-N,N-dioxide tris 2,2,6,6-tetramethylheptanedionato Dy0.01, La0.99 phenanthroline tris 2,2,6,6-tetramethylheptanedionato Dy0.01, La0.99 bathocuproine tris 2,2,6,6-tetramethylheptanedionato Dy0.01, La0.99 bathophenanthroline tris 3-methylpentane-2,4-dionato Dy0.01, La0.99 dimethylaminopyridine tris 3-methylpentane-2,4-dionato Dy0.01, La0.99 4-picoline-N-oxide tris 3-methylpentane-2,4-dionato Dy0.01, La0.99 4-phenylpyridine tris 3-methylpentane-2,4-dionato Dy0.01, La0.99 4-phenylpyridine-N-oxide tris 3-methylpentane-2,4-dionato Dy0.01, La0.99 1-methylimidazole tris 3-methylpentane-2,4-dionato Dy0.01, La0.99 triphenylphosphine oxide tris 3-methylpentane-2,4-dionato Dy0.01, La0.99 2,2-bipyridyl tris 3-methylpentane-2,4-dionato Dy0.01, La0.99 2,2-bipyridyl-N,N-dioxide tris 3-methylpentane-2,4-dionato Dy0.01, La0.99 phenanthroline tris 3-methylpentane-2,4-dionato Dy0.01, La0.99 bathocuproine tris 3-methylpentane-2,4-dionato Dy0.01, La0.99 bathophenanthroline tris 3-ethylpentane-2,4-dionato Dy0.01, La0.99 dimethylaminopyridine tris 3-ethylpentane-2,4-dionato Dy0.01, La0.99 4-picoline-N-oxide tris 3-ethylpentane-2,4-dionato Dy0.01, La0.99 4-phenylpyridine tris 3-ethylpentane-2,4-dionato Dy0.01, La0.99 4-phenylpyridine-N-oxide tris 3-ethylpentane-2,4-dionato Dy0.01, La0.99 1-methylimidazole tris 3-ethylpentane-2,4-dionato Dy0.01, La0.99 triphenylphosphine oxide tris 3-ethylpentane-2,4-dionato Dy0.01, La0.99 2,2-bipyridyl tris 3-ethylpentane-2,4-dionato Dy0.01, La0.99 2,2-bipyridyl-N,N-dioxide tris 3-ethylpentane-2,4-dionato Dy0.01, La0.99 phenanthroline tris 3-ethylpentane-2,4-dionato Dy0.01, La0.99 bathocuproine tris 3-ethylpentane-2,4-dionato Dy0.01, La0.99 bathophenanthroline tris pivaloyltrifluoroacetonato Dy0.01, La0.99 dimethylaminopyridine tris pivaloyltrifluoroacetonato Dy0.01, La0.99 4-picoline-N-oxide tris pivaloyltrifluoroacetonato Dy0.01, La0.99 4-phenylpyridine tris pivaloyltrifluoroacetonato Dy0.01, La0.99 4-phenylpyridine-N-oxide tris pivaloyltrifluoroacetonato Dy0.01, La0.99 1-methylimidazole tris pivaloyltrifluoroacetonato Dy0.01, La0.99 triphenylphosphine oxide tris pivaloyltrifluoroacetonato Dy0.01, La0.99 2,2-bipyridyl tris pivaloyltrifluoroacetonato Dy0.01, La0.99 2,2-bipyridyl-N,N-dioxide tris pivaloyltrifluoroacetonato Dy0.01, La0.99 phenanthroline tris pivaloyltrifluoroacetonato Dy0.01, La0.99 bathocuproine tris pivaloyltrifluoroacetonato Dy0.01, La0.99 bathophenanthroline tris trifluoroacetylacetonato Dy0.01, La0.99 dimethylaminopyridine tris trifluoroacetylacetonato Dy0.01, La0.99 4-picoline-N-oxide tris trifluoroacetylacetonato Dy0.01, La0.99 4-phenylpyridine tris trifluoroacetylacetonato Dy0.01, La0.99 4-phenylpyridine-N-oxide tris trifluoroacetylacetonato Dy0.01, La0.99 1-methylimidazole tris trifluoroacetylacetonato Dy0.01, La0.99 triphenylphosphine oxide tris trifluoroacetylacetonato Dy0.01, La0.99 2,2-bipyridyl tris trifluoroacetylacetonato Dy0.01, La0.99 2,2-bipyridyl-N,N-dioxide tris trifluoroacetylacetonato Dy0.01, La0.99 phenanthroline tris trifluoroacetylacetonato Dy0.01, La0.99 bathocuproine tris trifluoroacetylacetonato Dy0.01, La0.99 bathophenanthroline tris hexafluoroacetylacetonato Dy0.01, La0.99 dimethylaminopyridine tris hexafluoroacetylacetonato Dy0.01, La0.99 4-picoline-N-oxide tris hexafluoroacetylacetonato Dy0.01, La0.99 4-phenylpyridine tris hexafluoroacetylacetonato Dy0.01, La0.99 4-phenylpyridine-N-oxide tris hexafluoroacetylacetonato Dy0.01, La0.99 1-methylimidazole tris hexafluoroacetylacetonato Dy0.01, La0.99 triphenylphosphine oxide tris hexafluoroacetylacetonato Dy0.01, La0.99 2,2-bipyridyl tris hexafluoroacetylacetonato Dy0.01, La0.99 2,2-bipyridyl-N,N-dioxide tris hexafluoroacetylacetonato Dy0.01, La0.99 phenanthroline tris hexafluoroacetylacetonato Dy0.01, La0.99 bathocuproine tris hexafluoroacetylacetonato Dy0.01, La0.99 bathophenanthroline tris 6,6,7,7,8,8,8-heptafluoro-2,2-dimethyloctanedionato Dy0.01, La0.99 dimethylaminopyridine tris 6,6,7,7,8,8,8-heptafluoro-2,2-dimethyloctanedionato Dy0.01, La0.99 4-picoline-N-oxide tris 6,6,7,7,8,8,8-heptafluoro-2,2-dimethyloctanedionato Dy0.01, La0.99 4-phenylpyridine tris 6,6,7,7,8,8,8-heptafluoro-2,2-dimethyloctanedionato Dy0.01, La0.99 4-phenylpyridine-N-oxide tris 6,6,7,7,8,8,8-heptafluoro-2,2-dimethyloctanedionato Dy0.01, La0.99 1-methylimidazole tris 6,6,7,7,8,8,8-heptafluoro-2,2-dimethyloctanedionato Dy0.01, La0.99 triphenylphosphine oxide tris 6,6,7,7,8,8,8-heptafluoro-2,2-dimethyloctanedionato Dy0.01, La0.99 2,2-bipyridyl tris 6,6,7,7,8,8,8-heptafluoro-2,2-dimethyloctanedionato Dy0.01, La0.99 2,2-bipyridyl-N,N-dioxide tris 6,6,7,7,8,8,8-heptafluoro-2,2-dimethyloctanedionato Dy0.01, La0.99 phenanthroline tris 6,6,7,7,8,8,8-heptafluoro-2,2-dimethyloctanedionato Dy0.01, La0.99 bathocuproine tris 6,6,7,7,8,8,8-heptafluoro-2,2-dimethyloctanedionato Dy0.01, La0.99 bathophenanthroline
tris 1-phenyl-1,3-butanedionato Dy0.01, La0.99 dimethylaminopyridine
tris 1-phenyl-1,3-butanedionato Dy0.01, La0.99 4-picoline-N-oxide
tris 1-phenyl-1,3-butanedionato Dy0.01, La0.99 4-phenylpyridine
tris 1-phenyl-1,3-butanedionato Dy0.01, La0.99 4-phenylpyridine-N-oxide
tris 1-phenyl-1,3-butanedionato Dy0.01, La0.99 1-methylimidazole
tris 1-phenyl-1,3-butanedionato Dy0.01, La0.99 triphenylphosphine oxide
tris 1-phenyl-1,3-butanedionato Dy0.01, La0.99 2,2-bipyridyl
tris 1-phenyl-1,3-butanedionato Dy0.01, La0.99 2,2-bipyridyl-N,N-dioxide
tris 1-phenyl-1,3-butanedionato Dy0.01, La0.99 phenanthroline
tris 1-phenyl-1,3-butanedionato Dy0.01, La0.99 bathocuproine
tris 1-phenyl-1,3-butanedionato Dy0.01, La0.99 bathophenanthroline
tris acetylacetonato Dy0.5, La0.5 dimethylaminopyridine
tris acetylacetonato Dy0.5, La0.5 4-picoline-N-oxide
tris acetylacetonato Dy0.5, La0.5 4-phenylpyridine
tris acetylacetonato Dy0.5, La0.5 4-phenylpyridine-N-oxide
tris acetylacetonato Dy0.5, La0.5 1-methylimidazole
tris acetylacetonato Dy0.5, La0.5 triphenylphosphine oxide
tris acetylacetonato Dy0.5, La0.5 2,2-bipyridyl
tris acetylacetonato Dy0.5, La0.5 2,2-bipyridyl-N,N-dioxide
tris acetylacetonato Dy0.5, La0.5 phenanthroline
tris acetylacetonato Dy0.5, La0.5 bathocuproine
tris acetylacetonato Dy0.5, La0.5 bathophenanthroline
tris dibenzoylmethanato Dy0.5, La0.5 dimethylaminopyridine
tris dibenzoylmethanato Dy0.5, La0.5 4-picoline-N-oxide
tris dibenzoylmethanato Dy0.5, La0.5 4-phenylpyridine
tris dibenzoylmethanato Dy0.5, La0.5 4-phenylpyridine-N-oxide
tris dibenzoylmethanato Dy0.5, La0.5 1-methylimidazole
tris dibenzoylmethanato Dy0.5, La0.5 triphenylphosphine oxide
tris dibenzoylmethanato Dy0.5, La0.5 2,2-bipyridyl
tris dibenzoylmethanato Dy0.5, La0.5 2,2-bipyridyl-N,N-dioxide
tris dibenzoylmethanato Dy0.5, La0.5 phenanthroline
tris dibenzoylmethanato Dy0.5, La0.5 bathocuproine
tris dibenzoylmethanato Dy0.5, La0.5 bathophenanthroline
tris thenoyltrifluoroacetonato Dy0.5, La0.5 dimethylaminopyridine
tris thenoyltrifluoroacetonato Dy0.5, La0.5 4-picoline-N-oxide
tris thenoyltrifluoroacetonato Dy0.5, La0.5 4-phenylpyridine
tris thenoyltrifluoroacetonato Dy0.5, La0.5 4-phenylpyridine-N-oxide
tris thenoyltrifluoroacetonato Dy0.5, La0.5 1-methylimidazole
tris thenoyltrifluoroacetonato Dy0.5, La0.5 triphenylphosphine oxide
tris thenoyltrifluoroacetonato Dy0.5, La0.5 2,2-bipyridyl
tris thenoyltrifluoroacetonato Dy0.5, La0.5 2,2-bipyridyl-N,N-dioxide
tris thenoyltrifluoroacetonato Dy0.5, La0.5 phenanthroline
tris thenoyltrifluoroacetonato Dy0.5, La0.5 bathocuproine
tris thenoyltrifluoroacetonato Dy0.5, La0.5 bathophenanthroline
tris 2,2,6,6-tetramethylheptanedionato Dy0.5, La0.5 dimethylaminopyridine
tris 2,2,6,6-tetramethylheptanedionato Dy0.5, La0.5 4-picoline-N-oxide
tris 2,2,6,6-tetramethylheptanedionato Dy0.5, La0.5 4-phenylpyridine
tris 2,2,6,6-tetramethylheptanedionato Dy0.5, La0.5 4-phenylpyridine-N-oxide
tris 2,2,6,6-tetramethylheptanedionato Dy0.5, La0.5 1-methylimidazole
tris 2,2,6,6-tetramethylheptanedionato Dy0.5, La0.5 triphenylphosphine oxide
tris 2,2,6,6-tetramethylheptanedionato Dy0.5, La0.5 2,2-bipyridyl
tris 2,2,6,6-tetramethylheptanedionato Dy0.5, La0.5 2,2-bipyridyl-N,N-dioxide
tris 2,2,6,6-tetramethylheptanedionato Dy0.5, La0.5 phenanthroline
tris 2,2,6,6-tetramethylheptanedionato Dy0.5, La0.5 bathocuproine
tris 2,2,6,6-tetramethylheptanedionato Dy0.5, La0.5 bathophenanthroline
tris 3-methylpentane-2,4-dionato Dy0.5, La0.5 dimethylaminopyridine
tris 3-methylpentane-2,4-dionato Dy0.5, La0.5 4-picoline-N-oxide
tris 3-methylpentane-2,4-dionato Dy0.5, La0.5 4-phenylpyridine
tris 3-methylpentane-2,4-dionato Dy0.5, La0.5 4-phenylpyridine-N-oxide
tris 3-methylpentane-2,4-dionato Dy0.5, La0.5 1-methylimidazole
tris 3-methylpentane-2,4-dionato Dy0.5, La0.5 triphenylphosphine oxide
tris 3-methylpentane-2,4-dionato Dy0.5, La0.5 2,2-bipyridyl
tris 3-methylpentane-2,4-dionato Dy0.5, La0.5 2,2-bipyridyl-N,N-dioxide
tris 3-methylpentane-2,4-dionato Dy0.5, La0.5 phenanthroline
tris 3-methylpentane-2,4-dionato Dy0.5, La0.5 bathocuproine
tris 3-methylpentane-2,4-dionato Dy0.5, La0.5 bathophenanthroline
tris 3-ethylpentane-2,4-dionato Dy0.5, La0.5 dimethylaminopyridine
tris 3-ethylpentane-2,4-dionato Dy0.5, La0.5 4-picoline-N-oxide
tris 3-ethylpentane-2,4-dionato Dy0.5, La0.5 4-phenylpyridine
tris 3-ethylpentane-2,4-dionato Dy0.5, La0.5 4-phenylpyridine-N-oxide
tris 3-ethylpentane-2,4-dionato Dy0.5, La0.5 1-methylimidazole
tris 3-ethylpentane-2,4-dionato Dy0.5, La0.5 triphenylphosphine oxide
tris 3-ethylpentane-2,4-dionato Dy0.5, La0.5 2,2-bipyridyl
tris 3-ethylpentane-2,4-dionato Dy0.5, La0.5 2,2-bipyridyl-N,N-dioxide
tris 3-ethylpentane-2,4-dionato Dy0.5, La0.5 phenanthroline
tris 3-ethylpentane-2,4-dionato Dy0.5, La0.5 bathocuproine
tris 3-ethylpentane-2,4-dionato Dy0.5, La0.5 bathophenanthroline
tris pivaloyltrifluoroacetonato Dy0.5, La0.5 dimethylaminopyridine tris pivaloyltrifluoroacetonato Dy0.5, La0.5 4-picoline-N-oxide
tris pivaloyltrifluoroacetonato Dy0.5, La0.5 4-phenylpyridine
tris pivaloyltrifluoroacetonato Dy0.5, La0.5 4-phenylpyridine-N-oxide
tris pivaloyltrifluoroacetonato Dy0.5, La0.5 1-methylimidazole
tris pivaloyltrifluoroacetonato Dy0.5, La0.5 triphenylphosphine oxide
tris pivaloyltrifluoroacetonato Dy0.5, La0.5 2,2-bipyridyl
tris pivaloyltrifluoroacetonato Dy0.5, La0.5 2,2-bipyridyl-N,N-dioxide
tris pivaloyltrifluoroacetonato Dy0.5, La0.5 phenanthroline
tris pivaloyltrifluoroacetonato Dy0.5, La0.5 bathocuproine
tris pivaloyltrifluoroacetonato Dy0.5, La0.5 bathophenanthroline
tris trifluoroacetylacetonato Dy0.5, La0.5 dimethylaminopyridine
tris trifluoroacetylacetonato Dy0.5, La0.5 4-picoline-N-oxide
tris trifluoroacetylacetonato Dy0.5, La0.5 4-phenylpyridine
tris trifluoroacetylacetonato Dy0.5, La0.5 4-phenylpyridine-N-oxide
tris trifluoroacetylacetonato Dy0.5, La0.5 1-methylimidazole
tris trifluoroacetylacetonato Dy0.5, La0.5 triphenylphosphine oxide
tris trifluoroacetylacetonato Dy0.5, La0.5 2,2-bipyridyl
tris trifluoroacetylacetonato Dy0.5, La0.5 2,2-bipyridyl-N,N-dioxide
tris trifluoroacetylacetonato Dy0.5, La0.5 phenanthroline
tris trifluoroacetylacetonato Dy0.5, La0.5 bathocuproine
tris trifluoroacetylacetonato Dy0.5, La0.5 bathophenanthroline
tris hexafluoroacetylacetonato Dy0.5, La0.5 dimethylaminopyridine
tris hexafluoroacetylacetonato Dy0.5, La0.5 4-picoline-N-oxide
tris hexafluoroacetylacetonato Dy0.5, La0.5 4-phenylpyridine
tris hexafluoroacetylacetonato Dy0.5, La0.5 4-phenylpyridine-N-oxide
tris hexafluoroacetylacetonato Dy0.5, La0.5 1-methylimidazole
tris hexafluoroacetylacetonato Dy0.5, La0.5 triphenylphosphine oxide
tris hexafluoroacetylacetonato Dy0.5, La0.5 2,2-bipyridyl
tris hexafluoroacetylacetonato Dy0.5, La0.5 2,2-bipyridyl-N,N-dioxide
tris hexafluoroacetylacetonato Dy0.5, La0.5 phenanthroline
tris hexafluoroacetylacetonato Dy0.5, La0.5 bathocuproine
tris hexafluoroacetylacetonato Dy0.5, La0.5 bathophenanthroline
tris 6,6,7,7,8,8,8-heptafluoro-2,2-dimethyloctanedionato Dy0.5, La0.5 dimethylaminopyridine
tris 6,6,7,7,8,8,8-heptafluoro-2,2-dimethyloctanedionato Dy0.5, La0.5 4-picoline-N-oxide
tris 6,6,7,7,8,8,8-heptafluoro-2,2-dimethyloctanedionato Dy0.5, La0.5 4-phenylpyridine
tris 6,6,7,7,8,8,8-heptafluoro-2,2-dimethyloctanedionato Dy0.5, La0.5 4-phenylpyridine-N-oxide
tris 6,6,7,7,8,8,8-heptafluoro-2,2-dimethyloctanedionato Dy0.5, La0.5 1-methylimidazole
tris 6,6,7,7,8,8,8-heptafluoro-2,2-dimethyloctanedionato Dy0.5, La0.5 triphenylphosphine oxide
tris 6,6,7,7,8,8,8-heptafluoro-2,2-dimethyloctanedionato Dy0.5, La0.5 2,2-bipyridyl
tris 6,6,7,7,8,8,8-heptafluoro-2,2-dimethyloctanedionato Dy0.5, La0.5 2,2-bipyridyl-N,N-dioxide
tris 6,6,7,7,8,8,8-heptafluoro-2,2-dimethyloctanedionato Dy0.5, La0.5 phenanthroline
tris 6,6,7,7,8,8,8-heptafluoro-2,2-dimethyloctanedionato Dy0.5, La0.5 bathocuproine
tris 6,6,7,7,8,8,8-heptafluoro-2,2-dimethyloctanedionato Dy0.5, La0.5 bathophenanthroline
tris 1-phenyl-1,3-butanedionato Dy0.5, La0.5 dimethylaminopyridine
tris 1-phenyl-1,3-butanedionato Dy0.5, La0.5 4-picoline-N-oxide
tris 1-phenyl-1,3-butanedionato Dy0.5, La0.5 4-phenylpyridine
tris 1-phenyl-1,3-butanedionato Dy0.5, La0.5 4-phenylpyridine-N-oxide
tris 1-phenyl-1,3-butanedionato Dy0.5, La0.5 1-methylimidazole
tris 1-phenyl-1,3-butanedionato Dy0.5, La0.5 triphenylphosphine oxide
tris 1-phenyl-1,3-butanedionato Dy0.5, La0.5 2,2-bipyridyl
tris 1-phenyl-1,3-butanedionato Dy0.5, La0.5 2,2-bipyridyl-N,N-dioxide
tris 1-phenyl-1,3-butanedionato Dy0.5, La0.5 phenanthroline
tris 1-phenyl-1,3-butanedionato Dy0.5, La0.5 bathocuproine
tris 1-phenyl-1,3-butanedionato Dy0.5, La0.5 bathophenanthroline
tris acetylacetonato Dy0.2, La0.8 dimethylaminopyridine
tris acetylacetonato Dy0.2, La0.8 4-picoline-N-oxide
tris acetylacetonato Dy0.2, La0.8 4-phenylpyridine
tris acetylacetonato Dy0.2, La0.8 4-phenylpyridine-N-oxide
tris acetylacetonato Dy0.2, La0.8 1-methylimidazole
tris acetylacetonato Dy0.2, La0.8 triphenylphosphine oxide
tris acetylacetonato Dy0.2, La0.8 2,2-bipyridyl
tris acetylacetonato Dy0.2, La0.8 2,2-bipyridyl-N,N-dioxide
tris acetylacetonato Dy0.2, La0.8 phenanthroline
tris acetylacetonato Dy0.2, La0.8 bathocuproine
tris acetylacetonato Dy0.2, La0.8 bathophenanthroline
tris dibenzoylmethanato Dy0.2, La0.8 dimethylaminopyridine
tris dibenzoylmethanato Dy0.2, La0.8 4-picoline-N-oxide
tris dibenzoylmethanato Dy0.2, La0.8 4-phenylpyridine
tris dibenzoylmethanato Dy0.2, La0.8 4-phenylpyridine-N-oxide
tris dibenzoylmethanato Dy0.2, La0.8 1-methylimidazole
tris dibenzoylmethanato Dy0.2, La0.8 triphenylphosphine oxide
tris dibenzoylmethanato Dy0.2, La0.8 2,2-bipyridyl
tris dibenzoylmethanato Dy0.2, La0.8 2,2-bipyridyl-N,N-dioxide
tris dibenzoylmethanato Dy0.2, La0.8 phenanthroline
tris dibenzoylmethanato Dy0.2, La0.8 bathocuproine
tris dibenzoylmethanato Dy0.2, La0.8 bathophenanthroline
tris thenoyltrifluoroacetonato Dy0.2, La0.8 dimethylaminopyridine
tris thenoyltrifluoroacetonato Dy0.2, La0.8 4-picoline-N-oxide
tris thenoyltrifluoroacetonato Dy0.2, La0.8 4-phenylpyridine
tris thenoyltrifluoroacetonato Dy0.2, La0.8 4-phenylpyridine-N-oxide
tris thenoyltrifluoroacetonato Dy0.2, La0.8 1-methylimidazole tris thenoyltrifluoroacetonato Dy0.2, La0.8 triphenylphosphine oxide
tris thenoyltrifluoroacetonato Dy0.2, La0.8 2,2-bipyridyl
tris thenoyltrifluoroacetonato Dy0.2, La0.8 2,2-bipyridyl-N,N-dioxide
tris thenoyltrifluoroacetonato Dy0.2, La0.8 phenanthroline
tris thenoyltrifluoroacetonato Dy0.2, La0.8 bathocuproine
tris thenoyltrifluoroacetonato Dy0.2, La0.8 bathophenanthroline
tris 2,2,6,6-tetramethylheptanedionato Dy0.2, La0.8 dimethylaminopyridine
tris 2,2,6,6-tetramethylheptanedionato Dy0.2, La0.8 4-picoline-N-oxide
tris 2,2,6,6-tetramethylheptanedionato Dy0.2, La0.8 4-phenylpyridine
tris 2,2,6,6-tetramethylheptanedionato Dy0.2, La0.8 4-phenylpyridine-N-oxide
tris 2,2,6,6-tetramethylheptanedionato Dy0.2, La0.8 1-methylimidazole
tris 2,2,6,6-tetramethylheptanedionato Dy0.2, La0.8 triphenylphosphine oxide
tris 2,2,6,6-tetramethylheptanedionato Dy0.2, La0.8 2,2-bipyridyl
tris 2,2,6,6-tetramethylheptanedionato Dy0.2, La0.8 2,2-bipyridyl-N,N-dioxide
tris 2,2,6,6-tetramethylheptanedionato Dy0.2, La0.8 phenanthroline
tris 2,2,6,6-tetramethylheptanedionato Dy0.2, La0.8 bathocuproine
tris 2,2,6,6-tetramethylheptanedionato Dy0.2, La0.8 bathophenanthroline
tris 3-methylpentane-2,4-dionato Dy0.2, La0.8 dimethylaminopyridine
tris 3-methylpentane-2,4-dionato Dy0.2, La0.8 4-picoline-N-oxide
tris 3-methylpentane-2,4-dionato Dy0.2, La0.8 4-phenylpyridine
tris 3-methylpentane-2,4-dionato Dy0.2, La0.8 4-phenylpyridine-N-oxide
tris 3-methylpentane-2,4-dionato Dy0.2, La0.8 1-methylimidazole
tris 3-methylpentane-2,4-dionato Dy0.2, La0.8 triphenylphosphine oxide
tris 3-methylpentane-2,4-dionato Dy0.2, La0.8 2,2-bipyridyl
tris 3-methylpentane-2,4-dionato Dy0.2, La0.8 2,2-bipyridyl-N,N-dioxide
tris 3-methylpentane-2,4-dionato Dy0.2, La0.8 phenanthroline
tris 3-methylpentane-2,4-dionato Dy0.2, La0.8 bathocuproine
tris 3-methylpentane-2,4-dionato Dy0.2, La0.8 bathophenanthroline
tris 3-ethylpentane-2,4-dionato Dy0.2, La0.8 dimethylaminopyridine
tris 3-ethylpentane-2,4-dionato Dy0.2, La0.8 4-picoline-N-oxide
tris 3-ethylpentane-2,4-dionato Dy0.2, La0.8 4-phenylpyridine
tris 3-ethylpentane-2,4-dionato Dy0.2, La0.8 4-phenylpyridine-N-oxide
tris 3-ethylpentane-2,4-dionato Dy0.2, La0.8 1-methylimidazole
tris 3-ethylpentane-2,4-dionato Dy0.2, La0.8 triphenylphosphine oxide
tris 3-ethylpentane-2,4-dionato Dy0.2, La0.8 2,2-bipyridyl
tris 3-ethylpentane-2,4-dionato Dy0.2, La0.8 2,2-bipyridyl-N,N-dioxide
tris 3-ethylpentane-2,4-dionato Dy0.2, La0.8 phenanthroline
tris 3-ethylpentane-2,4-dionato Dy0.2, La0.8 bathocuproine
tris 3-ethylpentane-2,4-dionato Dy0.2, La0.8 bathophenanthroline
tris pivaloyltrifluoroacetonato Dy0.2, La0.8 dimethylaminopyridine
tris pivaloyltrifluoroacetonato Dy0.2, La0.8 4-picoline-N-oxide
tris pivaloyltrifluoroacetonato Dy0.2, La0.8 4-phenylpyridine
tris pivaloyltrifluoroacetonato Dy0.2, La0.8 4-phenylpyridine-N-oxide
tris pivaloyltrifluoroacetonato Dy0.2, La0.8 1-methylimidazole
tris pivaloyltrifluoroacetonato Dy0.2, La0.8 triphenylphosphine oxide
tris pivaloyltrifluoroacetonato Dy0.2, La0.8 2,2-bipyridyl
tris pivaloyltrifluoroacetonato Dy0.2, La0.8 2,2-bipyridyl-N,N-dioxide
tris pivaloyltrifluoroacetonato Dy0.2, La0.8 phenanthroline
tris pivaloyltrifluoroacetonato Dy0.2, La0.8 bathocuproine
tris pivaloyltrifluoroacetonato Dy0.2, La0.8 bathophenanthroline
tris trifluoroacetylacetonato Dy0.2, La0.8 dimethylaminopyridine
tris trifluoroacetylacetonato Dy0.2, La0.8 4-picoline-N-oxide
tris trifluoroacetylacetonato Dy0.2, La0.8 4-phenylpyridine
tris trifluoroacetylacetonato Dy0.2, La0.8 4-phenylpyridine-N-oxide
tris trifluoroacetylacetonato Dy0.2, La0.8 1-methylimidazole
tris trifluoroacetylacetonato Dy0.2, La0.8 triphenylphosphine oxide
tris trifluoroacetylacetonato Dy0.2, La0.8 2,2-bipyridyl
tris trifluoroacetylacetonato Dy0.2, La0.8 2,2-bipyridyl-N,N-dioxide
tris trifluoroacetylacetonato Dy0.2, La0.8 phenanthroline
tris trifluoroacetylacetonato Dy0.2, La0.8 bathocuproine
tris trifluoroacetylacetonato Dy0.2, La0.8 bathophenanthroline
tris hexafluoroacetylacetonato Dy0.2, La0.8 dimethylaminopyridine
tris hexafluoroacetylacetonato Dy0.2, La0.8 4-picoline-N-oxide
tris hexafluoroacetylacetonato Dy0.2, La0.8 4-phenylpyridine
tris hexafluoroacetylacetonato Dy0.2, La0.8 4-phenylpyridine-N-oxide
tris hexafluoroacetylacetonato Dy0.2, La0.8 1-methylimidazole
tris hexafluoroacetylacetonato Dy0.2, La0.8 triphenylphosphine oxide
tris hexafluoroacetylacetonato Dy0.2, La0.8 2,2-bipyridyl
tris hexafluoroacetylacetonato Dy0.2, La0.8 2,2-bipyridyl-N,N-dioxide
tris hexafluoroacetylacetonato Dy0.2, La0.8 phenanthroline
tris hexafluoroacetylacetonato Dy0.2, La0.8 bathocuproine
tris hexafluoroacetylacetonato Dy0.2, La0.8 bathophenanthroline
tris 6,6,7,7,8,8,8-heptafluoro-2,2-dimethyloctanedionato Dy0.2, La0.8 dimethylaminopyridine
tris 6,6,7,7,8,8,8-heptafluoro-2,2-dimethyloctanedionato Dy0.2, La0.8 4-picoline-N-oxide
tris 6,6,7,7,8,8,8-heptafluoro-2,2-dimethyloctanedionato Dy0.2, La0.8 4-phenylpyridine tris 6,6,7,7,8,8,8-heptafluoro-2,2-dimethyloctanedionato Dy0.2, La0.8 4-phenylpyridine-N-oxide
tris 6,6,7,7,8,8,8-heptafluoro-2,2-dimethyloctanedionato Dy0.2, La0.8 1-methylimidazole
tris 6,6,7,7,8,8,8-heptafluoro-2,2-dimethyloctanedionato Dy0.2, La0.8 triphenylphosphine oxide
tris 6,6,7,7,8,8,8-heptafluoro-2,2-dimethyloctanedionato Dy0.2, La0.8 2,2-bipyridyl
tris 6,6,7,7,8,8,8-heptafluoro-2,2-dimethyloctanedionato Dy0.2, La0.8 2,2-bipyridyl-N,N-dioxide
tris 6,6,7,7,8,8,8-heptafluoro-2,2-dimethyloctanedionato Dy0.2, La0.8 phenanthroline
tris 6,6,7,7,8,8,8-heptafluoro-2,2-dimethyloctanedionato Dy0.2, La0.8 bathocuproine
tris 6,6,7,7,8,8,8-heptafluoro-2,2-dimethyloctanedionato Dy0.2, La0.8 bathophenanthroline
tris 1-phenyl-1,3-butanedionato Dy0.2, La0.8 dimethylaminopyridine
tris 1-phenyl-1,3-butanedionato Dy0.2, La0.8 4-picoline-N-oxide
tris 1-phenyl-1,3-butanedionato Dy0.2, La0.8 4-phenylpyridine
tris 1-phenyl-1,3-butanedionato Dy0.2, La0.8 4-phenylpyridine-N-oxide
tris 1-phenyl-1,3-butanedionato Dy0.2, La0.8 1-methylimidazole
tris 1-phenyl-1,3-butanedionato Dy0.2, La0.8 triphenylphosphine oxide
tris 1-phenyl-1,3-butanedionato Dy0.2, La0.8 2,2-bipyridyl
tris 1-phenyl-1,3-butanedionato Dy0.2, La0.8 2,2-bipyridyl-N,N-dioxide
tris 1-phenyl-1,3-butanedionato Dy0.2, La0.8 phenanthroline
tris 1-phenyl-1,3-butanedionato Dy0.2, La0.8 bathocuproine
tris 1-phenyl-1,3-butanedionato Dy0.2, La0.8 bathophenanthroline
tris acetylacetonato Dy0.1, La0.9 dimethylaminopyridine
tris acetylacetonato Dy0.1, La0.9 4-picoline-N-oxide
tris acetylacetonato Dy0.1, La0.9 4-phenylpyridine
tris acetylacetonato Dy0.1, La0.9 4-phenylpyridine-N-oxide
tris acetylacetonato Dy0.1, La0.9 1-methylimidazole
tris acetylacetonato Dy0.1, La0.9 triphenylphosphine oxide
tris acetylacetonato Dy0.1, La0.9 2,2-bipyridyl
tris acetylacetonato Dy0.1, La0.9 2,2-bipyridyl-N,N-dioxide
tris acetylacetonato Dy0.1, La0.9 phenanthroline
tris acetylacetonato Dy0.1, La0.9 bathocuproine
tris acetylacetonato Dy0.1, La0.9 bathophenanthroline
tris dibenzoylmethanato Dy0.1, La0.9 dimethylaminopyridine
tris dibenzoylmethanato Dy0.1, La0.9 4-picoline-N-oxide
tris dibenzoylmethanato Dy0.1, La0.9 4-phenylpyridine
tris dibenzoylmethanato Dy0.1, La0.9 4-phenylpyridine-N-oxide
tris dibenzoylmethanato Dy0.1, La0.9 1-methylimidazole
tris dibenzoylmethanato Dy0.1, La0.9 triphenylphosphine oxide
tris dibenzoylmethanato Dy0.1, La0.9 2,2-bipyridyl
tris dibenzoylmethanato Dy0.1, La0.9 2,2-bipyridyl-N,N-dioxide
tris dibenzoylmethanato Dy0.1, La0.9 phenanthroline
tris dibenzoylmethanato Dy0.1, La0.9 bathocuproine
tris dibenzoylmethanato Dy0.1, La0.9 bathophenanthroline
tris thenoyltrifluoroacetonato Dy0.1, La0.9 dimethylaminopyridine
tris thenoyltrifluoroacetonato Dy0.1, La0.9 4-picoline-N-oxide
tris thenoyltrifluoroacetonato Dy0.1, La0.9 4-phenylpyridine
tris thenoyltrifluoroacetonato Dy0.1, La0.9 4-phenylpyridine-N-oxide
tris thenoyltrifluoroacetonato Dy0.1, La0.9 1-methylimidazole
tris thenoyltrifluoroacetonato Dy0.1, La0.9 triphenylphosphine oxide
tris thenoyltrifluoroacetonato Dy0.1, La0.9 2,2-bipyridyl
tris thenoyltrifluoroacetonato Dy0.1, La0.9 2,2-bipyridyl-N,N-dioxide
tris thenoyltrifluoroacetonato Dy0.1, La0.9 phenanthroline
tris thenoyltrifluoroacetonato Dy0.1, La0.9 bathocuproine
tris thenoyltrifluoroacetonato Dy0.1, La0.9 bathophenanthroline
tris 2,2,6,6-tetramethylheptanedionato Dy0.1, La0.9 dimethylaminopyridine
tris 2,2,6,6-tetramethylheptanedionato Dy0.1, La0.9 4-picoline-N-oxide
tris 2,2,6,6-tetramethylheptanedionato Dy0.1, La0.9 4-phenylpyridine
tris 2,2,6,6-tetramethylheptanedionato Dy0.1, La0.9 4-phenylpyridine-N-oxide
tris 2,2,6,6-tetramethylheptanedionato Dy0.1, La0.9 1-methylimidazole
tris 2,2,6,6-tetramethylheptanedionato Dy0.1, La0.9 triphenylphosphine oxide
tris 2,2,6,6-tetramethylheptanedionato Dy0.1, La0.9 2,2-bipyridyl
tris 2,2,6,6-tetramethylheptanedionato Dy0.1, La0.9 2,2-bipyridyl-N,N-dioxide
tris 2,2,6,6-tetramethylheptanedionato Dy0.1, La0.9 phenanthroline
tris 2,2,6,6-tetramethylheptanedionato Dy0.1, La0.9 bathocuproine
tris 2,2,6,6-tetramethylheptanedionato Dy0.1, La0.9 bathophenanthroline
tris 3-methylpentane-2,4-dionato Dy0.1, La0.9 dimethylaminopyridine
tris 3-methylpentane-2,4-dionato Dy0.1, La0.9 4-picoline-N-oxide
tris 3-methylpentane-2,4-dionato Dy0.1, La0.9 4-phenylpyridine
tris 3-methylpentane-2,4-dionato Dy0.1, La0.9 4-phenylpyridine-N-oxide
tris 3-methylpentane-2,4-dionato Dy0.1, La0.9 1-methylimidazole
tris 3-methylpentane-2,4-dionato Dy0.1, La0.9 triphenylphosphine oxide
tris 3-methylpentane-2,4-dionato Dy0.1, La0.9 2,2-bipyridyl
tris 3-methylpentane-2,4-dionato Dy0.1, La0.9 2,2-bipyridyl-N,N-dioxide
tris 3-methylpentane-2,4-dionato Dy0.1, La0.9 phenanthroline
tris 3-methylpentane-2,4-dionato Dy0.1, La0.9 bathocuproine
tris 3-methylpentane-2,4-dionato Dy0.1, La0.9 bathophenanthroline
tris 3-ethylpentane-2,4-dionato Dy0.1, La0.9 dimethylaminopyridine
tris 3-ethylpentane-2,4-dionato Dy0.1, La0.9 4-picoline-N-oxide
tris 3-ethylpentane-2,4-dionato Dy0.1, La0.9 4-phenylpyridine
tris 3-ethylpentane-2,4-dionato Dy0.1, La0.9 4-phenylpyridine-N-oxide tris 3-ethylpentane-2,4-dionato Dy0.1, La0.9 1-methylimidazole
tris 3-ethylpentane-2,4-dionato Dy0.1, La0.9 triphenylphosphine oxide
tris 3-ethylpentane-2,4-dionato Dy0.1, La0.9 2,2-bipyridyl
tris 3-ethylpentane-2,4-dionato Dy0.1, La0.9 2,2-bipyridyl-N,N-dioxide
tris 3-ethylpentane-2,4-dionato Dy0.1, La0.9 phenanthroline
tris 3-ethylpentane-2,4-dionato Dy0.1, La0.9 bathocuproine
tris 3-ethylpentane-2,4-dionato Dy0.1, La0.9 bathophenanthroline
tris pivaloyltrifluoroacetonato Dy0.1, La0.9 dimethylaminopyridine
tris pivaloyltrifluoroacetonato Dy0.1, La0.9 4-picoline-N-oxide
tris pivaloyltrifluoroacetonato Dy0.1, La0.9 4-phenylpyridine
tris pivaloyltrifluoroacetonato Dy0.1, La0.9 4-phenylpyridine-N-oxide
tris pivaloyltrifluoroacetonato Dy0.1, La0.9 1-methylimidazole
tris pivaloyltrifluoroacetonato Dy0.1, La0.9 triphenylphosphine oxide
tris pivaloyltrifluoroacetonato Dy0.1, La0.9 2,2-bipyridyl
tris pivaloyltrifluoroacetonato Dy0.1, La0.9 2,2-bipyridyl-N,N-dioxide
tris pivaloyltrifluoroacetonato Dy0.1, La0.9 phenanthroline
tris pivaloyltrifluoroacetonato Dy0.1, La0.9 bathocuproine
tris pivaloyltrifluoroacetonato Dy0.1, La0.9 bathophenanthroline
tris trifluoroacetylacetonato Dy0.1, La0.9 dimethylaminopyridine
tris trifluoroacetylacetonato Dy0.1, La0.9 4-picoline-N-oxide
tris trifluoroacetylacetonato Dy0.1, La0.9 4-phenylpyridine
tris trifluoroacetylacetonato Dy0.1, La0.9 4-phenylpyridine-N-oxide
tris trifluoroacetylacetonato Dy0.1, La0.9 1-methylimidazole
tris trifluoroacetylacetonato Dy0.1, La0.9 triphenylphosphine oxide
tris trifluoroacetylacetonato Dy0.1, La0.9 2,2-bipyridyl
tris trifluoroacetylacetonato Dy0.1, La0.9 2,2-bipyridyl-N,N-dioxide
tris trifluoroacetylacetonato Dy0.1, La0.9 phenanthroline
tris trifluoroacetylacetonato Dy0.1, La0.9 bathocuproine
tris trifluoroacetylacetonato Dy0.1, La0.9 bathophenanthroline
tris hexafluoroacetylacetonato Dy0.1, La0.9 dimethylaminopyridine
tris hexafluoroacetylacetonato Dy0.1, La0.9 4-picoline-N-oxide
tris hexafluoroacetylacetonato Dy0.1, La0.9 4-phenylpyridine
tris hexafluoroacetylacetonato Dy0.1, La0.9 4-phenylpyridine-N-oxide
tris hexafluoroacetylacetonato Dy0.1, La0.9 1-methylimidazole
tris hexafluoroacetylacetonato Dy0.1, La0.9 triphenylphosphine oxide
tris hexafluoroacetylacetonato Dy0.1, La0.9 2,2-bipyridyl
tris hexafluoroacetylacetonato Dy0.1, La0.9 2,2-bipyridyl-N,N-dioxide
tris hexafluoroacetylacetonato Dy0.1, La0.9 phenanthroline
tris hexafluoroacetylacetonato Dy0.1, La0.9 bathocuproine
tris hexafluoroacetylacetonato Dy0.1, La0.9 bathophenanthroline
tris 6,6,7,7,8,8,8-heptafluoro-2,2-dimethyloctanedionato Dy0.1, La0.9 dimethylaminopyridine
tris 6,6,7,7,8,8,8-heptafluoro-2,2-dimethyloctanedionato Dy0.1, La0.9 4-picoline-N-oxide
tris 6,6,7,7,8,8,8-heptafluoro-2,2-dimethyloctanedionato Dy0.1, La0.9 4-phenylpyridine
tris 6,6,7,7,8,8,8-heptafluoro-2,2-dimethyloctanedionato Dy0.1, La0.9 4-phenylpyridine-N-oxide
tris 6,6,7,7,8,8,8-heptafluoro-2,2-dimethyloctanedionato Dy0.1, La0.9 1-methylimidazole
tris 6,6,7,7,8,8,8-heptafluoro-2,2-dimethyloctanedionato Dy0.1, La0.9 triphenylphosphine oxide
tris 6,6,7,7,8,8,8-heptafluoro-2,2-dimethyloctanedionato Dy0.1, La0.9 2,2-bipyridyl
tris 6,6,7,7,8,8,8-heptafluoro-2,2-dimethyloctanedionato Dy0.1, La0.9 2,2-bipyridyl-N,N-dioxide
tris 6,6,7,7,8,8,8-heptafluoro-2,2-dimethyloctanedionato Dy0.1, La0.9 phenanthroline
tris 6,6,7,7,8,8,8-heptafluoro-2,2-dimethyloctanedionato Dy0.1, La0.9 bathocuproine
tris 6,6,7,7,8,8,8-heptafluoro-2,2-dimethyloctanedionato Dy0.1, La0.9 bathophenanthroline
tris 1-phenyl-1,3-butanedionato Dy0.1, La0.9 dimethylaminopyridine
tris 1-phenyl-1,3-butanedionato Dy0.1, La0.9 4-picoline-N-oxide
tris 1-phenyl-1,3-butanedionato Dy0.1, La0.9 4-phenylpyridine
tris 1-phenyl-1,3-butanedionato Dy0.1, La0.9 4-phenylpyridine-N-oxide
tris 1-phenyl-1,3-butanedionato Dy0.1, La0.9 1-methylimidazole
tris 1-phenyl-1,3-butanedionato Dy0.1, La0.9 triphenylphosphine oxide
tris 1-phenyl-1,3-butanedionato Dy0.1, La0.9 2,2-bipyridyl
tris 1-phenyl-1,3-butanedionato Dy0.1, La0.9 2,2-bipyridyl-N,N-dioxide
tris 1-phenyl-1,3-butanedionato Dy0.1, La0.9 phenanthroline
tris 1-phenyl-1,3-butanedionato Dy0.1, La0.9 bathocuproine
tris 1-phenyl-1,3-butanedionato Dy0.1, La0.9 bathophenanthroline
tris acetylacetonato Dy0.01, La0.99 dimethylaminopyridine
tris acetylacetonato Dy0.01, La0.99 4-picoline-N-oxide
tris acetylacetonato Dy0.01, La0.99 4-phenylpyridine
tris acetylacetonato Dy0.01, La0.99 4-phenylpyridine-N-oxide
tris acetylacetonato Dy0.01, La0.99 1-methylimidazole
tris acetylacetonato Dy0.01, La0.99 triphenylphosphine oxide
tris acetylacetonato Dy0.01, La0.99 2,2-bipyridyl
tris acetylacetonato Dy0.01, La0.99 2,2-bipyridyl-N,N-dioxide
tris acetylacetonato Dy0.01, La0.99 phenanthroline
tris acetylacetonato Dy0.01, La0.99 bathocuproine
tris acetylacetonato Dy0.01, La0.99 bathophenanthroline
tris dibenzoylmethanato Dy0.01, La0.99 dimethylaminopyridine
tris dibenzoylmethanato Dy0.01, La0.99 4-picoline-N-oxide
tris dibenzoylmethanato Dy0.01, La0.99 4-phenylpyridine
tris dibenzoylmethanato Dy0.01, La0.99 4-phenylpyridine-N-oxide
tris dibenzoylmethanato Dy0.01, La0.99 1-methylimidazole
tris dibenzoylmethanato Dy0.01, La0.99 triphenylphosphine oxide
tris dibenzoylmethanato Dy0.01, La0.99 2,2-bipyridyl tris dibenzoylmethanato Dy0.01, La0.99 2,2-bipyridyl-N,N-dioxide tris dibenzoylmethanato Dy0.01, La0.99 phenanthroline tris dibenzoylmethanato Dy0.01, La0.99 bathocuproine tris dibenzoylmethanato Dy0.01, La0.99 bathophenanthroline tris thenoyltrifluoroacetonato Dy0.01, La0.99 dimethylaminopyridine tris thenoyltrifluoroacetonato Dy0.01, La0.99 4-picoline-N-oxide tris thenoyltrifluoroacetonato Dy0.01, La0.99 4-phenylpyridine tris thenoyltrifluoroacetonato Dy0.01, La0.99 4-phenylpyridine-N-oxide tris thenoyltrifluoroacetonato Dy0.01, La0.99 1-methylimidazole tris thenoyltrifluoroacetonato Dy0.01, La0.99 triphenylphosphine oxide tris thenoyltrifluoroacetonato Dy0.01, La0.99 2,2-bipyridyl tris thenoyltrifluoroacetonato Dy0.01, La0.99 2,2-bipyridyl-N,N-dioxide tris thenoyltrifluoroacetonato Dy0.01, La0.99 phenanthroline tris thenoyltrifluoroacetonato Dy0.01, La0.99 bathocuproine tris thenoyltrifluoroacetonato Dy0.01, La0.99 bathophenanthroline tris 2,2,6,6-tetramethylheptanedionato Dy0.01, La0.99 dimethylaminopyridine tris 2,2,6,6-tetramethylheptanedionato Dy0.01, La0.99 4-picoline-N-oxide tris 2,2,6,6-tetramethylheptanedionato Dy0.01, La0.99 4-phenylpyridine tris 2,2,6,6-tetramethylheptanedionato Dy0.01, La0.99 4-phenylpyridine-N-oxide tris 2,2,6,6-tetramethylheptanedionato Dy0.01, La0.99 1-methylimidazole tris 2,2,6,6-tetramethylheptanedionato Dy0.01, La0.99 triphenylphosphine oxide tris 2,2,6,6-tetramethylheptanedionato Dy0.01, La0.99 2,2-bipyridyl tris 2,2,6,6-tetramethylheptanedionato Dy0.01, La0.99 2,2-bipyridyl-N,N-dioxide tris 2,2,6,6-tetramethylheptanedionato Dy0.01, La0.99 phenanthroline tris 2,2,6,6-tetramethylheptanedionato Dy0.01, La0.99 bathocuproine tris 2,2,6,6-tetramethylheptanedionato Dy0.01, La0.99 bathophenanthroline tris 3-methylpentane-2,4-dionato Dy0.01, La0.99 dimethylaminopyridine tris 3-methylpentane-2,4-dionato Dy0.01, La0.99 4-picoline-N-oxide tris 3-methylpentane-2,4-dionato Dy0.01, La0.99 4-phenylpyridine tris 3-methylpentane-2,4-dionato Dy0.01, La0.99 4-phenylpyridine-N-oxide tris 3-methylpentane-2,4-dionato Dy0.01, La0.99 1-methylimidazole tris 3-methylpentane-2,4-dionato Dy0.01, La0.99 triphenylphosphine oxide tris 3-methylpentane-2,4-dionato Dy0.01, La0.99 2,2-bipyridyl tris 3-methylpentane-2,4-dionato Dy0.01, La0.99 2,2-bipyridyl-N,N-dioxide tris 3-methylpentane-2,4-dionato Dy0.01, La0.99 phenanthroline tris 3-methylpentane-2,4-dionato Dy0.01, La0.99 bathocuproine tris 3-methylpentane-2,4-dionato Dy0.01, La0.99 bathophenanthroline tris 3-ethylpentane-2,4-dionato Dy0.01, La0.99 dimethylaminopyridine tris 3-ethylpentane-2,4-dionato Dy0.01, La0.99 4-picoline-N-oxide tris 3-ethylpentane-2,4-dionato Dy0.01, La0.99 4-phenylpyridine tris 3-ethylpentane-2,4-dionato Dy0.01, La0.99 4-phenylpyridine-N-oxide tris 3-ethylpentane-2,4-dionato Dy0.01, La0.99 1-methylimidazole tris 3-ethylpentane-2,4-dionato Dy0.01, La0.99 triphenylphosphine oxide tris 3-ethylpentane-2,4-dionato Dy0.01, La0.99 2,2-bipyridyl tris 3-ethylpentane-2,4-dionato Dy0.01, La0.99 2,2-bipyridyl-N,N-dioxide tris 3-ethylpentane-2,4-dionato Dy0.01, La0.99 phenanthroline tris 3-ethylpentane-2,4-dionato Dy0.01, La0.99 bathocuproine tris 3-ethylpentane-2,4-dionato Dy0.01, La0.99 bathophenanthroline tris pivaloyltrifluoroacetonato Dy0.01, La0.99 dimethylaminopyridine tris pivaloyltrifluoroacetonato Dy0.01, La0.99 4-picoline-N-oxide tris pivaloyltrifluoroacetonato Dy0.01, La0.99 4-phenylpyridine tris pivaloyltrifluoroacetonato Dy0.01, La0.99 4-phenylpyridine-N-oxide tris pivaloyltrifluoroacetonato Dy0.01, La0.99 1-methylimidazole tris pivaloyltrifluoroacetonato Dy0.01, La0.99 triphenylphosphine oxide tris pivaloyltrifluoroacetonato Dy0.01, La0.99 2,2-bipyridyl tris pivaloyltrifluoroacetonato Dy0.01, La0.99 2,2-bipyridyl-N,N-dioxide tris pivaloyltrifluoroacetonato Dy0.01, La0.99 phenanthroline tris pivaloyltrifluoroacetonato Dy0.01, La0.99 bathocuproine tris pivaloyltrifluoroacetonato Dy0.01, La0.99 bathophenanthroline tris trifluoroacetylacetonato Dy0.01, La0.99 dimethylaminopyridine tris trifluoroacetylacetonato Dy0.01, La0.99 4-picoline-N-oxide tris trifluoroacetylacetonato Dy0.01, La0.99 4-phenylpyridine tris trifluoroacetylacetonato Dy0.01, La0.99 4-phenylpyridine-N-oxide tris trifluoroacetylacetonato Dy0.01, La0.99 1-methylimidazole tris trifluoroacetylacetonato Dy0.01, La0.99 triphenylphosphine oxide tris trifluoroacetylacetonato Dy0.01, La0.99 2,2-bipyridyl tris trifluoroacetylacetonato Dy0.01, La0.99 2,2-bipyridyl-N,N-dioxide tris trifluoroacetylacetonato Dy0.01, La0.99 phenanthroline tris trifluoroacetylacetonato Dy0.01, La0.99 bathocuproine tris trifluoroacetylacetonato Dy0.01, La0.99 bathophenanthroline tris hexafluoroacetylacetonato Dy0.01, La0.99 dimethylaminopyridine tris hexafluoroacetylacetonato Dy0.01, La0.99 4-picoline-N-oxide tris hexafluoroacetylacetonato Dy0.01, La0.99 4-phenylpyridine tris hexafluoroacetylacetonato Dy0.01, La0.99 4-phenylpyridine-N-oxide tris hexafluoroacetylacetonato Dy0.01, La0.99 1-methylimidazole tris hexafluoroacetylacetonato Dy0.01, La0.99 triphenylphosphine oxide tris hexafluoroacetylacetonato Dy0.01, La0.99 2,2-bipyridyl tris hexafluoroacetylacetonato Dy0.01, La0.99 2,2-bipyridyl-N,N-dioxide tris hexafluoroacetylacetonato Dy0.01, La0.99 phenanthroline tris hexafluoroacetylacetonato Dy0.01, La0.99 bathocuproine tris hexafluoroacetylacetonato Dy0.01, La0.99 bathophenanthroline tris 6,6,7,7,8,8,8-heptafluoro-2,2-dimethyloctanedionato Dy0.01, La0.99 dimethylaminopyridine tris 6,6,7,7,8,8,8-heptafluoro-2,2-dimethyloctanedionato Dy0.01, La0.99 4-picoline-N-oxide tris 6,6,7,7,8,8,8-heptafluoro-2,2-dimethyloctanedionato Dy0.01, La0.99 4-phenylpyridine tris 6,6,7,7,8,8,8-heptafluoro-2,2-dimethyloctanedionato Dy0.01, La0.99 4-phenylpyridine-N-oxide tris 6,6,7,7,8,8,8-heptafluoro-2,2-dimethyloctanedionato Dy0.01, La0.99 1-methylimidazole tris 6,6,7,7,8,8,8-heptafluoro-2,2-dimethyloctanedionato Dy0.01, La0.99 triphenylphosphine oxide tris 6,6,7,7,8,8,8-heptafluoro-2,2-dimethyloctanedionato Dy0.01, La0.99 2,2-bipyridyl tris 6,6,7,7,8,8,8-heptafluoro-2,2-dimethyloctanedionato Dy0.01, La0.99 2,2-bipyridyl-N,N-dioxide tris 6,6,7,7,8,8,8-heptafluoro-2,2-dimethyloctanedionato Dy0.01, La0.99 phenanthroline tris 6,6,7,7,8,8,8-heptafluoro-2,2-dimethyloctanedionato Dy0.01, La0.99 bathocuproine tris 6,6,7,7,8,8,8-heptafluoro-2,2-dimethyloctanedionato Dy0.01, La0.99 bathophenanthroline tris 1-phenyl-1,3-butanedionato Dy0.01, La0.99 dimethylaminopyridine tris 1-phenyl-1,3-butanedionato Dy0.01, La0.99 4-picoline-N-oxide tris 1-phenyl-1,3-butanedionato Dy0.01, La0.99 4-phenylpyridine tris 1-phenyl-1,3-butanedionato Dy0.01, La0.99 4-phenylpyridine-N-oxide tris 1-phenyl-1,3-butanedionato Dy0.01, La0.99 1-methylimidazole tris 1-phenyl-1,3-butanedionato Dy0.01, La0.99 triphenylphosphine oxide tris 1-phenyl-1,3-butanedionato Dy0.01, La0.99 2,2-bipyridyl tris 1-phenyl-1,3-butanedionato Dy0.01, La0.99 2,2-bipyridyl-N,N-dioxide tris 1-phenyl-1,3-butanedionato Dy0.01, La0.99 phenanthroline tris 1-phenyl-1,3-butanedionato Dy0.01, La0.99 bathocuproine tris 1-phenyl-1,3-butanedionato Dy0.01, La0.99 bathophenanthroline tris acetylacetonato Sm0.5, Gd0.5 dimethylaminopyridine tris acetylacetonato Sm0.5, Gd0.5 4-picoline-N-oxide tris acetylacetonato Sm0.5, Gd0.5 4-phenylpyridine tris acetylacetonato Sm0.5, Gd0.5 4-phenylpyridine-N-oxide tris acetylacetonato Sm0.5, Gd0.5 1-methylimidazole tris acetylacetonato Sm0.5, Gd0.5 triphenylphosphine oxide tris acetylacetonato Sm0.5, Gd0.5 2,2-bipyridyl tris acetylacetonato Sm0.5, Gd0.5 2,2-bipyridyl-N,N-dioxide tris acetylacetonato Sm0.5, Gd0.5 phenanthroline tris acetylacetonato Sm0.5, Gd0.5 bathocuproine tris acetylacetonato Sm0.5, Gd0.5 bathophenanthroline tris dibenzoylmethanato Sm0.5, Gd0.5 dimethylaminopyridine tris dibenzoylmethanato Sm0.5, Gd0.5 4-picoline-N-oxide tris dibenzoylmethanato Sm0.5, Gd0.5 4-phenylpyridine tris dibenzoylmethanato Sm0.5, Gd0.5 4-phenylpyridine-N-oxide tris dibenzoylmethanato Sm0.5, Gd0.5 1-methylimidazole tris dibenzoylmethanato Sm0.5, Gd0.5 triphenylphosphine oxide tris dibenzoylmethanato Sm0.5, Gd0.5 2,2-bipyridyl tris dibenzoylmethanato Sm0.5, Gd0.5 2,2-bipyridyl-N,N-dioxide tris dibenzoylmethanato Sm0.5, Gd0.5 phenanthroline tris dibenzoylmethanato Sm0.5, Gd0.5 bathocuproine tris dibenzoylmethanato Sm0.5, Gd0.5 bathophenanthroline tris thenoyltrifluoroacetonato Sm0.5, Gd0.5 dimethylaminopyridine tris thenoyltrifluoroacetonato Sm0.5, Gd0.5 4-picoline-N-oxide tris thenoyltrifluoroacetonato Sm0.5, Gd0.5 4-phenylpyridine tris thenoyltrifluoroacetonato Sm0.5, Gd0.5 4-phenylpyridine-N-oxide tris thenoyltrifluoroacetonato Sm0.5, Gd0.5 1-methylimidazole tris thenoyltrifluoroacetonato Sm0.5, Gd0.5 triphenylphosphine oxide tris thenoyltrifluoroacetonato Sm0.5, Gd0.5 2,2-bipyridyl tris thenoyltrifluoroacetonato Sm0.5, Gd0.5 2,2-bipyridyl-N,N-dioxide tris thenoyltrifluoroacetonato Sm0.5, Gd0.5 phenanthroline tris thenoyltrifluoroacetonato Sm0.5, Gd0.5 bathocuproine tris thenoyltrifluoroacetonato Sm0.5, Gd0.5 bathophenanthroline tris 2,2,6,6-tetramethylheptanedionato Sm0.5, Gd0.5 dimethylaminopyridine tris 2,2,6,6-tetramethylheptanedionato Sm0.5, Gd0.5 4-picoline-N-oxide tris 2,2,6,6-tetramethylheptanedionato Sm0.5, Gd0.5 4-phenylpyridine tris 2,2,6,6-tetramethylheptanedionato Sm0.5, Gd0.5 4-phenylpyridine-N-oxide tris 2,2,6,6-tetramethylheptanedionato Sm0.5, Gd0.5 1-methylimidazole tris 2,2,6,6-tetramethylheptanedionato Sm0.5, Gd0.5 triphenylphosphine oxide tris 2,2,6,6-tetramethylheptanedionato Sm0.5, Gd0.5 2,2-bipyridyl tris 2,2,6,6-tetramethylheptanedionato Sm0.5, Gd0.5 2,2-bipyridyl-N,N-dioxide tris 2,2,6,6-tetramethylheptanedionato Sm0.5, Gd0.5 phenanthroline tris 2,2,6,6-tetramethylheptanedionato Sm0.5, Gd0.5 bathocuproine tris 2,2,6,6-tetramethylheptanedionato Sm0.5, Gd0.5 bathophenanthroline tris 3-methylpentane-2,4-dionato Sm0.5, Gd0.5 dimethylaminopyridine
tris 3-methylpentane-2,4-dionato Sm0.5, Gd0.5 4-picoline-N-oxide
tris 3-methylpentane-2,4-dionato Sm0.5, Gd0.5 4-phenylpyridine
tris 3-methylpentane-2,4-dionato Sm0.5, Gd0.5 4-phenylpyridine-N-oxide
tris 3-methylpentane-2,4-dionato Sm0.5, Gd0.5 1-methylimidazole
tris 3-methylpentane-2,4-dionato Sm0.5, Gd0.5 triphenylphosphine oxide
tris 3-methylpentane-2,4-dionato Sm0.5, Gd0.5 2,2-bipyridyl
tris 3-methylpentane-2,4-dionato Sm0.5, Gd0.5 2,2-bipyridyl-N,N-dioxide
tris 3-methylpentane-2,4-dionato Sm0.5, Gd0.5 phenanthroline
tris 3-methylpentane-2,4-dionato Sm0.5, Gd0.5 bathocuproine
tris 3-methylpentane-2,4-dionato Sm0.5, Gd0.5 bathophenanthroline
tris 3-ethylpentane-2,4-dionato Sm0.5, Gd0.5 dimethylaminopyridine
tris 3-ethylpentane-2,4-dionato Sm0.5, Gd0.5 4-picoline-N-oxide
tris 3-ethylpentane-2,4-dionato Sm0.5, Gd0.5 4-phenylpyridine
tris 3-ethylpentane-2,4-dionato Sm0.5, Gd0.5 4-phenylpyridine-N-oxide
tris 3-ethylpentane-2,4-dionato Sm0.5, Gd0.5 1-methylimidazole
tris 3-ethylpentane-2,4-dionato Sm0.5, Gd0.5 triphenylphosphine oxide
tris 3-ethylpentane-2,4-dionato Sm0.5, Gd0.5 2,2-bipyridyl
tris 3-ethylpentane-2,4-dionato Sm0.5, Gd0.5 2,2-bipyridyl-N,N-dioxide
tris 3-ethylpentane-2,4-dionato Sm0.5, Gd0.5 phenanthroline
tris 3-ethylpentane-2,4-dionato Sm0.5, Gd0.5 bathocuproine
tris 3-ethylpentane-2,4-dionato Sm0.5, Gd0.5 bathophenanthroline
tris pivaloyltrifluoroacetonato Sm0.5, Gd0.5 dimethylaminopyridine
tris pivaloyltrifluoroacetonato Sm0.5, Gd0.5 4-picoline-N-oxide
tris pivaloyltrifluoroacetonato Sm0.5, Gd0.5 4-phenylpyridine
tris pivaloyltrifluoroacetonato Sm0.5, Gd0.5 4-phenylpyridine-N-oxide
tris pivaloyltrifluoroacetonato Sm0.5, Gd0.5 1-methylimidazole
tris pivaloyltrifluoroacetonato Sm0.5, Gd0.5 triphenylphosphine oxide
tris pivaloyltrifluoroacetonato Sm0.5, Gd0.5 2,2-bipyridyl
tris pivaloyltrifluoroacetonato Sm0.5, Gd0.5 2,2-bipyridyl-N,N-dioxide
tris pivaloyltrifluoroacetonato Sm0.5, Gd0.5 phenanthroline
tris pivaloyltrifluoroacetonato Sm0.5, Gd0.5 bathocuproine
tris pivaloyltrifluoroacetonato Sm0.5, Gd0.5 bathophenanthroline
tris trifluoroacetylacetonato Sm0.5, Gd0.5 dimethylaminopyridine
tris trifluoroacetylacetonato Sm0.5, Gd0.5 4-picoline-N-oxide
tris trifluoroacetylacetonato Sm0.5, Gd0.5 4-phenylpyridine
tris trifluoroacetylacetonato Sm0.5, Gd0.5 4-phenylpyridine-N-oxide
tris trifluoroacetylacetonato Sm0.5, Gd0.5 1-methylimidazole
tris trifluoroacetylacetonato Sm0.5, Gd0.5 triphenylphosphine oxide
tris trifluoroacetylacetonato Sm0.5, Gd0.5 2,2-bipyridyl
tris trifluoroacetylacetonato Sm0.5, Gd0.5 2,2-bipyridyl-N,N-dioxide
tris trifluoroacetylacetonato Sm0.5, Gd0.5 phenanthroline
tris trifluoroacetylacetonato Sm0.5, Gd0.5 bathocuproine
tris trifluoroacetylacetonato Sm0.5, Gd0.5 bathophenanthroline
tris hexafluoroacetylacetonato Sm0.5, Gd0.5 dimethylaminopyridine
tris hexafluoroacetylacetonato Sm0.5, Gd0.5 4-picoline-N-oxide
tris hexafluoroacetylacetonato Sm0.5, Gd0.5 4-phenylpyridine
tris hexafluoroacetylacetonato Sm0.5, Gd0.5 4-phenylpyridine-N-oxide
tris hexafluoroacetylacetonato Sm0.5, Gd0.5 1-methylimidazole
tris hexafluoroacetylacetonato Sm0.5, Gd0.5 triphenylphosphine oxide
tris hexafluoroacetylacetonato Sm0.5, Gd0.5 2,2-bipyridyl
tris hexafluoroacetylacetonato Sm0.5, Gd0.5 2,2-bipyridyl-N,N-dioxide
tris hexafluoroacetylacetonato Sm0.5, Gd0.5 phenanthroline
tris hexafluoroacetylacetonato Sm0.5, Gd0.5 bathocuproine
tris hexafluoroacetylacetonato Sm0.5, Gd0.5 bathophenanthroline
tris 6,6,7,7,8,8,8-heptafluoro-2,2-dimethyloctanedionato Sm0.5, Gd0.5 dimethylaminopyridine
tris 6,6,7,7,8,8,8-heptafluoro-2,2-dimethyloctanedionato Sm0.5, Gd0.5 4-picoline-N-oxide
tris 6,6,7,7,8,8,8-heptafluoro-2,2-dimethyloctanedionato Sm0.5, Gd0.5 4-phenylpyridine
tris 6,6,7,7,8,8,8-heptafluoro-2,2-dimethyloctanedionato Sm0.5, Gd0.5 4-phenylpyridine-N-oxide
tris 6,6,7,7,8,8,8-heptafluoro-2,2-dimethyloctanedionato Sm0.5, Gd0.5 1-methylimidazole
tris 6,6,7,7,8,8,8-heptafluoro-2,2-dimethyloctanedionato Sm0.5, Gd0.5 triphenylphosphine oxide
tris 6,6,7,7,8,8,8-heptafluoro-2,2-dimethyloctanedionato Sm0.5, Gd0.5 2,2-bipyridyl
tris 6,6,7,7,8,8,8-heptafluoro-2,2-dimethyloctanedionato Sm0.5, Gd0.5 2,2-bipyridyl-N,N-dioxide
tris 6,6,7,7,8,8,8-heptafluoro-2,2-dimethyloctanedionato Sm0.5, Gd0.5 phenanthroline
tris 6,6,7,7,8,8,8-heptafluoro-2,2-dimethyloctanedionato Sm0.5, Gd0.5 bathocuproine
tris 6,6,7,7,8,8,8-heptafluoro-2,2-dimethyloctanedionato Sm0.5, Gd0.5 bathophenanthroline
tris 1-phenyl-1,3-butanedionato Sm0.5, Gd0.5 dimethylaminopyridine
tris 1-phenyl-1,3-butanedionato Sm0.5, Gd0.5 4-picoline-N-oxide
tris 1-phenyl-1,3-butanedionato Sm0.5, Gd0.5 4-phenylpyridine
tris 1-phenyl-1,3-butanedionato Sm0.5, Gd0.5 4-phenylpyridine-N-oxide
tris 1-phenyl-1,3-butanedionato Sm0.5, Gd0.5 1-methylimidazole
tris 1-phenyl-1,3-butanedionato Sm0.5, Gd0.5 triphenylphosphine oxide
tris 1-phenyl-1,3-butanedionato Sm0.5, Gd0.5 2,2-bipyridyl tris 1-phenyl-1,3-butanedionato Sm0.5, Gd0.5 2,2-bipyridyl-N,N-dioxide tris 1-phenyl-1,3-butanedionato Sm0.5, Gd0.5 phenanthroline tris 1-phenyl-1,3-butanedionato Sm0.5, Gd0.5 bathocuproine tris 1-phenyl-1,3-butanedionato Sm0.5, Gd0.5 bathophenanthroline tris acetylacetonato Sm0.2, Gd0.8 dimethylaminopyridine tris acetylacetonato Sm0.2, Gd0.8 4-picoline-N-oxide tris acetylacetonato Sm0.2, Gd0.8 4-phenylpyridine tris acetylacetonato Sm0.2, Gd0.8 4-phenylpyridine-N-oxide tris acetylacetonato Sm0.2, Gd0.8 1-methylimidazole tris acetylacetonato Sm0.2, Gd0.8 triphenylphosphine oxide tris acetylacetonato Sm0.2, Gd0.8 2,2-bipyridyl tris acetylacetonato Sm0.2, Gd0.8 2,2-bipyridyl-N,N-dioxide tris acetylacetonato Sm0.2, Gd0.8 phenanthroline tris acetylacetonato Sm0.2, Gd0.8 bathocuproine tris acetylacetonato Sm0.2, Gd0.8 bathophenanthroline tris dibenzoylmethanato Sm0.2, Gd0.8 dimethylaminopyridine tris dibenzoylmethanato Sm0.2, Gd0.8 4-picoline-N-oxide tris dibenzoylmethanato Sm0.2, Gd0.8 4-phenylpyridine tris dibenzoylmethanato Sm0.2, Gd0.8 4-phenylpyridine-N-oxide tris dibenzoylmethanato Sm0.2, Gd0.8 1-methylimidazole tris dibenzoylmethanato Sm0.2, Gd0.8 triphenylphosphine oxide tris dibenzoylmethanato Sm0.2, Gd0.8 2,2-bipyridyl tris dibenzoylmethanato Sm0.2, Gd0.8 2,2-bipyridyl-N,N-dioxide tris dibenzoylmethanato Sm0.2, Gd0.8 phenanthroline tris dibenzoylmethanato Sm0.2, Gd0.8 bathocuproine tris dibenzoylmethanato Sm0.2, Gd0.8 bathophenanthroline tris thenoyltrifluoroacetonato Sm0.2, Gd0.8 dimethylaminopyridine tris thenoyltrifluoroacetonato Sm0.2, Gd0.8 4-picoline-N-oxide tris thenoyltrifluoroacetonato Sm0.2, Gd0.8 4-phenylpyridine tris thenoyltrifluoroacetonato Sm0.2, Gd0.8 4-phenylpyridine-N-oxide tris thenoyltrifluoroacetonato Sm0.2, Gd0.8 1-methylimidazole tris thenoyltrifluoroacetonato Sm0.2, Gd0.8 triphenylphosphine oxide tris thenoyltrifluoroacetonato Sm0.2, Gd0.8 2,2-bipyridyl tris thenoyltrifluoroacetonato Sm0.2, Gd0.8 2,2-bipyridyl-N,N-dioxide tris thenoyltrifluoroacetonato Sm0.2, Gd0.8 phenanthroline tris thenoyltrifluoroacetonato Sm0.2, Gd0.8 bathocuproine tris thenoyltrifluoroacetonato Sm0.2, Gd0.8 bathophenanthroline tris 2,2,6,6-tetramethylheptanedionato Sm0.2, Gd0.8 dimethylaminopyridine tris 2,2,6,6-tetramethylheptanedionato Sm0.2, Gd0.8 4-picoline-N-oxide tris 2,2,6,6-tetramethylheptanedionato Sm0.2, Gd0.8 4-phenylpyridine tris 2,2,6,6-tetramethylheptanedionato Sm0.2, Gd0.8 4-phenylpyridine-N-oxide tris 2,2,6,6-tetramethylheptanedionato Sm0.2, Gd0.8 1-methylimidazole tris 2,2,6,6-tetramethylheptanedionato Sm0.2, Gd0.8 triphenylphosphine oxide tris 2,2,6,6-tetramethylheptanedionato Sm0.2, Gd0.8 2,2-bipyridyl tris 2,2,6,6-tetramethylheptanedionato Sm0.2, Gd0.8 2,2-bipyridyl-N,N-dioxide tris 2,2,6,6-tetramethylheptanedionato Sm0.2, Gd0.8 phenanthroline tris 2,2,6,6-tetramethylheptanedionato Sm0.2, Gd0.8 bathocuproine tris 2,2,6,6-tetramethylheptanedionato Sm0.2, Gd0.8 bathophenanthroline tris 3-methylpentane-2,4-dionato Sm0.2, Gd0.8 dimethylaminopyridine tris 3-methylpentane-2,4-dionato Sm0.2, Gd0.8 4-picoline-N-oxide tris 3-methylpentane-2,4-dionato Sm0.2, Gd0.8 4-phenylpyridine tris 3-methylpentane-2,4-dionato Sm0.2, Gd0.8 4-phenylpyridine-N-oxide tris 3-methylpentane-2,4-dionato Sm0.2, Gd0.8 1-methylimidazole tris 3-methylpentane-2,4-dionato Sm0.2, Gd0.8 triphenylphosphine oxide tris 3-methylpentane-2,4-dionato Sm0.2, Gd0.8 2,2-bipyridyl tris 3-methylpentane-2,4-dionato Sm0.2, Gd0.8 2,2-bipyridyl-N,N-dioxide tris 3-methylpentane-2,4-dionato Sm0.2, Gd0.8 phenanthroline tris 3-methylpentane-2,4-dionato Sm0.2, Gd0.8 bathocuproine tris 3-methylpentane-2,4-dionato Sm0.2, Gd0.8 bathophenanthroline tris 3-ethylpentane-2,4-dionato Sm0.2, Gd0.8 dimethylaminopyridine tris 3-ethylpentane-2,4-dionato Sm0.2, Gd0.8 4-picoline-N-oxide tris 3-ethylpentane-2,4-dionato Sm0.2, Gd0.8 4-phenylpyridine tris 3-ethylpentane-2,4-dionato Sm0.2, Gd0.8 4-phenylpyridine-N-oxide tris 3-ethylpentane-2,4-dionato Sm0.2, Gd0.8 1-methylimidazole tris 3-ethylpentane-2,4-dionato Sm0.2, Gd0.8 triphenylphosphine oxide tris 3-ethylpentane-2,4-dionato Sm0.2, Gd0.8 2,2-bipyridyl tris 3-ethylpentane-2,4-dionato Sm0.2, Gd0.8 2,2-bipyridyl-N,N-dioxide tris 3-ethylpentane-2,4-dionato Sm0.2, Gd0.8 phenanthroline tris 3-ethylpentane-2,4-dionato Sm0.2, Gd0.8 bathocuproine tris 3-ethylpentane-2,4-dionato Sm0.2, Gd0.8 bathophenanthroline tris pivaloyltrifluoroacetonato Sm0.2, Gd0.8 dimethylaminopyridine tris pivaloyltrifluoroacetonato Sm0.2, Gd0.8 4-picoline-N-oxide tris pivaloyltrifluoroacetonato Sm0.2, Gd0.8 4-phenylpyridine tris pivaloyltrifluoroacetonato Sm0.2, Gd0.8 4-phenylpyridine-N-oxide tris pivaloyltrifluoroacetonato Sm0.2, Gd0.8 1-methylimidazole tris pivaloyltrifluoroacetonato Sm0.2, Gd0.8 triphenylphosphine oxide tris pivaloyltrifluoroacetonato Sm0.2, Gd0.8 2,2-bipyridyl tris pivaloyltrifluoroacetonato Sm0.2, Gd0.8 2,2-bipyridyl-N,N-dioxide tris pivaloyltrifluoroacetonato Sm0.2, Gd0.8 phenanthroline
tris pivaloyltrifluoroacetonato Sm0.2, Gd0.8 bathocuproine
tris pivaloyltrifluoroacetonato Sm0.2, Gd0.8 bathophenanthroline
tris trifluoroacetylacetonato Sm0.2, Gd0.8 dimethylaminopyridine
tris trifluoroacetylacetonato Sm0.2, Gd0.8 4-picoline-N-oxide
tris trifluoroacetylacetonato Sm0.2, Gd0.8 4-phenylpyridine
tris trifluoroacetylacetonato Sm0.2, Gd0.8 4-phenylpyridine-N-oxide
tris trifluoroacetylacetonato Sm0.2, Gd0.8 1-methylimidazole
tris trifluoroacetylacetonato Sm0.2, Gd0.8 triphenylphosphine oxide
tris trifluoroacetylacetonato Sm0.2, Gd0.8 2,2-bipyridyl
tris trifluoroacetylacetonato Sm0.2, Gd0.8 2,2-bipyridyl-N,N-dioxide
tris trifluoroacetylacetonato Sm0.2, Gd0.8 phenanthroline
tris trifluoroacetylacetonato Sm0.2, Gd0.8 bathocuproine
tris trifluoroacetylacetonato Sm0.2, Gd0.8 bathophenanthroline
tris hexafluoroacetylacetonato Sm0.2, Gd0.8 dimethylaminopyridine
tris hexafluoroacetylacetonato Sm0.2, Gd0.8 4-picoline-N-oxide
tris hexafluoroacetylacetonato Sm0.2, Gd0.8 4-phenylpyridine
tris hexafluoroacetylacetonato Sm0.2, Gd0.8 4-phenylpyridine-N-oxide
tris hexafluoroacetylacetonato Sm0.2, Gd0.8 1-methylimidazole
tris hexafluoroacetylacetonato Sm0.2, Gd0.8 triphenylphosphine oxide
tris hexafluoroacetylacetonato Sm0.2, Gd0.8 2,2-bipyridyl
tris hexafluoroacetylacetonato Sm0.2, Gd0.8 2,2-bipyridyl-N,N-dioxide
tris hexafluoroacetylacetonato Sm0.2, Gd0.8 phenanthroline
tris hexafluoroacetylacetonato Sm0.2, Gd0.8 bathocuproine
tris hexafluoroacetylacetonato Sm0.2, Gd0.8 bathophenanthroline
tris 6,6,7,7,8,8,8-heptafluoro-2,2-dimethyloctanedionato Sm0.2, Gd0.8 dimethylaminopyridine
tris 6,6,7,7,8,8,8-heptafluoro-2,2-dimethyloctanedionato Sm0.2, Gd0.8 4-picoline-N-oxide
tris 6,6,7,7,8,8,8-heptafluoro-2,2-dimethyloctanedionato Sm0.2, Gd0.8 4-phenylpyridine
tris 6,6,7,7,8,8,8-heptafluoro-2,2-dimethyloctanedionato Sm0.2, Gd0.8 4-phenylpyridine-N-oxide
tris 6,6,7,7,8,8,8-heptafluoro-2,2-dimethyloctanedionato Sm0.2, Gd0.8 1-methylimidazole
tris 6,6,7,7,8,8,8-heptafluoro-2,2-dimethyloctanedionato Sm0.2, Gd0.8 triphenylphosphine oxide
tris 6,6,7,7,8,8,8-heptafluoro-2,2-dimethyloctanedionato Sm0.2, Gd0.8 2,2-bipyridyl
tris 6,6,7,7,8,8,8-heptafluoro-2,2-dimethyloctanedionato Sm0.2, Gd0.8 2,2-bipyridyl-N,N-dioxide
tris 6,6,7,7,8,8,8-heptafluoro-2,2-dimethyloctanedionato Sm0.2, Gd0.8 phenanthroline
tris 6,6,7,7,8,8,8-heptafluoro-2,2-dimethyloctanedionato Sm0.2, Gd0.8 bathocuproine
tris 6,6,7,7,8,8,8-heptafluoro-2,2-dimethyloctanedionato Sm0.2, Gd0.8 bathophenanthroline
tris 1-phenyl-1,3-butanedionato Sm0.2, Gd0.8 dimethylaminopyridine
tris 1-phenyl-1,3-butanedionato Sm0.2, Gd0.8 4-picoline-N-oxide tris 1-phenyl-1,3-butanedionato Sm0.2, Gd0.8 4-phenylpyridine
tris 1-phenyl-1,3-butanedionato Sm0.2, Gd0.8 4-phenylpyridine-N-oxide
tris 1-phenyl-1,3-butanedionato Sm0.2, Gd0.8 1-methylimidazole
tris 1-phenyl-1,3-butanedionato Sm0.2, Gd0.8 triphenylphosphine oxide
tris 1-phenyl-1,3-butanedionato Sm0.2, Gd0.8 2,2-bipyridyl
tris 1-phenyl-1,3-butanedionato Sm0.2, Gd0.8 2,2-bipyridyl-N,N-dioxide
tris 1-phenyl-1,3-butanedionato Sm0.2, Gd0.8 phenanthroline
tris 1-phenyl-1,3-butanedionato Sm0.2, Gd0.8 bathocuproine
tris 1-phenyl-1,3-butanedionato Sm0.2, Gd0.8 bathophenanthroline
tris acetylacetonato Sm0.1,Gd0.9 dimethylaminopyridine
tris acetylacetonato Sm0.1,Gd0.9 4-picoline-N-oxide
tris acetylacetonato Sm0.1,Gd0.9 4-phenylpyridine
tris acetylacetonato Sm0.1,Gd0.9 4-phenylpyridine-N-oxide
tris acetylacetonato Sm0.1,Gd0.9 1-methylimidazole
tris acetylacetonato Sm0.1,Gd0.9 triphenylphosphine oxide
tris acetylacetonato Sm0.1,Gd0.9 2,2-bipyridyl
tris acetylacetonato Sm0.1,Gd0.9 2,2-bipyridyl-N,N-dioxide
tris acetylacetonato Sm0.1,Gd0.9 phenanthroline
tris acetylacetonato Sm0.1,Gd0.9 bathocuproine
tris acetylacetonato Sm0.1,Gd0.9 bathophenanthroline
tris dibenzoylmethanato Sm0.1,Gd0.9 dimethylaminopyridine
tris dibenzoylmethanato Sm0.1,Gd0.9 4-picoline-N-oxide
tris dibenzoylmethanato Sm0.1,Gd0.9 4-phenylpyridine
tris dibenzoylmethanato Sm0.1,Gd0.9 4-phenylpyridine-N-oxide
tris dibenzoylmethanato Sm0.1,Gd0.9 1-methylimidazole
tris dibenzoylmethanato Sm0.1,Gd0.9 triphenylphosphine oxide
tris dibenzoylmethanato Sm0.1,Gd0.9 2,2-bipyridyl
tris dibenzoylmethanato Sm0.1,Gd0.9 2,2-bipyridyl-N,N-dioxide
tris dibenzoylmethanato Sm0.1,Gd0.9 phenanthroline
tris dibenzoylmethanato Sm0.1,Gd0.9 bathocuproine
tris dibenzoylmethanato Sm0.1,Gd0.9 bathophenanthroline
tris thenoyltrifluoroacetonato Sm0.1,Gd0.9 dimethylaminopyridine
tris thenoyltrifluoroacetonato Sm0.1,Gd0.9 4-picoline-N-oxide
tris thenoyltrifluoroacetonato Sm0.1,Gd0.9 4-phenylpyridine
tris thenoyltrifluoroacetonato Sm0.1,Gd0.9 4-phenylpyridine-N-oxide
tris thenoyltrifluoroacetonato Sm0.1,Gd0.9 1-methylimidazole
tris thenoyltrifluoroacetonato Sm0.1,Gd0.9 triphenylphosphine oxide
tris thenoyltrifluoroacetonato Sm0.1,Gd0.9 2,2-bipyridyl
tris thenoyltrifluoroacetonato Sm0.1,Gd0.9 2,2-bipyridyl-N,N-dioxide
tris thenoyltrifluoroacetonato Sm0.1,Gd0.9 phenanthroline
tris thenoyltrifluoroacetonato Sm0.1,Gd0.9 bathocuproine
tris thenoyltrifluoroacetonato Sm0.1,Gd0.9 bathophenanthroline
tris 2,2,6,6-tetramethylheptanedionato Sm0.1,Gd0.9 dimethylaminopyridine
tris 2,2,6,6-tetramethylheptanedionato Sm0.1,Gd0.9 4-picoline-N-oxide tris 2,2,6,6-tetramethylheptanedionato Sm0.1,Gd0.9 4-phenylpyridine
tris 2,2,6,6-tetramethylheptanedionato Sm0.1,Gd0.9 4-phenylpyridine-N-oxide
tris 2,2,6,6-tetramethylheptanedionato Sm0.1,Gd0.9 1-methylimidazole
tris 2,2,6,6-tetramethylheptanedionato Sm0.1,Gd0.9 triphenylphosphine oxide
tris 2,2,6,6-tetramethylheptanedionato Sm0.1,Gd0.9 2,2-bipyridyl
tris 2,2,6,6-tetramethylheptanedionato Sm0.1,Gd0.9 2,2-bipyridyl-N,N-dioxide
tris 2,2,6,6-tetramethylheptanedionato Sm0.1,Gd0.9 phenanthroline
tris 2,2,6,6-tetramethylheptanedionato Sm0.1,Gd0.9 bathocuproine
tris 2,2,6,6-tetramethylheptanedionato Sm0.1,Gd0.9 bathophenanthroline
tris 3-methylpentane-2,4-dionato Sm0.1,Gd0.9 dimethylaminopyridine
tris 3-methylpentane-2,4-dionato Sm0.1,Gd0.9 4-picoline-N-oxide
tris 3-methylpentane-2,4-dionato Sm0.1,Gd0.9 4-phenylpyridine
tris 3-methylpentane-2,4-dionato Sm0.1,Gd0.9 4-phenylpyridine-N-oxide
tris 3-methylpentane-2,4-dionato Sm0.1,Gd0.9 1-methylimidazole
tris 3-methylpentane-2,4-dionato Sm0.1,Gd0.9 triphenylphosphine oxide
tris 3-methylpentane-2,4-dionato Sm0.1,Gd0.9 2,2-bipyridyl
tris 3-methylpentane-2,4-dionato Sm0.1,Gd0.9 2,2-bipyridyl-N,N-dioxide
tris 3-methylpentane-2,4-dionato Sm0.1,Gd0.9 phenanthroline
tris 3-methylpentane-2,4-dionato Sm0.1,Gd0.9 bathocuproine
tris 3-methylpentane-2,4-dionato Sm0.1,Gd0.9 bathophenanthroline
tris 3-ethylpentane-2,4-dionato Sm0.1,Gd0.9 dimethylaminopyridine
tris 3-ethylpentane-2,4-dionato Sm0.1,Gd0.9 4-picoline-N-oxide
tris 3-ethylpentane-2,4-dionato Sm0.1,Gd0.9 4-phenylpyridine
tris 3-ethylpentane-2,4-dionato Sm0.1,Gd0.9 4-phenylpyridine-N-oxide
tris 3-ethylpentane-2,4-dionato Sm0.1,Gd0.9 1-methylimidazole
tris 3-ethylpentane-2,4-dionato Sm0.1,Gd0.9 triphenylphosphine oxide
tris 3-ethylpentane-2,4-dionato Sm0.1,Gd0.9 2,2-bipyridyl
tris 3-ethylpentane-2,4-dionato Sm0.1,Gd0.9 2,2-bipyridyl-N,N-dioxide
tris 3-ethylpentane-2,4-dionato Sm0.1,Gd0.9 phenanthroline
tris 3-ethylpentane-2,4-dionato Sm0.1,Gd0.9 bathocuproine
tris 3-ethylpentane-2,4-dionato Sm0.1,Gd0.9 bathophenanthroline
tris pivaloyltrifluoroacetonato Sm0.1,Gd0.9 dimethylaminopyridine
tris pivaloyltrifluoroacetonato Sm0.1,Gd0.9 4-picoline-N-oxide
tris pivaloyltrifluoroacetonato Sm0.1,Gd0.9 4-phenylpyridine
tris pivaloyltrifluoroacetonato Sm0.1,Gd0.9 4-phenylpyridine-N-oxide
tris pivaloyltrifluoroacetonato Sm0.1,Gd0.9 1-methylimidazole
tris pivaloyltrifluoroacetonato Sm0.1,Gd0.9 triphenylphosphine oxide
tris pivaloyltrifluoroacetonato Sm0.1,Gd0.9 2,2-bipyridyl
tris pivaloyltrifluoroacetonato Sm0.1,Gd0.9 2,2-bipyridyl-N,N-dioxide
tris pivaloyltrifluoroacetonato Sm0.1,Gd0.9 phenanthroline
tris pivaloyltrifluoroacetonato Sm0.1,Gd0.9 bathocuproine
tris pivaloyltrifluoroacetonato Sm0.1,Gd0.9 bathophenanthroline
tris trifluoroacetylacetonato Sm0.1,Gd0.9 dimethylaminopyridine
tris trifluoroacetylacetonato Sm0.1,Gd0.9 4-picoline-N-oxide
tris trifluoroacetylacetonato Sm0.1,Gd0.9 4-phenylpyridine
tris trifluoroacetylacetonato Sm0.1,Gd0.9 4-phenylpyridine-N-oxide
tris trifluoroacetylacetonato Sm0.1,Gd0.9 1-methylimidazole
tris trifluoroacetylacetonato Sm0.1,Gd0.9 triphenylphosphine oxide
tris trifluoroacetylacetonato Sm0.1,Gd0.9 2,2-bipyridyl
tris trifluoroacetylacetonato Sm0.1,Gd0.9 2,2-bipyridyl-N,N-dioxide
tris trifluoroacetylacetonato Sm0.1,Gd0.9 phenanthroline
tris trifluoroacetylacetonato Sm0.1,Gd0.9 bathocuproine
tris trifluoroacetylacetonato Sm0.1,Gd0.9 bathophenanthroline
tris hexafluoroacetylacetonato Sm0.1,Gd0.9 dimethylaminopyridine
tris hexafluoroacetylacetonato Sm0.1,Gd0.9 4-picoline-N-oxide
tris hexafluoroacetylacetonato Sm0.1,Gd0.9 4-phenylpyridine
tris hexafluoroacetylacetonato Sm0.1,Gd0.9 4-phenylpyridine-N-oxide
tris hexafluoroacetylacetonato Sm0.1,Gd0.9 1-methylimidazole
tris hexafluoroacetylacetonato Sm0.1,Gd0.9 triphenylphosphine oxide
tris hexafluoroacetylacetonato Sm0.1,Gd0.9 2,2-bipyridyl
tris hexafluoroacetylacetonato Sm0.1,Gd0.9 2,2-bipyridyl-N,N-dioxide
tris hexafluoroacetylacetonato Sm0.1,Gd0.9 phenanthroline
tris hexafluoroacetylacetonato Sm0.1,Gd0.9 bathocuproine
tris hexafluoroacetylacetonato Sm0.1,Gd0.9 bathophenanthroline
tris 6,6,7,7,8,8,8-heptafluoro-2,2-dimethyloctanedionato Sm0.1,Gd0.9 dimethylaminopyridine
tris 6,6,7,7,8,8,8-heptafluoro-2,2-dimethyloctanedionato Sm0.1,Gd0.9 4-picoline-N-oxide
tris 6,6,7,7,8,8,8-heptafluoro-2,2-dimethyloctanedionato Sm0.1,Gd0.9 4-phenylpyridine
tris 6,6,7,7,8,8,8-heptafluoro-2,2-dimethyloctanedionato Sm0.1,Gd0.9 4-phenylpyridine-N-oxide
tris 6,6,7,7,8,8,8-heptafluoro-2,2-dimethyloctanedionato Sm0.1,Gd0.9 1-methylimidazole
tris 6,6,7,7,8,8,8-heptafluoro-2,2-dimethyloctanedionato Sm0.1,Gd0.9 triphenylphosphine oxide
tris 6,6,7,7,8,8,8-heptafluoro-2,2-dimethyloctanedionato Sm0.1,Gd0.9 2,2-bipyridyl
tris 6,6,7,7,8,8,8-heptafluoro-2,2-dimethyloctanedionato Sm0.1,Gd0.9 2,2-bipyridyl-N,N-dioxide tris 6,6,7,7,8,8,8-heptafluoro-2,2-dimethyloctanedionato Sm0.1,Gd0.9 phenanthroline tris 6,6,7,7,8,8,8-heptafluoro-2,2-dimethyloctanedionato Sm0.1,Gd0.9 bathocuproine tris 6,6,7,7,8,8,8-heptafluoro-2,2-dimethyloctanedionato Sm0.1,Gd0.9 bathophenanthroline tris 1-phenyl-1,3-butanedionato Sm0.1,Gd0.9 dimethylaminopyridine tris 1-phenyl-1,3-butanedionato Sm0.1,Gd0.9 4-picoline-N-oxide tris 1-phenyl-1,3-butanedionato Sm0.1,Gd0.9 4-phenylpyridine tris 1-phenyl-1,3-butanedionato Sm0.1,Gd0.9 4-phenylpyridine-N-oxide tris 1-phenyl-1,3-butanedionato Sm0.1,Gd0.9 1-methylimidazole tris 1-phenyl-1,3-butanedionato Sm0.1,Gd0.9 triphenylphosphine oxide tris 1-phenyl-1,3-butanedionato Sm0.1,Gd0.9 2,2-bipyridyl tris 1-phenyl-1,3-butanedionato Sm0.1,Gd0.9 2,2-bipyridyl-N,N-dioxide tris 1-phenyl-1,3-butanedionato Sm0.1,Gd0.9 phenanthroline tris 1-phenyl-1,3-butanedionato Sm0.1,Gd0.9 bathocuproine tris 1-phenyl-1,3-butanedionato Sm0.1,Gd0.9 bathophenanthroline tris acetylacetonato Sm0.01, Gd0.99 dimethylaminopyridine tris acetylacetonato Sm0.01, Gd0.99 4-picoline-N-oxide tris acetylacetonato Sm0.01, Gd0.99 4-phenylpyridine tris acetylacetonato Sm0.01, Gd0.99 4-phenylpyridine-N-oxide tris acetylacetonato Sm0.01, Gd0.99 1-methylimidazole tris acetylacetonato Sm0.01, Gd0.99 triphenylphosphine oxide tris acetylacetonato Sm0.01, Gd0.99 2,2-bipyridyl tris acetylacetonato Sm0.01, Gd0.99 2,2-bipyridyl-N,N-dioxide tris acetylacetonato Sm0.01, Gd0.99 phenanthroline tris acetylacetonato Sm0.01, Gd0.99 bathocuproine tris acetylacetonato Sm0.01, Gd0.99 bathophenanthroline tris dibenzoylmethanato Sm0.01, Gd0.99 dimethylaminopyridine tris dibenzoylmethanato Sm0.01, Gd0.99 4-picoline-N-oxide tris dibenzoylmethanato Sm0.01, Gd0.99 4-phenylpyridine tris dibenzoylmethanato Sm0.01, Gd0.99 4-phenylpyridine-N-oxide tris dibenzoylmethanato Sm0.01, Gd0.99 1-methylimidazole tris dibenzoylmethanato Sm0.01, Gd0.99 triphenylphosphine oxide tris dibenzoylmethanato Sm0.01, Gd0.99 2,2-bipyridyl tris dibenzoylmethanato Sm0.01, Gd0.99 2,2-bipyridyl-N,N-dioxide tris dibenzoylmethanato Sm0.01, Gd0.99 phenanthroline tris dibenzoylmethanato Sm0.01, Gd0.99 bathocuproine tris dibenzoylmethanato Sm0.01, Gd0.99 bathophenanthroline tris thenoyltrifluoroacetonato Sm0.01, Gd0.99 dimethylaminopyridine tris thenoyltrifluoroacetonato Sm0.01, Gd0.99 4-picoline-N-oxide tris thenoyltrifluoroacetonato Sm0.01, Gd0.99 4-phenylpyridine tris thenoyltrifluoroacetonato Sm0.01, Gd0.99 4-phenylpyridine-N-oxide tris thenoyltrifluoroacetonato Sm0.01, Gd0.99 1-methylimidazole tris thenoyltrifluoroacetonato Sm0.01, Gd0.99 triphenylphosphine oxide tris thenoyltrifluoroacetonato Sm0.01, Gd0.99 2,2-bipyridyl tris thenoyltrifluoroacetonato Sm0.01, Gd0.99 2,2-bipyridyl-N,N-dioxide tris thenoyltrifluoroacetonato Sm0.01, Gd0.99 phenanthroline tris thenoyltrifluoroacetonato Sm0.01, Gd0.99 bathocuproine tris thenoyltrifluoroacetonato Sm0.01, Gd0.99 bathophenanthroline tris 2,2,6,6-tetramethylheptanedionato Sm0.01, Gd0.99 dimethylaminopyridine tris 2,2,6,6-tetramethylheptanedionato Sm0.01, Gd0.99 4-picoline-N-oxide tris 2,2,6,6-tetramethylheptanedionato Sm0.01, Gd0.99 4-phenylpyridine tris 2,2,6,6-tetramethylheptanedionato Sm0.01, Gd0.99 4-phenylpyridine-N-oxide tris 2,2,6,6-tetramethylheptanedionato Sm0.01, Gd0.99 1-methylimidazole tris 2,2,6,6-tetramethylheptanedionato Sm0.01, Gd0.99 triphenylphosphine oxide tris 2,2,6,6-tetramethylheptanedionato Sm0.01, Gd0.99 2,2-bipyridyl tris 2,2,6,6-tetramethylheptanedionato Sm0.01, Gd0.99 2,2-bipyridyl-N,N-dioxide tris 2,2,6,6-tetramethylheptanedionato Sm0.01, Gd0.99 phenanthroline tris 2,2,6,6-tetramethylheptanedionato Sm0.01, Gd0.99 bathocuproine tris 2,2,6,6-tetramethylheptanedionato Sm0.01, Gd0.99 bathophenanthroline tris 3-methylpentane-2,4-dionato Sm0.01, Gd0.99 dimethylaminopyridine tris 3-methylpentane-2,4-dionato Sm0.01, Gd0.99 4-picoline-N-oxide tris 3-methylpentane-2,4-dionato Sm0.01, Gd0.99 4-phenylpyridine tris 3-methylpentane-2,4-dionato Sm0.01, Gd0.99 4-phenylpyridine-N-oxide tris 3-methylpentane-2,4-dionato Sm0.01, Gd0.99 1-methylimidazole tris 3-methylpentane-2,4-dionato Sm0.01, Gd0.99 triphenylphosphine oxide tris 3-methylpentane-2,4-dionato Sm0.01, Gd0.99 2,2-bipyridyl tris 3-methylpentane-2,4-dionato Sm0.01, Gd0.99 2,2-bipyridyl-N,N-dioxide tris 3-methylpentane-2,4-dionato Sm0.01, Gd0.99 phenanthroline tris 3-methylpentane-2,4-dionato Sm0.01, Gd0.99 bathocuproine tris 3-methylpentane-2,4-dionato Sm0.01, Gd0.99 bathophenanthroline tris 3-ethylpentane-2,4-dionato Sm0.01, Gd0.99 dimethylaminopyridine tris 3-ethylpentane-2,4-dionato Sm0.01, Gd0.99 4-picoline-N-oxide tris 3-ethylpentane-2,4-dionato Sm0.01, Gd0.99 4-phenylpyridine tris 3-ethylpentane-2,4-dionato Sm0.01, Gd0.99 4-phenylpyridine-N-oxide tris 3-ethylpentane-2,4-dionato Sm0.01, Gd0.99 1-methylimidazole tris 3-ethylpentane-2,4-dionato Sm0.01, Gd0.99 triphenylphosphine oxide
tris 3-ethylpentane-2,4-dionato Sm0.01, Gd0.99 2,2-bipyridyl
tris 3-ethylpentane-2,4-dionato Sm0.01, Gd0.99 2,2-bipyridyl-N,N-dioxide
tris 3-ethylpentane-2,4-dionato Sm0.01, Gd0.99 phenanthroline
tris 3-ethylpentane-2,4-dionato Sm0.01, Gd0.99 bathocuproine
tris 3-ethylpentane-2,4-dionato Sm0.01, Gd0.99 bathophenanthroline
tris pivaloyltrifluoroacetonato Sm0.01, Gd0.99 dimethylaminopyridine
tris pivaloyltrifluoroacetonato Sm0.01, Gd0.99 4-picoline-N-oxide
tris pivaloyltrifluoroacetonato Sm0.01, Gd0.99 4-phenylpyridine
tris pivaloyltrifluoroacetonato Sm0.01, Gd0.99 4-phenylpyridine-N-oxide
tris pivaloyltrifluoroacetonato Sm0.01, Gd0.99 1-methylimidazole
tris pivaloyltrifluoroacetonato Sm0.01, Gd0.99 triphenylphosphine oxide
tris pivaloyltrifluoroacetonato Sm0.01, Gd0.99 2,2-bipyridyl
tris pivaloyltrifluoroacetonato Sm0.01, Gd0.99 2,2-bipyridyl-N,N-dioxide
tris pivaloyltrifluoroacetonato Sm0.01, Gd0.99 phenanthroline
tris pivaloyltrifluoroacetonato Sm0.01, Gd0.99 bathocuproine
tris pivaloyltrifluoroacetonato Sm0.01, Gd0.99 bathophenanthroline
tris trifluoroacetylacetonato Sm0.01, Gd0.99 dimethylaminopyridine
tris trifluoroacetylacetonato Sm0.01, Gd0.99 4-picoline-N-oxide
tris trifluoroacetylacetonato Sm0.01, Gd0.99 4-phenylpyridine
tris trifluoroacetylacetonato Sm0.01, Gd0.99 4-phenylpyridine-N-oxide
tris trifluoroacetylacetonato Sm0.01, Gd0.99 1-methylimidazole
tris trifluoroacetylacetonato Sm0.01, Gd0.99 triphenylphosphine oxide
tris trifluoroacetylacetonato Sm0.01, Gd0.99 2,2-bipyridyl
tris trifluoroacetylacetonato Sm0.01, Gd0.99 2,2-bipyridyl-N,N-dioxide
tris trifluoroacetylacetonato Sm0.01, Gd0.99 phenanthroline
tris trifluoroacetylacetonato Sm0.01, Gd0.99 bathocuproine
tris trifluoroacetylacetonato Sm0.01, Gd0.99 bathophenanthroline
tris hexafluoroacetylacetonato Sm0.01, Gd0.99 dimethylaminopyridine
tris hexafluoroacetylacetonato Sm0.01, Gd0.99 4-picoline-N-oxide
tris hexafluoroacetylacetonato Sm0.01, Gd0.99 4-phenylpyridine
tris hexafluoroacetylacetonato Sm0.01, Gd0.99 4-phenylpyridine-N-oxide
tris hexafluoroacetylacetonato Sm0.01, Gd0.99 1-methylimidazole
tris hexafluoroacetylacetonato Sm0.01, Gd0.99 triphenylphosphine oxide
tris hexafluoroacetylacetonato Sm0.01, Gd0.99 2,2-bipyridyl
tris hexafluoroacetylacetonato Sm0.01, Gd0.99 2,2-bipyridyl-N,N-dioxide
tris hexafluoroacetylacetonato Sm0.01, Gd0.99 phenanthroline
tris hexafluoroacetylacetonato Sm0.01, Gd0.99 bathocuproine
tris hexafluoroacetylacetonato Sm0.01, Gd0.99 bathophenanthroline
tris 6,6,7,7,8,8,8-heptafluoro-2,2-dimethyloctanedionato Sm0.01, Gd0.99 dimethylaminopyridine
tris 6,6,7,7,8,8,8-heptafluoro-2,2-dimethyloctanedionato Sm0.01, Gd0.99 4-picoline-N-oxide
tris 6,6,7,7,8,8,8-heptafluoro-2,2-dimethyloctanedionato Sm0.01, Gd0.99 4-phenylpyridine
tris 6,6,7,7,8,8,8-heptafluoro-2,2-dimethyloctanedionato Sm0.01, Gd0.99 4-phenylpyridine-N-oxide
tris 6,6,7,7,8,8,8-heptafluoro-2,2-dimethyloctanedionato Sm0.01, Gd0.99 1-methylimidazole
tris 6,6,7,7,8,8,8-heptafluoro-2,2-dimethyloctanedionato Sm0.01, Gd0.99 triphenylphosphine oxide
tris 6,6,7,7,8,8,8-heptafluoro-2,2-dimethyloctanedionato Sm0.01, Gd0.99 2,2-bipyridyl
tris 6,6,7,7,8,8,8-heptafluoro-2,2-dimethyloctanedionato Sm0.01, Gd0.99 2,2-bipyridyl-N,N-dioxide
tris 6,6,7,7,8,8,8-heptafluoro-2,2-dimethyloctanedionato Sm0.01, Gd0.99 phenanthroline
tris 6,6,7,7,8,8,8-heptafluoro-2,2-dimethyloctanedionato Sm0.01, Gd0.99 bathocuproine
tris 6,6,7,7,8,8,8-heptafluoro-2,2-dimethyloctanedionato Sm0.01, Gd0.99 bathophenanthroline
tris 1-phenyl-1,3-butanedionato Sm0.01, Gd0.99 dimethylaminopyridine
tris 1-phenyl-1,3-butanedionato Sm0.01, Gd0.99 4-picoline-N-oxide
tris 1-phenyl-1,3-butanedionato Sm0.01, Gd0.99 4-phenylpyridine
tris 1-phenyl-1,3-butanedionato Sm0.01, Gd0.99 4-phenylpyridine-N-oxide
tris 1-phenyl-1,3-butanedionato Sm0.01, Gd0.99 1-methylimidazole
tris 1-phenyl-1,3-butanedionato Sm0.01, Gd0.99 triphenylphosphine oxide
tris 1-phenyl-1,3-butanedionato Sm0.01, Gd0.99 2,2-bipyridyl
tris 1-phenyl-1,3-butanedionato Sm0.01, Gd0.99 2,2-bipyridyl-N,N-dioxide
tris 1-phenyl-1,3-butanedionato Sm0.01, Gd0.99 phenanthroline
tris 1-phenyl-1,3-butanedionato Sm0.01, Gd0.99 bathocuproine
tris 1-phenyl-1,3-butanedionato Sm0.01, Gd0.99 bathophenanthroline
tris acetylacetonato Dy0.5, Gd0.5 dimethylaminopyridine
tris acetylacetonato Dy0.5, Gd0.5 4-picoline-N-oxide
tris acetylacetonato Dy0.5, Gd0.5 4-phenylpyridine
tris acetylacetonato Dy0.5, Gd0.5 4-phenylpyridine-N-oxide
tris acetylacetonato Dy0.5, Gd0.5 1-methylimidazole
tris acetylacetonato Dy0.5, Gd0.5 triphenylphosphine oxide
tris acetylacetonato Dy0.5, Gd0.5 2,2-bipyridyl
tris acetylacetonato Dy0.5, Gd0.5 2,2-bipyridyl-N,N-dioxide
tris acetylacetonato Dy0.5, Gd0.5 phenanthroline
tris acetylacetonato Dy0.5, Gd0.5 bathocuproine
tris acetylacetonato Dy0.5, Gd0.5 bathophenanthroline
tris dibenzoylmethanato Dy0.5, Gd0.5 dimethylaminopyridine
tris dibenzoylmethanato Dy0.5, Gd0.5 4-picoline-N-oxide tris dibenzoylmethanato Dy0.5, Gd0.5 4-phenylpyridine tris dibenzoylmethanato Dy0.5, Gd0.5 4-phenylpyridine-N-oxide tris dibenzoylmethanato Dy0.5, Gd0.5 1-methylimidazole tris dibenzoylmethanato Dy0.5, Gd0.5 triphenylphosphine oxide tris dibenzoylmethanato Dy0.5, Gd0.5 2,2-bipyridyl tris dibenzoylmethanato Dy0.5, Gd0.5 2,2-bipyridyl-N,N-dioxide tris dibenzoylmethanato Dy0.5, Gd0.5 phenanthroline tris dibenzoylmethanato Dy0.5, Gd0.5 bathocuproine tris dibenzoylmethanato Dy0.5, Gd0.5 bathophenanthroline tris thenoyltrifluoroacetonato Dy0.5, Gd0.5 dimethylaminopyridine tris thenoyltrifluoroacetonato Dy0.5, Gd0.5 4-picoline-N-oxide tris thenoyltrifluoroacetonato Dy0.5, Gd0.5 4-phenylpyridine tris thenoyltrifluoroacetonato Dy0.5, Gd0.5 4-phenylpyridine-N-oxide tris thenoyltrifluoroacetonato Dy0.5, Gd0.5 1-methylimidazole tris thenoyltrifluoroacetonato Dy0.5, Gd0.5 triphenylphosphine oxide tris thenoyltrifluoroacetonato Dy0.5, Gd0.5 2,2-bipyridyl tris thenoyltrifluoroacetonato Dy0.5, Gd0.5 2,2-bipyridyl-N,N-dioxide tris thenoyltrifluoroacetonato Dy0.5, Gd0.5 phenanthroline tris thenoyltrifluoroacetonato Dy0.5, Gd0.5 bathocuproine tris thenoyltrifluoroacetonato Dy0.5, Gd0.5 bathophenanthroline tris 2,2,6,6-tetramethylheptanedionato Dy0.5, Gd0.5 dimethylaminopyridine tris 2,2,6,6-tetramethylheptanedionato Dy0.5, Gd0.5 4-picoline-N-oxide tris 2,2,6,6-tetramethylheptanedionato Dy0.5, Gd0.5 4-phenylpyridine tris 2,2,6,6-tetramethylheptanedionato Dy0.5, Gd0.5 4-phenylpyridine-N-oxide tris 2,2,6,6-tetramethylheptanedionato Dy0.5, Gd0.5 1-methylimidazole tris 2,2,6,6-tetramethylheptanedionato Dy0.5, Gd0.5 triphenylphosphine oxide tris 2,2,6,6-tetramethylheptanedionato Dy0.5, Gd0.5 2,2-bipyridyl tris 2,2,6,6-tetramethylheptanedionato Dy0.5, Gd0.5 2,2-bipyridyl-N,N-dioxide tris 2,2,6,6-tetramethylheptanedionato Dy0.5, Gd0.5 phenanthroline tris 2,2,6,6-tetramethylheptanedionato Dy0.5, Gd0.5 bathocuproine tris 2,2,6,6-tetramethylheptanedionato Dy0.5, Gd0.5 bathophenanthroline tris 3-methylpentane-2,4-dionato Dy0.5, Gd0.5 dimethylaminopyridine tris 3-methylpentane-2,4-dionato Dy0.5, Gd0.5 4-picoline-N-oxide tris 3-methylpentane-2,4-dionato Dy0.5, Gd0.5 4-phenylpyridine tris 3-methylpentane-2,4-dionato Dy0.5, Gd0.5 4-phenylpyridine-N-oxide tris 3-methylpentane-2,4-dionato Dy0.5, Gd0.5 1-methylimidazole tris 3-methylpentane-2,4-dionato Dy0.5, Gd0.5 triphenylphosphine oxide tris 3-methylpentane-2,4-dionato Dy0.5, Gd0.5 2,2-bipyridyl tris 3-methylpentane-2,4-dionato Dy0.5, Gd0.5 2,2-bipyridyl-N,N-dioxide tris 3-methylpentane-2,4-dionato Dy0.5, Gd0.5 phenanthroline tris 3-methylpentane-2,4-dionato Dy0.5, Gd0.5 bathocuproine tris 3-methylpentane-2,4-dionato Dy0.5, Gd0.5 bathophenanthroline tris 3-ethylpentane-2,4-dionato Dy0.5, Gd0.5 dimethylaminopyridine tris 3-ethylpentane-2,4-dionato Dy0.5, Gd0.5 4-picoline-N-oxide tris 3-ethylpentane-2,4-dionato Dy0.5, Gd0.5 4-phenylpyridine tris 3-ethylpentane-2,4-dionato Dy0.5, Gd0.5 4-phenylpyridine-N-oxide tris 3-ethylpentane-2,4-dionato Dy0.5, Gd0.5 1-methylimidazole tris 3-ethylpentane-2,4-dionato Dy0.5, Gd0.5 triphenylphosphine oxide tris 3-ethylpentane-2,4-dionato Dy0.5, Gd0.5 2,2-bipyridyl tris 3-ethylpentane-2,4-dionato Dy0.5, Gd0.5 2,2-bipyridyl-N,N-dioxide tris 3-ethylpentane-2,4-dionato Dy0.5, Gd0.5 phenanthroline tris 3-ethylpentane-2,4-dionato Dy0.5, Gd0.5 bathocuproine tris 3-ethylpentane-2,4-dionato Dy0.5, Gd0.5 bathophenanthroline tris pivaloyltrifluoroacetonato Dy0.5, Gd0.5 dimethylaminopyridine tris pivaloyltrifluoroacetonato Dy0.5, Gd0.5 4-picoline-N-oxide tris pivaloyltrifluoroacetonato Dy0.5, Gd0.5 4-phenylpyridine tris pivaloyltrifluoroacetonato Dy0.5, Gd0.5 4-phenylpyridine-N-oxide tris pivaloyltrifluoroacetonato Dy0.5, Gd0.5 1-methylimidazole tris pivaloyltrifluoroacetonato Dy0.5, Gd0.5 triphenylphosphine oxide tris pivaloyltrifluoroacetonato Dy0.5, Gd0.5 2,2-bipyridyl tris pivaloyltrifluoroacetonato Dy0.5, Gd0.5 2,2-bipyridyl-N,N-dioxide tris pivaloyltrifluoroacetonato Dy0.5, Gd0.5 phenanthroline tris pivaloyltrifluoroacetonato Dy0.5, Gd0.5 bathocuproine tris pivaloyltrifluoroacetonato Dy0.5, Gd0.5 bathophenanthroline tris trifluoroacetylacetonato Dy0.5, Gd0.5 dimethylaminopyridine tris trifluoroacetylacetonato Dy0.5, Gd0.5 4-picoline-N-oxide tris trifluoroacetylacetonato Dy0.5, Gd0.5 4-phenylpyridine tris trifluoroacetylacetonato Dy0.5, Gd0.5 4-phenylpyridine-N-oxide tris trifluoroacetylacetonato Dy0.5, Gd0.5 1-methylimidazole tris trifluoroacetylacetonato Dy0.5, Gd0.5 triphenylphosphine oxide tris trifluoroacetylacetonato Dy0.5, Gd0.5 2,2-bipyridyl tris trifluoroacetylacetonato Dy0.5, Gd0.5 2,2-bipyridyl-N,N-dioxide tris trifluoroacetylacetonato Dy0.5, Gd0.5 phenanthroline tris trifluoroacetylacetonato Dy0.5, Gd0.5 bathocuproine tris trifluoroacetylacetonato Dy0.5, Gd0.5 bathophenanthroline tris hexafluoroacetylacetonato Dy0.5, Gd0.5 dimethylaminopyridine tris hexafluoroacetylacetonato Dy0.5, Gd0.5 4-picoline-N-oxide
tris hexafluoroacetylacetonato Dy0.5, Gd0.5 4-phenylpyridine
tris hexafluoroacetylacetonato Dy0.5, Gd0.5 4-phenylpyridine-N-oxide
tris hexafluoroacetylacetonato Dy0.5, Gd0.5 1-methylimidazole
tris hexafluoroacetylacetonato Dy0.5, Gd0.5 triphenylphosphine oxide
tris hexafluoroacetylacetonato Dy0.5, Gd0.5 2,2-bipyridyl
tris hexafluoroacetylacetonato Dy0.5, Gd0.5 2,2-bipyridyl-N,N-dioxide
tris hexafluoroacetylacetonato Dy0.5, Gd0.5 phenanthroline
tris hexafluoroacetylacetonato Dy0.5, Gd0.5 bathocuproine
tris hexafluoroacetylacetonato Dy0.5, Gd0.5 bathophenanthroline
tris 6,6,7,7,8,8,8-heptafluoro-2,2-dimethyloctanedionato Dy0.5, Gd0.5 dimethylaminopyridine
tris 6,6,7,7,8,8,8-heptafluoro-2,2-dimethyloctanedionato Dy0.5, Gd0.5 4-picoline-N-oxide
tris 6,6,7,7,8,8,8-heptafluoro-2,2-dimethyloctanedionato Dy0.5, Gd0.5 4-phenylpyridine
tris 6,6,7,7,8,8,8-heptafluoro-2,2-dimethyloctanedionato Dy0.5, Gd0.5 4-phenylpyridine-N-oxide
tris 6,6,7,7,8,8,8-heptafluoro-2,2-dimethyloctanedionato Dy0.5, Gd0.5 1-methylimidazole
tris 6,6,7,7,8,8,8-heptafluoro-2,2-dimethyloctanedionato Dy0.5, Gd0.5 triphenylphosphine oxide
tris 6,6,7,7,8,8,8-heptafluoro-2,2-dimethyloctanedionato Dy0.5, Gd0.5 2,2-bipyridyl
tris 6,6,7,7,8,8,8-heptafluoro-2,2-dimethyloctanedionato Dy0.5, Gd0.5 2,2-bipyridyl-N,N-dioxide
tris 6,6,7,7,8,8,8-heptafluoro-2,2-dimethyloctanedionato Dy0.5, Gd0.5 phenanthroline
tris 6,6,7,7,8,8,8-heptafluoro-2,2-dimethyloctanedionato Dy0.5, Gd0.5 bathocuproine
tris 6,6,7,7,8,8,8-heptafluoro-2,2-dimethyloctanedionato Dy0.5, Gd0.5 bathophenanthroline
tris 1-phenyl-1,3-butanedionato Dy0.5, Gd0.5 dimethylaminopyridine
tris 1-phenyl-1,3-butanedionato Dy0.5, Gd0.5 4-picoline-N-oxide
tris 1-phenyl-1,3-butanedionato Dy0.5, Gd0.5 4-phenylpyridine
tris 1-phenyl-1,3-butanedionato Dy0.5, Gd0.5 4-phenylpyridine-N-oxide
tris 1-phenyl-1,3-butanedionato Dy0.5, Gd0.5 1-methylimidazole
tris 1-phenyl-1,3-butanedionato Dy0.5, Gd0.5 triphenylphosphine oxide
tris 1-phenyl-1,3-butanedionato Dy0.5, Gd0.5 2,2-bipyridyl
tris 1-phenyl-1,3-butanedionato Dy0.5, Gd0.5 2,2-bipyridyl-N,N-dioxide
tris 1-phenyl-1,3-butanedionato Dy0.5, Gd0.5 phenanthroline
tris 1-phenyl-1,3-butanedionato Dy0.5, Gd0.5 bathocuproine
tris 1-phenyl-1,3-butanedionato Dy0.5, Gd0.5 bathophenanthroline
tris acetylacetonato Dy0.2, Gd0.8 dimethylaminopyridine
tris acetylacetonato Dy0.2, Gd0.8 4-picoline-N-oxide
tris acetylacetonato Dy0.2, Gd0.8 4-phenylpyridine
tris acetylacetonato Dy0.2, Gd0.8 4-phenylpyridine-N-oxide
tris acetylacetonato Dy0.2, Gd0.8 1-methylimidazole
tris acetylacetonato Dy0.2, Gd0.8 triphenylphosphine oxide
tris acetylacetonato Dy0.2, Gd0.8 2,2-bipyridyl
tris acetylacetonato Dy0.2, Gd0.8 2,2-bipyridyl-N,N-dioxide
tris acetylacetonato Dy0.2, Gd0.8 phenanthroline
tris acetylacetonato Dy0.2, Gd0.8 bathocuproine
tris acetylacetonato Dy0.2, Gd0.8 bathophenanthroline
tris dibenzoylmethanato Dy0.2, Gd0.8 dimethylaminopyridine
tris dibenzoylmethanato Dy0.2, Gd0.8 4-picoline-N-oxide
tris dibenzoylmethanato Dy0.2, Gd0.8 4-phenylpyridine
tris dibenzoylmethanato Dy0.2, Gd0.8 4-phenylpyridine-N-oxide
tris dibenzoylmethanato Dy0.2, Gd0.8 1-methylimidazole
tris dibenzoylmethanato Dy0.2, Gd0.8 triphenylphosphine oxide
tris dibenzoylmethanato Dy0.2, Gd0.8 2,2-bipyridyl
tris dibenzoylmethanato Dy0.2, Gd0.8 2,2-bipyridyl-N,N-dioxide
tris dibenzoylmethanato Dy0.2, Gd0.8 phenanthroline
tris dibenzoylmethanato Dy0.2, Gd0.8 bathocuproine
tris dibenzoylmethanato Dy0.2, Gd0.8 bathophenanthroline
tris thenoyltrifluoroacetonato Dy0.2, Gd0.8 dimethylaminopyridine
tris thenoyltrifluoroacetonato Dy0.2, Gd0.8 4-picoline-N-oxide
tris thenoyltrifluoroacetonato Dy0.2, Gd0.8 4-phenylpyridine
tris thenoyltrifluoroacetonato Dy0.2, Gd0.8 4-phenylpyridine-N-oxide
tris thenoyltrifluoroacetonato Dy0.2, Gd0.8 1-methylimidazole
tris thenoyltrifluoroacetonato Dy0.2, Gd0.8 triphenylphosphine oxide
tris thenoyltrifluoroacetonato Dy0.2, Gd0.8 2,2-bipyridyl
tris thenoyltrifluoroacetonato Dy0.2, Gd0.8 2,2-bipyridyl-N,N-dioxide
tris thenoyltrifluoroacetonato Dy0.2, Gd0.8 phenanthroline
tris thenoyltrifluoroacetonato Dy0.2, Gd0.8 bathocuproine
tris thenoyltrifluoroacetonato Dy0.2, Gd0.8 bathophenanthroline
tris 2,2,6,6-tetramethylheptanedionato Dy0.2, Gd0.8 dimethylaminopyridine
tris 2,2,6,6-tetramethylheptanedionato Dy0.2, Gd0.8 4-picoline-N-oxide
tris 2,2,6,6-tetramethylheptanedionato Dy0.2, Gd0.8 4-phenylpyridine
tris 2,2,6,6-tetramethylheptanedionato Dy0.2, Gd0.8 4-phenylpyridine-N-oxide
tris 2,2,6,6-tetramethylheptanedionato Dy0.2, Gd0.8 1-methylimidazole
tris 2,2,6,6-tetramethylheptanedionato Dy0.2, Gd0.8 triphenylphosphine oxide
tris 2,2,6,6-tetramethylheptanedionato Dy0.2, Gd0.8 2,2-bipyridyl
tris 2,2,6,6-tetramethylheptanedionato Dy0.2, Gd0.8 2,2-bipyridyl-N,N-dioxide
tris 2,2,6,6-tetramethylheptanedionato Dy0.2, Gd0.8 phenanthroline
tris 2,2,6,6-tetramethylheptanedionato Dy0.2, Gd0.8 bathocuproine
tris 2,2,6,6-tetramethylheptanedionato Dy0.2, Gd0.8 bathophenanthroline
tris 3-methylpentane-2,4-dionato Dy0.2, Gd0.8 dimethylaminopyridine
tris 3-methylpentane-2,4-dionato Dy0.2, Gd0.8 4-picoline-N-oxide
tris 3-methylpentane-2,4-dionato Dy0.2, Gd0.8 4-phenylpyridine tris 3-methylpentane-2,4-dionato Dy0.2, Gd0.8 4-phenylpyridine-N-oxide
tris 3-methylpentane-2,4-dionato Dy0.2, Gd0.8 1-methylimidazole
tris 3-methylpentane-2,4-dionato Dy0.2, Gd0.8 triphenylphosphine oxide
tris 3-methylpentane-2,4-dionato Dy0.2, Gd0.8 2,2-bipyridyl
tris 3-methylpentane-2,4-dionato Dy0.2, Gd0.8 2,2-bipyridyl-N,N-dioxide
tris 3-methylpentane-2,4-dionato Dy0.2, Gd0.8 phenanthroline
tris 3-methylpentane-2,4-dionato Dy0.2, Gd0.8 bathocuproine
tris 3-methylpentane-2,4-dionato Dy0.2, Gd0.8 bathophenanthroline
tris 3-ethylpentane-2,4-dionato Dy0.2, Gd0.8 dimethylaminopyridine
tris 3-ethylpentane-2,4-dionato Dy0.2, Gd0.8 4-picoline-N-oxide
tris 3-ethylpentane-2,4-dionato Dy0.2, Gd0.8 4-phenylpyridine
tris 3-ethylpentane-2,4-dionato Dy0.2, Gd0.8 4-phenylpyridine-N-oxide
tris 3-ethylpentane-2,4-dionato Dy0.2, Gd0.8 1-methylimidazole
tris 3-ethylpentane-2,4-dionato Dy0.2, Gd0.8 triphenylphosphine oxide
tris 3-ethylpentane-2,4-dionato Dy0.2, Gd0.8 2,2-bipyridyl
tris 3-ethylpentane-2,4-dionato Dy0.2, Gd0.8 2,2-bipyridyl-N,N-dioxide
tris 3-ethylpentane-2,4-dionato Dy0.2, Gd0.8 phenanthroline
tris 3-ethylpentane-2,4-dionato Dy0.2, Gd0.8 bathocuproine
tris 3-ethylpentane-2,4-dionato Dy0.2, Gd0.8 bathophenanthroline
tris pivaloyltrifluoroacetonato Dy0.2, Gd0.8 dimethylaminopyridine
tris pivaloyltrifluoroacetonato Dy0.2, Gd0.8 4-picoline-N-oxide
tris pivaloyltrifluoroacetonato Dy0.2, Gd0.8 4-phenylpyridine
tris pivaloyltrifluoroacetonato Dy0.2, Gd0.8 4-phenylpyridine-N-oxide
tris pivaloyltrifluoroacetonato Dy0.2, Gd0.8 1-methylimidazole
tris pivaloyltrifluoroacetonato Dy0.2, Gd0.8 triphenylphosphine oxide
tris pivaloyltrifluoroacetonato Dy0.2, Gd0.8 2,2-bipyridyl
tris pivaloyltrifluoroacetonato Dy0.2, Gd0.8 2,2-bipyridyl-N,N-dioxide
tris pivaloyltrifluoroacetonato Dy0.2, Gd0.8 phenanthroline
tris pivaloyltrifluoroacetonato Dy0.2, Gd0.8 bathocuproine
tris pivaloyltrifluoroacetonato Dy0.2, Gd0.8 bathophenanthroline
tris trifluoroacetylacetonato Dy0.2, Gd0.8 dimethylaminopyridine
tris trifluoroacetylacetonato Dy0.2, Gd0.8 4-picoline-N-oxide
tris trifluoroacetylacetonato Dy0.2, Gd0.8 4-phenylpyridine
tris trifluoroacetylacetonato Dy0.2, Gd0.8 4-phenylpyridine-N-oxide
tris trifluoroacetylacetonato Dy0.2, Gd0.8 1-methylimidazole
tris trifluoroacetylacetonato Dy0.2, Gd0.8 triphenylphosphine oxide
tris trifluoroacetylacetonato Dy0.2, Gd0.8 2,2-bipyridyl
tris trifluoroacetylacetonato Dy0.2, Gd0.8 2,2-bipyridyl-N,N-dioxide
tris trifluoroacetylacetonato Dy0.2, Gd0.8 phenanthroline
tris trifluoroacetylacetonato Dy0.2, Gd0.8 bathocuproine
tris trifluoroacetylacetonato Dy0.2, Gd0.8 bathophenanthroline
tris hexafluoroacetylacetonato Dy0.2, Gd0.8 dimethylaminopyridine
tris hexafluoroacetylacetonato Dy0.2, Gd0.8 4-picoline-N-oxide
tris hexafluoroacetylacetonato Dy0.2, Gd0.8 4-phenylpyridine
tris hexafluoroacetylacetonato Dy0.2, Gd0.8 4-phenylpyridine-N-oxide
tris hexafluoroacetylacetonato Dy0.2, Gd0.8 1-methylimidazole
tris hexafluoroacetylacetonato Dy0.2, Gd0.8 triphenylphosphine oxide
tris hexafluoroacetylacetonato Dy0.2, Gd0.8 2,2-bipyridyl
tris hexafluoroacetylacetonato Dy0.2, Gd0.8 2,2-bipyridyl-N,N-dioxide
tris hexafluoroacetylacetonato Dy0.2, Gd0.8 phenanthroline
tris hexafluoroacetylacetonato Dy0.2, Gd0.8 bathocuproine
tris hexafluoroacetylacetonato Dy0.2, Gd0.8 bathophenanthroline
tris 6,6,7,7,8,8,8-heptafluoro-2,2-dimethyloctanedionato Dy0.2, Gd0.8 dimethylaminopyridine
tris 6,6,7,7,8,8,8-heptafluoro-2,2-dimethyloctanedionato Dy0.2, Gd0.8 4-picoline-N-oxide
tris 6,6,7,7,8,8,8-heptafluoro-2,2-dimethyloctanedionato Dy0.2, Gd0.8 4-phenylpyridine
tris 6,6,7,7,8,8,8-heptafluoro-2,2-dimethyloctanedionato Dy0.2, Gd0.8 4-phenylpyridine-N-oxide
tris 6,6,7,7,8,8,8-heptafluoro-2,2-dimethyloctanedionato Dy0.2, Gd0.8 1-methylimidazole
tris 6,6,7,7,8,8,8-heptafluoro-2,2-dimethyloctanedionato Dy0.2, Gd0.8 triphenylphosphine oxide
tris 6,6,7,7,8,8,8-heptafluoro-2,2-dimethyloctanedionato Dy0.2, Gd0.8 2,2-bipyridyl
tris 6,6,7,7,8,8,8-heptafluoro-2,2-dimethyloctanedionato Dy0.2, Gd0.8 2,2-bipyridyl-N,N-dioxide
tris 6,6,7,7,8,8,8-heptafluoro-2,2-dimethyloctanedionato Dy0.2, Gd0.8 phenanthroline
tris 6,6,7,7,8,8,8-heptafluoro-2,2-dimethyloctanedionato Dy0.2, Gd0.8 bathocuproine
tris 6,6,7,7,8,8,8-heptafluoro-2,2-dimethyloctanedionato Dy0.2, Gd0.8 bathophenanthroline
tris 1-phenyl-1,3-butanedionato Dy0.2, Gd0.8 dimethylaminopyridine
tris 1-phenyl-1,3-butanedionato Dy0.2, Gd0.8 4-picoline-N-oxide
tris 1-phenyl-1,3-butanedionato Dy0.2, Gd0.8 4-phenylpyridine
tris 1-phenyl-1,3-butanedionato Dy0.2, Gd0.8 4-phenylpyridine-N-oxide
tris 1-phenyl-1,3-butanedionato Dy0.2, Gd0.8 1-methylimidazole
tris 1-phenyl-1,3-butanedionato Dy0.2, Gd0.8 triphenylphosphine oxide
tris 1-phenyl-1,3-butanedionato Dy0.2, Gd0.8 2,2-bipyridyl
tris 1-phenyl-1,3-butanedionato Dy0.2, Gd0.8 2,2-bipyridyl-N,N-dioxide
tris 1-phenyl-1,3-butanedionato Dy0.2, Gd0.8 phenanthroline
tris 1-phenyl-1,3-butanedionato Dy0.2, Gd0.8 bathocuproine tris 1-phenyl-1,3-butanedionato Dy0.2, Gd0.8 bathophenanthroline
tris acetylacetonato Dy0.1,Gd0.9 dimethylaminopyridine
tris acetylacetonato Dy0.1,Gd0.9 4-picoline-N-oxide
tris acetylacetonato Dy0.1,Gd0.9 4-phenylpyridine
tris acetylacetonato Dy0.1,Gd0.9 4-phenylpyridine-N-oxide
tris acetylacetonato Dy0.1,Gd0.9 1-methylimidazole
tris acetylacetonato Dy0.1,Gd0.9 triphenylphosphine oxide
tris acetylacetonato Dy0.1,Gd0.9 2,2-bipyridyl
tris acetylacetonato Dy0.1,Gd0.9 2,2-bipyridyl-N,N-dioxide
tris acetylacetonato Dy0.1,Gd0.9 phenanthroline
tris acetylacetonato Dy0.1,Gd0.9 bathocuproine
tris acetylacetonato Dy0.1,Gd0.9 bathophenanthroline
tris dibenzoylmethanato Dy0.1,Gd0.9 dimethylaminopyridine
tris dibenzoylmethanato Dy0.1,Gd0.9 4-picoline-N-oxide
tris dibenzoylmethanato Dy0.1,Gd0.9 4-phenylpyridine
tris dibenzoylmethanato Dy0.1,Gd0.9 4-phenylpyridine-N-oxide
tris dibenzoylmethanato Dy0.1,Gd0.9 1-methylimidazole
tris dibenzoylmethanato Dy0.1,Gd0.9 triphenylphosphine oxide
tris dibenzoylmethanato Dy0.1,Gd0.9 2,2-bipyridyl
tris dibenzoylmethanato Dy0.1,Gd0.9 2,2-bipyridyl-N,N-dioxide
tris dibenzoylmethanato Dy0.1,Gd0.9 phenanthroline
tris dibenzoylmethanato Dy0.1,Gd0.9 bathocuproine
tris dibenzoylmethanato Dy0.1,Gd0.9 bathophenanthroline
tris thenoyltrifluoroacetonato Dy0.1,Gd0.9 dimethylaminopyridine
tris thenoyltrifluoroacetonato Dy0.1,Gd0.9 4-picoline-N-oxide
tris thenoyltrifluoroacetonato Dy0.1,Gd0.9 4-phenylpyridine
tris thenoyltrifluoroacetonato Dy0.1,Gd0.9 4-phenylpyridine-N-oxide
tris thenoyltrifluoroacetonato Dy0.1,Gd0.9 1-methylimidazole
tris thenoyltrifluoroacetonato Dy0.1,Gd0.9 triphenylphosphine oxide
tris thenoyltrifluoroacetonato Dy0.1,Gd0.9 2,2-bipyridyl
tris thenoyltrifluoroacetonato Dy0.1,Gd0.9 2,2-bipyridyl-N,N-dioxide
tris thenoyltrifluoroacetonato Dy0.1,Gd0.9 phenanthroline
tris thenoyltrifluoroacetonato Dy0.1,Gd0.9 bathocuproine
tris thenoyltrifluoroacetonato Dy0.1,Gd0.9 bathophenanthroline
tris 2,2,6,6-tetramethylheptanedionato Dy0.1,Gd0.9 dimethylaminopyridine
tris 2,2,6,6-tetramethylheptanedionato Dy0.1,Gd0.9 4-picoline-N-oxide
tris 2,2,6,6-tetramethylheptanedionato Dy0.1,Gd0.9 4-phenylpyridine
tris 2,2,6,6-tetramethylheptanedionato Dy0.1,Gd0.9 4-phenylpyridine-N-oxide
tris 2,2,6,6-tetramethylheptanedionato Dy0.1,Gd0.9 1-methylimidazole
tris 2,2,6,6-tetramethylheptanedionato Dy0.1,Gd0.9 triphenylphosphine oxide
tris 2,2,6,6-tetramethylheptanedionato Dy0.1,Gd0.9 2,2-bipyridyl
tris 2,2,6,6-tetramethylheptanedionato Dy0.1,Gd0.9 2,2-bipyridyl-N,N-dioxide
tris 2,2,6,6-tetramethylheptanedionato Dy0.1,Gd0.9 phenanthroline
tris 2,2,6,6-tetramethylheptanedionato Dy0.1,Gd0.9 bathocuproine
tris 2,2,6,6-tetramethylheptanedionato Dy0.1,Gd0.9 bathophenanthroline
tris 3-methylpentane-2,4-dionato Dy0.1,Gd0.9 dimethylaminopyridine
tris 3-methylpentane-2,4-dionato Dy0.1,Gd0.9 4-picoline-N-oxide
tris 3-methylpentane-2,4-dionato Dy0.1,Gd0.9 4-phenylpyridine
tris 3-methylpentane-2,4-dionato Dy0.1,Gd0.9 4-phenylpyridine-N-oxide
tris 3-methylpentane-2,4-dionato Dy0.1,Gd0.9 1-methylimidazole
tris 3-methylpentane-2,4-dionato Dy0.1,Gd0.9 triphenylphosphine oxide
tris 3-methylpentane-2,4-dionato Dy0.1,Gd0.9 2,2-bipyridyl
tris 3-methylpentane-2,4-dionato Dy0.1,Gd0.9 2,2-bipyridyl-N,N-dioxide
tris 3-methylpentane-2,4-dionato Dy0.1,Gd0.9 phenanthroline
tris 3-methylpentane-2,4-dionato Dy0.1,Gd0.9 bathocuproine
tris 3-methylpentane-2,4-dionato Dy0.1,Gd0.9 bathophenanthroline
tris 3-ethylpentane-2,4-dionato Dy0.1,Gd0.9 dimethylaminopyridine
tris 3-ethylpentane-2,4-dionato Dy0.1,Gd0.9 4-picoline-N-oxide
tris 3-ethylpentane-2,4-dionato Dy0.1,Gd0.9 4-phenylpyridine
tris 3-ethylpentane-2,4-dionato Dy0.1,Gd0.9 4-phenylpyridine-N-oxide
tris 3-ethylpentane-2,4-dionato Dy0.1,Gd0.9 1-methylimidazole
tris 3-ethylpentane-2,4-dionato Dy0.1,Gd0.9 triphenylphosphine oxide
tris 3-ethylpentane-2,4-dionato Dy0.1,Gd0.9 2,2-bipyridyl
tris 3-ethylpentane-2,4-dionato Dy0.1,Gd0.9 2,2-bipyridyl-N,N-dioxide
tris 3-ethylpentane-2,4-dionato Dy0.1,Gd0.9 phenanthroline
tris 3-ethylpentane-2,4-dionato Dy0.1,Gd0.9 bathocuproine
tris 3-ethylpentane-2,4-dionato Dy0.1,Gd0.9 bathophenanthroline
tris pivaloyltrifluoroacetonato Dy0.1,Gd0.9 dimethylaminopyridine
tris pivaloyltrifluoroacetonato Dy0.1,Gd0.9 4-picoline-N-oxide
tris pivaloyltrifluoroacetonato Dy0.1,Gd0.9 4-phenylpyridine
tris pivaloyltrifluoroacetonato Dy0.1,Gd0.9 4-phenylpyridine-N-oxide
tris pivaloyltrifluoroacetonato Dy0.1,Gd0.9 1-methylimidazole
tris pivaloyltrifluoroacetonato Dy0.1,Gd0.9 triphenylphosphine oxide
tris pivaloyltrifluoroacetonato Dy0.1,Gd0.9 2,2-bipyridyl
tris pivaloyltrifluoroacetonato Dy0.1,Gd0.9 2,2-bipyridyl-N,N-dioxide
tris pivaloyltrifluoroacetonato Dy0.1,Gd0.9 phenanthroline
tris pivaloyltrifluoroacetonato Dy0.1,Gd0.9 bathocuproine
tris pivaloyltrifluoroacetonato Dy0.1,Gd0.9 bathophenanthroline
tris trifluoroacetylacetonato Dy0.1,Gd0.9 dimethylaminopyridine
tris trifluoroacetylacetonato Dy0.1,Gd0.9 4-picoline-N-oxide
tris trifluoroacetylacetonato Dy0.1,Gd0.9 4-phenylpyridine tris trifluoroacetylacetonato Dy0.1,Gd0.9 4-phenylpyridine-N-oxide
tris trifluoroacetylacetonato Dy0.1,Gd0.9 1-methylimidazole
tris trifluoroacetylacetonato Dy0.1,Gd0.9 triphenylphosphine oxide
tris trifluoroacetylacetonato Dy0.1,Gd0.9 2,2-bipyridyl
tris trifluoroacetylacetonato Dy0.1,Gd0.9 2,2-bipyridyl-N,N-dioxide
tris trifluoroacetylacetonato Dy0.1,Gd0.9 phenanthroline
tris trifluoroacetylacetonato Dy0.1,Gd0.9 bathocuproine
tris trifluoroacetylacetonato Dy0.1,Gd0.9 bathophenanthroline
tris hexafluoroacetylacetonato Dy0.1,Gd0.9 dimethylaminopyridine
tris hexafluoroacetylacetonato Dy0.1,Gd0.9 4-picoline-N-oxide
tris hexafluoroacetylacetonato Dy0.1,Gd0.9 4-phenylpyridine
tris hexafluoroacetylacetonato Dy0.1,Gd0.9 4-phenylpyridine-N-oxide
tris hexafluoroacetylacetonato Dy0.1,Gd0.9 1-methylimidazole
tris hexafluoroacetylacetonato Dy0.1,Gd0.9 triphenylphosphine oxide
tris hexafluoroacetylacetonato Dy0.1,Gd0.9 2,2-bipyridyl
tris hexafluoroacetylacetonato Dy0.1,Gd0.9 2,2-bipyridyl-N,N-dioxide
tris hexafluoroacetylacetonato Dy0.1,Gd0.9 phenanthroline
tris hexafluoroacetylacetonato Dy0.1,Gd0.9 bathocuproine
tris hexafluoroacetylacetonato Dy0.1,Gd0.9 bathophenanthroline
tris 6,6,7,7,8,8,8-heptafluoro-2,2-dimethyloctanedionato Dy0.1,Gd0.9 dimethylaminopyridine
tris 6,6,7,7,8,8,8-heptafluoro-2,2-dimethyloctanedionato Dy0.1,Gd0.9 4-picoline-N-oxide
tris 6,6,7,7,8,8,8-heptafluoro-2,2-dimethyloctanedionato Dy0.1,Gd0.9 4-phenylpyridine
tris 6,6,7,7,8,8,8-heptafluoro-2,2-dimethyloctanedionato Dy0.1,Gd0.9 4-phenylpyridine-N-oxide
tris 6,6,7,7,8,8,8-heptafluoro-2,2-dimethyloctanedionato Dy0.1,Gd0.9 1-methylimidazole
tris 6,6,7,7,8,8,8-heptafluoro-2,2-dimethyloctanedionato Dy0.1,Gd0.9 triphenylphosphine oxide
tris 6,6,7,7,8,8,8-heptafluoro-2,2-dimethyloctanedionato Dy0.1,Gd0.9 2,2-bipyridyl
tris 6,6,7,7,8,8,8-heptafluoro-2,2-dimethyloctanedionato Dy0.1,Gd0.9 2,2-bipyridyl-N,N-dioxide
tris 6,6,7,7,8,8,8-heptafluoro-2,2-dimethyloctanedionato Dy0.1,Gd0.9 phenanthroline
tris 6,6,7,7,8,8,8-heptafluoro-2,2-dimethyloctanedionato Dy0.1,Gd0.9 bathocuproine
tris 6,6,7,7,8,8,8-heptafluoro-2,2-dimethyloctanedionato Dy0.1,Gd0.9 bathophenanthroline
tris 1-phenyl-1,3-butanedionato Dy0.1,Gd0.9 dimethylaminopyridine
tris 1-phenyl-1,3-butanedionato Dy0.1,Gd0.9 4-picoline-N-oxide
tris 1-phenyl-1,3-butanedionato Dy0.1,Gd0.9 4-phenylpyridine
tris 1-phenyl-1,3-butanedionato Dy0.1,Gd0.9 4-phenylpyridine-N-oxide
tris 1-phenyl-1,3-butanedionato Dy0.1,Gd0.9 1-methylimidazole
tris 1-phenyl-1,3-butanedionato Dy0.1,Gd0.9 triphenylphosphine oxide
tris 1-phenyl-1,3-butanedionato Dy0.1,Gd0.9 2,2-bipyridyl
tris 1-phenyl-1,3-butanedionato Dy0.1,Gd0.9 2,2-bipyridyl-N,N-dioxide
tris 1-phenyl-1,3-butanedionato Dy0.1,Gd0.9 phenanthroline
tris 1-phenyl-1,3-butanedionato Dy0.1,Gd0.9 bathocuproine
tris 1-phenyl-1,3-butanedionato Dy0.1,Gd0.9 bathophenanthroline
tris acetylacetonato Dy0.01, Gd0.99 dimethylaminopyridine
tris acetylacetonato Dy0.01, Gd0.99 4-picoline-N-oxide
tris acetylacetonato Dy0.01, Gd0.99 4-phenylpyridine
tris acetylacetonato Dy0.01, Gd0.99 4-phenylpyridine-N-oxide
tris acetylacetonato Dy0.01, Gd0.99 1-methylimidazole
tris acetylacetonato Dy0.01, Gd0.99 triphenylphosphine oxide
tris acetylacetonato Dy0.01, Gd0.99 2,2-bipyridyl
tris acetylacetonato Dy0.01, Gd0.99 2,2-bipyridyl-N,N-dioxide
tris acetylacetonato Dy0.01, Gd0.99 phenanthroline
tris acetylacetonato Dy0.01, Gd0.99 bathocuproine
tris acetylacetonato Dy0.01, Gd0.99 bathophenanthroline
tris dibenzoylmethanato Dy0.01, Gd0.99 dimethylaminopyridine
tris dibenzoylmethanato Dy0.01, Gd0.99 4-picoline-N-oxide
tris dibenzoylmethanato Dy0.01, Gd0.99 4-phenylpyridine
tris dibenzoylmethanato Dy0.01, Gd0.99 4-phenylpyridine-N-oxide
tris dibenzoylmethanato Dy0.01, Gd0.99 1-methylimidazole
tris dibenzoylmethanato Dy0.01, Gd0.99 triphenylphosphine oxide
tris dibenzoylmethanato Dy0.01, Gd0.99 2,2-bipyridyl
tris dibenzoylmethanato Dy0.01, Gd0.99 2,2-bipyridyl-N,N-dioxide
tris dibenzoylmethanato Dy0.01, Gd0.99 phenanthroline
tris dibenzoylmethanato Dy0.01, Gd0.99 bathocuproine
tris dibenzoylmethanato Dy0.01, Gd0.99 bathophenanthroline
tris thenoyltrifluoroacetonato Dy0.01, Gd0.99 dimethylaminopyridine
tris thenoyltrifluoroacetonato Dy0.01, Gd0.99 4-picoline-N-oxide
tris thenoyltrifluoroacetonato Dy0.01, Gd0.99 4-phenylpyridine
tris thenoyltrifluoroacetonato Dy0.01, Gd0.99 4-phenylpyridine-N-oxide
tris thenoyltrifluoroacetonato Dy0.01, Gd0.99 1-methylimidazole
tris thenoyltrifluoroacetonato Dy0.01, Gd0.99 triphenylphosphine oxide
tris thenoyltrifluoroacetonato Dy0.01, Gd0.99 2,2-bipyridyl
tris thenoyltrifluoroacetonato Dy0.01, Gd0.99 2,2-bipyridyl-N,N-dioxide
tris thenoyltrifluoroacetonato Dy0.01, Gd0.99 phenanthroline
tris thenoyltrifluoroacetonato Dy0.01, Gd0.99 bathocuproine
tris thenoyltrifluoroacetonato Dy0.01, Gd0.99 bathophenanthroline
tris 2,2,6,6-tetramethylheptanedionato Dy0.01, Gd0.99 dimethylaminopyridine
tris 2,2,6,6-tetramethylheptanedionato Dy0.01, Gd0.99 4-picoline-N-oxide
tris 2,2,6,6-tetramethylheptanedionato Dy0.01, Gd0.99 4-phenylpyridine
tris 2,2,6,6-tetramethylheptanedionato Dy0.01, Gd0.99 4-phenylpyridine-N-oxide tris 2,2,6,6-tetramethylheptanedionato Dy0.01, Gd0.99 1-methylimidazole
tris 2,2,6,6-tetramethylheptanedionato Dy0.01, Gd0.99 triphenylphosphine oxide
tris 2,2,6,6-tetramethylheptanedionato Dy0.01, Gd0.99 2,2-bipyridyl
tris 2,2,6,6-tetramethylheptanedionato Dy0.01, Gd0.99 2,2-bipyridyl-N,N-dioxide
tris 2,2,6,6-tetramethylheptanedionato Dy0.01, Gd0.99 phenanthroline
tris 2,2,6,6-tetramethylheptanedionato Dy0.01, Gd0.99 bathocuproine
tris 2,2,6,6-tetramethylheptanedionato Dy0.01, Gd0.99 bathophenanthroline
tris 3-methylpentane-2,4-dionato Dy0.01, Gd0.99 dimethylaminopyridine
tris 3-methylpentane-2,4-dionato Dy0.01, Gd0.99 4-picoline-N-oxide
tris 3-methylpentane-2,4-dionato Dy0.01, Gd0.99 4-phenylpyridine
tris 3-methylpentane-2,4-dionato Dy0.01, Gd0.99 4-phenylpyridine-N-oxide
tris 3-methylpentane-2,4-dionato Dy0.01, Gd0.99 1-methylimidazole
tris 3-methylpentane-2,4-dionato Dy0.01, Gd0.99 triphenylphosphine oxide
tris 3-methylpentane-2,4-dionato Dy0.01, Gd0.99 2,2-bipyridyl
tris 3-methylpentane-2,4-dionato Dy0.01, Gd0.99 2,2-bipyridyl-N,N-dioxide
tris 3-methylpentane-2,4-dionato Dy0.01, Gd0.99 phenanthroline
tris 3-methylpentane-2,4-dionato Dy0.01, Gd0.99 bathocuproine
tris 3-methylpentane-2,4-dionato Dy0.01, Gd0.99 bathophenanthroline
tris 3-ethylpentane-2,4-dionato Dy0.01, Gd0.99 dimethylaminopyridine
tris 3-ethylpentane-2,4-dionato Dy0.01, Gd0.99 4-picoline-N-oxide
tris 3-ethylpentane-2,4-dionato Dy0.01, Gd0.99 4-phenylpyridine
tris 3-ethylpentane-2,4-dionato Dy0.01, Gd0.99 4-phenylpyridine-N-oxide
tris 3-ethylpentane-2,4-dionato Dy0.01, Gd0.99 1-methylimidazole
tris 3-ethylpentane-2,4-dionato Dy0.01, Gd0.99 triphenylphosphine oxide
tris 3-ethylpentane-2,4-dionato Dy0.01, Gd0.99 2,2-bipyridyl
tris 3-ethylpentane-2,4-dionato Dy0.01, Gd0.99 2,2-bipyridyl-N,N-dioxide
tris 3-ethylpentane-2,4-dionato Dy0.01, Gd0.99 phenanthroline
tris 3-ethylpentane-2,4-dionato Dy0.01, Gd0.99 bathocuproine
tris 3-ethylpentane-2,4-dionato Dy0.01, Gd0.99 bathophenanthroline
tris pivaloyltrifluoroacetonato Dy0.01, Gd0.99 dimethylaminopyridine
tris pivaloyltrifluoroacetonato Dy0.01, Gd0.99 4-picoline-N-oxide
tris pivaloyltrifluoroacetonato Dy0.01, Gd0.99 4-phenylpyridine
tris pivaloyltrifluoroacetonato Dy0.01, Gd0.99 4-phenylpyridine-N-oxide
tris pivaloyltrifluoroacetonato Dy0.01, Gd0.99 1-methylimidazole
tris pivaloyltrifluoroacetonato Dy0.01, Gd0.99 triphenylphosphine oxide
tris pivaloyltrifluoroacetonato Dy0.01, Gd0.99 2,2-bipyridyl
tris pivaloyltrifluoroacetonato Dy0.01, Gd0.99 2,2-bipyridyl-N,N-dioxide
tris pivaloyltrifluoroacetonato Dy0.01, Gd0.99 phenanthroline
tris pivaloyltrifluoroacetonato Dy0.01, Gd0.99 bathocuproine
tris pivaloyltrifluoroacetonato Dy0.01, Gd0.99 bathophenanthroline
tris trifluoroacetylacetonato Dy0.01, Gd0.99 dimethylaminopyridine
tris trifluoroacetylacetonato Dy0.01, Gd0.99 4-picoline-N-oxide
tris trifluoroacetylacetonato Dy0.01, Gd0.99 4-phenylpyridine
tris trifluoroacetylacetonato Dy0.01, Gd0.99 4-phenylpyridine-N-oxide
tris trifluoroacetylacetonato Dy0.01, Gd0.99 1-methylimidazole
tris trifluoroacetylacetonato Dy0.01, Gd0.99 triphenylphosphine oxide
tris trifluoroacetylacetonato Dy0.01, Gd0.99 2,2-bipyridyl
tris trifluoroacetylacetonato Dy0.01, Gd0.99 2,2-bipyridyl-N,N-dioxide
tris trifluoroacetylacetonato Dy0.01, Gd0.99 phenanthroline
tris trifluoroacetylacetonato Dy0.01, Gd0.99 bathocuproine
tris trifluoroacetylacetonato Dy0.01, Gd0.99 bathophenanthroline
tris hexafluoroacetylacetonato Dy0.01, Gd0.99 dimethylaminopyridine
tris hexafluoroacetylacetonato Dy0.01, Gd0.99 4-picoline-N-oxide
tris hexafluoroacetylacetonato Dy0.01, Gd0.99 4-phenylpyridine
tris hexafluoroacetylacetonato Dy0.01, Gd0.99 4-phenylpyridine-N-oxide
tris hexafluoroacetylacetonato Dy0.01, Gd0.99 1-methylimidazole
tris hexafluoroacetylacetonato Dy0.01, Gd0.99 triphenylphosphine oxide
tris hexafluoroacetylacetonato Dy0.01, Gd0.99 2,2-bipyridyl
tris hexafluoroacetylacetonato Dy0.01, Gd0.99 2,2-bipyridyl-N,N-dioxide
tris hexafluoroacetylacetonato Dy0.01, Gd0.99 phenanthroline
tris hexafluoroacetylacetonato Dy0.01, Gd0.99 bathocuproine
tris hexafluoroacetylacetonato Dy0.01, Gd0.99 bathophenanthroline
tris 6,6,7,7,8,8,8-heptafluoro-2,2-dimethyloctanedionato Dy0.01, Gd0.99 dimethylaminopyridine
tris 6,6,7,7,8,8,8-heptafluoro-2,2-dimethyloctanedionato Dy0.01, Gd0.99 4-picoline-N-oxide
tris 6,6,7,7,8,8,8-heptafluoro-2,2-dimethyloctanedionato Dy0.01, Gd0.99 4-phenylpyridine
tris 6,6,7,7,8,8,8-heptafluoro-2,2-dimethyloctanedionato Dy0.01, Gd0.99 4-phenylpyridine-N-oxide
tris 6,6,7,7,8,8,8-heptafluoro-2,2-dimethyloctanedionato Dy0.01, Gd0.99 1-methylimidazole
tris 6,6,7,7,8,8,8-heptafluoro-2,2-dimethyloctanedionato Dy0.01, Gd0.99 triphenylphosphine oxide tris 6,6,7,7,8,8,8-heptafluoro-2,2-dimethyloctanedionato Dy0.01, Gd0.99 2,2-bipyridyl
tris 6,6,7,7,8,8,8-heptafluoro-2,2-dimethyloctanedionato Dy0.01, Gd0.99 2,2-bipyridyl-N,N-dioxide
tris 6,6,7,7,8,8,8-heptafluoro-2,2-dimethyloctanedionato Dy0.01, Gd0.99 phenanthroline
tris 6,6,7,7,8,8,8-heptafluoro-2,2-dimethyloctanedionato Dy0.01, Gd0.99 bathocuproine
tris 6,6,7,7,8,8,8-heptafluoro-2,2-dimethyloctanedionato Dy0.01, Gd0.99 bathophenanthroline
tris 1-phenyl-1,3-butanedionato Dy0.01, Gd0.99 dimethylaminopyridine
tris 1-phenyl-1,3-butanedionato Dy0.01, Gd0.99 4-picoline-N-oxide
tris 1-phenyl-1,3-butanedionato Dy0.01, Gd0.99 4-phenylpyridine
tris 1-phenyl-1,3-butanedionato Dy0.01, Gd0.99 4-phenylpyridine-N-oxide
tris 1-phenyl-1,3-butanedionato Dy0.01, Gd0.99 1-methylimidazole
tris 1-phenyl-1,3-butanedionato Dy0.01, Gd0.99 triphenylphosphine oxide
tris 1-phenyl-1,3-butanedionato Dy0.01, Gd0.99 2,2-bipyridyl
tris 1-phenyl-1,3-butanedionato Dy0.01, Gd0.99 2,2-bipyridyl-N,N-dioxide
tris 1-phenyl-1,3-butanedionato Dy0.01, Gd0.99 phenanthroline
tris 1-phenyl-1,3-butanedionato Dy0.01, Gd0.99 bathocuproine
tris 1-phenyl-1,3-butanedionato Dy0.01, Gd0.99 bathophenanthroline
tris acetylacetonato Dy0.5, Gd0.5 dimethylaminopyridine
tris acetylacetonato Dy0.5, Gd0.5 4-picoline-N-oxide
tris acetylacetonato Dy0.5, Gd0.5 4-phenylpyridine
tris acetylacetonato Dy0.5, Gd0.5 4-phenylpyridine-N-oxide
tris acetylacetonato Dy0.5, Gd0.5 1-methylimidazole
tris acetylacetonato Dy0.5, Gd0.5 triphenylphosphine oxide
tris acetylacetonato Dy0.5, Gd0.5 2,2-bipyridyl
tris acetylacetonato Dy0.5, Gd0.5 2,2-bipyridyl-N,N-dioxide
tris acetylacetonato Dy0.5, Gd0.5 phenanthroline
tris acetylacetonato Dy0.5, Gd0.5 bathocuproine
tris acetylacetonato Dy0.5, Gd0.5 bathophenanthroline
tris dibenzoylmethanato Dy0.5, Gd0.5 dimethylaminopyridine
tris dibenzoylmethanato Dy0.5, Gd0.5 4-picoline-N-oxide
tris dibenzoylmethanato Dy0.5, Gd0.5 4-phenylpyridine
tris dibenzoylmethanato Dy0.5, Gd0.5 4-phenylpyridine-N-oxide
tris dibenzoylmethanato Dy0.5, Gd0.5 1-methylimidazole
tris dibenzoylmethanato Dy0.5, Gd0.5 triphenylphosphine oxide
tris dibenzoylmethanato Dy0.5, Gd0.5 2,2-bipyridyl
tris dibenzoylmethanato Dy0.5, Gd0.5 2,2-bipyridyl-N,N-dioxide
tris dibenzoylmethanato Dy0.5, Gd0.5 phenanthroline
tris dibenzoylmethanato Dy0.5, Gd0.5 bathocuproine
tris dibenzoylmethanato Dy0.5, Gd0.5 bathophenanthroline
tris thenoyltrifluoroacetonato Dy0.5, Gd0.5 dimethylaminopyridine
tris thenoyltrifluoroacetonato Dy0.5, Gd0.5 4-picoline-N-oxide
tris thenoyltrifluoroacetonato Dy0.5, Gd0.5 4-phenylpyridine
tris thenoyltrifluoroacetonato Dy0.5, Gd0.5 4-phenylpyridine-N-oxide
tris thenoyltrifluoroacetonato Dy0.5, Gd0.5 1-methylimidazole
tris thenoyltrifluoroacetonato Dy0.5, Gd0.5 triphenylphosphine oxide
tris thenoyltrifluoroacetonato Dy0.5, Gd0.5 2,2-bipyridyl
tris thenoyltrifluoroacetonato Dy0.5, Gd0.5 2,2-bipyridyl-N,N-dioxide
tris thenoyltrifluoroacetonato Dy0.5, Gd0.5 phenanthroline
tris thenoyltrifluoroacetonato Dy0.5, Gd0.5 bathocuproine
tris thenoyltrifluoroacetonato Dy0.5, Gd0.5 bathophenanthroline
tris 2,2,6,6-tetramethylheptanedionato Dy0.5, Gd0.5 dimethylaminopyridine
tris 2,2,6,6-tetramethylheptanedionato Dy0.5, Gd0.5 4-picoline-N-oxide
tris 2,2,6,6-tetramethylheptanedionato Dy0.5, Gd0.5 4-phenylpyridine
tris 2,2,6,6-tetramethylheptanedionato Dy0.5, Gd0.5 4-phenylpyridine-N-oxide
tris 2,2,6,6-tetramethylheptanedionato Dy0.5, Gd0.5 1-methylimidazole
tris 2,2,6,6-tetramethylheptanedionato Dy0.5, Gd0.5 triphenylphosphine oxide
tris 2,2,6,6-tetramethylheptanedionato Dy0.5, Gd0.5 2,2-bipyridyl
tris 2,2,6,6-tetramethylheptanedionato Dy0.5, Gd0.5 2,2-bipyridyl-N,N-dioxide
tris 2,2,6,6-tetramethylheptanedionato Dy0.5, Gd0.5 phenanthroline
tris 2,2,6,6-tetramethylheptanedionato Dy0.5, Gd0.5 bathocuproine
tris 2,2,6,6-tetramethylheptanedionato Dy0.5, Gd0.5 bathophenanthroline
tris 3-methylpentane-2,4-dionato Dy0.5, Gd0.5 dimethylaminopyridine
tris 3-methylpentane-2,4-dionato Dy0.5, Gd0.5 4-picoline-N-oxide
tris 3-methylpentane-2,4-dionato Dy0.5, Gd0.5 4-phenylpyridine
tris 3-methylpentane-2,4-dionato Dy0.5, Gd0.5 4-phenylpyridine-N-oxide
tris 3-methylpentane-2,4-dionato Dy0.5, Gd0.5 1-methylimidazole
tris 3-methylpentane-2,4-dionato Dy0.5, Gd0.5 triphenylphosphine oxide
tris 3-methylpentane-2,4-dionato Dy0.5, Gd0.5 2,2-bipyridyl
tris 3-methylpentane-2,4-dionato Dy0.5, Gd0.5 2,2-bipyridyl-N,N-dioxide
tris 3-methylpentane-2,4-dionato Dy0.5, Gd0.5 phenanthroline
tris 3-methylpentane-2,4-dionato Dy0.5, Gd0.5 bathocuproine
tris 3-methylpentane-2,4-dionato Dy0.5, Gd0.5 bathophenanthroline
tris 3-ethylpentane-2,4-dionato Dy0.5, Gd0.5 dimethylaminopyridine
tris 3-ethylpentane-2,4-dionato Dy0.5, Gd0.5 4-picoline-N-oxide
tris 3-ethylpentane-2,4-dionato Dy0.5, Gd0.5 4-phenylpyridine
tris 3-ethylpentane-2,4-dionato Dy0.5, Gd0.5 4-phenylpyridine-N-oxide
tris 3-ethylpentane-2,4-dionato Dy0.5, Gd0.5 1-methylimidazole
tris 3-ethylpentane-2,4-dionato Dy0.5, Gd0.5 triphenylphosphine oxide tris 3-ethylpentane-2,4-dionato Dy0.5, Gd0.5 2,2-bipyridyl
tris 3-ethylpentane-2,4-dionato Dy0.5, Gd0.5 2,2-bipyridyl-N,N-dioxide
tris 3-ethylpentane-2,4-dionato Dy0.5, Gd0.5 phenanthroline
tris 3-ethylpentane-2,4-dionato Dy0.5, Gd0.5 bathocuproine
tris 3-ethylpentane-2,4-dionato Dy0.5, Gd0.5 bathophenanthroline
tris pivaloyltrifluoroacetonato Dy0.5, Gd0.5 dimethylaminopyridine
tris pivaloyltrifluoroacetonato Dy0.5, Gd0.5 4-picoline-N-oxide
tris pivaloyltrifluoroacetonato Dy0.5, Gd0.5 4-phenylpyridine
tris pivaloyltrifluoroacetonato Dy0.5, Gd0.5 4-phenylpyridine-N-oxide
tris pivaloyltrifluoroacetonato Dy0.5, Gd0.5 1-methylimidazole
tris pivaloyltrifluoroacetonato Dy0.5, Gd0.5 triphenylphosphine oxide
tris pivaloyltrifluoroacetonato Dy0.5, Gd0.5 2,2-bipyridyl
tris pivaloyltrifluoroacetonato Dy0.5, Gd0.5 2,2-bipyridyl-N,N-dioxide
tris pivaloyltrifluoroacetonato Dy0.5, Gd0.5 phenanthroline
tris pivaloyltrifluoroacetonato Dy0.5, Gd0.5 bathocuproine
tris pivaloyltrifluoroacetonato Dy0.5, Gd0.5 bathophenanthroline
tris trifluoroacetylacetonato Dy0.5, Gd0.5 dimethylaminopyridine
tris trifluoroacetylacetonato Dy0.5, Gd0.5 4-picoline-N-oxide
tris trifluoroacetylacetonato Dy0.5, Gd0.5 4-phenylpyridine
tris trifluoroacetylacetonato Dy0.5, Gd0.5 4-phenylpyridine-N-oxide
tris trifluoroacetylacetonato Dy0.5, Gd0.5 1-methylimidazole
tris trifluoroacetylacetonato Dy0.5, Gd0.5 triphenylphosphine oxide
tris trifluoroacetylacetonato Dy0.5, Gd0.5 2,2-bipyridyl
tris trifluoroacetylacetonato Dy0.5, Gd0.5 2,2-bipyridyl-N,N-dioxide
tris trifluoroacetylacetonato Dy0.5, Gd0.5 phenanthroline
tris trifluoroacetylacetonato Dy0.5, Gd0.5 bathocuproine
tris trifluoroacetylacetonato Dy0.5, Gd0.5 bathophenanthroline
tris hexafluoroacetylacetonato Dy0.5, Gd0.5 dimethylaminopyridine
tris hexafluoroacetylacetonato Dy0.5, Gd0.5 4-picoline-N-oxide
tris hexafluoroacetylacetonato Dy0.5, Gd0.5 4-phenylpyridine
tris hexafluoroacetylacetonato Dy0.5, Gd0.5 4-phenylpyridine-N-oxide
tris hexafluoroacetylacetonato Dy0.5, Gd0.5 1-methylimidazole
tris hexafluoroacetylacetonato Dy0.5, Gd0.5 triphenylphosphine oxide
tris hexafluoroacetylacetonato Dy0.5, Gd0.5 2,2-bipyridyl
tris hexafluoroacetylacetonato Dy0.5, Gd0.5 2,2-bipyridyl-N,N-dioxide
tris hexafluoroacetylacetonato Dy0.5, Gd0.5 phenanthroline
tris hexafluoroacetylacetonato Dy0.5, Gd0.5 bathocuproine
tris hexafluoroacetylacetonato Dy0.5, Gd0.5 bathophenanthroline
tris 6,6,7,7,8,8,8-heptafluoro-2,2-dimethyloctanedionato Dy0.5, Gd0.5 dimethylaminopyridine
tris 6,6,7,7,8,8,8-heptafluoro-2,2-dimethyloctanedionato Dy0.5, Gd0.5 4-picoline-N-oxide
tris 6,6,7,7,8,8,8-heptafluoro-2,2-dimethyloctanedionato Dy0.5, Gd0.5 4-phenylpyridine
tris 6,6,7,7,8,8,8-heptafluoro-2,2-dimethyloctanedionato Dy0.5, Gd0.5 4-phenylpyridine-N-oxide
tris 6,6,7,7,8,8,8-heptafluoro-2,2-dimethyloctanedionato Dy0.5, Gd0.5 1-methylimidazole
tris 6,6,7,7,8,8,8-heptafluoro-2,2-dimethyloctanedionato Dy0.5, Gd0.5 triphenylphosphine oxide
tris 6,6,7,7,8,8,8-heptafluoro-2,2-dimethyloctanedionato Dy0.5, Gd0.5 2,2-bipyridyl
tris 6,6,7,7,8,8,8-heptafluoro-2,2-dimethyloctanedionato Dy0.5, Gd0.5 2,2-bipyridyl-N,N-dioxide
tris 6,6,7,7,8,8,8-heptafluoro-2,2-dimethyloctanedionato Dy0.5, Gd0.5 phenanthroline
tris 6,6,7,7,8,8,8-heptafluoro-2,2-dimethyloctanedionato Dy0.5, Gd0.5 bathocuproine
tris 6,6,7,7,8,8,8-heptafluoro-2,2-dimethyloctanedionato Dy0.5, Gd0.5 bathophenanthroline
tris 1-phenyl-1,3-butanedionato Dy0.5, Gd0.5 dimethylaminopyridine
tris 1-phenyl-1,3-butanedionato Dy0.5, Gd0.5 4-picoline-N-oxide
tris 1-phenyl-1,3-butanedionato Dy0.5, Gd0.5 4-phenylpyridine
tris 1-phenyl-1,3-butanedionato Dy0.5, Gd0.5 4-phenylpyridine-N-oxide
tris 1-phenyl-1,3-butanedionato Dy0.5, Gd0.5 1-methylimidazole
tris 1-phenyl-1,3-butanedionato Dy0.5, Gd0.5 triphenylphosphine oxide
tris 1-phenyl-1,3-butanedionato Dy0.5, Gd0.5 2,2-bipyridyl
tris 1-phenyl-1,3-butanedionato Dy0.5, Gd0.5 2,2-bipyridyl-N,N-dioxide
tris 1-phenyl-1,3-butanedionato Dy0.5, Gd0.5 phenanthroline
tris 1-phenyl-1,3-butanedionato Dy0.5, Gd0.5 bathocuproine
tris 1-phenyl-1,3-butanedionato Dy0.5, Gd0.5 bathophenanthroline
tris acetylacetonato Dy0.2, Gd0.8 dimethylaminopyridine
tris acetylacetonato Dy0.2, Gd0.8 4-picoline-N-oxide
tris acetylacetonato Dy0.2, Gd0.8 4-phenylpyridine
tris acetylacetonato Dy0.2, Gd0.8 4-phenylpyridine-N-oxide
tris acetylacetonato Dy0.2, Gd0.8 1-methylimidazole
tris acetylacetonato Dy0.2, Gd0.8 triphenylphosphine oxide
tris acetylacetonato Dy0.2, Gd0.8 2,2-bipyridyl
tris acetylacetonato Dy0.2, Gd0.8 2,2-bipyridyl-N,N-dioxide
tris acetylacetonato Dy0.2, Gd0.8 phenanthroline
tris acetylacetonato Dy0.2, Gd0.8 bathocuproine
tris acetylacetonato Dy0.2, Gd0.8 bathophenanthroline
tris dibenzoylmethanato Dy0.2, Gd0.8 dimethylaminopyridine
tris dibenzoylmethanato Dy0.2, Gd0.8 4-picoline-N-oxide
tris dibenzoylmethanato Dy0.2, Gd0.8 4-phenylpyridine
tris dibenzoylmethanato Dy0.2, Gd0.8 4-phenylpyridine-N-oxide
tris dibenzoylmethanato Dy0.2, Gd0.8 1-methylimidazole
tris dibenzoylmethanato Dy0.2, Gd0.8 triphenylphosphine oxide
tris dibenzoylmethanato Dy0.2, Gd0.8 2,2-bipyridyl
tris dibenzoylmethanato Dy0.2, Gd0.8 2,2-bipyridyl-N,N-dioxide
tris dibenzoylmethanato Dy0.2, Gd0.8 phenanthroline
tris dibenzoylmethanato Dy0.2, Gd0.8 bathocuproine tris dibenzoylmethanato Dy0.2, Gd0.8 bathophenanthroline
tris thenoyltrifluoroacetonato Dy0.2, Gd0.8 dimethylaminopyridine
tris thenoyltrifluoroacetonato Dy0.2, Gd0.8 4-picoline-N-oxide
tris thenoyltrifluoroacetonato Dy0.2, Gd0.8 4-phenylpyridine
tris thenoyltrifluoroacetonato Dy0.2, Gd0.8 4-phenylpyridine-N-oxide
tris thenoyltrifluoroacetonato Dy0.2, Gd0.8 1-methylimidazole
tris thenoyltrifluoroacetonato Dy0.2, Gd0.8 triphenylphosphine oxide
tris thenoyltrifluoroacetonato Dy0.2, Gd0.8 2,2-bipyridyl
tris thenoyltrifluoroacetonato Dy0.2, Gd0.8 2,2-bipyridyl-N,N-dioxide
tris thenoyltrifluoroacetonato Dy0.2, Gd0.8 phenanthroline
tris thenoyltrifluoroacetonato Dy0.2, Gd0.8 bathocuproine
tris thenoyltrifluoroacetonato Dy0.2, Gd0.8 bathophenanthroline
tris 2,2,6,6-tetramethylheptanedionato Dy0.2, Gd0.8 dimethylaminopyridine
tris 2,2,6,6-tetramethylheptanedionato Dy0.2, Gd0.8 4-picoline-N-oxide
tris 2,2,6,6-tetramethylheptanedionato Dy0.2, Gd0.8 4-phenylpyridine
tris 2,2,6,6-tetramethylheptanedionato Dy0.2, Gd0.8 4-phenylpyridine-N-oxide
tris 2,2,6,6-tetramethylheptanedionato Dy0.2, Gd0.8 1-methylimidazole
tris 2,2,6,6-tetramethylheptanedionato Dy0.2, Gd0.8 triphenylphosphine oxide
tris 2,2,6,6-tetramethylheptanedionato Dy0.2, Gd0.8 2,2-bipyridyl
tris 2,2,6,6-tetramethylheptanedionato Dy0.2, Gd0.8 2,2-bipyridyl-N,N-dioxide
tris 2,2,6,6-tetramethylheptanedionato Dy0.2, Gd0.8 phenanthroline
tris 2,2,6,6-tetramethylheptanedionato Dy0.2, Gd0.8 bathocuproine
tris 2,2,6,6-tetramethylheptanedionato Dy0.2, Gd0.8 bathophenanthroline
tris 3-methylpentane-2,4-dionato Dy0.2, Gd0.8 dimethylaminopyridine
tris 3-methylpentane-2,4-dionato Dy0.2, Gd0.8 4-picoline-N-oxide
tris 3-methylpentane-2,4-dionato Dy0.2, Gd0.8 4-phenylpyridine
tris 3-methylpentane-2,4-dionato Dy0.2, Gd0.8 4-phenylpyridine-N-oxide
tris 3-methylpentane-2,4-dionato Dy0.2, Gd0.8 1-methylimidazole
tris 3-methylpentane-2,4-dionato Dy0.2, Gd0.8 triphenylphosphine oxide
tris 3-methylpentane-2,4-dionato Dy0.2, Gd0.8 2,2-bipyridyl
tris 3-methylpentane-2,4-dionato Dy0.2, Gd0.8 2,2-bipyridyl-N,N-dioxide
tris 3-methylpentane-2,4-dionato Dy0.2, Gd0.8 phenanthroline
tris 3-methylpentane-2,4-dionato Dy0.2, Gd0.8 bathocuproine
tris 3-methylpentane-2,4-dionato Dy0.2, Gd0.8 bathophenanthroline
tris 3-ethylpentane-2,4-dionato Dy0.2, Gd0.8 dimethylaminopyridine
tris 3-ethylpentane-2,4-dionato Dy0.2, Gd0.8 4-picoline-N-oxide
tris 3-ethylpentane-2,4-dionato Dy0.2, Gd0.8 4-phenylpyridine
tris 3-ethylpentane-2,4-dionato Dy0.2, Gd0.8 4-phenylpyridine-N-oxide
tris 3-ethylpentane-2,4-dionato Dy0.2, Gd0.8 1-methylimidazole
tris 3-ethylpentane-2,4-dionato Dy0.2, Gd0.8 triphenylphosphine oxide
tris 3-ethylpentane-2,4-dionato Dy0.2, Gd0.8 2,2-bipyridyl
tris 3-ethylpentane-2,4-dionato Dy0.2, Gd0.8 2,2-bipyridyl-N,N-dioxide
tris 3-ethylpentane-2,4-dionato Dy0.2, Gd0.8 phenanthroline
tris 3-ethylpentane-2,4-dionato Dy0.2, Gd0.8 bathocuproine
tris 3-ethylpentane-2,4-dionato Dy0.2, Gd0.8 bathophenanthroline
tris pivaloyltrifluoroacetonato Dy0.2, Gd0.8 dimethylaminopyridine
tris pivaloyltrifluoroacetonato Dy0.2, Gd0.8 4-picoline-N-oxide
tris pivaloyltrifluoroacetonato Dy0.2, Gd0.8 4-phenylpyridine
tris pivaloyltrifluoroacetonato Dy0.2, Gd0.8 4-phenylpyridine-N-oxide
tris pivaloyltrifluoroacetonato Dy0.2, Gd0.8 1-methylimidazole
tris pivaloyltrifluoroacetonato Dy0.2, Gd0.8 triphenylphosphine oxide
tris pivaloyltrifluoroacetonato Dy0.2, Gd0.8 2,2-bipyridyl
tris pivaloyltrifluoroacetonato Dy0.2, Gd0.8 2,2-bipyridyl-N,N-dioxide
tris pivaloyltrifluoroacetonato Dy0.2, Gd0.8 phenanthroline
tris pivaloyltrifluoroacetonato Dy0.2, Gd0.8 bathocuproine
tris pivaloyltrifluoroacetonato Dy0.2, Gd0.8 bathophenanthroline
tris trifluoroacetylacetonato Dy0.2, Gd0.8 dimethylaminopyridine
tris trifluoroacetylacetonato Dy0.2, Gd0.8 4-picoline-N-oxide
tris trifluoroacetylacetonato Dy0.2, Gd0.8 4-phenylpyridine
tris trifluoroacetylacetonato Dy0.2, Gd0.8 4-phenylpyridine-N-oxide
tris trifluoroacetylacetonato Dy0.2, Gd0.8 1-methylimidazole
tris trifluoroacetylacetonato Dy0.2, Gd0.8 triphenylphosphine oxide
tris trifluoroacetylacetonato Dy0.2, Gd0.8 2,2-bipyridyl
tris trifluoroacetylacetonato Dy0.2, Gd0.8 2,2-bipyridyl-N,N-dioxide
tris trifluoroacetylacetonato Dy0.2, Gd0.8 phenanthroline
tris trifluoroacetylacetonato Dy0.2, Gd0.8 bathocuproine
tris trifluoroacetylacetonato Dy0.2, Gd0.8 bathophenanthroline
tris hexafluoroacetylacetonato Dy0.2, Gd0.8 dimethylaminopyridine
tris hexafluoroacetylacetonato Dy0.2, Gd0.8 4-picoline-N-oxide
tris hexafluoroacetylacetonato Dy0.2, Gd0.8 4-phenylpyridine
tris hexafluoroacetylacetonato Dy0.2, Gd0.8 4-phenylpyridine-N-oxide
tris hexafluoroacetylacetonato Dy0.2, Gd0.8 1-methylimidazole
tris hexafluoroacetylacetonato Dy0.2, Gd0.8 triphenylphosphine oxide tris hexafluoroacetylacetonato Dy0.2, Gd0.8 2,2-bipyridyl
tris hexafluoroacetylacetonato Dy0.2, Gd0.8 2,2-bipyridyl-N,N-dioxide
tris hexafluoroacetylacetonato Dy0.2, Gd0.8 phenanthroline
tris hexafluoroacetylacetonato Dy0.2, Gd0.8 bathocuproine
tris hexafluoroacetylacetonato Dy0.2, Gd0.8 bathophenanthroline
tris 6,6,7,7,8,8,8-heptafluoro-2,2-dimethyloctanedionato Dy0.2, Gd0.8 dimethylaminopyridine
tris 6,6,7,7,8,8,8-heptafluoro-2,2-dimethyloctanedionato Dy0.2, Gd0.8 4-picoline-N-oxide
tris 6,6,7,7,8,8,8-heptafluoro-2,2-dimethyloctanedionato Dy0.2, Gd0.8 4-phenylpyridine
tris 6,6,7,7,8,8,8-heptafluoro-2,2-dimethyloctanedionato Dy0.2, Gd0.8 4-phenylpyridine-N-oxide
tris 6,6,7,7,8,8,8-heptafluoro-2,2-dimethyloctanedionato Dy0.2, Gd0.8 1-methylimidazole
tris 6,6,7,7,8,8,8-heptafluoro-2,2-dimethyloctanedionato Dy0.2, Gd0.8 triphenylphosphine oxide
tris 6,6,7,7,8,8,8-heptafluoro-2,2-dimethyloctanedionato Dy0.2, Gd0.8 2,2-bipyridyl
tris 6,6,7,7,8,8,8-heptafluoro-2,2-dimethyloctanedionato Dy0.2, Gd0.8 2,2-bipyridyl-N,N-dioxide
tris 6,6,7,7,8,8,8-heptafluoro-2,2-dimethyloctanedionato Dy0.2, Gd0.8 phenanthroline
tris 6,6,7,7,8,8,8-heptafluoro-2,2-dimethyloctanedionato Dy0.2, Gd0.8 bathocuproine
tris 6,6,7,7,8,8,8-heptafluoro-2,2-dimethyloctanedionato Dy0.2, Gd0.8 bathophenanthroline
tris 1-phenyl-1,3-butanedionato Dy0.2, Gd0.8 dimethylaminopyridine
tris 1-phenyl-1,3-butanedionato Dy0.2, Gd0.8 4-picoline-N-oxide
tris 1-phenyl-1,3-butanedionato Dy0.2, Gd0.8 4-phenylpyridine
tris 1-phenyl-1,3-butanedionato Dy0.2, Gd0.8 4-phenylpyridine-N-oxide
tris 1-phenyl-1,3-butanedionato Dy0.2, Gd0.8 1-methylimidazole
tris 1-phenyl-1,3-butanedionato Dy0.2, Gd0.8 triphenylphosphine oxide
tris 1-phenyl-1,3-butanedionato Dy0.2, Gd0.8 2,2-bipyridyl
tris 1-phenyl-1,3-butanedionato Dy0.2, Gd0.8 2,2-bipyridyl-N,N-dioxide
tris 1-phenyl-1,3-butanedionato Dy0.2, Gd0.8 phenanthroline
tris 1-phenyl-1,3-butanedionato Dy0.2, Gd0.8 bathocuproine
tris 1-phenyl-1,3-butanedionato Dy0.2, Gd0.8 bathophenanthroline
tris acetylacetonato Dy0.1, Gd0.9 dimethylaminopyridine
tris acetylacetonato Dy0.1, Gd0.9 4-picoline-N-oxide
tris acetylacetonato Dy0.1, Gd0.9 4-phenylpyridine
tris acetylacetonato Dy0.1, Gd0.9 4-phenylpyridine-N-oxide
tris acetylacetonato Dy0.1, Gd0.9 1-methylimidazole
tris acetylacetonato Dy0.1, Gd0.9 triphenylphosphine oxide
tris acetylacetonato Dy0.1, Gd0.9 2,2-bipyridyl
tris acetylacetonato Dy0.1, Gd0.9 2,2-bipyridyl-N,N-dioxide
tris acetylacetonato Dy0.1, Gd0.9 phenanthroline
tris acetylacetonato Dy0.1, Gd0.9 bathocuproine
tris acetylacetonato Dy0.1, Gd0.9 bathophenanthroline
tris dibenzoylmethanato Dy0.1, Gd0.9 dimethylaminopyridine
tris dibenzoylmethanato Dy0.1, Gd0.9 4-picoline-N-oxide
tris dibenzoylmethanato Dy0.1, Gd0.9 4-phenylpyridine
tris dibenzoylmethanato Dy0.1, Gd0.9 4-phenylpyridine-N-oxide
tris dibenzoylmethanato Dy0.1, Gd0.9 1-methylimidazole
tris dibenzoylmethanato Dy0.1, Gd0.9 triphenylphosphine oxide
tris dibenzoylmethanato Dy0.1, Gd0.9 2,2-bipyridyl
tris dibenzoylmethanato Dy0.1, Gd0.9 2,2-bipyridyl-N,N-dioxide
tris dibenzoylmethanato Dy0.1, Gd0.9 phenanthroline
tris dibenzoylmethanato Dy0.1, Gd0.9 bathocuproine
tris dibenzoylmethanato Dy0.1, Gd0.9 bathophenanthroline
tris thenoyltrifluoroacetonato Dy0.1, Gd0.9 dimethylaminopyridine
tris thenoyltrifluoroacetonato Dy0.1, Gd0.9 4-picoline-N-oxide
tris thenoyltrifluoroacetonato Dy0.1, Gd0.9 4-phenylpyridine
tris thenoyltrifluoroacetonato Dy0.1, Gd0.9 4-phenylpyridine-N-oxide
tris thenoyltrifluoroacetonato Dy0.1, Gd0.9 1-methylimidazole
tris thenoyltrifluoroacetonato Dy0.1, Gd0.9 triphenylphosphine oxide
tris thenoyltrifluoroacetonato Dy0.1, Gd0.9 2,2-bipyridyl
tris thenoyltrifluoroacetonato Dy0.1, Gd0.9 2,2-bipyridyl-N,N-dioxide
tris thenoyltrifluoroacetonato Dy0.1, Gd0.9 phenanthroline
tris thenoyltrifluoroacetonato Dy0.1, Gd0.9 bathocuproine
tris thenoyltrifluoroacetonato Dy0.1, Gd0.9 bathophenanthroline
tris 2,2,6,6-tetramethylheptanedionato Dy0.1, Gd0.9 dimethylaminopyridine
tris 2,2,6,6-tetramethylheptanedionato Dy0.1, Gd0.9 4-picoline-N-oxide
tris 2,2,6,6-tetramethylheptanedionato Dy0.1, Gd0.9 4-phenylpyridine
tris 2,2,6,6-tetramethylheptanedionato Dy0.1, Gd0.9 4-phenylpyridine-N-oxide
tris 2,2,6,6-tetramethylheptanedionato Dy0.1, Gd0.9 1-methylimidazole
tris 2,2,6,6-tetramethylheptanedionato Dy0.1, Gd0.9 triphenylphosphine oxide
tris 2,2,6,6-tetramethylheptanedionato Dy0.1, Gd0.9 2,2-bipyridyl
tris 2,2,6,6-tetramethylheptanedionato Dy0.1, Gd0.9 2,2-bipyridyl-N,N-dioxide
tris 2,2,6,6-tetramethylheptanedionato Dy0.1, Gd0.9 phenanthroline
tris 2,2,6,6-tetramethylheptanedionato Dy0.1, Gd0.9 bathocuproine
tris 2,2,6,6-tetramethylheptanedionato Dy0.1, Gd0.9 bathophenanthroline
tris 3-methylpentane-2,4-dionato Dy0.1, Gd0.9 dimethylaminopyridine
tris 3-methylpentane-2,4-dionato Dy0.1, Gd0.9 4-picoline-N-oxide
tris 3-methylpentane-2,4-dionato Dy0.1, Gd0.9 4-phenylpyridine
tris 3-methylpentane-2,4-dionato Dy0.1, Gd0.9 4-phenylpyridine-N-oxide
tris 3-methylpentane-2,4-dionato Dy0.1, Gd0.9 1-methylimidazole
tris 3-methylpentane-2,4-dionato Dy0.1, Gd0.9 triphenylphosphine oxide
tris 3-methylpentane-2,4-dionato Dy0.1, Gd0.9 2,2-bipyridyl tris 3-methylpentane-2,4-dionato Dy0.1, Gd0.9 2,2-bipyridyl-N,N-dioxide tris 3-methylpentane-2,4-dionato Dy0.1, Gd0.9 phenanthroline tris 3-methylpentane-2,4-dionato Dy0.1, Gd0.9 bathocuproine tris 3-methylpentane-2,4-dionato Dy0.1, Gd0.9 bathophenanthroline tris 3-ethylpentane-2,4-dionato Dy0.1, Gd0.9 dimethylaminopyridine tris 3-ethylpentane-2,4-dionato Dy0.1, Gd0.9 4-picoline-N-oxide tris 3-ethylpentane-2,4-dionato Dy0.1, Gd0.9 4-phenylpyridine tris 3-ethylpentane-2,4-dionato Dy0.1, Gd0.9 4-phenylpyridine-N-oxide tris 3-ethylpentane-2,4-dionato Dy0.1, Gd0.9 1-methylimidazole tris 3-ethylpentane-2,4-dionato Dy0.1, Gd0.9 triphenylphosphine oxide tris 3-ethylpentane-2,4-dionato Dy0.1, Gd0.9 2,2-bipyridyl tris 3-ethylpentane-2,4-dionato Dy0.1, Gd0.9 2,2-bipyridyl-N,N-dioxide tris 3-ethylpentane-2,4-dionato Dy0.1, Gd0.9 phenanthroline tris 3-ethylpentane-2,4-dionato Dy0.1, Gd0.9 bathocuproine tris 3-ethylpentane-2,4-dionato Dy0.1, Gd0.9 bathophenanthroline tris pivaloyltrifluoroacetonato Dy0.1, Gd0.9 dimethylaminopyridine tris pivaloyltrifluoroacetonato Dy0.1, Gd0.9 4-picoline-N-oxide tris pivaloyltrifluoroacetonato Dy0.1, Gd0.9 4-phenylpyridine tris pivaloyltrifluoroacetonato Dy0.1, Gd0.9 4-phenylpyridine-N-oxide tris pivaloyltrifluoroacetonato Dy0.1, Gd0.9 1-methylimidazole tris pivaloyltrifluoroacetonato Dy0.1, Gd0.9 triphenylphosphine oxide tris pivaloyltrifluoroacetonato Dy0.1, Gd0.9 2,2-bipyridyl tris pivaloyltrifluoroacetonato Dy0.1, Gd0.9 2,2-bipyridyl-N,N-dioxide tris pivaloyltrifluoroacetonato Dy0.1, Gd0.9 phenanthroline tris pivaloyltrifluoroacetonato Dy0.1, Gd0.9 bathocuproine tris pivaloyltrifluoroacetonato Dy0.1, Gd0.9 bathophenanthroline tris trifluoroacetylacetonato Dy0.1, Gd0.9 dimethylaminopyridine tris trifluoroacetylacetonato Dy0.1, Gd0.9 4-picoline-N-oxide tris trifluoroacetylacetonato Dy0.1, Gd0.9 4-phenylpyridine tris trifluoroacetylacetonato Dy0.1, Gd0.9 4-phenylpyridine-N-oxide tris trifluoroacetylacetonato Dy0.1, Gd0.9 1-methylimidazole tris trifluoroacetylacetonato Dy0.1, Gd0.9 triphenylphosphine oxide tris trifluoroacetylacetonato Dy0.1, Gd0.9 2,2-bipyridyl tris trifluoroacetylacetonato Dy0.1, Gd0.9 2,2-bipyridyl-N,N-dioxide tris trifluoroacetylacetonato Dy0.1, Gd0.9 phenanthroline tris trifluoroacetylacetonato Dy0.1, Gd0.9 bathocuproine tris trifluoroacetylacetonato Dy0.1, Gd0.9 bathophenanthroline tris hexafluoroacetylacetonato Dy0.1, Gd0.9 dimethylaminopyridine tris hexafluoroacetylacetonato Dy0.1, Gd0.9 4-picoline-N-oxide tris hexafluoroacetylacetonato Dy0.1, Gd0.9 4-phenylpyridine tris hexafluoroacetylacetonato Dy0.1, Gd0.9 4-phenylpyridine-N-oxide tris hexafluoroacetylacetonato Dy0.1, Gd0.9 1-methylimidazole tris hexafluoroacetylacetonato Dy0.1, Gd0.9 triphenylphosphine oxide tris hexafluoroacetylacetonato Dy0.1, Gd0.9 2,2-bipyridyl tris hexafluoroacetylacetonato Dy0.1, Gd0.9 2,2-bipyridyl-N,N-dioxide tris hexafluoroacetylacetonato Dy0.1, Gd0.9 phenanthroline tris hexafluoroacetylacetonato Dy0.1, Gd0.9 bathocuproine tris hexafluoroacetylacetonato Dy0.1, Gd0.9 bathophenanthroline tris 6,6,7,7,8,8,8-heptafluoro-2,2-dimethyloctanedionato Dy0.1, Gd0.9 dimethylaminopyridine tris 6,6,7,7,8,8,8-heptafluoro-2,2-dimethyloctanedionato Dy0.1, Gd0.9 4-picoline-N-oxide tris 6,6,7,7,8,8,8-heptafluoro-2,2-dimethyloctanedionato Dy0.1, Gd0.9 4-phenylpyridine tris 6,6,7,7,8,8,8-heptafluoro-2,2-dimethyloctanedionato Dy0.1, Gd0.9 4-phenylpyridine-N-oxide tris 6,6,7,7,8,8,8-heptafluoro-2,2-dimethyloctanedionato Dy0.1, Gd0.9 1-methylimidazole tris 6,6,7,7,8,8,8-heptafluoro-2,2-dimethyloctanedionato Dy0.1, Gd0.9 triphenylphosphine oxide tris 6,6,7,7,8,8,8-heptafluoro-2,2-dimethyloctanedionato Dy0.1, Gd0.9 2,2-bipyridyl tris 6,6,7,7,8,8,8-heptafluoro-2,2-dimethyloctanedionato Dy0.1, Gd0.9 2,2-bipyridyl-N,N-dioxide tris 6,6,7,7,8,8,8-heptafluoro-2,2-dimethyloctanedionato Dy0.1, Gd0.9 phenanthroline tris 6,6,7,7,8,8,8-heptafluoro-2,2-dimethyloctanedionato Dy0.1, Gd0.9 bathocuproine tris 6,6,7,7,8,8,8-heptafluoro-2,2-dimethyloctanedionato Dy0.1, Gd0.9 bathophenanthroline tris 1-phenyl-1,3-butanedionato Dy0.1, Gd0.9 dimethylaminopyridine tris 1-phenyl-1,3-butanedionato Dy0.1, Gd0.9 4-picoline-N-oxide tris 1-phenyl-1,3-butanedionato Dy0.1, Gd0.9 4-phenylpyridine tris 1-phenyl-1,3-butanedionato Dy0.1, Gd0.9 4-phenylpyridine-N-oxide tris 1-phenyl-1,3-butanedionato Dy0.1, Gd0.9 1-methylimidazole tris 1-phenyl-1,3-butanedionato Dy0.1, Gd0.9 triphenylphosphine oxide tris 1-phenyl-1,3-butanedionato Dy0.1, Gd0.9 2,2-bipyridyl tris 1-phenyl-1,3-butanedionato Dy0.1, Gd0.9 2,2-bipyridyl-N,N-dioxide tris 1-phenyl-1,3-butanedionato Dy0.1, Gd0.9 phenanthroline tris 1-phenyl-1,3-butanedionato Dy0.1, Gd0.9 bathocuproine tris 1-phenyl-1,3-butanedionato Dy0.1, Gd0.9 bathophenanthroline tris acetylacetonato Dy0.01, Gd0.99 dimethylaminopyridine tris acetylacetonato Dy0.01, Gd0.99 4-picoline-N-oxide tris acetylacetonato Dy0.01, Gd0.99 4-phenylpyridine tris acetylacetonato Dy0.01, Gd0.99 4-phenylpyridine-N-oxide tris acetylacetonato Dy0.01, Gd0.99 1-methylimidazole tris acetylacetonato Dy0.01, Gd0.99 triphenylphosphine oxide
tris acetylacetonato Dy0.01, Gd0.99 2,2-bipyridyl
tris acetylacetonato Dy0.01, Gd0.99 2,2-bipyridyl-N,N-dioxide
tris acetylacetonato Dy0.01, Gd0.99 phenanthroline
tris acetylacetonato Dy0.01, Gd0.99 bathocuproine
tris acetylacetonato Dy0.01, Gd0.99 bathophenanthroline
tris dibenzoylmethanato Dy0.01, Gd0.99 dimethylaminopyridine
tris dibenzoylmethanato Dy0.01, Gd0.99 4-picoline-N-oxide
tris dibenzoylmethanato Dy0.01, Gd0.99 4-phenylpyridine
tris dibenzoylmethanato Dy0.01, Gd0.99 4-phenylpyridine-N-oxide
tris dibenzoylmethanato Dy0.01, Gd0.99 1-methylimidazole
tris dibenzoylmethanato Dy0.01, Gd0.99 triphenylphosphine oxide
tris dibenzoylmethanato Dy0.01, Gd0.99 2,2-bipyridyl
tris dibenzoylmethanato Dy0.01, Gd0.99 2,2-bipyridyl-N,N-dioxide
tris dibenzoylmethanato Dy0.01, Gd0.99 phenanthroline
tris dibenzoylmethanato Dy0.01, Gd0.99 bathocuproine
tris dibenzoylmethanato Dy0.01, Gd0.99 bathophenanthroline
tris thenoyltrifluoroacetonato Dy0.01, Gd0.99 dimethylaminopyridine
tris thenoyltrifluoroacetonato Dy0.01, Gd0.99 4-picoline-N-oxide
tris thenoyltrifluoroacetonato Dy0.01, Gd0.99 4-phenylpyridine
tris thenoyltrifluoroacetonato Dy0.01, Gd0.99 4-phenylpyridine-N-oxide
tris thenoyltrifluoroacetonato Dy0.01, Gd0.99 1-methylimidazole
tris thenoyltrifluoroacetonato Dy0.01, Gd0.99 triphenylphosphine oxide
tris thenoyltrifluoroacetonato Dy0.01, Gd0.99 2,2-bipyridyl
tris thenoyltrifluoroacetonato Dy0.01, Gd0.99 2,2-bipyridyl-N,N-dioxide
tris thenoyltrifluoroacetonato Dy0.01, Gd0.99 phenanthroline
tris thenoyltrifluoroacetonato Dy0.01, Gd0.99 bathocuproine
tris thenoyltrifluoroacetonato Dy0.01, Gd0.99 bathophenanthroline
tris 2,2,6,6-tetramethylheptanedionato Dy0.01, Gd0.99 dimethylaminopyridine
tris 2,2,6,6-tetramethylheptanedionato Dy0.01, Gd0.99 4-picoline-N-oxide
tris 2,2,6,6-tetramethylheptanedionato Dy0.01, Gd0.99 4-phenylpyridine
tris 2,2,6,6-tetramethylheptanedionato Dy0.01, Gd0.99 4-phenylpyridine-N-oxide
tris 2,2,6,6-tetramethylheptanedionato Dy0.01, Gd0.99 1-methylimidazole
tris 2,2,6,6-tetramethylheptanedionato Dy0.01, Gd0.99 triphenylphosphine oxide
tris 2,2,6,6-tetramethylheptanedionato Dy0.01, Gd0.99 2,2-bipyridyl
tris 2,2,6,6-tetramethylheptanedionato Dy0.01, Gd0.99 2,2-bipyridyl-N,N-dioxide
tris 2,2,6,6-tetramethylheptanedionato Dy0.01, Gd0.99 phenanthroline
tris 2,2,6,6-tetramethylheptanedionato Dy0.01, Gd0.99 bathocuproine
tris 2,2,6,6-tetramethylheptanedionato Dy0.01, Gd0.99 bathophenanthroline
tris 3-methylpentane-2,4-dionato Dy0.01, Gd0.99 dimethylaminopyridine
tris 3-methylpentane-2,4-dionato Dy0.01, Gd0.99 4-picoline-N-oxide
tris 3-methylpentane-2,4-dionato Dy0.01, Gd0.99 4-phenylpyridine
tris 3-methylpentane-2,4-dionato Dy0.01, Gd0.99 4-phenylpyridine-N-oxide
tris 3-methylpentane-2,4-dionato Dy0.01, Gd0.99 1-methylimidazole
tris 3-methylpentane-2,4-dionato Dy0.01, Gd0.99 triphenylphosphine oxide
tris 3-methylpentane-2,4-dionato Dy0.01, Gd0.99 2,2-bipyridyl
tris 3-methylpentane-2,4-dionato Dy0.01, Gd0.99 2,2-bipyridyl-N,N-dioxide
tris 3-methylpentane-2,4-dionato Dy0.01, Gd0.99 phenanthroline
tris 3-methylpentane-2,4-dionato Dy0.01, Gd0.99 bathocuproine
tris 3-methylpentane-2,4-dionato Dy0.01, Gd0.99 bathophenanthroline
tris 3-ethylpentane-2,4-dionato Dy0.01, Gd0.99 dimethylaminopyridine
tris 3-ethylpentane-2,4-dionato Dy0.01, Gd0.99 4-picoline-N-oxide
tris 3-ethylpentane-2,4-dionato Dy0.01, Gd0.99 4-phenylpyridine
tris 3-ethylpentane-2,4-dionato Dy0.01, Gd0.99 4-phenylpyridine-N-oxide
tris 3-ethylpentane-2,4-dionato Dy0.01, Gd0.99 1-methylimidazole
tris 3-ethylpentane-2,4-dionato Dy0.01, Gd0.99 triphenylphosphine oxide
tris 3-ethylpentane-2,4-dionato Dy0.01, Gd0.99 2,2-bipyridyl
tris 3-ethylpentane-2,4-dionato Dy0.01, Gd0.99 2,2-bipyridyl-N,N-dioxide
tris 3-ethylpentane-2,4-dionato Dy0.01, Gd0.99 phenanthroline
tris 3-ethylpentane-2,4-dionato Dy0.01, Gd0.99 bathocuproine
tris 3-ethylpentane-2,4-dionato Dy0.01, Gd0.99 bathophenanthroline
tris pivaloyltrifluoroacetonato Dy0.01, Gd0.99 dimethylaminopyridine
tris pivaloyltrifluoroacetonato Dy0.01, Gd0.99 4-picoline-N-oxide
tris pivaloyltrifluoroacetonato Dy0.01, Gd0.99 4-phenylpyridine
tris pivaloyltrifluoroacetonato Dy0.01, Gd0.99 4-phenylpyridine-N-oxide
tris pivaloyltrifluoroacetonato Dy0.01, Gd0.99 1-methylimidazole
tris pivaloyltrifluoroacetonato Dy0.01, Gd0.99 triphenylphosphine oxide
tris pivaloyltrifluoroacetonato Dy0.01, Gd0.99 2,2-bipyridyl
tris pivaloyltrifluoroacetonato Dy0.01, Gd0.99 2,2-bipyridyl-N,N-dioxide
tris pivaloyltrifluoroacetonato Dy0.01, Gd0.99 phenanthroline
tris pivaloyltrifluoroacetonato Dy0.01, Gd0.99 bathocuproine
tris pivaloyltrifluoroacetonato Dy0.01, Gd0.99 bathophenanthroline tris trifluoroacetylacetonato Dy0.01, Gd0.99 dimethylaminopyridine
tris trifluoroacetylacetonato Dy0.01, Gd0.99 4-picoline-N-oxide
tris trifluoroacetylacetonato Dy0.01, Gd0.99 4-phenylpyridine
tris trifluoroacetylacetonato Dy0.01, Gd0.99 4-phenylpyridine-N-oxide
tris trifluoroacetylacetonato Dy0.01, Gd0.99 1-methylimidazole
tris trifluoroacetylacetonato Dy0.01, Gd0.99 triphenylphosphine oxide
tris trifluoroacetylacetonato Dy0.01, Gd0.99 2,2-bipyridyl
tris trifluoroacetylacetonato Dy0.01, Gd0.99 2,2-bipyridyl-N,N-dioxide
tris trifluoroacetylacetonato Dy0.01, Gd0.99 phenanthroline
tris trifluoroacetylacetonato Dy0.01, Gd0.99 bathocuproine
tris trifluoroacetylacetonato Dy0.01, Gd0.99 bathophenanthroline
tris hexafluoroacetylacetonato Dy0.01, Gd0.99 dimethylaminopyridine
tris hexafluoroacetylacetonato Dy0.01, Gd0.99 4-picoline-N-oxide
tris hexafluoroacetylacetonato Dy0.01, Gd0.99 4-phenylpyridine
tris hexafluoroacetylacetonato Dy0.01, Gd0.99 4-phenylpyridine-N-oxide
tris hexafluoroacetylacetonato Dy0.01, Gd0.99 1-methylimidazole
tris hexafluoroacetylacetonato Dy0.01, Gd0.99 triphenylphosphine oxide
tris hexafluoroacetylacetonato Dy0.01, Gd0.99 2,2-bipyridyl
tris hexafluoroacetylacetonato Dy0.01, Gd0.99 2,2-bipyridyl-N,N-dioxide
tris hexafluoroacetylacetonato Dy0.01, Gd0.99 phenanthroline
tris hexafluoroacetylacetonato Dy0.01, Gd0.99 bathocuproine
tris hexafluoroacetylacetonato Dy0.01, Gd0.99 bathophenanthroline
tris 6,6,7,7,8,8,8-heptafluoro-2,2-dimethyloctanedionato Dy0.01, Gd0.99 dimethylaminopyridine
tris 6,6,7,7,8,8,8-heptafluoro-2,2-dimethyloctanedionato Dy0.01, Gd0.99 4-picoline-N-oxide
tris 6,6,7,7,8,8,8-heptafluoro-2,2-dimethyloctanedionato Dy0.01, Gd0.99 4-phenylpyridine
tris 6,6,7,7,8,8,8-heptafluoro-2,2-dimethyloctanedionato Dy0.01, Gd0.99 4-phenylpyridine-N-oxide
tris 6,6,7,7,8,8,8-heptafluoro-2,2-dimethyloctanedionato Dy0.01, Gd0.99 1-methylimidazole
tris 6,6,7,7,8,8,8-heptafluoro-2,2-dimethyloctanedionato Dy0.01, Gd0.99 triphenylphosphine oxide
tris 6,6,7,7,8,8,8-heptafluoro-2,2-dimethyloctanedionato Dy0.01, Gd0.99 2,2-bipyridyl
tris 6,6,7,7,8,8,8-heptafluoro-2,2-dimethyloctanedionato Dy0.01, Gd0.99 2,2-bipyridyl-N,N-dioxide
tris 6,6,7,7,8,8,8-heptafluoro-2,2-dimethyloctanedionato Dy0.01, Gd0.99 phenanthroline
tris 6,6,7,7,8,8,8-heptafluoro-2,2-dimethyloctanedionato Dy0.01, Gd0.99 bathocuproine
tris 6,6,7,7,8,8,8-heptafluoro-2,2-dimethyloctanedionato Dy0.01, Gd0.99 bathophenanthroline
tris 1-phenyl-1,3-butanedionato Dy0.01, Gd0.99 dimethylaminopyridine
tris 1-phenyl-1,3-butanedionato Dy0.01, Gd0.99 4-picoline-N-oxide
tris 1-phenyl-1,3-butanedionato Dy0.01, Gd0.99 4-phenylpyridine
tris 1-phenyl-1,3-butanedionato Dy0.01, Gd0.99 4-phenylpyridine-N-oxide
tris 1-phenyl-1,3-butanedionato Dy0.01, Gd0.99 1-methylimidazole
tris 1-phenyl-1,3-butanedionato Dy0.01, Gd0.99 triphenylphosphine oxide
tris 1-phenyl-1,3-butanedionato Dy0.01, Gd0.99 2,2-bipyridyl
tris 1-phenyl-1,3-butanedionato Dy0.01, Gd0.99 2,2-bipyridyl-N,N-dioxide
tris 1-phenyl-1,3-butanedionato Dy0.01, Gd0.99 phenanthroline
tris 1-phenyl-1,3-butanedionato Dy0.01, Gd0.99 bathocuproine
tris 1-phenyl-1,3-butanedionato Dy0.01, Gd0.99 bathophenanthroline Lanthanum(III) chloride heptahydrate (3.7 gm), terbium chloride hexahydrate (0.037 gm) and antipyrine (11.3 gm) were dissolved in 100 ml of distilled water. The solution was heated to boiling, and potassium iodide (5 gm) dissolved in the minimum quantity of distilled water was added. The solution was cooled overnight and the resulting light yellow crystals filtered and dried to provide hexakis antipyrine Tb0.01, La0.99 iodide. The product gave strong green photoluminescence when excited with UV light of wavelength 365 nm, and bright green triboluminescence when the crystals were crushed.

In the same way, the following compounds were prepared:

hexakis antipyrine Tb iodide (comparative example)
hexakis antipyrine Tb tetrafluoroborate (comparative example)
hexakis antipyrine Tb0.5, Y0.5 iodide
hexakis antipyrine Tb0.5, Y0.5 tetrafluoroborate
hexakis antipyrine Tb0.2, Y0.8 iodide
hexakis antipyrine Tb0.2, Y0.8 tetrafluoroborate
hexakis antipyrine Tb0.1, Y0.9 iodide
hexakis antipyrine Tb0.1, Y0.9 tetrafluoroborate
hexakis antipyrine Tb0.01, Y0.99 iodide
hexakis antipyrine Tb0.01, Y0.99 tetrafluoroborate
hexakis antipyrine Tb0.5, La0.5 iodide
hexakis antipyrine Tb0.5, La0.5 tetrafluoroborate
hexakis antipyrine Tb0.2, La0.8 iodide
hexakis antipyrine Tb0.2, La0.8 tetrafluoroborate
hexakis antipyrine Tb0.1, La0.9 iodide
hexakis antipyrine Tb0.1, La0.9 tetrafluoroborate
hexakis antipyrine Tb0.01, La0.99 tetrafluoroborate
hexakis antipyrine Tb0.5, Gd0.5 iodide
hexakis antipyrine Tb0.5, Gd0.5 tetrafluoroborate
hexakis antipyrine Tb0.2, Gd0.8 iodide
hexakis antipyrine Tb0.2, Gd0.8 tetrafluoroborate
hexakis antipyrine Tb0.1, Gd0.9 iodide
hexakis antipyrine Tb0.1, Gd0.9 tetrafluoroborate
hexakis antipyrine Tb0.01, Gd0.99 iodide
hexakis antipyrine Tb0.01, Gd0.99 tetrafluoroborate Synthesis 3

Anhydrous europium chloride (0.1 gm), anhydrous gadolinium chloride (0.9 gm) and dibenzoylmethane (3.4 gm) were dissolved in 90 mls anhydrous ethanol. Triethylamine (1.55 gm) was added, and the solution raised briefly to reflux. The solution was cooled first to room temperature overnight, and then to 5° C. in a refrigerator. The crystalline solid which separated was filtered off, washed with cold anhydrous ethanol, and dried to provide triethylammonium tetrakis dibenzoylmethanato Tb0.1, Gd0.9 as a light yellow solid. The product was compared with the corresponding compound containing 100% europium, and on crushing side by side in a semi-darkened room, appeared to show brighter triboluminescent emission than the latter. Samples of the product and of the corresponding compound containing 100% europium were placed side by side on an inspection table and illuminated with ultraviolet light of wavelength 365 nm from a hand held source containing a filtered low pressure mercury vapour lamp. The photoluminescence of each sample was an intense red light, of substantially identical brightness from each sample. The exciting light source was switched to emit 254 nm ultra violet light. The photoluminescence of each sample became brighter, and the brightness of each was again essentially identical.

The following were prepared in like manner:

triethylammonium tetrakis acetylacetonato Tb (comparative example)

triethylammonium tetrakis dibenzoylmethanato Tb (comparative example)

triethylammonium tetrakis thenoyltrifluoroacetonato Tb (comparative example)

triethylammonium tetrakis 2,2,6,6-tetramethylheptanedionato Tb (comparative example)

triethylammonium tetrakis 3-methylpentane-2,4-dionato Tb (comparative example)

triethylammonium tetrakis 3-ethylpentane-2,4-dionato Tb (comparative example)

triethylammonium tetrakis pivaloyltrifluoroacetonato Tb (comparative example)

triethylammonium tetrakis trifluoroacetylacetonato Tb (comparative example)

triethylammonium tetrakis hexafluoroacetylacetonato Tb (comparative example)

triethylammonium tetrakis 6,6,7,7,8,8,8-heptafluoro-2,2-dimethyloctanedionato Tb (comparative example)

triethylammonium tetrakis 1-phenyl-1,3-butanedionato Tb (comparative example)

morpholinium tetrakis acetylacetonato Tb (comparative example)

morpholinium tetrakis dibenzoylmethanato Tb (comparative example)

morpholinium tetrakis thenoyltrifluoroacetonato Tb (comparative example)

morpholinium tetrakis 2,2,6,6-tetramethylheptanedionato Tb (comparative example)

morpholinium tetrakis 3-methylpentane-2,4-dionato Tb (comparative example)

morpholinium tetrakis 3-ethylpentane-2,4-dionato Tb (comparative example)

morpholinium tetrakis pivaloyltrifluoroacetonato Tb (comparative example)

morpholinium tetrakis trifluoroacetylacetonato Tb (comparative example)

morpholinium tetrakis hexafluoroacetylacetonato Tb (comparative example)

morpholinium tetrakis 6,6,7,7,8,8,8-heptafluoro-2,2-dimethyloctanedionato Tb (comparative example)

morpholinium tetrakis 1-phenyl-1,3-butanedionato Tb (comparative example)

dimethylbenzylammonium tetrakis acetylacetonato Tb (comparative example)

dimethylbenzylammonium tetrakis dibenzoylmethanato Tb (comparative example)

dimethylbenzylammonium tetrakis thenoyltrifluoroacetonato Tb (comparative example)

dimethylbenzylammonium tetrakis 2,2,6,6-tetramethylheptanedionato Tb (comparative example)

dimethylbenzylammonium tetrakis 3-methylpentane-2,4-dionato Tb (comparative example)

dimethylbenzylammonium tetrakis 3-ethylpentane-2,4-dionato Tb (comparative example)

dimethylbenzylammonium tetrakis pivaloyltrifluoroacetonato Tb (comparative example)

dimethylbenzylammonium tetrakis trifluoroacetylacetonato Tb (comparative example)

dimethylbenzylammonium tetrakis hexafluoroacetylacetonato Tb (comparative example)

dimethylbenzylammonium tetrakis 6,6,7,7,8,8,8-heptafluoro-2,2-dimethyloctanedionato Tb (comparative example)

dimethylbenzylammonium tetrakis 1-phenyl-1,3-butanedionato Tb (comparative example)

triallylammonium tetrakis acetylacetonato Tb (comparative example)

triallylammonium tetrakis dibenzoylmethanato Tb (comparative example)

triallylammonium tetrakis thenoyltrifluoroacetonato Tb (comparative example)

triallylammonium tetrakis 2,2,6,6-tetramethylheptanedionato Tb (comparative example)

triallylammonium tetrakis 3-methylpentane-2,4-dionato Tb (comparative example)

triallylammonium tetrakis 3-ethylpentane-2,4-dionato Tb (comparative example)

triallylammonium tetrakis pivaloyltrifluoroacetonato Tb (comparative example)

triallylammonium tetrakis trifluoroacetylacetonato Tb (comparative example)

triallylammonium tetrakis hexafluoroacetylacetonato Tb (comparative example)

triallylammonium tetrakis 6,6,7,7,8,8,8-heptafluoro-2,2-dimethyloctanedionato Tb (comparative example)

triallylammonium tetrakis 1-phenyl-1,3-butanedionato Tb (comparative example)

anilinium tetrakis acetylacetonato Tb (comparative example)

anilinium tetrakis dibenzoylmethanato Tb (comparative example)

anilinium tetrakis thenoyltrifluoroacetonato Tb (comparative example)

anilinium tetrakis 2,2,6,6-tetramethylheptanedionato Tb (comparative example)

anilinium tetrakis 3-methylpentane-2,4-dionato Tb (comparative example)

anilinium tetrakis 3-ethylpentane-2,4-dionato Tb (comparative example)

anilinium tetrakis pivaloyltrifluoroacetonato Tb (comparative example)

anilinium tetrakis trifluoroacetylacetonato Tb (comparative example)

anilinium tetrakis hexafluoroacetylacetonato Tb (comparative example)

anilinium tetrakis 6,6,7,7,8,8,8-heptafluoro-2,2-dimethyloctanedionato Tb (comparative example)

anilinium tetrakis 1-phenyl-1,3-butanedionato Tb (comparative example)

triethylammonium tetrakis acetylacetonato Eu (comparative example)

triethylammonium tetrakis dibenzoylmethanato Eu (comparative example)

triethylammonium tetrakis thenoyltrifluoroacetonato Eu (comparative example)

triethylammonium tetrakis 2,2,6,6-tetramethylheptanedionato Eu (comparative example)

triethylammonium tetrakis 3-methylpentane-2,4-dionato Eu (comparative example)

triethylammonium tetrakis 3-ethylpentane-2,4-dionato Eu (comparative example)

triethylammonium tetrakis pivaloyltrifluoroacetonato Eu (comparative example)

triethylammonium tetrakis trifluoroacetylacetonato Eu (comparative example)

triethylammonium tetrakis hexafluoroacetylacetonato Eu (comparative example)

triethylammonium tetrakis 6,6,7,7,8,8,8-heptafluoro-2,2-dimethyloctanedionato Eu (comparative example)

triethylammonium tetrakis 1-phenyl-1,3-butanedionato Eu (comparative example)

morpholinium tetrakis acetylacetonato Eu (comparative example)

morpholinium tetrakis dibenzoylmethanato Eu (comparative example)

morpholinium tetrakis thenoyltrifluoroacetonato Eu (comparative example)

morpholinium tetrakis 2,2,6,6-tetramethylheptanedionato Eu (comparative example)

morpholinium tetrakis 3-methylpentane-2,4-dionato Eu (comparative example)

morpholinium tetrakis 3-ethylpentane-2,4-dionato Eu (comparative example)

morpholinium tetrakis pivaloyltrifluoroacetonato Eu (comparative example)

morpholinium tetrakis trifluoroacetylacetonato Eu (comparative example)

morpholinium tetrakis hexafluoroacetylacetonato Eu (comparative example)

morpholinium tetrakis 6,6,7,7,8,8,8-heptafluoro-2,2-dimethyloctanedionato Eu (comparative example)

morpholinium tetrakis 1-phenyl-1,3-butanedionato Eu (comparative example)

dimethylbenzylammonium tetrakis acetylacetonato Eu (comparative example)

dimethylbenzylammonium tetrakis dibenzoylmethanato Eu (comparative example)

dimethylbenzylammonium tetrakis thenoyltrifluoroacetonato Eu (comparative example)

dimethylbenzylammonium tetrakis 2,2,6,6-tetramethylheptanedionato Eu (comparative example)

dimethylbenzylammonium tetrakis 3-methylpentane-2,4-dionato Eu (comparative example)

dimethylbenzylammonium tetrakis 3-ethylpentane-2,4-dionato Eu (comparative example)

dimethylbenzylammonium tetrakis pivaloyltrifluoroacetonato Eu (comparative example)

dimethylbenzylammonium tetrakis trifluoroacetylacetonato Eu (comparative example)

dimethylbenzylammonium tetrakis hexafluoroacetylacetonato Eu (comparative example)

dimethylbenzylammonium tetrakis 6,6,7,7,8,8,8-heptafluoro-2,2-dimethyloctanedionato Eu (comparative example)

dimethylbenzylammonium tetrakis 1-phenyl-1,3-butanedionato Eu (comparative example)

triallylammonium tetrakis acetylacetonato Eu (comparative example)

triallylammonium tetrakis dibenzoylmethanato Eu (comparative example)

triallylammonium tetrakis thenoyltrifluoroacetonato Eu (comparative example)

triallylammonium tetrakis 2,2,6,6-tetramethylheptanedionato Eu (comparative example)

triallylammonium tetrakis 3-methylpentane-2,4-dionato Eu (comparative example)

triallylammonium tetrakis 3-ethylpentane-2,4-dionato Eu (comparative example)

triallylammonium tetrakis pivaloyltrifluoroacetonato Eu (comparative example)

triallylammonium tetrakis trifluoroacetylacetonato Eu (comparative example)

triallylammonium tetrakis hexafluoroacetylacetonato Eu (comparative example)

triallylammonium tetrakis 6,6,7,7,8,8,8-heptafluoro-2,2-dimethyloctanedionato Eu (comparative example)

triallylammonium tetrakis 1-phenyl-1,3-butanedionato Eu (comparative example)

anilinium tetrakis acetylacetonato Eu (comparative example)

anilinium tetrakis dibenzoylmethanato Eu (comparative example)

anilinium tetrakis thenoyltrifluoroacetonato Eu (comparative example)

anilinium tetrakis 2,2,6,6-tetramethylheptanedionato Eu (comparative example)

anilinium tetrakis 3-methylpentane-2,4-dionato Eu (comparative example)

anilinium tetrakis 3-ethylpentane-2,4-dionato Eu (comparative example)

anilinium tetrakis pivaloyltrifluoroacetonato Eu (comparative example)

anilinium tetrakis trifluoroacetylacetonato Eu (comparative example)

anilinium tetrakis hexafluoroacetylacetonato Eu (comparative example)

anilinium tetrakis 6,6,7,7,8,8,8-heptafluoro-2,2-dimethyloctanedionato Eu (comparative example)

anilinium tetrakis 1-phenyl-1,3-butanedionato Eu (comparative example)

triethylammonium tetrakis acetylacetonato Sm (comparative example)

triethylammonium tetrakis dibenzoylmethanato Sm (comparative example)

triethylammonium tetrakis thenoyltrifluoroacetonato Sm (comparative example)

triethylammonium tetrakis 2,2,6,6-tetramethylheptanedionato Sm (comparative example)

triethylammonium tetrakis 3-methylpentane-2,4-dionato Sm (comparative example)

triethylammonium tetrakis 3-ethylpentane-2,4-dionato Sm (comparative example)

triethylammonium tetrakis pivaloyltrifluoroacetonato Sm (comparative example)

triethylammonium tetrakis trifluoroacetylacetonato Sm (comparative example)

triethylammonium tetrakis hexafluoroacetylacetonato Sm (comparative example)

triethylammonium tetrakis 6,6,7,7,8,8,8-heptafluoro-2,2-dimethyloctanedionato Sm (comparative example)

triethylammonium tetrakis 1-phenyl-1,3-butanedionato Sm (comparative example)

morpholinium tetrakis acetylacetonato Sm (comparative example)

morpholinium tetrakis dibenzoylmethanato Sm (comparative example)

morpholinium tetrakis thenoyltrifluoroacetonato Sm (comparative example)

morpholinium tetrakis 2,2,6,6-tetramethylheptanedionato Sm (comparative example)

morpholinium tetrakis 3-methylpentane-2,4-dionato Sm (comparative example)

morpholinium tetrakis 3-ethylpentane-2,4-dionato Sm (comparative example)

morpholinium tetrakis pivaloyltrifluoroacetonato Sm (comparative example)

morpholinium tetrakis trifluoroacetylacetonato Sm (comparative example)

morpholinium tetrakis hexafluoroacetylacetonato Sm (comparative example)

morpholinium tetrakis 6,6,7,7,8,8,8-heptafluoro-2,2-dimethyloctanedionato Sm (comparative example)

morpholinium tetrakis 1-phenyl-1,3-butanedionato Sm (comparative example)

dimethylbenzylammonium tetrakis acetylacetonato Sm (comparative example)

dimethylbenzylammonium tetrakis dibenzoylmethanato Sm (comparative example)

dimethylbenzylammonium tetrakis thenoyltrifluoroacetonato Sm (comparative example)

dimethylbenzylammonium tetrakis 2,2,6,6-tetramethylheptanedionato Sm (comparative example)

dimethylbenzylammonium tetrakis 3-methylpentane-2,4-dionato Sm (comparative example)

dimethylbenzylammonium tetrakis 3-ethylpentane-2,4-dionato Sm (comparative example)

dimethylbenzylammonium tetrakis pivaloyltrifluoroacetonato Sm (comparative example)

dimethylbenzylammonium tetrakis trifluoroacetylacetonato Sm (comparative example)

dimethylbenzylammonium tetrakis hexafluoroacetylacetonato Sm (comparative example)

dimethylbenzylammonium tetrakis 6,6,7,7,8,8,8-heptafluoro-2,2-dimethyloctanedionato Sm (comparative example)

dimethylbenzylammonium tetrakis 1-phenyl-1,3-butanedionato Sm (comparative example)

triallylammonium tetrakis acetylacetonato Sm (comparative example)

triallylammonium tetrakis dibenzoylmethanato Sm (comparative example)

triallylammonium tetrakis thenoyltrifluoroacetonato Sm (comparative example)

triallylammonium tetrakis 2,2,6,6-tetramethylheptanedionato Sm (comparative example)

triallylammonium tetrakis 3-methylpentane-2,4-dionato Sm (comparative example)

triallylammonium tetrakis 3-ethylpentane-2,4-dionato Sm (comparative example)

triallylammonium tetrakis pivaloyltrifluoroacetonato Sm (comparative example)

triallylammonium tetrakis trifluoroacetylacetonato Sm (comparative example)

triallylammonium tetrakis hexafluoroacetylacetonato Sm (comparative example)

triallylammonium tetrakis 6,6,7,7,8,8,8-heptafluoro-2,2-dimethyloctanedionato Sm (comparative example)

triallylammonium tetrakis 1-phenyl-1,3-butanedionato Sm (comparative example)

anilinium tetrakis acetylacetonato Sm (comparative example)

anilinium tetrakis dibenzoylmethanato Sm (comparative example)

anilinium tetrakis thenoyltrifluoroacetonato Sm (comparative example)

anilinium tetrakis 2,2,6,6-tetramethylheptanedionato Sm (comparative example)

anilinium tetrakis 3-methylpentane-2,4-dionato Sm (comparative example)

anilinium tetrakis 3-ethylpentane-2,4-dionato Sm (comparative example)

anilinium tetrakis pivaloyltrifluoroacetonato Sm (comparative example)

anilinium tetrakis trifluoroacetylacetonato Sm (comparative example)

anilinium tetrakis hexafluoroacetylacetonato Sm (comparative example)

anilinium tetrakis 6,6,7,7,8,8,8-heptafluoro-2,2-dimethyloctanedionato Sm (comparative example)

anilinium tetrakis 1-phenyl-1,3-butanedionato Sm (comparative example)

triethylammonium tetrakis acetylacetonato Dy (comparative example)

triethylammonium tetrakis dibenzoylmethanato Dy (comparative example)

triethylammonium tetrakis thenoyltrifluoroacetonato Dy (comparative example)

triethylammonium tetrakis 2,2,6,6-tetramethylheptanedionato Dy (comparative example)

triethylammonium tetrakis 3-methylpentane-2,4-dionato Dy (comparative example)

triethylammonium tetrakis 3-ethylpentane-2,4-dionato Dy (comparative example)

triethylammonium tetrakis pivaloyltrifluoroacetonato Dy (comparative example)

triethylammonium tetrakis trifluoroacetylacetonato Dy (comparative example)

triethylammonium tetrakis hexafluoroacetylacetonato Dy (comparative example)

triethylammonium tetrakis 6,6,7,7,8,8,8-heptafluoro-2,2-dimethyloctanedionato Dy (comparative example)

triethylammonium tetrakis 1-phenyl-1,3-butanedionato Dy (comparative example)

morpholinium tetrakis acetylacetonato Dy (comparative example)

morpholinium tetrakis dibenzoylmethanato Dy (comparative example)

morpholinium tetrakis thenoyltrifluoroacetonato Dy (comparative example)

morpholinium tetrakis 2,2,6,6-tetramethylheptanedionato Dy (comparative example)

morpholinium tetrakis 3-methylpentane-2,4-dionato Dy (comparative example)

morpholinium tetrakis 3-ethylpentane-2,4-dionato Dy (comparative example)

morpholinium tetrakis pivaloyltrifluoroacetonato Dy (comparative example)

morpholinium tetrakis trifluoroacetylacetonato Dy (comparative example)

morpholinium tetrakis hexafluoroacetylacetonato Dy (comparative example)

morpholinium tetrakis 6,6,7,7,8,8,8-heptafluoro-2,2-dimethyloctanedionato Dy (comparative example)

morpholinium tetrakis 1-phenyl-1,3-butanedionato Dy (comparative example)

dimethylbenzylammonium tetrakis acetylacetonato Dy (comparative example)

dimethylbenzylammonium tetrakis dibenzoylmethanato Dy (comparative example)

dimethylbenzylammonium tetrakis thenoyltrifluoroacetonato Dy (comparative example)

dimethylbenzylammonium tetrakis 2,2,6,6-tetramethylheptanedionato Dy (comparative example)

dimethylbenzylammonium tetrakis 3-methylpentane-2,4-dionato Dy (comparative example)
dimethylbenzylammonium tetrakis 3-ethylpentane-2,4-dionato Dy (comparative example)
dimethylbenzylammonium tetrakis pivaloyltrifluoroacetonato Dy (comparative example)
dimethylbenzylammonium tetrakis trifluoroacetylacetonato Dy (comparative example)
dimethylbenzylammonium tetrakis hexafluoroacetylacetonato Dy (comparative example)
dimethylbenzylammonium tetrakis 6,6,7,7,8,8,8-heptafluoro-2,2-dimethyloctanedionato Dy (comparative example)
dimethylbenzylammonium tetrakis 1-phenyl-1,3-butanedionato Dy (comparative example)
triallylammonium tetrakis acetylacetonato Dy (comparative example)
triallylammonium tetrakis dibenzoylmethanato Dy (comparative example)
triallylammonium tetrakis thenoyltrifluoroacetonato Dy (comparative example)
triallylammonium tetrakis 2,2,6,6-tetramethylheptanedionato Dy (comparative example)
triallylammonium tetrakis 3-methylpentane-2,4-dionato Dy (comparative example)
triallylammonium tetrakis 3-ethylpentane-2,4-dionato Dy (comparative example)
triallylammonium tetrakis pivaloyltrifluoroacetonato Dy (comparative example)
triallylammonium tetrakis trifluoroacetylacetonato Dy (comparative example)
triallylammonium tetrakis hexafluoroacetylacetonato Dy (comparative example)
triallylammonium tetrakis 6,6,7,7,8,8,8-heptafluoro-2,2-dimethyloctanedionato Dy (comparative example)
triallylammonium tetrakis 1-phenyl-1,3-butanedionato Dy (comparative example)
anilinium tetrakis acetylacetonato Dy (comparative example)
anilinium tetrakis dibenzoylmethanato Dy (comparative example)
anilinium tetrakis thenoyltrifluoroacetonato Dy (comparative example)
anilinium tetrakis 2,2,6,6-tetramethylheptanedionato Dy (comparative example)
anilinium tetrakis 3-methylpentane-2,4-dionato Dy (comparative example)
anilinium tetrakis 3-ethylpentane-2,4-dionato Dy (comparative example)
anilinium tetrakis pivaloyltrifluoroacetonato Dy (comparative example)
anilinium tetrakis trifluoroacetylacetonato Dy (comparative example)
anilinium tetrakis hexafluoroacetylacetonato Dy (comparative example)
anilinium tetrakis 6,6,7,7,8,8,8-heptafluoro-2,2-dimethyloctanedionato Dy (comparative example)
anilinium tetrakis 1-phenyl-1,3-butanedionato Dy (comparative example)
triethylammonium tetrakis acetylacetonato Tb0.5, Y0.5
triethylammonium tetrakis dibenzoylmethanato Tb0.5, Y0.5
triethylammonium tetrakis thenoyltrifluoroacetonato Tb0.5, Y0.5
triethylammonium tetrakis 2,2,6,6-tetramethylheptanedionato Tb0.5, Y0.5
triethylammonium tetrakis 3-methylpentane-2,4-dionato Tb0.5, Y0.5
triethylammonium tetrakis 3-ethylpentane-2,4-dionato Tb0.5, Y0.5
triethylammonium tetrakis pivaloyltrifluoroacetonato Tb0.5, Y0.5
triethylammonium tetrakis trifluoroacetylacetonato Tb0.5, Y0.5
triethylammonium tetrakis hexafluoroacetylacetonato Tb0.5, Y0.5
triethylammonium tetrakis 6,6,7,7,8,8,8-heptafluoro-2,2-dimethyloctanedionato Tb0.5, Y0.5
triethylammonium tetrakis 1-phenyl-1,3-butanedionato Tb0.5, Y0.5
morpholinium tetrakis acetylacetonato Tb0.5, Y0.5
morpholinium tetrakis dibenzoylmethanato Tb0.5, Y0.5
morpholinium tetrakis thenoyltrifluoroacetonato Tb0.5, Y0.5
morpholinium tetrakis 2,2,6,6-tetramethylheptanedionato Tb0.5, Y0.5
morpholinium tetrakis 3-methylpentane-2,4-dionato Tb0.5, Y0.5
morpholinium tetrakis 3-ethylpentane-2,4-dionato Tb0.5, Y0.5
morpholinium tetrakis pivaloyltrifluoroacetonato Tb0.5, Y0.5
morpholinium tetrakis trifluoroacetylacetonato Tb0.5, Y0.5
morpholinium tetrakis hexafluoroacetylacetonato Tb0.5, Y0.5
morpholinium tetrakis 6,6,7,7,8,8,8-heptafluoro-2,2-dimethyloctanedionato Tb0.5, Y0.5
morpholinium tetrakis 1-phenyl-1,3-butanedionato Tb0.5, Y0.5
dimethylbenzylammonium tetrakis acetylacetonato Tb0.5, Y0.5
dimethylbenzylammonium tetrakis dibenzoylmethanato Tb0.5, Y0.5
dimethylbenzylammonium tetrakis thenoyltrifluoroacetonato Tb0.5, Y0.5
dimethylbenzylammonium tetrakis 2,2,6,6-tetramethylheptanedionato Tb0.5, Y0.5
dimethylbenzylammonium tetrakis 3-methylpentane-2,4-dionato Tb0.5, Y0.5
dimethylbenzylammonium tetrakis 3-ethylpentane-2,4-dionato Tb0.5, Y0.5
dimethylbenzylammonium tetrakis pivaloyltrifluoroacetonato Tb0.5, Y0.5
dimethylbenzylammonium tetrakis trifluoroacetylacetonato Tb0.5, Y0.5
dimethylbenzylammonium tetrakis hexafluoroacetylacetonato Tb0.5, Y0.5
dimethylbenzylammonium tetrakis 6,6,7,7,8,8,8-heptafluoro-2,2-dimethyloctanedionato Tb0.5, Y0.5
dimethylbenzylammonium tetrakis 1-phenyl-1,3-butanedionato Tb0.5, Y0.5
triallylammonium tetrakis acetylacetonato Tb0.5, Y0.5
triallylammonium tetrakis dibenzoylmethanato Tb0.5, Y0.5
triallylammonium tetrakis thenoyltrifluoroacetonato Tb0.5, Y0.5
triallylammonium tetrakis 2,2,6,6-tetramethylheptanedionato Tb0.5, Y0.5
triallylammonium tetrakis 3-methylpentane-2,4-dionato Tb0.5, Y0.5
triallylammonium tetrakis 3-ethylpentane-2,4-dionato Tb0.5, Y0.5
triallylammonium tetrakis pivaloyltrifluoroacetonato Tb0.5, Y0.5
triallylammonium tetrakis trifluoroacetylacetonato Tb0.5, Y0.5 triallylammonium tetrakis hexafluoroacetylacetonato Tb0.5, Y0.5
triallylammonium tetrakis 6,6,7,7,8,8,8-heptafluoro-2,2-dimethyloctanedionato Tb0.5, Y0.5
triallylammonium tetrakis 1-phenyl-1,3-butanedionato Tb0.5, Y0.5
anilinium tetrakis acetylacetonato Tb0.5, Y0.5
anilinium tetrakis dibenzoylmethanato Tb0.5, Y0.5
anilinium tetrakis thenoyltrifluoroacetonato Tb0.5, Y0.5
anilinium tetrakis 2,2,6,6-tetramethylheptanedionato Tb0.5, Y0.5
anilinium tetrakis 3-methylpentane-2,4-dionato Tb0.5, Y0.5
anilinium tetrakis 3-ethylpentane-2,4-dionato Tb0.5, Y0.5
anilinium tetrakis pivaloyltrifluoroacetonato Tb0.5, Y0.5
anilinium tetrakis trifluoroacetylacetonato Tb0.5, Y0.5
anilinium tetrakis hexafluoroacetylacetonato Tb0.5, Y0.5
anilinium tetrakis 6,6,7,7,8,8,8-heptafluoro-2,2-dimethyloctanedionato Tb0.5, Y0.5
anilinium tetrakis 1-phenyl-1,3-butanedionato Tb0.5, Y0.5
triethylammonium tetrakis acetylacetonato Tb0.2, Y0.8
triethylammonium tetrakis dibenzoylmethanato Tb0.2, Y0.8
triethylammonium tetrakis thenoyltrifluoroacetonato Tb0.2, Y0.8
triethylammonium tetrakis 2,2,6,6-tetramethylheptanedionato Tb0.2, Y0.8
triethylammonium tetrakis 3-methylpentane-2,4-dionato Tb0.2, Y0.8
triethylammonium tetrakis 3-ethylpentane-2,4-dionato Tb0.2, Y0.8
triethylammonium tetrakis pivaloyltrifluoroacetonato Tb0.2, Y0.8
triethylammonium tetrakis trifluoroacetylacetonato Tb0.2, Y0.8
triethylammonium tetrakis hexafluoroacetylacetonato Tb0.2, Y0.8
triethylammonium tetrakis 6,6,7,7,8,8,8-heptafluoro-2,2-dimethyloctanedionato Tb0.2, Y0.8
triethylammonium tetrakis 1-phenyl-1,3-butanedionato Tb0.2, Y0.8
morpholinium tetrakis acetylacetonato Tb0.2, Y0.8
morpholinium tetrakis dibenzoylmethanato Tb0.2, Y0.8
morpholinium tetrakis thenoyltrifluoroacetonato Tb0.2, Y0.8
morpholinium tetrakis 2,2,6,6-tetramethylheptanedionato Tb0.2, Y0.8
morpholinium tetrakis 3-methylpentane-2,4-dionato Tb0.2, Y0.8
morpholinium tetrakis 3-ethylpentane-2,4-dionato Tb0.2, Y0.8
morpholinium tetrakis pivaloyltrifluoroacetonato Tb0.2, Y0.8
morpholinium tetrakis trifluoroacetylacetonato Tb0.2, Y0.8
morpholinium tetrakis hexafluoroacetylacetonato Tb0.2, Y0.8
morpholinium tetrakis 6,6,7,7,8,8,8-heptafluoro-2,2-dimethyloctanedionato Tb0.2, Y0.8
morpholinium tetrakis 1-phenyl-1,3-butanedionato Tb0.2, Y0.8
dimethylbenzylammonium tetrakis acetylacetonato Tb0.2, Y0.8
dimethylbenzylammonium tetrakis dibenzoylmethanato Tb0.2, Y0.8
dimethylbenzylammonium tetrakis thenoyltrifluoroacetonato Tb0.2, Y0.8
dimethylbenzylammonium tetrakis 2,2,6,6-tetramethylheptanedionato Tb0.2, Y0.8 dimethylbenzylammonium tetrakis 3-methylpentane-2,4-dionato Tb0.2, Y0.8
dimethylbenzylammonium tetrakis 3-ethylpentane-2,4-dionato Tb0.2, Y0.8
dimethylbenzylammonium tetrakis pivaloyltrifluoroacetonato Tb0.2, Y0.8
dimethylbenzylammonium tetrakis trifluoroacetylacetonato Tb0.2, Y0.8
dimethylbenzylammonium tetrakis hexafluoroacetylacetonato Tb0.2, Y0.8
dimethylbenzylammonium tetrakis 6,6,7,7,8,8,8-heptafluoro-2,2-dimethyloctanedionato Tb0.2, Y0.8
dimethylbenzylammonium tetrakis 1-phenyl-1,3-butanedionato Tb0.2, Y0.8
triallylammonium tetrakis acetylacetonato Tb0.2, Y0.8
triallylammonium tetrakis dibenzoylmethanato Tb0.2, Y0.8
triallylammonium tetrakis thenoyltrifluoroacetonato Tb0.2, Y0.8
triallylammonium tetrakis 2,2,6,6-tetramethylheptanedionato Tb0.2, Y0.8
triallylammonium tetrakis 3-methylpentane-2,4-dionato Tb0.2, Y0.8
triallylammonium tetrakis 3-ethylpentane-2,4-dionato Tb0.2, Y0.8
triallylammonium tetrakis pivaloyltrifluoroacetonato Tb0.2, Y0.8
triallylammonium tetrakis trifluoroacetylacetonato Tb0.2, Y0.8
triallylammonium tetrakis hexafluoroacetylacetonato Tb0.2, Y0.8
triallylammonium tetrakis 6,6,7,7,8,8,8-heptafluoro-2,2-dimethyloctanedionato Tb0.2, Y0.8
triallylammonium tetrakis 1-phenyl-1,3-butanedionato Tb0.2, Y0.8
anilinium tetrakis acetylacetonato Tb0.2, Y0.8
anilinium tetrakis dibenzoylmethanato Tb0.2, Y0.8
anilinium tetrakis thenoyltrifluoroacetonato Tb0.2, Y0.8
anilinium tetrakis 2,2,6,6-tetramethylheptanedionato Tb0.2, Y0.8
anilinium tetrakis 3-methylpentane-2,4-dionato Tb0.2, Y0.8
anilinium tetrakis 3-ethylpentane-2,4-dionato Tb0.2, Y0.8
anilinium tetrakis pivaloyltrifluoroacetonato Tb0.2, Y0.8
anilinium tetrakis trifluoroacetylacetonato Tb0.2, Y0.8
anilinium tetrakis hexafluoroacetylacetonato Tb0.2, Y0.8
anilinium tetrakis 6,6,7,7,8,8,8-heptafluoro-2,2-dimethyloctanedionato Tb0.2, Y0.8
anilinium tetrakis 1-phenyl-1,3-butanedionato Tb0.2, Y0.8
triethylammonium tetrakis acetylacetonato Tb0.1, Y0.9
triethylammonium tetrakis dibenzoylmethanato Tb0.1, Y0.9
triethylammonium tetrakis thenoyltrifluoroacetonato Tb0.1, Y0.9
triethylammonium tetrakis 2,2,6,6-tetramethylheptanedionato Tb0.1, Y0.9
triethylammonium tetrakis 3-methylpentane-2,4-dionato Tb0.1, Y0.9
triethylammonium tetrakis 3-ethylpentane-2,4-dionato Tb0.1, Y0.9
triethylammonium tetrakis pivaloyltrifluoroacetonato Tb0.1, Y0.9
triethylammonium tetrakis trifluoroacetylacetonato Tb0.1, Y0.9
triethylammonium tetrakis hexafluoroacetylacetonato Tb0.1, Y0.9
triethylammonium tetrakis 6,6,7,7,8,8,8-heptafluoro-2,2-dimethyloctanedionato Tb0.1, Y0.9
triethylammonium tetrakis 1-phenyl-1,3-butanedionato Tb0.1, Y0.9 morpholinium tetrakis acetylacetonato Tb0.1, Y0.9
morpholinium tetrakis dibenzoylmethanato Tb0.1, Y0.9
morpholinium tetrakis thenoyltrifluoroacetonato Tb0.1, Y0.9
morpholinium tetrakis 2,2,6,6-tetramethylheptanedionato Tb0.1, Y0.9
morpholinium tetrakis 3-methylpentane-2,4-dionato Tb0.1, Y0.9
morpholinium tetrakis 3-ethylpentane-2,4-dionato Tb0.1, Y0.9
morpholinium tetrakis pivaloyltrifluoroacetonato Tb0.1, Y0.9
morpholinium tetrakis trifluoroacetylacetonato Tb0.1, Y0.9
morpholinium tetrakis hexafluoroacetylacetonato Tb0.1, Y0.9
morpholinium tetrakis 6,6,7,7,8,8,8-heptafluoro-2,2-dimethyloctanedionato Tb0.1, Y0.9
morpholinium tetrakis 1-phenyl-1,3-butanedionato Tb0.1, Y0.9
dimethylbenzylammonium tetrakis acetylacetonato Tb0.1, Y0.9
dimethylbenzylammonium tetrakis dibenzoylmethanato Tb0.1, Y0.9
dimethylbenzylammonium tetrakis thenoyltrifluoroacetonato Tb0.1, Y0.9
dimethylbenzylammonium tetrakis 2,2,6,6-tetramethylheptanedionato Tb0.1, Y0.9
dimethylbenzylammonium tetrakis 3-methylpentane-2,4-dionato Tb0.1, Y0.9
dimethylbenzylammonium tetrakis 3-ethylpentane-2,4-dionato Tb0.1, Y0.9
dimethylbenzylammonium tetrakis pivaloyltrifluoroacetonato Tb0.1, Y0.9
dimethylbenzylammonium tetrakis trifluoroacetylacetonato Tb0.1, Y0.9
dimethylbenzylammonium tetrakis hexafluoroacetylacetonato Tb0.1, Y0.9
dimethylbenzylammonium tetrakis 6,6,7,7,8,8,8-heptafluoro-2,2-dimethyloctanedionato Tb0.1, Y0.9
dimethylbenzylammonium tetrakis 1-phenyl-1,3-butanedionato Tb0.1, Y0.9
triallylammonium tetrakis acetylacetonato Tb0.1, Y0.9
triallylammonium tetrakis dibenzoylmethanato Tb0.1, Y0.9
triallylammonium tetrakis thenoyltrifluoroacetonato Tb0.1, Y0.9
triallylammonium tetrakis 2,2,6,6-tetramethylheptanedionato Tb0.1, Y0.9
triallylammonium tetrakis 3-methylpentane-2,4-dionato Tb0.1, Y0.9
triallylammonium tetrakis 3-ethylpentane-2,4-dionato Tb0.1, Y0.9
triallylammonium tetrakis pivaloyltrifluoroacetonato Tb0.1, Y0.9.
triallylammonium tetrakis trifluoroacetylacetonato Tb0.1, Y0.9
triallylammonium tetrakis hexafluoroacetylacetonato Tb0.1, Y0.9
triallylammonium tetrakis 6,6,7,7,8,8,8-heptafluoro-2,2-dimethyloctanedionato Tb0.1, Y0.9
triallylammonium tetrakis 1-phenyl-1,3-butanedionato Tb0.1, Y0.9
anilinium tetrakis acetylacetonato Tb0.1, Y0.9
anilinium tetrakis dibenzoylmethanato Tb0.1, Y0.9
anilinium tetrakis thenoyltrifluoroacetonato Tb0.1, Y0.9
anilinium tetrakis 2,2,6,6-tetramethylheptanedionato Tb0.1, Y0.9
anilinium tetrakis 3-methylpentane-2,4-dionato Tb0.1, Y0.9
anilinium tetrakis 3-ethylpentane-2,4-dionato Tb0.1, Y0.9
anilinium tetrakis pivaloyltrifluoroacetonato Tb0.1, Y0.9
anilinium tetrakis trifluoroacetylacetonato Tb0.1, Y0.9
anilinium tetrakis hexafluoroacetylacetonato Tb0.1, Y0.9
anilinium tetrakis 6,6,7,7,8,8,8-heptafluoro-2,2-dimethyloctanedionato Tb0.1, Y0.9
anilinium tetrakis 1-phenyl-1,3-butanedionato Tb0.1, Y0.9
triethylammonium tetrakis acetylacetonato Tb0.01, Y0.99
triethylammonium tetrakis dibenzoylmethanato Tb0.01, Y0.99
triethylammonium tetrakis thenoyltrifluoroacetonato Tb0.01, Y0.99
triethylammonium tetrakis 2,2,6,6-tetramethylheptanedionato Tb0.01, Y0.99
triethylammonium tetrakis 3-methylpentane-2,4-dionato Tb0.01, Y0.99
triethylammonium tetrakis 3-ethylpentane-2,4-dionato Tb0.01, Y0.99
triethylammonium tetrakis pivaloyltrifluoroacetonato Tb0.01, Y0.99
triethylammonium tetrakis trifluoroacetylacetonato Tb0.01, Y0.99
triethylammonium tetrakis hexafluoroacetylacetonato Tb0.01, Y0.99
triethylammonium tetrakis 6,6,7,7,8,8,8-heptafluoro-2,2-dimethyloctanedionato Tb0.01, Y0.99
triethylammonium tetrakis 1-phenyl-1,3-butanedionato Tb0.01, Y0.99
morpholinium tetrakis acetylacetonato Tb0.01, Y0.99
morpholinium tetrakis dibenzoylmethanato Tb0.01, Y0.99
morpholinium tetrakis thenoyltrifluoroacetonato Tb0.01, Y0.99
morpholinium tetrakis 2,2,6,6-tetramethylheptanedionato Tb0.01, Y0.99
morpholinium tetrakis 3-methylpentane-2,4-dionato Tb0.01, Y0.99
morpholinium tetrakis 3-ethylpentane-2,4-dionato Tb0.01, Y0.99
morpholinium tetrakis pivaloyltrifluoroacetonato Tb0.01, Y0.99
morpholinium tetrakis trifluoroacetylacetonato Tb0.01, Y0.99
morpholinium tetrakis hexafluoroacetylacetonato Tb0.01, Y0.99
morpholinium tetrakis 6,6,7,7,8,8,8-heptafluoro-2,2-dimethyloctanedionato Tb0.01, Y0.99
morpholinium tetrakis 1-phenyl-1,3-butanedionato Tb0.01, Y0.99
dimethylbenzylammonium tetrakis acetylacetonato Tb0.01, Y0.99
dimethylbenzylammonium tetrakis dibenzoylmethanato Tb0.01, Y0.99
dimethylbenzylammonium tetrakis thenoyltrifluoroacetonato Tb0.01, Y0.99
dimethylbenzylammonium tetrakis 2,2,6,6-tetramethylheptanedionato Tb0.01, Y0.99
dimethylbenzylammonium tetrakis 3-methylpentane-2,4-dionato Tb0.01, Y0.99
dimethylbenzylammonium tetrakis 3-ethylpentane-2,4-dionato Tb0.01, Y0.99
dimethylbenzylammonium tetrakis pivaloyltrifluoroacetonato Tb0.01, Y0.99
dimethylbenzylammonium tetrakis trifluoroacetylacetonato Tb0.01, Y0.99
dimethylbenzylammonium tetrakis hexafluoroacetylacetonato Tb0.01, Y0.99 dimethylbenzylammonium tetrakis 6,6,7,7,8,8,8-heptafluoro-2,2-dimethyloctanedionato Tb0.01, Y0.99
dimethylbenzylammonium tetrakis 1-phenyl-1,3-butanedionato Tb0.01, Y0.99
triallylammonium tetrakis acetylacetonato Tb0.01, Y0.99
triallylammonium tetrakis dibenzoylmethanato Tb0.01, Y0.99
triallylammonium tetrakis thenoyltrifluoroacetonato Tb0.01, Y0.99
triallylammonium tetrakis 2,2,6,6-tetramethylheptanedionato Tb0.01, Y0.99
triallylammonium tetrakis 3-methylpentane-2,4-dionato Tb0.01, Y0.99
triallylammonium tetrakis 3-ethylpentane-2,4-dionato Tb0.01, Y0.99
triallylammonium tetrakis pivaloyltrifluoroacetonato Tb0.01, Y0.99
triallylammonium tetrakis trifluoroacetylacetonato Tb0.01, Y0.99
triallylammonium tetrakis hexafluoroacetylacetonato Tb0.01, Y0.99
triallylammonium tetrakis 6,6,7,7,8,8,8-heptafluoro-2,2-dimethyloctanedionato Tb0.01, Y0.99
triallylammonium tetrakis 1-phenyl-1,3-butanedionato Tb0.01, Y0.99
anilinium tetrakis acetylacetonato Tb0.01, Y0.99
anilinium tetrakis dibenzoylmethanato Tb0.01, Y0.99
anilinium tetrakis thenoyltrifluoroacetonato Tb0.01, Y0.99
anilinium tetrakis 2,2,6,6-tetramethylheptanedionato Tb0.01, Y0.99
anilinium tetrakis 3-methylpentane-2,4-dionato Tb0.01, Y0.99
anilinium tetrakis 3-ethylpentane-2,4-dionato Tb0.01, Y0.99
anilinium tetrakis pivaloyltrifluoroacetonato Tb0.01, Y0.99
anilinium tetrakis trifluoroacetylacetonato Tb0.01, Y0.99
anilinium tetrakis hexafluoroacetylacetonato Tb0.01, Y0.99
anilinium tetrakis 6,6,7,7,8,8,8-heptafluoro-2,2-dimethyloctanedionato Tb0.01, Y0.99
anilinium tetrakis 1-phenyl-1,3-butanedionato Tb0.01, Y0.99
triethylammonium tetrakis acetylacetonato Eu0.5, Y0.5
triethylammonium tetrakis dibenzoylmethanato Eu0.5, Y0.5
triethylammonium tetrakis thenoyltrifluoroacetonato Eu0.5, Y0.5
triethylammonium tetrakis 2,2,6,6-tetramethylheptanedionato Eu0.5, Y0.5
triethylammonium tetrakis 3-methylpentane-2,4-dionato Eu0.5, Y0.5
triethylammonium tetrakis 3-ethylpentane-2,4-dionato Eu0.5, Y0.5
triethylammonium tetrakis pivaloyltrifluoroacetonato Eu0.5, Y0.5
triethylammonium tetrakis trifluoroacetylacetonato Eu0.5, Y0.5
triethylammonium tetrakis hexafluoroacetylacetonato Eu0.5, Y0.5
triethylammonium tetrakis 6,6,7,7,8,8,8-heptafluoro-2,2-dimethyloctanedionato Eu0.5, Y0.5
triethylammonium tetrakis 1-phenyl-1,3-butanedionato Eu0.5, Y0.5
morpholinium tetrakis acetylacetonato Eu0.5, Y0.5
morpholinium tetrakis dibenzoylmethanato Eu0.5, Y0.5
morpholinium tetrakis thenoyltrifluoroacetonato Eu0.5, Y0.5
morpholinium tetrakis 2,2,6,6-tetramethylheptanedionato Eu0.5, Y0.5
morpholinium tetrakis 3-methylpentane-2,4-dionato Eu0.5, Y0.5
morpholinium tetrakis 3-ethylpentane-2,4-dionato Eu0.5, Y0.5
morpholinium tetrakis pivaloyltrifluoroacetonato Eu0.5, Y0.5
morpholinium tetrakis trifluoroacetylacetonato Eu0.5, Y0.5
morpholinium tetrakis hexafluoroacetylacetonato Eu0.5, Y0.5
morpholinium tetrakis 6,6,7,7,8,8,8-heptafluoro-2,2-dimethyloctanedionato Eu0.5, Y0.5
morpholinium tetrakis 1-phenyl-1,3-butanedionato Eu0.5, Y0.5
dimethylbenzylammonium tetrakis acetylacetonato Eu0.5, Y0.5
dimethylbenzylammonium tetrakis dibenzoylmethanato Eu0.5, Y0.5
dimethylbenzylammonium tetrakis thenoyltrifluoroacetonato Eu0.5, Y0.5
dimethylbenzylammonium tetrakis 2,2,6,6-tetramethylheptanedionato Eu0.5, Y0.5
dimethylbenzylammonium tetrakis 3-methylpentane-2,4-dionato Eu0.5, Y0.5
dimethylbenzylammonium tetrakis 3-ethylpentane-2,4-dionato Eu0.5, Y0.5
dimethylbenzylammonium tetrakis pivaloyltrifluoroacetonato Eu0.5, Y0.5
dimethylbenzylammonium tetrakis trifluoroacetylacetonato Eu0.5, Y0.5
dimethylbenzylammonium tetrakis hexafluoroacetylacetonato Eu0.5, Y0.5
dimethylbenzylammonium tetrakis 6,6,7,7,8,8,8-heptafluoro-2,2-dimethyloctanedionato Eu0.5, Y0.5
dimethylbenzylammonium tetrakis 1-phenyl-1,3-butanedionato Eu0.5, Y0.5
triallylammonium tetrakis acetylacetonato Eu0.5, Y0.5
triallylammonium tetrakis dibenzoylmethanato Eu0.5, Y0.5
triallylammonium tetrakis thenoyltrifluoroacetonato Eu0.5, Y0.5
triallylammonium tetrakis 2,2,6,6-tetramethylheptanedionato Eu0.5, Y0.5
triallylammonium tetrakis 3-methylpentane-2,4-dionato Eu0.5, Y0.5
triallylammonium tetrakis 3-ethylpentane-2,4-dionato Eu0.5, Y0.5
triallylammonium tetrakis pivaloyltrifluoroacetonato Eu0.5, Y0.5
triallylammonium tetrakis trifluoroacetylacetonato Eu0.5, Y0.5
triallylammonium tetrakis hexafluoroacetylacetonato Eu0.5, Y0.5
triallylammonium tetrakis 6,6,7,7,8,8,8-heptafluoro-2,2-dimethyloctanedionato Eu0.5, Y0.5
triallylammonium tetrakis 1-phenyl-1,3-butanedionato Eu0.5, Y0.5
anilinium tetrakis acetylacetonato Eu0.5, Y0.5
anilinium tetrakis dibenzoylmethanato Eu0.5, Y0.5
anilinium tetrakis thenoyltrifluoroacetonato Eu0.5, Y0.5
anilinium tetrakis 2,2,6,6-tetramethylheptanedionato Eu0.5, Y0.5
anilinium tetrakis 3-methylpentane-2,4-dionato Eu0.5, Y0.5
anilinium tetrakis 3-ethylpentane-2,4-dionato Eu0.5, Y0.5
anilinium tetrakis pivaloyltrifluoroacetonato Eu0.5, Y0.5
anilinium tetrakis trifluoroacetylacetonato Eu0.5, Y0.5
anilinium tetrakis hexafluoroacetylacetonato Eu0.5, Y0.5
anilinium tetrakis 6,6,7,7,8,8,8-heptafluoro-2,2-dimethyloctanedionato Eu0.5, Y0.5 anilinium tetrakis 1-phenyl-1,3-butanedionato Eu0.5, Y0.5
triethylammonium tetrakis acetylacetonato Eu0.2, Y0.8
triethylammonium tetrakis dibenzoylmethanato Eu0.2, Y0.8
triethylammonium tetrakis thenoyltrifluoroacetonato Eu0.2, Y0.8
triethylammonium tetrakis 2,2,6,6-tetramethylheptanedionato Eu0.2, Y0.8
triethylammonium tetrakis 3-methylpentane-2,4-dionato Eu0.2, Y0.8
triethylammonium tetrakis 3-ethylpentane-2,4-dionato Eu0.2, Y0.8
triethylammonium tetrakis pivaloyltrifluoroacetonato Eu0.2, Y0.8
triethylammonium tetrakis trifluoroacetylacetonato Eu0.2, Y0.8
triethylammonium tetrakis hexafluoroacetylacetonato Eu0.2, Y0.8
triethylammonium tetrakis 6,6,7,7,8,8,8-heptafluoro-2,2-dimethyloctanedionato Eu0.2, Y0.8
triethylammonium tetrakis 1-phenyl-1,3-butanedionato Eu0.2, Y0.8
morpholinium tetrakis acetylacetonato Eu0.2, Y0.8
morpholinium tetrakis dibenzoylmethanato Eu0.2, Y0.8
morpholinium tetrakis thenoyltrifluoroacetonato Eu0.2, Y0.8
morpholinium tetrakis 2,2,6,6-tetramethylheptanedionato Eu0.2, Y0.8
morpholinium tetrakis 3-methylpentane-2,4-dionato Eu0.2, Y0.8
morpholinium tetrakis 3-ethylpentane-2,4-dionato Eu0.2, Y0.8
morpholinium tetrakis pivaloyltrifluoroacetonato Eu0.2, Y0.8
morpholinium tetrakis trifluoroacetylacetonato Eu0.2, Y0.8
morpholinium tetrakis hexafluoroacetylacetonato Eu0.2, Y0.8
morpholinium tetrakis 6,6,7,7,8,8,8-heptafluoro-2,2-dimethyloctanedionato Eu0.2, Y0.8
morpholinium tetrakis 1-phenyl-1,3-butanedionato Eu0.2, Y0.8
dimethylbenzylammonium tetrakis acetylacetonato Eu0.2, Y0.8
dimethylbenzylammonium tetrakis dibenzoylmethanato Eu0.2, Y0.8
dimethylbenzylammonium tetrakis thenoyltrifluoroacetonato Eu0.2, Y0.8
dimethylbenzylammonium tetrakis 2,2,6,6-tetramethylheptanedionato Eu0.2, Y0.8
dimethylbenzylammonium tetrakis 3-methylpentane-2,4-dionato Eu0.2, Y0.8
dimethylbenzylammonium tetrakis 3-ethylpentane-2,4-dionato Eu0.2, Y0.8
dimethylbenzylammonium tetrakis pivaloyltrifluoroacetonato Eu0.2, Y0.8
dimethylbenzylammonium tetrakis trifluoroacetylacetonato Eu0.2, Y0.8
dimethylbenzylammonium tetrakis hexafluoroacetylacetonato Eu0.2, Y0.8
dimethylbenzylammonium tetrakis 6,6,7,7,8,8,8-heptafluoro-2,2-dimethyloctanedionato Eu0.2, Y0.8
dimethylbenzylammonium tetrakis 1-phenyl-1,3-butanedionato Eu0.2, Y0.8
triallylammonium tetrakis acetylacetonato Eu0.2, Y0.8
triallylammonium tetrakis dibenzoylmethanato Eu0.2, Y0.8
triallylammonium tetrakis thenoyltrifluoroacetonato Eu0.2, Y0.8
triallylammonium tetrakis 2,2,6,6-tetramethylheptanedionato Eu0.2, Y0.8
triallylammonium tetrakis 3-methylpentane-2,4-dionato Eu0.2, Y0.8
triallylammonium tetrakis 3-ethylpentane-2,4-dionato Eu0.2, Y0.8
triallylammonium tetrakis pivaloyltrifluoroacetonato Eu0.2, Y0.8
triallylammonium tetrakis trifluoroacetylacetonato Eu0.2, Y0.8
triallylammonium tetrakis hexafluoroacetylacetonato Eu0.2, Y0.8
triallylammonium tetrakis 6,6,7,7,8,8,8-heptafluoro-2,2-dimethyloctanedionato Eu0.2, Y0.8
triallylammonium tetrakis 1-phenyl-1,3-butanedionato Eu0.2, Y0.8
anilinium tetrakis acetylacetonato Eu0.2, Y0.8
anilinium tetrakis dibenzoylmethanato Eu0.2, Y0.8
anilinium tetrakis thenoyltrifluoroacetonato Eu0.2, Y0.8
anilinium tetrakis 2,2,6,6-tetramethylheptanedionato Eu0.2, Y0.8
anilinium tetrakis 3-methylpentane-2,4-dionato Eu0.2, Y0.8
anilinium tetrakis 3-ethylpentane-2,4-dionato Eu0.2, Y0.8
anilinium tetrakis pivaloyltrifluoroacetonato Eu0.2, Y0.8
anilinium tetrakis trifluoroacetylacetonato Eu0.2, Y0.8
anilinium tetrakis hexafluoroacetylacetonato Eu0.2, Y0.8
anilinium tetrakis 6,6,7,7,8,8,8-heptafluoro-2,2-dimethyloctanedionato Eu0.2, Y0.8
anilinium tetrakis 1-phenyl-1,3-butanedionato Eu0.2, Y0.8
triethylammonium tetrakis acetylacetonato Eu0.1, Y0.9
triethylammonium tetrakis dibenzoylmethanato Eu0.1, Y0.9
triethylammonium tetrakis thenoyltrifluoroacetonato Eu0.1, Y0.9
triethylammonium tetrakis 2,2,6,6-tetramethylheptanedionato Eu0.1, Y0.9
triethylammonium tetrakis 3-methylpentane-2,4-dionato Eu0.1, Y0.9
triethylammonium tetrakis 3-ethylpentane-2,4-dionato Eu0.1, Y0.9
triethylammonium tetrakis pivaloyltrifluoroacetonato Eu0.1, Y0.9
triethylammonium tetrakis trifluoroacetylacetonato Eu0.1, Y0.9
triethylammonium tetrakis hexafluoroacetylacetonato Eu0.1, Y0.9
triethylammonium tetrakis 6,6,7,7,8,8,8-heptafluoro-2,2-dimethyloctanedionato Eu0.1, Y0.9
triethylammonium tetrakis 1-phenyl-1,3-butanedionato Eu0.1, Y0.9
morpholinium tetrakis acetylacetonato Eu0.1, Y0.9
morpholinium tetrakis dibenzoylmethanato Eu0.1, Y0.9
morpholinium tetrakis thenoyltrifluoroacetonato Eu0.1, Y0.9
morpholinium tetrakis 2,2,6,6-tetramethylheptanedionato Eu0.1, Y0.9
morpholinium tetrakis 3-methylpentane-2,4-dionato Eu0.1, Y0.9
morpholinium tetrakis 3-ethylpentane-2,4-dionato Eu0.1, Y0.9
morpholinium tetrakis pivaloyltrifluoroacetonato Eu0.1, Y0.9
morpholinium tetrakis trifluoroacetylacetonato Eu0.1, Y0.9
morpholinium tetrakis hexafluoroacetylacetonato Eu0.1, Y0.9
morpholinium tetrakis 6,6,7,7,8,8,8-heptafluoro-2,2-dimethyloctanedionato Eu0.1, Y0.9 morpholinium tetrakis 1-phenyl-1,3-butanedionato Eu0.1, Y0.9
dimethylbenzylammonium tetrakis acetylacetonato Eu0.1, Y0.9
dimethylbenzylammonium tetrakis dibenzoylmethanato Eu0.1, Y0.9
dimethylbenzylammonium tetrakis thenoyltrifluoroacetonato Eu0.1, Y0.9
dimethylbenzylammonium tetrakis 2,2,6,6-tetramethylheptanedionato Eu0.1, Y0.9
dimethylbenzylammonium tetrakis 3-methylpentane-2,4-dionato Eu0.1, Y0.9
dimethylbenzylammonium tetrakis 3-ethylpentane-2,4-dionato Eu0.1, Y0.9
dimethylbenzylammonium tetrakis pivaloyltrifluoroacetonato Eu0.1, Y0.9
dimethylbenzylammonium tetrakis trifluoroacetylacetonato Eu0.1, Y0.9
dimethylbenzylammonium tetrakis hexafluoroacetylacetonato Eu0.1, Y0.9
dimethylbenzylammonium tetrakis 6,6,7,7,8,8,8-heptafluoro-2,2-dimethyloctanedionato Eu0.1, Y0.9
dimethylbenzylammonium tetrakis 1-phenyl-1,3-butanedionato Eu0.1, Y0.9
triallylammonium tetrakis acetylacetonato Eu0.1, Y0.9
triallylammonium tetrakis dibenzoylmethanato Eu0.1, Y0.9
triallylammonium tetrakis thenoyltrifluoroacetonato Eu0.1, Y0.9
triallylammonium tetrakis 2,2,6,6-tetramethylheptanedionato Eu0.1, Y0.9
triallylammonium tetrakis 3-methylpentane-2,4-dionato Eu0.1, Y0.9
triallylammonium tetrakis 3-ethylpentane-2,4-dionato Eu0.1, Y0.9
triallylammonium tetrakis pivaloyltrifluoroacetonato Eu0.1, Y0.9
triallylammonium tetrakis trifluoroacetylacetonato Eu0.1, Y0.9
triallylammonium tetrakis hexafluoroacetylacetonato Eu0.1, Y0.9
triallylammonium tetrakis 6,6,7,7,8,8,8-heptafluoro-2,2-dimethyloctanedionato Eu0.1, Y0.9
triallylammonium tetrakis 1-phenyl-1,3-butanedionato Eu0.1, Y0.9
anilinium tetrakis acetylacetonato Eu0.1, Y0.9
anilinium tetrakis dibenzoylmethanato Eu0.1, Y0.9
anilinium tetrakis thenoyltrifluoroacetonato Eu0.1, Y0.9
anilinium tetrakis 2,2,6,6-tetramethylheptanedionato Eu0.1, Y0.9
anilinium tetrakis 3-methylpentane-2,4-dionato Eu0.1, Y0.9
anilinium tetrakis 3-ethylpentane-2,4-dionato Eu0.1, Y0.9
anilinium tetrakis pivaloyltrifluoroacetonato Eu0.1, Y0.9
anilinium tetrakis trifluoroacetylacetonato Eu0.1, Y0.9
anilinium tetrakis hexafluoroacetylacetonato Eu0.1, Y0.9
anilinium tetrakis 6,6,7,7,8,8,8-heptafluoro-2,2-dimethyloctanedionato Eu0.1, Y0.9
anilinium tetrakis 1-phenyl-1,3-butanedionato Eu0.1, Y0.9
triethylammonium tetrakis acetylacetonato Eu0.01, Y0.99
triethylammonium tetrakis dibenzoylmethanato Eu0.01, Y0.99
triethylammonium tetrakis thenoyltrifluoroacetonato Eu0.01, Y0.99
triethylammonium tetrakis 2,2,6,6-tetramethylheptanedionato Eu0.01, Y0.99
triethylammonium tetrakis 3-methylpentane-2,4-dionato Eu0.01, Y0.99
triethylammonium tetrakis 3-ethylpentane-2,4-dionato Eu0.01, Y0.99
triethylammonium tetrakis pivaloyltrifluoroacetonato Eu0.01, Y0.99
triethylammonium tetrakis trifluoroacetylacetonato Eu0.01, Y0.99
triethylammonium tetrakis hexafluoroacetylacetonato Eu0.01, Y0.99
triethylammonium tetrakis 6,6,7,7,8,8,8-heptafluoro-2,2-dimethyloctanedionato Eu0.01, Y0.99
triethylammonium tetrakis 1-phenyl-1,3-butanedionato Eu0.01, Y0.99
morpholinium tetrakis acetylacetonato Eu0.01, Y0.99
morpholinium tetrakis dibenzoylmethanato Eu0.01, Y0.99
morpholinium tetrakis thenoyltrifluoroacetonato Eu0.01, Y0.99
morpholinium tetrakis 2,2,6,6-tetramethylheptanedionato Eu0.01, Y0.99
morpholinium tetrakis 3-methylpentane-2,4-dionato Eu0.01, Y0.99
morpholinium tetrakis 3-ethylpentane-2,4-dionato Eu0.01, Y0.99
morpholinium tetrakis pivaloyltrifluoroacetonato Eu0.01, Y0.99
morpholinium tetrakis trifluoroacetylacetonato Eu0.01, Y0.99
morpholinium tetrakis hexafluoroacetylacetonato Eu0.01, Y0.99
morpholinium tetrakis 6,6,7,7,8,8,8-heptafluoro-2,2-dimethyloctanedionato Eu0.01, Y0.99
morpholinium tetrakis 1-phenyl-1,3-butanedionato Eu0.01, Y0.99
dimethylbenzylammonium tetrakis acetylacetonato Eu0.01, Y0.99
dimethylbenzylammonium tetrakis dibenzoylmethanato Eu0.01, Y0.99.
dimethylbenzylammonium tetrakis thenoyltrifluoroacetonato Eu0.01, Y0.99
dimethylbenzylammonium tetrakis 2,2,6,6-tetramethylheptanedionato Eu0.01, Y0.99
dimethylbenzylammonium tetrakis 3-methylpentane-2,4-dionato Eu0.01, Y0.99
dimethylbenzylammonium tetrakis 3-ethylpentane-2,4-dionato Eu0.01, Y0.99
dimethylbenzylammonium tetrakis pivaloyltrifluoroacetonato Eu0.01, Y0.99
dimethylbenzylammonium tetrakis trifluoroacetylacetonato Eu0.01, Y0.99
dimethylbenzylammonium tetrakis hexafluoroacetylacetonato Eu0.01, Y0.99
dimethylbenzylammonium tetrakis 6,6,7,7,8,8,8-heptafluoro-2,2-dimethyloctanedionato Eu0.01, Y0.99
dimethylbenzylammonium tetrakis 1-phenyl-1,3-butanedionato Eu0.01, Y0.99
triallylammonium tetrakis acetylacetonato Eu0.01, Y0.99
triallylammonium tetrakis dibenzoylmethanato Eu0.01, Y0.99
triallylammonium tetrakis thenoyltrifluoroacetonato Eu0.01, Y0.99
triallylammonium tetrakis 2,2,6,6-tetramethylheptanedionato Eu0.01, Y0.99
triallylammonium tetrakis 3-methylpentane-2,4-dionato Eu0.01, Y0.99
triallylammonium tetrakis 3-ethylpentane-2,4-dionato Eu0.01, Y0.99
triallylammonium tetrakis pivaloyltrifluoroacetonato Eu0.01, Y0.99 triallylammonium tetrakis trifluoroacetylacetonato Eu0.01, Y0.99
triallylammonium tetrakis hexafluoroacetylacetonato Eu0.01, Y0.99
triallylammonium tetrakis 6,6,7,7,8,8,8-heptafluoro-2,2-dimethyloctanedionato Eu0.01, Y0.99
triallylammonium tetrakis 1-phenyl-1,3-butanedionato Eu0.01, Y0.99
anilinium tetrakis acetylacetonato Eu0.01, Y0.99
anilinium tetrakis dibenzoylmethanato Eu0.01, Y0.99
anilinium tetrakis thenoyltrifluoroacetonato Eu0.01, Y0.99
anilinium tetrakis 2,2,6,6-tetramethylheptanedionato Eu0.01, Y0.99
anilinium tetrakis 3-methylpentane-2,4-dionato Eu0.01, Y0.99
anilinium tetrakis 3-ethylpentane-2,4-dionato Eu0.01, Y0.99
anilinium tetrakis pivaloyltrifluoroacetonato Eu0.01, Y0.99
anilinium tetrakis trifluoroacetylacetonato Eu0.01, Y0.99
anilinium tetrakis hexafluoroacetylacetonato Eu0.01, Y0.99
anilinium tetrakis 6,6,7,7,8,8,8-heptafluoro-2,2-dimethyloctanedionato Eu0.01, Y0.99
anilinium tetrakis 1-phenyl-1,3-butanedionato Eu0.01, Y0.99
triethylammonium tetrakis acetylacetonato Eu0.5, Y0.5
triethylammonium tetrakis dibenzoylmethanato Eu0.5, Y0.5
triethylammonium tetrakis thenoyltrifluoroacetonato Eu0.5, Y0.5
triethylammonium tetrakis 2,2,6,6-tetramethylheptanedionato Eu0.5, Y0.5
triethylammonium tetrakis 3-methylpentane-2,4-dionato Eu0.5, Y0.5
triethylammonium tetrakis 3-ethylpentane-2,4-dionato Eu0.5, Y0.5
triethylammonium tetrakis pivaloyltrifluoroacetonato Eu0.5, Y0.5
triethylammonium tetrakis trifluoroacetylacetonato Eu0.5, Y0.5
triethylammonium tetrakis hexafluoroacetylacetonato Eu0.5, Y0.5
triethylammonium tetrakis 6,6,7,7,8,8,8-heptafluoro-2,2-dimethyloctanedionato Eu0.5, Y0.5
triethylammonium tetrakis 1-phenyl-1,3-butanedionato Eu0.5, Y0.5
morpholinium tetrakis acetylacetonato Eu0.5, Y0.5
morpholinium tetrakis dibenzoylmethanato Eu0.5, Y0.5
morpholinium tetrakis thenoyltrifluoroacetonato Eu0.5, Y0.5
morpholinium tetrakis 2,2,6,6-tetramethylheptanedionato Eu0.5, Y0.5
morpholinium tetrakis 3-methylpentane-2,4-dionato Eu0.5, Y0.5
morpholinium tetrakis 3-ethylpentane-2,4-dionato Eu0.5, Y0.5
morpholinium tetrakis pivaloyltrifluoroacetonato Eu0.5, Y0.5
morpholinium tetrakis trifluoroacetylacetonato Eu0.5, Y0.5
morpholinium tetrakis hexafluoroacetylacetonato Eu0.5, Y0.5
morpholinium tetrakis 6,6,7,7,8,8,8-heptafluoro-2,2-dimethyloctanedionato Eu0.5, Y0.5
morpholinium tetrakis 1-phenyl-1,3-butanedionato Eu0.5, Y0.5
dimethylbenzylammonium tetrakis acetylacetonato Eu0.5, Y0.5
dimethylbenzylammonium tetrakis dibenzoylmethanato Eu0.5, Y0.5
dimethylbenzylammonium tetrakis thenoyltrifluoroacetonato Eu0.5, Y0.5
dimethylbenzylammonium tetrakis 2,2,6,6-tetramethylheptanedionato Eu0.5, Y0.5
dimethylbenzylammonium tetrakis 3-methylpentane-2,4-dionato Eu0.5, Y0.5
dimethylbenzylammonium tetrakis 3-ethylpentane-2,4-dionato Eu0.5, Y0.5
dimethylbenzylammonium tetrakis pivaloyltrifluoroacetonato Eu0.5, Y0.5
dimethylbenzylammonium tetrakis trifluoroacetylacetonato Eu0.5, Y0.5
dimethylbenzylammonium tetrakis hexafluoroacetylacetonato Eu0.5, Y0.5
dimethylbenzylammonium tetrakis 6,6,7,7,8,8,8-heptafluoro-2,2-dimethyloctanedionato Eu0.5, Y0.5
dimethylbenzylammonium tetrakis 1-phenyl-1,3-butanedionato Eu0.5, Y0.5
triallylammonium tetrakis acetylacetonato Eu0.5, Y0.5
triallylammonium tetrakis dibenzoylmethanato Eu0.5, Y0.5
triallylammonium tetrakis thenoyltrifluoroacetonato Eu0.5, Y0.5
triallylammonium tetrakis 2,2,6,6-tetramethylheptanedionato Eu0.5, Y0.5
triallylammonium tetrakis 3-methylpentane-2,4-dionato Eu0.5, Y0.5
triallylammonium tetrakis 3-ethylpentane-2,4-dionato Eu0.5, Y0.5
triallylammonium tetrakis pivaloyltrifluoroacetonato Eu0.5, Y0.5
triallylammonium tetrakis trifluoroacetylacetonato Eu0.5, Y0.5
triallylammonium tetrakis hexafluoroacetylacetonato Eu0.5, Y0.5
triallylammonium tetrakis 6,6,7,7,8,8,8-heptafluoro-2,2-dimethyloctanedionato Eu0.5, Y0.5
triallylammonium tetrakis 1-phenyl-1,3-butanedionato Eu0.5, Y0.5
anilinium tetrakis acetylacetonato Eu0.5, Y0.5
anilinium tetrakis dibenzoylmethanato Eu0.5, Y0.5
anilinium tetrakis thenoyltrifluoroacetonato Eu0.5, Y0.5
anilinium tetrakis 2,2,6,6-tetramethylheptanedionato Eu0.5, Y0.5
anilinium tetrakis 3-methylpentane-2,4-dionato Eu0.5, Y0.5
anilinium tetrakis 3-ethylpentane-2,4-dionato Eu0.5, Y0.5
anilinium tetrakis pivaloyltrifluoroacetonato Eu0.5, Y0.5
anilinium tetrakis trifluoroacetylacetonato Eu0.5, Y0.5
anilinium tetrakis hexafluoroacetylacetonato Eu0.5, Y0.5
anilinium tetrakis 6,6,7,7,8,8,8-heptafluoro-2,2-dimethyloctanedionato Eu0.5, Y0.5
anilinium tetrakis 1-phenyl-1,3-butanedionato Eu0.5, Y0.5
triethylammonium tetrakis acetylacetonato Eu0.2, Y0.8
triethylammonium tetrakis dibenzoylmethanato Eu0.2, Y0.8
triethylammonium tetrakis thenoyltrifluoroacetonato Eu0.2, Y0.8
triethylammonium tetrakis 2,2,6,6-tetramethylheptanedionato Eu0.2, Y0.8
triethylammonium tetrakis 3-methylpentane-2,4-dionato Eu0.2, Y0.8
triethylammonium tetrakis 3-ethylpentane-2,4-dionato Eu0.2, Y0.8
triethylammonium tetrakis pivaloyltrifluoroacetonato Eu0.2, Y0.8
triethylammonium tetrakis trifluoroacetylacetonato Eu0.2, Y0.8
triethylammonium tetrakis hexafluoroacetylacetonato Eu0.2, Y0.8 triethylammonium tetrakis 6,6,7,7,8,8,8-heptafluoro-2,2-dimethyloctanedionato Eu0.2, Y0.8
triethylammonium tetrakis 1-phenyl-1,3-butanedionato Eu0.2, Y0.8
morpholinium tetrakis acetylacetonato Eu0.2, Y0.8
morpholinium tetrakis dibenzoylmethanato Eu0.2, Y0.8
morpholinium tetrakis thenoyltrifluoroacetonato Eu0.2, Y0.8
morpholinium tetrakis 2,2,6,6-tetramethylheptanedionato Eu0.2, Y0.8
morpholinium tetrakis 3-methylpentane-2,4-dionato Eu0.2, Y0.8
morpholinium tetrakis 3-ethylpentane-2,4-dionato Eu0.2, Y0.8
morpholinium tetrakis pivaloyltrifluoroacetonato Eu0.2, Y0.8
morpholinium tetrakis trifluoroacetylacetonato Eu0.2, Y0.8
morpholinium tetrakis hexafluoroacetylacetonato Eu0.2, Y0.8
morpholinium tetrakis 6,6,7,7,8,8,8-heptafluoro-2,2-dimethyloctanedionato Eu0.2, Y0.8
morpholinium tetrakis 1-phenyl-1,3-butanedionato Eu0.2, Y0.8
dimethylbenzylammonium tetrakis acetylacetonato Eu0.2, Y0.8
dimethylbenzylammonium tetrakis dibenzoylmethanato Eu0.2, Y0.8
dimethylbenzylammonium tetrakis thenoyltrifluoroacetonato Eu0.2, Y0.8
dimethylbenzylammonium tetrakis 2,2,6,6-tetramethylheptanedionato Eu0.2, Y0.8
dimethylbenzylammonium tetrakis 3-methylpentane-2,4-dionato Eu0.2, Y0.8
dimethylbenzylammonium tetrakis 3-ethylpentane-2,4-dionato Eu0.2, Y0.8
dimethylbenzylammonium tetrakis pivaloyltrifluoroacetonato Eu0.2, Y0.8
dimethylbenzylammonium tetrakis trifluoroacetylacetonato Eu0.2, Y0.8
dimethylbenzylammonium tetrakis hexafluoroacetylacetonato Eu0.2, Y0.8
dimethylbenzylammonium tetrakis 6,6,7,7,8,8,8-heptafluoro-2,2-dimethyloctanedionato Eu0.2, Y0.8
dimethylbenzylammonium tetrakis 1-phenyl-1,3-butanedionato Eu0.2, Y0.8
triallylammonium tetrakis acetylacetonato Eu0.2, Y0.8
triallylammonium tetrakis dibenzoylmethanato Eu0.2, Y0.8
triallylammonium tetrakis thenoyltrifluoroacetonato Eu0.2, Y0.8
triallylammonium tetrakis 2,2,6,6-tetramethylheptanedionato Eu0.2, Y0.8
triallylammonium tetrakis 3-methylpentane-2,4-dionato Eu0.2, Y0.8
triallylammonium tetrakis 3-ethylpentane-2,4-dionato Eu0.2, Y0.8
triallylammonium tetrakis pivaloyltrifluoroacetonato Eu0.2, Y0.8
triallylammonium tetrakis trifluoroacetylacetonato Eu0.2, Y0.8
triallylammonium tetrakis hexafluoroacetylacetonato Eu0.2, Y0.8
triallylammonium tetrakis 6,6,7,7,8,8,8-heptafluoro-2,2-dimethyloctanedionato Eu0.2, Y0.8
triallylammonium tetrakis 1-phenyl-1,3-butanedionato Eu0.2, Y0.8
anilinium tetrakis acetylacetonato Eu0.2, Y0.8
anilinium tetrakis dibenzoylmethanato Eu0.2, Y0.8
anilinium tetrakis thenoyltrifluoroacetonato Eu0.2, Y0.8
anilinium tetrakis 2,2,6,6-tetramethylheptanedionato Eu0.2, Y0.8
anilinium tetrakis 3-methylpentane-2,4-dionato Eu0.2, Y0.8
anilinium tetrakis 3-ethylpentane-2,4-dionato Eu0.2, Y0.8
anilinium tetrakis pivaloyltrifluoroacetonato Eu0.2, Y0.8
anilinium tetrakis trifluoroacetylacetonato Eu0.2, Y0.8
anilinium tetrakis hexafluoroacetylacetonato Eu0.2, Y0.8
anilinium tetrakis 6,6,7,7,8,8,8-heptafluoro-2,2-dimethyloctanedionato Eu0.2, Y0.8
anilinium tetrakis 1-phenyl-1,3-butanedionato Eu0.2, Y0.8
triethylammonium tetrakis acetylacetonato Eu0.1, Y0.9
triethylammonium tetrakis dibenzoylmethanato Eu0.1, Y0.9
triethylammonium tetrakis thenoyltrifluoroacetonato Eu0.1, Y0.9
triethylammonium tetrakis 2,2,6,6-tetramethylheptanedionato Eu0.1, Y0.9
triethylammonium tetrakis 3-methylpentane-2,4-dionato Eu0.1, Y0.9
triethylammonium tetrakis 3-ethylpentane-2,4-dionato Eu0.1, Y0.9
triethylammonium tetrakis pivaloyltrifluoroacetonato Eu0.1, Y0.9
triethylammonium tetrakis trifluoroacetylacetonato Eu0.1, Y0.9
triethylammonium tetrakis hexafluoroacetylacetonato Eu0.1, Y0.9
triethylammonium tetrakis 6,6,7,7,8,8,8-heptafluoro-2,2-dimethyloctanedionato Eu0.1, Y0.9
triethylammonium tetrakis 1-phenyl-1,3-butanedionato Eu0.1, Y0.9
morpholinium tetrakis acetylacetonato Eu0.1, Y0.9
morpholinium tetrakis dibenzoylmethanato Eu0.1, Y0.9
morpholinium tetrakis thenoyltrifluoroacetonato Eu0.1, Y0.9
morpholinium tetrakis 2,2,6,6-tetramethylheptanedionato Eu0.1, Y0.9
morpholinium tetrakis 3-methylpentane-2,4-dionato Eu0.1, Y0.9
morpholinium tetrakis 3-ethylpentane-2,4-dionato Eu0.1, Y0.9
morpholinium tetrakis pivaloyltrifluoroacetonato Eu0.1, Y0.9
morpholinium tetrakis trifluoroacetylacetonato Eu0.1, Y0.9
morpholinium tetrakis hexafluoroacetylacetonato Eu0.1, Y0.9
morpholinium tetrakis 6,6,7,7,8,8,8-heptafluoro-2,2-dimethyloctanedionato Eu0.1, Y0.9
morpholinium tetrakis 1-phenyl-1,3-butanedionato Eu0.1, Y0.9
dimethylbenzylammonium tetrakis acetylacetonato Eu0.1, Y0.9
dimethylbenzylammonium tetrakis dibenzoylmethanato Eu0.1, Y0.9
dimethylbenzylammonium tetrakis thenoyltrifluoroacetonato Eu0.1, Y0.9
dimethylbenzylammonium tetrakis 2,2,6,6-tetramethylheptanedionato Eu0.1, Y0.9
dimethylbenzylammonium tetrakis 3-methylpentane-2,4-dionato Eu0.1, Y0.9
dimethylbenzylammonium tetrakis 3-ethylpentane-2,4-dionato Eu0.1, Y0.9
dimethylbenzylammonium tetrakis pivaloyltrifluoroacetonato Eu0.1, Y0.9
dimethylbenzylammonium tetrakis trifluoroacetylacetonato Eu0.1, Y0.9 dimethylbenzylammonium tetrakis hexafluoroacetylacetonato Eu0.1, Y0.9
dimethylbenzylammonium tetrakis 6,6,7,7,8,8,8-heptafluoro-2,2-dimethyloctanedionato Eu0.1, Y0.9
dimethylbenzylammonium tetrakis 1-phenyl-1,3-butanedionato Eu0.1, Y0.9
triallylammonium tetrakis acetylacetonato Eu0.1, Y0.9
triallylammonium tetrakis dibenzoylmethanato Eu0.1, Y0.9
triallylammonium tetrakis thenoyltrifluoroacetonato Eu0.1, Y0.9
triallylammonium tetrakis 2,2,6,6-tetramethylheptanedionato Eu0.1, Y0.9
triallylammonium tetrakis 3-methylpentane-2,4-dionato Eu0.1, Y0.9
triallylammonium tetrakis 3-ethylpentane-2,4-dionato Eu0.1, Y0.9
triallylammonium tetrakis pivaloyltrifluoroacetonato Eu0.1, Y0.9
triallylammonium tetrakis trifluoroacetylacetonato Eu0.1, Y0.9
triallylammonium tetrakis hexafluoroacetylacetonato Eu0.1, Y0.9
triallylammonium tetrakis 6,6,7,7,8,8,8-heptafluoro-2,2-dimethyloctanedionato Eu0.1, Y0.9
triallylammonium tetrakis 1-phenyl-1,3-butanedionato Eu0.1, Y0.9
anilinium tetrakis acetylacetonato Eu0.1, Y0.9
anilinium tetrakis dibenzoylmethanato Eu0.1, Y0.9
anilinium tetrakis thenoyltrifluoroacetonato Eu0.1, Y0.9
anilinium tetrakis 2,2,6,6-tetramethylheptanedionato Eu0.1, Y0.9
anilinium tetrakis 3-methylpentane-2,4-dionato Eu0.1, Y0.9
anilinium tetrakis 3-ethylpentane-2,4-dionato Eu0.1, Y0.9
anilinium tetrakis pivaloyltrifluoroacetonato Eu0.1, Y0.9
anilinium tetrakis trifluoroacetylacetonato Eu0.1, Y0.9
anilinium tetrakis hexafluoroacetylacetonato Eu0.1, Y0.9
anilinium tetrakis 6,6,7,7,8,8,8-heptafluoro-2,2-dimethyloctanedionato Eu0.1, Y0.9
anilinium tetrakis 1-phenyl-1,3-butanedionato Eu0.1, Y0.9
triethylammonium tetrakis acetylacetonato Eu0.01, Y0.99
triethylammonium tetrakis dibenzoylmethanato Eu0.01, Y0.99
triethylammonium tetrakis thenoyltrifluoroacetonato Eu0.01, Y0.99
triethylammonium tetrakis 2,2,6,6-tetramethylheptanedionato Eu0.01, Y0.99
triethylammonium tetrakis 3-methylpentane-2,4-dionato Eu0.01, Y0.99
triethylammonium tetrakis 3-ethylpentane-2,4-dionato Eu0.01, Y0.99
triethylammonium tetrakis pivaloyltrifluoroacetonato Eu0.01, Y0.99
triethylammonium tetrakis trifluoroacetylacetonato Eu0.01, Y0.99
triethylammonium tetrakis hexafluoroacetylacetonato Eu0.01, Y0.99
triethylammonium tetrakis 6,6,7,7,8,8,8-heptafluoro-2,2-dimethyloctanedionato Eu0.01, Y0.99
triethylammonium tetrakis 1-phenyl-1,3-butanedionato Eu0.01, Y0.99
morpholinium tetrakis acetylacetonato Eu0.01, Y0.99
morpholinium tetrakis dibenzoylmethanato Eu0.01, Y0.99
morpholinium tetrakis thenoyltrifluoroacetonato Eu0.01, Y0.99
morpholinium tetrakis 2,2,6,6-tetramethylheptanedionato Eu0.01, Y0.99
morpholinium tetrakis 3-methylpentane-2,4-dionato Eu0.01, Y0.99
morpholinium tetrakis 3-ethylpentane-2,4-dionato Eu0.01, Y0.99
morpholinium tetrakis pivaloyltrifluoroacetonato Eu0.01, Y0.99
morpholinium tetrakis trifluoroacetylacetonato Eu0.01, Y0.99
morpholinium tetrakis hexafluoroacetylacetonato Eu0.01, Y0.99
morpholinium tetrakis 6,6,7,7,8,8,8-heptafluoro-2,2-dimethyloctanedionato Eu0.01, Y0.99
morpholinium tetrakis 1-phenyl-1,3-butanedionato Eu0.01, Y0.99
dimethylbenzylammonium tetrakis acetylacetonato Eu0.01, Y0.99
dimethylbenzylammonium tetrakis dibenzoylmethanato Eu0.01, Y0.99
dimethylbenzylammonium tetrakis thenoyltrifluoroacetonato Eu0.01, Y0.99
dimethylbenzylammonium tetrakis 2,2,6,6-tetramethylheptanedionato Eu0.01, Y0.99
dimethylbenzylammonium tetrakis 3-methylpentane-2,4-dionato Eu0.01, Y0.99
dimethylbenzylammonium tetrakis 3-ethylpentane-2,4-dionato Eu0.01, Y0.99
dimethylbenzylammonium tetrakis pivaloyltrifluoroacetonato Eu0.01, Y0.99
dimethylbenzylammonium tetrakis trifluoroacetylacetonato Eu0.01, Y0.99
dimethylbenzylammonium tetrakis hexafluoroacetylacetonato Eu0.01, Y0.99
dimethylbenzylammonium tetrakis 6,6,7,7,8,8,8-heptafluoro-2,2-dimethyloctanedionato Eu0.01, Y0.99
dimethylbenzylammonium tetrakis 1-phenyl-1,3-butanedionato Eu0.01, Y0.99
triallylammonium tetrakis acetylacetonato Eu0.01, Y0.99
triallylammonium tetrakis dibenzoylmethanato Eu0.01, Y0.99
triallylammonium tetrakis thenoyltrifluoroacetonato Eu0.01, Y0.99
triallylammonium tetrakis 2,2,6,6-tetramethylheptanedionato Eu0.01, Y0.99
triallylammonium tetrakis 3-methylpentane-2,4-dionato Eu0.01, Y0.99
triallylammonium tetrakis 3-ethylpentane-2,4-dionato Eu0.01, Y0.99
triallylammonium tetrakis pivaloyltrifluoroacetonato Eu0.01, Y0.99
triallylammonium tetrakis trifluoroacetylacetonato Eu0.01, Y0.99
triallylammonium tetrakis hexafluoroacetylacetonato Eu0.01, Y0.99
triallylammonium tetrakis 6,6,7,7,8,8,8-heptafluoro-2,2-dimethyloctanedionato Eu0.01, Y0.99
triallylammonium tetrakis 1-phenyl-1,3-butanedionato Eu0.01, Y0.99
anilinium tetrakis acetylacetonato Eu0.01, Y0.99
anilinium tetrakis dibenzoylmethanato Eu0.01, Y0.99
anilinium tetrakis thenoyltrifluoroacetonato Eu0.01, Y0.99
anilinium tetrakis 2,2,6,6-tetramethylheptanedionato Eu0.01, Y0.99
anilinium tetrakis 3-methylpentane-2,4-dionato Eu0.01, Y0.99
anilinium tetrakis 3-ethylpentane-2,4-dionato Eu0.01, Y0.99
anilinium tetrakis pivaloyltrifluoroacetonato Eu0.01, Y0.99
anilinium tetrakis trifluoroacetylacetonato Eu0.01, Y0.99 anilinium tetrakis hexafluoroacetylacetonato Eu0.01, Y0.99
anilinium tetrakis 6,6,7,7,8,8,8-heptafluoro-2,2-dimethyloctanedionato Eu0.01, Y0.99
anilinium tetrakis 1-phenyl-1,3-butanedionato Eu0.01, Y0.99
triethylammonium tetrakis acetylacetonato Tb0.5, La0.5
triethylammonium tetrakis dibenzoylmethanato Tb0.5, La0.5
triethylammonium tetrakis thenoyltrifluoroacetonato Tb0.5, La0.5
triethylammonium tetrakis 2,2,6,6-tetramethylheptanedionato Tb0.5, La0.5
triethylammonium tetrakis 3-methylpentane-2,4-dionato Tb0.5, La0.5
triethylammonium tetrakis 3-ethylpentane-2,4-dionato Tb0.5, La0.5
triethylammonium tetrakis pivaloyltrifluoroacetonato Tb0.5, La0.5
triethylammonium tetrakis trifluoroacetylacetonato Tb0.5, La0.5
triethylammonium tetrakis hexafluoroacetylacetonato Tb0.5, La0.5
triethylammonium tetrakis 6,6,7,7,8,8,8-heptafluoro-2,2-dimethyloctanedionato Tb0.5, La0.5
triethylammonium tetrakis 1-phenyl-1,3-butanedionato Tb0.5, La0.5
morpholinium tetrakis acetylacetonato Tb0.5, La0.5
morpholinium tetrakis dibenzoylmethanato Tb0.5, La0.5
morpholinium tetrakis thenoyltrifluoroacetonato Tb0.5, La0.5
morpholinium tetrakis 2,2,6,6-tetramethylheptanedionato Tb0.5, La0.5
morpholinium tetrakis 3-methylpentane-2,4-dionato Tb0.5, La0.5
morpholinium tetrakis 3-ethylpentane-2,4-dionato Tb0.5, La0.5
morpholinium tetrakis pivaloyltrifluoroacetonato Tb0.5, La0.5
morpholinium tetrakis trifluoroacetylacetonato Tb0.5, La0.5
morpholinium tetrakis hexafluoroacetylacetonato Tb0.5, La0.5
morpholinium tetrakis 6,6,7,7,8,8,8-heptafluoro-2,2-dimethyloctanedionato Tb0.5, La0.5
morpholinium tetrakis 1-phenyl-1,3-butanedionato Tb0.5, La0.5
dimethylbenzylammonium tetrakis acetylacetonato Tb0.5, La0.5
dimethylbenzylammonium tetrakis dibenzoylmethanato Tb0.5, La0.5
dimethylbenzylammonium tetrakis thenoyltrifluoroacetonato Tb0.5, La0.5
dimethylbenzylammonium tetrakis 2,2,6,6-tetramethylheptanedionato Tb0.5, La0.5
dimethylbenzylammonium tetrakis 3-methylpentane-2,4-dionato Tb0.5, La0.5
dimethylbenzylammonium tetrakis 3-ethylpentane-2,4-dionato Tb0.5, La0.5
dimethylbenzylammonium tetrakis pivaloyltrifluoroacetonato Tb0.5, La0.5
dimethylbenzylammonium tetrakis trifluoroacetylacetonato Tb0.5, La0.5
dimethylbenzylammonium tetrakis hexafluoroacetylacetonato Tb0.5, La0.5
dimethylbenzylammonium tetrakis 6,6,7,7,8,8,8-heptafluoro-2,2-dimethyloctanedionato Tb0.5, La0.5
dimethylbenzylammonium tetrakis 1-phenyl-1,3-butanedionato Tb0.5, La0.5
triallylammonium tetrakis acetylacetonato Tb0.5, La0.5
triallylammonium tetrakis dibenzoylmethanato Tb0.5, La0.5
triallylammonium tetrakis thenoyltrifluoroacetonato Tb0.5, La0.5
triallylammonium tetrakis 2,2,6,6-tetramethylheptanedionato Tb0.5, La0.5
triallylammonium tetrakis 3-methylpentane-2,4-dionato Tb0.5, La0.5
triallylammonium tetrakis 3-ethylpentane-2,4-dionato Tb0.5, La0.5
triallylammonium tetrakis pivaloyltrifluoroacetonato Tb0.5, La0.5
triallylammonium tetrakis trifluoroacetylacetonato Tb0.5, La0.5
triallylammonium tetrakis hexafluoroacetylacetonato Tb0.5, La0.5
triallylammonium tetrakis 6,6,7,7,8,8,8-heptafluoro-2,2-dimethyloctanedionato Tb0.5, La0.5
triallylammonium tetrakis 1-phenyl-1,3-butanedionato Tb0.5, La0.5
anilinium tetrakis acetylacetonato Tb0.5, La0.5
anilinium tetrakis dibenzoylmethanato Tb0.5, La0.5
anilinium tetrakis thenoyltrifluoroacetonato Tb0.5, La0.5
anilinium tetrakis 2,2,6,6-tetramethylheptanedionato Tb0.5, La0.5
anilinium tetrakis 3-methylpentane-2,4-dionato Tb0.5, La0.5
anilinium tetrakis 3-ethylpentane-2,4-dionato Tb0.5, La0.5
anilinium tetrakis pivaloyltrifluoroacetonato Tb0.5, La0.5
anilinium tetrakis trifluoroacetylacetonato Tb0.5, La0.5
anilinium tetrakis hexafluoroacetylacetonato Tb0.5, La0.5
anilinium tetrakis 6,6,7,7,8,8,8-heptafluoro-2,2-dimethyloctanedionato Tb0.5, La0.5
anilinium tetrakis 1-phenyl-1,3-butanedionato Tb0.5, La0.5
triethylammonium tetrakis acetylacetonato Tb0.2, La0.8
triethylammonium tetrakis dibenzoylmethanato Tb0.2, La0.8
triethylammonium tetrakis thenoyltrifluoroacetonato Tb0.2, La0.8
triethylammonium tetrakis 2,2,6,6-tetramethylheptanedionato Tb0.2, La0.8
triethylammonium tetrakis 3-methylpentane-2,4-dionato Tb0.2, La0.8
triethylammonium tetrakis 3-ethylpentane-2,4-dionato Tb0.2, La0.8
triethylammonium tetrakis pivaloyltrifluoroacetonato Tb0.2, La0.8
triethylammonium tetrakis trifluoroacetylacetonato Tb0.2, La0.8
triethylammonium tetrakis hexafluoroacetylacetonato Tb0.2, La0.8
triethylammonium tetrakis 6,6,7,7,8,8,8-heptafluoro-2,2-dimethyloctanedionato Tb0.2, La0.8
triethylammonium tetrakis 1-phenyl-1,3-butanedionato Tb0.2, La0.8
morpholinium tetrakis acetylacetonato Tb0.2, La0.8
morpholinium tetrakis dibenzoylmethanato Tb0.2, La0.8
morpholinium tetrakis thenoyltrifluoroacetonato Tb0.2, La0.8
morpholinium tetrakis 2,2,6,6-tetramethylheptanedionato Tb0.2, La0.8
morpholinium tetrakis 3-methylpentane-2,4-dionato Tb0.2, La0.8
morpholinium tetrakis 3-ethylpentane-2,4-dionato Tb0.2, La0.8
morpholinium tetrakis pivaloyltrifluoroacetonato Tb0.2, La0.8 morpholinium tetrakis trifluoroacetylacetonato Tb0.2, La0.8
morpholinium tetrakis hexafluoroacetylacetonato Tb0.2, La0.8
morpholinium tetrakis 6,6,7,7,8,8,8-heptafluoro-2,2-dimethyloctanedionato Tb0.2, La0.8
morpholinium tetrakis 1-phenyl-1,3-butanedionato Tb0.2, La0.8
dimethylbenzylammonium tetrakis acetylacetonato Tb0.2, La0.8
dimethylbenzylammonium tetrakis dibenzoylmethanato Tb0.2, La0.8
dimethylbenzylammonium tetrakis thenoyltrifluoroacetonato Tb0.2, La0.8
dimethylbenzylammonium tetrakis 2,2,6,6-tetramethylheptanedionato Tb0.2, La0.8
dimethylbenzylammonium tetrakis 3-methylpentane-2,4-dionato Tb0.2, La0.8
dimethylbenzylammonium tetrakis 3-ethylpentane-2,4-dionato Tb0.2, La0.8
dimethylbenzylammonium tetrakis pivaloyltrifluoroacetonato Tb0.2, La0.8
dimethylbenzylammonium tetrakis trifluoroacetylacetonato Tb0.2, La0.8
dimethylbenzylammonium tetrakis hexafluoroacetylacetonato Tb0.2, La0.8
dimethylbenzylammonium tetrakis 6,6,7,7,8,8,8-heptafluoro-2,2-dimethyloctanedionato Tb0.2, La0.8
dimethylbenzylammonium tetrakis 1-phenyl-1,3-butanedionato Tb0.2, La0.8
triallylammonium tetrakis acetylacetonato Tb0.2, La0.8
triallylammonium tetrakis dibenzoylmethanato Tb0.2, La0.8
triallylammonium tetrakis thenoyltrifluoroacetonato Tb0.2, La0.8
triallylammonium tetrakis 2,2,6,6-tetramethylheptanedionato Tb0.2, La0.8
triallylammonium tetrakis 3-methylpentane-2,4-dionato Tb0.2, La0.8
triallylammonium tetrakis 3-ethylpentane-2,4-dionato Tb0.2, La0.8
triallylammonium tetrakis pivaloyltrifluoroacetonato Tb0.2, La0.8
triallylammonium tetrakis trifluoroacetylacetonato Tb0.2, La0.8
triallylammonium tetrakis hexafluoroacetylacetonato Tb0.2, La0.8
triallylammonium tetrakis 6,6,7,7,8,8,8-heptafluoro-2,2-dimethyloctanedionato Tb0.2, La0.8
triallylammonium tetrakis 1-phenyl-1,3-butanedionato Tb0.2, La0.8
anilinium tetrakis acetylacetonato Tb0.2, La0.8
anilinium tetrakis dibenzoylmethanato Tb0.2, La0.8
anilinium tetrakis thenoyltrifluoroacetonato Tb0.2, La0.8
anilinium tetrakis 2,2,6,6-tetramethylheptanedionato Tb0.2, La0.8
anilinium tetrakis 3-methylpentane-2,4-dionato Tb0.2, La0.8
anilinium tetrakis 3-ethylpentane-2,4-dionato Tb0.2, La0.8
anilinium tetrakis pivaloyltrifluoroacetonato Tb0.2, La0.8
anilinium tetrakis trifluoroacetylacetonato Tb0.2, La0.8
anilinium tetrakis hexafluoroacetylacetonato Tb0.2, La0.8
anilinium tetrakis 6,6,7,7,8,8,8-heptafluoro-2,2-dimethyloctanedionato Tb0.2, La0.8
anilinium tetrakis 1-phenyl-1,3-butanedionato Tb0.2, La0.8
triethylammonium tetrakis acetylacetonato Tb0.1, La0.9
triethylammonium tetrakis dibenzoylmethanato Tb0.1, La0.9
triethylammonium tetrakis thenoyltrifluoroacetonato Tb0.1, La0.9
triethylammonium tetrakis 2,2,6,6-tetramethylheptanedionato Tb0.1, La0.9
triethylammonium tetrakis 3-methylpentane-2,4-dionato Tb0.1, La0.9
triethylammonium tetrakis 3-ethylpentane-2,4-dionato Tb0.1, La0.9
triethylammonium tetrakis pivaloyltrifluoroacetonato Tb0.1, La0.9
triethylammonium tetrakis trifluoroacetylacetonato Tb0.1, La0.9
triethylammonium tetrakis hexafluoroacetylacetonato Tb0.1, La0.9
triethylammonium tetrakis 6,6,7,7,8,8,8-heptafluoro-2,2-dimethyloctanedionato Tb0.1, La0.9
triethylammonium tetrakis 1-phenyl-1,3-butanedionato Tb0.1, La0.9
morpholinium tetrakis acetylacetonato Tb0.1, La0.9
morpholinium tetrakis dibenzoylmethanato Tb0.1, La0.9
morpholinium tetrakis thenoyltrifluoroacetonato Tb0.1, La0.9
morpholinium tetrakis 2,2,6,6-tetramethylheptanedionato Tb0.1, La0.9
morpholinium tetrakis 3-methylpentane-2,4-dionato Tb0.1, La0.9
morpholinium tetrakis 3-ethylpentane-2,4-dionato Tb0.1, La0.9
morpholinium tetrakis pivaloyltrifluoroacetonato Tb0.1, La0.9
morpholinium tetrakis trifluoroacetylacetonato Tb0.1, La0.9
morpholinium tetrakis hexafluoroacetylacetonato Tb0.1, La0.9
morpholinium tetrakis 6,6,7,7,8,8,8-heptafluoro-2,2-dimethyloctanedionato Tb0.1, La0.9
morpholinium tetrakis 1-phenyl-1,3-butanedionato Tb0.1, La0.9
dimethylbenzylammonium tetrakis acetylacetonato Tb0.1, La0.9
dimethylbenzylammonium tetrakis dibenzoylmethanato Tb0.1, La0.9
dimethylbenzylammonium tetrakis thenoyltrifluoroacetonato Tb0.1, La0.9
dimethylbenzylammonium tetrakis 2,2,6,6-tetramethylheptanedionato Tb0.1, La0.9
dimethylbenzylammonium tetrakis 3-methylpentane-2,4-dionato Tb0.1, La0.9
dimethylbenzylammonium tetrakis 3-ethylpentane-2,4-dionato Tb0.1, La0.9
dimethylbenzylammonium tetrakis pivaloyltrifluoroacetonato Tb0.1, La0.9
dimethylbenzylammonium tetrakis trifluoroacetylacetonato Tb0.1, La0.9
dimethylbenzylammonium tetrakis hexafluoroacetylacetonato Tb0.1, La0.9
dimethylbenzylammonium tetrakis 6,6,7,7,8,8,8-heptafluoro-2,2-dimethyloctanedionato Tb0.1, La0.9
dimethylbenzylammonium tetrakis 1-phenyl-1,3-butanedionato Tb0.1, La0.9
triallylammonium tetrakis acetylacetonato Tb0.1, La0.9
triallylammonium tetrakis dibenzoylmethanato Tb0.1, La0.9
triallylammonium tetrakis thenoyltrifluoroacetonato Tb0.1, La0.9
triallylammonium tetrakis 2,2,6,6-tetramethylheptanedionato Tb0.1, La0.9
triallylammonium tetrakis 3-methylpentane-2,4-dionato Tb0.1, La0.9 triallylammonium tetrakis 3-ethylpentane-2,4-dionato Tb0.1, La0.9
triallylammonium tetrakis pivaloyltrifluoroacetonato Tb0.1, La0.9
triallylammonium tetrakis trifluoroacetylacetonato Tb0.1, La0.9
triallylammonium tetrakis hexafluoroacetylacetonato Tb0.1, La0.9
triallylammonium tetrakis 6,6,7,7,8,8,8-heptafluoro-2,2-dimethyloctanedionato Tb0.1, La0.9
triallylammonium tetrakis 1-phenyl-1,3-butanedionato Tb0.1, La0.9
anilinium tetrakis acetylacetonato Tb0.1, La0.9
anilinium tetrakis dibenzoylmethanato Tb0.1, La0.9
anilinium tetrakis thenoyltrifluoroacetonato Tb0.1, La0.9
anilinium tetrakis 2,2,6,6-tetramethylheptanedionato Tb0.1, La0.9
anilinium tetrakis 3-methylpentane-2,4-dionato Tb0.1, La0.9
anilinium tetrakis 3-ethylpentane-2,4-dionato Tb0.1, La0.9
anilinium tetrakis pivaloyltrifluoroacetonato Tb0.1, La0.9
anilinium tetrakis trifluoroacetylacetonato Tb0.1, La0.9
anilinium tetrakis hexafluoroacetylacetonato Tb0.1, La0.9
anilinium tetrakis 6,6,7,7,8,8,8-heptafluoro-2,2-dimethyloctanedionato Tb0.1, La0.9
anilinium tetrakis 1-phenyl-1,3-butanedionato Tb0.1, La0.9
triethylammonium tetrakis acetylacetonato Tb0.01, La0.99
triethylammonium tetrakis dibenzoylmethanato Tb0.01, La0.99
triethylammonium tetrakis thenoyltrifluoroacetonato Tb0.01, La0.99
triethylammonium tetrakis 2,2,6,6-tetramethylheptanedionato Tb0.01, La0.99
triethylammonium tetrakis 3-methylpentane-2,4-dionato Tb0.01, La0.99
triethylammonium tetrakis 3-ethylpentane-2,4-dionato Tb0.01, La0.99
triethylammonium tetrakis pivaloyltrifluoroacetonato Tb0.01, La0.99
triethylammonium tetrakis trifluoroacetylacetonato Tb0.01, La0.99
triethylammonium tetrakis hexafluoroacetylacetonato Tb0.01, La0.99
triethylammonium tetrakis 6,6,7,7,8,8,8-heptafluoro-2,2-dimethyloctanedionato Tb0.01, La0.99
triethylammonium tetrakis 1-phenyl-1,3-butanedionato Tb0.01, La0.99
morpholinium tetrakis acetylacetonato Tb0.01, La0.99
morpholinium tetrakis dibenzoylmethanato Tb0.01, La0.99
morpholinium tetrakis thenoyltrifluoroacetonato Tb0.01, La0.99
morpholinium tetrakis 2,2,6,6-tetramethylheptanedionato Tb0.01, La0.99
morpholinium tetrakis 3-methylpentane-2,4-dionato Tb0.01, La0.99
morpholinium tetrakis 3-ethylpentane-2,4-dionato Tb0.01, La0.99
morpholinium tetrakis pivaloyltrifluoroacetonato Tb0.01, La0.99
morpholinium tetrakis trifluoroacetylacetonato Tb0.01, La0.99
morpholinium tetrakis hexafluoroacetylacetonato Tb0.01, La0.99
morpholinium tetrakis 6,6,7,7,8,8,8-heptafluoro-2,2-dimethyloctanedionato Tb0.01, La0.99
morpholinium tetrakis 1-phenyl-1,3-butanedionato Tb0.01, La0.99
dimethylbenzylammonium tetrakis acetylacetonato Tb0.01, La0.99
dimethylbenzylammonium tetrakis dibenzoylmethanato Tb0.01, La0.99
dimethylbenzylammonium tetrakis thenoyltrifluoroacetonato Tb0.01, La0.99
dimethylbenzylammonium tetrakis 2,2,6,6-tetramethylheptanedionato Tb0.01, La0.99
dimethylbenzylammonium tetrakis 3-methylpentane-2,4-dionato Tb0.01, La0.99
dimethylbenzylammonium tetrakis 3-ethylpentane-2,4-dionato Tb0.01, La0.99
dimethylbenzylammonium tetrakis pivaloyltrifluoroacetonato Tb0.01, La0.99
dimethylbenzylammonium tetrakis trifluoroacetylacetonato Tb0.01, La0.99
dimethylbenzylammonium tetrakis hexafluoroacetylacetonato Tb0.01, La0.99
dimethylbenzylammonium tetrakis 6,6,7,7,8,8,8-heptafluoro-2,2-dimethyloctanedionato Tb0.01, La0.99
dimethylbenzylammonium tetrakis 1-phenyl-1,3-butanedionato Tb0.01, La0.99
triallylammonium tetrakis acetylacetonato Tb0.01, La0.99
triallylammonium tetrakis dibenzoylmethanato Tb0.01, La0.99
triallylammonium tetrakis thenoyltrifluoroacetonato Tb0.01, La0.99
triallylammonium tetrakis 2,2,6,6-tetramethylheptanedionato Tb0.01, La0.99
triallylammonium tetrakis 3-methylpentane-2,4-dionato Tb0.01, La0.99
triallylammonium tetrakis 3-ethylpentane-2,4-dionato Tb0.01, La0.99
triallylammonium tetrakis pivaloyltrifluoroacetonato Tb0.01, La0.99
triallylammonium tetrakis trifluoroacetylacetonato Tb0.01, La0.99
triallylammonium tetrakis hexafluoroacetylacetonato Tb0.01, La0.99
triallylammonium tetrakis 6,6,7,7,8,8,8-heptafluoro-2,2-dimethyloctanedionato Tb0.01, La0.99
triallylammonium tetrakis 1-phenyl-1,3-butanedionato Tb0.01, La0.99
anilinium tetrakis acetylacetonato Tb0.01, La0.99
anilinium tetrakis dibenzoylmethanato Tb0.01, La0.99
anilinium tetrakis thenoyltrifluoroacetonato Tb0.01, La0.99
anilinium tetrakis 2,2,6,6-tetramethylheptanedionato Tb0.01, La0.99
anilinium tetrakis 3-methylpentane-2,4-dionato Tb0.01, La0.99
anilinium tetrakis 3-ethylpentane-2,4-dionato Tb0.01, La0.99
anilinium tetrakis pivaloyltrifluoroacetonato Tb0.01, La0.99.
anilinium tetrakis trifluoroacetylacetonato Tb0.01, La0.99
anilinium tetrakis hexafluoroacetylacetonato Tb0.01, La0.99
anilinium tetrakis 6,6,7,7,8,8,8-heptafluoro-2,2-dimethyloctanedionato Tb0.01, La0.99
anilinium tetrakis 1-phenyl-1,3-butanedionato Tb0.01, La0.99
triethylammonium tetrakis acetylacetonato Eu0.5, La0.5
triethylammonium tetrakis dibenzoylmethanato Eu0.5, La0.5
triethylammonium tetrakis thenoyltrifluoroacetonato Eu0.5, La0.5
triethylammonium tetrakis 2,2,6,6-tetramethylheptanedionato Eu0.5, La0.5 triethylammonium tetrakis 3-methylpentane-2,4-dionato Eu0.5, La0.5
triethylammonium tetrakis 3-ethylpentane-2,4-dionato Eu0.5, La0.5
triethylammonium tetrakis pivaloyltrifluoroacetonato Eu0.5, La0.5
triethylammonium tetrakis trifluoroacetylacetonato Eu0.5, La0.5
triethylammonium tetrakis hexafluoroacetylacetonato Eu0.5, La0.5
triethylammonium tetrakis 6,6,7,7,8,8,8-heptafluoro-2,2-dimethyloctanedionato Eu0.5, La0.5
triethylammonium tetrakis 1-phenyl-1,3-butanedionato Eu0.5, La0.5
morpholinium tetrakis acetylacetonato Eu0.5, La0.5
morpholinium tetrakis dibenzoylmethanato Eu0.5, La0.5
morpholinium tetrakis thenoyltrifluoroacetonato Eu0.5, La0.5
morpholinium tetrakis 2,2,6,6-tetramethylheptanedionato Eu0.5, La0.5
morpholinium tetrakis 3-methylpentane-2,4-dionato Eu0.5, La0.5
morpholinium tetrakis 3-ethylpentane-2,4-dionato Eu0.5, La0.5
morpholinium tetrakis pivaloyltrifluoroacetonato Eu0.5, La0.5
morpholinium tetrakis trifluoroacetylacetonato Eu0.5, La0.5
morpholinium tetrakis hexafluoroacetylacetonato Eu0.5, La0.5
morpholinium tetrakis 6,6,7,7,8,8,8-heptafluoro-2,2-dimethyloctanedionato Eu0.5, La0.5
morpholinium tetrakis 1-phenyl-1,3-butanedionato Eu0.5, La0.5
dimethylbenzylammonium tetrakis acetylacetonato Eu0.5, La0.5
dimethylbenzylammonium tetrakis dibenzoylmethanato Eu0.5, La0.5
dimethylbenzylammonium tetrakis thenoyltrifluoroacetonato Eu0.5, La0.5
dimethylbenzylammonium tetrakis 2,2,6,6-tetramethylheptanedionato Eu0.5, La0.5
dimethylbenzylammonium tetrakis 3-methylpentane-2,4-dionato Eu0.5, La0.5
dimethylbenzylammonium tetrakis 3-ethylpentane-2,4-dionato Eu0.5, La0.5
dimethylbenzylammonium tetrakis pivaloyltrifluoroacetonato Eu0.5, La0.5
dimethylbenzylammonium tetrakis trifluoroacetylacetonato Eu0.5, La0.5
dimethylbenzylammonium tetrakis hexafluoroacetylacetonato Eu0.5, La0.5
dimethylbenzylammonium tetrakis 6,6,7,7,8,8,8-heptafluoro-2,2-dimethyloctanedionato Eu0.5, La0.5
dimethylbenzylammonium tetrakis 1-phenyl-1,3-butanedionato Eu0.5, La0.5
triallylammonium tetrakis acetylacetonato Eu0.5, La0.5
triallylammonium tetrakis dibenzoylmethanato Eu0.5, La0.5
triallylammonium tetrakis thenoyltrifluoroacetonato Eu0.5, La0.5
triallylammonium tetrakis 2,2,6,6-tetramethylheptanedionato Eu0.5, La0.5
triallylammonium tetrakis 3-methylpentane-2,4-dionato Eu0.5, La0.5
triallylammonium tetrakis 3-ethylpentane-2,4-dionato Eu0.5, La0.5
triallylammonium tetrakis pivaloyltrifluoroacetonato Eu0.5, La0.5
triallylammonium tetrakis trifluoroacetylacetonato Eu0.5, La0.5
triallylammonium tetrakis hexafluoroacetylacetonato Eu0.5, La0.5
triallylammonium tetrakis 6,6,7,7,8,8,8-heptafluoro-2,2-dimethyloctanedionato Eu0.5, La0.5
triallylammonium tetrakis 1-phenyl-1,3-butanedionato Eu0.5, La0.5
anilinium tetrakis acetylacetonato Eu0.5, La0.5
anilinium tetrakis dibenzoylmethanato Eu0.5, La0.5
anilinium tetrakis thenoyltrifluoroacetonato Eu0.5, La0.5
anilinium tetrakis 2,2,6,6-tetramethylheptanedionato Eu0.5, La0.5
anilinium tetrakis 3-methylpentane-2,4-dionato Eu0.5, La0.5
anilinium tetrakis 3-ethylpentane-2,4-dionato Eu0.5, La0.5
anilinium tetrakis pivaloyltrifluoroacetonato Eu0.5, La0.5
anilinium tetrakis trifluoroacetylacetonato Eu0.5, La0.5
anilinium tetrakis hexafluoroacetylacetonato Eu0.5, La0.5
anilinium tetrakis 6,6,7,7,8,8,8-heptafluoro-2,2-dimethyloctanedionato Eu0.5, La0.5
anilinium tetrakis 1-phenyl-1,3-butanedionato Eu0.5, La0.5
triethylammonium tetrakis acetylacetonato Eu0.2, La0.8
triethylammonium tetrakis dibenzoylmethanato Eu0.2, La0.8
triethylammonium tetrakis thenoyltrifluoroacetonato Eu0.2, La0.8
triethylammonium tetrakis 2,2,6,6-tetramethylheptanedionato Eu0.2, La0.8
triethylammonium tetrakis 3-methylpentane-2,4-dionato Eu0.2, La0.8
triethylammonium tetrakis 3-ethylpentane-2,4-dionato Eu0.2, La0.8
triethylammonium tetrakis pivaloyltrifluoroacetonato Eu0.2, La0.8
triethylammonium tetrakis trifluoroacetylacetonato Eu0.2, La0.8
triethylammonium tetrakis hexafluoroacetylacetonato Eu0.2, La0.8
triethylammonium tetrakis 6,6,7,7,8,8,8-heptafluoro-2,2-dimethyloctanedionato Eu0.2, La0.8
triethylammonium tetrakis 1-phenyl-1,3-butanedionato Eu0.2, La0.8
morpholinium tetrakis acetylacetonato Eu0.2, La0.8
morpholinium tetrakis dibenzoylmethanato Eu0.2, La0.8
morpholinium tetrakis thenoyltrifluoroacetonato Eu0.2, La0.8
morpholinium tetrakis 2,2,6,6-tetramethylheptanedionato Eu0.2, La0.8
morpholinium tetrakis 3-methylpentane-2,4-dionato Eu0.2, La0.8
morpholinium tetrakis 3-ethylpentane-2,4-dionato Eu0.2, La0.8
morpholinium tetrakis pivaloyltrifluoroacetonato Eu0.2, La0.8
morpholinium tetrakis trifluoroacetylacetonato Eu0.2, La0.8
morpholinium tetrakis hexafluoroacetylacetonato Eu0.2, La0.8
morpholinium tetrakis 6,6,7,7,8,8,8-heptafluoro-2,2-dimethyloctanedionato Eu0.2, La0.8
morpholinium tetrakis 1-phenyl-1,3-butanedionato Eu0.2, La0.8
dimethylbenzylammonium tetrakis acetylacetonato Eu0.2, La0.8
dimethylbenzylammonium tetrakis dibenzoylmethanato Eu0.2, La0.8 dimethylbenzylammonium tetrakis thenoyltrifluoroacetonato Eu0.2, La0.8
dimethylbenzylammonium tetrakis 2,2,6,6-tetramethylheptanedionato Eu0.2, La0.8
dimethylbenzylammonium tetrakis 3-methylpentane-2,4-dionato Eu0.2, La0.8
dimethylbenzylammonium tetrakis 3-ethylpentane-2,4-dionato Eu0.2, La0.8
dimethylbenzylammonium tetrakis pivaloyltrifluoroacetonato Eu0.2, La0.8
dimethylbenzylammonium tetrakis trifluoroacetylacetonato Eu0.2, La0.8
dimethylbenzylammonium tetrakis hexafluoroacetylacetonato Eu0.2, La0.8
dimethylbenzylammonium tetrakis 6,6,7,7,8,8,8-heptafluoro-2,2-dimethyloctanedionato Eu0.2, La0.8
dimethylbenzylammonium tetrakis 1-phenyl-1,3-butanedionato Eu0.2, La0.8
triallylammonium tetrakis acetylacetonato Eu0.2, La0.8
triallylammonium tetrakis dibenzoylmethanato Eu0.2, La0.8
triallylammonium tetrakis thenoyltrifluoroacetonato Eu0.2, La0.8
triallylammonium tetrakis 2,2,6,6-tetramethylheptanedionato Eu0.2, La0.8
triallylammonium tetrakis 3-methylpentane-2,4-dionato Eu0.2, La0.8
triallylammonium tetrakis 3-ethylpentane-2,4-dionato Eu0.2, La0.8
triallylammonium tetrakis pivaloyltrifluoroacetonato Eu0.2, La0.8
triallylammonium tetrakis trifluoroacetylacetonato Eu0.2, La0.8
triallylammonium tetrakis hexafluoroacetylacetonato Eu0.2, La0.8
triallylammonium tetrakis 6,6,7,7,8,8,8-heptafluoro-2,2-dimethyloctanedionato Eu0.2, La0.8
triallylammonium tetrakis 1-phenyl-1,3-butanedionato Eu0.2, La0.8
anilinium tetrakis acetylacetonato Eu0.2, La0.8
anilinium tetrakis dibenzoylmethanato Eu0.2, La0.8
anilinium tetrakis thenoyltrifluoroacetonato. Eu0.2, La0.8
anilinium tetrakis 2,2,6,6-tetramethylheptanedionato Eu0.2, La0.8
anilinium tetrakis 3-methylpentane-2,4-dionato Eu0.2, La0.8
anilinium tetrakis 3-ethylpentane-2,4-dionato Eu0.2, La0.8
anilinium tetrakis pivaloyltrifluoroacetonato Eu0.2, La0.8
anilinium tetrakis trifluoroacetylacetonato Eu0.2, La0.8
anilinium tetrakis hexafluoroacetylacetonato Eu0.2, La0.8
anilinium tetrakis 6,6,7,7,8,8,8-heptafluoro-2,2-dimethyloctanedionato Eu0.2, La0.8
anilinium tetrakis 1-phenyl-1,3-butanedionato Eu0.2, La0.8
triethylammonium tetrakis acetylacetonato Eu0.1, La0.9
triethylammonium tetrakis dibenzoylmethanato Eu0.1, La0.9
triethylammonium tetrakis thenoyltrifluoroacetonato Eu0.1, La0.9
triethylammonium tetrakis 2,2,6,6-tetramethylheptanedionato Eu0.1, La0.9
triethylammonium tetrakis 3-methylpentane-2,4-dionato Eu0.1, La0.9
triethylammonium tetrakis 3-ethylpentane-2,4-dionato Eu0.1, La0.9
triethylammonium tetrakis pivaloyltrifluoroacetonato Eu0.1, La0.9
triethylammonium tetrakis trifluoroacetylacetonato Eu0.1, La0.9
triethylammonium tetrakis hexafluoroacetylacetonato Eu0.1, La0.9
triethylammonium tetrakis 6,6,7,7,8,8,8-heptafluoro-2,2-dimethyloctanedionato Eu0.1, La0.9
triethylammonium tetrakis 1-phenyl-1,3-butanedionato Eu0.1, La0.9
morpholinium tetrakis acetylacetonato Eu0.1, La0.9
morpholinium tetrakis dibenzoylmethanato Eu0.1, La0.9
morpholinium tetrakis thenoyltrifluoroacetonato Eu0.1, La0.9
morpholinium tetrakis 2,2,6,6-tetramethylheptanedionato Eu0.1, La0.9
morpholinium tetrakis 3-methylpentane-2,4-dionato Eu0.1, La0.9
morpholinium tetrakis 3-ethylpentane-2,4-dionato Eu0.1, La0.9
morpholinium tetrakis pivaloyltrifluoroacetonato Eu0.1, La0.9
morpholinium tetrakis trifluoroacetylacetonato Eu0.1, La0.9
morpholinium tetrakis hexafluoroacetylacetonato Eu0.1, La0.9
morpholinium tetrakis 6,6,7,7,8,8,8-heptafluoro-2,2-dimethyloctanedionato Eu0.1, La0.9
morpholinium tetrakis 1-phenyl-1,3-butanedionato Eu0.1, La0.9
dimethylbenzylammonium tetrakis acetylacetonato Eu0.1, La0.9
dimethylbenzylammonium tetrakis dibenzoylmethanato Eu0.1, La0.9
dimethylbenzylammonium tetrakis thenoyltrifluoroacetonato Eu0.1, La0.9
dimethylbenzylammonium tetrakis 2,2,6,6-tetramethylheptanedionato Eu0.1, La0.9
dimethylbenzylammonium tetrakis 3-methylpentane-2,4-dionato Eu0.1, La0.9
dimethylbenzylammonium tetrakis 3-ethylpentane-2,4-dionato Eu0.1, La0.9
dimethylbenzylammonium tetrakis pivaloyltrifluoroacetonato Eu0.1, La0.9
dimethylbenzylammonium tetrakis trifluoroacetylacetonato Eu0.1, La0.9
dimethylbenzylammonium tetrakis hexafluoroacetylacetonato Eu0.1, La0.9
dimethylbenzylammonium tetrakis 6,6,7,7,8,8,8-heptafluoro-2,2-dimethyloctanedionato Eu0.1, La0.9
dimethylbenzylammonium tetrakis 1-phenyl-1,3-butanedionato Eu0.1, La0.9
triallylammonium tetrakis acetylacetonato Eu0.1, La0.9
triallylammonium tetrakis dibenzoylmethanato Eu0.1, La0.9
triallylammonium tetrakis thenoyltrifluoroacetonato Eu0.1, La0.9
triallylammonium tetrakis 2,2,6,6-tetramethylheptanedionato Eu0.1, La0.9
triallylammonium tetrakis 3-methylpentane-2,4-dionato Eu0.1, La0.9
triallylammonium tetrakis 3-ethylpentane-2,4-dionato Eu0.1, La0.9
triallylammonium tetrakis pivaloyltrifluoroacetonato Eu0.1, La0.9
triallylammonium tetrakis trifluoroacetylacetonato Eu0.1, La0.9
triallylammonium tetrakis hexafluoroacetylacetonato Eu0.1, La0.9
triallylammonium tetrakis 6,6,7,7,8,8,8-heptafluoro-2,2-dimethyloctanedionato Eu0.1, La0.9
triallylammonium tetrakis 1-phenyl-1,3-butanedionato Eu0.1, La0.9 anilinium tetrakis acetylacetonato Eu0.1, La0.9
anilinium tetrakis dibenzoylmethanato Eu0.1, La0.9
anilinium tetrakis thenoyltrifluoroacetonato Eu0.1, La0.9
anilinium tetrakis 2,2,6,6-tetramethylheptanedionato Eu0.1, La0.9
anilinium tetrakis 3-methylpentane-2,4-dionato Eu0.1, La0.9
anilinium tetrakis 3-ethylpentane-2,4-dionato Eu0.1, La0.9
anilinium tetrakis pivaloyltrifluoroacetonato Eu0.1, La0.9
anilinium tetrakis trifluoroacetylacetonato Eu0.1, La0.9
anilinium tetrakis hexafluoroacetylacetonato Eu0.1, La0.9
anilinium tetrakis 6,6,7,7,8,8,8-heptafluoro-2,2-dimethyloctanedionato Eu0.1, La0.9
anilinium tetrakis 1-phenyl-1,3-butanedionato Eu0.1, La0.9
triethylammonium tetrakis acetylacetonato Eu0.01, La0.99
triethylammonium tetrakis dibenzoylmethanato Eu0.01, La0.99
triethylammonium tetrakis thenoyltrifluoroacetonato Eu0.01, La0.99
triethylammonium tetrakis 2,2,6,6-tetramethylheptanedionato Eu0.01, La0.99
triethylammonium tetrakis 3-methylpentane-2,4-dionato Eu0.01, La0.99
triethylammonium tetrakis 3-ethylpentane-2,4-dionato Eu0.01, La0.99
triethylammonium tetrakis pivaloyltrifluoroacetonato Eu0.01, La0.99
triethylammonium tetrakis trifluoroacetylacetonato Eu0.01, La0.99
triethylammonium tetrakis hexafluoroacetylacetonato Eu0.01, La0.99
triethylammonium tetrakis 6,6,7,7,8,8,8-heptafluoro-2,2-dimethyloctanedionato Eu0.01, La0.99
triethylammonium tetrakis 1-phenyl-1,3-butanedionato Eu0.01, La0.99
morpholinium tetrakis acetylacetonato Eu0.01, La0.99
morpholinium tetrakis dibenzoylmethanato Eu0.01, La0.99
morpholinium tetrakis thenoyltrifluoroacetonato Eu0.01, La0.99
morpholinium tetrakis 2,2,6,6-tetramethylheptanedionato Eu0.01, La0.99
morpholinium tetrakis 3-methylpentane-2,4-dionato Eu0.01, La0.99
morpholinium tetrakis 3-ethylpentane-2,4-dionato Eu0.01, La0.99
morpholinium tetrakis pivaloyltrifluoroacetonato Eu0.01, La0.99
morpholinium tetrakis trifluoroacetylacetonato Eu0.01, La0.99
morpholinium tetrakis hexafluoroacetylacetonato Eu0.01, La0.99
morpholinium tetrakis 6,6,7,7,8,8,8-heptafluoro-2,2-dimethyloctanedionato Eu0.01, La0.99
morpholinium tetrakis 1-phenyl-1,3-butanedionato Eu0.01, La0.99
dimethylbenzylammonium tetrakis acetylacetonato Eu0.01, La0.99
dimethylbenzylammonium tetrakis dibenzoylmethanato Eu0.01, La0.99
dimethylbenzylammonium tetrakis thenoyltrifluoroacetonato Eu0.01, La0.99
dimethylbenzylammonium tetrakis 2,2,6,6-tetramethylheptanedionato Eu0.01, La0.99
dimethylbenzylammonium tetrakis 3-methylpentane-2,4-dionato Eu0.01, La0.99
dimethylbenzylammonium tetrakis 3-ethylpentane-2,4-dionato Eu0.01, La0.99
dimethylbenzylammonium tetrakis pivaloyltrifluoroacetonato Eu0.01, La0.99
dimethylbenzylammonium tetrakis trifluoroacetylacetonato Eu0.01, La0.99
dimethylbenzylammonium tetrakis hexafluoroacetylacetonato Eu0.01, La0.99
dimethylbenzylammonium tetrakis 6,6,7,7,8,8,8-heptafluoro-2,2-dimethyloctanedionato Eu0.01, La0.99
dimethylbenzylammonium tetrakis 1-phenyl-1,3-butanedionato Eu0.01, La0.99
triallylammonium tetrakis acetylacetonato Eu0.01, La0.99
triallylammonium tetrakis dibenzoylmethanato Eu0.01, La0.99
triallylammonium tetrakis thenoyltrifluoroacetonato Eu0.01, La0.99
triallylammonium tetrakis 2,2,6,6-tetramethylheptanedionato Eu0.01, La0.99
triallylammonium tetrakis 3-methylpentane-2,4-dionato Eu0.01, La0.99
triallylammonium tetrakis 3-ethylpentane-2,4-dionato Eu0.01, La0.99
triallylammonium tetrakis pivaloyltrifluoroacetonato Eu0.01, La0.99
triallylammonium tetrakis trifluoroacetylacetonato Eu0.01, La0.99
triallylammonium tetrakis hexafluoroacetylacetonato Eu0.01, La0.99
triallylammonium tetrakis 6,6,7,7,8,8,8-heptafluoro-2,2-dimethyloctanedionato Eu0.01, La0.99
triallylammonium tetrakis 1-phenyl-1,3-butanedionato Eu0.01, La0.99
anilinium tetrakis acetylacetonato Eu0.01, La0.99
anilinium tetrakis dibenzoylmethanato Eu0.01, La0.99
anilinium tetrakis thenoyltrifluoroacetonato Eu0.01, La0.99
anilinium tetrakis 2,2,6,6-tetramethylheptanedionato Eu0.01, La0.99
anilinium tetrakis 3-methylpentane-2,4-dionato Eu0.01, La0.99
anilinium tetrakis 3-ethylpentane-2,4-dionato Eu0.01, La0.99
anilinium tetrakis pivaloyltrifluoroacetonato Eu0.01, La0.99
anilinium tetrakis trifluoroacetylacetonato Eu0.01, La0.99
anilinium tetrakis hexafluoroacetylacetonato Eu0.01, La0.99
anilinium tetrakis 6,6,7,7,8,8,8-heptafluoro-2,2-dimethyloctanedionato Eu0.01, La0.99
anilinium tetrakis 1-phenyl-1,3-butanedionato Eu0.01, La0.99
triethylammonium tetrakis acetylacetonato Eu0.5, La0.5
triethylammonium tetrakis dibenzoylmethanato Eu0.5, La0.5
triethylammonium tetrakis thenoyltrifluoroacetonato Eu0.5, La0.5
triethylammonium tetrakis 2,2,6,6-tetramethylheptanedionato Eu0.5, La0.5
triethylammonium tetrakis 3-methylpentane-2,4-dionato Eu0.5, La0.5
triethylammonium tetrakis 3-ethylpentane-2,4-dionato Eu0.5, La0.5
triethylammonium tetrakis pivaloyltrifluoroacetonato Eu0.5, La0.5
triethylammonium tetrakis trifluoroacetylacetonato Eu0.5, La0.5
triethylammonium tetrakis hexafluoroacetylacetonato Eu0.5, La0.5
triethylammonium tetrakis 6,6,7,7,8,8,8-heptafluoro-2,2-dimethyloctanedionato Eu0.5, La0.5 triethylammonium tetrakis 1-phenyl-1,3-butanedionato Eu0.5, La0.5
morpholinium tetrakis acetylacetonato Eu0.5, La0.5
morpholinium tetrakis dibenzoylmethanato Eu0.5, La0.5
morpholinium tetrakis thenoyltrifluoroacetonato Eu0.5, La0.5
morpholinium tetrakis 2,2,6,6-tetramethylheptanedionato Eu0.5, La0.5
morpholinium tetrakis 3-methylpentane-2,4-dionato Eu0.5, La0.5
morpholinium tetrakis 3-ethylpentane-2,4-dionato Eu0.5, La0.5
morpholinium tetrakis pivaloyltrifluoroacetonato Eu0.5, La0.5
morpholinium tetrakis trifluoroacetylacetonato Eu0.5, La0.5
morpholinium tetrakis hexafluoroacetylacetonato Eu0.5, La0.5
morpholinium tetrakis 6,6,7,7,8,8,8-heptafluoro-2,2-dimethyloctanedionato Eu0.5, La0.5
morpholinium tetrakis 1-phenyl-1,3-butanedionato Eu0.5, La0.5
dimethylbenzylammonium tetrakis acetylacetonato Eu0.5, La0.5
dimethylbenzylammonium tetrakis dibenzoylmethanato Eu0.5, La0.5
dimethylbenzylammonium tetrakis thenoyltrifluoroacetonato Eu0.5, La0.5
dimethylbenzylammonium tetrakis 2,2,6,6-tetramethylheptanedionato Eu0.5, La0.5
dimethylbenzylammonium tetrakis 3-methylpentane-2,4-dionato Eu0.5, La0.5
dimethylbenzylammonium tetrakis 3-ethylpentane-2,4-dionato Eu0.5, La0.5
dimethylbenzylammonium tetrakis pivaloyltrifluoroacetonato Eu0.5, La0.5
dimethylbenzylammonium tetrakis trifluoroacetylacetonato Eu0.5, La0.5
dimethylbenzylammonium tetrakis hexafluoroacetylacetonato Eu0.5, La0.5
dimethylbenzylammonium tetrakis 6,6,7,7,8,8,8-heptafluoro-2,2-dimethyloctanedionato Eu0.5, La0.5
dimethylbenzylammonium tetrakis 1-phenyl-1,3-butanedionato Eu0.5, La0.5
triallylammonium tetrakis acetylacetonato Eu0.5, La0.5
triallylammonium tetrakis dibenzoylmethanato Eu0.5, La0.5
triallylammonium tetrakis thenoyltrifluoroacetonato Eu0.5, La0.5
triallylammonium tetrakis 2,2,6,6-tetramethylheptanedionato Eu0.5, La0.5
triallylammonium tetrakis 3-methylpentane-2,4-dionato Eu0.5, La0.5
triallylammonium tetrakis 3-ethylpentane-2,4-dionato Eu0.5, La0.5
triallylammonium tetrakis pivaloyltrifluoroacetonato Eu0.5, La0.5
triallylammonium tetrakis trifluoroacetylacetonato Eu0.5, La0.5
triallylammonium tetrakis hexafluoroacetylacetonato Eu0.5, La0.5
triallylammonium tetrakis 6,6,7,7,8,8,8-heptafluoro-2,2-dimethyloctanedionato Eu0.5, La0.5
triallylammonium tetrakis 1-phenyl-1,3-butanedionato Eu0.5, La0.5
anilinium tetrakis acetylacetonato Eu0.5, La0.5
anilinium tetrakis dibenzoylmethanato Eu0.5, La0.5
anilinium tetrakis thenoyltrifluoroacetonato Eu0.5, La0.5
anilinium tetrakis 2,2,6,6-tetramethylheptanedionato Eu0.5, La0.5
anilinium tetrakis 3-methylpentane-2,4-dionato Eu0.5, La0.5
anilinium tetrakis 3-ethylpentane-2,4-dionato Eu0.5, La0.5
anilinium tetrakis pivaloyltrifluoroacetonato Eu0.5, La0.5
anilinium tetrakis trifluoroacetylacetonato Eu0.5, La0.5
anilinium tetrakis hexafluoroacetylacetonato Eu0.5, La0.5
anilinium tetrakis 6,6,7,7,8,8,8-heptafluoro-2,2-dimethyloctanedionato Eu0.5, La0.5
anilinium tetrakis 1-phenyl-1,3-butanedionato Eu0.5, La0.5
triethylammonium tetrakis acetylacetonato Eu0.2, La0.8
triethylammonium tetrakis dibenzoylmethanato Eu0.2, La0.8
triethylammonium tetrakis thenoyltrifluoroacetonato Eu0.2, La0.8
triethylammonium tetrakis 2,2,6,6-tetramethylheptanedionato Eu0.2, La0.8
triethylammonium tetrakis 3-methylpentane-2,4-dionato Eu0.2, La0.8
triethylammonium tetrakis 3-ethylpentane-2,4-dionato Eu0.2, La0.8
triethylammonium tetrakis pivaloyltrifluoroacetonato Eu0.2, La0.8
triethylammonium tetrakis trifluoroacetylacetonato Eu0.2, La0.8
triethylammonium tetrakis hexafluoroacetylacetonato Eu0.2, La0.8
triethylammonium tetrakis 6,6,7,7,8,8,8-heptafluoro-2,2-dimethyloctanedionato Eu0.2, La0.8
triethylammonium tetrakis 1-phenyl-1,3-butanedionato Eu0.2, La0.8
morpholinium tetrakis acetylacetonato Eu0.2, La0.8
morpholinium tetrakis dibenzoylmethanato Eu0.2, La0.8
morpholinium tetrakis thenoyltrifluoroacetonato Eu0.2, La0.8
morpholinium tetrakis 2,2,6,6-tetramethylheptanedionato Eu0.2, La0.8
morpholinium tetrakis 3-methylpentane-2,4-dionato Eu0.2, La0.8
morpholinium tetrakis 3-ethylpentane-2,4-dionato Eu0.2, La0.8
morpholinium tetrakis pivaloyltrifluoroacetonato Eu0.2, La0.8
morpholinium tetrakis trifluoroacetylacetonato Eu0.2, La0.8
morpholinium tetrakis hexafluoroacetylacetonato Eu0.2, La0.8
morpholinium tetrakis 6,6,7,7,8,8,8-heptafluoro-2,2-dimethyloctanedionato Eu0.2, La0.8
morpholinium tetrakis 1-phenyl-1,3-butanedionato Eu0.2, La0.8
dimethylbenzylammonium tetrakis acetylacetonato Eu0.2, La0.8
dimethylbenzylammonium tetrakis dibenzoylmethanato Eu0.2, La0.8
dimethylbenzylammonium tetrakis thenoyltrifluoroacetonato Eu0.2, La0.8
dimethylbenzylammonium tetrakis 2,2,6,6-tetramethylheptanedionato Eu0.2, La0.8
dimethylbenzylammonium tetrakis 3-methylpentane-2,4-dionato Eu0.2, La0.8
dimethylbenzylammonium tetrakis 3-ethylpentane-2,4-dionato Eu0.2, La0.8
dimethylbenzylammonium tetrakis pivaloyltrifluoroacetonato Eu0.2, La0.8
dimethylbenzylammonium tetrakis trifluoroacetylacetonato Eu0.2, La0.8 dimethylbenzylammonium tetrakis hexafluoroacetylacetonato Eu0.2, La0.8
dimethylbenzylammonium tetrakis 6,6,7,7,8,8,8-heptafluoro-2,2-dimethyloctanedionato Eu0.2, La0.8
dimethylbenzylammonium tetrakis 1-phenyl-1,3-butanedionato Eu0.2, La0.8
triallylammonium tetrakis acetylacetonato Eu0.2, La0.8
triallylammonium tetrakis dibenzoylmethanato Eu0.2, La0.8
triallylammonium tetrakis thenoyltrifluoroacetonato Eu0.2, La0.8
triallylammonium tetrakis 2,2,6,6-tetramethylheptanedionato Eu0.2, La0.8
triallylammonium tetrakis 3-methylpentane-2,4-dionato Eu0.2, La0.8
triallylammonium tetrakis 3-ethylpentane-2,4-dionato Eu0.2, La0.8
triallylammonium tetrakis pivaloyltrifluoroacetonato Eu0.2, La0.8
triallylammonium tetrakis trifluoroacetylacetonato Eu0.2, La0.8
triallylammonium tetrakis hexafluoroacetylacetonato Eu0.2, La0.8
triallylammonium tetrakis 6,6,7,7,8,8,8-heptafluoro-2,2-dimethyloctanedionato Eu0.2, La0.8
triallylammonium tetrakis 1-phenyl-1,3-butanedionato Eu0.2, La0.8
anilinium tetrakis acetylacetonato Eu0.2, La0.8
anilinium tetrakis dibenzoylmethanato Eu0.2, La0.8
anilinium tetrakis thenoyltrifluoroacetonato Eu0.2, La0.8
anilinium tetrakis 2,2,6,6-tetramethylheptanedionato Eu0.2, La0.8
anilinium tetrakis 3-methylpentane-2,4-dionato Eu0.2, La0.8
anilinium tetrakis 3-ethylpentane-2,4-dionato Eu0.2, La0.8
anilinium tetrakis pivaloyltrifluoroacetonato Eu0.2, La0.8
anilinium tetrakis trifluoroacetylacetonato Eu0.2, La0.8
anilinium tetrakis hexafluoroacetylacetonato Eu0.2, La0.8
anilinium tetrakis 6,6,7,7,8,8,8-heptafluoro-2,2-dimethyloctanedionato Eu0.2, La0.8
anilinium tetrakis 1-phenyl-1,3-butanedionato Eu0.2, La0.8
triethylammonium tetrakis acetylacetonato Eu0.1, La0.9
triethylammonium tetrakis dibenzoylmethanato Eu0.1, La0.9
triethylammonium tetrakis thenoyltrifluoroacetonato Eu0.1, La0.9
triethylammonium tetrakis 2,2,6,6-tetramethylheptanedionato Eu0.1, La0.9
triethylammonium tetrakis 3-methylpentane-2,4-dionato Eu0.1, La0.9
triethylammonium tetrakis 3-ethylpentane-2,4-dionato Eu0.1, La0.9
triethylammonium tetrakis pivaloyltrifluoroacetonato Eu0.1, La0.9
triethylammonium tetrakis trifluoroacetylacetonato Eu0.1, La0.9
triethylammonium tetrakis hexafluoroacetylacetonato Eu0.1, La0.9
triethylammonium tetrakis 6,6,7,7,8,8,8-heptafluoro-2,2-dimethyloctanedionato Eu0.1, La0.9
triethylammonium tetrakis 1-phenyl-1,3-butanedionato Eu0.1, La0.9
morpholinium tetrakis acetylacetonato Eu0.1, La0.9
morpholinium tetrakis dibenzoylmethanato Eu0.1, La0.9
morpholinium tetrakis thenoyltrifluoroacetonato Eu0.1, La0.9
morpholinium tetrakis 2,2,6,6-tetramethylheptanedionato Eu0.1, La0.9
morpholinium tetrakis 3-methylpentane-2,4-dionato Eu0.1, La0.9
morpholinium tetrakis 3-ethylpentane-2,4-dionato Eu0.1, La0.9
morpholinium tetrakis pivaloyltrifluoroacetonato Eu0.1, La0.9
morpholinium tetrakis trifluoroacetylacetonato Eu0.1, La0.9
morpholinium tetrakis hexafluoroacetylacetonato Eu0.1, La0.9
morpholinium tetrakis 6,6,7,7,8,8,8-heptafluoro-2,2-dimethyloctanedionato Eu0.1, La0.9
morpholinium tetrakis 1-phenyl-1,3-butanedionato Eu0.1, La0.9
dimethylbenzylammonium tetrakis acetylacetonato Eu0.1, La0.9
dimethylbenzylammonium tetrakis dibenzoylmethanato Eu0.1, La0.9
dimethylbenzylammonium tetrakis thenoyltrifluoroacetonato Eu0.1, La0.9
dimethylbenzylammonium tetrakis 2,2,6,6-tetramethylheptanedionato Eu0.1, La0.9
dimethylbenzylammonium tetrakis 3-methylpentane-2,4-dionato Eu0.1, La0.9
dimethylbenzylammonium tetrakis 3-ethylpentane-2,4-dionato Eu0.1, La0.9
dimethylbenzylammonium tetrakis pivaloyltrifluoroacetonato Eu0.1, La0.9
dimethylbenzylammonium tetrakis trifluoroacetylacetonato Eu0.1, La0.9
dimethylbenzylammonium tetrakis hexafluoroacetylacetonato Eu0.1, La0.9
dimethylbenzylammonium tetrakis 6,6,7,7,8,8,8-heptafluoro-2,2-dimethyloctanedionato Eu0.1, La0.9
dimethylbenzylammonium tetrakis 1-phenyl-1,3-butanedionato Eu0.1, La0.9
triallylammonium tetrakis acetylacetonato Eu0.1, La0.9
triallylammonium tetrakis dibenzoylmethanato Eu0.1, La0.9
triallylammonium tetrakis thenoyltrifluoroacetonato Eu0.1, La0.9
triallylammonium tetrakis 2,2,6,6-tetramethylheptanedionato Eu0.1, La0.9
triallylammonium tetrakis 3-methylpentane-2,4-dionato Eu0.1, La0.9
triallylammonium tetrakis 3-ethylpentane-2,4-dionato Eu0.1, La0.9
triallylammonium tetrakis pivaloyltrifluoroacetonato Eu0.1, La0.9
triallylammonium tetrakis trifluoroacetylacetonato Eu0.1, La0.9
triallylammonium tetrakis hexafluoroacetylacetonato Eu0.1, La0.9
triallylammonium tetrakis 6,6,7,7,8,8,8-heptafluoro-2,2-dimethyloctanedionato Eu0.1, La0.9
triallylammonium tetrakis 1-phenyl-1,3-butanedionato Eu0.1, La0.9
anilinium tetrakis acetylacetonato Eu0.1, La0.9
anilinium tetrakis dibenzoylmethanato Eu0.1, La0.9
anilinium tetrakis thenoyltrifluoroacetonato Eu0.1, La0.9
anilinium tetrakis 2,2,6,6-tetramethylheptanedionato Eu0.1, La0.9
anilinium tetrakis 3-methylpentane-2,4-dionato Eu0.1, La0.9
anilinium tetrakis 3-ethylpentane-2,4-dionato Eu0.1, La0.9
anilinium tetrakis pivaloyltrifluoroacetonato Eu0.1, La0.9
anilinium tetrakis trifluoroacetylacetonato Eu0.1, La0.9
anilinium tetrakis hexafluoroacetylacetonato Eu0.1, La0.9 anilinium tetrakis 6,6,7,7,8,8,8-heptafluoro-2,2-dimethyloctanedionato Eu0.1, La0.9
anilinium tetrakis 1-phenyl-1,3-butanedionato Eu0.1, La0.9
triethylammonium tetrakis acetylacetonato Eu0.01, La0.99
triethylammonium tetrakis dibenzoylmethanato Eu0.01, La0.99
triethylammonium tetrakis thenoyltrifluoroacetonato Eu0.01, La0.99
triethylammonium tetrakis 2,2,6,6-tetramethylheptanedionato Eu0.01, La0.99
triethylammonium tetrakis 3-methylpentane-2,4-dionato Eu0.01, La0.99
triethylammonium tetrakis 3-ethylpentane-2,4-dionato Eu0.01, La0.99
triethylammonium tetrakis pivaloyltrifluoroacetonato Eu0.01, La0.99
triethylammonium tetrakis trifluoroacetylacetonato Eu0.01, La0.99
triethylammonium tetrakis hexafluoroacetylacetonato Eu0.01, La0.99
triethylammonium tetrakis 6,6,7,7,8,8,8-heptafluoro-2,2-dimethyloctanedionato Eu0.01, La0.99
triethylammonium tetrakis 1-phenyl-1,3-butanedionato Eu0.01, La0.99
morpholinium tetrakis acetylacetonato Eu0.01, La0.99
morpholinium tetrakis dibenzoylmethanato Eu0.01, La0.99
morpholinium tetrakis thenoyltrifluoroacetonato Eu0.01, La0.99
morpholinium tetrakis 2,2,6,6-tetramethylheptanedionato Eu0.01, La0.99
morpholinium tetrakis 3-methylpentane-2,4-dionato Eu0.01, La0.99
morpholinium tetrakis 3-ethylpentane-2,4-dionato Eu0.01, La0.99
morpholinium tetrakis pivaloyltrifluoroacetonato Eu0.01, La0.99
morpholinium tetrakis trifluoroacetylacetonato Eu0.01, La0.99
morpholinium tetrakis hexafluoroacetylacetonato Eu0.01, La0.99
morpholinium tetrakis 6,6,7,7,8,8,8-heptafluoro-2,2-dimethyloctanedionato Eu0.01, La0.99
morpholinium tetrakis 1-phenyl-1,3-butanedionato Eu0.01, La0.99
dimethylbenzylammonium tetrakis acetylacetonato Eu0.01, La0.99
dimethylbenzylammonium tetrakis dibenzoylmethanato Eu0.01, La0.99
dimethylbenzylammonium tetrakis thenoyltrifluoroacetonato Eu0.01, La0.99
dimethylbenzylammonium tetrakis 2,2,6,6-tetramethylheptanedionato Eu0.01, La0.99
dimethylbenzylammonium tetrakis 3-methylpentane-2,4-dionato Eu0.01, La0.99
dimethylbenzylammonium tetrakis 3-ethylpentane-2,4-dionato Eu0.01, La0.99
dimethylbenzylammonium tetrakis pivaloyltrifluoroacetonato Eu0.01, La0.99
dimethylbenzylammonium tetrakis trifluoroacetylacetonato Eu0.01, La0.99
dimethylbenzylammonium tetrakis hexafluoroacetylacetonato Eu0.01, La0.99
dimethylbenzylammonium tetrakis 6,6,7,7,8,8,8-heptafluoro-2,2-dimethyloctanedionato Eu0.01, La0.99
dimethylbenzylammonium tetrakis 1-phenyl-1,3-butanedionato Eu0.01, La0.99
triallylammonium tetrakis acetylacetonato Eu0.01, La0.99
triallylammonium tetrakis dibenzoylmethanato Eu0.01, La0.99
triallylammonium tetrakis thenoyltrifluoroacetonato Eu0.01, La0.99
triallylammonium tetrakis 2,2,6,6-tetramethylheptanedionato Eu0.01, La0.99
triallylammonium tetrakis 3-methylpentane-2,4-dionato Eu0.01, La0.99
triallylammonium tetrakis 3-ethylpentane-2,4-dionato Eu0.01, La0.99
triallylammonium tetrakis pivaloyltrifluoroacetonato Eu0.01, La0.99
triallylammonium tetrakis trifluoroacetylacetonato Eu0.01, La0.99
triallylammonium tetrakis hexafluoroacetylacetonato Eu0.01, La0.99
triallylammonium tetrakis 6,6,7,7,8,8,8-heptafluoro-2,2-dimethyloctanedionato Eu0.01, La0.99
triallylammonium tetrakis 1-phenyl-1,3-butanedionato Eu0.01, La0.99
anilinium tetrakis acetylacetonato Eu0.01, La0.99
anilinium tetrakis dibenzoylmethanato Eu0.01, La0.99
anilinium tetrakis thenoyltrifluoroacetonato Eu0.01, La0.99
anilinium tetrakis 2,2,6,6-tetramethylheptanedionato Eu0.01, La0.99
anilinium tetrakis 3-methylpentane-2,4-dionato Eu0.01, La0.99
anilinium tetrakis 3-ethylpentane-2,4-dionato Eu0.01, La0.99
anilinium tetrakis pivaloyltrifluoroacetonato Eu0.01, La0.99
anilinium tetrakis trifluoroacetylacetonato Eu0.01, La0.99
anilinium tetrakis hexafluoroacetylacetonato Eu0.01, La0.99
anilinium tetrakis 6,6,7,7,8,8,8-heptafluoro-2,2-dimethyloctanedionato Eu0.01, La0.99
anilinium tetrakis 1-phenyl-1,3-butanedionato Eu0.01, La0.99
triethylammonium tetrakis acetylacetonato Tb0.5, Gd0.5
triethylammonium tetrakis dibenzoylmethanato Tb0.5, Gd0.5
triethylammonium tetrakis thenoyltrifluoroacetonato Tb0.5, Gd0.5
triethylammonium tetrakis 2,2,6,6-tetramethylheptanedionato Tb0.5, Gd0.5
triethylammonium tetrakis 3-methylpentane-2,4-dionato Tb0.5, Gd0.5
triethylammonium tetrakis 3-ethylpentane-2,4-dionato Tb0.5, Gd0.5
triethylammonium tetrakis pivaloyltrifluoroacetonato Tb0.5, Gd0.5
triethylammonium tetrakis trifluoroacetylacetonato Tb0.5, Gd0.5
triethylammonium tetrakis hexafluoroacetylacetonato Tb0.5, Gd0.5
triethylammonium tetrakis 6,6,7,7,8,8,8-heptafluoro-2,2-dimethyloctanedionato Tb0.5, Gd0.5
triethylammonium tetrakis 1-phenyl-1,3-butanedionato Tb0.5, Gd0.5
morpholinium tetrakis acetylacetonato Tb0.5, Gd0.5
morpholinium tetrakis dibenzoylmethanato Tb0.5, Gd0.5
morpholinium tetrakis thenoyltrifluoroacetonato Tb0.5, Gd0.5
morpholinium tetrakis 2,2,6,6-tetramethylheptanedionato Tb0.5, Gd0.5
morpholinium tetrakis 3-methylpentane-2,4-dionato Tb0.5, Gd0.5
morpholinium tetrakis 3-ethylpentane-2,4-dionato Tb0.5, Gd0.5 morpholinium tetrakis pivaloyltrifluoroacetonato Tb0.5, Gd0.5
morpholinium tetrakis trifluoroacetylacetonato Tb0.5, Gd0.5
morpholinium tetrakis hexafluoroacetylacetonato Tb0.5, Gd0.5
morpholinium tetrakis 6,6,7,7,8,8,8-heptafluoro-2,2-dimethyloctanedionato Tb0.5, Gd0.5
morpholinium tetrakis 1-phenyl-1,3-butanedionato Tb0.5, Gd0.5
dimethylbenzylammonium tetrakis acetylacetonato Tb0.5, Gd0.5
dimethylbenzylammonium tetrakis dibenzoylmethanato Tb0.5, Gd0.5
dimethylbenzylammonium tetrakis thenoyltrifluoroacetonato Tb0.5, Gd0.5
dimethylbenzylammonium tetrakis 2,2,6,6-tetramethylheptanedionato Tb0.5, Gd0.5
dimethylbenzylammonium tetrakis 3-methylpentane-2,4-dionato Tb0.5, Gd0.5
dimethylbenzylammonium tetrakis 3-ethylpentane-2,4-dionato Tb0.5, Gd0.5
dimethylbenzylammonium tetrakis pivaloyltrifluoroacetonato Tb0.5, Gd0.5
dimethylbenzylammonium tetrakis trifluoroacetylacetonato Tb0.5, Gd0.5
dimethylbenzylammonium tetrakis hexafluoroacetylacetonato Tb0.5, Gd0.5
dimethylbenzylammonium tetrakis 6,6,7,7,8,8,8-heptafluoro-2,2-dimethyloctanedionato Tb0.5, Gd0.5
dimethylbenzylammonium tetrakis 1-phenyl-1,3-butanedionato Tb0.5, Gd0.5
triallylammonium tetrakis acetylacetonato Tb0.5, Gd0.5
triallylammonium tetrakis dibenzoylmethanato Tb0.5, Gd0.5
triallylammonium tetrakis thenoyltrifluoroacetonato Tb0.5, Gd0.5
triallylammonium tetrakis 2,2,6,6-tetramethylheptanedionato Tb0.5, Gd0.5
triallylammonium tetrakis 3-methylpentane-2,4-dionato Tb0.5, Gd0.5
triallylammonium tetrakis 3-ethylpentane-2,4-dionato Tb0.5, Gd0.5
triallylammonium tetrakis pivaloyltrifluoroacetonato Tb0.5, Gd0.5
triallylammonium tetrakis trifluoroacetylacetonato Tb0.5, Gd0.5
triallylammonium tetrakis hexafluoroacetylacetonato Tb0.5, Gd0.5
triallylammonium tetrakis 6,6,7,7,8,8,8-heptafluoro-2,2-dimethyloctanedionato Tb0.5, Gd0.5
triallylammonium tetrakis 1-phenyl-1,3-butanedionato Tb0.5, Gd0.5
anilinium tetrakis acetylacetonato Tb0.5, Gd0.5
anilinium tetrakis dibenzoylmethanato Tb0.5, Gd0.5
anilinium tetrakis thenoyltrifluoroacetonato Tb0.5, Gd0.5
anilinium tetrakis 2,2,6,6-tetramethylheptanedionato Tb0.5, Gd0.5
anilinium tetrakis 3-methylpentane-2,4-dionato Tb0.5, Gd0.5
anilinium tetrakis 3-ethylpentane-2,4-dionato Tb0.5, Gd0.5
anilinium tetrakis pivaloyltrifluoroacetonato Tb0.5, Gd0.5
anilinium tetrakis trifluoroacetylacetonato Tb0.5, Gd0.5
anilinium tetrakis hexafluoroacetylacetonato Tb0.5, Gd0.5
anilinium tetrakis 6,6,7,7,8,8,8-heptafluoro-2,2-dimethyloctanedionato Tb0.5, Gd0.5
anilinium tetrakis 1-phenyl-1,3-butanedionato Tb0.5, Gd0.5
triethylammonium tetrakis acetylacetonato Tb0.2, Gd0.8
triethylammonium tetrakis dibenzoylmethanato Tb0.2, Gd0.8
triethylammonium tetrakis thenoyltrifluoroacetonato Tb0.2, Gd0.8
triethylammonium tetrakis 2,2,6,6-tetramethylheptanedionato Tb0.2, Gd0.8
triethylammonium tetrakis 3-methylpentane-2,4-dionato Tb0.2, Gd0.8
triethylammonium tetrakis 3-ethylpentane-2,4-dionato Tb0.2, Gd0.8
triethylammonium tetrakis pivaloyltrifluoroacetonato Tb0.2, Gd0.8
triethylammonium tetrakis trifluoroacetylacetonato Tb0.2, Gd0.8
triethylammonium tetrakis hexafluoroacetylacetonato Tb0.2, Gd0.8
triethylammonium tetrakis 6,6,7,7,8,8,8-heptafluoro-2,2-dimethyloctanedionato Tb0.2, Gd0.8
triethylammonium tetrakis 1-phenyl-1,3-butanedionato Tb0.2, Gd0.8
morpholinium tetrakis acetylacetonato Tb0.2, Gd0.8
morpholinium tetrakis dibenzoylmethanato Tb0.2, Gd0.8
morpholinium tetrakis thenoyltrifluoroacetonato Tb0.2, Gd0.8
morpholinium tetrakis 2,2,6,6-tetramethylheptanedionato Tb0.2, Gd0.8
morpholinium tetrakis 3-methylpentane-2,4-dionato Tb0.2, Gd0.8
morpholinium tetrakis 3-ethylpentane-2,4-dionato Tb0.2, Gd0.8
morpholinium tetrakis pivaloyltrifluoroacetonato Tb0.2, Gd0.8
morpholinium tetrakis trifluoroacetylacetonato Tb0.2, Gd0.8
morpholinium tetrakis hexafluoroacetylacetonato Tb0.2, Gd0.8
morpholinium tetrakis 6,6,7,7,8,8,8-heptafluoro-2,2-dimethyloctanedionato Tb0.2, Gd0.8
morpholinium tetrakis 1-phenyl-1,3-butanedionato Tb0.2, Gd0.8
dimethylbenzylammonium tetrakis acetylacetonato Tb0.2, Gd0.8
dimethylbenzylammonium tetrakis dibenzoylmethanato Tb0.2, Gd0.8
dimethylbenzylammonium tetrakis thenoyltrifluoroacetonato Tb0.2, Gd0.8
dimethylbenzylammonium tetrakis 2,2,6,6-tetramethylheptanedionato Tb0.2, Gd0.8
dimethylbenzylammonium tetrakis 3-methylpentane-2,4-dionato Tb0.2, Gd0.8
dimethylbenzylammonium tetrakis 3-ethylpentane-2,4-dionato Tb0.2, Gd0.8
dimethylbenzylammonium tetrakis pivaloyltrifluoroacetonato Tb0.2, Gd0.8
dimethylbenzylammonium tetrakis trifluoroacetylacetonato Tb0.2, Gd0.8
dimethylbenzylammonium tetrakis hexafluoroacetylacetonato Tb0.2, Gd0.8
dimethylbenzylammonium tetrakis 6,6,7,7,8,8,8-heptafluoro-2,2-dimethyloctanedionato Tb0.2, Gd0.8
dimethylbenzylammonium tetrakis 1-phenyl-1,3-butanedionato Tb0.2, Gd0.8
triallylammonium tetrakis acetylacetonato Tb0.2, Gd0.8
triallylammonium tetrakis dibenzoylmethanato Tb0.2, Gd0.8 triallylammonium tetrakis thenoyltrifluoroacetonato Tb0.2, Gd0.8
triallylammonium tetrakis 2,2,6,6-tetramethylheptanedionato Tb0.2, Gd0.8
triallylammonium tetrakis 3-methylpentane-2,4-dionato Tb0.2, Gd0.8
triallylammonium tetrakis 3-ethylpentane-2,4-dionato Tb0.2, Gd0.8
triallylammonium tetrakis pivaloyltrifluoroacetonato Tb0.2, Gd0.8
triallylammonium tetrakis trifluoroacetylacetonato Tb0.2, Gd0.8
triallylammonium tetrakis hexafluoroacetylacetonato Tb0.2, Gd0.8
triallylammonium tetrakis 6,6,7,7,8,8,8-heptafluoro-2,2-dimethyloctanedionato Tb0.2, Gd0.8
triallylammonium tetrakis 1-phenyl-1,3-butanedionato Tb0.2, Gd0.8
anilinium tetrakis acetylacetonato Tb0.2, Gd0.8
anilinium tetrakis dibenzoylmethanato Tb0.2, Gd0.8
anilinium tetrakis thenoyltrifluoroacetonato Tb0.2, Gd0.8
anilinium tetrakis 2,2,6,6-tetramethylheptanedionato Tb0.2, Gd0.8
anilinium tetrakis 3-methylpentane-2,4-dionato Tb0.2, Gd0.8
anilinium tetrakis 3-ethylpentane-2,4-dionato Tb0.2, Gd0.8
anilinium tetrakis pivaloyltrifluoroacetonato Tb0.2, Gd0.8
anilinium tetrakis trifluoroacetylacetonato Tb0.2, Gd0.8
anilinium tetrakis hexafluoroacetylacetonato Tb0.2, Gd0.8
anilinium tetrakis 6,6,7,7,8,8,8-heptafluoro-2,2-dimethyloctanedionato Tb0.2, Gd0.8
anilinium tetrakis 1-phenyl-1,3-butanedionato Tb0.2, Gd0.8
triethylammonium tetrakis acetylacetonato Tb0.1, Gd0.9
triethylammonium tetrakis thenoyltrifluoroacetonato Tb0.1, Gd0.9
triethylammonium tetrakis 2,2,6,6-tetramethylheptanedionato Tb0.1, Gd0.9
triethylammonium tetrakis 3-methylpentane-2,4-dionato Tb0.1, Gd0.9
triethylammonium tetrakis 3-ethylpentane-2,4-dionato Tb0.1, Gd0.9
triethylammonium tetrakis pivaloyltrifluoroacetonato Tb0.1, Gd0.9
triethylammonium tetrakis trifluoroacetylacetonato Tb0.1, Gd0.9
triethylammonium tetrakis hexafluoroacetylacetonato Tb0.1, Gd0.9
triethylammonium tetrakis 6,6,7,7,8,8,8-heptafluoro-2,2-dimethyloctanedionato Tb0.1, Gd0.9
triethylammonium tetrakis 1-phenyl-1,3-butanedionato Tb0.1, Gd0.9
morpholinium tetrakis acetylacetonato Tb0.1, Gd0.9
morpholinium tetrakis dibenzoylmethanato Tb0.1, Gd0.9
morpholinium tetrakis thenoyltrifluoroacetonato Tb0.1, Gd0.9
morpholinium tetrakis 2,2,6,6-tetramethylheptanedionato Tb0.1, Gd0.9
morpholinium tetrakis 3-methylpentane-2,4-dionato Tb0.1, Gd0.9
morpholinium tetrakis 3-ethylpentane-2,4-dionato Tb0.1, Gd0.9
morpholinium tetrakis pivaloyltrifluoroacetonato Tb0.1, Gd0.9
morpholinium tetrakis trifluoroacetylacetonato Tb0.1, Gd0.9
morpholinium tetrakis hexafluoroacetylacetonato Tb0.1, Gd0.9
morpholinium tetrakis 6,6,7,7,8,8,8-heptafluoro-2,2-dimethyloctanedionato Tb0.1, Gd0.9
morpholinium tetrakis 1-phenyl-1,3-butanedionato Tb0.1, Gd0.9
dimethylbenzylammonium tetrakis acetylacetonato Tb0.1, Gd0.9
dimethylbenzylammonium tetrakis dibenzoylmethanato Tb0.1, Gd0.9
dimethylbenzylammonium tetrakis thenoyltrifluoroacetonato Tb0.1, Gd0.9
dimethylbenzylammonium tetrakis 2,2,6,6-tetramethylheptanedionato Tb0.1, Gd0.9
dimethylbenzylammonium tetrakis 3-methylpentane-2,4-dionato Tb0.1, Gd0.9
dimethylbenzylammonium tetrakis 3-ethylpentane-2,4-dionato Tb0.1, Gd0.9
dimethylbenzylammonium tetrakis pivaloyltrifluoroacetonato Tb0.1, Gd0.9
dimethylbenzylammonium tetrakis trifluoroacetylacetonato Tb0.1, Gd0.9
dimethylbenzylammonium tetrakis hexafluoroacetylacetonato Tb0.1, Gd0.9
dimethylbenzylammonium tetrakis 6,6,7,7,8,8,8-heptafluoro-2,2-dimethyloctanedionato Tb0.1, Gd0.9
dimethylbenzylammonium tetrakis 1-phenyl-1,3-butanedionato Tb0.1, Gd0.9
triallylammonium tetrakis acetylacetonato Tb0.1, Gd0.9
triallylammonium tetrakis dibenzoylmethanato Tb0.1, Gd0.9
triallylammonium tetrakis thenoyltrifluoroacetonato Tb0.1, Gd0.9
triallylammonium tetrakis 2,2,6,6-tetramethylheptanedionato Tb0.1, Gd0.9
triallylammonium tetrakis 3-methylpentane-2,4-dionato Tb0.1, Gd0.9
triallylammonium tetrakis 3-ethylpentane-2,4-dionato Tb0.1, Gd0.9
triallylammonium tetrakis pivaloyltrifluoroacetonato Tb0.1, Gd0.9
triallylammonium tetrakis trifluoroacetylacetonato Tb0.1, Gd0.9
triallylammonium tetrakis hexafluoroacetylacetonato Tb0.1, Gd0.9
triallylammonium tetrakis 6,6,7,7,8,8,8-heptafluoro-2,2-dimethyloctanedionato Tb0.1, Gd0.9
triallylammonium tetrakis 1-phenyl-1,3-butanedionato Tb0.1, Gd0.9
anilinium tetrakis acetylacetonato Tb0.1, Gd0.9
anilinium tetrakis dibenzoylmethanato Tb0.1, Gd0.9
anilinium tetrakis thenoyltrifluoroacetonato Tb0.1, Gd0.9
anilinium tetrakis 2,2,6,6-tetramethylheptanedionato Tb0.1, Gd0.9
anilinium tetrakis 3-methylpentane-2,4-dionato Tb0.1, Gd0.9
anilinium tetrakis 3-ethylpentane-2,4-dionato Tb0.1, Gd0.9
anilinium tetrakis pivaloyltrifluoroacetonato Tb0.1, Gd0.9
anilinium tetrakis trifluoroacetylacetonato Tb0.1, Gd0.9
anilinium tetrakis hexafluoroacetylacetonato Tb0.1, Gd0.9
anilinium tetrakis 6,6,7,7,8,8,8-heptafluoro-2,2-dimethyloctanedionato Tb0.1, Gd0.9
anilinium tetrakis 1-phenyl-1,3-butanedionato Tb0.1, Gd0.9
triethylammonium tetrakis acetylacetonato Tb0.01, Gd0.99
triethylammonium tetrakis dibenzoylmethanato Tb0.01, Gd0.99
triethylammonium tetrakis thenoyltrifluoroacetonato Tb0.01, Gd0.99 triethylammonium tetrakis 2,2,6,6-tetramethylheptanedionato Tb0.01, Gd0.99
triethylammonium tetrakis 3-methylpentane-2,4-dionato Tb0.01, Gd0.99
triethylammonium tetrakis 3-ethylpentane-2,4-dionato Tb0.01, Gd0.99
triethylammonium tetrakis pivaloyltrifluoroacetonato Tb0.01, Gd0.99
triethylammonium tetrakis trifluoroacetylacetonato Tb0.01, Gd0.99
triethylammonium tetrakis hexafluoroacetylacetonato Tb0.01, Gd0.99
triethylammonium tetrakis 6,6,7,7,8,8,8-heptafluoro-2,2-dimethyloctanedionato Tb0.01, Gd0.99
triethylammonium tetrakis 1-phenyl-1,3-butanedionato Tb0.01, Gd0.99
morpholinium tetrakis acetylacetonato Tb0.01, Gd0.99
morpholinium tetrakis dibenzoylmethanato Tb0.01, Gd0.99
morpholinium tetrakis thenoyltrifluoroacetonato Tb0.01, Gd0.99
morpholinium tetrakis 2,2,6,6-tetramethylheptanedionato Tb0.01, Gd0.99
morpholinium tetrakis 3-methylpentane-2,4-dionato Tb0.01, Gd0.99
morpholinium tetrakis 3-ethylpentane-2,4-dionato Tb0.01, Gd0.99
morpholinium tetrakis pivaloyltrifluoroacetonato Tb0.01, Gd0.99
morpholinium tetrakis trifluoroacetylacetonato Tb0.01, Gd0.99
morpholinium tetrakis hexafluoroacetylacetonato Tb0.01, Gd0.99
morpholinium tetrakis 6,6,7,7,8,8,8-heptafluoro-2,2-dimethyloctanedionato Tb0.01, Gd0.99
morpholinium tetrakis 1-phenyl-1,3-butanedionato Tb0.01, Gd0.99
dimethylbenzylammonium tetrakis acetylacetonato Tb0.01, Gd0.99
dimethylbenzylammonium tetrakis dibenzoylmethanato Tb0.01, Gd0.99
dimethylbenzylammonium tetrakis thenoyltrifluoroacetonato Tb0.01, Gd0.99
dimethylbenzylammonium tetrakis 2,2,6,6-tetramethylheptanedionato Tb0.01, Gd0.99
dimethylbenzylammonium tetrakis 3-methylpentane-2,4-dionato Tb0.01, Gd0.99
dimethylbenzylammonium tetrakis 3-ethylpentane-2,4-dionato Tb0.01, Gd0.99
dimethylbenzylammonium tetrakis pivaloyltrifluoroacetonato Tb0.01, Gd0.99
dimethylbenzylammonium tetrakis trifluoroacetylacetonato Tb0.01, Gd0.99
dimethylbenzylammonium tetrakis hexafluoroacetylacetonato Tb0.01, Gd0.99
dimethylbenzylammonium tetrakis 6,6,7,7,8,8,8-heptafluoro-2,2-dimethyloctanedionato Tb0.01, Gd0.99
dimethylbenzylammonium tetrakis 1-phenyl-1,3-butanedionato Tb0.01, Gd0.99
triallylammonium tetrakis acetylacetonato Tb0.01, Gd0.99
triallylammonium tetrakis dibenzoylmethanato Tb0.01, Gd0.99
triallylammonium tetrakis thenoyltrifluoroacetonato Tb0.01, Gd0.99
triallylammonium tetrakis 2,2,6,6-tetramethylheptanedionato Tb0.01, Gd0.99
triallylammonium tetrakis 3-methylpentane-2,4-dionato Tb0.01, Gd0.99
triallylammonium tetrakis 3-ethylpentane-2,4-dionato Tb0.01, Gd0.99
triallylammonium tetrakis pivaloyltrifluoroacetonato Tb0.01, Gd0.99
triallylammonium tetrakis trifluoroacetylacetonato Tb0.01, Gd0.99
triallylammonium tetrakis hexafluoroacetylacetonato Tb0.01, Gd0.99
triallylammonium tetrakis 6,6,7,7,8,8,8-heptafluoro-2,2-dimethyloctanedionato Tb0.01, Gd0.99
triallylammonium tetrakis 1-phenyl-1,3-butanedionato Tb0.01, Gd0.99
anilinium tetrakis acetylacetonato Tb0.01, Gd0.99
anilinium tetrakis dibenzoylmethanato Tb0.01, Gd0.99
anilinium tetrakis thenoyltrifluoroacetonato Tb0.01, Gd0.99
anilinium tetrakis 2,2,6,6-tetramethylheptanedionato Tb0.01, Gd0.99
anilinium tetrakis 3-methylpentane-2,4-dionato Tb0.01, Gd0.99
anilinium tetrakis 3-ethylpentane-2,4-dionato Tb0.01, Gd0.99
anilinium tetrakis pivaloyltrifluoroacetonato Tb0.01, Gd0.99
anilinium tetrakis trifluoroacetylacetonato Tb0.01, Gd0.99
anilinium tetrakis hexafluoroacetylacetonato Tb0.01, Gd0.99
anilinium tetrakis 6,6,7,7,8,8,8-heptafluoro-2,2-dimethyloctanedionato Tb0.01, Gd0.99
anilinium tetrakis 1-phenyl-1,3-butanedionato Tb0.01, Gd0.99
triethylammonium tetrakis acetylacetonato Eu0.5, Gd0.5
triethylammonium tetrakis dibenzoylmethanato Eu0.5, Gd0.5
triethylammonium tetrakis thenoyltrifluoroacetonato Eu0.5, Gd0.5
triethylammonium tetrakis 2,2,6,6-tetramethylheptanedionato Eu0.5, Gd0.5
triethylammonium tetrakis 3-methylpentane-2,4-dionato Eu0.5, Gd0.5
triethylammonium tetrakis 3-ethylpentane-2,4-dionato Eu0.5, Gd0.5
triethylammonium tetrakis pivaloyltrifluoroacetonato Eu0.5, Gd0.5
triethylammonium tetrakis trifluoroacetylacetonato Eu0.5, Gd0.5
triethylammonium tetrakis hexafluoroacetylacetonato Eu0.5, Gd0.5
triethylammonium tetrakis 6,6,7,7,8,8,8-heptafluoro-2,2-dimethyloctanedionato Eu0.5, Gd0.5
triethylammonium tetrakis 1-phenyl-1,3-butanedionato Eu0.5, Gd0.5
morpholinium tetrakis acetylacetonato Eu0.5, Gd0.5
morpholinium tetrakis dibenzoylmethanato Eu0.5, Gd0.5
morpholinium tetrakis thenoyltrifluoroacetonato Eu0.5, Gd0.5
morpholinium tetrakis 2,2,6,6-tetramethylheptanedionato Eu0.5, Gd0.5
morpholinium tetrakis 3-methylpentane-2,4-dionato Eu0.5, Gd0.5
morpholinium tetrakis 3-ethylpentane-2,4-dionato Eu0.5, Gd0.5
morpholinium tetrakis pivaloyltrifluoroacetonato Eu0.5, Gd0.5
morpholinium tetrakis trifluoroacetylacetonato Eu0.5, Gd0.5
morpholinium tetrakis hexafluoroacetylacetonato Eu0.5, Gd0.5 morpholinium tetrakis 6,6,7,7,8,8,8-heptafluoro-2,2-dimethyloctanedionato Eu0.5, Gd0.5 morpholinium tetrakis 1-phenyl-1,3-butanedionato Eu0.5, Gd0.5 dimethylbenzylammonium tetrakis acetylacetonato Eu0.5, Gd0.5 dimethylbenzylammonium tetrakis dibenzoylmethanato Eu0.5, Gd0.5 dimethylbenzylammonium tetrakis thenoyltrifluoroacetonato Eu0.5, Gd0.5 dimethylbenzylammonium tetrakis 2,2,6,6-tetramethylheptanedionato Eu0.5, Gd0.5 dimethylbenzylammonium tetrakis 3-methylpentane-2,4-dionato Eu0.5, Gd0.5 dimethylbenzylammonium tetrakis 3-ethylpentane-2,4-dionato Eu0.5, Gd0.5 dimethylbenzylammonium tetrakis pivaloyltrifluoroacetonato Eu0.5, Gd0.5 dimethylbenzylammonium tetrakis trifluoroacetylacetonato Eu0.5, Gd0.5 dimethylbenzylammonium tetrakis hexafluoroacetylacetonato Eu0.5, Gd0.5 dimethylbenzylammonium tetrakis 6,6,7,7,8,8,8-heptafluoro-2,2-dimethyloctanedionato Eu0.5, Gd0.5 dimethylbenzylammonium tetrakis 1-phenyl-1,3-butanedionato Eu0.5, Gd0.5 triallylammonium tetrakis acetylacetonato Eu0.5, Gd0.5 triallylammonium tetrakis dibenzoylmethanato Eu0.5, Gd0.5 triallylammonium tetrakis thenoyltrifluoroacetonato Eu0.5, Gd0.5 triallylammonium tetrakis 2,2,6,6-tetramethylheptanedionato Eu0.5, Gd0.5 triallylammonium tetrakis 3-methylpentane-2,4-dionato Eu0.5, Gd0.5 triallylammonium tetrakis 3-ethylpentane-2,4-dionato Eu0.5, Gd0.5 triallylammonium tetrakis pivaloyltrifluoroacetonato Eu0.5, Gd0.5 triallylammonium tetrakis trifluoroacetylacetonato Eu0.5, Gd0.5 triallylammonium tetrakis hexafluoroacetylacetonato Eu0.5, Gd0.5 triallylammonium tetrakis 6,6,7,7,8,8,8-heptafluoro-2,2-dimethyloctanedionato Eu0.5, Gd0.5 triallylammonium tetrakis 1-phenyl-1,3-butanedionato Eu0.5, Gd0.5 anilinium tetrakis acetylacetonato Eu0.5, Gd0.5 anilinium tetrakis dibenzoylmethanato Eu0.5, Gd0.5 anilinium tetrakis thenoyltrifluoroacetonato Eu0.5, Gd0.5 anilinium tetrakis 2,2,6,6-tetramethylheptanedionato Eu0.5, Gd0.5 anilinium tetrakis 3-methylpentane-2,4-dionato Eu0.5, Gd0.5 anilinium tetrakis 3-ethylpentane-2,4-dionato Eu0.5, Gd0.5 anilinium tetrakis pivaloyltrifluoroacetonato Eu0.5, Gd0.5 anilinium tetrakis trifluoroacetylacetonato Eu0.5, Gd0.5 anilinium tetrakis hexafluoroacetylacetonato Eu0.5, Gd0.5 anilinium tetrakis 6,6,7,7,8,8,8-heptafluoro-2,2-dimethyloctanedionato Eu0.5, Gd0.5 anilinium tetrakis 1-phenyl-1,3-butanedionato Eu0.5, Gd0.5 triethylammonium tetrakis acetylacetonato Eu0.2, Gd0.8 triethylammonium tetrakis dibenzoylmethanato Eu0.2, Gd0.8 triethylammonium tetrakis thenoyltrifluoroacetonato Eu0.2, Gd0.8 triethylammonium tetrakis 2,2,6,6-tetramethylheptanedionato Eu0.2, Gd0.8 triethylammonium tetrakis 3-methylpentane-2,4-dionato Eu0.2, Gd0.8 triethylammonium tetrakis 3-ethylpentane-2,4-dionato Eu0.2, Gd0.8 triethylammonium tetrakis pivaloyltrifluoroacetonato Eu0.2, Gd0.8 triethylammonium tetrakis trifluoroacetylacetonato Eu0.2, Gd0.8 triethylammonium tetrakis hexafluoroacetylacetonato Eu0.2, Gd0.8 triethylammonium tetrakis 6,6,7,7,8,8,8-heptafluoro-2,2-dimethyloctanedionato Eu0.2, Gd0.8 triethylammonium tetrakis 1-phenyl-1,3-butanedionato Eu0.2, Gd0.8 morpholinium tetrakis acetylacetonato Eu0.2, Gd0.8 morpholinium tetrakis dibenzoylmethanato Eu0.2, Gd0.8 morpholinium tetrakis thenoyltrifluoroacetonato Eu0.2, Gd0.8 morpholinium tetrakis 2,2,6,6-tetramethylheptanedionato Eu0.2, Gd0.8 morpholinium tetrakis 3-methylpentane-2,4-dionato Eu0.2, Gd0.8 morpholinium tetrakis 3-ethylpentane-2,4-dionato Eu0.2, Gd0.8 morpholinium tetrakis pivaloyltrifluoroacetonato Eu0.2, Gd0.8 morpholinium tetrakis trifluoroacetylacetonato Eu0.2, Gd0.8 morpholinium tetrakis hexafluoroacetylacetonato Eu0.2, Gd0.8 morpholinium tetrakis 6,6,7,7,8,8,8-heptafluoro-2,2-dimethyloctanedionato Eu0.2, Gd0.8 morpholinium tetrakis 1-phenyl-1,3-butanedionato Eu0.2, Gd0.8 dimethylbenzylammonium tetrakis acetylacetonato Eu0.2, Gd0.8 dimethylbenzylammonium tetrakis dibenzoylmethanato Eu0.2, Gd0.8 dimethylbenzylammonium tetrakis thenoyltrifluoroacetonato Eu0.2, Gd0.8 dimethylbenzylammonium tetrakis 2,2,6,6-tetramethylheptanedionato Eu0.2, Gd0.8 dimethylbenzylammonium tetrakis 3-methylpentane-2,4-dionato Eu0.2, Gd0.8 dimethylbenzylammonium tetrakis 3-ethylpentane-2,4-dionato Eu0.2, Gd0.8 dimethylbenzylammonium tetrakis pivaloyltrifluoroacetonato Eu0.2, Gd0.8 dimethylbenzylammonium tetrakis trifluoroacetylacetonato Eu0.2, Gd0.8 dimethylbenzylammonium tetrakis hexafluoroacetylacetonato Eu0.2, Gd0.8 dimethylbenzylammonium tetrakis 6,6,7,7,8,8,8-heptafluoro-2,2-dimethyloctanedionato Eu0.2, Gd0.8 dimethylbenzylammonium tetrakis 1-phenyl-1,3-butanedionato Eu0.2, Gd0.8 triallylammonium tetrakis acetylacetonato Eu0.2, Gd0.8 triallylammonium tetrakis dibenzoylmethanato Eu0.2, Gd0.8 triallylammonium tetrakis thenoyltrifluoroacetonato Eu0.2, Gd0.8 triallylammonium tetrakis 2,2,6,6-tetramethylheptanedionato Eu0.2, Gd0.8 triallylammonium tetrakis 3-methylpentane-2,4-dionato Eu0.2, Gd0.8 triallylammonium tetrakis 3-ethylpentane-2,4-dionato Eu0.2, Gd0.8
triallylammonium tetrakis pivaloyltrifluoroacetonato Eu0.2, Gd0.8
triallylammonium tetrakis trifluoroacetylacetonato Eu0.2, Gd0.8
triallylammonium tetrakis hexafluoroacetylacetonato Eu0.2, Gd0.8
triallylammonium tetrakis 6,6,7,7,8,8,8-heptafluoro-2,2-dimethyloctanedionato Eu0.2, Gd0.8
triallylammonium tetrakis 1-phenyl-1,3-butanedionato Eu0.2, Gd0.8
anilinium tetrakis acetylacetonato Eu0.2, Gd0.8
anilinium tetrakis dibenzoylmethanato Eu0.2, Gd0.8
anilinium tetrakis thenoyltrifluoroacetonato Eu0.2, Gd0.8
anilinium tetrakis 2,2,6,6-tetramethylheptanedionato Eu0.2, Gd0.8
anilinium tetrakis 3-methylpentane-2,4-dionato Eu0.2, Gd0.8
anilinium tetrakis 3-ethylpentane-2,4-dionato Eu0.2, Gd0.8
anilinium tetrakis pivaloyltrifluoroacetonato Eu0.2, Gd0.8
anilinium tetrakis trifluoroacetylacetonato Eu0.2, Gd0.8
anilinium tetrakis hexafluoroacetylacetonato Eu0.2, Gd0.8
anilinium tetrakis 6,6,7,7,8,8,8-heptafluoro-2,2-dimethyloctanedionato Eu0.2, Gd0.8
anilinium tetrakis 1-phenyl-1,3-butanedionato Eu0.2, Gd0.8
triethylammonium tetrakis acetylacetonato Eu0.1, Gd0.9
triethylammonium tetrakis dibenzoylmethanato Eu0.1, Gd0.9
triethylammonium tetrakis thenoyltrifluoroacetonato Eu0.1, Gd0.9
triethylammonium tetrakis 2,2,6,6-tetramethylheptanedionato Eu0.1, Gd0.9
triethylammonium tetrakis 3-methylpentane-2,4-dionato Eu0.1, Gd0.9
triethylammonium tetrakis 3-ethylpentane-2,4-dionato Eu0.1, Gd0.9
triethylammonium tetrakis pivaloyltrifluoroacetonato Eu0.1, Gd0.9
triethylammonium tetrakis trifluoroacetylacetonato Eu0.1, Gd0.9
triethylammonium tetrakis hexafluoroacetylacetonato Eu0.1, Gd0.9
triethylammonium tetrakis 6,6,7,7,8,8,8-heptafluoro-2,2-dimethyloctanedionato Eu0.1, Gd0.9
triethylammonium tetrakis 1-phenyl-1,3-butanedionato Eu0.1, Gd0.9
morpholinium tetrakis acetylacetonato Eu0.1, Gd0.9
morpholinium tetrakis dibenzoylmethanato Eu0.1, Gd0.9
morpholinium tetrakis thenoyltrifluoroacetonato Eu0.1, Gd0.9
morpholinium tetrakis 2,2,6,6-tetramethylheptanedionato Eu0.1, Gd0.9
morpholinium tetrakis 3-methylpentane-2,4-dionato Eu0.1, Gd0.9
morpholinium tetrakis 3-ethylpentane-2,4-dionato Eu0.1, Gd0.9
morpholinium tetrakis pivaloyltrifluoroacetonato Eu0.1, Gd0.9
morpholinium tetrakis trifluoroacetylacetonato Eu0.1, Gd0.9
morpholinium tetrakis hexafluoroacetylacetonato Eu0.1, Gd0.9
morpholinium tetrakis 6,6,7,7,8,8,8-heptafluoro-2,2-dimethyloctanedionato Eu0.1, Gd0.9
morpholinium tetrakis 1-phenyl-1,3-butanedionato Eu0.1, Gd0.9
dimethylbenzylammonium tetrakis acetylacetonato Eu0.1, Gd0.9
dimethylbenzylammonium tetrakis dibenzoylmethanato Eu0.1, Gd0.9
dimethylbenzylammonium tetrakis thenoyltrifluoroacetonato Eu0.1, Gd0.9
dimethylbenzylammonium tetrakis 2,2,6,6-tetramethylheptanedionato Eu0.1, Gd0.9
dimethylbenzylammonium tetrakis 3-methylpentane-2,4-dionato Eu0.1, Gd0.9
dimethylbenzylammonium tetrakis 3-ethylpentane-2,4-dionato Eu0.1, Gd0.9
dimethylbenzylammonium tetrakis pivaloyltrifluoroacetonato Eu0.1, Gd0.9
dimethylbenzylammonium tetrakis trifluoroacetylacetonato Eu0.1, Gd0.9
dimethylbenzylammonium tetrakis hexafluoroacetylacetonato Eu0.1, Gd0.9
dimethylbenzylammonium tetrakis 6,6,7,7,8,8,8-heptafluoro-2,2-dimethyloctanedionato Eu0.1, Gd0.9
dimethylbenzylammonium tetrakis 1-phenyl-1,3-butanedionato Eu0.1, Gd0.9
triallylammonium tetrakis acetylacetonato Eu0.1, Gd0.9
triallylammonium tetrakis dibenzoylmethanato Eu0.1, Gd0.9
triallylammonium tetrakis thenoyltrifluoroacetonato Eu0.1, Gd0.9
triallylammonium tetrakis 2,2,6,6-tetramethylheptanedionato Eu0.1, Gd0.9
triallylammonium tetrakis 3-methylpentane-2,4-dionato Eu0.1, Gd0.9
triallylammonium tetrakis 3-ethylpentane-2,4-dionato Eu0.1, Gd0.9
triallylammonium tetrakis pivaloyltrifluoroacetonato Eu0.1, Gd0.9
triallylammonium tetrakis trifluoroacetylacetonato Eu0.1, Gd0.9
triallylammonium tetrakis hexafluoroacetylacetonato Eu0.1, Gd0.9
triallylammonium tetrakis 6,6,7,7,8,8,8-heptafluoro-2,2-dimethyloctanedionato Eu0.1, Gd0.9
triallylammonium tetrakis 1-phenyl-1,3-butanedionato Eu0.1, Gd0.9
anilinium tetrakis acetylacetonato Eu0.1, Gd0.9
anilinium tetrakis dibenzoylmethanato Eu0.1, Gd0.9
anilinium tetrakis thenoyltrifluoroacetonato Eu0.1, Gd0.9
anilinium tetrakis 2,2,6,6-tetramethylheptanedionato Eu0.1, Gd0.9
anilinium tetrakis 3-methylpentane-2,4-dionato Eu0.1, Gd0.9
anilinium tetrakis 3-ethylpentane-2,4-dionato Eu0.1, Gd0.9
anilinium tetrakis pivaloyltrifluoroacetonato Eu0.1, Gd0.9
anilinium tetrakis trifluoroacetylacetonato Eu0.1, Gd0.9
anilinium tetrakis hexafluoroacetylacetonato Eu0.1, Gd0.9
anilinium tetrakis 6,6,7,7,8,8,8-heptafluoro-2,2-dimethyloctanedionato Eu0.1, Gd0.9
anilinium tetrakis 1-phenyl-1,3-butanedionato Eu0.1, Gd0.9
triethylammonium tetrakis acetylacetonato Eu0.01, Gd0.99
triethylammonium tetrakis dibenzoylmethanato Eu0.01, Gd0.99
triethylammonium tetrakis thenoyltrifluoroacetonato Eu0.01, Gd0.99
triethylammonium tetrakis 2,2,6,6-tetramethylheptanedionato Eu0.01, Gd0.99
triethylammonium tetrakis 3-methylpentane-2,4-dionato Eu0.01, Gd0.99 triethylammonium tetrakis 3-ethylpentane-2,4-dionato Eu0.01, Gd0.99 triethylammonium tetrakis pivaloyltrifluoroacetonato Eu0.01, Gd0.99 triethylammonium tetrakis trifluoroacetylacetonato Eu0.01, Gd0.99 triethylammonium tetrakis hexafluoroacetylacetonato Eu0.01, Gd0.99 triethylammonium tetrakis 6,6,7,7,8,8,8-heptafluoro-2,2-dimethyloctanedionato Eu0.01, Gd0.99 triethylammonium tetrakis 1-phenyl-1,3-butanedionato Eu0.01, Gd0.99 morpholinium tetrakis acetylacetonato Eu0.01, Gd0.99 morpholinium tetrakis dibenzoylmethanato Eu0.01, Gd0.99 morpholinium tetrakis thenoyltrifluoroacetonato Eu0.01, Gd0.99 morpholinium tetrakis 2,2,6,6-tetramethylheptanedionato Eu0.01, Gd0.99 morpholinium tetrakis 3-methylpentane-2,4-dionato Eu0.01, Gd0.99 morpholinium tetrakis 3-ethylpentane-2,4-dionato Eu0.01, Gd0.99 morpholinium tetrakis pivaloyltrifluoroacetonato Eu0.01, Gd0.99 morpholinium tetrakis trifluoroacetylacetonato Eu0.01, Gd0.99 morpholinium tetrakis hexafluoroacetylacetonato Eu0.01, Gd0.99 morpholinium tetrakis 6,6,7,7,8,8,8-heptafluoro-2,2-dimethyloctanedionato Eu0.01, Gd0.99 morpholinium tetrakis 1-phenyl-1,3-butanedionato Eu0.01, Gd0.99 dimethylbenzylammonium tetrakis acetylacetonato Eu0.01, Gd0.99 dimethylbenzylammonium tetrakis dibenzoylmethanato Eu0.01, Gd0.99 dimethylbenzylammonium tetrakis thenoyltrifluoroacetonato Eu0.01, Gd0.99 dimethylbenzylammonium tetrakis 2,2,6,6-tetramethylheptanedionato Eu0.01, Gd0.99 dimethylbenzylammonium tetrakis 3-methylpentane-2,4-dionato Eu0.01, Gd0.99 dimethylbenzylammonium tetrakis 3-ethylpentane-2,4-dionato Eu0.01, Gd0.99 dimethylbenzylammonium tetrakis pivaloyltrifluoroacetonato Eu0.01, Gd0.99 dimethylbenzylammonium tetrakis trifluoroacetylacetonato Eu0.01, Gd0.99 dimethylbenzylammonium tetrakis hexafluoroacetylacetonato Eu0.01, Gd0.99 dimethylbenzylammonium tetrakis 6,6,7,7,8,8,8-heptafluoro-2,2-dimethyloctanedionato Eu0.01, Gd0.99 dimethylbenzylammonium tetrakis 1-phenyl-1,3-butanedionato Eu0.01, Gd0.99 triallylammonium tetrakis acetylacetonato Eu0.01, Gd0.99 triallylammonium tetrakis dibenzoylmethanato Eu0.01, Gd0.99 triallylammonium tetrakis thenoyltrifluoroacetonato Eu0.01, Gd0.99 triallylammonium tetrakis 2,2,6,6-tetramethylheptanedionato Eu0.01, Gd0.99 triallylammonium tetrakis 3-methylpentane-2,4-dionato Eu0.01, Gd0.99 triallylammonium tetrakis 3-ethylpentane-2,4-dionato Eu0.01, Gd0.99 triallylammonium tetrakis pivaloyltrifluoroacetonato Eu0.01, Gd0.99 triallylammonium tetrakis trifluoroacetylacetonato Eu0.01, Gd0.99 triallylammonium tetrakis hexafluoroacetylacetonato Eu0.01, Gd0.99 triallylammonium tetrakis 6,6,7,7,8,8,8-heptafluoro-2,2-dimethyloctanedionato Eu0.01, Gd0.99 triallylammonium tetrakis 1-phenyl-1,3-butanedionato Eu0.01, Gd0.99 anilinium tetrakis acetylacetonato Eu0.01, Gd0.99 anilinium tetrakis dibenzoylmethanato Eu0.01, Gd0.99 anilinium tetrakis thenoyltrifluoroacetonato Eu0.01, Gd0.99 anilinium tetrakis 2,2,6,6-tetramethylheptanedionato Eu0.01, Gd0.99 anilinium tetrakis 3-methylpentane-2,4-dionato Eu0.01, Gd0.99 anilinium tetrakis 3-ethylpentane-2,4-dionato Eu0.01, Gd0.99 anilinium tetrakis pivaloyltrifluoroacetonato Eu0.01, Gd0.99 anilinium tetrakis trifluoroacetylacetonato Eu0.01, Gd0.99 anilinium tetrakis hexafluoroacetylacetonato Eu0.01, Gd0.99 anilinium tetrakis 6,6,7,7,8,8,8-heptafluoro-2,2-dimethyloctanedionato Eu0.01, Gd0.99 anilinium tetrakis 1-phenyl-1,3-butanedionato Eu0.01, Gd0.99 triethylammonium tetrakis acetylacetonato Eu0.5, Gd0.5 triethylammonium tetrakis dibenzoylmethanato Eu0.5, Gd0.5 triethylammonium tetrakis thenoyltrifluoroacetonato Eu0.5, Gd0.5 triethylammonium tetrakis 2,2,6,6-tetramethylheptanedionato Eu0.5, Gd0.5 triethylammonium tetrakis 3-methylpentane-2,4-dionato Eu0.5, Gd0.5 triethylammonium tetrakis 3-ethylpentane-2,4-dionato Eu0.5, Gd0.5 triethylammonium tetrakis pivaloyltrifluoroacetonato Eu0.5, Gd0.5 triethylammonium tetrakis trifluoroacetylacetonato Eu0.5, Gd0.5 triethylammonium tetrakis hexafluoroacetylacetonato Eu0.5, Gd0.5 triethylammonium tetrakis 6,6,7,7,8,8,8-heptafluoro-2,2-dimethyloctanedionato Eu0.5, Gd0.5 triethylammonium tetrakis 1-phenyl-1,3-butanedionato Eu0.5, Gd0.5 morpholinium tetrakis acetylacetonato Eu0.5, Gd0.5 morpholinium tetrakis dibenzoylmethanato Eu0.5, Gd0.5 morpholinium tetrakis thenoyltrifluoroacetonato Eu0.5, Gd0.5 morpholinium tetrakis 2,2,6,6-tetramethylheptanedionato Eu0.5, Gd0.5 morpholinium tetrakis 3-methylpentane-2,4-dionato Eu0.5, Gd0.5 morpholinium tetrakis 3-ethylpentane-2,4-dionato Eu0.5, Gd0.5 morpholinium tetrakis pivaloyltrifluoroacetonato Eu0.5, Gd0.5 morpholinium tetrakis trifluoroacetylacetonato Eu0.5, Gd0.5 morpholinium tetrakis hexafluoroacetylacetonato Eu0.5, Gd0.5 morpholinium tetrakis 6,6,7,7,8,8,8-heptafluoro-2,2-dimethyloctanedionato Eu0.5, Gd0.5 morpholinium tetrakis 1-phenyl-1,3-butanedionato Eu0.5, Gd0.5 dimethylbenzylammonium tetrakis acetylacetonato Eu0.5, Gd0.5
dimethylbenzylammonium tetrakis dibenzoylmethanato Eu0.5, Gd0.5
dimethylbenzylammonium tetrakis thenoyltrifluoroacetonato Eu0.5, Gd0.5
dimethylbenzylammonium tetrakis 2,2,6,6-tetramethylheptanedionato Eu0.5, Gd0.5
dimethylbenzylammonium tetrakis 3-methylpentane-2,4-dionato Eu0.5, Gd0.5
dimethylbenzylammonium tetrakis 3-ethylpentane-2,4-dionato Eu0.5, Gd0.5
dimethylbenzylammonium tetrakis pivaloyltrifluoroacetonato Eu0.5, Gd0.5
dimethylbenzylammonium tetrakis trifluoroacetylacetonato Eu0.5, Gd0.5
dimethylbenzylammonium tetrakis hexafluoroacetylacetonato Eu0.5, Gd0.5
dimethylbenzylammonium tetrakis 6,6,7,7,8,8,8-heptafluoro-2,2-dimethyloctanedionato Eu0.5, Gd0.5
dimethylbenzylammonium tetrakis 1-phenyl-1,3-butanedionato Eu0.5, Gd0.5
triallylammonium tetrakis acetylacetonato Eu0.5, Gd0.5
triallylammonium tetrakis dibenzoylmethanato Eu0.5, Gd0.5
triallylammonium tetrakis thenoyltrifluoroacetonato Eu0.5, Gd0.5
triallylammonium tetrakis 2,2,6,6-tetramethylheptanedionato Eu0.5, Gd0.5
triallylammonium tetrakis 3-methylpentane-2,4-dionato Eu0.5, Gd0.5
triallylammonium tetrakis 3-ethylpentane-2,4-dionato Eu0.5, Gd0.5
triallylammonium tetrakis pivaloyltrifluoroacetonato Eu0.5, Gd0.5
triallylammonium tetrakis trifluoroacetylacetonato Eu0.5, Gd0.5
triallylammonium tetrakis hexafluoroacetylacetonato Eu0.5, Gd0.5
triallylammonium tetrakis 6,6,7,7,8,8,8-heptafluoro-2,2-dimethyloctanedionato Eu0.5, Gd0.5
triallylammonium tetrakis 1-phenyl-1,3-butanedionato Eu0.5, Gd0.5
anilinium tetrakis acetylacetonato Eu0.5, Gd0.5
anilinium tetrakis dibenzoylmethanato Eu0.5, Gd0.5
anilinium tetrakis thenoyltrifluoroacetonato Eu0.5, Gd0.5
anilinium tetrakis 2,2,6,6-tetramethylheptanedionato Eu0.5, Gd0.5
anilinium tetrakis 3-methylpentane-2,4-dionato Eu0.5, Gd0.5
anilinium tetrakis 3-ethylpentane-2,4-dionato Eu0.5, Gd0.5
anilinium tetrakis pivaloyltrifluoroacetonato Eu0.5, Gd0.5
anilinium tetrakis trifluoroacetylacetonato Eu0.5, Gd0.5
anilinium tetrakis hexafluoroacetylacetonato Eu0.5, Gd0.5
anilinium tetrakis 6,6,7,7,8,8,8-heptafluoro-2,2-dimethyloctanedionato Eu0.5, Gd0.5
anilinium tetrakis 1-phenyl-1,3-butanedionato Eu0.5, Gd0.5
triethylammonium tetrakis acetylacetonato Eu0.2, Gd0.8
triethylammonium tetrakis dibenzoylmethanato Eu0.2, Gd0.8
triethylammonium tetrakis thenoyltrifluoroacetonato Eu0.2, Gd0.8
triethylammonium tetrakis 2,2,6,6-tetramethylheptanedionato Eu0.2, Gd0.8
triethylammonium tetrakis 3-methylpentane-2,4-dionato Eu0.2, Gd0.8
triethylammonium tetrakis 3-ethylpentane-2,4-dionato Eu0.2, Gd0.8
triethylammonium tetrakis pivaloyltrifluoroacetonato Eu0.2, Gd0.8
triethylammonium tetrakis trifluoroacetylacetonato Eu0.2, Gd0.8
triethylammonium tetrakis hexafluoroacetylacetonato Eu0.2, Gd0.8
triethylammonium tetrakis 6,6,7,7,8,8,8-heptafluoro-2,2-dimethyloctanedionato Eu0.2, Gd0.8
triethylammonium tetrakis 1-phenyl-1,3-butanedionato Eu0.2, Gd0.8
morpholinium tetrakis acetylacetonato Eu0.2, Gd0.8
morpholinium tetrakis dibenzoylmethanato Eu0.2, Gd0.8
morpholinium tetrakis thenoyltrifluoroacetonato Eu0.2, Gd0.8
morpholinium tetrakis 2,2,6,6-tetramethylheptanedionato Eu0.2, Gd0.8
morpholinium tetrakis 3-methylpentane-2,4-dionato Eu0.2, Gd0.8
morpholinium tetrakis 3-ethylpentane-2,4-dionato Eu0.2, Gd0.8
morpholinium tetrakis pivaloyltrifluoroacetonato Eu0.2, Gd0.8
morpholinium tetrakis trifluoroacetylacetonato Eu0.2, Gd0.8
morpholinium tetrakis hexafluoroacetylacetonato Eu0.2, Gd0.8
morpholinium tetrakis 6,6,7,7,8,8,8-heptafluoro-2,2-dimethyloctanedionato Eu0.2, Gd0.8
morpholinium tetrakis 1-phenyl-1,3-butanedionato Eu0.2, Gd0.8
dimethylbenzylammonium tetrakis acetylacetonato Eu0.2, Gd0.8
dimethylbenzylammonium tetrakis dibenzoylmethanato Eu0.2, Gd0.8
dimethylbenzylammonium tetrakis thenoyltrifluoroacetonato Eu0.2, Gd0.8
dimethylbenzylammonium tetrakis 2,2,6,6-tetramethylheptanedionato Eu0.2, Gd0.8
dimethylbenzylammonium tetrakis 3-methylpentane-2,4-dionato Eu0.2, Gd0.8
dimethylbenzylammonium tetrakis 3-ethylpentane-2,4-dionato Eu0.2, Gd0.8
dimethylbenzylammonium tetrakis pivaloyltrifluoroacetonato Eu0.2, Gd0.8
dimethylbenzylammonium tetrakis trifluoroacetylacetonato Eu0.2, Gd0.8
dimethylbenzylammonium tetrakis hexafluoroacetylacetonato Eu0.2, Gd0.8
dimethylbenzylammonium tetrakis 6,6,7,7,8,8,8-heptafluoro-2,2-dimethyloctanedionato Eu0.2, Gd0.8
dimethylbenzylammonium tetrakis 1-phenyl-1,3-butanedionato Eu0.2, Gd0.8
triallylammonium tetrakis acetylacetonato Eu0.2, Gd0.8
triallylammonium tetrakis dibenzoylmethanato Eu0.2, Gd0.8
triallylammonium tetrakis thenoyltrifluoroacetonato Eu0.2, Gd0.8
triallylammonium tetrakis 2,2,6,6-tetramethylheptanedionato Eu0.2, Gd0.8
triallylammonium tetrakis 3-methylpentane-2,4-dionato Eu0.2, Gd0.8
triallylammonium tetrakis 3-ethylpentane-2,4-dionato Eu0.2, Gd0.8
triallylammonium tetrakis pivaloyltrifluoroacetonato Eu0.2, Gd0.8 triallylammonium tetrakis trifluoroacetylacetonato Eu0.2, Gd0.8
triallylammonium tetrakis hexafluoroacetylacetonato Eu0.2, Gd0.8
triallylammonium tetrakis 6,6,7,7,8,8,8-heptafluoro-2,2-dimethyloctanedionato Eu0.2, Gd0.8
triallylammonium tetrakis 1-phenyl-1,3-butanedionato Eu0.2, Gd0.8
anilinium tetrakis acetylacetonato Eu0.2, Gd0.8
anilinium tetrakis dibenzoylmethanato Eu0.2, Gd0.8
anilinium tetrakis thenoyltrifluoroacetonato Eu0.2, Gd0.8
anilinium tetrakis 2,2,6,6-tetramethylheptanedionato Eu0.2, Gd0.8
anilinium tetrakis 3-methylpentane-2,4-dionato Eu0.2, Gd0.8
anilinium tetrakis 3-ethylpentane-2,4-dionato Eu0.2, Gd0.8
anilinium tetrakis pivaloyltrifluoroacetonato Eu0.2, Gd0.8
anilinium tetrakis trifluoroacetylacetonato Eu0.2, Gd0.8
anilinium tetrakis hexafluoroacetylacetonato Eu0.2, Gd0.8
anilinium tetrakis 6,6,7,7,8,8,8-heptafluoro-2,2-dimethyloctanedionato Eu0.2, Gd0.8
anilinium tetrakis 1-phenyl-1,3-butanedionato Eu0.2, Gd0.8
triethylammonium tetrakis acetylacetonato Eu0.1, Gd0.9
triethylammonium tetrakis dibenzoylmethanato Eu0.1, Gd0.9
triethylammonium tetrakis thenoyltrifluoroacetonato Eu0.1, Gd0.9
triethylammonium tetrakis 2,2,6,6-tetramethylheptanedionato Eu0.1, Gd0.9
triethylammonium tetrakis 3-methylpentane-2,4-dionato Eu0.1, Gd0.9
triethylammonium tetrakis 3-ethylpentane-2,4-dionato Eu0.1, Gd0.9
triethylammonium tetrakis pivaloyltrifluoroacetonato Eu0.1, Gd0.9
triethylammonium tetrakis trifluoroacetylacetonato Eu0.1, Gd0.9
triethylammonium tetrakis hexafluoroacetylacetonato Eu0.1, Gd0.9
triethylammonium tetrakis 6,6,7,7,8,8,8-heptafluoro-2,2-dimethyloctanedionato Eu0.1, Gd0.9
triethylammonium tetrakis 1-phenyl-1,3-butanedionato Eu0.1, Gd0.9
morpholinium tetrakis acetylacetonato Eu0.1, Gd0.9
morpholinium tetrakis dibenzoylmethanato Eu0.1, Gd0.9
morpholinium tetrakis thenoyltrifluoroacetonato Eu0.1, Gd0.9
morpholinium tetrakis 2,2,6,6-tetramethylheptanedionato Eu0.1, Gd0.9
morpholinium tetrakis 3-methylpentane-2,4-dionato Eu0.1, Gd0.9
morpholinium tetrakis 3-ethylpentane-2,4-dionato Eu0.1, Gd0.9
morpholinium tetrakis pivaloyltrifluoroacetonato Eu0.1, Gd0.9
morpholinium tetrakis trifluoroacetylacetonato Eu0.1, Gd0.9
morpholinium tetrakis hexafluoroacetylacetonato Eu0.1, Gd0.9
morpholinium tetrakis 6,6,7,7,8,8,8-heptafluoro-2,2-dimethyloctanedionato Eu0.1, Gd0.9
morpholinium tetrakis 1-phenyl-1,3-butanedionato Eu0.1, Gd0.9
dimethylbenzylammonium tetrakis acetylacetonato Eu0.1, Gd0.9
dimethylbenzylammonium tetrakis dibenzoylmethanato Eu0.1, Gd0.9
dimethylbenzylammonium tetrakis thenoyltrifluoroacetonato Eu0.1, Gd0.9
dimethylbenzylammonium tetrakis 2,2,6,6-tetramethylheptanedionato Eu0.1, Gd0.9
dimethylbenzylammonium tetrakis 3-methylpentane-2,4-dionato Eu0.1, Gd0.9
dimethylbenzylammonium tetrakis 3-ethylpentane-2,4-dionato Eu0.1, Gd0.9
dimethylbenzylammonium tetrakis pivaloyltrifluoroacetonato Eu0.1, Gd0.9
dimethylbenzylammonium tetrakis trifluoroacetylacetonato Eu0.1, Gd0.9
dimethylbenzylammonium tetrakis hexafluoroacetylacetonato Eu0.1, Gd0.9
dimethylbenzylammonium tetrakis 6,6,7,7,8,8,8-heptafluoro-2,2-dimethyloctanedionato Eu0.1, Gd0.9
dimethylbenzylammonium tetrakis 1-phenyl-1,3-butanedionato Eu0.1, Gd0.9
triallylammonium tetrakis acetylacetonato Eu0.1, Gd0.9
triallylammonium tetrakis dibenzoylmethanato Eu0.1, Gd0.9
triallylammonium tetrakis thenoyltrifluoroacetonato Eu0.1, Gd0.9
triallylammonium tetrakis 2,2,6,6-tetramethylheptanedionato Eu0.1, Gd0.9
triallylammonium tetrakis 3-methylpentane-2,4-dionato Eu0.1, Gd0.9
triallylammonium tetrakis 3-ethylpentane-2,4-dionato Eu0.1, Gd0.9
triallylammonium tetrakis pivaloyltrifluoroacetonato Eu0.1, Gd0.9
triallylammonium tetrakis trifluoroacetylacetonato Eu0.1, Gd0.9
triallylammonium tetrakis hexafluoroacetylacetonato Eu0.1, Gd0.9
triallylammonium tetrakis 6,6,7,7,8,8,8-heptafluoro-2,2-dimethyloctanedionato Eu0.1, Gd0.9
triallylammonium tetrakis 1-phenyl-1,3-butanedionato Eu0.1, Gd0.9
anilinium tetrakis acetylacetonato Eu0.1, Gd0.9
anilinium tetrakis dibenzoylmethanato Eu0.1, Gd0.9
anilinium tetrakis thenoyltrifluoroacetonato Eu0.1, Gd0.9
anilinium tetrakis 2,2,6,6-tetramethylheptanedionato Eu0.1, Gd0.9
anilinium tetrakis 3-methylpentane-2,4-dionato Eu0.1, Gd0.9
anilinium tetrakis 3-ethylpentane-2,4-dionato Eu0.1, Gd0.9
anilinium tetrakis pivaloyltrifluoroacetonato Eu0.1, Gd0.9
anilinium tetrakis trifluoroacetylacetonato Eu0.1, Gd0.9
anilinium tetrakis hexafluoroacetylacetonato Eu0.1, Gd0.9
anilinium tetrakis 6,6,7,7,8,8,8-heptafluoro-2,2-dimethyloctanedionato Eu0.1, Gd0.9
anilinium tetrakis 1-phenyl-1,3-butanedionato Eu0.1, Gd0.9
triethylammonium tetrakis acetylacetonato Eu0.01, Gd0.99
triethylammonium tetrakis dibenzoylmethanato Eu0.01, Gd0.99
triethylammonium tetrakis thenoyltrifluoroacetonato Eu0.01, Gd0.99
triethylammonium tetrakis 2,2,6,6-tetramethylheptanedionato Eu0.01, Gd0.99
triethylammonium tetrakis 3-methylpentane-2,4-dionato Eu0.01, Gd0.99
triethylammonium tetrakis 3-ethylpentane-2,4-dionato Eu0.01, Gd0.99
triethylammonium tetrakis pivaloyltrifluoroacetonato Eu0.01, Gd0.99 triethylammonium tetrakis trifluoroacetylacetonato Eu0.01, Gd0.99 triethylammonium tetrakis hexafluoroacetylacetonato Eu0.01, Gd0.99 triethylammonium tetrakis 6,6,7,7,8,8,8-heptafluoro-2,2-dimethyloctanedionato Eu0.01, Gd0.99 triethylammonium tetrakis 1-phenyl-1,3-butanedionato Eu0.01, Gd0.99 morpholinium tetrakis acetylacetonato Eu0.01, Gd0.99 morpholinium tetrakis dibenzoylmethanato Eu0.01, Gd0.99 morpholinium tetrakis thenoyltrifluoroacetonato Eu0.01, Gd0.99 morpholinium tetrakis 2,2,6,6-tetramethylheptanedionato Eu0.01, Gd0.99 morpholinium tetrakis 3-methylpentane-2,4-dionato Eu0.01, Gd0.99 morpholinium tetrakis 3-ethylpentane-2,4-dionato Eu0.01, Gd0.99 morpholinium tetrakis pivaloyltrifluoroacetonato Eu0.01, Gd0.99 morpholinium tetrakis trifluoroacetylacetonato Eu0.01, Gd0.99 morpholinium tetrakis hexafluoroacetylacetonato Eu0.01, Gd0.99 morpholinium tetrakis 6,6,7,7,8,8,8-heptafluoro-2,2-dimethyloctanedionato Eu0.01, Gd0.99 morpholinium tetrakis 1-phenyl-1,3-butanedionato Eu0.01, Gd0.99 dimethylbenzylammonium tetrakis acetylacetonato Eu0.01, Gd0.99 dimethylbenzylammonium tetrakis dibenzoylmethanato Eu0.01, Gd0.99 dimethylbenzylammonium tetrakis thenoyltrifluoroacetonato Eu0.01, Gd0.99 dimethylbenzylammonium tetrakis 2,2,6,6-tetramethylheptanedionato Eu0.01, Gd0.99 dimethylbenzylammonium tetrakis 3-methylpentane-2,4-dionato Eu0.01, Gd0.99 dimethylbenzylammonium tetrakis 3-ethylpentane-2,4-dionato Eu0.01, Gd0.99 dimethylbenzylammonium tetrakis pivaloyltrifluoroacetonato Eu0.01, Gd0.99 dimethylbenzylammonium tetrakis trifluoroacetylacetonato Eu0.01, Gd0.99 dimethylbenzylammonium tetrakis hexafluoroacetylacetonato Eu0.01, Gd0.99 dimethylbenzylammonium tetrakis 6,6,7,7,8,8,8-heptafluoro-2,2-dimethyloctanedionato Eu0.01, Gd0.99 dimethylbenzylammonium tetrakis 1-phenyl-1,3-butanedionato Eu0.01, Gd0.99 triallylammonium tetrakis acetylacetonato Eu0.01, Gd0.99 triallylammonium tetrakis dibenzoylmethanato Eu0.01, Gd0.99 triallylammonium tetrakis thenoyltrifluoroacetonato Eu0.01, Gd0.99 triallylammonium tetrakis 2,2,6,6-tetramethylheptanedionato Eu0.01, Gd0.99 triallylammonium tetrakis 3-methylpentane-2,4-dionato Eu0.01, Gd0.99 triallylammonium tetrakis 3-ethylpentane-2,4-dionato Eu0.01, Gd0.99 triallylammonium tetrakis pivaloyltrifluoroacetonato Eu0.01, Gd0.99 triallylammonium tetrakis trifluoroacetylacetonato Eu0.01, Gd0.99 triallylammonium tetrakis hexafluoroacetylacetonato Eu0.01, Gd0.99 triallylammonium tetrakis 6,6,7,7,8,8,8-heptafluoro-2,2-dimethyloctanedionato Eu0.01, Gd0.99 triallylammonium tetrakis 1-phenyl-1,3-butanedionato Eu0.01, Gd0.99 anilinium tetrakis acetylacetonato Eu0.01, Gd0.99 anilinium tetrakis dibenzoylmethanato Eu0.01, Gd0.99 anilinium tetrakis thenoyltrifluoroacetonato Eu0.01, Gd0.99 anilinium tetrakis 2,2,6,6-tetramethylheptanedionato Eu0.01, Gd0.99 anilinium tetrakis 3-methylpentane-2,4-dionato Eu0.01, Gd0.99 anilinium tetrakis 3-ethylpentane-2,4-dionato Eu0.01, Gd0.99 anilinium tetrakis pivaloyltrifluoroacetonato Eu0.01, Gd0.99 anilinium tetrakis trifluoroacetylacetonato Eu0.01, Gd0.99 anilinium tetrakis hexafluoroacetylacetonato Eu0.01, Gd0.99 anilinium tetrakis 6,6,7,7,8,8,8-heptafluoro-2,2-dimethyloctanedionato Eu0.01, Gd0.99 anilinium tetrakis 1-phenyl-1,3-butanedionato Eu0.01, Gd0.99 triethylammonium tetrakis acetylacetonato Sm0.5, Y0.5 triethylammonium tetrakis dibenzoylmethanato Sm0.5, Y0.5 triethylammonium tetrakis thenoyltrifluoroacetonato Sm0.5, Y0.5 triethylammonium tetrakis 2,2,6,6-tetramethylheptanedionato Sm0.5, Y0.5 triethylammonium tetrakis 3-methylpentane-2,4-dionato Sm0.5, Y0.5 triethylammonium tetrakis 3-ethylpentane-2,4-dionato Sm0.5, Y0.5 triethylammonium tetrakis pivaloyltrifluoroacetonato Sm0.5, Y0.5 triethylammonium tetrakis trifluoroacetylacetonato Sm0.5, Y0.5 triethylammonium tetrakis hexafluoroacetylacetonato Sm0.5, Y0.5 triethylammonium tetrakis 6,6,7,7,8,8,8-heptafluoro-2,2-dimethyloctanedionato Sm0.5, Y0.5 triethylammonium tetrakis 1-phenyl-1,3-butanedionato Sm0.5, Y0.5 morpholinium tetrakis acetylacetonato Sm0.5, Y0.5 morpholinium tetrakis dibenzoylmethanato Sm0.5, Y0.5 morpholinium tetrakis thenoyltrifluoroacetonato Sm0.5, Y0.5 morpholinium tetrakis 2,2,6,6-tetramethylheptanedionato Sm0.5, Y0.5 morpholinium tetrakis 3-methylpentane-2,4-dionato Sm0.5, Y0.5 morpholinium tetrakis 3-ethylpentane-2,4-dionato Sm0.5, Y0.5 morpholinium tetrakis pivaloyltrifluoroacetonato Sm0.5, Y0.5 morpholinium tetrakis trifluoroacetylacetonato Sm0.5, Y0.5 morpholinium tetrakis hexafluoroacetylacetonato Sm0.5, Y0.5 morpholinium tetrakis 6,6,7,7,8,8,8-heptafluoro-2,2-dimethyloctanedionato Sm0.5, Y0.5 morpholinium tetrakis 1-phenyl-1,3-butanedionato Sm0.5, Y0.5 dimethylbenzylammonium tetrakis acetylacetonato Sm0.5, Y0.5 dimethylbenzylammonium tetrakis dibenzoylmethanato Sm0.5, Y0.5 dimethylbenzylammonium tetrakis thenoyltrifluoroacetonato Sm0.5, Y0.5 dimethylbenzylammonium tetrakis 2,2,6,6-tetramethylheptanedionato Sm0.5, Y0.5 dimethylbenzylammonium tetrakis 3-methylpentane-2,4-dionato Sm0.5, Y0.5 dimethylbenzylammonium tetrakis 3-ethylpentane-2,4-dionato Sm0.5, Y0.5 dimethylbenzylammonium tetrakis pivaloyltrifluoroacetonato Sm0.5, Y0.5 dimethylbenzylammonium tetrakis trifluoroacetylacetonato Sm0.5, Y0.5 dimethylbenzylammonium tetrakis hexafluoroacetylacetonato Sm0.5, Y0.5 dimethylbenzylammonium tetrakis 6,6,7,7,8,8,8-heptafluoro-2,2-dimethyloctanedionato Sm0.5, Y0.5 dimethylbenzylammonium tetrakis 1-phenyl-1,3-butanedionato Sm0.5, Y0.5 triallylammonium tetrakis acetylacetonato Sm0.5, Y0.5 triallylammonium tetrakis dibenzoylmethanato Sm0.5, Y0.5 triallylammonium tetrakis thenoyltrifluoroacetonato Sm0.5, Y0.5 triallylammonium tetrakis 2,2,6,6-tetramethylheptanedionato Sm0.5, Y0.5 triallylammonium tetrakis 3-methylpentane-2,4-dionato Sm0.5, Y0.5 triallylammonium tetrakis 3-ethylpentane-2,4-dionato Sm0.5, Y0.5 triallylammonium tetrakis pivaloyltrifluoroacetonato Sm0.5, Y0.5 triallylammonium tetrakis trifluoroacetylacetonato Sm0.5, Y0.5 triallylammonium tetrakis hexafluoroacetylacetonato Sm0.5, Y0.5 triallylammonium tetrakis 6,6,7,7,8,8,8-heptafluoro-2,2-dimethyloctanedionato Sm0.5, Y0.5 triallylammonium tetrakis 1-phenyl-1,3-butanedionato Sm0.5, Y0.5 anilinium tetrakis acetylacetonato Sm0.5, Y0.5 anilinium tetrakis dibenzoylmethanato Sm0.5, Y0.5 anilinium tetrakis thenoyltrifluoroacetonato Sm0.5, Y0.5 anilinium tetrakis 2,2,6,6-tetramethylheptanedionato Sm0.5, Y0.5 anilinium tetrakis 3-methylpentane-2,4-dionato Sm0.5, Y0.5 anilinium tetrakis 3-ethylpentane-2,4-dionato Sm0.5, Y0.5 anilinium tetrakis pivaloyltrifluoroacetonato Sm0.5, Y0.5 anilinium tetrakis trifluoroacetylacetonato Sm0.5, Y0.5 anilinium tetrakis hexafluoroacetylacetonato Sm0.5, Y0.5 anilinium tetrakis 6,6,7,7,8,8,8-heptafluoro-2,2-dimethyloctanedionato Sm0.5, Y0.5 anilinium tetrakis 1-phenyl-1,3-butanedionato Sm0.5, Y0.5 triethylammonium tetrakis acetylacetonato Sm0.2, Y0.8 triethylammonium tetrakis dibenzoylmethanato Sm0.2, Y0.8 triethylammonium tetrakis thenoyltrifluoroacetonato Sm0.2, Y0.8 triethylammonium tetrakis 2,2,6,6-tetramethylheptanedionato Sm0.2, Y0.8 triethylammonium tetrakis 3-methylpentane-2,4-dionato Sm0.2, Y0.8 triethylammonium tetrakis 3-ethylpentane-2,4-dionato Sm0.2, Y0.8 triethylammonium tetrakis pivaloyltrifluoroacetonato Sm0.2, Y0.8 triethylammonium tetrakis trifluoroacetylacetonato Sm0.2, Y0.8 triethylammonium tetrakis hexafluoroacetylacetonato Sm0.2, Y0.8 triethylammonium tetrakis 6,6,7,7,8,8,8-heptafluoro-2,2-dimethyloctanedionato Sm0.2, Y0.8 triethylammonium tetrakis 1-phenyl-1,3-butanedionato Sm0.2, Y0.8 morpholinium tetrakis acetylacetonato Sm0.2, Y0.8 morpholinium tetrakis dibenzoylmethanato Sm0.2, Y0.8 morpholinium tetrakis thenoyltrifluoroacetonato Sm0.2, Y0.8 morpholinium tetrakis 2,2,6,6-tetramethylheptanedionato Sm0.2, Y0.8 morpholinium tetrakis 3-methylpentane-2,4-dionato Sm0.2, Y0.8 morpholinium tetrakis 3-ethylpentane-2,4-dionato Sm0.2, Y0.8 morpholinium tetrakis pivaloyltrifluoroacetonato Sm0.2, Y0.8 morpholinium tetrakis trifluoroacetylacetonato Sm0.2, Y0.8 morpholinium tetrakis hexafluoroacetylacetonato Sm0.2, Y0.8 morpholinium tetrakis 6,6,7,7,8,8,8-heptafluoro-2,2-dimethyloctanedionato Sm0.2, Y0.8 morpholinium tetrakis 1-phenyl-1,3-butanedionato Sm0.2, Y0.8 dimethylbenzylammonium tetrakis acetylacetonato Sm0.2, Y0.8 dimethylbenzylammonium tetrakis dibenzoylmethanato Sm0.2, Y0.8 dimethylbenzylammonium tetrakis thenoyltrifluoroacetonato Sm0.2, Y0.8 dimethylbenzylammonium tetrakis 2,2,6,6-tetramethylheptanedionato Sm0.2, Y0.8 dimethylbenzylammonium tetrakis 3-methylpentane-2,4-dionato Sm0.2, Y0.8 dimethylbenzylammonium tetrakis 3-ethylpentane-2,4-dionato Sm0.2, Y0.8 dimethylbenzylammonium tetrakis pivaloyltrifluoroacetonato Sm0.2, Y0.8 dimethylbenzylammonium tetrakis trifluoroacetylacetonato Sm0.2, Y0.8 dimethylbenzylammonium tetrakis hexafluoroacetylacetonato Sm0.2, Y0.8 dimethylbenzylammonium tetrakis 6,6,7,7,8,8,8-heptafluoro-2,2-dimethyloctanedionato Sm0.2, Y0.8 dimethylbenzylammonium tetrakis 1-phenyl-1,3-butanedionato Sm0.2, Y0.8 triallylammonium tetrakis acetylacetonato Sm0.2, Y0.8 triallylammonium tetrakis dibenzoylmethanato Sm0.2, Y0.8 triallylammonium tetrakis thenoyltrifluoroacetonato Sm0.2, Y0.8 triallylammonium tetrakis 2,2,6,6-tetramethylheptanedionato Sm0.2, Y0.8 triallylammonium tetrakis 3-methylpentane-2,4-dionato Sm0.2, Y0.8 triallylammonium tetrakis 3-ethylpentane-2,4-dionato Sm0.2, Y0.8 triallylammonium tetrakis pivaloyltrifluoroacetonato Sm0.2, Y0.8 triallylammonium tetrakis trifluoroacetylacetonato Sm0.2, Y0.8 triallylammonium tetrakis hexafluoroacetylacetonato Sm0.2, Y0.8 triallylammonium tetrakis 6,6,7,7,8,8,8-heptafluoro-2,2-dimethyloctanedionato Sm0.2, Y0.8 triallylammonium tetrakis 1-phenyl-1,3-butanedionato Sm0.2, Y0.8 anilinium tetrakis acetylacetonato Sm0.2, Y0.8
anilinium tetrakis dibenzoylmethanato Sm0.2, Y0.8
anilinium tetrakis thenoyltrifluoroacetonato Sm0.2, Y0.8
anilinium tetrakis 2,2,6,6-tetramethylheptanedionato Sm0.2, Y0.8
anilinium tetrakis 3-methylpentane-2,4-dionato Sm0.2, Y0.8
anilinium tetrakis 3-ethylpentane-2,4-dionato Sm0.2, Y0.8
anilinium tetrakis pivaloyltrifluoroacetonato Sm0.2, Y0.8
anilinium tetrakis trifluoroacetylacetonato Sm0.2, Y0.8
anilinium tetrakis hexafluoroacetylacetonato Sm0.2, Y0.8
anilinium tetrakis 6,6,7,7,8,8,8-heptafluoro-2,2-dimethyloctanedionato Sm0.2, Y0.8
anilinium tetrakis 1-phenyl-1,3-butanedionato Sm0.2, Y0.8
triethylammonium tetrakis acetylacetonato Sm0.1, Y0.9
triethylammonium tetrakis dibenzoylmethanato Sm0.1, Y0.9
triethylammonium tetrakis thenoyltrifluoroacetonato Sm0.1, Y0.9
triethylammonium tetrakis 2,2,6,6-tetramethylheptanedionato Sm0.1, Y0.9
triethylammonium tetrakis 3-methylpentane-2,4-dionato Sm0.1, Y0.9
triethylammonium tetrakis 3-ethylpentane-2,4-dionato Sm0.1, Y0.9
triethylammonium tetrakis pivaloyltrifluoroacetonato Sm0.1, Y0.9
triethylammonium tetrakis trifluoroacetylacetonato Sm0.1, Y0.9
triethylammonium tetrakis hexafluoroacetylacetonato Sm0.1, Y0.9
triethylammonium tetrakis 6,6,7,7,8,8,8-heptafluoro-2,2-dimethyloctanedionato Sm0.1, Y0.9
triethylammonium tetrakis 1-phenyl-1,3-butanedionato Sm0.1, Y0.9
morpholinium tetrakis acetylacetonato Sm0.1, Y0.9
morpholinium tetrakis dibenzoylmethanato Sm0.1, Y0.9
morpholinium tetrakis thenoyltrifluoroacetonato Sm0.1, Y0.9
morpholinium tetrakis 2,2,6,6-tetramethylheptanedionato Sm0.1, Y0.9
morpholinium tetrakis 3-methylpentane-2,4-dionato Sm0.1, Y0.9
morpholinium tetrakis 3-ethylpentane-2,4-dionato Sm0.1, Y0.9
morpholinium tetrakis pivaloyltrifluoroacetonato Sm0.1, Y0.9
morpholinium tetrakis trifluoroacetylacetonato Sm0.1, Y0.9
morpholinium tetrakis hexafluoroacetylacetonato Sm0.1, Y0.9
morpholinium tetrakis 6,6,7,7,8,8,8-heptafluoro-2,2-dimethyloctanedionato Sm0.1, Y0.9
morpholinium tetrakis 1-phenyl-1,3-butanedionato Sm0.1, Y0.9
dimethylbenzylammonium tetrakis acetylacetonato Sm0.1, Y0.9
dimethylbenzylammonium tetrakis dibenzoylmethanato Sm0.1, Y0.9
dimethylbenzylammonium tetrakis thenoyltrifluoroacetonato Sm0.1, Y0.9
dimethylbenzylammonium tetrakis 2,2,6,6-tetramethylheptanedionato Sm0.1, Y0.9
dimethylbenzylammonium tetrakis 3-methylpentane-2,4-dionato Sm0.1, Y0.9
dimethylbenzylammonium tetrakis 3-ethylpentane-2,4-dionato Sm0.1, Y0.9
dimethylbenzylammonium tetrakis pivaloyltrifluoroacetonato Sm0.1, Y0.9
dimethylbenzylammonium tetrakis trifluoroacetylacetonato Sm0.1, Y0.9
dimethylbenzylammonium tetrakis hexafluoroacetylacetonato Sm0.1, Y0.9
dimethylbenzylammonium tetrakis 6,6,7,7,8,8,8-heptafluoro-2,2-dimethyloctanedionato Sm0.1, Y0.9
dimethylbenzylammonium tetrakis 1-phenyl-1,3-butanedionato Sm0.1, Y0.9
triallylammonium tetrakis acetylacetonato Sm0.1, Y0.9
triallylammonium tetrakis dibenzoylmethanato Sm0.1, Y0.9
triallylammonium tetrakis thenoyltrifluoroacetonato Sm0.1, Y0.9
triallylammonium tetrakis 2,2,6,6-tetramethylheptanedionato Sm0.1, Y0.9
triallylammonium tetrakis 3-methylpentane-2,4-dionato Sm0.1, Y0.9
triallylammonium tetrakis 3-ethylpentane-2,4-dionato Sm0.1, Y0.9
triallylammonium tetrakis pivaloyltrifluoroacetonato Sm0.1, Y0.9
triallylammonium tetrakis trifluoroacetylacetonato Sm0.1, Y0.9
triallylammonium tetrakis hexafluoroacetylacetonato Sm0.1, Y0.9
triallylammonium tetrakis 6,6,7,7,8,8,8-heptafluoro-2,2-dimethyloctanedionato Sm0.1, Y0.9
triallylammonium tetrakis 1-phenyl-1,3-butanedionato Sm0.1, Y0.9
anilinium tetrakis acetylacetonato Sm0.1, Y0.9
anilinium tetrakis dibenzoylmethanato Sm0.1, Y0.9
anilinium tetrakis thenoyltrifluoroacetonato Sm0.1, Y0.9
anilinium tetrakis 2,2,6,6-tetramethylheptanedionato Sm0.1, Y0.9
anilinium tetrakis 3-methylpentane-2,4-dionato Sm0.1, Y0.9
anilinium tetrakis 3-ethylpentane-2,4-dionato Sm0.1, Y0.9
anilinium tetrakis pivaloyltrifluoroacetonato Sm0.1, Y0.9
anilinium tetrakis trifluoroacetylacetonato Sm0.1, Y0.9
anilinium tetrakis hexafluoroacetylacetonato Sm0.1, Y0.9
anilinium tetrakis 6,6,7,7,8,8,8-heptafluoro-2,2-dimethyloctanedionato Sm0.1, Y0.9
anilinium tetrakis 1-phenyl-1,3-butanedionato Sm0.1, Y0.9
triethylammonium tetrakis acetylacetonato Sm0.01, Y0.99
triethylammonium tetrakis dibenzoylmethanato Sm0.01, Y0.99
triethylammonium tetrakis thenoyltrifluoroacetonato Sm0.01, Y0.99
triethylammonium tetrakis 2,2,6,6-tetramethylheptanedionato Sm0.01, Y0.99
triethylammonium tetrakis 3-methylpentane-2,4-dionato Sm0.01, Y0.99
triethylammonium tetrakis 3-ethylpentane-2,4-dionato Sm0.01, Y0.99
triethylammonium tetrakis pivaloyltrifluoroacetonato Sm0.01, Y0.99
triethylammonium tetrakis trifluoroacetylacetonato Sm0.01, Y0.99
triethylammonium tetrakis hexafluoroacetylacetonato Sm0.01, Y0.99
triethylammonium tetrakis 6,6,7,7,8,8,8-heptafluoro-2,2-dimethyloctanedionato Sm0.01, Y0.99
triethylammonium tetrakis 1-phenyl-1,3-butanedionato Sm0.01, Y0.99
morpholinium tetrakis acetylacetonato Sm0.01, Y0.99
morpholinium tetrakis dibenzoylmethanato Sm0.01, Y0.99
morpholinium tetrakis thenoyltrifluoroacetonato Sm0.01, Y0.99 morpholinium tetrakis 2,2,6,6-tetramethylheptanedionato Sm0.01, Y0.99
morpholinium tetrakis 3-methylpentane-2,4-dionato Sm0.01, Y0.99
morpholinium tetrakis 3-ethylpentane-2,4-dionato Sm0.01, Y0.99
morpholinium tetrakis pivaloyltrifluoroacetonato Sm0.01, Y0.99
morpholinium tetrakis trifluoroacetylacetonato Sm0.01, Y0.99
morpholinium tetrakis hexafluoroacetylacetonato Sm0.01, Y0.99
morpholinium tetrakis 6,6,7,7,8,8,8-heptafluoro-2,2-dimethyloctanedionato Sm0.01, Y0.99
morpholinium tetrakis 1-phenyl-1,3-butanedionato Sm0.01, Y0.99
dimethylbenzylammonium tetrakis acetylacetonato Sm0.01, Y0.99
dimethylbenzylammonium tetrakis dibenzoylmethanato Sm0.01, Y0.99
dimethylbenzylammonium tetrakis thenoyltrifluoroacetonato Sm0.01, Y0.99
dimethylbenzylammonium tetrakis 2,2,6,6-tetramethylheptanedionato Sm0.01, Y0.99
dimethylbenzylammonium tetrakis 3-methylpentane-2,4-dionato Sm0.01, Y0.99
dimethylbenzylammonium tetrakis 3-ethylpentane-2,4-dionato Sm0.01, Y0.99
dimethylbenzylammonium tetrakis pivaloyltrifluoroacetonato Sm0.01, Y0.99
dimethylbenzylammonium tetrakis trifluoroacetylacetonato Sm0.01, Y0.99
dimethylbenzylammonium tetrakis hexafluoroacetylacetonato Sm0.01, Y0.99
dimethylbenzylammonium tetrakis 6,6,7,7,8,8,8-heptafluoro-2,2-dimethyloctanedionato Sm0.01, Y0.99
dimethylbenzylammonium tetrakis 1-phenyl-1,3-butanedionato Sm0.01, Y0.99
triallylammonium tetrakis acetylacetonato Sm0.01, Y0.99
triallylammonium tetrakis dibenzoylmethanato Sm0.01, Y0.99
triallylammonium tetrakis thenoyltrifluoroacetonato Sm0.01, Y0.99
triallylammonium tetrakis 2,2,6,6-tetramethylheptanedionato Sm0.01, Y0.99
triallylammonium tetrakis 3-methylpentane-2,4-dionato Sm0.01, Y0.99
triallylammonium tetrakis 3-ethylpentane-2,4-dionato Sm0.01, Y0.99
triallylammonium tetrakis pivaloyltrifluoroacetonato Sm0.01, Y0.99
triallylammonium tetrakis trifluoroacetylacetonato Sm0.01, Y0.99
triallylammonium tetrakis hexafluoroacetylacetonato Sm0.01, Y0.99
triallylammonium tetrakis 6,6,7,7,8,8,8-heptafluoro-2,2-dimethyloctanedionato Sm0.01, Y0.99
triallylammonium tetrakis 1-phenyl-1,3-butanedionato Sm0.01, Y0.99
anilinium tetrakis acetylacetonato Sm0.01, Y0.99
anilinium tetrakis dibenzoylmethanato Sm0.01, Y0.99
anilinium tetrakis thenoyltrifluoroacetonato Sm0.01, Y0.99
anilinium tetrakis 2,2,6,6-tetramethylheptanedionato Sm0.01, Y0.99
anilinium tetrakis 3-methylpentane-2,4-dionato Sm0.01, Y0.99
anilinium tetrakis 3-ethylpentane-2,4-dionato Sm0.01, Y0.99
anilinium tetrakis pivaloyltrifluoroacetonato Sm0.01, Y0.99
anilinium tetrakis trifluoroacetylacetonato Sm0.01, Y0.99
anilinium tetrakis hexafluoroacetylacetonato Sm0.01, Y0.99
anilinium tetrakis 6,6,7,7,8,8,8-heptafluoro-2,2-dimethyloctanedionato Sm0.01, Y0.99
anilinium tetrakis 1-phenyl-1,3-butanedionato Sm0.01, Y0.99
triethylammonium tetrakis acetylacetonato Dy0.5, Y0.5
triethylammonium tetrakis dibenzoylmethanato Dy0.5, Y0.5
triethylammonium tetrakis thenoyltrifluoroacetonato Dy0.5, Y0.5
triethylammonium tetrakis 2,2,6,6-tetramethylheptanedionato Dy0.5, Y0.5
triethylammonium tetrakis 3-methylpentane-2,4-dionato Dy0.5, Y0.5
triethylammonium tetrakis 3-ethylpentane-2,4-dionato Dy0.5, Y0.5
triethylammonium tetrakis pivaloyltrifluoroacetonato Dy0.5, Y0.5
triethylammonium tetrakis trifluoroacetylacetonato Dy0.5, Y0.5
triethylammonium tetrakis hexafluoroacetylacetonato Dy0.5, Y0.5
triethylammonium tetrakis 6,6,7,7,8,8,8-heptafluoro-2,2-dimethyloctanedionato Dy0.5, Y0.5
triethylammonium tetrakis 1-phenyl-1,3-butanedionato Dy0.5, Y0.5
morpholinium tetrakis acetylacetonato Dy0.5, Y0.5
morpholinium tetrakis dibenzoylmethanato Dy0.5, Y0.5
morpholinium tetrakis thenoyltrifluoroacetonato Dy0.5, Y0.5
morpholinium tetrakis 2,2,6,6-tetramethylheptanedionato Dy0.5, Y0.5
morpholinium tetrakis 3-methylpentane-2,4-dionato Dy0.5, Y0.5
morpholinium tetrakis 3-ethylpentane-2,4-dionato Dy0.5, Y0.5
morpholinium tetrakis pivaloyltrifluoroacetonato Dy0.5, Y0.5
morpholinium tetrakis trifluoroacetylacetonato Dy0.5, Y0.5
morpholinium tetrakis hexafluoroacetylacetonato Dy0.5, Y0.5
morpholinium tetrakis 6,6,7,7,8,8,8-heptafluoro-2,2-dimethyloctanedionato Dy0.5, Y0.5
morpholinium tetrakis 1-phenyl-1,3-butanedionato Dy0.5, Y0.5
dimethylbenzylammonium tetrakis acetylacetonato Dy0.5, Y0.5
dimethylbenzylammonium tetrakis dibenzoylmethanato Dy0.5, Y0.5
dimethylbenzylammonium tetrakis thenoyltrifluoroacetonato Dy0.5, Y0.5
dimethylbenzylammonium tetrakis 2,2,6,6-tetramethylheptanedionato Dy0.5, Y0.5
dimethylbenzylammonium tetrakis 3-methylpentane-2,4-dionato Dy0.5, Y0.5
dimethylbenzylammonium tetrakis 3-ethylpentane-2,4-dionato Dy0.5, Y0.5
dimethylbenzylammonium tetrakis pivaloyltrifluoroacetonato Dy0.5, Y0.5
dimethylbenzylammonium tetrakis trifluoroacetylacetonato Dy0.5, Y0.5
dimethylbenzylammonium tetrakis hexafluoroacetylacetonato Dy0.5, Y0.5 dimethylbenzylammonium tetrakis 6,6,7,7,8,8,8-heptafluoro-2,2-dimethyloctanedionato Dy0.5, Y0.5
dimethylbenzylammonium tetrakis 1-phenyl-1,3-butanedionato Dy0.5, Y0.5
triallylammonium tetrakis acetylacetonato Dy0.5, Y0.5
triallylammonium tetrakis dibenzoylmethanato Dy0.5, Y0.5
triallylammonium tetrakis thenoyltrifluoroacetonato Dy0.5, Y0.5
triallylammonium tetrakis 2,2,6,6-tetramethylheptanedionato Dy0.5, Y0.5
triallylammonium tetrakis 3-methylpentane-2,4-dionato Dy0.5, Y0.5.
triallylammonium tetrakis 3-ethylpentane-2,4-dionato Dy0.5, Y0.5
triallylammonium tetrakis pivaloyltrifluoroacetonato Dy0.5, Y0.5
triallylammonium tetrakis trifluoroacetylacetonato Dy0.5, Y0.5
triallylammonium tetrakis hexafluoroacetylacetonato Dy0.5, Y0.5
triallylammonium tetrakis 6,6,7,7,8,8,8-heptafluoro-2,2-dimethyloctanedionato Dy0.5, Y0.5
triallylammonium tetrakis 1-phenyl-1,3-butanedionato Dy0.5, Y0.5
anilinium tetrakis acetylacetonato Dy0.5, Y0.5
anilinium tetrakis dibenzoylmethanato Dy0.5, Y0.5
anilinium tetrakis thenoyltrifluoroacetonato Dy0.5, Y0.5
anilinium tetrakis 2,2,6,6-tetramethylheptanedionato Dy0.5, Y0.5
anilinium tetrakis 3-methylpentane-2,4-dionato Dy0.5, Y0.5
anilinium tetrakis 3-ethylpentane-2,4-dionato Dy0.5, Y0.5
anilinium tetrakis pivaloyltrifluoroacetonato Dy0.5, Y0.5
anilinium tetrakis trifluoroacetylacetonato Dy0.5, Y0.5
anilinium tetrakis hexafluoroacetylacetonato Dy0.5, Y0.5
anilinium tetrakis 6,6,7,7,8,8,8-heptafluoro-2,2-dimethyloctanedionato Dy0.5, Y0.5
anilinium tetrakis 1-phenyl-1,3-butanedionato Dy0.5, Y0.5
triethylammonium tetrakis acetylacetonato Dy0.2, Y0.8
triethylammonium tetrakis dibenzoylmethanato Dy0.2, Y0.8
triethylammonium tetrakis thenoyltrifluoroacetonato Dy0.2, Y0.8
triethylammonium tetrakis 2,2,6,6-tetramethylheptanedionato Dy0.2, Y0.8
triethylammonium tetrakis 3-methylpentane-2,4-dionato Dy0.2, Y0.8
triethylammonium tetrakis 3-ethylpentane-2,4-dionato Dy0.2, Y0.8
triethylammonium tetrakis pivaloyltrifluoroacetonato Dy0.2, Y0.8
triethylammonium tetrakis trifluoroacetylacetonato Dy0.2, Y0.8
triethylammonium tetrakis hexafluoroacetylacetonato Dy0.2, Y0.8
triethylammonium tetrakis 6,6,7,7,8,8,8-heptafluoro-2,2-dimethyloctanedionato Dy0.2, Y0.8
triethylammonium tetrakis 1-phenyl-1,3-butanedionato Dy0.2, Y0.8
morpholinium tetrakis acetylacetonato Dy0.2, Y0.8
morpholinium tetrakis dibenzoylmethanato Dy0.2, Y0.8
morpholinium tetrakis thenoyltrifluoroacetonato Dy0.2, Y0.8
morpholinium tetrakis 2,2,6,6-tetramethylheptanedionato Dy0.2, Y0.8
morpholinium tetrakis 3-methylpentane-2,4-dionato Dy0.2, Y0.8
morpholinium tetrakis 3-ethylpentane-2,4-dionato Dy0.2, Y0.8
morpholinium tetrakis pivaloyltrifluoroacetonato Dy0.2, Y0.8
morpholinium tetrakis trifluoroacetylacetonato Dy0.2, Y0.8
morpholinium tetrakis hexafluoroacetylacetonato Dy0.2, Y0.8
morpholinium tetrakis 6,6,7,7,8,8,8-heptafluoro-2,2-dimethyloctanedionato Dy0.2, Y0.8
morpholinium tetrakis 1-phenyl-1,3-butanedionato Dy0.2, Y0.8
dimethylbenzylammonium tetrakis acetylacetonato Dy0.2, Y0.8
dimethylbenzylammonium tetrakis dibenzoylmethanato Dy0.2, Y0.8
dimethylbenzylammonium tetrakis thenoyltrifluoroacetonato Dy0.2, Y0.8
dimethylbenzylammonium tetrakis 2,2,6,6-tetramethylheptanedionato Dy0.2, Y0.8
dimethylbenzylammonium tetrakis 3-methylpentane-2,4-dionato Dy0.2, Y0.8
dimethylbenzylammonium tetrakis 3-ethylpentane-2,4-dionato Dy0.2, Y0.8
dimethylbenzylammonium tetrakis pivaloyltrifluoroacetonato Dy0.2, Y0.8
dimethylbenzylammonium tetrakis trifluoroacetylacetonato Dy0.2, Y0.8
dimethylbenzylammonium tetrakis hexafluoroacetylacetonato Dy0.2, Y0.8
dimethylbenzylammonium tetrakis 6,6,7,7,8,8,8-heptafluoro-2,2-dimethyloctanedionato Dy0.2, Y0.8
dimethylbenzylammonium tetrakis 1-phenyl-1,3-butanedionato Dy0.2, Y0.8
triallylammonium tetrakis acetylacetonato Dy0.2, Y0.8
triallylammonium tetrakis dibenzoylmethanato Dy0.2, Y0.8
triallylammonium tetrakis thenoyltrifluoroacetonato Dy0.2, Y0.8
triallylammonium tetrakis 2,2,6,6-tetramethylheptanedionato Dy0.2, Y0.8
triallylammonium tetrakis 3-methylpentane-2,4-dionato Dy0.2, Y0.8
triallylammonium tetrakis 3-ethylpentane-2,4-dionato Dy0.2, Y0.8
triallylammonium tetrakis pivaloyltrifluoroacetonato Dy0.2, Y0.8
triallylammonium tetrakis trifluoroacetylacetonato Dy0.2, Y0.8
triallylammonium tetrakis hexafluoroacetylacetonato Dy0.2, Y0.8
triallylammonium tetrakis 6,6,7,7,8,8,8-heptafluoro-2,2-dimethyloctanedionato Dy0.2, Y0.8
triallylammonium tetrakis 1-phenyl-1,3-butanedionato Dy0.2, Y0.8
anilinium tetrakis acetylacetonato Dy0.2, Y0.8
anilinium tetrakis dibenzoylmethanato Dy0.2, Y0.8
anilinium tetrakis thenoyltrifluoroacetonato Dy0.2, Y0.8
anilinium tetrakis 2,2,6,6-tetramethylheptanedionato Dy0.2, Y0.8
anilinium tetrakis 3-methylpentane-2,4-dionato Dy0.2, Y0.8
anilinium tetrakis 3-ethylpentane-2,4-dionato Dy0.2, Y0.8
anilinium tetrakis pivaloyltrifluoroacetonato Dy0.2, Y0.8
anilinium tetrakis trifluoroacetylacetonato Dy0.2, Y0.8
anilinium tetrakis hexafluoroacetylacetonato Dy0.2, Y0.8
anilinium tetrakis 6,6,7,7,8,8,8-heptafluoro-2,2-dimethyloctanedionato Dy0.2, Y0.8
anilinium tetrakis 1-phenyl-1,3-butanedionato Dy0.2, Y0.8
triethylammonium tetrakis acetylacetonato Dy0.1, Y0.9
triethylammonium tetrakis dibenzoylmethanato Dy0.1, Y0.9 triethylammonium tetrakis thenoyltrifluoroacetonato Dy0.1, Y0.9
triethylammonium tetrakis 2,2,6,6-tetramethylheptanedionato Dy0.1, Y0.9
triethylammonium tetrakis 3-methylpentane-2,4-dionato Dy0.1, Y0.9
triethylammonium tetrakis 3-ethylpentane-2,4-dionato Dy0.1, Y0.9
triethylammonium tetrakis pivaloyltrifluoroacetonato Dy0.1, Y0.9
triethylammonium tetrakis trifluoroacetylacetonato Dy0.1, Y0.9
triethylammonium tetrakis hexafluoroacetylacetonato Dy0.1, Y0.9
triethylammonium tetrakis 6,6,7,7,8,8,8-heptafluoro-2,2-dimethyloctanedionato Dy0.1, Y0.9
triethylammonium tetrakis 1-phenyl-1,3-butanedionato Dy0.1, Y0.9
morpholinium tetrakis acetylacetonato Dy0.1, Y0.9
morpholinium tetrakis dibenzoylmethanato Dy0.1, Y0.9
morpholinium tetrakis thenoyltrifluoroacetonato Dy0.1, Y0.9
morpholinium tetrakis 2,2,6,6-tetramethylheptanedionato Dy0.1, Y0.9
morpholinium tetrakis 3-methylpentane-2,4-dionato Dy0.1, Y0.9
morpholinium tetrakis 3-ethylpentane-2,4-dionato Dy0.1, Y0.9
morpholinium tetrakis pivaloyltrifluoroacetonato Dy0.1, Y0.9
morpholinium tetrakis trifluoroacetylacetonato Dy0.1, Y0.9
morpholinium tetrakis hexafluoroacetylacetonato Dy0.1, Y0.9
morpholinium tetrakis 6,6,7,7,8,8,8-heptafluoro-2,2-dimethyloctanedionato Dy0.1, Y0.9
morpholinium tetrakis 1-phenyl-1,3-butanedionato Dy0.1, Y0.9
dimethylbenzylammonium tetrakis acetylacetonato Dy0.1, Y0.9
dimethylbenzylammonium tetrakis dibenzoylmethanato Dy0.1, Y0.9
dimethylbenzylammonium tetrakis thenoyltrifluoroacetonato Dy0.1, Y0.9
dimethylbenzylammonium tetrakis 2,2,6,6-tetramethylheptanedionato Dy0.1, Y0.9
dimethylbenzylammonium tetrakis 3-methylpentane-2,4-dionato Dy0.1, Y0.9
dimethylbenzylammonium tetrakis 3-ethylpentane-2,4-dionato Dy0.1, Y0.9
dimethylbenzylammonium tetrakis pivaloyltrifluoroacetonato Dy0.1, Y0.9
dimethylbenzylammonium tetrakis trifluoroacetylacetonato Dy0.1, Y0.9
dimethylbenzylammonium tetrakis hexafluoroacetylacetonato Dy0.1, Y0.9
dimethylbenzylammonium tetrakis 6,6,7,7,8,8,8-heptafluoro-2,2-dimethyloctanedionato Dy0.1, Y0.9
dimethylbenzylammonium tetrakis 1-phenyl-1,3-butanedionato Dy0.1, Y0.9
triallylammonium tetrakis acetylacetonato Dy0.1, Y0.9
triallylammonium tetrakis dibenzoylmethanato Dy0.1, Y0.9
triallylammonium tetrakis thenoyltrifluoroacetonato Dy0.1, Y0.9
triallylammonium tetrakis 2,2,6,6-tetramethylheptanedionato Dy0.1, Y0.9
triallylammonium tetrakis 3-methylpentane-2,4-dionato Dy0.1, Y0.9
triallylammonium tetrakis 3-ethylpentane-2,4-dionato Dy0.1, Y0.9
triallylammonium tetrakis pivaloyltrifluoroacetonato Dy0.1, Y0.9
triallylammonium tetrakis trifluoroacetylacetonato Dy0.1, Y0.9
triallylammonium tetrakis hexafluoroacetylacetonato Dy0.1, Y0.9
triallylammonium tetrakis 6,6,7,7,8,8,8-heptafluoro-2,2-dimethyloctanedionato Dy0.1, Y0.9
triallylammonium tetrakis 1-phenyl-1,3-butanedionato Dy0.1, Y0.9
anilinium tetrakis acetylacetonato Dy0.1, Y0.9
anilinium tetrakis dibenzoylmethanato Dy0.1, Y0.9
anilinium tetrakis thenoyltrifluoroacetonato Dy0.1, Y0.9
anilinium tetrakis 2,2,6,6-tetramethylheptanedionato Dy0.1, Y0.9
anilinium tetrakis 3-methylpentane-2,4-dionato Dy0.1, Y0.9
anilinium tetrakis 3-ethylpentane-2,4-dionato Dy0.1, Y0.9
anilinium tetrakis pivaloyltrifluoroacetonato Dy0.1, Y0.9
anilinium tetrakis trifluoroacetylacetonato Dy0.1, Y0.9
anilinium tetrakis hexafluoroacetylacetonato Dy0.1, Y0.9
anilinium tetrakis 6,6,7,7,8,8,8-heptafluoro-2,2-dimethyloctanedionato Dy0.1, Y0.9
anilinium tetrakis 1-phenyl-1,3-butanedionato Dy0.1, Y0.9
triethylammonium tetrakis acetylacetonato Dy0.01, Y0.99
triethylammonium tetrakis dibenzoylmethanato Dy0.01, Y0.99
triethylammonium tetrakis thenoyltrifluoroacetonato Dy0.01, Y0.99
triethylammonium tetrakis 2,2,6,6-tetramethylheptanedionato Dy0.01, Y0.99
triethylammonium tetrakis 3-methylpentane-2,4-dionato Dy0.01, Y0.99
triethylammonium tetrakis 3-ethylpentane-2,4-dionato Dy0.01, Y0.99
triethylammonium tetrakis pivaloyltrifluoroacetonato Dy0.01, Y0.99
triethylammonium tetrakis trifluoroacetylacetonato Dy0.01, Y0.99
triethylammonium tetrakis hexafluoroacetylacetonato Dy0.01, Y0.99
triethylammonium tetrakis 6,6,7,7,8,8,8-heptafluoro-2,2-dimethyloctanedionato Dy0.01, Y0.99
triethylammonium tetrakis 1-phenyl-1,3-butanedionato Dy0.01, Y0.99
morpholinium tetrakis acetylacetonato Dy0.01, Y0.99
morpholinium tetrakis dibenzoylmethanato Dy0.01, Y0.99
morpholinium tetrakis thenoyltrifluoroacetonato Dy0.01, Y0.99
morpholinium tetrakis 2,2,6,6-tetramethylheptanedionato Dy0.01, Y0.99
morpholinium tetrakis 3-methylpentane-2,4-dionato Dy0.01, Y0.99
morpholinium tetrakis 3-ethylpentane-2,4-dionato Dy0.01, Y0.99
morpholinium tetrakis pivaloyltrifluoroacetonato Dy0.01, Y0.99
morpholinium tetrakis trifluoroacetylacetonato Dy0.01, Y0.99
morpholinium tetrakis hexafluoroacetylacetonato Dy0.01, Y0.99
morpholinium tetrakis 6,6,7,7,8,8,8-heptafluoro-2,2-dimethyloctanedionato Dy0.01, Y0.99
morpholinium tetrakis 1-phenyl-1,3-butanedionato Dy0.01, Y0.99 dimethylbenzylammonium tetrakis acetylacetonato Dy0.01, Y0.99
dimethylbenzylammonium tetrakis dibenzoylmethanato Dy0.01, Y0.99
dimethylbenzylammonium tetrakis thenoyltrifluoroacetonato Dy0.01, Y0.99
dimethylbenzylammonium tetrakis 2,2,6,6-tetramethylheptanedionato Dy0.01, Y0.99
dimethylbenzylammonium tetrakis 3-methylpentane-2,4-dionato Dy0.01, Y0.99
dimethylbenzylammonium tetrakis 3-ethylpentane-2,4-dionato Dy0.01, Y0.99
dimethylbenzylammonium tetrakis pivaloyltrifluoroacetonato Dy0.01, Y0.99
dimethylbenzylammonium tetrakis trifluoroacetylacetonato Dy0.01, Y0.99
dimethylbenzylammonium tetrakis hexafluoroacetylacetonato Dy0.01, Y0.99
dimethylbenzylammonium tetrakis 6,6,7,7,8,8,8-heptafluoro-2,2-dimethyloctanedionato Dy0.01, Y0.99
dimethylbenzylammonium tetrakis 1-phenyl-1,3-butanedionato Dy0.01, Y0.99
triallylammonium tetrakis acetylacetonato Dy0.01, Y0.99
triallylammonium tetrakis dibenzoylmethanato Dy0.01, Y0.99
triallylammonium tetrakis thenoyltrifluoroacetonato Dy0.01, Y0.99
triallylammonium tetrakis 2,2,6,6-tetramethylheptanedionato Dy0.01, Y0.99
triallylammonium tetrakis 3-methylpentane-2,4-dionato Dy0.01, Y0.99
triallylammonium tetrakis 3-ethylpentane-2,4-dionato Dy0.01, Y0.99
triallylammonium tetrakis pivaloyltrifluoroacetonato Dy0.01, Y0.99
triallylammonium tetrakis trifluoroacetylacetonato Dy0.01, Y0.99
triallylammonium tetrakis hexafluoroacetylacetonato Dy0.01, Y0.99
triallylammonium tetrakis 6,6,7,7,8,8,8-heptafluoro-2,2-dimethyloctanedionato Dy0.01, Y0.99
triallylammonium tetrakis 1-phenyl-1,3-butanedionato Dy0.01, Y0.99
anilinium tetrakis acetylacetonato Dy0.01, Y0.99
anilinium tetrakis dibenzoylmethanato Dy0.01, Y0.99
anilinium tetrakis thenoyltrifluoroacetonato Dy0.01, Y0.99
anilinium tetrakis 2,2,6,6-tetramethylheptanedionato Dy0.01, Y0.99
anilinium tetrakis 3-methylpentane-2,4-dionato Dy0.01, Y0.99
anilinium tetrakis 3-ethylpentane-2,4-dionato Dy0.01, Y0.99
anilinium tetrakis pivaloyltrifluoroacetonato Dy0.01, Y0.99
anilinium tetrakis trifluoroacetylacetonato Dy0.01, Y0.99
anilinium tetrakis hexafluoroacetylacetonato Dy0.01, Y0.99
anilinium tetrakis 6,6,7,7,8,8,8-heptafluoro-2,2-dimethyloctanedionato Dy0.01, Y0.99
anilinium tetrakis 1-phenyl-1,3-butanedionato Dy0.01, Y0.99
triethylammonium tetrakis acetylacetonato Dy0.5, Y0.5
triethylammonium tetrakis dibenzoylmethanato Dy0.5, Y0.5
triethylammonium tetrakis thenoyltrifluoroacetonato Dy0.5, Y0.5
triethylammonium tetrakis 2,2,6,6-tetramethylheptanedionato Dy0.5, Y0.5
triethylammonium tetrakis 3-methylpentane-2,4-dionato Dy0.5, Y0.5
triethylammonium tetrakis 3-ethylpentane-2,4-dionato Dy0.5, Y0.5
triethylammonium tetrakis pivaloyltrifluoroacetonato Dy0.5, Y0.5
triethylammonium tetrakis trifluoroacetylacetonato Dy0.5, Y0.5
triethylammonium tetrakis hexafluoroacetylacetonato Dy0.5, Y0.5
triethylammonium tetrakis 6,6,7,7,8,8,8-heptafluoro-2,2-dimethyloctanedionato Dy0.5, Y0.5
triethylammonium tetrakis 1-phenyl-1,3-butanedionato Dy0.5, Y0.5
morpholinium tetrakis acetylacetonato Dy0.5, Y0.5
morpholinium tetrakis dibenzoylmethanato Dy0.5, Y0.5
morpholinium tetrakis thenoyltrifluoroacetonato Dy0.5, Y0.5
morpholinium tetrakis 2,2,6,6-tetramethylheptanedionato Dy0.5, Y0.5
morpholinium tetrakis 3-methylpentane-2,4-dionato Dy0.5, Y0.5
morpholinium tetrakis 3-ethylpentane-2,4-dionato Dy0.5, Y0.5
morpholinium tetrakis pivaloyltrifluoroacetonato Dy0.5, Y0.5
morpholinium tetrakis trifluoroacetylacetonato Dy0.5, Y0.5
morpholinium tetrakis hexafluoroacetylacetonato Dy0.5, Y0.5
morpholinium tetrakis 6,6,7,7,8,8,8-heptafluoro-2,2-dimethyloctanedionato Dy0.5, Y0.5
morpholinium tetrakis 1-phenyl-1,3-butanedionato Dy0.5, Y0.5
dimethylbenzylammonium tetrakis acetylacetonato Dy0.5, Y0.5
dimethylbenzylammonium tetrakis dibenzoylmethanato Dy0.5, Y0.5
dimethylbenzylammonium tetrakis thenoyltrifluoroacetonato Dy0.5, Y0.5
dimethylbenzylammonium tetrakis 2,2,6,6-tetramethylheptanedionato Dy0.5, Y0.5
dimethylbenzylammonium tetrakis 3-methylpentane-2,4-dionato Dy0.5, Y0.5
dimethylbenzylammonium tetrakis 3-ethylpentane-2,4-dionato Dy0.5, Y0.5
dimethylbenzylammonium tetrakis pivaloyltrifluoroacetonato Dy0.5, Y0.5
dimethylbenzylammonium tetrakis trifluoroacetylacetonato Dy0.5, Y0.5
dimethylbenzylammonium tetrakis hexafluoroacetylacetonato Dy0.5, Y0.5
dimethylbenzylammonium tetrakis 6,6,7,7,8,8,8-heptafluoro-2,2-dimethyloctanedionato Dy0.5, Y0.5
dimethylbenzylammonium tetrakis 1-phenyl-1,3-butanedionato Dy0.5, Y0.5
triallylammonium tetrakis acetylacetonato Dy0.5, Y0.5
triallylammonium tetrakis dibenzoylmethanato Dy0.5, Y0.5
triallylammonium tetrakis thenoyltrifluoroacetonato Dy0.5, Y0.5
triallylammonium tetrakis 2,2,6,6-tetramethylheptanedionato Dy0.5, Y0.5
triallylammonium tetrakis 3-methylpentane-2,4-dionato Dy0.5, Y0.5
triallylammonium tetrakis 3-ethylpentane-2,4-dionato Dy0.5, Y0.5
triallylammonium tetrakis pivaloyltrifluoroacetonato Dy0.5, Y0.5
triallylammonium tetrakis trifluoroacetylacetonato Dy0.5, Y0.5 triallylammonium tetrakis hexafluoroacetylacetonato Dy0.5, Y0.5
triallylammonium tetrakis 6,6,7,7,8,8,8-heptafluoro-2,2-dimethyloctanedionato Dy0.5, Y0.5
triallylammonium tetrakis 1-phenyl-1,3-butanedionato Dy0.5, Y0.5
anilinium tetrakis acetylacetonato Dy0.5, Y0.5
anilinium tetrakis dibenzoylmethanato Dy0.5, Y0.5
anilinium tetrakis thenoyltrifluoroacetonato Dy0.5, Y0.5
anilinium tetrakis 2,2,6,6-tetramethylheptanedionato Dy0.5, Y0.5
anilinium tetrakis 3-methylpentane-2,4-dionato Dy0.5, Y0.5
anilinium tetrakis 3-ethylpentane-2,4-dionato Dy0.5, Y0.5
anilinium tetrakis pivaloyltrifluoroacetonato Dy0.5, Y0.5
anilinium tetrakis trifluoroacetylacetonato Dy0.5, Y0.5
anilinium tetrakis hexafluoroacetylacetonato Dy0.5, Y0.5
anilinium tetrakis 6,6,7,7,8,8,8-heptafluoro-2,2-dimethyloctanedionato Dy0.5, Y0.5
anilinium tetrakis 1-phenyl-1,3-butanedionato Dy0.5, Y0.5
triethylammonium tetrakis acetylacetonato Dy0.2, Y0.8
triethylammonium tetrakis dibenzoylmethanato Dy0.2, Y0.8
triethylammonium tetrakis thenoyltrifluoroacetonato Dy0.2, Y0.8
triethylammonium tetrakis 2,2,6,6-tetramethylheptanedionato Dy0.2, Y0.8
triethylammonium tetrakis 3-methylpentane-2,4-dionato Dy0.2, Y0.8
triethylammonium tetrakis 3-ethylpentane-2,4-dionato Dy0.2, Y0.8
triethylammonium tetrakis pivaloyltrifluoroacetonato Dy0.2, Y0.8
triethylammonium tetrakis trifluoroacetylacetonato Dy0.2, Y0.8
triethylammonium tetrakis hexafluoroacetylacetonato Dy0.2, Y0.8
triethylammonium tetrakis 6,6,7,7,8,8,8-heptafluoro-2,2-dimethyloctanedionato Dy0.2, Y0.8
triethylammonium tetrakis 1-phenyl-1,3-butanedionato Dy0.2, Y0.8
morpholinium tetrakis acetylacetonato Dy0.2, Y0.8
morpholinium tetrakis dibenzoylmethanato Dy0.2, Y0.8
morpholinium tetrakis thenoyltrifluoroacetonato Dy0.2, Y0.8
morpholinium tetrakis 2,2,6,6-tetramethylheptanedionato Dy0.2, Y0.8
morpholinium tetrakis 3-methylpentane-2,4-dionato Dy0.2, Y0.8
morpholinium tetrakis 3-ethylpentane-2,4-dionato Dy0.2, Y0.8
morpholinium tetrakis pivaloyltrifluoroacetonato Dy0.2, Y0.8
morpholinium tetrakis trifluoroacetylacetonato Dy0.2, Y0.8
morpholinium tetrakis hexafluoroacetylacetonato Dy0.2, Y0.8
morpholinium tetrakis 6,6,7,7,8,8,8-heptafluoro-2,2-dimethyloctanedionato Dy0.2, Y0.8
morpholinium tetrakis 1-phenyl-1,3-butanedionato Dy0.2, Y0.8
dimethylbenzylammonium tetrakis acetylacetonato Dy0.2, Y0.8
dimethylbenzylammonium tetrakis dibenzoylmethanato Dy0.2, Y0.8
dimethylbenzylammonium tetrakis thenoyltrifluoroacetonato Dy0.2, Y0.8
dimethylbenzylammonium tetrakis 2,2,6,6-tetramethylheptanedionato Dy0.2, Y0.8
dimethylbenzylammonium tetrakis 3-methylpentane-2,4-dionato Dy0.2, Y0.8
dimethylbenzylammonium tetrakis 3-ethylpentane-2,4-dionato Dy0.2, Y0.8
dimethylbenzylammonium tetrakis pivaloyltrifluoroacetonato Dy0.2, Y0.8
dimethylbenzylammonium tetrakis trifluoroacetylacetonato Dy0.2, Y0.8
dimethylbenzylammonium tetrakis hexafluoroacetylacetonato Dy0.2, Y0.8
dimethylbenzylammonium tetrakis 6,6,7,7,8,8,8-heptafluoro-2,2-dimethyloctanedionato Dy0.2, Y0.8
dimethylbenzylammonium tetrakis 1-phenyl-1,3-butanedionato Dy0.2, Y0.8
triallylammonium tetrakis acetylacetonato Dy0.2, Y0.8
triallylammonium tetrakis dibenzoylmethanato Dy0.2, Y0.8
triallylammonium tetrakis thenoyltrifluoroacetonato Dy0.2, Y0.8
triallylammonium tetrakis 2,2,6,6-tetramethylheptanedionato Dy0.2, Y0.8
triallylammonium tetrakis 3-methylpentane-2,4-dionato Dy0.2, Y0.8
triallylammonium tetrakis 3-ethylpentane-2,4-dionato Dy0.2, Y0.8
triallylammonium tetrakis pivaloyltrifluoroacetonato Dy0.2, Y0.8
triallylammonium tetrakis trifluoroacetylacetonato Dy0.2, Y0.8
triallylammonium tetrakis hexafluoroacetylacetonato Dy0.2, Y0.8
triallylammonium tetrakis 6,6,7,7,8,8,8-heptafluoro-2,2-dimethyloctanedionato Dy0.2, Y0.8
triallylammonium tetrakis 1-phenyl-1,3-butanedionato Dy0.2, Y0.8
anilinium tetrakis acetylacetonato Dy0.2, Y0.8
anilinium tetrakis dibenzoylmethanato Dy0.2, Y0.8
anilinium tetrakis thenoyltrifluoroacetonato Dy0.2, Y0.8
anilinium tetrakis 2,2,6,6-tetramethylheptanedionato Dy0.2, Y0.8
anilinium tetrakis 3-methylpentane-2,4-dionato Dy0.2, Y0.8
anilinium tetrakis 3-ethylpentane-2,4-dionato Dy0.2, Y0.8
anilinium tetrakis pivaloyltrifluoroacetonato Dy0.2, Y0.8
anilinium tetrakis trifluoroacetylacetonato Dy0.2, Y0.8
anilinium tetrakis hexafluoroacetylacetonato Dy0.2, Y0.8
anilinium tetrakis 6,6,7,7,8,8,8-heptafluoro-2,2-dimethyloctanedionato Dy0.2, Y0.8
anilinium tetrakis 1-phenyl-1,3-butanedionato Dy0.2, Y0.8
triethylammonium tetrakis acetylacetonato Dy0.1, Y0.9
triethylammonium tetrakis dibenzoylmethanato Dy0.1, Y0.9
triethylammonium tetrakis thenoyltrifluoroacetonato Dy0.1, Y0.9
triethylammonium tetrakis 2,2,6,6-tetramethylheptanedionato Dy0.1, Y0.9
triethylammonium tetrakis 3-methylpentane-2,4-dionato Dy0.1, Y0.9
triethylammonium tetrakis 3-ethylpentane-2,4-dionato Dy0.1, Y0.9
triethylammonium tetrakis pivaloyltrifluoroacetonato Dy0.1, Y0.9
triethylammonium tetrakis trifluoroacetylacetonato Dy0.1, Y0.9
triethylammonium tetrakis hexafluoroacetylacetonato Dy0.1, Y0.9
triethylammonium tetrakis 6,6,7,7,8,8,8-heptafluoro-2,2-dimethyloctanedionato Dy0.1, Y0.9
triethylammonium tetrakis 1-phenyl-1,3-butanedionato Dy0.1, Y0.9 morpholinium tetrakis acetylacetonato Dy0.1, Y0.9
morpholinium tetrakis dibenzoylmethanato Dy0.1, Y0.9
morpholinium tetrakis thenoyltrifluoroacetonato Dy0.1, Y0.9
morpholinium tetrakis 2,2,6,6-tetramethylheptanedionato Dy0.1, Y0.9
morpholinium tetrakis 3-methylpentane-2,4-dionato Dy0.1, Y0.9
morpholinium tetrakis 3-ethylpentane-2,4-dionato Dy0.1, Y0.9
morpholinium tetrakis pivaloyltrifluoroacetonato Dy0.1, Y0.9
morpholinium tetrakis trifluoroacetylacetonato Dy0.1, Y0.9
morpholinium tetrakis hexafluoroacetylacetonato Dy0.1, Y0.9
morpholinium tetrakis 6,6,7,7,8,8,8-heptafluoro-2,2-dimethyloctanedionato Dy0.1, Y0.9
morpholinium tetrakis 1-phenyl-1,3-butanedionato Dy0.1, Y0.9
dimethylbenzylammonium tetrakis acetylacetonato Dy0.1, Y0.9
dimethylbenzylammonium tetrakis dibenzoylmethanato Dy0.1, Y0.9
dimethylbenzylammonium tetrakis thenoyltrifluoroacetonato Dy0.1, Y0.9
dimethylbenzylammonium tetrakis 2,2,6,6-tetramethylheptanedionato Dy0.1, Y0.9
dimethylbenzylammonium tetrakis 3-methylpentane-2,4-dionato Dy0.1, Y0.9
dimethylbenzylammonium tetrakis 3-ethylpentane-2,4-dionato Dy0.1, Y0.9
dimethylbenzylammonium tetrakis pivaloyltrifluoroacetonato Dy0.1, Y0.9
dimethylbenzylammonium tetrakis trifluoroacetylacetonato Dy0.1, Y0.9
dimethylbenzylammonium tetrakis hexafluoroacetylacetonato Dy0.1, Y0.9
dimethylbenzylammonium tetrakis 6,6,7,7,8,8,8-heptafluoro-2,2-dimethyloctanedionato Dy0.1, Y0.9
dimethylbenzylammonium tetrakis 1-phenyl-1,3-butanedionato Dy0.1, Y0.9
triallylammonium tetrakis acetylacetonato Dy0.1, Y0.9
triallylammonium tetrakis dibenzoylmethanato Dy0.1, Y0.9
triallylammonium tetrakis thenoyltrifluoroacetonato Dy0.1, Y0.9
triallylammonium tetrakis 2,2,6,6-tetramethylheptanedionato Dy0.1, Y0.9
triallylammonium tetrakis 3-methylpentane-2,4-dionato Dy0.1, Y0.9
triallylammonium tetrakis 3-ethylpentane-2,4-dionato Dy0.1, Y0.9
triallylammonium tetrakis pivaloyltrifluoroacetonato Dy0.1, Y0.9
triallylammonium tetrakis trifluoroacetylacetonato Dy0.1, Y0.9
triallylammonium tetrakis hexafluoroacetylacetonato Dy0.1, Y0.9
triallylammonium tetrakis 6,6,7,7,8,8,8-heptafluoro-2,2-dimethyloctanedionato Dy0.1, Y0.9
triallylammonium tetrakis 1-phenyl-1,3-butanedionato Dy0.1, Y0.9
anilinium tetrakis acetylacetonato Dy0.1, Y0.9
anilinium tetrakis dibenzoylmethanato Dy0.1, Y0.9
anilinium tetrakis thenoyltrifluoroacetonato Dy0.1, Y0.9
anilinium tetrakis 2,2,6,6-tetramethylheptanedionato Dy0.1, Y0.9
anilinium tetrakis 3-methylpentane-2,4-dionato Dy0.1, Y0.9
anilinium tetrakis 3-ethylpentane-2,4-dionato Dy0.1, Y0.9
anilinium tetrakis pivaloyltrifluoroacetonato Dy0.1, Y0.9
anilinium tetrakis trifluoroacetylacetonato Dy0.1, Y0.9
anilinium tetrakis hexafluoroacetylacetonato Dy0.1, Y0.9
anilinium tetrakis 6,6,7,7,8,8,8-heptafluoro-2,2-dimethyloctanedionato Dy0.1, Y0.9
anilinium tetrakis 1-phenyl-1,3-butanedionato Dy0.1, Y0.9
triethylammonium tetrakis acetylacetonato Dy0.01, Y0.99
triethylammonium tetrakis dibenzoylmethanato Dy0.01, Y0.99
triethylammonium tetrakis thenoyltrifluoroacetonato Dy0.01, Y0.99
triethylammonium tetrakis 2,2,6,6-tetramethylheptanedionato Dy0.01, Y0.99
triethylammonium tetrakis 3-methylpentane-2,4-dionato Dy0.01, Y0.99
triethylammonium tetrakis 3-ethylpentane-2,4-dionato Dy0.01, Y0.99
triethylammonium tetrakis pivaloyltrifluoroacetonato Dy0.01, Y0.99
triethylammonium tetrakis trifluoroacetylacetonato Dy0.01, Y0.99
triethylammonium tetrakis hexafluoroacetylacetonato Dy0.01, Y0.99
triethylammonium tetrakis 6,6,7,7,8,8,8-heptafluoro-2,2-dimethyloctanedionato Dy0.01, Y0.99
triethylammonium tetrakis 1-phenyl-1,3-butanedionato Dy0.01, Y0.99
morpholinium tetrakis acetylacetonato Dy0.01, Y0.99
morpholinium tetrakis dibenzoylmethanato Dy0.01, Y0.99
morpholinium tetrakis thenoyltrifluoroacetonato Dy0.01, Y0.99
morpholinium tetrakis 2,2,6,6-tetramethylheptanedionato Dy0.01, Y0.99
morpholinium tetrakis 3-methylpentane-2,4-dionato Dy0.01, Y0.99
morpholinium tetrakis 3-ethylpentane-2,4-dionato Dy0.01, Y0.99
morpholinium tetrakis pivaloyltrifluoroacetonato Dy0.01, Y0.99
morpholinium tetrakis trifluoroacetylacetonato Dy0.01, Y0.99
morpholinium tetrakis hexafluoroacetylacetonato Dy0.01, Y0.99
morpholinium tetrakis 6,6,7,7,8,8,8-heptafluoro-2,2-dimethyloctanedionato Dy0.01, Y0.99
morpholinium tetrakis 1-phenyl-1,3-butanedionato Dy0.01, Y0.99
dimethylbenzylammonium tetrakis acetylacetonato Dy0.01, Y0.99
dimethylbenzylammonium tetrakis dibenzoylmethanato Dy0.01, Y0.99
dimethylbenzylammonium tetrakis thenoyltrifluoroacetonato Dy0.01, Y0.99
dimethylbenzylammonium tetrakis 2,2,6,6-tetramethylheptanedionato Dy0.01, Y0.99
dimethylbenzylammonium tetrakis 3-methylpentane-2,4-dionato Dy0.01, Y0.99
dimethylbenzylammonium tetrakis 3-ethylpentane-2,4-dionato Dy0.01, Y0.99
dimethylbenzylammonium tetrakis pivaloyltrifluoroacetonato Dy0.01, Y0.99
dimethylbenzylammonium tetrakis trifluoroacetylacetonato Dy0.01, Y0.99
dimethylbenzylammonium tetrakis hexafluoroacetylacetonato Dy0.01, Y0.99 dimethylbenzylammonium tetrakis 6,6,7,7,8,8,8-heptafluoro-2,2-dimethyloctanedionato Dy0.01, Y0.99
dimethylbenzylammonium tetrakis 1-phenyl-1,3-butanedionato Dy0.01, Y0.99
triallylammonium tetrakis acetylacetonato Dy0.01, Y0.99
triallylammonium tetrakis dibenzoylmethanato Dy0.01, Y0.99
triallylammonium tetrakis thenoyltrifluoroacetonato Dy0.01, Y0.99
triallylammonium tetrakis 2,2,6,6-tetramethylheptanedionato Dy0.01, Y0.99
triallylammonium tetrakis 3-methylpentane-2,4-dionato Dy0.01, Y0.99
triallylammonium tetrakis 3-ethylpentane-2,4-dionato Dy0.01, Y0.99
triallylammonium tetrakis pivaloyltrifluoroacetonato Dy0.01, Y0.99
triallylammonium tetrakis trifluoroacetylacetonato Dy0.01, Y0.99
triallylammonium tetrakis hexafluoroacetylacetonato Dy0.01, Y0.99
triallylammonium tetrakis 6,6,7,7,8,8,8-heptafluoro-2,2-dimethyloctanedionato Dy0.01, Y0.99
triallylammonium tetrakis 1-phenyl-1,3-butanedionato Dy0.01, Y0.99
anilinium tetrakis acetylacetonato Dy0.01, Y0.99
anilinium tetrakis dibenzoylmethanato Dy0.01, Y0.99
anilinium tetrakis thenoyltrifluoroacetonato Dy0.01, Y0.99
anilinium tetrakis 2,2,6,6-tetramethylheptanedionato Dy0.01, Y0.99
anilinium tetrakis 3-methylpentane-2,4-dionato Dy0.01, Y0.99
anilinium tetrakis 3-ethylpentane-2,4-dionato Dy0.01, Y0.99
anilinium tetrakis pivaloyltrifluoroacetonato Dy0.01, Y0.99
anilinium tetrakis trifluoroacetylacetonato Dy0.01, Y0.99
anilinium tetrakis hexafluoroacetylacetonato Dy0.01, Y0.99
anilinium tetrakis 6,6,7,7,8,8,8-heptafluoro-2,2-dimethyloctanedionato Dy0.01, Y0.99
anilinium tetrakis 1-phenyl-1,3-butanedionato Dy0.01, Y0.99
triethylammonium tetrakis acetylacetonato Sm0.5, La0.5
triethylammonium tetrakis dibenzoylmethanato Sm0.5, La0.5
triethylammonium tetrakis thenoyltrifluoroacetonato Sm0.5, La0.5
triethylammonium tetrakis 2,2,6,6-tetramethylheptanedionato Sm0.5, La0.5
triethylammonium tetrakis 3-methylpentane-2,4-dionato Sm0.5, La0.5
triethylammonium tetrakis 3-ethylpentane-2,4-dionato Sm0.5, La0.5
triethylammonium tetrakis pivaloyltrifluoroacetonato Sm0.5, La0.5
triethylammonium tetrakis trifluoroacetylacetonato Sm0.5, La0.5
triethylammonium tetrakis hexafluoroacetylacetonato Sm0.5, La0.5
triethylammonium tetrakis 6,6,7,7,8,8,8-heptafluoro-2,2-dimethyloctanedionato Sm0.5, La0.5
triethylammonium tetrakis 1-phenyl-1,3-butanedionato Sm0.5, La0.5
morpholinium tetrakis acetylacetonato Sm0.5, La0.5
morpholinium tetrakis dibenzoylmethanato Sm0.5, La0.5
morpholinium tetrakis thenoyltrifluoroacetonato Sm0.5, La0.5
morpholinium tetrakis 2,2,6,6-tetramethylheptanedionato Sm0.5, La0.5
morpholinium tetrakis 3-methylpentane-2,4-dionato Sm0.5, La0.5
morpholinium tetrakis 3-ethylpentane-2,4-dionato Sm0.5, La0.5
morpholinium tetrakis pivaloyltrifluoroacetonato Sm0.5, La0.5
morpholinium tetrakis trifluoroacetylacetonato Sm0.5, La0.5
morpholinium tetrakis hexafluoroacetylacetonato Sm0.5, La0.5
morpholinium tetrakis 6,6,7,7,8,8,8-heptafluoro-2,2-dimethyloctanedionato Sm0.5, La0.5
morpholinium tetrakis 1-phenyl-1,3-butanedionato Sm0.5, La0.5
dimethylbenzylammonium tetrakis acetylacetonato Sm0.5, La0.5
dimethylbenzylammonium tetrakis dibenzoylmethanato Sm0.5, La0.5
dimethylbenzylammonium tetrakis thenoyltrifluoroacetonato Sm0.5, La0.5
dimethylbenzylammonium tetrakis 2,2,6,6-tetramethylheptanedionato Sm0.5, La0.5
dimethylbenzylammonium tetrakis 3-methylpentane-2,4-dionato Sm0.5, La0.5
dimethylbenzylammonium tetrakis 3-ethylpentane-2,4-dionato Sm0.5, La0.5
dimethylbenzylammonium tetrakis pivaloyltrifluoroacetonato Sm0.5, La0.5
dimethylbenzylammonium tetrakis trifluoroacetylacetonato Sm0.5, La0.5
dimethylbenzylammonium tetrakis hexafluoroacetylacetonato Sm0.5, La0.5
dimethylbenzylammonium tetrakis 6,6,7,7,8,8,8-heptafluoro-2,2-dimethyloctanedionato Sm0.5, La0.5
dimethylbenzylammonium tetrakis 1-phenyl-1,3-butanedionato Sm0.5, La0.5
triallylammonium tetrakis acetylacetonato Sm0.5, La0.5
triallylammonium tetrakis dibenzoylmethanato Sm0.5, La0.5
triallylammonium tetrakis thenoyltrifluoroacetonato Sm0.5, La0.5
triallylammonium tetrakis 2,2,6,6-tetramethylheptanedionato Sm0.5, La0.5
triallylammonium tetrakis 3-methylpentane-2,4-dionato Sm0.5, La0.5
triallylammonium tetrakis 3-ethylpentane-2,4-dionato Sm0.5, La0.5
triallylammonium tetrakis pivaloyltrifluoroacetonato Sm0.5, La0.5
triallylammonium tetrakis trifluoroacetylacetonato Sm0.5, La0.5
triallylammonium tetrakis hexafluoroacetylacetonato Sm0.5, La0.5
triallylammonium tetrakis 6,6,7,7,8,8,8-heptafluoro-2,2-dimethyloctanedionato Sm0.5, La0.5
triallylammonium tetrakis 1-phenyl-1,3-butanedionato Sm0.5, La0.5
anilinium tetrakis acetylacetonato Sm0.5, La0.5
anilinium tetrakis dibenzoylmethanato Sm0.5, La0.5
anilinium tetrakis thenoyltrifluoroacetonato Sm0.5, La0.5
anilinium tetrakis 2,2,6,6-tetramethylheptanedionato Sm0.5, La0.5
anilinium tetrakis 3-methylpentane-2,4-dionato Sm0.5, La0.5
anilinium tetrakis 3-ethylpentane-2,4-dionato Sm0.5, La0.5 anilinium tetrakis pivaloyltrifluoroacetonato Sm0.5, La0.5
anilinium tetrakis trifluoroacetylacetonato Sm0.5, La0.5
anilinium tetrakis hexafluoroacetylacetonato Sm0.5, La0.5
anilinium tetrakis 6,6,7,7,8,8,8-heptafluoro-2,2-dimethyloctanedionato Sm0.5, La0.5
anilinium tetrakis 1-phenyl-1,3-butanedionato Sm0.5, La0.5
triethylammonium tetrakis acetylacetonato Sm0.2, La0.8
triethylammonium tetrakis dibenzoylmethanato Sm0.2, La0.8
triethylammonium tetrakis thenoyltrifluoroacetonato Sm0.2, La0.8
triethylammonium tetrakis 2,2,6,6-tetramethylheptanedionato Sm0.2, La0.8
triethylammonium tetrakis 3-methylpentane-2,4-dionato Sm0.2, La0.8
triethylammonium tetrakis 3-ethylpentane-2,4-dionato Sm0.2, La0.8
triethylammonium tetrakis pivaloyltrifluoroacetonato Sm0.2, La0.8
triethylammonium tetrakis trifluoroacetylacetonato Sm0.2, La0.8
triethylammonium tetrakis hexafluoroacetylacetonato Sm0.2, La0.8
triethylammonium tetrakis 6,6,7,7,8,8,8-heptafluoro-2,2-dimethyloctanedionato Sm0.2, La0.8
triethylammonium tetrakis 1-phenyl-1,3-butanedionato Sm0.2, La0.8
morpholinium tetrakis acetylacetonato Sm0.2, La0.8
morpholinium tetrakis dibenzoylmethanato Sm0.2, La0.8
morpholinium tetrakis thenoyltrifluoroacetonato Sm0.2, La0.8
morpholinium tetrakis 2,2,6,6-tetramethylheptanedionato Sm0.2, La0.8
morpholinium tetrakis 3-methylpentane-2,4-dionato Sm0.2, La0.8
morpholinium tetrakis 3-ethylpentane-2,4-dionato Sm0.2, La0.8
morpholinium tetrakis pivaloyltrifluoroacetonato Sm0.2, La0.8
morpholinium tetrakis trifluoroacetylacetonato Sm0.2, La0.8
morpholinium tetrakis hexafluoroacetylacetonato Sm0.2, La0.8
morpholinium tetrakis 6,6,7,7,8,8,8-heptafluoro-2,2-dimethyloctanedionato Sm0.2, La0.8
morpholinium tetrakis 1-phenyl-1,3-butanedionato Sm0.2, La0.8
dimethylbenzylammonium tetrakis acetylacetonato Sm0.2, La0.8
dimethylbenzylammonium tetrakis dibenzoylmethanato Sm0.2, La0.8
dimethylbenzylammonium tetrakis thenoyltrifluoroacetonato Sm0.2, La0.8
dimethylbenzylammonium tetrakis 2,2,6,6-tetramethylheptanedionato Sm0.2, La0.8
dimethylbenzylammonium tetrakis 3-methylpentane-2,4-dionato Sm0.2, La0.8
dimethylbenzylammonium tetrakis 3-ethylpentane-2,4-dionato Sm0.2, La0.8
dimethylbenzylammonium tetrakis pivaloyltrifluoroacetonato Sm0.2, La0.8
dimethylbenzylammonium tetrakis trifluoroacetylacetonato Sm0.2, La0.8
dimethylbenzylammonium tetrakis hexafluoroacetylacetonato Sm0.2, La0.8
dimethylbenzylammonium tetrakis 6,6,7,7,8,8,8-heptafluoro-2,2-dimethyloctanedionato Sm0.2, La0.8
dimethylbenzylammonium tetrakis 1-phenyl-1,3-butanedionato Sm0.2, La0.8
triallylammonium tetrakis acetylacetonato Sm0.2, La0.8
triallylammonium tetrakis dibenzoylmethanato Sm0.2, La0.8
triallylammonium tetrakis thenoyltrifluoroacetonato Sm0.2, La0.8
triallylammonium tetrakis 2,2,6,6-tetramethylheptanedionato Sm0.2, La0.8
triallylammonium tetrakis 3-methylpentane-2,4-dionato Sm0.2, La0.8
triallylammonium tetrakis 3-ethylpentane-2,4-dionato Sm0.2, La0.8
triallylammonium tetrakis pivaloyltrifluoroacetonato Sm0.2, La0.8
triallylammonium tetrakis trifluoroacetylacetonato Sm0.2, La0.8
triallylammonium tetrakis hexafluoroacetylacetonato Sm0.2, La0.8
triallylammonium tetrakis 6,6,7,7,8,8,8-heptafluoro-2,2-dimethyloctanedionato Sm0.2, La0.8
triallylammonium tetrakis 1-phenyl-1,3-butanedionato Sm0.2, La0.8
anilinium tetrakis acetylacetonato Sm0.2, La0.8
anilinium tetrakis dibenzoylmethanato Sm0.2, La0.8
anilinium tetrakis thenoyltrifluoroacetonato Sm0.2, La0.8
anilinium tetrakis 2,2,6,6-tetramethylheptanedionato Sm0.2, La0.8
anilinium tetrakis 3-methylpentane-2,4-dionato Sm0.2, La0.8
anilinium tetrakis 3-ethylpentane-2,4-dionato Sm0.2, La0.8
anilinium tetrakis pivaloyltrifluoroacetonato Sm0.2, La0.8
anilinium tetrakis trifluoroacetylacetonato Sm0.2, La0.8
anilinium tetrakis hexafluoroacetylacetonato Sm0.2, La0.8
anilinium tetrakis 6,6,7,7,8,8,8-heptafluoro-2,2-dimethyloctanedionato Sm0.2, La0.8
anilinium tetrakis 1-phenyl-1,3-butanedionato Sm0.2, La0.8
triethylammonium tetrakis acetylacetonato Sm0.1, La0.9
triethylammonium tetrakis dibenzoylmethanato Sm0.1, La0.9
triethylammonium tetrakis thenoyltrifluoroacetonato Sm0.1, La0.9
triethylammonium tetrakis 2,2,6,6-tetramethylheptanedionato Sm0.1, La0.9
triethylammonium tetrakis 3-methylpentane-2,4-dionato Sm0.1, La0.9
triethylammonium tetrakis 3-ethylpentane-2,4-dionato Sm0.1, La0.9
triethylammonium tetrakis pivaloyltrifluoroacetonato Sm0.1, La0.9
triethylammonium tetrakis trifluoroacetylacetonato Sm0.1, La0.9
triethylammonium tetrakis hexafluoroacetylacetonato Sm0.1, La0.9
triethylammonium tetrakis 6,6,7,7,8,8,8-heptafluoro-2,2-dimethyloctanedionato Sm0.1, La0.9
triethylammonium tetrakis 1-phenyl-1,3-butanedionato Sm0.1, La0.9
morpholinium tetrakis acetylacetonato Sm0.1, La0.9
morpholinium tetrakis dibenzoylmethanato Sm0.1, La0.9
morpholinium tetrakis thenoyltrifluoroacetonato Sm0.1, La0.9
morpholinium tetrakis 2,2,6,6-tetramethylheptanedionato Sm0.1, La0.9
morpholinium tetrakis 3-methylpentane-2,4-dionato Sm0.1, La0.9 morpholinium tetrakis 3-ethylpentane-2,4-dionato Sm0.1, La0.9
morpholinium tetrakis pivaloyltrifluoroacetonato Sm0.1, La0.9
morpholinium tetrakis trifluoroacetylacetonato Sm0.1, La0.9
morpholinium tetrakis hexafluoroacetylacetonato Sm0.1, La0.9
morpholinium tetrakis 6,6,7,7,8,8,8-heptafluoro-2,2-dimethyloctanedionato Sm0.1, La0.9
morpholinium tetrakis 1-phenyl-1,3-butanedionato Sm0.1, La0.9
dimethylbenzylammonium tetrakis acetylacetonato Sm0.1, La0.9
dimethylbenzylammonium tetrakis dibenzoylmethanato Sm0.1, La0.9
dimethylbenzylammonium tetrakis thenoyltrifluoroacetonato Sm0.1, La0.9
dimethylbenzylammonium tetrakis 2,2,6,6-tetramethylheptanedionato Sm0.1, La0.9
dimethylbenzylammonium tetrakis 3-methylpentane-2,4-dionato Sm0.1, La0.9
dimethylbenzylammonium tetrakis 3-ethylpentane-2,4-dionato Sm0.1, La0.9
dimethylbenzylammonium tetrakis pivaloyltrifluoroacetonato Sm0.1, La0.9
dimethylbenzylammonium tetrakis trifluoroacetylacetonato Sm0.1, La0.9
dimethylbenzylammonium tetrakis hexafluoroacetylacetonato Sm0.1, La0.9
dimethylbenzylammonium tetrakis 6,6,7,7,8,8,8-heptafluoro-2,2-dimethyloctanedionato Sm0.1, La0.9
dimethylbenzylammonium tetrakis 1-phenyl-1,3-butanedionato Sm0.1, La0.9
triallylammonium tetrakis acetylacetonato Sm0.1, La0.9
triallylammonium tetrakis dibenzoylmethanato Sm0.1, La0.9
triallylammonium tetrakis thenoyltrifluoroacetonato Sm0.1, La0.9
triallylammonium tetrakis 2,2,6,6-tetramethylheptanedionato Sm0.1, La0.9
triallylammonium tetrakis 3-methylpentane-2,4-dionato Sm0.1, La0.9
triallylammonium tetrakis 3-ethylpentane-2,4-dionato Sm0.1, La0.9
triallylammonium tetrakis pivaloyltrifluoroacetonato Sm0.1, La0.9
triallylammonium tetrakis trifluoroacetylacetonato Sm0.1, La0.9
triallylammonium tetrakis hexafluoroacetylacetonato Sm0.1, La0.9
triallylammonium tetrakis 6,6,7,7,8,8,8-heptafluoro-2,2-dimethyloctanedionato Sm0.1, La0.9
triallylammonium tetrakis 1-phenyl-1,3-butanedionato Sm0.1, La0.9
anilinium tetrakis acetylacetonato Sm0.1, La0.9
anilinium tetrakis dibenzoylmethanato Sm0.1, La0.9
anilinium tetrakis thenoyltrifluoroacetonato Sm0.1, La0.9
anilinium tetrakis 2,2,6,6-tetramethylheptanedionato Sm0.1, La0.9
anilinium tetrakis 3-methylpentane-2,4-dionato Sm0.1, La0.9
anilinium tetrakis 3-ethylpentane-2,4-dionato Sm0.1, La0.9
anilinium tetrakis pivaloyltrifluoroacetonato Sm0.1, La0.9
anilinium tetrakis trifluoroacetylacetonato Sm0.1, La0.9
anilinium tetrakis hexafluoroacetylacetonato Sm0.1, La0.9
anilinium tetrakis 6,6,7,7,8,8,8-heptafluoro-2,2-dimethyloctanedionato Sm0.1, La0.9
anilinium tetrakis 1-phenyl-1,3-butanedionato Sm0.1, La0.9
triethylammonium tetrakis acetylacetonato Sm0.01, La0.99
triethylammonium tetrakis dibenzoylmethanato Sm0.01, La0.99
triethylammonium tetrakis thenoyltrifluoroacetonato Sm0.01, La0.99
triethylammonium tetrakis 2,2,6,6-tetramethylheptanedionato Sm0.01, La0.99
triethylammonium tetrakis 3-methylpentane-2,4-dionato Sm0.01, La0.99
triethylammonium tetrakis 3-ethylpentane-2,4-dionato Sm0.01, La0.99
triethylammonium tetrakis pivaloyltrifluoroacetonato Sm0.01, La0.99
triethylammonium tetrakis trifluoroacetylacetonato Sm0.01, La0.99
triethylammonium tetrakis hexafluoroacetylacetonato Sm0.01, La0.99
triethylammonium tetrakis 6,6,7,7,8,8,8-heptafluoro-2,2-dimethyloctanedionato Sm0.01, La0.99
triethylammonium tetrakis 1-phenyl-1,3-butanedionato Sm0.01, La0.99
morpholinium tetrakis acetylacetonato Sm0.01, La0.99
morpholinium tetrakis dibenzoylmethanato Sm0.01, La0.99
morpholinium tetrakis thenoyltrifluoroacetonato Sm0.01, La0.99
morpholinium tetrakis 2,2,6,6-tetramethylheptanedionato Sm0.01, La0.99
morpholinium tetrakis 3-methylpentane-2,4-dionato Sm0.01, La0.99
morpholinium tetrakis 3-ethylpentane-2,4-dionato Sm0.01, La0.99
morpholinium tetrakis pivaloyltrifluoroacetonato Sm0.01, La0.99
morpholinium tetrakis trifluoroacetylacetonato Sm0.01, La0.99
morpholinium tetrakis hexafluoroacetylacetonato Sm0.01, La0.99
morpholinium tetrakis 6,6,7,7,8,8,8-heptafluoro-2,2-dimethyloctanedionato Sm0.01, La0.99
morpholinium tetrakis 1-phenyl-1,3-butanedionato Sm0.01, La0.99
dimethylbenzylammonium tetrakis acetylacetonato Sm0.01, La0.99
dimethylbenzylammonium tetrakis dibenzoylmethanato Sm0.01, La0.99
dimethylbenzylammonium tetrakis thenoyltrifluoroacetonato Sm0.01, La0.99
dimethylbenzylammonium tetrakis 2,2,6,6-tetramethylheptanedionato Sm0.01, La0.99
dimethylbenzylammonium tetrakis 3-methylpentane-2,4-dionato Sm0.01, La0.99
dimethylbenzylammonium tetrakis 3-ethylpentane-2,4-dionato Sm0.01, La0.99
dimethylbenzylammonium tetrakis pivaloyltrifluoroacetonato Sm0.01, La0.99
dimethylbenzylammonium tetrakis trifluoroacetylacetonato Sm0.01, La0.99
dimethylbenzylammonium tetrakis hexafluoroacetylacetonato Sm0.01, La0.99
dimethylbenzylammonium tetrakis 6,6,7,7,8,8,8-heptafluoro-2,2-dimethyloctanedionato Sm0.01, La0.99
dimethylbenzylammonium tetrakis 1-phenyl-1,3-butanedionato Sm0.01, La0.99
triallylammonium tetrakis acetylacetonato Sm0.01, La0.99 triallylammonium tetrakis dibenzoylmethanato Sm0.01, La0.99
triallylammonium tetrakis thenoyltrifluoroacetonato Sm0.01, La0.99
triallylammonium tetrakis 2,2,6,6-tetramethylheptanedionato Sm0.01, La0.99
triallylammonium tetrakis 3-methylpentane-2,4-dionato Sm0.01, La0.99
triallylammonium tetrakis 3-ethylpentane-2,4-dionato Sm0.01, La0.99
triallylammonium tetrakis pivaloyltrifluoroacetonato Sm0.01, La0.99
triallylammonium tetrakis trifluoroacetylacetonato Sm0.01, La0.99
triallylammonium tetrakis hexafluoroacetylacetonato Sm0.01, La0.99
triallylammonium tetrakis 6,6,7,7,8,8,8-heptafluoro-2,2-dimethyloctanedionato Sm0.01, La0.99
triallylammonium tetrakis 1-phenyl-1,3-butanedionato Sm0.01, La0.99
anilinium tetrakis acetylacetonato Sm0.01, La0.99
anilinium tetrakis dibenzoylmethanato Sm0.01, La0.99
anilinium tetrakis thenoyltrifluoroacetonato Sm0.01, La0.99
anilinium tetrakis 2,2,6,6-tetramethylheptanedionato Sm0.01, La0.99
anilinium tetrakis 3-methylpentane-2,4-dionato Sm0.01, La0.99
anilinium tetrakis 3-ethylpentane-2,4-dionato Sm0.01, La0.99
anilinium tetrakis pivaloyltrifluoroacetonato Sm0.01, La0.99
anilinium tetrakis trifluoroacetylacetonato Sm0.01, La0.99
anilinium tetrakis hexafluoroacetylacetonato Sm0.01, La0.99
anilinium tetrakis 6,6,7,7,8,8,8-heptafluoro-2,2-dimethyloctanedionato Sm0.01, La0.99
anilinium tetrakis 1-phenyl-1,3-butanedionato Sm0.01, La0.99
triethylammonium tetrakis acetylacetonato Dy0.5, La0.5
triethylammonium tetrakis dibenzoylmethanato Dy0.5, La0.5
triethylammonium tetrakis thenoyltrifluoroacetonato Dy0.5, La0.5
triethylammonium tetrakis 2,2,6,6-tetramethylheptanedionato Dy0.5, La0.5
triethylammonium tetrakis 3-methylpentane-2,4-dionato Dy0.5, La0.5
triethylammonium tetrakis 3-ethylpentane-2,4-dionato Dy0.5, La0.5
triethylammonium tetrakis pivaloyltrifluoroacetonato Dy0.5, La0.5
triethylammonium tetrakis trifluoroacetylacetonato Dy0.5, La0.5
triethylammonium tetrakis hexafluoroacetylacetonato Dy0.5, La0.5
triethylammonium tetrakis 6,6,7,7,8,8,8-heptafluoro-2,2-dimethyloctanedionato Dy0.5, La0.5
triethylammonium tetrakis 1-phenyl-1,3-butanedionato Dy0.5, La0.5
morpholinium tetrakis acetylacetonato Dy0.5, La0.5
morpholinium tetrakis dibenzoylmethanato Dy0.5, La0.5
morpholinium tetrakis thenoyltrifluoroacetonato Dy0.5, La0.5
morpholinium tetrakis 2,2,6,6-tetramethylheptanedionato Dy0.5, La0.5
morpholinium tetrakis 3-methylpentane-2,4-dionato Dy0.5, La0.5
morpholinium tetrakis 3-ethylpentane-2,4-dionato Dy0.5, La0.5
morpholinium tetrakis pivaloyltrifluoroacetonato Dy0.5, La0.5
morpholinium tetrakis trifluoroacetylacetonato Dy0.5, La0.5
morpholinium tetrakis hexafluoroacetylacetonato Dy0.5, La0.5
morpholinium tetrakis 6,6,7,7,8,8,8-heptafluoro-2,2-dimethyloctanedionato Dy0.5, La0.5
morpholinium tetrakis 1-phenyl-1,3-butanedionato Dy0.5, La0.5
dimethylbenzylammonium tetrakis acetylacetonato Dy0.5, La0.5
dimethylbenzylammonium tetrakis dibenzoylmethanato Dy0.5, La0.5
dimethylbenzylammonium tetrakis thenoyltrifluoroacetonato Dy0.5, La0.5
dimethylbenzylammonium tetrakis 2,2,6,6-tetramethylheptanedionato Dy0.5, La0.5
dimethylbenzylammonium tetrakis 3-methylpentane-2,4-dionato Dy0.5, La0.5
dimethylbenzylammonium tetrakis 3-ethylpentane-2,4-dionato Dy0.5, La0.5
dimethylbenzylammonium tetrakis pivaloyltrifluoroacetonato Dy0.5, La0.5
dimethylbenzylammonium tetrakis trifluoroacetylacetonato Dy0.5, La0.5
dimethylbenzylammonium tetrakis hexafluoroacetylacetonato Dy0.5, La0.5
dimethylbenzylammonium tetrakis 6,6,7,7,8,8,8-heptafluoro-2,2-dimethyloctanedionato Dy0.5, La0.5
dimethylbenzylammonium tetrakis 1-phenyl-1,3-butanedionato Dy0.5, La0.5
triallylammonium tetrakis acetylacetonato Dy0.5, La0.5
triallylammonium tetrakis dibenzoylmethanato Dy0.5, La0.5
triallylammonium tetrakis thenoyltrifluoroacetonato Dy0.5, La0.5
triallylammonium tetrakis 2,2,6,6-tetramethylheptanedionato Dy0.5, La0.5
triallylammonium tetrakis 3-methylpentane-2,4-dionato Dy0.5, La0.5
triallylammonium tetrakis 3-ethylpentane-2,4-dionato Dy0.5, La0.5
triallylammonium tetrakis pivaloyltrifluoroacetonato Dy0.5, La0.5
triallylammonium tetrakis trifluoroacetylacetonato Dy0.5, La0.5
triallylammonium tetrakis hexafluoroacetylacetonato Dy0.5, La0.5
triallylammonium tetrakis 6,6,7,7,8,8,8-heptafluoro-2,2-dimethyloctanedionato Dy0.5, La0.5
triallylammonium tetrakis 1-phenyl-1,3-butanedionato Dy0.5, La0.5
anilinium tetrakis acetylacetonato Dy0.5, La0.5
anilinium tetrakis dibenzoylmethanato Dy0.5, La0.5
anilinium tetrakis thenoyltrifluoroacetonato Dy0.5, La0.5
anilinium tetrakis 2,2,6,6-tetramethylheptanedionato Dy0.5, La0.5
anilinium tetrakis 3-methylpentane-2,4-dionato Dy0.5, La0.5
anilinium tetrakis 3-ethylpentane-2,4-dionato Dy0.5, La0.5
anilinium tetrakis pivaloyltrifluoroacetonato Dy0.5, La0.5
anilinium tetrakis trifluoroacetylacetonato Dy0.5, La0.5
anilinium tetrakis hexafluoroacetylacetonato Dy0.5, La0.5
anilinium tetrakis 6,6,7,7,8,8,8-heptafluoro-2,2-dimethyloctanedionato Dy0.5, La0.5 anilinium tetrakis 1-phenyl-1,3-butanedionato Dy0.5, La0.5
triethylammonium tetrakis acetylacetonato Dy0.2, La0.8
triethylammonium tetrakis dibenzoylmethanato Dy0.2, La0.8
triethylammonium tetrakis thenoyltrifluoroacetonato Dy0.2, La0.8
triethylammonium tetrakis 2,2,6,6-tetramethylheptanedionato Dy0.2, La0.8
triethylammonium tetrakis 3-methylpentane-2,4-dionato Dy0.2, La0.8
triethylammonium tetrakis 3-ethylpentane-2,4-dionato Dy0.2, La0.8
triethylammonium tetrakis pivaloyltrifluoroacetonato Dy0.2, La0.8
triethylammonium tetrakis trifluoroacetylacetonato Dy0.2, La0.8
triethylammonium tetrakis hexafluoroacetylacetonato Dy0.2, La0.8
triethylammonium tetrakis 6,6,7,7,8,8,8-heptafluoro-2,2-dimethyloctanedionato Dy0.2, La0.8
triethylammonium tetrakis 1-phenyl-1,3-butanedionato Dy0.2, La0.8
morpholinium tetrakis acetylacetonato Dy0.2, La0.8
morpholinium tetrakis dibenzoylmethanato Dy0.2, La0.8
morpholinium tetrakis thenoyltrifluoroacetonato Dy0.2, La0.8
morpholinium tetrakis 2,2,6,6-tetramethylheptanedionato Dy0.2, La0.8
morpholinium tetrakis 3-methylpentane-2,4-dionato Dy0.2, La0.8
morpholinium tetrakis 3-ethylpentane-2,4-dionato Dy0.2, La0.8
morpholinium tetrakis pivaloyltrifluoroacetonato Dy0.2, La0.8
morpholinium tetrakis trifluoroacetylacetonato Dy0.2, La0.8
morpholinium tetrakis hexafluoroacetylacetonato Dy0.2, La0.8
morpholinium tetrakis 6,6,7,7,8,8,8-heptafluoro-2,2-dimethyloctanedionato Dy0.2, La0.8
morpholinium tetrakis 1-phenyl-1,3-butanedionato Dy0.2, La0.8
dimethylbenzylammonium tetrakis acetylacetonato Dy0.2, La0.8
dimethylbenzylammonium tetrakis dibenzoylmethanato Dy0.2, La0.8
dimethylbenzylammonium tetrakis thenoyltrifluoroacetonato Dy0.2, La0.8
dimethylbenzylammonium tetrakis 2,2,6,6-tetramethylheptanedionato Dy0.2, La0.8
dimethylbenzylammonium tetrakis 3-methylpentane-2,4-dionato Dy0.2, La0.8
dimethylbenzylammonium tetrakis 3-ethylpentane-2,4-dionato Dy0.2, La0.8
dimethylbenzylammonium tetrakis pivaloyltrifluoroacetonato Dy0.2, La0.8
dimethylbenzylammonium tetrakis trifluoroacetylacetonato Dy0.2, La0.8
dimethylbenzylammonium tetrakis hexafluoroacetylacetonato Dy0.2, La0.8
dimethylbenzylammonium tetrakis 6,6,7,7,8,8,8-heptafluoro-2,2-dimethyloctanedionato Dy0.2, La0.8
dimethylbenzylammonium tetrakis 1-phenyl-1,3-butanedionato Dy0.2, La0.8
triallylammonium tetrakis acetylacetonato Dy0.2, La0.8
triallylammonium tetrakis dibenzoylmethanato Dy0.2, La0.8
triallylammonium tetrakis thenoyltrifluoroacetonato Dy0.2, La0.8
triallylammonium tetrakis 2,2,6,6-tetramethylheptanedionato Dy0.2, La0.8
triallylammonium tetrakis 3-methylpentane-2,4-dionato Dy0.2, La0.8
triallylammonium tetrakis 3-ethylpentane-2,4-dionato Dy0.2, La0.8
triallylammonium tetrakis pivaloyltrifluoroacetonato Dy0.2, La0.8
triallylammonium tetrakis trifluoroacetylacetonato Dy0.2, La0.8
triallylammonium tetrakis hexafluoroacetylacetonato Dy0.2, La0.8
triallylammonium tetrakis 6,6,7,7,8,8,8-heptafluoro-2,2-dimethyloctanedionato Dy0.2, La0.8
triallylammonium tetrakis 1-phenyl-1,3-butanedionato Dy0.2, La0.8
anilinium tetrakis acetylacetonato Dy0.2, La0.8
anilinium tetrakis dibenzoylmethanato Dy0.2, La0.8
anilinium tetrakis thenoyltrifluoroacetonato Dy0.2, La0.8
anilinium tetrakis 2,2,6,6-tetramethylheptanedionato Dy0.2, La0.8
anilinium tetrakis 3-methylpentane-2,4-dionato Dy0.2, La0.8
anilinium tetrakis 3-ethylpentane-2,4-dionato Dy0.2, La0.8
anilinium tetrakis pivaloyltrifluoroacetonato Dy0.2, La0.8
anilinium tetrakis trifluoroacetylacetonato Dy0.2, La0.8
anilinium tetrakis hexafluoroacetylacetonato Dy0.2, La0.8
anilinium tetrakis 6,6,7,7,8,8,8-heptafluoro-2,2-dimethyloctanedionato Dy0.2, La0.8
anilinium tetrakis 1-phenyl-1,3-butanedionato Dy0.2, La0.8
triethylammonium tetrakis acetylacetonato Dy0.1, La0.9
triethylammonium tetrakis dibenzoylmethanato Dy0.1, La0.9
triethylammonium tetrakis thenoyltrifluoroacetonato Dy0.1, La0.9
triethylammonium tetrakis 2,2,6,6-tetramethylheptanedionato Dy0.1, La0.9
triethylammonium tetrakis 3-methylpentane-2,4-dionato Dy0.1, La0.9
triethylammonium tetrakis 3-ethylpentane-2,4-dionato Dy0.1, La0.9
triethylammonium tetrakis pivaloyltrifluoroacetonato Dy0.1, La0.9
triethylammonium tetrakis trifluoroacetylacetonato Dy0.1, La0.9
triethylammonium tetrakis hexafluoroacetylacetonato Dy0.1, La0.9
triethylammonium tetrakis 6,6,7,7,8,8,8-heptafluoro-2,2-dimethyloctanedionato Dy0.1, La0.9
triethylammonium tetrakis 1-phenyl-1,3-butanedionato Dy0.1, La0.9
morpholinium tetrakis acetylacetonato Dy0.1, La0.9
morpholinium tetrakis dibenzoylmethanato Dy0.1, La0.9
morpholinium tetrakis thenoyltrifluoroacetonato Dy0.1, La0.9
morpholinium tetrakis 2,2,6,6-tetramethylheptanedionato Dy0.1, La0.9
morpholinium tetrakis 3-methylpentane-2,4-dionato Dy0.1, La0.9
morpholinium tetrakis 3-ethylpentane-2,4-dionato Dy0.1, La0.9
morpholinium tetrakis pivaloyltrifluoroacetonato Dy0.1, La0.9
morpholinium tetrakis trifluoroacetylacetonato Dy0.1, La0.9 morpholinium tetrakis hexafluoroacetylacetonato Dy0.1, La0.9
morpholinium tetrakis 6,6,7,7,8,8,8-heptafluoro-2,2-dimethyloctanedionato Dy0.1, La0.9
morpholinium tetrakis 1-phenyl-1,3-butanedionato Dy0.1, La0.9
dimethylbenzylammonium tetrakis acetylacetonato Dy0.1, La0.9
dimethylbenzylammonium tetrakis dibenzoylmethanato Dy0.1, La0.9
dimethylbenzylammonium tetrakis thenoyltrifluoroacetonato Dy0.1, La0.9
dimethylbenzylammonium tetrakis 2,2,6,6-tetramethylheptanedionato Dy0.1, La0.9
dimethylbenzylammonium tetrakis 3-methylpentane-2,4-dionato Dy0.1, La0.9
dimethylbenzylammonium tetrakis 3-ethylpentane-2,4-dionato Dy0.1, La0.9
dimethylbenzylammonium tetrakis pivaloyltrifluoroacetonato Dy0.1, La0.9
dimethylbenzylammonium tetrakis trifluoroacetylacetonato Dy0.1, La0.9
dimethylbenzylammonium tetrakis hexafluoroacetylacetonato Dy0.1, La0.9
dimethylbenzylammonium tetrakis 6,6,7,7,8,8,8-heptafluoro-2,2-dimethyloctanedionato Dy0.1, La0.9
dimethylbenzylammonium tetrakis 1-phenyl-1,3-butanedionato Dy0.1, La0.9
triallylammonium tetrakis acetylacetonato Dy0.1, La0.9
triallylammonium tetrakis dibenzoylmethanato Dy0.1, La0.9
triallylammonium tetrakis thenoyltrifluoroacetonato Dy0.1, La0.9
triallylammonium tetrakis 2,2,6,6-tetramethylheptanedionato Dy0.1, La0.9
triallylammonium tetrakis 3-methylpentane-2,4-dionato Dy0.1, La0.9
triallylammonium tetrakis 3-ethylpentane-2,4-dionato Dy0.1, La0.9
triallylammonium tetrakis pivaloyltrifluoroacetonato Dy0.1, La0.9
triallylammonium tetrakis trifluoroacetylacetonato Dy0.1, La0.9
triallylammonium tetrakis hexafluoroacetylacetonato Dy0.1, La0.9
triallylammonium tetrakis 6,6,7,7,8,8,8-heptafluoro-2,2-dimethyloctanedionato Dy0.1, La0.9
triallylammonium tetrakis 1-phenyl-1,3-butanedionato Dy0.1, La0.9
anilinium tetrakis acetylacetonato Dy0.1, La0.9
anilinium tetrakis dibenzoylmethanato Dy0.1, La0.9
anilinium tetrakis thenoyltrifluoroacetonato Dy0.1, La0.9
anilinium tetrakis 2,2,6,6-tetramethylheptanedionato Dy0.1, La0.9
anilinium tetrakis 3-methylpentane-2,4-dionato Dy0.1, La0.9
anilinium tetrakis 3-ethylpentane-2,4-dionato Dy0.1, La0.9
anilinium tetrakis pivaloyltrifluoroacetonato Dy0.1, La0.9
anilinium tetrakis trifluoroacetylacetonato Dy0.1, La0.9
anilinium tetrakis hexafluoroacetylacetonato Dy0.1, La0.9
anilinium tetrakis 6,6,7,7,8,8,8-heptafluoro-2,2-dimethyloctanedionato Dy0.1, La0.9
anilinium tetrakis 1-phenyl-1,3-butanedionato Dy0.1, La0.9
triethylammonium tetrakis acetylacetonato Dy0.01, La0.99
triethylammonium tetrakis dibenzoylmethanato Dy0.01, La0.99
triethylammonium tetrakis thenoyltrifluoroacetonato Dy0.01, La0.99
triethylammonium tetrakis 2,2,6,6-tetramethylheptanedionato Dy0.01, La0.99
triethylammonium tetrakis 3-methylpentane-2,4-dionato Dy0.01, La0.99
triethylammonium tetrakis 3-ethylpentane-2,4-dionato Dy0.01, La0.99
triethylammonium tetrakis pivaloyltrifluoroacetonato Dy0.01, La0.99
triethylammonium tetrakis trifluoroacetylacetonato Dy0.01, La0.99
triethylammonium tetrakis hexafluoroacetylacetonato Dy0.01, La0.99
triethylammonium tetrakis 6,6,7,7,8,8,8-heptafluoro-2,2-dimethyloctanedionato Dy0.01, La0.99
triethylammonium tetrakis 1-phenyl-1,3-butanedionato Dy0.01, La0.99
morpholinium tetrakis acetylacetonato Dy0.01, La0.99
morpholinium tetrakis dibenzoylmethanato Dy0.01, La0.99
morpholinium tetrakis thenoyltrifluoroacetonato Dy0.01, La0.99
morpholinium tetrakis 2,2,6,6-tetramethylheptanedionato Dy0.01, La0.99
morpholinium tetrakis 3-methylpentane-2,4-dionato Dy0.01, La0.99
morpholinium tetrakis 3-ethylpentane-2,4-dionato Dy0.01, La0.99
morpholinium tetrakis pivaloyltrifluoroacetonato Dy0.01, La0.99
morpholinium tetrakis trifluoroacetylacetonato Dy0.01, La0.99
morpholinium tetrakis hexafluoroacetylacetonato Dy0.01, La0.99
morpholinium tetrakis 6,6,7,7,8,8,8-heptafluoro-2,2-dimethyloctanedionato Dy0.01, La0.99
morpholinium tetrakis 1-phenyl-1,3-butanedionato Dy0.01, La0.99
dimethylbenzylammonium tetrakis acetylacetonato Dy0.01, La0.99
dimethylbenzylammonium tetrakis dibenzoylmethanato Dy0.01, La0.99
dimethylbenzylammonium tetrakis thenoyltrifluoroacetonato Dy0.01, La0.99
dimethylbenzylammonium tetrakis 2,2,6,6-tetramethylheptanedionato Dy0.01, La0.99
dimethylbenzylammonium tetrakis 3-methylpentane-2,4-dionato Dy0.01, La0.99
dimethylbenzylammonium tetrakis 3-ethylpentane-2,4-dionato Dy0.01, La0.99
dimethylbenzylammonium tetrakis pivaloyltrifluoroacetonato Dy0.01, La0.99
dimethylbenzylammonium tetrakis trifluoroacetylacetonato Dy0.01, La0.99
dimethylbenzylammonium tetrakis hexafluoroacetylacetonato Dy0.01, La0.99
dimethylbenzylammonium tetrakis 6,6,7,7,8,8,8-heptafluoro-2,2-dimethyloctanedionato Dy0.01, La0.99
dimethylbenzylammonium tetrakis 1-phenyl-1,3-butanedionato Dy0.01, La0.99
triallylammonium tetrakis acetylacetonato Dy0.01, La0.99
triallylammonium tetrakis dibenzoylmethanato Dy0.01, La0.99
triallylammonium tetrakis thenoyltrifluoroacetonato Dy0.01, La0.99
triallylammonium tetrakis 2,2,6,6-tetramethylheptanedionato Dy0.01, La0.99 triallylammonium tetrakis 3-methylpentane-2,4-dionato Dy0.01, La0.99
triallylammonium tetrakis 3-ethylpentane-2,4-dionato Dy0.01, La0.99
triallylammonium tetrakis pivaloyltrifluoroacetonato Dy0.01, La0.99
triallylammonium tetrakis trifluoroacetylacetonato Dy0.01, La0.99
triallylammonium tetrakis hexafluoroacetylacetonato Dy0.01, La0.99
triallylammonium tetrakis 6,6,7,7,8,8,8-heptafluoro-2,2-dimethyloctanedionato Dy0.01, La0.99
triallylammonium tetrakis 1-phenyl-1,3-butanedionato Dy0.01, La0.99
anilinium tetrakis acetylacetonato Dy0.01, La0.99
anilinium tetrakis dibenzoylmethanato Dy0.01, La0.99
anilinium tetrakis thenoyltrifluoroacetonato Dy0.01, La0.99
anilinium tetrakis 2,2,6,6-tetramethylheptanedionato Dy0.01, La0.99
anilinium tetrakis 3-methylpentane-2,4-dionato Dy0.01, La0.99
anilinium tetrakis 3-ethylpentane-2,4-dionato Dy0.01, La0.99
anilinium tetrakis pivaloyltrifluoroacetonato Dy0.01, La0.99
anilinium tetrakis trifluoroacetylacetonato Dy0.01, La0.99
anilinium tetrakis hexafluoroacetylacetonato Dy0.01, La0.99
anilinium tetrakis 6,6,7,7,8,8,8-heptafluoro-2,2-dimethyloctanedionato Dy0.01, La0.99
anilinium tetrakis 1-phenyl-1,3-butanedionato Dy0.01, La0.99
triethylammonium tetrakis acetylacetonato Dy0.5, La0.5
triethylammonium tetrakis dibenzoylmethanato Dy0.5, La0.5
triethylammonium tetrakis thenoyltrifluoroacetonato Dy0.5, La0.5
triethylammonium tetrakis 2,2,6,6-tetramethylheptanedionato Dy0.5, La0.5
triethylammonium tetrakis 3-methylpentane-2,4-dionato Dy0.5, La0.5
triethylammonium tetrakis 3-ethylpentane-2,4-dionato Dy0.5, La0.5
triethylammonium tetrakis pivaloyltrifluoroacetonato Dy0.5, La0.5
triethylammonium tetrakis trifluoroacetylacetonato Dy0.5, La0.5
triethylammonium tetrakis hexafluoroacetylacetonato Dy0.5, La0.5
triethylammonium tetrakis 6,6,7,7,8,8,8-heptafluoro-2,2-dimethyloctanedionato Dy0.5, La0.5
triethylammonium tetrakis 1-phenyl-1,3-butanedionato Dy0.5, La0.5
morpholinium tetrakis acetylacetonato Dy0.5, La0.5
morpholinium tetrakis dibenzoylmethanato Dy0.5, La0.5
morpholinium tetrakis thenoyltrifluoroacetonato Dy0.5, La0.5
morpholinium tetrakis 2,2,6,6-tetramethylheptanedionato Dy0.5, La0.5
morpholinium tetrakis 3-methylpentane-2,4-dionato Dy0.5, La0.5
morpholinium tetrakis 3-ethylpentane-2,4-dionato Dy0.5, La0.5
morpholinium tetrakis pivaloyltrifluoroacetonato Dy0.5, La0.5
morpholinium tetrakis trifluoroacetylacetonato Dy0.5, La0.5
morpholinium tetrakis hexafluoroacetylacetonato Dy0.5, La0.5
morpholinium tetrakis 6,6,7,7,8,8,8-heptafluoro-2,2-dimethyloctanedionato Dy0.5, La0.5
morpholinium tetrakis 1-phenyl-1,3-butanedionato Dy0.5, La0.5
dimethylbenzylammonium tetrakis acetylacetonato Dy0.5, La0.5
dimethylbenzylammonium tetrakis dibenzoylmethanato Dy0.5, La0.5
dimethylbenzylammonium tetrakis thenoyltrifluoroacetonato Dy0.5, La0.5
dimethylbenzylammonium tetrakis 2,2,6,6-tetramethylheptanedionato Dy0.5, La0.5
dimethylbenzylammonium tetrakis 3-methylpentane-2,4-dionato Dy0.5, La0.5
dimethylbenzylammonium tetrakis 3-ethylpentane-2,4-dionato Dy0.5, La0.5
dimethylbenzylammonium tetrakis pivaloyltrifluoroacetonato Dy0.5, La0.5
dimethylbenzylammonium tetrakis trifluoroacetylacetonato Dy0.5, La0.5
dimethylbenzylammonium tetrakis hexafluoroacetylacetonato Dy0.5, La0.5
dimethylbenzylammonium tetrakis 6,6,7,7,8,8,8-heptafluoro-2,2-dimethyloctanedionato Dy0.5, La0.5
dimethylbenzylammonium tetrakis 1-phenyl-1,3-butanedionato Dy0.5, La0.5
triallylammonium tetrakis acetylacetonato Dy0.5, La0.5
triallylammonium tetrakis dibenzoylmethanato Dy0.5, La0.5
triallylammonium tetrakis thenoyltrifluoroacetonato Dy0.5, La0.5
triallylammonium tetrakis 2,2,6,6-tetramethylheptanedionato Dy0.5, La0.5
triallylammonium tetrakis 3-methylpentane-2,4-dionato Dy0.5, La0.5
triallylammonium tetrakis 3-ethylpentane-2,4-dionato Dy0.5, La0.5
triallylammonium tetrakis pivaloyltrifluoroacetonato Dy0.5, La0.5
triallylammonium tetrakis trifluoroacetylacetonato Dy0.5, La0.5
triallylammonium tetrakis hexafluoroacetylacetonato Dy0.5, La0.5
triallylammonium tetrakis 6,6,7,7,8,8,8-heptafluoro-2,2-dimethyloctanedionato Dy0.5, La0.5
triallylammonium tetrakis 1-phenyl-1,3-butanedionato Dy0.5, La0.5
anilinium tetrakis acetylacetonato Dy0.5, La0.5
anilinium tetrakis dibenzoylmethanato Dy0.5, La0.5
anilinium tetrakis thenoyltrifluoroacetonato Dy0.5, La0.5
anilinium tetrakis 2,2,6,6-tetramethylheptanedionato Dy0.5, La0.5
anilinium tetrakis 3-methylpentane-2,4-dionato Dy0.5, La0.5
anilinium tetrakis 3-ethylpentane-2,4-dionato Dy0.5, La0.5
anilinium tetrakis pivaloyltrifluoroacetonato Dy0.5, La0.5
anilinium tetrakis trifluoroacetylacetonato Dy0.5, La0.5
anilinium tetrakis hexafluoroacetylacetonato Dy0.5, La0.5
anilinium tetrakis 6,6,7,7,8,8,8-heptafluoro-2,2-dimethyloctanedionato Dy0.5, La0.5
anilinium tetrakis 1-phenyl-1,3-butanedionato Dy0.5, La0.5
triethylammonium tetrakis acetylacetonato Dy0.2, La0.8
triethylammonium tetrakis dibenzoylmethanato Dy0.2, La0.8
triethylammonium tetrakis thenoyltrifluoroacetonato Dy0.2, La0.8 triethylammonium tetrakis 2,2,6,6-tetramethylheptanedionato Dy0.2, La0.8
triethylammonium tetrakis 3-methylpentane-2,4-dionato Dy0.2, La0.8
triethylammonium tetrakis 3-ethylpentane-2,4-dionato Dy0.2, La0.8
triethylammonium tetrakis pivaloyltrifluoroacetonato Dy0.2, La0.8
triethylammonium tetrakis trifluoroacetylacetonato Dy0.2, La0.8
triethylammonium tetrakis hexafluoroacetylacetonato Dy0.2, La0.8
triethylammonium tetrakis 6,6,7,7,8,8,8-heptafluoro-2,2-dimethyloctanedionato Dy0.2, La0.8
triethylammonium tetrakis 1-phenyl-1,3-butanedionato Dy0.2, La0.8
morpholinium tetrakis acetylacetonato Dy0.2, La0.8
morpholinium tetrakis dibenzoylmethanato Dy0.2, La0.8
morpholinium tetrakis thenoyltrifluoroacetonato Dy0.2, La0.8
morpholinium tetrakis 2,2,6,6-tetramethylheptanedionato Dy0.2, La0.8
morpholinium tetrakis 3-methylpentane-2,4-dionato Dy0.2, La0.8
morpholinium tetrakis 3-ethylpentane-2,4-dionato Dy0.2, La0.8
morpholinium tetrakis pivaloyltrifluoroacetonato Dy0.2, La0.8
morpholinium tetrakis trifluoroacetylacetonato Dy0.2, La0.8
morpholinium tetrakis hexafluoroacetylacetonato Dy0.2, La0.8
morpholinium tetrakis 6,6,7,7,8,8,8-heptafluoro-2,2-dimethyloctanedionato Dy0.2, La0.8
morpholinium tetrakis 1-phenyl-1,3-butanedionato Dy0.2, La0.8
dimethylbenzylammonium tetrakis acetylacetonato Dy0.2, La0.8
dimethylbenzylammonium tetrakis dibenzoylmethanato Dy0.2, La0.8
dimethylbenzylammonium tetrakis thenoyltrifluoroacetonato Dy0.2, La0.8
dimethylbenzylammonium tetrakis 2,2,6,6-tetramethylheptanedionato Dy0.2, La0.8
dimethylbenzylammonium tetrakis 3-methylpentane-2,4-dionato Dy0.2, La0.8
dimethylbenzylammonium tetrakis 3-ethylpentane-2,4-dionato Dy0.2, La0.8
dimethylbenzylammonium tetrakis pivaloyltrifluoroacetonato Dy0.2, La0.8
dimethylbenzylammonium tetrakis trifluoroacetylacetonato Dy0.2, La0.8
dimethylbenzylammonium tetrakis hexafluoroacetylacetonato Dy0.2, La0.8
dimethylbenzylammonium tetrakis 6,6,7,7,8,8,8-heptafluoro-2,2-dimethyloctanedionato Dy0.2, La0.8
dimethylbenzylammonium tetrakis 1-phenyl-1,3-butanedionato Dy0.2, La0.8
triallylammonium tetrakis acetylacetonato Dy0.2, La0.8
triallylammonium tetrakis dibenzoylmethanato Dy0.2, La0.8
triallylammonium tetrakis thenoyltrifluoroacetonato Dy0.2, La0.8
triallylammonium tetrakis 2,2,6,6-tetramethylheptanedionato Dy0.2, La0.8
triallylammonium tetrakis 3-methylpentane-2,4-dionato Dy0.2, La0.8
triallylammonium tetrakis 3-ethylpentane-2,4-dionato Dy0.2, La0.8
triallylammonium tetrakis pivaloyltrifluoroacetonato Dy0.2, La0.8
triallylammonium tetrakis trifluoroacetylacetonato Dy0.2, La0.8
triallylammonium tetrakis hexafluoroacetylacetonato Dy0.2, La0.8
triallylammonium tetrakis 6,6,7,7,8,8,8-heptafluoro-2,2-dimethyloctanedionato Dy0.2, La0.8
triallylammonium tetrakis 1-phenyl-1,3-butanedionato Dy0.2, La0.8
anilinium tetrakis acetylacetonato Dy0.2, La0.8
anilinium tetrakis dibenzoylmethanato Dy0.2, La0.8
anilinium tetrakis thenoyltrifluoroacetonato Dy0.2, La0.8
anilinium tetrakis 2,2,6,6-tetramethylheptanedionato Dy0.2, La0.8
anilinium tetrakis 3-methylpentane-2,4-dionato Dy0.2, La0.8
anilinium tetrakis 3-ethylpentane-2,4-dionato Dy0.2, La0.8
anilinium tetrakis pivaloyltrifluoroacetonato Dy0.2, La0.8
anilinium tetrakis trifluoroacetylacetonato Dy0.2, La0.8
anilinium tetrakis hexafluoroacetylacetonato Dy0.2, La0.8
anilinium tetrakis 6,6,7,7,8,8,8-heptafluoro-2,2-dimethyloctanedionato Dy0.2, La0.8
anilinium tetrakis 1-phenyl-1,3-butanedionato Dy0.2, La0.8
triethylammonium tetrakis acetylacetonato Dy0.1, La0.9
triethylammonium tetrakis dibenzoylmethanato Dy0.1, La0.9
triethylammonium tetrakis thenoyltrifluoroacetonato Dy0.1, La0.9
triethylammonium tetrakis 2,2,6,6-tetramethylheptanedionato Dy0.1, La0.9
triethylammonium tetrakis 3-methylpentane-2,4-dionato Dy0.1, La0.9
triethylammonium tetrakis 3-ethylpentane-2,4-dionato Dy0.1, La0.9
triethylammonium tetrakis pivaloyltrifluoroacetonato Dy0.1, La0.9
triethylammonium tetrakis trifluoroacetylacetonato Dy0.1, La0.9
triethylammonium tetrakis hexafluoroacetylacetonato Dy0.1, La0.9
triethylammonium tetrakis 6,6,7,7,8,8,8-heptafluoro-2,2-dimethyloctanedionato Dy0.1, La0.9
triethylammonium tetrakis 1-phenyl-1,3-butanedionato Dy0.1, La0.9
morpholinium tetrakis acetylacetonato Dy0.1, La0.9
morpholinium tetrakis dibenzoylmethanato Dy0.1, La0.9
morpholinium tetrakis thenoyltrifluoroacetonato Dy0.1, La0.9
morpholinium tetrakis 2,2,6,6-tetramethylheptanedionato Dy0.1, La0.9
morpholinium tetrakis 3-methylpentane-2,4-dionato Dy0.1, La0.9
morpholinium tetrakis 3-ethylpentane-2,4-dionato Dy0.1, La0.9
morpholinium tetrakis pivaloyltrifluoroacetonato Dy0.1, La0.9
morpholinium tetrakis trifluoroacetylacetonato Dy0.1, La0.9
morpholinium tetrakis hexafluoroacetylacetonato Dy0.1, La0.9
morpholinium tetrakis 6,6,7,7,8,8,8-heptafluoro-2,2-dimethyloctanedionato Dy0.1, La0.9
morpholinium tetrakis 1-phenyl-1,3-butanedionato Dy0.1, La0.9 dimethylbenzylammonium tetrakis acetylacetonato Dy0.1, La0.9
dimethylbenzylammonium tetrakis dibenzoylmethanato Dy0.1, La0.9
dimethylbenzylammonium tetrakis thenoyltrifluoroacetonato Dy0.1, La0.9
dimethylbenzylammonium tetrakis 2,2,6,6-tetramethylheptanedionato Dy0.1, La0.9
dimethylbenzylammonium tetrakis 3-methylpentane-2,4-dionato Dy0.1, La0.9
dimethylbenzylammonium tetrakis 3-ethylpentane-2,4-dionato Dy0.1, La0.9
dimethylbenzylammonium tetrakis pivaloyltrifluoroacetonato Dy0.1, La0.9
dimethylbenzylammonium tetrakis trifluoroacetylacetonato Dy0.1, La0.9
dimethylbenzylammonium tetrakis hexafluoroacetylacetonato Dy0.1, La0.9
dimethylbenzylammonium tetrakis 6,6,7,7,8,8,8-heptafluoro-2,2-dimethyloctanedionato Dy0.1, La0.9
dimethylbenzylammonium tetrakis 1-phenyl-1,3-butanedionato Dy0.1, La0.9
triallylammonium tetrakis acetylacetonato Dy0.1, La0.9
triallylammonium tetrakis dibenzoylmethanato Dy0.1, La0.9
triallylammonium tetrakis thenoyltrifluoroacetonato Dy0.1, La0.9
triallylammonium tetrakis 2,2,6,6-tetramethylheptanedionato Dy0.1, La0.9
triallylammonium tetrakis 3-methylpentane-2,4-dionato Dy0.1, La0.9
triallylammonium tetrakis 3-ethylpentane-2,4-dionato Dy0.1, La0.9
triallylammonium tetrakis pivaloyltrifluoroacetonato Dy0.1, La0.9
triallylammonium tetrakis trifluoroacetylacetonato Dy0.1, La0.9
triallylammonium tetrakis hexafluoroacetylacetonato Dy0.1, La0.9
triallylammonium tetrakis 6,6,7,7,8,8,8-heptafluoro-2,2-dimethyloctanedionato Dy0.1, La0.9
triallylammonium tetrakis 1-phenyl-1,3-butanedionato Dy0.1, La0.9
anilinium tetrakis acetylacetonato Dy0.1, La0.9
anilinium tetrakis dibenzoylmethanato Dy0.1, La0.9
anilinium tetrakis thenoyltrifluoroacetonato Dy0.1, La0.9
anilinium tetrakis 2,2,6,6-tetramethylheptanedionato Dy0.1, La0.9
anilinium tetrakis 3-methylpentane-2,4-dionato Dy0.1, La0.9
anilinium tetrakis 3-ethylpentane-2,4-dionato Dy0.1, La0.9
anilinium tetrakis pivaloyltrifluoroacetonato Dy0.1, La0.9
anilinium tetrakis trifluoroacetylacetonato Dy0.1, La0.9
anilinium tetrakis hexafluoroacetylacetonato Dy0.1, La0.9
anilinium tetrakis 6,6,7,7,8,8,8-heptafluoro-2,2-dimethyloctanedionato Dy0.1, La0.9
anilinium tetrakis 1-phenyl-1,3-butanedionato Dy0.1, La0.9
triethylammonium tetrakis acetylacetonato Dy0.01, La0.99
triethylammonium tetrakis dibenzoylmethanato Dy0.01, La0.99
triethylammonium tetrakis thenoyltrifluoroacetonato Dy0.01, La0.99
triethylammonium tetrakis 2,2,6,6-tetramethylheptanedionato Dy0.01, La0.99
triethylammonium tetrakis 3-methylpentane-2,4-dionato Dy0.01, La0.99
triethylammonium tetrakis 3-ethylpentane-2,4-dionato Dy0.01, La0.99
triethylammonium tetrakis pivaloyltrifluoroacetonato Dy0.01, La0.99
triethylammonium tetrakis trifluoroacetylacetonato Dy0.01, La0.99
triethylammonium tetrakis hexafluoroacetylacetonato Dy0.01, La0.99
triethylammonium tetrakis 6,6,7,7,8,8,8-heptafluoro-2,2-dimethyloctanedionato Dy0.01, La0.99
triethylammonium tetrakis 1-phenyl-1,3-butanedionato Dy0.01, La0.99
morpholinium tetrakis acetylacetonato Dy0.01, La0.99
morpholinium tetrakis dibenzoylmethanato Dy0.01, La0.99
morpholinium tetrakis thenoyltrifluoroacetonato Dy0.01, La0.99
morpholinium tetrakis 2,2,6,6-tetramethylheptanedionato Dy0.01, La0.99
morpholinium tetrakis 3-methylpentane-2,4-dionato Dy0.01, La0.99
morpholinium tetrakis 3-ethylpentane-2,4-dionato Dy0.01, La0.99
morpholinium tetrakis pivaloyltrifluoroacetonato Dy0.01, La0.99
morpholinium tetrakis trifluoroacetylacetonato Dy0.01, La0.99
morpholinium tetrakis hexafluoroacetylacetonato Dy0.01, La0.99
morpholinium tetrakis 6,6,7,7,8,8,8-heptafluoro-2,2-dimethyloctanedionato Dy0.01, La0.99
morpholinium tetrakis 1-phenyl-1,3-butanedionato Dy0.01, La0.99
dimethylbenzylammonium tetrakis acetylacetonato Dy0.01, La0.99
dimethylbenzylammonium tetrakis dibenzoylmethanato Dy0.01, La0.99
dimethylbenzylammonium tetrakis thenoyltrifluoroacetonato Dy0.01, La0.99
dimethylbenzylammonium tetrakis 2,2,6,6-tetramethylheptanedionato Dy0.01, La0.99
dimethylbenzylammonium tetrakis 3-methylpentane-2,4-dionato Dy0.01, La0.99
dimethylbenzylammonium tetrakis 3-ethylpentane-2,4-dionato Dy0.01, La0.99
dimethylbenzylammonium tetrakis pivaloyltrifluoroacetonato Dy0.01, La0.99
dimethylbenzylammonium tetrakis trifluoroacetylacetonato Dy0.01, La0.99
dimethylbenzylammonium tetrakis hexafluoroacetylacetonato Dy0.01, La0.99
dimethylbenzylammonium tetrakis 6,6,7,7,8,8,8-heptafluoro-2,2-dimethyloctanedionato Dy0.01, La0.99
dimethylbenzylammonium tetrakis 1-phenyl-1,3-butanedionato Dy0.01, La0.99
triallylammonium tetrakis acetylacetonato Dy0.01, La0.99
triallylammonium tetrakis dibenzoylmethanato Dy0.01, La0.99
triallylammonium tetrakis thenoyltrifluoroacetonato Dy0.01, La0.99
triallylammonium tetrakis 2,2,6,6-tetramethylheptanedionato Dy0.01, La0.99
triallylammonium tetrakis 3-methylpentane-2,4-dionato Dy0.01, La0.99
triallylammonium tetrakis 3-ethylpentane-2,4-dionato Dy0.01, La0.99
triallylammonium tetrakis pivaloyltrifluoroacetonato Dy0.01, La0.99 triallylammonium tetrakis trifluoroacetylacetonato Dy0.01, La0.99
triallylammonium tetrakis hexafluoroacetylacetonato Dy0.01, La0.99
triallylammonium tetrakis 6,6,7,7,8,8,8-heptafluoro-2,2-dimethyloctanedionato Dy0.01, La0.99
triallylammonium tetrakis 1-phenyl-1,3-butanedionato Dy0.01, La0.99
anilinium tetrakis acetylacetonato Dy0.01, La0.99
anilinium tetrakis dibenzoylmethanato Dy0.01, La0.99
anilinium tetrakis thenoyltrifluoroacetonato Dy0.01, La0.99
anilinium tetrakis 2,2,6,6-tetramethylheptanedionato Dy0.01, La0.99
anilinium tetrakis 3-methylpentane-2,4-dionato Dy0.01, La0.99
anilinium tetrakis 3-ethylpentane-2,4-dionato Dy0.01, La0.99
anilinium tetrakis pivaloyltrifluoroacetonato Dy0.01, La0.99
anilinium tetrakis trifluoroacetylacetonato Dy0.01, La0.99
anilinium tetrakis hexafluoroacetylacetonato Dy0.01, La0.99
anilinium tetrakis 6,6,7,7,8,8,8-heptafluoro-2,2-dimethyloctanedionato Dy0.01, La0.99
anilinium tetrakis 1-phenyl-1,3-butanedionato Dy0.01, La0.99
triethylammonium tetrakis acetylacetonato Sm0.5, Gd0.5
triethylammonium tetrakis dibenzoylmethanato Sm0.5, Gd0.5
triethylammonium tetrakis thenoyltrifluoroacetonato Sm0.5, Gd0.5
triethylammonium tetrakis 2,2,6,6-tetramethylheptanedionato Sm0.5, Gd0.5
triethylammonium tetrakis 3-methylpentane-2,4-dionato Sm0.5, Gd0.5
triethylammonium tetrakis 3-ethylpentane-2,4-dionato Sm0.5, Gd0.5
triethylammonium tetrakis pivaloyltrifluoroacetonato Sm0.5, Gd0.5
triethylammonium tetrakis trifluoroacetylacetonato Sm0.5, Gd0.5
triethylammonium tetrakis hexafluoroacetylacetonato Sm0.5, Gd0.5
triethylammonium tetrakis 6,6,7,7,8,8,8-heptafluoro-2,2-dimethyloctanedionato Sm0.5, Gd0.5
triethylammonium tetrakis 1-phenyl-1,3-butanedionato Sm0.5, Gd0.5
morpholinium tetrakis acetylacetonato Sm0.5, Gd0.5
morpholinium tetrakis dibenzoylmethanato Sm0.5, Gd0.5
morpholinium tetrakis thenoyltrifluoroacetonato Sm0.5, Gd0.5
morpholinium tetrakis 2,2,6,6-tetramethylheptanedionato Sm0.5, Gd0.5
morpholinium tetrakis 3-methylpentane-2,4-dionato Sm0.5, Gd0.5
morpholinium tetrakis 3-ethylpentane-2,4-dionato Sm0.5, Gd0.5
morpholinium tetrakis pivaloyltrifluoroacetonato Sm0.5, Gd0.5
morpholinium tetrakis trifluoroacetylacetonato Sm0.5, Gd0.5
morpholinium tetrakis hexafluoroacetylacetonato Sm0.5, Gd0.5
morpholinium tetrakis 6,6,7,7,8,8,8-heptafluoro-2,2-dimethyloctanedionato Sm0.5, Gd0.5
morpholinium tetrakis 1-phenyl-1,3-butanedionato Sm0.5, Gd0.5
dimethylbenzylammonium tetrakis acetylacetonato Sm0.5, Gd0.5
dimethylbenzylammonium tetrakis dibenzoylmethanato Sm0.5, Gd0.5
dimethylbenzylammonium tetrakis thenoyltrifluoroacetonato Sm0.5, Gd0.5
dimethylbenzylammonium tetrakis 2,2,6,6-tetramethylheptanedionato Sm0.5, Gd0.5
dimethylbenzylammonium tetrakis 3-methylpentane-2,4-dionato Sm0.5, Gd0.5
dimethylbenzylammonium tetrakis 3-ethylpentane-2,4-dionato Sm0.5, Gd0.5
dimethylbenzylammonium tetrakis pivaloyltrifluoroacetonato Sm0.5, Gd0.5
dimethylbenzylammonium tetrakis trifluoroacetylacetonato Sm0.5, Gd0.5
dimethylbenzylammonium tetrakis hexafluoroacetylacetonato Sm0.5, Gd0.5
dimethylbenzylammonium tetrakis 6,6,7,7,8,8,8-heptafluoro-2,2-dimethyloctanedionato Sm0.5, Gd0.5
dimethylbenzylammonium tetrakis 1-phenyl-1,3-butanedionato Sm0.5, Gd0.5
triallylammonium tetrakis acetylacetonato Sm0.5, Gd0.5
triallylammonium tetrakis dibenzoylmethanato Sm0.5, Gd0.5
triallylammonium tetrakis thenoyltrifluoroacetonato Sm0.5, Gd0.5
triallylammonium tetrakis 2,2,6,6-tetramethylheptanedionato Sm0.5, Gd0.5
triallylammonium tetrakis 3-methylpentane-2,4-dionato Sm0.5, Gd0.5
triallylammonium tetrakis 3-ethylpentane-2,4-dionato Sm0.5, Gd0.5
triallylammonium tetrakis pivaloyltrifluoroacetonato Sm0.5, Gd0.5
triallylammonium tetrakis trifluoroacetylacetonato Sm0.5, Gd0.5
triallylammonium tetrakis hexafluoroacetylacetonato Sm0.5, Gd0.5
triallylammonium tetrakis 6,6,7,7,8,8,8-heptafluoro-2,2-dimethyloctanedionato Sm0.5, Gd0.5
triallylammonium tetrakis 1-phenyl-1,3-butanedionato Sm0.5, Gd0.5
anilinium tetrakis acetylacetonato Sm0.5, Gd0.5
anilinium tetrakis dibenzoylmethanato Sm0.5, Gd0.5
anilinium tetrakis thenoyltrifluoroacetonato Sm0.5, Gd0.5
anilinium tetrakis 2,2,6,6-tetramethylheptanedionato Sm0.5, Gd0.5
anilinium tetrakis 3-methylpentane-2,4-dionato Sm0.5, Gd0.5
anilinium tetrakis 3-ethylpentane-2,4-dionato Sm0.5, Gd0.5
anilinium tetrakis pivaloyltrifluoroacetonato Sm0.5, Gd0.5
anilinium tetrakis trifluoroacetylacetonato Sm0.5, Gd0.5
anilinium tetrakis hexafluoroacetylacetonato Sm0.5, Gd0.5
anilinium tetrakis 6,6,7,7,8,8,8-heptafluoro-2,2-dimethyloctanedionato Sm0.5, Gd0.5
anilinium tetrakis 1-phenyl-1,3-butanedionato Sm0.5, Gd0.5
triethylammonium tetrakis acetylacetonato Sm0.2, Gd0.8
triethylammonium tetrakis dibenzoylmethanato Sm0.2, Gd0.8
triethylammonium tetrakis thenoyltrifluoroacetonato Sm0.2, Gd0.8
triethylammonium tetrakis 2,2,6,6-tetramethylheptanedionato Sm0.2, Gd0.8
triethylammonium tetrakis 3-methylpentane-2,4-dionato Sm0.2, Gd0.8 triethylammonium tetrakis 3-ethylpentane-2,4-dionato Sm0.2, Gd0.8
triethylammonium tetrakis pivaloyltrifluoroacetonato Sm0.2, Gd0.8
triethylammonium tetrakis trifluoroacetylacetonato Sm0.2, Gd0.8
triethylammonium tetrakis hexafluoroacetylacetonato Sm0.2, Gd0.8
triethylammonium tetrakis 6,6,7,7,8,8,8-heptafluoro-2,2-dimethyloctanedionato Sm0.2, Gd0.8
triethylammonium tetrakis 1-phenyl-1,3-butanedionato Sm0.2, Gd0.8
morpholinium tetrakis acetylacetonato Sm0.2, Gd0.8
morpholinium tetrakis dibenzoylmethanato Sm0.2, Gd0.8
morpholinium tetrakis thenoyltrifluoroacetonato Sm0.2, Gd0.8
morpholinium tetrakis 2,2,6,6-tetramethylheptanedionato Sm0.2, Gd0.8
morpholinium tetrakis 3-methylpentane-2,4-dionato Sm0.2, Gd0.8
morpholinium tetrakis 3-ethylpentane-2,4-dionato Sm0.2, Gd0.8
morpholinium tetrakis pivaloyltrifluoroacetonato Sm0.2, Gd0.8
morpholinium tetrakis trifluoroacetylacetonato Sm0.2, Gd0.8
morpholinium tetrakis hexafluoroacetylacetonato Sm0.2, Gd0.8
morpholinium tetrakis 6,6,7,7,8,8,8-heptafluoro-2,2-dimethyloctanedionato Sm0.2, Gd0.8
morpholinium tetrakis 1-phenyl-1,3-butanedionato Sm0.2, Gd0.8
dimethylbenzylammonium tetrakis acetylacetonato Sm0.2, Gd0.8
dimethylbenzylammonium tetrakis dibenzoylmethanato Sm0.2, Gd0.8
dimethylbenzylammonium tetrakis thenoyltrifluoroacetonato Sm0.2, Gd0.8
dimethylbenzylammonium tetrakis 2,2,6,6-tetramethylheptanedionato Sm0.2, Gd0.8
dimethylbenzylammonium tetrakis 3-methylpentane-2,4-dionato Sm0.2, Gd0.8
dimethylbenzylammonium tetrakis 3-ethylpentane-2,4-dionato Sm0.2, Gd0.8
dimethylbenzylammonium tetrakis pivaloyltrifluoroacetonato Sm0.2, Gd0.8
dimethylbenzylammonium tetrakis trifluoroacetylacetonato Sm0.2, Gd0.8
dimethylbenzylammonium tetrakis hexafluoroacetylacetonato Sm0.2, Gd0.8
dimethylbenzylammonium tetrakis 6,6,7,7,8,8,8-heptafluoro-2,2-dimethyloctanedionato Sm0.2, Gd0.8
dimethylbenzylammonium tetrakis 1-phenyl-1,3-butanedionato Sm0.2, Gd0.8
triallylammonium tetrakis acetylacetonato Sm0.2, Gd0.8
triallylammonium tetrakis dibenzoylmethanato Sm0.2, Gd0.8
triallylammonium tetrakis thenoyltrifluoroacetonato Sm0.2, Gd0.8
triallylammonium tetrakis 2,2,6,6-tetramethylheptanedionato Sm0.2, Gd0.8
triallylammonium tetrakis 3-methylpentane-2,4-dionato Sm0.2, Gd0.8
triallylammonium tetrakis 3-ethylpentane-2,4-dionato Sm0.2, Gd0.8
triallylammonium tetrakis pivaloyltrifluoroacetonato Sm0.2, Gd0.8
triallylammonium tetrakis trifluoroacetylacetonato Sm0.2, Gd0.8
triallylammonium tetrakis hexafluoroacetylacetonato Sm0.2, Gd0.8
triallylammonium tetrakis 6,6,7,7,8,8,8-heptafluoro-2,2-dimethyloctanedionato Sm0.2, Gd0.8
triallylammonium tetrakis 1-phenyl-1,3-butanedionato Sm0.2, Gd0.8
anilinium tetrakis acetylacetonato Sm0.2, Gd0.8
anilinium tetrakis dibenzoylmethanato Sm0.2, Gd0.8
anilinium tetrakis thenoyltrifluoroacetonato Sm0.2, Gd0.8
anilinium tetrakis 2,2,6,6-tetramethylheptanedionato Sm0.2, Gd0.8
anilinium tetrakis 3-methylpentane-2,4-dionato Sm0.2, Gd0.8
anilinium tetrakis 3-ethylpentane-2,4-dionato Sm0.2, Gd0.8
anilinium tetrakis pivaloyltrifluoroacetonato Sm0.2, Gd0.8
anilinium tetrakis trifluoroacetylacetonato Sm0.2, Gd0.8
anilinium tetrakis hexafluoroacetylacetonato Sm0.2, Gd0.8
anilinium tetrakis 6,6,7,7,8,8,8-heptafluoro-2,2-dimethyloctanedionato Sm0.2, Gd0.8
anilinium tetrakis 1-phenyl-1,3-butanedionato Sm0.2, Gd0.8
triethylammonium tetrakis acetylacetonato Sm0.1,Gd0.9
triethylammonium tetrakis dibenzoylmethanato Sm0.1, Gd0.9
triethylammonium tetrakis thenoyltrifluoroacetonato Sm0.1, Gd0.9
triethylammonium tetrakis 2,2,6,6-tetramethylheptanedionato Sm0.1,Gd0.9
triethylammonium tetrakis 3-methylpentane-2,4-dionato Sm0.1,Gd0.9
triethylammonium tetrakis 3-ethylpentane-2,4-dionato Sm0.1,Gd0.9
triethylammonium tetrakis pivaloyltrifluoroacetonato Sm0.1,Gd0.9
triethylammonium tetrakis trifluoroacetylacetonato Sm0.1, Gd0.9
triethylammonium tetrakis hexafluoroacetylacetonato Sm0.1,Gd0.9
triethylammonium tetrakis 6,6,7,7,8,8,8-heptafluoro-2,2-dimethyloctanedionato Sm0.1,Gd0.9
triethylammonium tetrakis 1-phenyl-1,3-butanedionato Sm0.1,Gd0.9
morpholinium tetrakis acetylacetonato Sm0.1,Gd0.9
morpholinium tetrakis dibenzoylmethanato Sm0.1,Gd0.9
morpholinium tetrakis thenoyltrifluoroacetonato Sm0.1, Gd0.9
morpholinium tetrakis 2,2,6,6-tetramethylheptanedionato Sm0.1,Gd0.9
morpholinium tetrakis 3-methylpentane-2,4-dionato Sm0.1, Gd0.9
morpholinium tetrakis 3-ethylpentane-2,4-dionato Sm0.1, Gd0.9
morpholinium tetrakis pivaloyltrifluoroacetonato Sm0.1, Gd0.9
morpholinium tetrakis trifluoroacetylacetonato Sm0.1, Gd0.9
morpholinium tetrakis hexafluoroacetylacetonato Sm0.1, Gd0.9
morpholinium tetrakis 6,6,7,7,8,8,8-heptafluoro-2,2-dimethyloctanedionato Sm0.1,Gd0.9
morpholinium tetrakis 1-phenyl-1,3-butanedionato Sm0.1, Gd0.9
dimethylbenzylammonium tetrakis acetylacetonato Sm0.1, Gd0.9 dimethylbenzylammonium tetrakis dibenzoylmethanato Sm0.1,Gd0.9
dimethylbenzylammonium tetrakis thenoyltrifluoroacetonato Sm0.1,Gd0.9
dimethylbenzylammonium tetrakis 2,2,6,6-tetramethylheptanedionato Sm0.1,Gd0.9
dimethylbenzylammonium tetrakis 3-methylpentane-2,4-dionato Sm0.1,Gd0.9
dimethylbenzylammonium tetrakis 3-ethylpentane-2,4-dionato Sm0.1,Gd0.9
dimethylbenzylammonium tetrakis pivaloyltrifluoroacetonato Sm0.1,Gd0.9
dimethylbenzylammonium tetrakis trifluoroacetylacetonato Sm0.1,Gd0.9
dimethylbenzylammonium tetrakis hexafluoroacetylacetonato Sm0.1,Gd0.9
dimethylbenzylammonium tetrakis 6,6,7,7,8,8,8-heptafluoro-2,2-dimethyloctanedionato Sm0.1,Gd0.9
dimethylbenzylammonium tetrakis 1-phenyl-1,3-butanedionato Sm0.1,Gd0.9
triallylammonium tetrakis acetylacetonato Sm0.1,Gd0.9
triallylammonium tetrakis dibenzoylmethanato Sm0.1, Gd0.9
triallylammonium tetrakis thenoyltrifluoroacetonato Sm0.1, Gd0.9
triallylammonium tetrakis 2,2,6,6-tetramethylheptanedionato Sm0.1,Gd0.9
triallylammonium tetrakis 3-methylpentane-2,4-dionato Sm0.1,Gd0.9
triallylammonium tetrakis 3-ethylpentane-2,4-dionato Sm0.1,Gd0.9
triallylammonium tetrakis pivaloyltrifluoroacetonato Sm0.1, Gd0.9
triallylammonium tetrakis trifluoroacetylacetonato Sm0.1, Gd0.9
triallylammonium tetrakis hexafluoroacetylacetonato Sm0.1,Gd0.9
triallylammonium tetrakis 6,6,7,7,8,8,8-heptafluoro-2,2-dimethyloctanedionato Sm0.1,Gd0.9
triallylammonium tetrakis 1-phenyl-1,3-butanedionato Sm0.1,Gd0.9
anilinium tetrakis acetylacetonato Sm0.1,Gd0.9
anilinium tetrakis dibenzoylmethanato Sm0.1,Gd0.9
anilinium tetrakis thenoyltrifluoroacetonato Sm0.1,Gd0.9
anilinium tetrakis 2,2,6,6-tetramethylheptanedionato Sm0.1, Gd0.9
anilinium tetrakis 3-methylpentane-2,4-dionato Sm0.1, Gd0.9
anilinium tetrakis 3-ethylpentane-2,4-dionato Sm0.1,Gd0.9
anilinium tetrakis pivaloyltrifluoroacetonato Sm0.1,Gd0.9
anilinium tetrakis trifluoroacetylacetonato Sm0.1,Gd0.9
anilinium tetrakis hexafluoroacetylacetonato Sm0.1,Gd0.9
anilinium tetrakis 6,6,7,7,8,8,8-heptafluoro-2,2-dimethyloctanedionato Sm0.1,Gd0.9
anilinium tetrakis 1-phenyl-1,3-butanedionato Sm0.1,Gd0.9
triethylammonium tetrakis acetylacetonato Sm0.01, Gd0.99
triethylammonium tetrakis dibenzoylmethanato Sm0.01, Gd0.99
triethylammonium tetrakis thenoyltrifluoroacetonato Sm0.01, Gd0.99
triethylammonium tetrakis 2,2,6,6-tetramethylheptanedionato Sm0.01, Gd0.99
triethylammonium tetrakis 3-methylpentane-2,4-dionato Sm0.01, Gd0.99
triethylammonium tetrakis 3-ethylpentane-2,4-dionato Sm0.01, Gd0.99
triethylammonium tetrakis pivaloyltrifluoroacetonato Sm0.01, Gd0.99
triethylammonium tetrakis trifluoroacetylacetonato Sm0.01, Gd0.99
triethylammonium tetrakis hexafluoroacetylacetonato Sm0.01, Gd0.99
triethylammonium tetrakis 6,6,7,7,8,8,8-heptafluoro-2,2-dimethyloctanedionato Sm0.01, Gd0.99
triethylammonium tetrakis 1-phenyl-1,3-butanedionato Sm0.01, Gd0.99
morpholinium tetrakis acetylacetonato Sm0.01, Gd0.99
morpholinium tetrakis dibenzoylmethanato Sm0.01, Gd0.99
morpholinium tetrakis thenoyltrifluoroacetonato Sm0.01, Gd0.99
morpholinium tetrakis 2,2,6,6-tetramethylheptanedionato Sm0.01, Gd0.99
morpholinium tetrakis 3-methylpentane-2,4-dionato Sm0.01, Gd0.99
morpholinium tetrakis 3-ethylpentane-2,4-dionato Sm0.01, Gd0.99
morpholinium tetrakis pivaloyltrifluoroacetonato Sm0.01, Gd0.99
morpholinium tetrakis trifluoroacetylacetonato Sm0.01, Gd0.99
morpholinium tetrakis hexafluoroacetylacetonato Sm0.01, Gd0.99
morpholinium tetrakis 6,6,7,7,8,8,8-heptafluoro-2,2-dimethyloctanedionato Sm0.01, Gd0.99
morpholinium tetrakis 1-phenyl-1,3-butanedionato Sm0.01, Gd0.99
dimethylbenzylammonium tetrakis acetylacetonato Sm0.01, Gd0.99
dimethylbenzylammonium tetrakis dibenzoylmethanato Sm0.01, Gd0.99
dimethylbenzylammonium tetrakis thenoyltrifluoroacetonato Sm0.01, Gd0.99
dimethylbenzylammonium tetrakis 2,2,6,6-tetramethylheptanedionato Sm0.01, Gd0.99
dimethylbenzylammonium tetrakis 3-methylpentane-2,4-dionato Sm0.01, Gd0.99
dimethylbenzylammonium tetrakis 3-ethylpentane-2,4-dionato Sm0.01, Gd0.99
dimethylbenzylammonium tetrakis pivaloyltrifluoroacetonato Sm0.01, Gd0.99
dimethylbenzylammonium tetrakis trifluoroacetylacetonato Sm0.01, Gd0.99
dimethylbenzylammonium tetrakis hexafluoroacetylacetonato Sm0.01, Gd0.99
dimethylbenzylammonium tetrakis 6,6,7,7,8,8,8-heptafluoro-2,2-dimethyloctanedionato Sm0.01, Gd0.99
dimethylbenzylammonium tetrakis 1-phenyl-1,3-butanedionato Sm0.01, Gd0.99
triallylammonium tetrakis acetylacetonato Sm0.01, Gd0.99
triallylammonium tetrakis dibenzoylmethanato Sm0.01, Gd0.99
triallylammonium tetrakis thenoyltrifluoroacetonato Sm0.01, Gd0.99
triallylammonium tetrakis 2,2,6,6-tetramethylheptanedionato Sm0.01, Gd0.99
triallylammonium tetrakis 3-methylpentane-2,4-dionato Sm0.01, Gd0.99
triallylammonium tetrakis 3-ethylpentane-2,4-dionato Sm0.01, Gd0.99
triallylammonium tetrakis pivaloyltrifluoroacetonato Sm0.01, Gd0.99
triallylammonium tetrakis trifluoroacetylacetonato Sm0.01, Gd0.99 triallylammonium tetrakis hexafluoroacetylacetonato Sm0.01, Gd0.99
triallylammonium tetrakis 6,6,7,7,8,8,8-heptafluoro-2,2-dimethyloctanedionato Sm0.01, Gd0.99
triallylammonium tetrakis 1-phenyl-1,3-butanedionato Sm0.01, Gd0.99
anilinium tetrakis acetylacetonato Sm0.01, Gd0.99
anilinium tetrakis dibenzoylmethanato Sm0.01, Gd0.99
anilinium tetrakis thenoyltrifluoroacetonato Sm0.01, Gd0.99
anilinium tetrakis 2,2,6,6-tetramethylheptanedionato Sm0.01, Gd0.99
anilinium tetrakis 3-methylpentane-2,4-dionato Sm0.01, Gd0.99
anilinium tetrakis 3-ethylpentane-2,4-dionato Sm0.01, Gd0.99
anilinium tetrakis pivaloyltrifluoroacetonato Sm0.01, Gd0.99
anilinium tetrakis trifluoroacetylacetonato Sm0.01, Gd0.99
anilinium tetrakis hexafluoroacetylacetonato Sm0.01, Gd0.99
anilinium tetrakis 6,6,7,7,8,8,8-heptafluoro-2,2-dimethyloctanedionato Sm0.01, Gd0.99
anilinium tetrakis 1-phenyl-1,3-butanedionato Sm0.01, Gd0.99
triethylammonium tetrakis acetylacetonato Dy0.5, Gd0.5
triethylammonium tetrakis dibenzoylmethanato Dy0.5, Gd0.5
triethylammonium tetrakis thenoyltrifluoroacetonato Dy0.5, Gd0.5
triethylammonium tetrakis 2,2,6,6-tetramethylheptanedionato Dy0.5, Gd0.5
triethylammonium tetrakis 3-methylpentane-2,4-dionato Dy0.5, Gd0.5
triethylammonium tetrakis 3-ethylpentane-2,4-dionato Dy0.5, Gd0.5
triethylammonium tetrakis pivaloyltrifluoroacetonato Dy0.5, Gd0.5
triethylammonium tetrakis trifluoroacetylacetonato Dy0.5, Gd0.5
triethylammonium tetrakis hexafluoroacetylacetonato Dy0.5, Gd0.5
triethylammonium tetrakis 6,6,7,7,8,8,8-heptafluoro-2,2-dimethyloctanedionato Dy0.5, Gd0.5
triethylammonium tetrakis 1-phenyl-1,3-butanedionato Dy0.5, Gd0.5
morpholinium tetrakis acetylacetonato Dy0.5, Gd0.5
morpholinium tetrakis dibenzoylmethanato Dy0.5, Gd0.5
morpholinium tetrakis thenoyltrifluoroacetonato Dy0.5, Gd0.5
morpholinium tetrakis 2,2,6,6-tetramethylheptanedionato Dy0.5, Gd0.5
morpholinium tetrakis 3-methylpentane-2,4-dionato Dy0.5, Gd0.5
morpholinium tetrakis 3-ethylpentane-2,4-dionato Dy0.5, Gd0.5
morpholinium tetrakis pivaloyltrifluoroacetonato Dy0.5, Gd0.5
morpholinium tetrakis trifluoroacetylacetonato Dy0.5, Gd0.5
morpholinium tetrakis hexafluoroacetylacetonato Dy0.5, Gd0.5
morpholinium tetrakis 6,6,7,7,8,8,8-heptafluoro-2,2-dimethyloctanedionato Dy0.5, Gd0.5
morpholinium tetrakis 1-phenyl-1,3-butanedionato Dy0.5, Gd0.5
dimethylbenzylammonium tetrakis acetylacetonato Dy0.5, Gd0.5 dimethylbenzylammonium tetrakis dibenzoylmethanato Dy0.5, Gd0.5
dimethylbenzylammonium tetrakis thenoyltrifluoroacetonato Dy0.5, Gd0.5
dimethylbenzylammonium tetrakis 2,2,6,6-tetramethylheptanedionato Dy0.5, Gd0.5
dimethylbenzylammonium tetrakis 3-methylpentane-2,4-dionato Dy0.5, Gd0.5
dimethylbenzylammonium tetrakis 3-ethylpentane-2,4-dionato Dy0.5, Gd0.5
dimethylbenzylammonium tetrakis pivaloyltrifluoroacetonato Dy0.5, Gd0.5
dimethylbenzylammonium tetrakis trifluoroacetylacetonato Dy0.5, Gd0.5
dimethylbenzylammonium tetrakis hexafluoroacetylacetonato Dy0.5, Gd0.5
dimethylbenzylammonium tetrakis 6,6,7,7,8,8,8-heptafluoro-2,2-dimethyloctanedionato Dy0.5, Gd0.5
dimethylbenzylammonium tetrakis 1-phenyl-1,3-butanedionato Dy0.5, Gd0.5
triallylammonium tetrakis acetylacetonato Dy0.5, Gd0.5
triallylammonium tetrakis dibenzoylmethanato Dy0.5, Gd0.5
triallylammonium tetrakis thenoyltrifluoroacetonato Dy0.5, Gd0.5
triallylammonium tetrakis 2,2,6,6-tetramethylheptanedionato Dy0.5, Gd0.5
triallylammonium tetrakis 3-methylpentane-2,4-dionato Dy0.5, Gd0.5
triallylammonium tetrakis 3-ethylpentane-2,4-dionato Dy0.5, Gd0.5
triallylammonium tetrakis pivaloyltrifluoroacetonato Dy0.5, Gd0.5
triallylammonium tetrakis trifluoroacetylacetonato Dy0.5, Gd0.5
triallylammonium tetrakis hexafluoroacetylacetonato Dy0.5, Gd0.5
triallylammonium tetrakis 6,6,7,7,8,8,8-heptafluoro-2,2-dimethyloctanedionato Dy0.5, Gd0.5
triallylammonium tetrakis 1-phenyl-1,3-butanedionato Dy0.5, Gd0.5
anilinium tetrakis acetylacetonato Dy0.5, Gd0.5
anilinium tetrakis dibenzoylmethanato Dy0.5, Gd0.5
anilinium tetrakis thenoyltrifluoroacetonato Dy0.5, Gd0.5
anilinium tetrakis 2,2,6,6-tetramethylheptanedionato Dy0.5, Gd0.5
anilinium tetrakis 3-methylpentane-2,4-dionato Dy0.5, Gd0.5
anilinium tetrakis 3-ethylpentane-2,4-dionato Dy0.5, Gd0.5
anilinium tetrakis pivaloyltrifluoroacetonato Dy0.5, Gd0.5
anilinium tetrakis trifluoroacetylacetonato Dy0.5, Gd0.5
anilinium tetrakis hexafluoroacetylacetonato Dy0.5, Gd0.5
anilinium tetrakis 6,6,7,7,8,8,8-heptafluoro-2,2-dimethyloctanedionato Dy0.5, Gd0.5
anilinium tetrakis 1-phenyl-1,3-butanedionato Dy0.5, Gd0.5
triethylammonium tetrakis acetylacetonato Dy0.2, Gd0.8
triethylammonium tetrakis dibenzoylmethanato Dy0.2, Gd0.8
triethylammonium tetrakis thenoyltrifluoroacetonato Dy0.2, Gd0.8
triethylammonium tetrakis 2,2,6,6-tetramethylheptanedionato Dy0.2, Gd0.8
triethylammonium tetrakis 3-methylpentane-2,4-dionato Dy0.2, Gd0.8
triethylammonium tetrakis 3-ethylpentane-2,4-dionato Dy0.2, Gd0.8 triethylammonium tetrakis pivaloyltrifluoroacetonato Dy0.2, Gd0.8
triethylammonium tetrakis trifluoroacetylacetonato Dy0.2, Gd0.8
triethylammonium tetrakis hexafluoroacetylacetonato Dy0.2, Gd0.8
triethylammonium tetrakis 6,6,7,7,8,8,8-heptafluoro-2,2-dimethyloctanedionato Dy0.2, Gd0.8
triethylammonium tetrakis 1-phenyl-1,3-butanedionato Dy0.2, Gd0.8
morpholinium tetrakis acetylacetonato Dy0.2, Gd0.8
morpholinium tetrakis dibenzoylmethanato Dy0.2, Gd0.8
morpholinium tetrakis thenoyltrifluoroacetonato Dy0.2, Gd0.8
morpholinium tetrakis 2,2,6,6-tetramethylheptanedionato Dy0.2, Gd0.8
morpholinium tetrakis 3-methylpentane-2,4-dionato Dy0.2, Gd0.8
morpholinium tetrakis 3-ethylpentane-2,4-dionato Dy0.2, Gd0.8
morpholinium tetrakis pivaloyltrifluoroacetonato Dy0.2, Gd0.8
morpholinium tetrakis trifluoroacetylacetonato Dy0.2, Gd0.8
morpholinium tetrakis hexafluoroacetylacetonato Dy0.2, Gd0.8
morpholinium tetrakis 6,6,7,7,8,8,8-heptafluoro-2,2-dimethyloctanedionato Dy0.2, Gd0.8
morpholinium tetrakis 1-phenyl-1,3-butanedionato Dy0.2, Gd0.8
dimethylbenzylammonium tetrakis acetylacetonato Dy0.2, Gd0.8
dimethylbenzylammonium tetrakis dibenzoylmethanato Dy0.2, Gd0.8
dimethylbenzylammonium tetrakis thenoyltrifluoroacetonato Dy0.2, Gd0.8
dimethylbenzylammonium tetrakis 2,2,6,6-tetramethylheptanedionato Dy0.2, Gd0.8
dimethylbenzylammonium tetrakis 3-methylpentane-2,4-dionato Dy0.2, Gd0.8
dimethylbenzylammonium tetrakis 3-ethylpentane-2,4-dionato Dy0.2, Gd0.8
dimethylbenzylammonium tetrakis pivaloyltrifluoroacetonato Dy0.2, Gd0.8
dimethylbenzylammonium tetrakis trifluoroacetylacetonato Dy0.2, Gd0.8
dimethylbenzylammonium tetrakis hexafluoroacetylacetonato Dy0.2, Gd0.8
dimethylbenzylammonium tetrakis 6,6,7,7,8,8,8-heptafluoro-2,2-dimethyloctanedionato Dy0.2, Gd0.8
dimethylbenzylammonium tetrakis 1-phenyl-1,3-butanedionato Dy0.2, Gd0.8
triallylammonium tetrakis acetylacetonato Dy0.2, Gd0.8
triallylammonium tetrakis dibenzoylmethanato Dy0.2, Gd0.8
triallylammonium tetrakis thenoyltrifluoroacetonato Dy0.2, Gd0.8
triallylammonium tetrakis 2,2,6,6-tetramethylheptanedionato Dy0.2, Gd0.8
triallylammonium tetrakis 3-methylpentane-2,4-dionato Dy0.2, Gd0.8
triallylammonium tetrakis 3-ethylpentane-2,4-dionato Dy0.2, Gd0.8
triallylammonium tetrakis pivaloyltrifluoroacetonato Dy0.2, Gd0.8
triallylammonium tetrakis trifluoroacetylacetonato Dy0.2, Gd0.8
triallylammonium tetrakis hexafluoroacetylacetonato Dy0.2, Gd0.8
triallylammonium tetrakis 6,6,7,7,8,8,8-heptafluoro-2,2-dimethyloctanedionato Dy0.2, Gd0.8
triallylammonium tetrakis 1-phenyl-1,3-butanedionato Dy0.2, Gd0.8
anilinium tetrakis acetylacetonato Dy0.2, Gd0.8
anilinium tetrakis dibenzoylmethanato Dy0.2, Gd0.8
anilinium tetrakis thenoyltrifluoroacetonato Dy0.2, Gd0.8
anilinium tetrakis 2,2,6,6-tetramethylheptanedionato Dy0.2, Gd0.8
anilinium tetrakis 3-methylpentane-2,4-dionato Dy0.2, Gd0.8
anilinium tetrakis 3-ethylpentane-2,4-dionato Dy0.2, Gd0.8
anilinium tetrakis pivaloyltrifluoroacetonato Dy0.2, Gd0.8
anilinium tetrakis trifluoroacetylacetonato Dy0.2, Gd0.8
anilinium tetrakis hexafluoroacetylacetonato Dy0.2, Gd0.8
anilinium tetrakis 6,6,7,7,8,8,8-heptafluoro-2,2-dimethyloctanedionato Dy0.2, Gd0.8
anilinium tetrakis 1-phenyl-1,3-butanedionato Dy0.2, Gd0.8
triethylammonium tetrakis acetylacetonato Dy0.1,Gd0.9
triethylammonium tetrakis dibenzoylmethanato Dy0.1, Gd0.9
triethylammonium tetrakis thenoyltrifluoroacetonato Dy0.1, Gd0.9
triethylammonium tetrakis 2,2,6,6-tetramethylheptanedionato Dy0.1,Gd0.9
triethylammonium tetrakis 3-methylpentane-2,4-dionato Dy0.1,Gd0.9
triethylammonium tetrakis 3-ethylpentane-2,4-dionato Dy0.1,Gd0.9
triethylammonium tetrakis pivaloyltrifluoroacetonato Dy0.1,Gd0.9
triethylammonium tetrakis trifluoroacetylacetonato Dy0.1, Gd0.9
triethylammonium tetrakis hexafluoroacetylacetonato Dy0.1,Gd0.9
triethylammonium tetrakis 6,6,7,7,8,8,8-heptafluoro-2,2-dimethyloctanedionato Dy0.1,Gd0.9
triethylammonium tetrakis 1-phenyl-1,3-butanedionato Dy0.1,Gd0.9
morpholinium tetrakis acetylacetonato Dy0.1,Gd0.9
morpholinium tetrakis dibenzoylmethanato Dy0.1,Gd0.9
morpholinium tetrakis thenoyltrifluoroacetonato Dy0.1, Gd0.9
morpholinium tetrakis 2,2,6,6-tetramethylheptanedionato Dy0.1,Gd0.9
morpholinium tetrakis 3-methylpentane-2,4-dionato Dy0.1, Gd0.9
morpholinium tetrakis 3-ethylpentane-2,4-dionato Dy0.1, Gd0.9
morpholinium tetrakis pivaloyltrifluoroacetonato Dy0.1, Gd0.9
morpholinium tetrakis trifluoroacetylacetonato Dy0.1,Gd0.9
morpholinium tetrakis hexafluoroacetylacetonato Dy0.1, Gd0.9
morpholinium tetrakis 6,6,7,7,8,8,8-heptafluoro-2,2-dimethyloctanedionato Dy0.1,Gd0.9
morpholinium tetrakis 1-phenyl-1,3-butanedionato Dy0.1, Gd0.9
dimethylbenzylammonium tetrakis acetylacetonato Dy0.1, Gd0.9
dimethylbenzylammonium tetrakis dibenzoylmethanato Dy0.1,Gd0.9
dimethylbenzylammonium tetrakis thenoyltrifluoroacetonato Dy0.1,Gd0.9 dimethylbenzylammonium tetrakis 2,2,6,6-tetramethylheptanedionato Dy0.1,Gd0.9
dimethylbenzylammonium tetrakis 3-methylpentane-2,4-dionato Dy0.1,Gd0.9
dimethylbenzylammonium tetrakis 3-ethylpentane-2,4-dionato Dy0.1,Gd0.9
dimethylbenzylammonium tetrakis pivaloyltrifluoroacetonato Dy0.1,Gd0.9
dimethylbenzylammonium tetrakis trifluoroacetylacetonato Dy0.1,Gd0.9
dimethylbenzylammonium tetrakis hexafluoroacetylacetonato Dy0.1,Gd0.9
dimethylbenzylammonium tetrakis 6,6,7,7,8,8,8-heptafluoro-2,2-dimethyloctanedionato Dy0.1,Gd0.9
dimethylbenzylammonium tetrakis 1-phenyl-1,3-butanedionato Dy0.1,Gd0.9
triallylammonium tetrakis acetylacetonato Dy0.1,Gd0.9
triallylammonium tetrakis dibenzoylmethanato Dy0.1, Gd0.9
triallylammonium tetrakis thenoyltrifluoroacetonato Dy0.1, Gd0.9
triallylammonium tetrakis 2,2,6,6-tetramethylheptanedionato Dy0.1,Gd0.9
triallylammonium tetrakis 3-methylpentane-2,4-dionato Dy0.1,Gd0.9
triallylammonium tetrakis 3-ethylpentane-2,4-dionato Dy0.1,Gd0.9
triallylammonium tetrakis pivaloyltrifluoroacetonato Dy0.1, Gd0.9
triallylammonium tetrakis trifluoroacetylacetonato Dy0.1, Gd0.9
triallylammonium tetrakis hexafluoroacetylacetonato Dy0.1, Gd0.9
triallylammonium tetrakis 6,6,7,7,8,8,8-heptafluoro-2,2-dimethyloctanedionato Dy0.1,Gd0.9
triallylammonium tetrakis 1-phenyl-1,3-butanedionato Dy0.1,Gd0.9
anilinium tetrakis acetylacetonato Dy0.1,Gd0.9
anilinium tetrakis dibenzoylmethanato Dy0.1,Gd0.9
anilinium tetrakis thenoyltrifluoroacetonato Dy0.1,Gd0.9
anilinium tetrakis 2,2,6,6-tetramethylheptanedionato Dy0.1, Gd0.9
anilinium tetrakis 3-methylpentane-2,4-dionato Dy0.1, Gd0.9
anilinium tetrakis 3-ethylpentane-2,4-dionato Dy0.1,Gd0.9
anilinium tetrakis pivaloyltrifluoroacetonato Dy0.1,Gd0.9
anilinium tetrakis trifluoroacetylacetonato Dy0.1,Gd0.9
anilinium tetrakis hexafluoroacetylacetonato Dy0.1,Gd0.9
anilinium tetrakis 6,6,7,7,8,8,8-heptafluoro-2,2-dimethyloctanedionato Dy0.1,Gd0.9
anilinium tetrakis 1-phenyl-1,3-butanedionato Dy0.1,Gd0.9
triethylammonium tetrakis acetylacetonato Dy0.01, Gd0.99
triethylammonium tetrakis dibenzoylmethanato Dy0.01, Gd0.99
triethylammonium tetrakis thenoyltrifluoroacetonato Dy0.01, Gd0.99
triethylammonium tetrakis 2,2,6,6-tetramethylheptanedionato Dy0.01, Gd0.99
triethylammonium tetrakis 3-methylpentane-2,4-dionato Dy0.01, Gd0.99
triethylammonium tetrakis 3-ethylpentane-2,4-dionato Dy0.01, Gd0.99
triethylammonium tetrakis pivaloyltrifluoroacetonato Dy0.01, Gd0.99
triethylammonium tetrakis trifluoroacetylacetonato Dy0.01, Gd0.99
triethylammonium tetrakis hexafluoroacetylacetonato Dy0.01, Gd0.99
triethylammonium tetrakis 6,6,7,7,8,8,8-heptafluoro-2,2-dimethyloctanedionato Dy0.01, Gd0.99
triethylammonium tetrakis 1-phenyl-1,3-butanedionato Dy0.01, Gd0.99
morpholinium tetrakis acetylacetonato Dy0.01, Gd0.99
morpholinium tetrakis dibenzoylmethanato Dy0.01, Gd0.99
morpholinium tetrakis thenoyltrifluoroacetonato Dy0.01, Gd0.99
morpholinium tetrakis 2,2,6,6-tetramethylheptanedionato Dy0.01, Gd0.99
morpholinium tetrakis 3-methylpentane-2,4-dionato Dy0.01, Gd0.99
morpholinium tetrakis 3-ethylpentane-2,4-dionato Dy0.01, Gd0.99
morpholinium tetrakis pivaloyltrifluoroacetonato Dy0.01, Gd0.99
morpholinium tetrakis trifluoroacetylacetonato Dy0.01, Gd0.99
morpholinium tetrakis hexafluoroacetylacetonato Dy0.01, Gd0.99
morpholinium tetrakis 6,6,7,7,8,8,8-heptafluoro-2,2-dimethyloctanedionato Dy0.01, Gd0.99
morpholinium tetrakis 1-phenyl-1,3-butanedionato Dy0.01, Gd0.99
dimethylbenzylammonium tetrakis acetylacetonato Dy0.01, Gd0.99
dimethylbenzylammonium tetrakis dibenzoylmethanato Dy0.01, Gd0.99
dimethylbenzylammonium tetrakis thenoyltrifluoroacetonato Dy0.01, Gd0.99
dimethylbenzylammonium tetrakis 2,2,6,6-tetramethylheptanedionato Dy0.01, Gd0.99
dimethylbenzylammonium tetrakis 3-methylpentane-2,4-dionato Dy0.01, Gd0.99
dimethylbenzylammonium tetrakis 3-ethylpentane-2,4-dionato Dy0.01, Gd0.99
dimethylbenzylammonium tetrakis pivaloyltrifluoroacetonato Dy0.01, Gd0.99
dimethylbenzylammonium tetrakis trifluoroacetylacetonato Dy0.01, Gd0.99
dimethylbenzylammonium tetrakis hexafluoroacetylacetonato Dy0.01, Gd0.99
dimethylbenzylammonium tetrakis 6,6,7,7,8,8,8-heptafluoro-2,2-dimethyloctanedionato Dy0.01, Gd0.99
dimethylbenzylammonium tetrakis 1-phenyl-1,3-butanedionato Dy0.01, Gd0.99
triallylammonium tetrakis acetylacetonato Dy0.01, Gd0.99
triallylammonium tetrakis dibenzoylmethanato Dy0.01, Gd0.99
triallylammonium tetrakis thenoyltrifluoroacetonato Dy0.01, Gd0.99
triallylammonium tetrakis 2,2,6,6-tetramethylheptanedionato Dy0.01, Gd0.99
triallylammonium tetrakis 3-methylpentane-2,4-dionato Dy0.01, Gd0.99
triallylammonium tetrakis 3-ethylpentane-2,4-dionato Dy0.01, Gd0.99
triallylammonium tetrakis pivaloyltrifluoroacetonato Dy0.01, Gd0.99
triallylammonium tetrakis trifluoroacetylacetonato Dy0.01, Gd0.99
triallylammonium tetrakis hexafluoroacetylacetonato Dy0.01, Gd0.99
triallylammonium tetrakis 6,6,7,7,8,8,8-heptafluoro-2,2-dimethyloctanedionato Dy0.01, Gd0.99 triallylammonium tetrakis 1-phenyl-1,3-butanedionato Dy0.01, Gd0.99
anilinium tetrakis acetylacetonato Dy0.01, Gd0.99
anilinium tetrakis dibenzoylmethanato Dy0.01, Gd0.99
anilinium tetrakis thenoyltrifluoroacetonato Dy0.01, Gd0.99
anilinium tetrakis 2,2,6,6-tetramethylheptanedionato Dy0.01, Gd0.99
anilinium tetrakis 3-methylpentane-2,4-dionato Dy0.01, Gd0.99
anilinium tetrakis 3-ethylpentane-2,4-dionato Dy0.01, Gd0.99
anilinium tetrakis pivaloyltrifluoroacetonato Dy0.01, Gd0.99
anilinium tetrakis trifluoroacetylacetonato Dy0.01, Gd0.99
anilinium tetrakis hexafluoroacetylacetonato Dy0.01, Gd0.99
anilinium tetrakis 6,6,7,7,8,8,8-heptafluoro-2,2-dimethyloctanedionato Dy0.01, Gd0.99
anilinium tetrakis 1-phenyl-1,3-butanedionato Dy0.01, Gd0.99
triethylammonium tetrakis acetylacetonato Dy0.5, Gd0.5
triethylammonium tetrakis dibenzoylmethanato Dy0.5, Gd0.5
triethylammonium tetrakis thenoyltrifluoroacetonato Dy0.5, Gd0.5
triethylammonium tetrakis 2,2,6,6-tetramethylheptanedionato Dy0.5, Gd0.5
triethylammonium tetrakis 3-methylpentane-2,4-dionato Dy0.5, Gd0.5
triethylammonium tetrakis 3-ethylpentane-2,4-dionato Dy0.5, Gd0.5
triethylammonium tetrakis pivaloyltrifluoroacetonato Dy0.5, Gd0.5
triethylammonium tetrakis trifluoroacetylacetonato Dy0.5, Gd0.5
triethylammonium tetrakis hexafluoroacetylacetonato Dy0.5, Gd0.5
triethylammonium tetrakis 6,6,7,7,8,8,8-heptafluoro-2,2-dimethyloctanedionato Dy0.5, Gd0.5
triethylammonium tetrakis 1-phenyl-1,3-butanedionato Dy0.5, Gd0.5
morpholinium tetrakis acetylacetonato Dy0.5, Gd0.5
morpholinium tetrakis dibenzoylmethanato Dy0.5, Gd0.5
morpholinium tetrakis thenoyltrifluoroacetonato Dy0.5, Gd0.5
morpholinium tetrakis 2,2,6,6-tetramethylheptanedionato Dy0.5, Gd0.5
morpholinium tetrakis 3-methylpentane-2,4-dionato Dy0.5, Gd0.5
morpholinium tetrakis 3-ethylpentane-2,4-dionato Dy0.5, Gd0.5
morpholinium tetrakis pivaloyltrifluoroacetonato Dy0.5, Gd0.5
morpholinium tetrakis trifluoroacetylacetonato Dy0.5, Gd0.5
morpholinium tetrakis hexafluoroacetylacetonato Dy0.5, Gd0.5
morpholinium tetrakis 6,6,7,7,8,8,8-heptafluoro-2,2-dimethyloctanedionato Dy0.5, Gd0.5
morpholinium tetrakis 1-phenyl-1,3-butanedionato Dy0.5, Gd0.5
dimethylbenzylammonium tetrakis acetylacetonato Dy0.5, Gd0.5
dimethylbenzylammonium tetrakis dibenzoylmethanato Dy0.5, Gd0.5
dimethylbenzylammonium tetrakis thenoyltrifluoroacetonato Dy0.5, Gd0.5
dimethylbenzylammonium tetrakis 2,2,6,6-tetramethylheptanedionato Dy0.5, Gd0.5
dimethylbenzylammonium tetrakis 3-methylpentane-2,4-dionato Dy0.5, Gd0.5
dimethylbenzylammonium tetrakis 3-ethylpentane-2,4-dionato Dy0.5, Gd0.5
dimethylbenzylammonium tetrakis pivaloyltrifluoroacetonato Dy0.5, Gd0.5
dimethylbenzylammonium tetrakis trifluoroacetylacetonato Dy0.5, Gd0.5
dimethylbenzylammonium tetrakis hexafluoroacetylacetonato Dy0.5, Gd0.5
dimethylbenzylammonium tetrakis 6,6,7,7,8,8,8-heptafluoro-2,2-dimethyloctanedionato Dy0.5, Gd0.5
dimethylbenzylammonium tetrakis 1-phenyl-1,3-butanedionato Dy0.5, Gd0.5
triallylammonium tetrakis acetylacetonato Dy0.5, Gd0.5
triallylammonium tetrakis dibenzoylmethanato Dy0.5, Gd0.5
triallylammonium tetrakis thenoyltrifluoroacetonato Dy0.5, Gd0.5
triallylammonium tetrakis 2,2,6,6-tetramethylheptanedionato Dy0.5, Gd0.5
triallylammonium tetrakis 3-methylpentane-2,4-dionato Dy0.5, Gd0.5
triallylammonium tetrakis 3-ethylpentane-2,4-dionato Dy0.5, Gd0.5
triallylammonium tetrakis pivaloyltrifluoroacetonato Dy0.5, Gd0.5
triallylammonium tetrakis trifluoroacetylacetonato Dy0.5, Gd0.5
triallylammonium tetrakis hexafluoroacetylacetonato Dy0.5, Gd0.5
triallylammonium tetrakis 6,6,7,7,8,8,8-heptafluoro-2,2-dimethyloctanedionato Dy0.5, Gd0.5
triallylammonium tetrakis 1-phenyl-1,3-butanedionato Dy0.5, Gd0.5
anilinium tetrakis acetylacetonato Dy0.5, Gd0.5
anilinium tetrakis dibenzoylmethanato Dy0.5, Gd0.5
anilinium tetrakis thenoyltrifluoroacetonato Dy0.5, Gd0.5
anilinium tetrakis 2,2,6,6-tetramethylheptanedionato Dy0.5, Gd0.5
anilinium tetrakis 3-methylpentane-2,4-dionato Dy0.5, Gd0.5
anilinium tetrakis 3-ethylpentane-2,4-dionato Dy0.5, Gd0.5
anilinium tetrakis pivaloyltrifluoroacetonato Dy0.5, Gd0.5
anilinium tetrakis trifluoroacetylacetonato Dy0.5, Gd0.5
anilinium tetrakis hexafluoroacetylacetonato Dy0.5, Gd0.5
anilinium tetrakis 6,6,7,7,8,8,8-heptafluoro-2,2-dimethyloctanedionato Dy0.5, Gd0.5
anilinium tetrakis 1-phenyl-1,3-butanedionato Dy0.5, Gd0.5
triethylammonium tetrakis acetylacetonato Dy0.2, Gd0.8
triethylammonium tetrakis dibenzoylmethanato Dy0.2, Gd0.8
triethylammonium tetrakis thenoyltrifluoroacetonato Dy0.2, Gd0.8
triethylammonium tetrakis 2,2,6,6-tetramethylheptanedionato Dy0.2, Gd0.8
triethylammonium tetrakis 3-methylpentane-2,4-dionato Dy0.2, Gd0.8
triethylammonium tetrakis 3-ethylpentane-2,4-dionato Dy0.2, Gd0.8
triethylammonium tetrakis pivaloyltrifluoroacetonato Dy0.2, Gd0.8
triethylammonium tetrakis trifluoroacetylacetonato Dy0.2, Gd0.8 triethylammonium tetrakis hexafluoroacetylacetonato Dy0.2, Gd0.8
triethylammonium tetrakis 6,6,7,7,8,8,8-heptafluoro-2,2-dimethyloctanedionato Dy0.2, Gd0.8
triethylammonium tetrakis 1-phenyl-1,3-butanedionato Dy0.2, Gd0.8
morpholinium tetrakis acetylacetonato Dy0.2, Gd0.8
morpholinium tetrakis dibenzoylmethanato Dy0.2, Gd0.8
morpholinium tetrakis thenoyltrifluoroacetonato Dy0.2, Gd0.8
morpholinium tetrakis 2,2,6,6-tetramethylheptanedionato Dy0.2, Gd0.8
morpholinium tetrakis 3-methylpentane-2,4-dionato Dy0.2, Gd0.8
morpholinium tetrakis 3-ethylpentane-2,4-dionato Dy0.2, Gd0.8
morpholinium tetrakis pivaloyltrifluoroacetonato Dy0.2, Gd0.8
morpholinium tetrakis trifluoroacetylacetonato Dy0.2, Gd0.8
morpholinium tetrakis hexafluoroacetylacetonato Dy0.2, Gd0.8
morpholinium tetrakis 6,6,7,7,8,8,8-heptafluoro-2,2-dimethyloctanedionato Dy0.2, Gd0.8
morpholinium tetrakis 1-phenyl-1,3-butanedionato Dy0.2, Gd0.8
dimethylbenzylammonium tetrakis acetylacetonato Dy0.2, Gd0.8
dimethylbenzylammonium tetrakis dibenzoylmethanato Dy0.2, Gd0.8
dimethylbenzylammonium tetrakis thenoyltrifluoroacetonato Dy0.2, Gd0.8
dimethylbenzylammonium tetrakis 2,2,6,6-tetramethylheptanedionato Dy0.2, Gd0.8
dimethylbenzylammonium tetrakis 3-methylpentane-2,4-dionato Dy0.2, Gd0.8
dimethylbenzylammonium tetrakis 3-ethylpentane-2,4-dionato Dy0.2, Gd0.8
dimethylbenzylammonium tetrakis pivaloyltrifluoroacetonato Dy0.2, Gd0.8
dimethylbenzylammonium tetrakis trifluoroacetylacetonato Dy0.2, Gd0.8
dimethylbenzylammonium tetrakis hexafluoroacetylacetonato Dy0.2, Gd0.8
dimethylbenzylammonium tetrakis 6,6,7,7,8,8,8-heptafluoro-2,2-dimethyloctanedionato Dy0.2, Gd0.8
dimethylbenzylammonium tetrakis 1-phenyl-1,3-butanedionato Dy0.2, Gd0.8
triallylammonium tetrakis acetylacetonato Dy0.2, Gd0.8
triallylammonium tetrakis dibenzoylmethanato Dy0.2, Gd0.8
triallylammonium tetrakis thenoyltrifluoroacetonato Dy0.2, Gd0.8
triallylammonium tetrakis 2,2,6,6-tetramethylheptanedionato Dy0.2, Gd0.8
triallylammonium tetrakis 3-methylpentane-2,4-dionato Dy0.2, Gd0.8
triallylammonium tetrakis 3-ethylpentane-2,4-dionato Dy0.2, Gd0.8
triallylammonium tetrakis pivaloyltrifluoroacetonato Dy0.2, Gd0.8
triallylammonium tetrakis trifluoroacetylacetonato Dy0.2, Gd0.8
triallylammonium tetrakis hexafluoroacetylacetonato Dy0.2, Gd0.8
triallylammonium tetrakis 6,6,7,7,8,8,8-heptafluoro-2,2-dimethyloctanedionato Dy0.2, Gd0.8
triallylammonium tetrakis 1-phenyl-1,3-butanedionato Dy0.2, Gd0.8
anilinium tetrakis acetylacetonato Dy0.2, Gd0.8
anilinium tetrakis dibenzoylmethanato Dy0.2, Gd0.8
anilinium tetrakis thenoyltrifluoroacetonato Dy0.2, Gd0.8
anilinium tetrakis 2,2,6,6-tetramethylheptanedionato Dy0.2, Gd0.8
anilinium tetrakis 3-methylpentane-2,4-dionato Dy0.2, Gd0.8
anilinium tetrakis 3-ethylpentane-2,4-dionato Dy0.2, Gd0.8
anilinium tetrakis pivaloyltrifluoroacetonato Dy0.2, Gd0.8
anilinium tetrakis trifluoroacetylacetonato Dy0.2, Gd0.8
anilinium tetrakis hexafluoroacetylacetonato Dy0.2, Gd0.8
anilinium tetrakis 6,6,7,7,8,8,8-heptafluoro-2,2-dimethyloctanedionato Dy0.2, Gd0.8
anilinium tetrakis 1-phenyl-1,3-butanedionato Dy0.2, Gd0.8
triethylammonium tetrakis acetylacetonato Dy0.1, Gd0.9
triethylammonium tetrakis dibenzoylmethanato Dy0.1, Gd0.9
triethylammonium tetrakis thenoyltrifluoroacetonato Dy0.1, Gd0.9
triethylammonium tetrakis 2,2,6,6-tetramethylheptanedionato Dy0.1, Gd0.9
triethylammonium tetrakis 3-methylpentane-2,4-dionato Dy0.1, Gd0.9
triethylammonium tetrakis 3-ethylpentane-2,4-dionato Dy0.1, Gd0.9
triethylammonium tetrakis pivaloyltrifluoroacetonato Dy0.1, Gd0.9
triethylammonium tetrakis trifluoroacetylacetonato Dy0.1, Gd0.9
triethylammonium tetrakis hexafluoroacetylacetonato Dy0.1, Gd0.9
triethylammonium tetrakis 6,6,7,7,8,8,8-heptafluoro-2,2-dimethyloctanedionato Dy0.1, Gd0.9
triethylammonium tetrakis 1-phenyl-1,3-butanedionato Dy0.1, Gd0.9
morpholinium tetrakis acetylacetonato Dy0.1, Gd0.9
morpholinium tetrakis dibenzoylmethanato Dy0.1, Gd0.9
morpholinium tetrakis thenoyltrifluoroacetonato Dy0.1, Gd0.9
morpholinium tetrakis 2,2,6,6-tetramethylheptanedionato Dy0.1, Gd0.9
morpholinium tetrakis 3-methylpentane-2,4-dionato Dy0.1, Gd0.9
morpholinium tetrakis 3-ethylpentane-2,4-dionato Dy0.1, Gd0.9
morpholinium tetrakis pivaloyltrifluoroacetonato Dy0.1, Gd0.9
morpholinium tetrakis trifluoroacetylacetonato Dy0.1, Gd0.9
morpholinium tetrakis hexafluoroacetylacetonato Dy0.1, Gd0.9
morpholinium tetrakis 6,6,7,7,8,8,8-heptafluoro-2,2-dimethyloctanedionato Dy0.1, Gd0.9
morpholinium tetrakis 1-phenyl-1,3-butanedionato Dy0.1, Gd0.9
dimethylbenzylammonium tetrakis acetylacetonato Dy0.1, Gd0.9
dimethylbenzylammonium tetrakis dibenzoylmethanato Dy0.1, Gd0.9
dimethylbenzylammonium tetrakis thenoyltrifluoroacetonato Dy0.1, Gd0.9
dimethylbenzylammonium tetrakis 2,2,6,6-tetramethylheptanedionato Dy0.1, Gd0.9
dimethylbenzylammonium tetrakis 3-methylpentane-2,4-dionato Dy0.1, Gd0.9 dimethylbenzylammonium tetrakis 3-ethylpentane-2,4-dionato Dy0.1, Gd0.9
dimethylbenzylammonium tetrakis pivaloyltrifluoroacetonato Dy0.1, Gd0.9
dimethylbenzylammonium tetrakis trifluoroacetylacetonato Dy0.1, Gd0.9
dimethylbenzylammonium tetrakis hexafluoroacetylacetonato Dy0.1, Gd0.9
dimethylbenzylammonium tetrakis 6,6,7,7,8,8,8-heptafluoro-2,2-dimethyloctanedionato Dy0.1, Gd0.9
dimethylbenzylammonium tetrakis 1-phenyl-1,3-butanedionato Dy0.1, Gd0.9
triallylammonium tetrakis acetylacetonato Dy0.1, Gd0.9
triallylammonium tetrakis dibenzoylmethanato Dy0.1, Gd0.9
triallylammonium tetrakis thenoyltrifluoroacetonato Dy0.1, Gd0.9
triallylammonium tetrakis 2,2,6,6-tetramethylheptanedionato Dy0.1, Gd0.9
triallylammonium tetrakis 3-methylpentane-2,4-dionato Dy0.1, Gd0.9
triallylammonium tetrakis 3-ethylpentane-2,4-dionato Dy0.1, Gd0.9
triallylammonium tetrakis pivaloyltrifluoroacetonato Dy0.1, Gd0.9
triallylammonium tetrakis trifluoroacetylacetonato Dy0.1, Gd0.9
triallylammonium tetrakis hexafluoroacetylacetonato Dy0.1, Gd0.9
triallylammonium tetrakis 6,6,7,7,8,8,8-heptafluoro-2,2-dimethyloctanedionato Dy0.1, Gd0.9
triallylammonium tetrakis 1-phenyl-1,3-butanedionato Dy0.1, Gd0.9
anilinium tetrakis acetylacetonato Dy0.1, Gd0.9
anilinium tetrakis dibenzoylmethanato Dy0.1, Gd0.9
anilinium tetrakis thenoyltrifluoroacetonato Dy0.1, Gd0.9
anilinium tetrakis 2,2,6,6-tetramethylheptanedionato Dy0.1, Gd0.9
anilinium tetrakis 3-methylpentane-2,4-dionato Dy0.1, Gd0.9
anilinium tetrakis 3-ethylpentane-2,4-dionato Dy0.1, Gd0.9
anilinium tetrakis pivaloyltrifluoroacetonato Dy0.1, Gd0.9
anilinium tetrakis trifluoroacetylacetonato Dy0.1, Gd0.9
anilinium tetrakis hexafluoroacetylacetonato Dy0.1, Gd0.9
anilinium tetrakis 6,6,7,7,8,8,8-heptafluoro-2,2-dimethyloctanedionato Dy0.1, Gd0.9
anilinium tetrakis 1-phenyl-1,3-butanedionato Dy0.1, Gd0.9
triethylammonium tetrakis acetylacetonato Dy0.01, Gd0.99
triethylammonium tetrakis dibenzoylmethanato Dy0.01, Gd0.99
triethylammonium tetrakis thenoyltrifluoroacetonato Dy0.01, Gd0.99
triethylammonium tetrakis 2,2,6,6-tetramethylheptanedionato Dy0.01, Gd0.99
triethylammonium tetrakis 3-methylpentane-2,4-dionato Dy0.01, Gd0.99
triethylammonium tetrakis 3-ethylpentane-2,4-dionato Dy0.01, Gd0.99
triethylammonium tetrakis pivaloyltrifluoroacetonato Dy0.01, Gd0.99
triethylammonium tetrakis trifluoroacetylacetonato Dy0.01, Gd0.99
triethylammonium tetrakis hexafluoroacetylacetonato Dy0.01, Gd0.99
triethylammonium tetrakis 6,6,7,7,8,8,8-heptafluoro-2,2-dimethyloctanedionato Dy0.01, Gd0.99
triethylammonium tetrakis 1-phenyl-1,3-butanedionato Dy0.01, Gd0.99
morpholinium tetrakis acetylacetonato Dy0.01, Gd0.99
morpholinium tetrakis dibenzoylmethanato Dy0.01, Gd0.99
morpholinium tetrakis thenoyltrifluoroacetonato Dy0.01, Gd0.99
morpholinium tetrakis 2,2,6,6-tetramethylheptanedionato Dy0.01, Gd0.99
morpholinium tetrakis 3-methylpentane-2,4-dionato Dy0.01, Gd0.99
morpholinium tetrakis 3-ethylpentane-2,4-dionato Dy0.01, Gd0.99
morpholinium tetrakis pivaloyltrifluoroacetonato Dy0.01, Gd0.99
morpholinium tetrakis trifluoroacetylacetonato Dy0.01, Gd0.99
morpholinium tetrakis hexafluoroacetylacetonato Dy0.01, Gd0.99
morpholinium tetrakis 6,6,7,7,8,8,8-heptafluoro-2,2-dimethyloctanedionato Dy0.01, Gd0.99
morpholinium tetrakis 1-phenyl-1,3-butanedionato Dy0.01, Gd0.99
dimethylbenzylammonium tetrakis acetylacetonato Dy0.01, Gd0.99
dimethylbenzylammonium tetrakis dibenzoylmethanato Dy0.01, Gd0.99
dimethylbenzylammonium tetrakis thenoyltrifluoroacetonato Dy0.01, Gd0.99
dimethylbenzylammonium tetrakis 2,2,6,6-tetramethylheptanedionato Dy0.01, Gd0.99
dimethylbenzylammonium tetrakis 3-methylpentane-2,4-dionato Dy0.01, Gd0.99
dimethylbenzylammonium tetrakis 3-ethylpentane-2,4-dionato Dy0.01, Gd0.99
dimethylbenzylammonium tetrakis pivaloyltrifluoroacetonato Dy0.01, Gd0.99
dimethylbenzylammonium tetrakis trifluoroacetylacetonato Dy0.01, Gd0.99
dimethylbenzylammonium tetrakis hexafluoroacetylacetonato Dy0.01, Gd0.99
dimethylbenzylammonium tetrakis 6,6,7,7,8,8,8-heptafluoro-2,2-dimethyloctanedionato Dy0.01, Gd0.99
dimethylbenzylammonium tetrakis 1-phenyl-1,3-butanedionato Dy0.01, Gd0.99
triallylammonium tetrakis acetylacetonato Dy0.01, Gd0.99
triallylammonium tetrakis dibenzoylmethanato Dy0.01, Gd0.99
triallylammonium tetrakis thenoyltrifluoroacetonato Dy0.01, Gd0.99
triallylammonium tetrakis 2,2,6,6-tetramethylheptanedionato Dy0.01, Gd0.99
triallylammonium tetrakis 3-methylpentane-2,4-dionato Dy0.01, Gd0.99
triallylammonium tetrakis 3-ethylpentane-2,4-dionato Dy0.01, Gd0.99
triallylammonium tetrakis pivaloyltrifluoroacetonato Dy0.01, Gd0.99
triallylammonium tetrakis trifluoroacetylacetonato Dy0.01, Gd0.99
triallylammonium tetrakis hexafluoroacetylacetonato Dy0.01, Gd0.99
triallylammonium tetrakis 6,6,7,7,8,8,8-heptafluoro-2,2-dimethyloctanedionato Dy0.01, Gd0.99
triallylammonium tetrakis 1-phenyl-1,3-butanedionato Dy0.01, Gd0.99
anilinium tetrakis acetylacetonato Dy0.01, Gd0.99
anilinium tetrakis dibenzoylmethanato Dy0.01, Gd0.99 anilinium tetrakis thenoyltrifluoroacetonato Dy0.01, Gd0.99
anilinium tetrakis 2,2,6,6-tetramethylheptanedionato Dy0.01, Gd0.99
anilinium tetrakis 3-methylpentane-2,4-dionato Dy0.01, Gd0.99
anilinium tetrakis 3-ethylpentane-2,4-dionato Dy0.01, Gd0.99
anilinium tetrakis pivaloyltrifluoroacetonato Dy0.01, Gd0.99
anilinium tetrakis trifluoroacetylacetonato Dy0.01, Gd0.99
anilinium tetrakis hexafluoroacetylacetonato Dy0.01, Gd0.99
anilinium tetrakis 6,6,7,7,8,8,8-heptafluoro-2,2-dimethyloctanedionato Dy0.01, Gd0.99
anilinium tetrakis 1-phenyl-1,3-butanedionato Dy0.01, Gd0.99

The invention claimed is:

1. A material comprising M plus a ligand wherein M is selected from Tb, Eu, Sm, Dy wherein:

the material is capable of exhibiting a photoluminescent effect; and from 75% to 99.99% of M is replaced by at least one of Y, Gd, La or Lu, wherein the ligand is selected from a group consisting of:

(i) Formula I:

Formula I

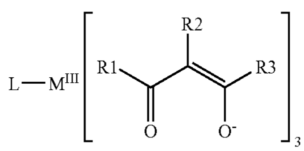

wherein:

R2 is H or C1–C6 alkyl or phenyl;

R1 and R3 are independently of each other selected from phenyl, naphthyl,

H and C1–C6 branched or straight chain alkyl, thiophene and C1–C6 fluorinated alkyl wherein the fluorination may be in 1 or all positions or any intermediate value, substituted phenyl wherein the substituents are independently selected from C1–C4 straight or branched chain alkyl, Cl, Br, F, I and the phenyl group may be substituted in 1, 2 or 3 positions; and L is given by the following general Formula IA:

Formula IA

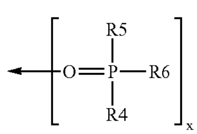

wherein the arrow indicates that the oxygen coordinates to M and wherein x is 1 or 2

R4 and R5 are independently of each other selected from phenyl, tolyl, naphthyl, C1–C6 branched or straight chain alkyl and substituted phenyl wherein the substituents are independently selected from C1–C4 straight or branched chain alkyl and the phenyl group may be substituted in 1, 2 or 3 positions;

R6 is selected from phenyl, tolyl, naphthyl, C1–C6 branched or straight chain alkyl, —$(CH_2)_n$P(O)R7 R8, wherein n=1 to 4 and —N═(P R7 R8 R9), wherein R7, R8 and R9 are independently selected from phenyl, naphthyl, C1–C6 branched or straight chain alkyl and substituted phenyl wherein the substituents are independently selected from C1–C4 straight or branched chain alkyl and the phenyl group may be substituted in 1, 2 or 3 positions;

R6 is also selected from substituted phenyl wherein the substituents are independently selected from C1–C4 straight or branched chain alkyl and the phenyl group may be substituted in 1, 2 or 3 positions;

or, (ii) Formula II:

Formula II

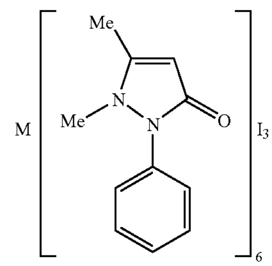

wherein M is replaced by at least one of La or Lu;

or, (iii) Formula III:

Formula III

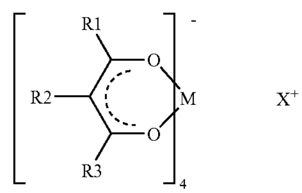

wherein R1 and R2 and R3 are independently chosen from H, $C_1$–$C_{12}$ alkyl, including straight and branched chain which may be fluorinated in one, or any interim amount and up to all positions, $C_1$–$C_{12}$ cycloalkyl, aryl, thiophene, pyrrole, pyridine, pyrimidine, furan, benzoxazole, benzothiazole;

$X^+$ is selected from:

morpholinium;

pyridinium optionally substituted by phenyl, C1–C6 alkyl, Cl, Br, F, I, CN, $NO_2$;

$HNR_1R_2R_3$ wherein $R_1$, $R_2$ and $R_3$ are independently selected from H, C1–C12 alkyl, phenyl and benzyl.

2. The material according to claim 1 wherein the ligand is selected from Formula II or Formula III.

3. The material according to claim 1 wherein from 85 to 99.99% of M is replaced.

4. The material according to claim 3 wherein from 95 to 99.99% of M is replaced.

5. The material according to claim 1 wherein,

M is selected from Eu, Tb or Dy;

R2 is H;

R1 and R3 are each tert-butyl or phenyl.

6. The material according to claim 1 wherein R6 is selected from —$(CH_2)_n$P(O)R7 R8 wherein the P(O) group is coordinated via the O to M or to another equivalent M as a bridging group.

7. The material according to claim 1, wherein the $I_3$ anion is replaced by a tetrafluoroborate anion.

8. A liquid crystal device which comprises a display cell comprising a layer of a liquid crystal material, means for addressing the liquid crystal material so as to allow light to pass through it when appropriately addressed, and an emitting layer comprising phosphor elements which comprises a material according to claim 1 arranged to receive light passing through the liquid crystal layer.

9. A device comprising one or more materials according to claim 1.

10. A method for preparing a material of claim 1 comprising M plus ligand wherein M is chosen from Tb, Eu, Sm or Dy, wherein the material is capable of exhibiting a photoluminescent effect; and, wherein the method comprises incorporating in place of 75% to 99.99% of M at least one of Y, Gd, La or Lu, provided that when the material is given by Formula II (as hereinbefore defined) then M is replaced by at least one of La or Lu.

11. A method of producing a luminescent light output, comprising the step of subjecting a material capable of exhibiting a photoluminescent effect to a light source capable of inducing photoluminescence in said material; wherein said material comprises a material of claim 1.

* * * * *